(12) United States Patent
Guheen et al.

(10) Patent No.: US 6,615,166 B1
(45) Date of Patent: Sep. 2, 2003

(54) PRIORITIZING COMPONENTS OF A NETWORK FRAMEWORK REQUIRED FOR IMPLEMENTATION OF TECHNOLOGY

(75) Inventors: Michael F. Guheen, Tiburon, CA (US); James D. Mitchell, Manhattan Beach, CA (US); James J. Barrese, San Jose, CA (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/321,274

(22) Filed: May 27, 1999

(51) Int. Cl.[7] .............................................. G06F 13/00
(52) U.S. Cl. .......................... 703/27; 703/26; 709/231; 709/316; 709/223; 709/220; 717/140
(58) Field of Search ..................... 703/27, 26; 345/356, 345/357, 735, 736; 707/10, 104; 709/231, 223, 316, 220, 226; 717/140, 176, 177; 370/412

(56) References Cited

U.S. PATENT DOCUMENTS

| | | | |
|---|---|---|---|
| 4,674,043 A | | 6/1987 | Hernandez et al. |
| 4,937,863 A | | 6/1990 | Robert et al. |
| 5,023,907 A | | 6/1991 | Johnson et al. |
| 5,204,955 A | * | 4/1993 | Kagei et al. ................. 395/575 |
| 5,216,593 A | * | 6/1993 | Dietrich et al. ............. 364/402 |
| 5,579,222 A | | 11/1996 | Bains et al. |
| 5,615,312 A | | 3/1997 | Kohler |
| 5,710,887 A | | 1/1998 | Chelliah et al. |
| 5,740,549 A | | 4/1998 | Reilly et al. |
| 5,745,681 A | | 4/1998 | Levine et al. |
| 5,752,238 A | | 5/1998 | Dedrick |
| 5,799,151 A | | 8/1998 | Hoffer |
| 5,819,092 A | | 10/1998 | Ferguson et al. |
| 5,826,242 A | | 10/1998 | Montulli |
| 5,848,396 A | | 12/1998 | Gerace |

(List continued on next page.)

FOREIGN PATENT DOCUMENTS

JP 6-274504 9/1994 ........... G06F/15/21

OTHER PUBLICATIONS

Chuah, M. et al., "Information Rich Glyphs for Software Management Data", *Information Visualization*, pp. 24–29 (Jul./Aug. 1998).

DiCesare, F. et al., "An Interactive Multimedia Learning Module for Manufacturing Scheduling", *IEEE*, pp. 770–776 (Nov. 18, 1996).

Hawley, J. et al., "Paperless Assembly Using Touchscreen Based Graphics", *IEEE/CHMT '91 IEMT Symposium*, pp. 231–234 (Sep. 16, 1991).

Imhof, K. et al., "Show It With Colors. Connectivity, Status, and Value Information in Energy Management Systems", *IEEE Computer Applications in Power*, pp. 11–16 (Oct. 1990).

*Primary Examiner*—Krisna Lim
*Assistant Examiner*—Thai Phan
(74) *Attorney, Agent, or Firm*—Oppenheimer Wolff & Donnelly LLP

(57) ABSTRACT

A system and method are provided for prioritizing components of an existing network framework. First, a plurality of components required for implementation of a predetermined technology using an existing network framework are provided. Next, a priority listing of the components is complied such that the relative position of the components on the priority listing corresponds to a temporal priority among the components. The existing network framework and the components are pictorially represented. Next, a first component of the existing network framework is indicia coded in order to indicate that the first component must be installed first based on the component's position on the priority listing. Thereafter, a second component and any remaining components of the existing network framework is indicia encoded in order to indicate that the second component and any remaining components must be installed after the first component based on the second component's position on the priority listing.

18 Claims, 177 Drawing Sheets

U.S. PATENT DOCUMENTS

| | | | | |
|---|---|---|---|---|
| 5,870,559 A | * | 2/1999 | Leshem et al. | 395/200.54 |
| 5,873,069 A | | 2/1999 | Reuhl et al. | |
| 5,890,137 A | | 3/1999 | Koreeda | |
| 5,895,477 A | * | 4/1999 | Orr et al. | 707/517 |
| 6,144,962 A | * | 11/2000 | Weinberg et al. | 707/10 |
| 6,208,345 B1 | * | 3/2001 | Sheard et al. | 345/356 |
| 6,269,398 B1 | * | 7/2001 | Leong et al. | 709/224 |
| 6,324,647 B1 | * | 11/2001 | Bowman-Amuah | 713/201 |
| 6,332,163 B1 | * | 12/2001 | Bowman-Amuah | 709/231 |
| 6,473,794 B1 | * | 10/2002 | Guheen et al. | 709/223 |
| 6,519,571 B1 | * | 2/2003 | Guheen et al. | 705/14 |
| 6,536,037 B1 | * | 3/2003 | Guheen et al. | 717/151 |

* cited by examiner

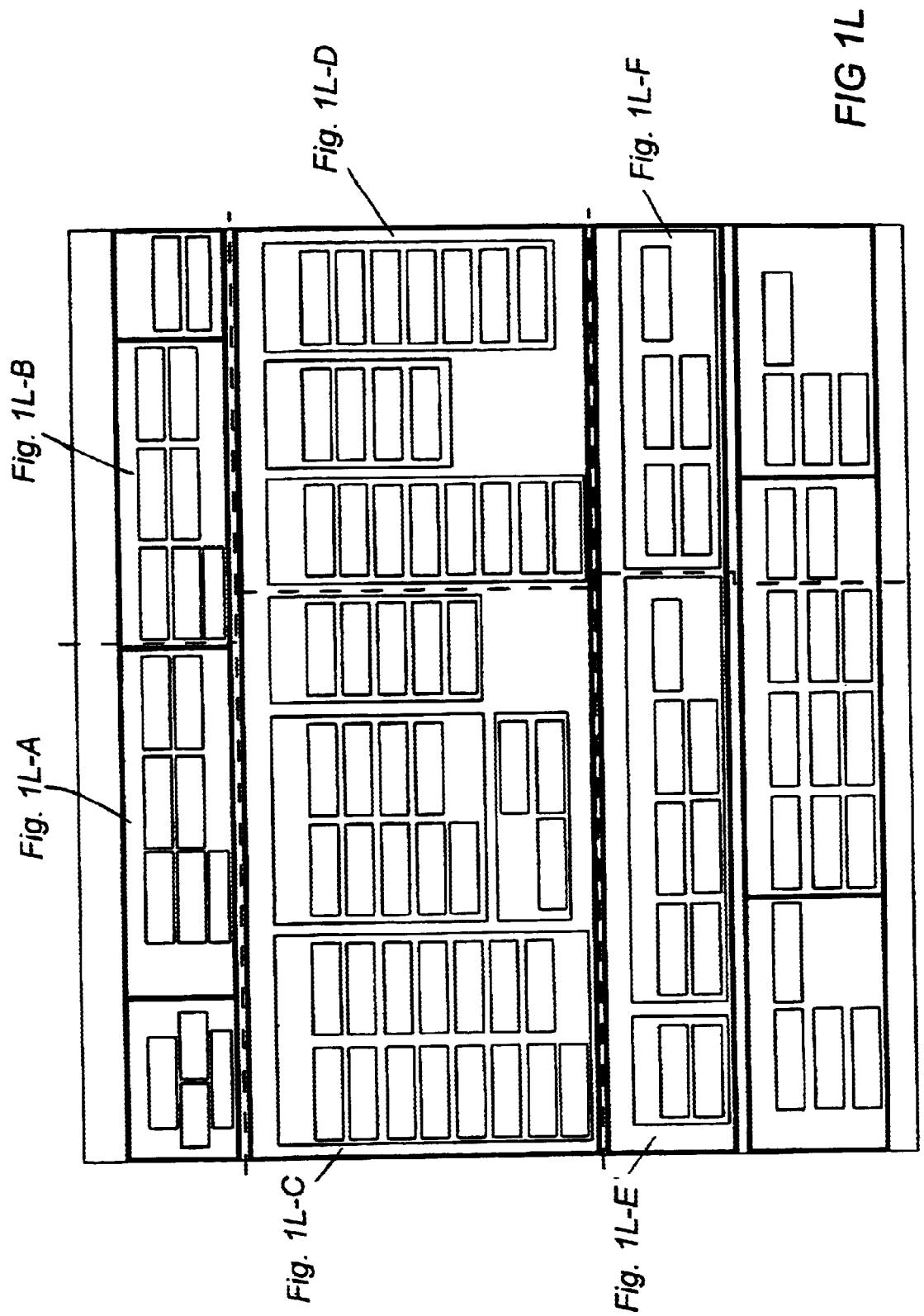

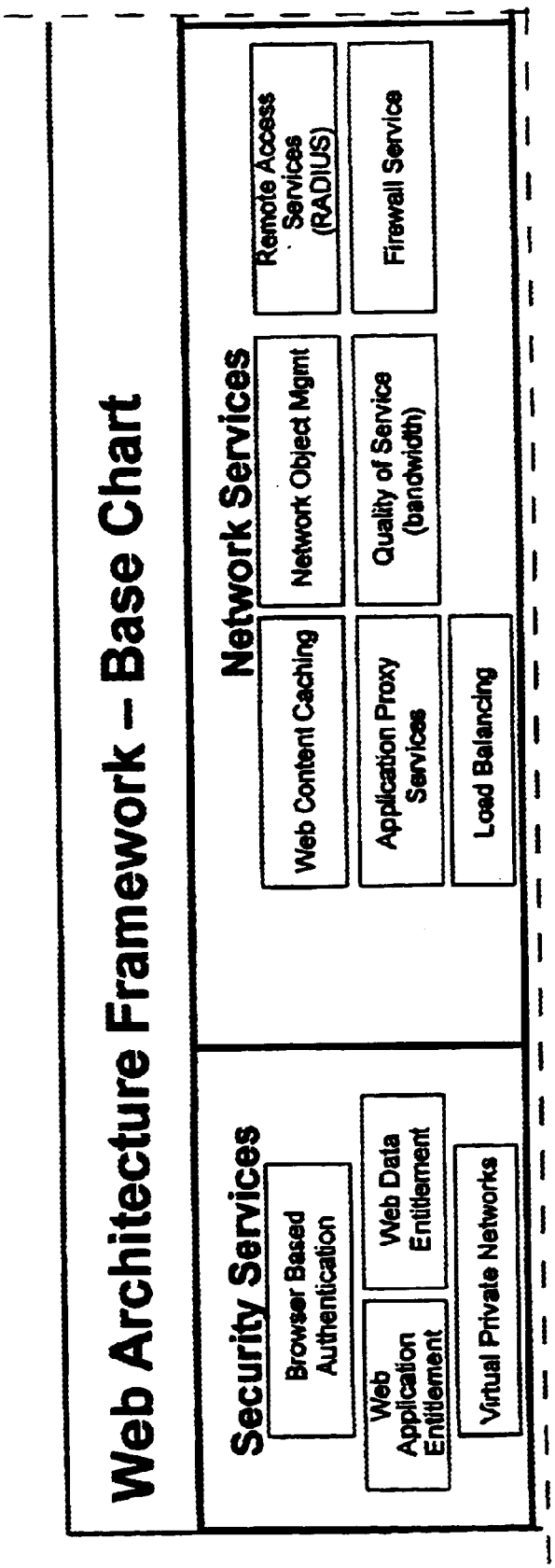
Fig. 1L-A

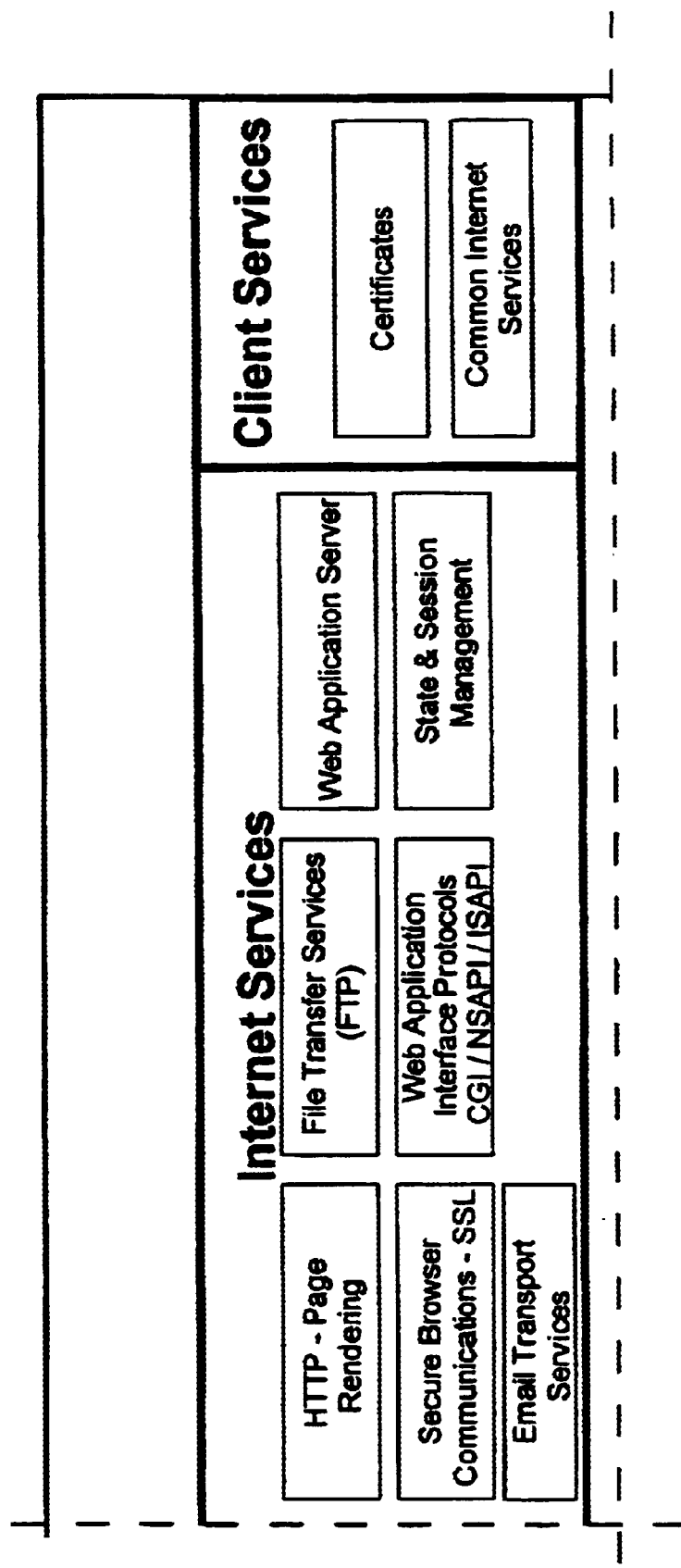
Fig. 1L-B

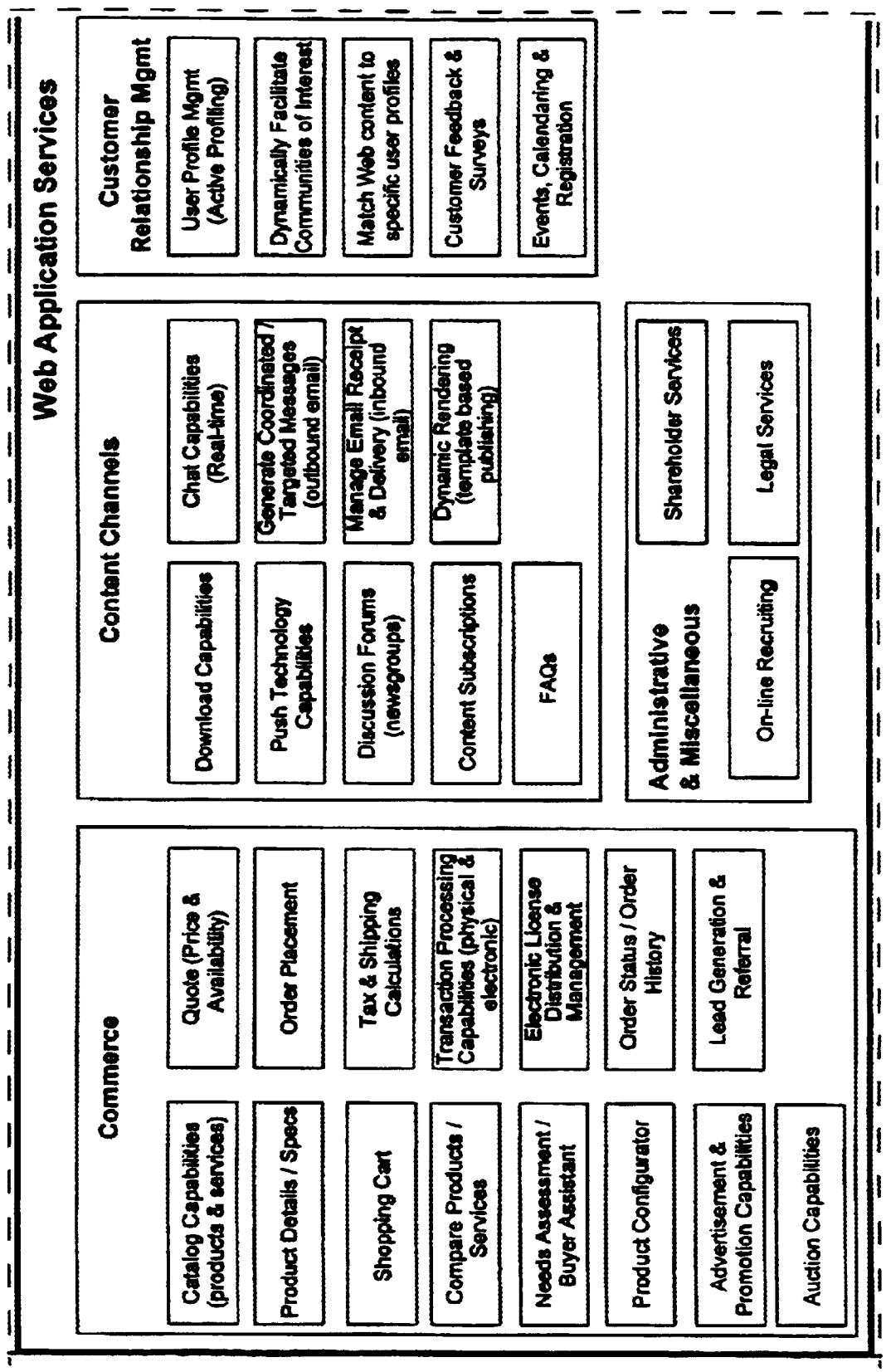
Fig. 1L-C

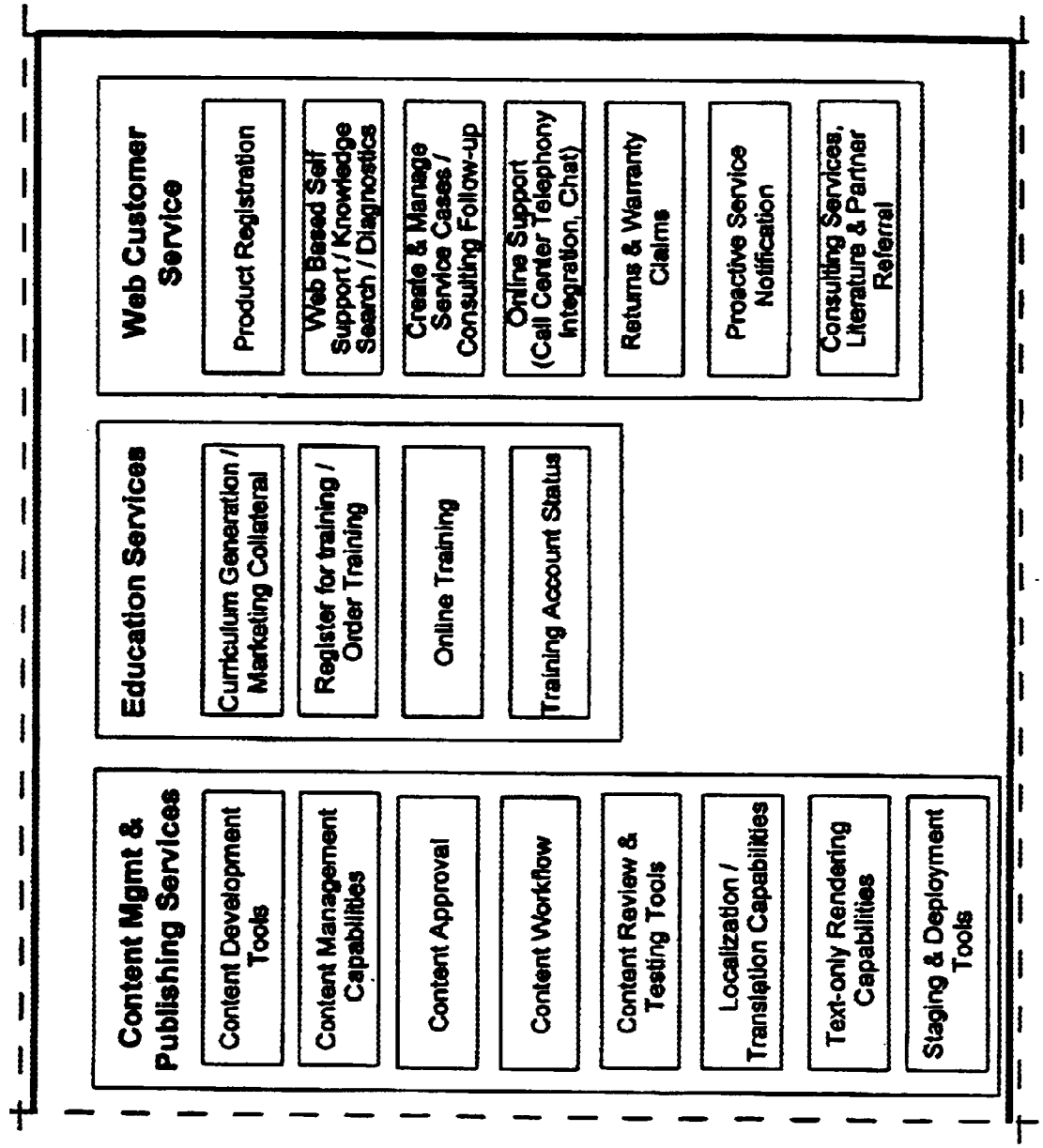
Fig. 1L-D

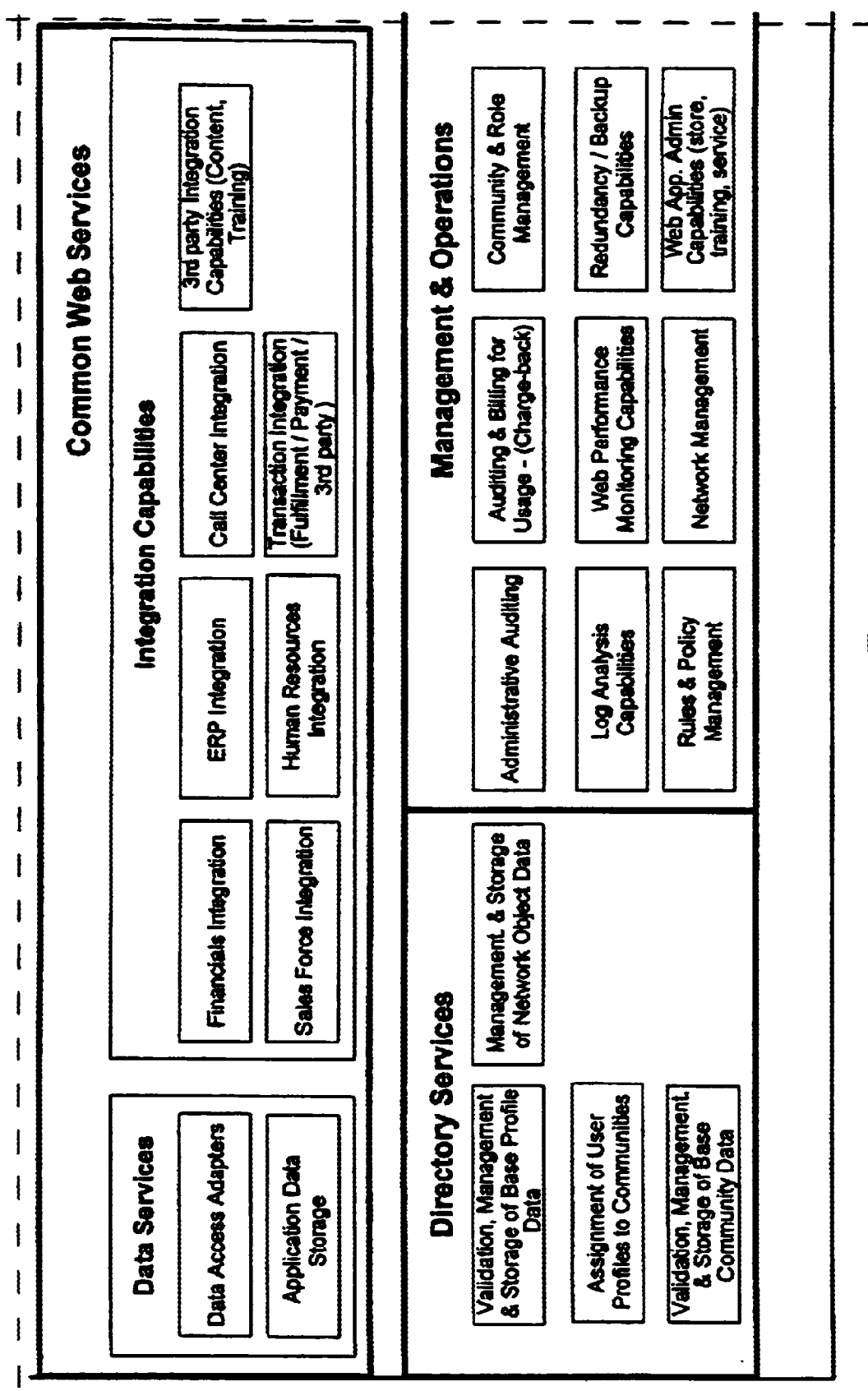
Fig. 1L-E

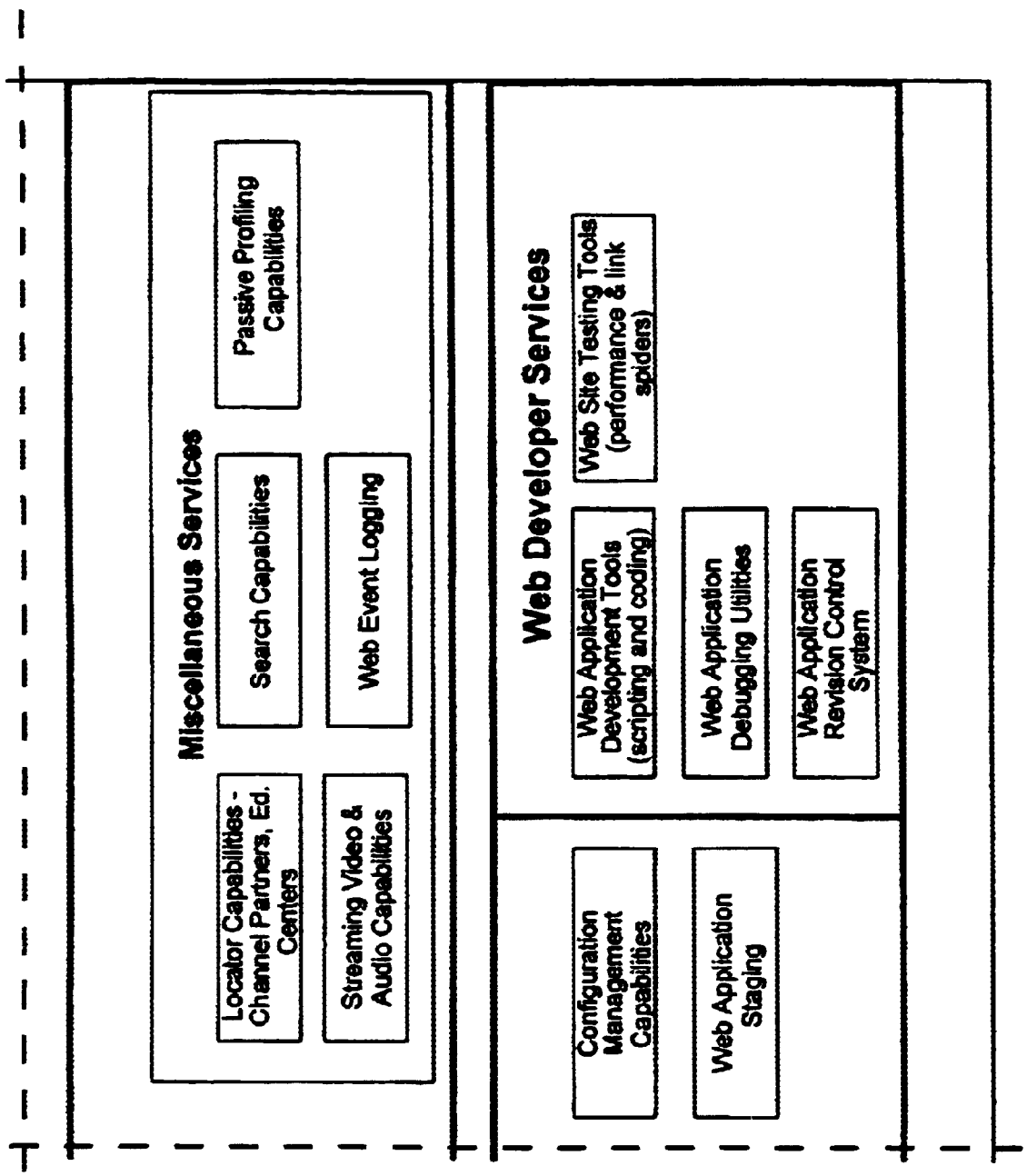
Fig. 1L-F

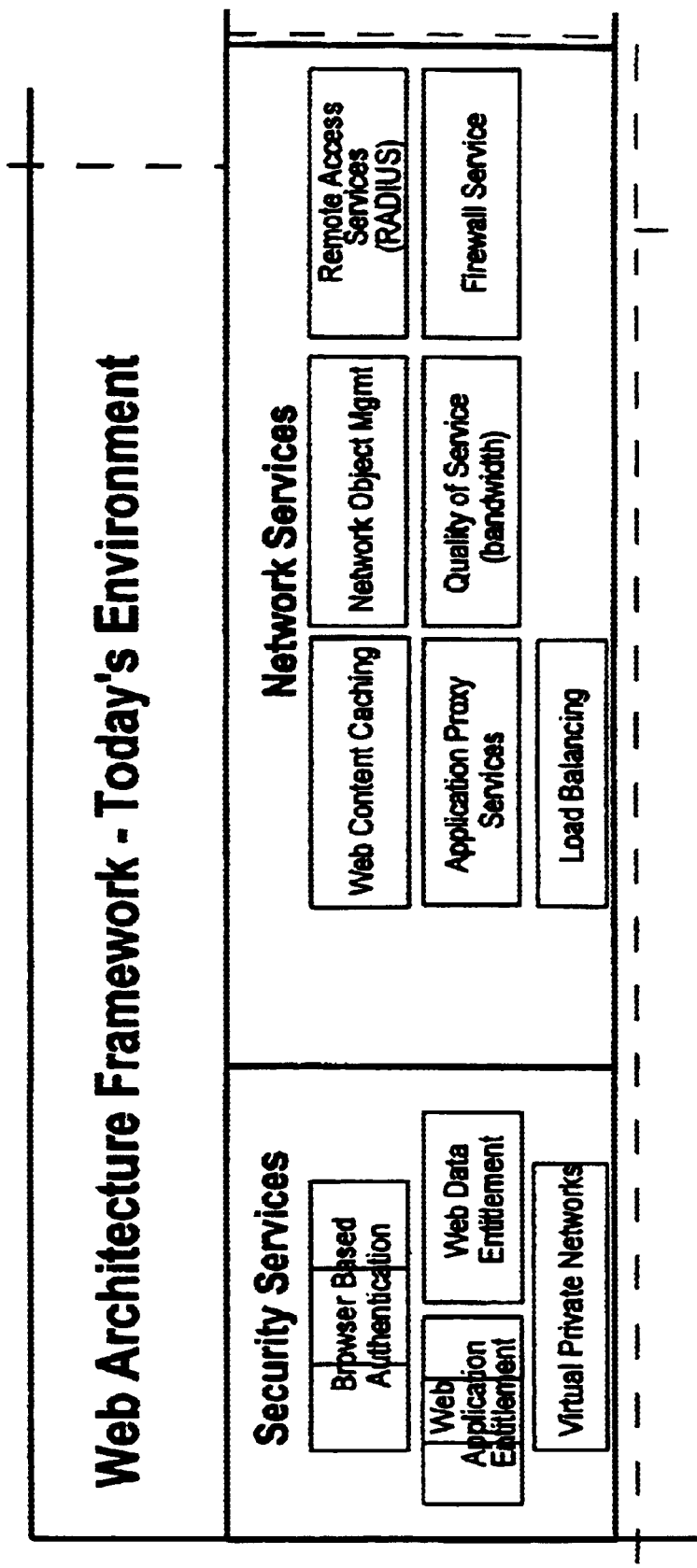
FIG 1M-A

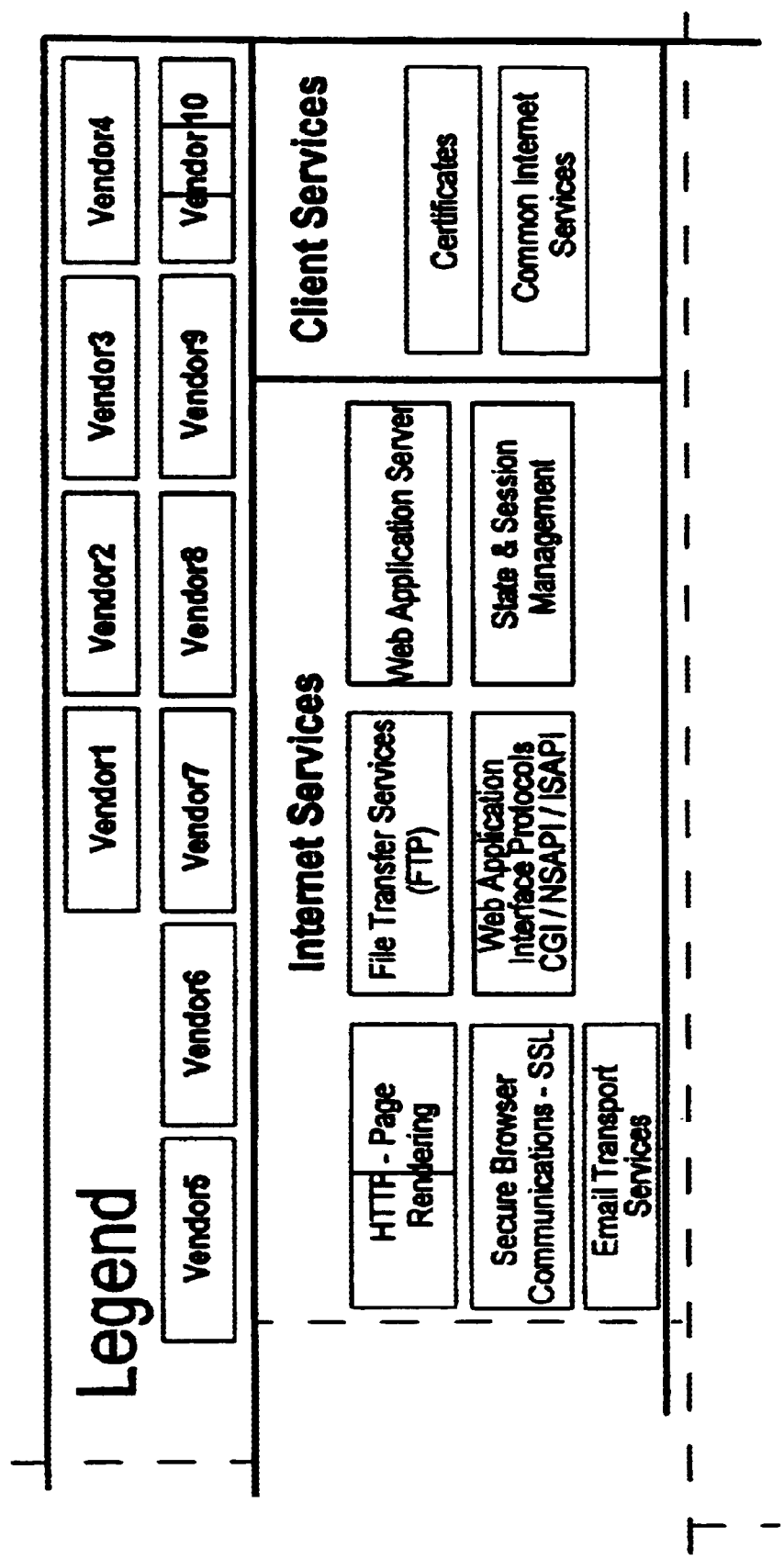
FIG 1M-B

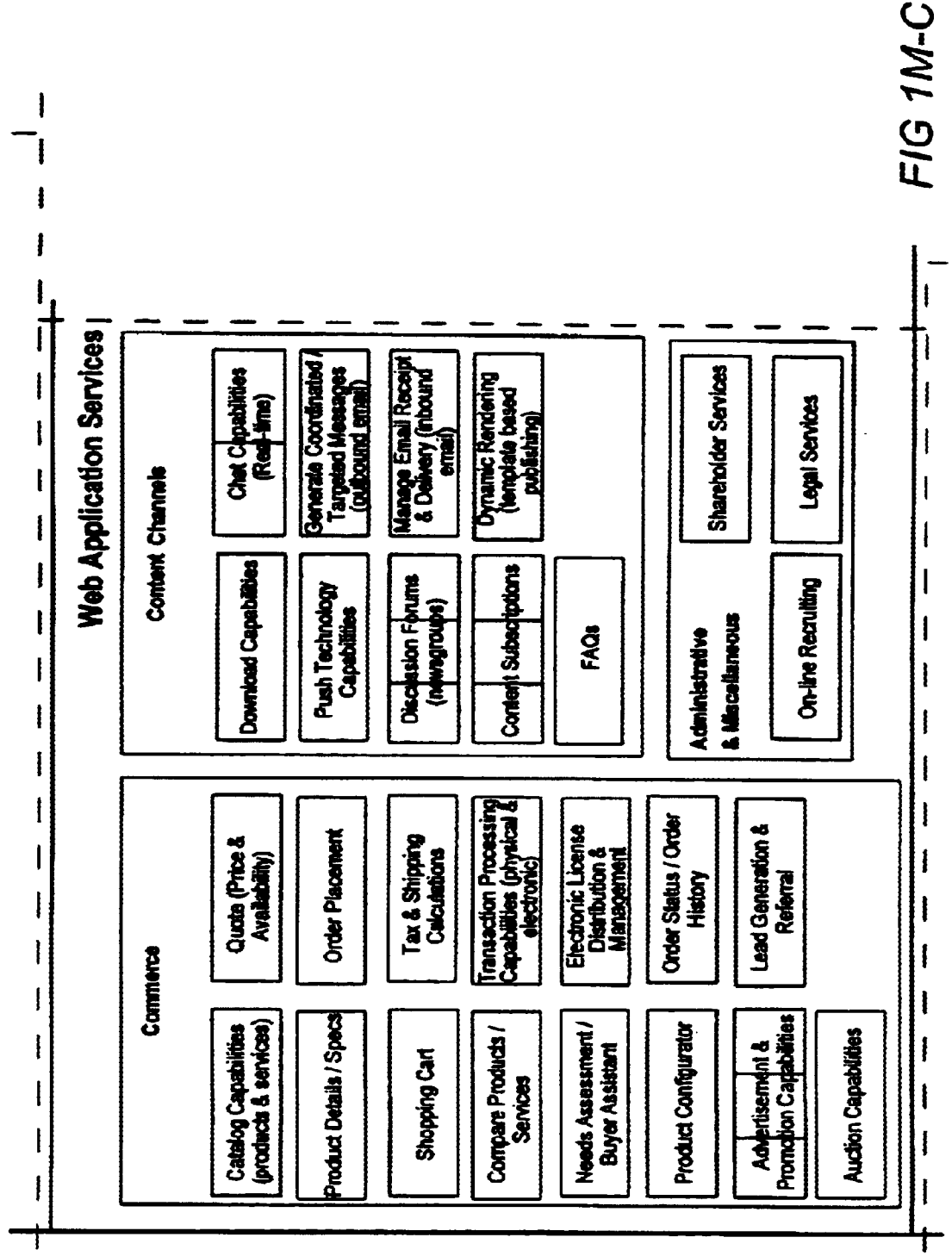
FIG 1M-C

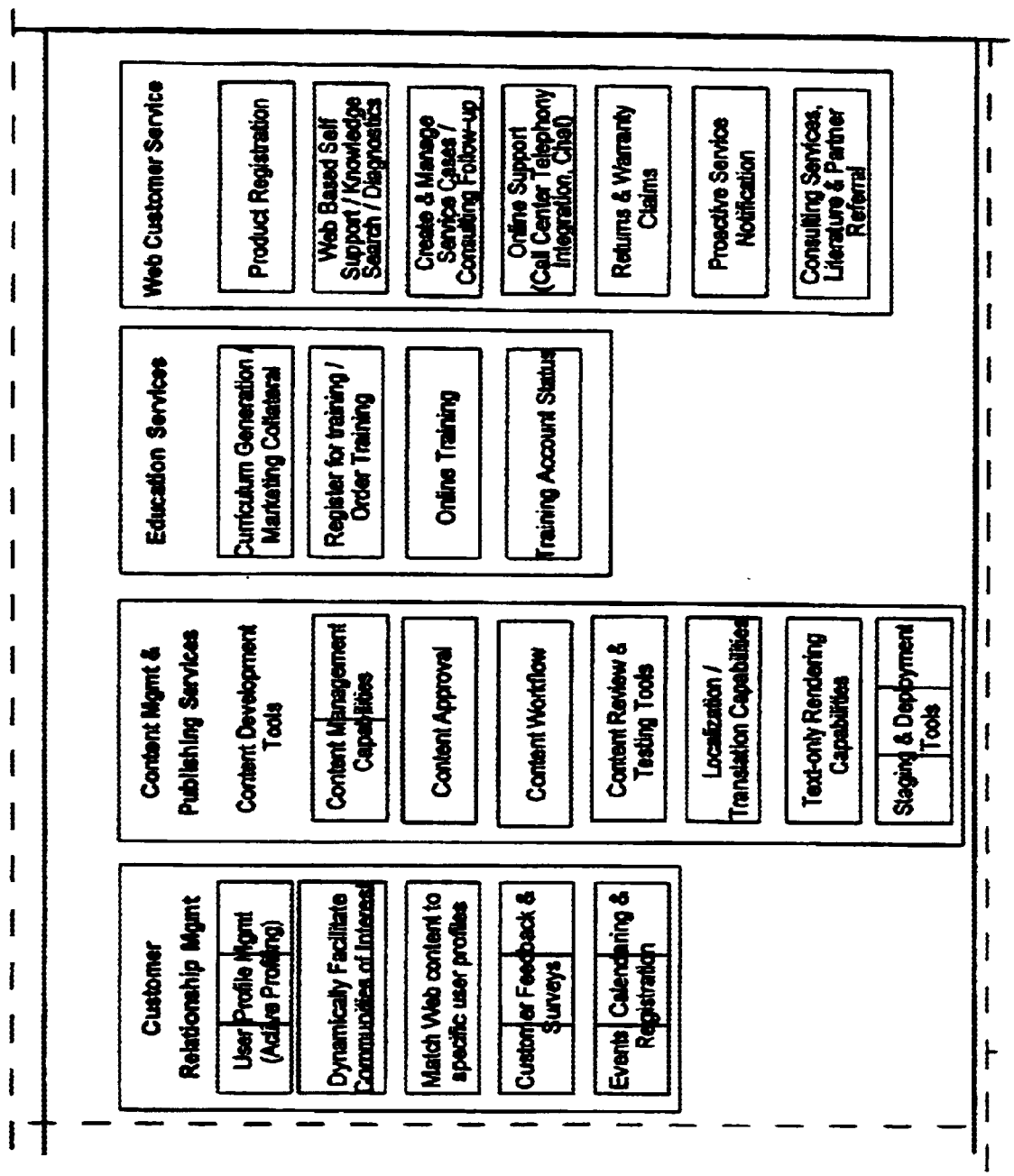
FIG 1M-D

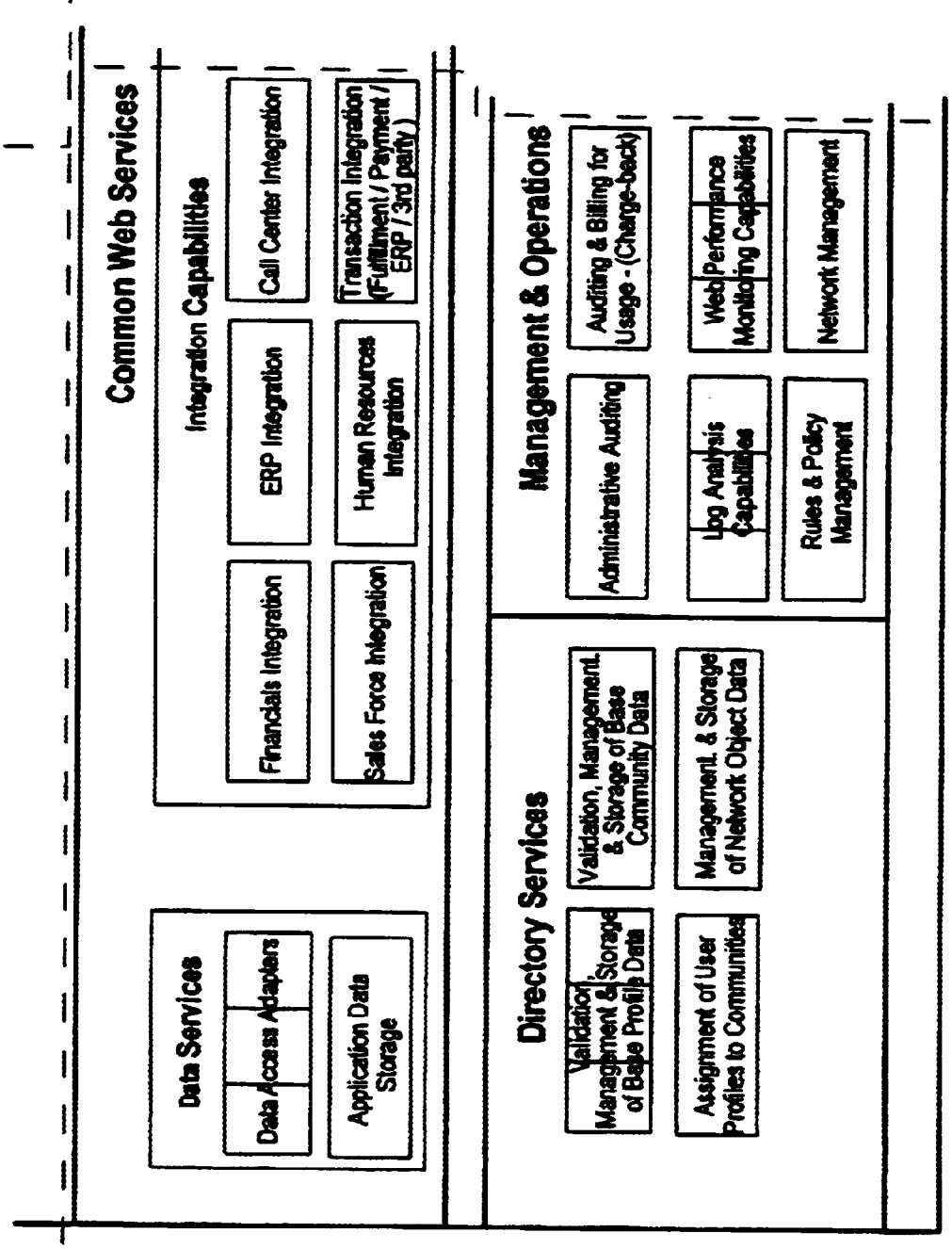
FIG 1M-E

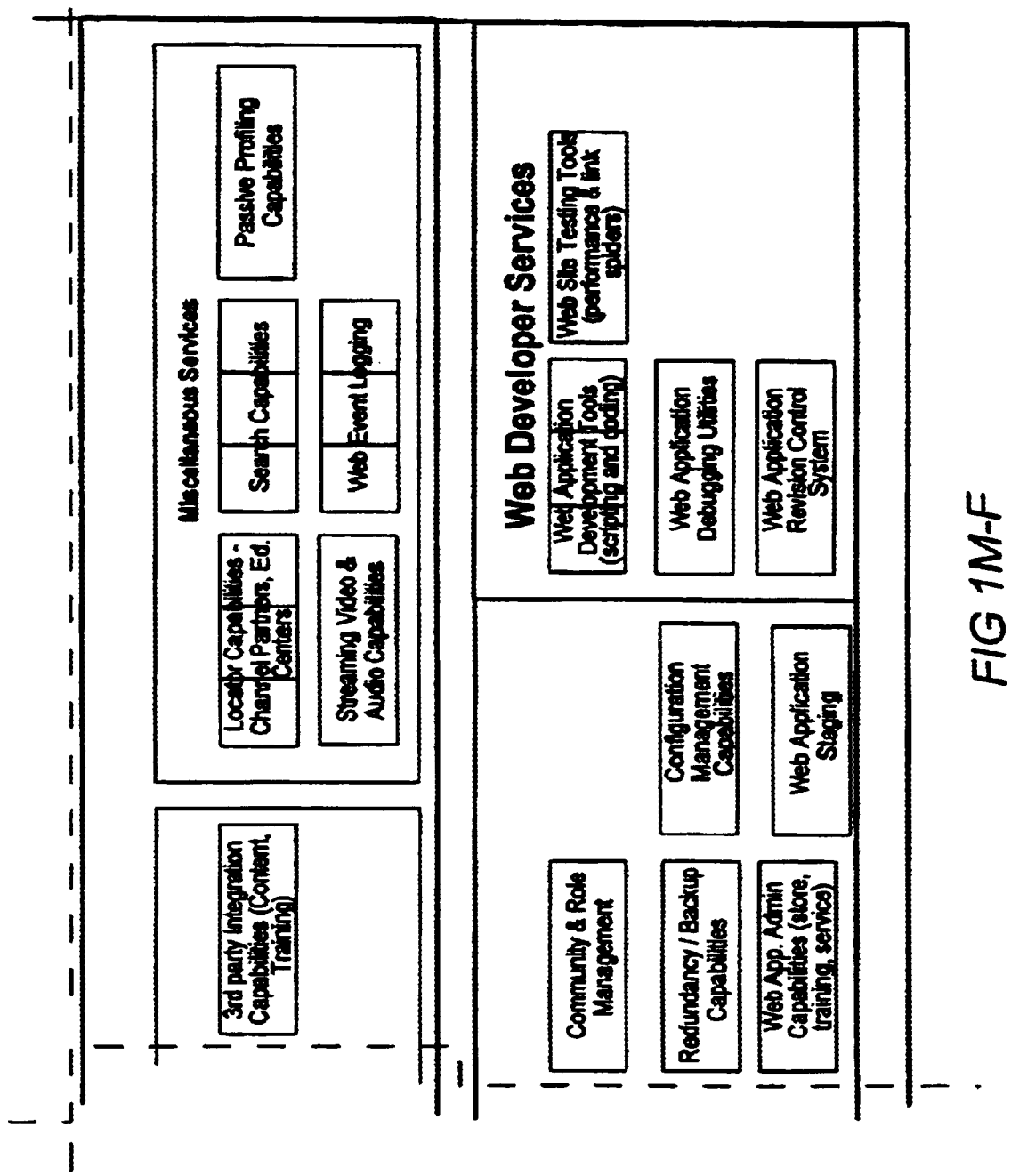
FIG 1M-F

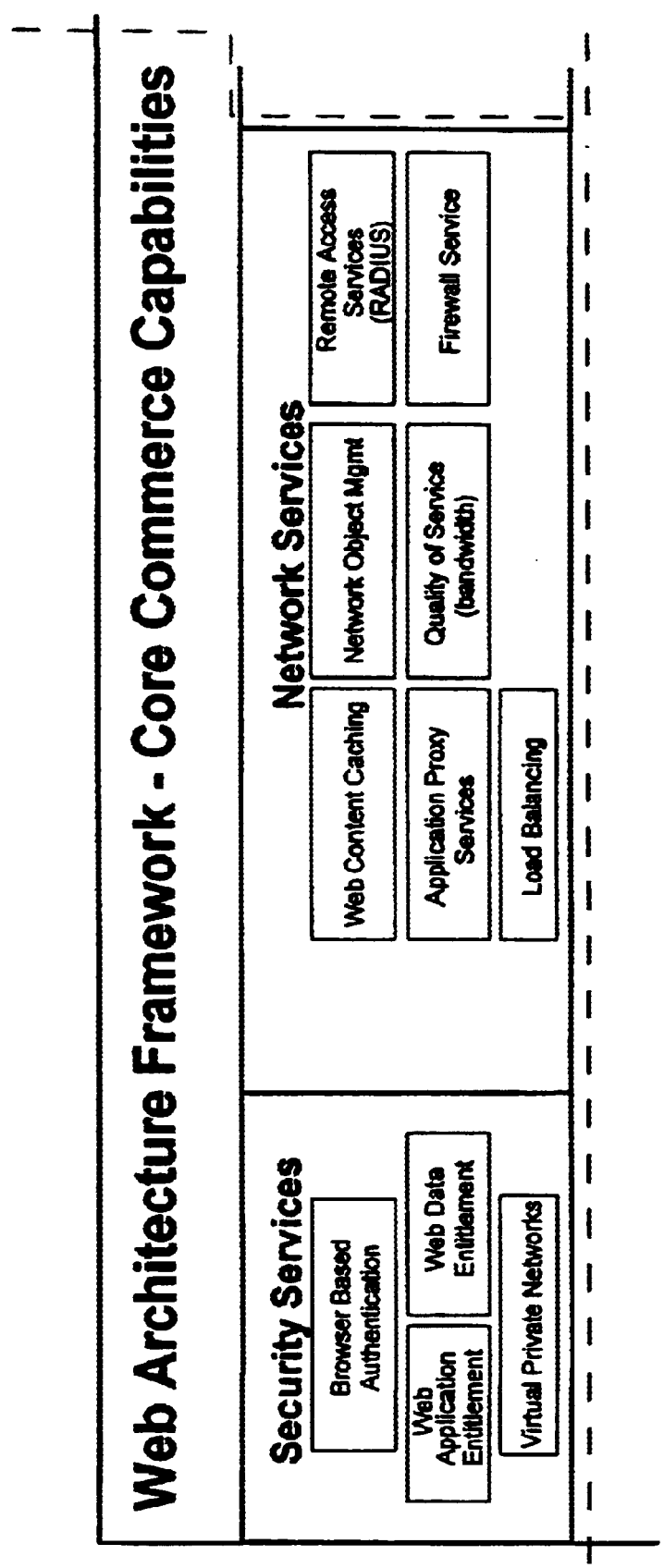

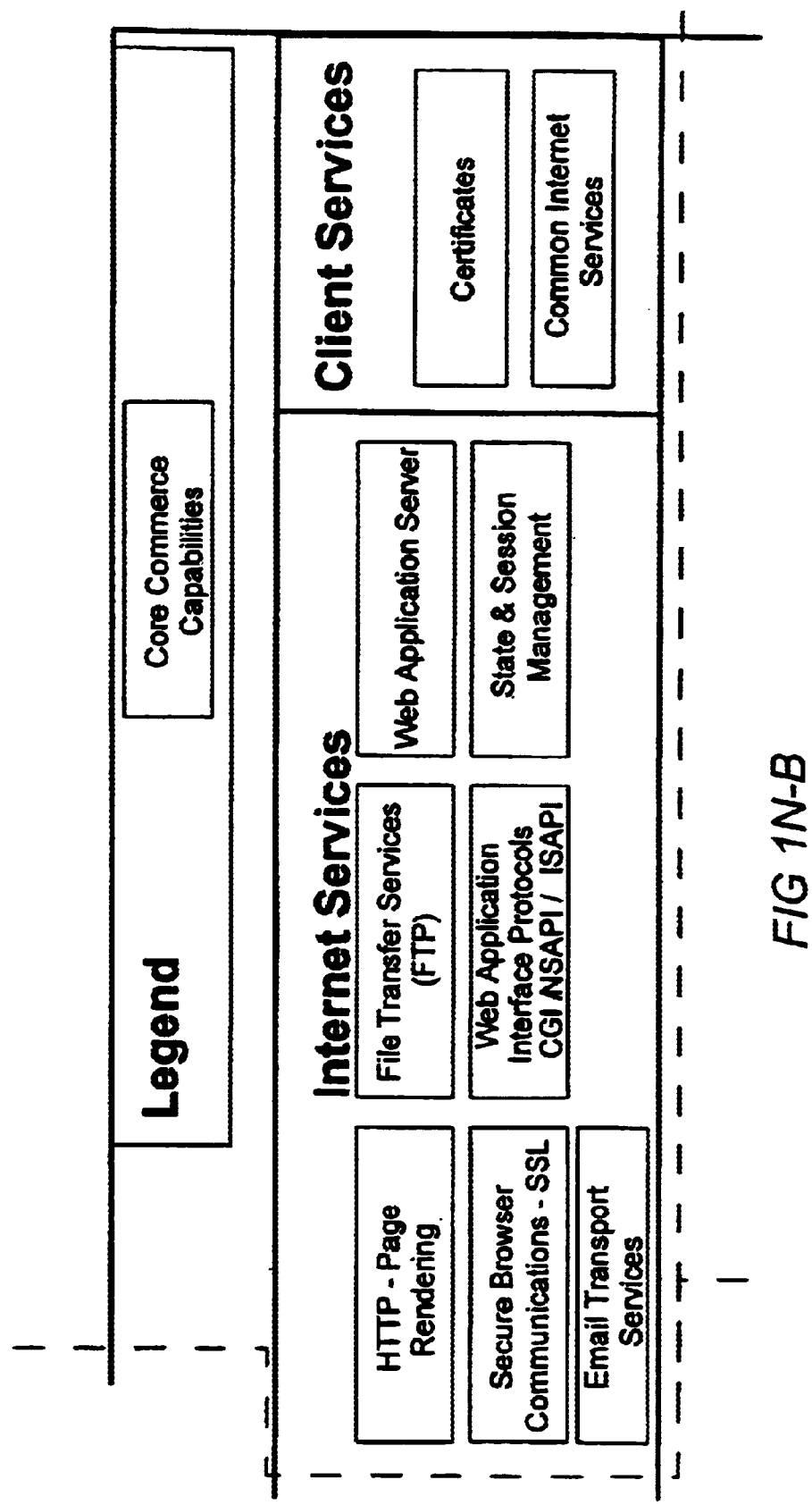
FIG 1N-B

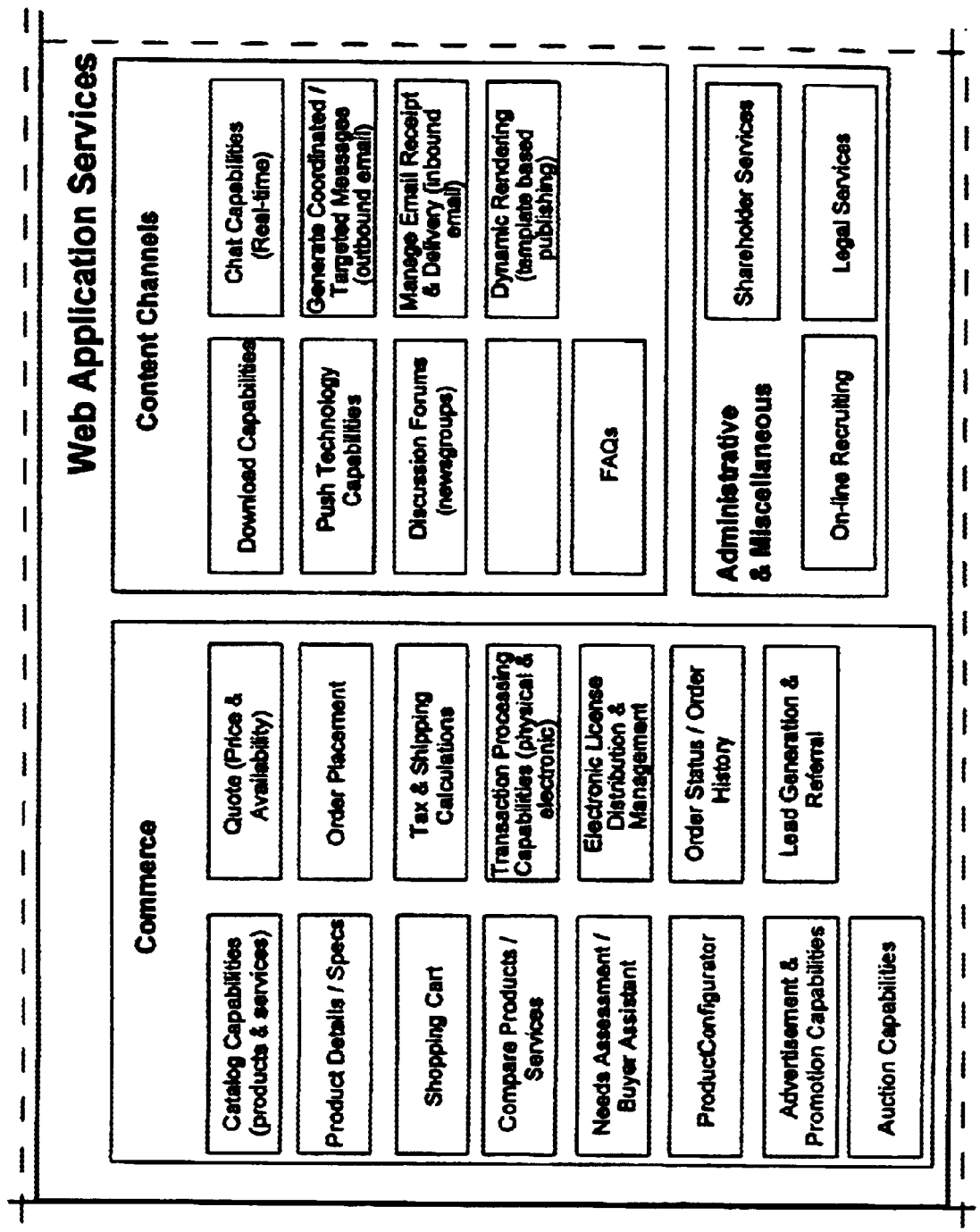
FIG 1N-C

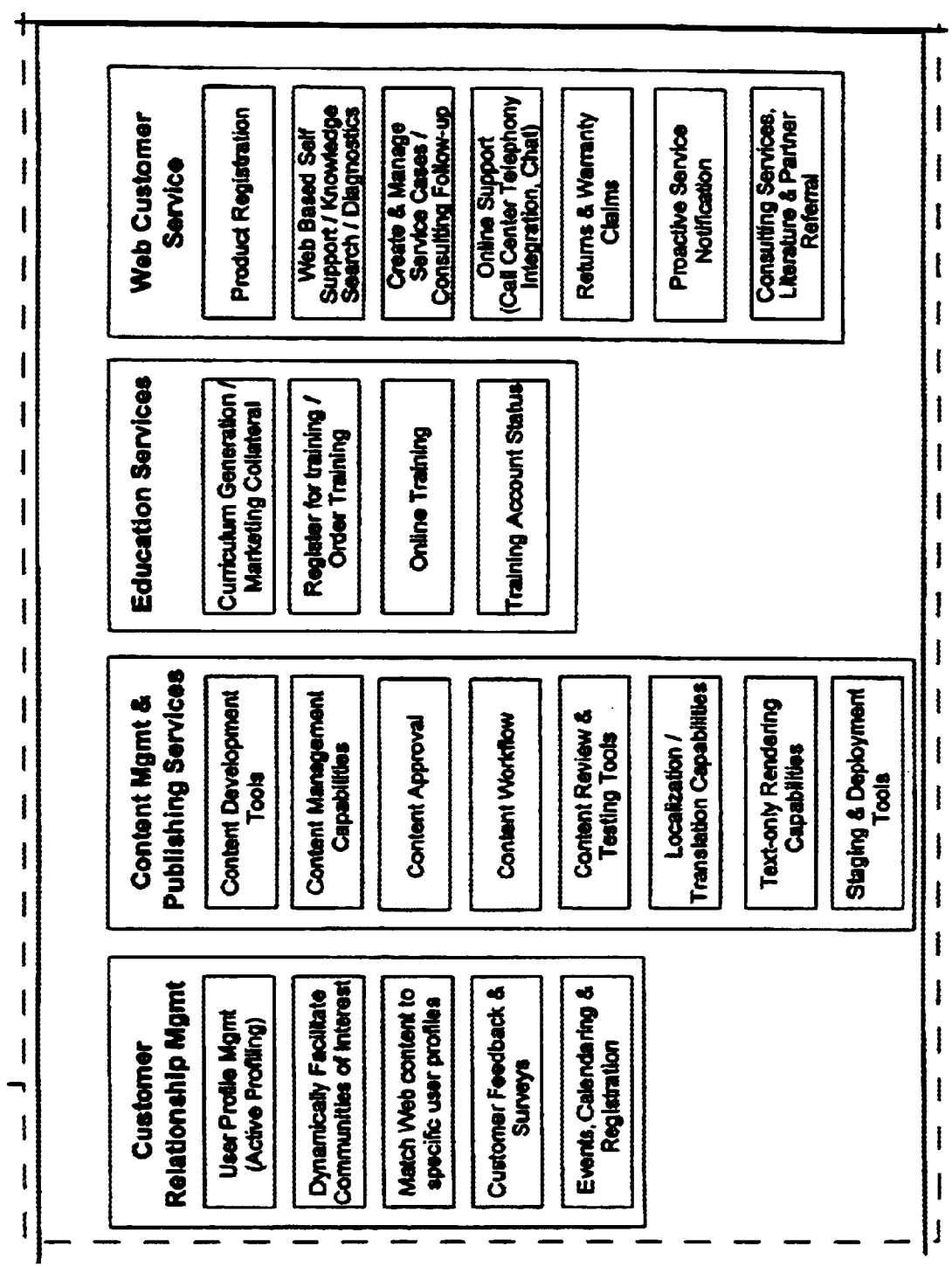
FIG 1N-D

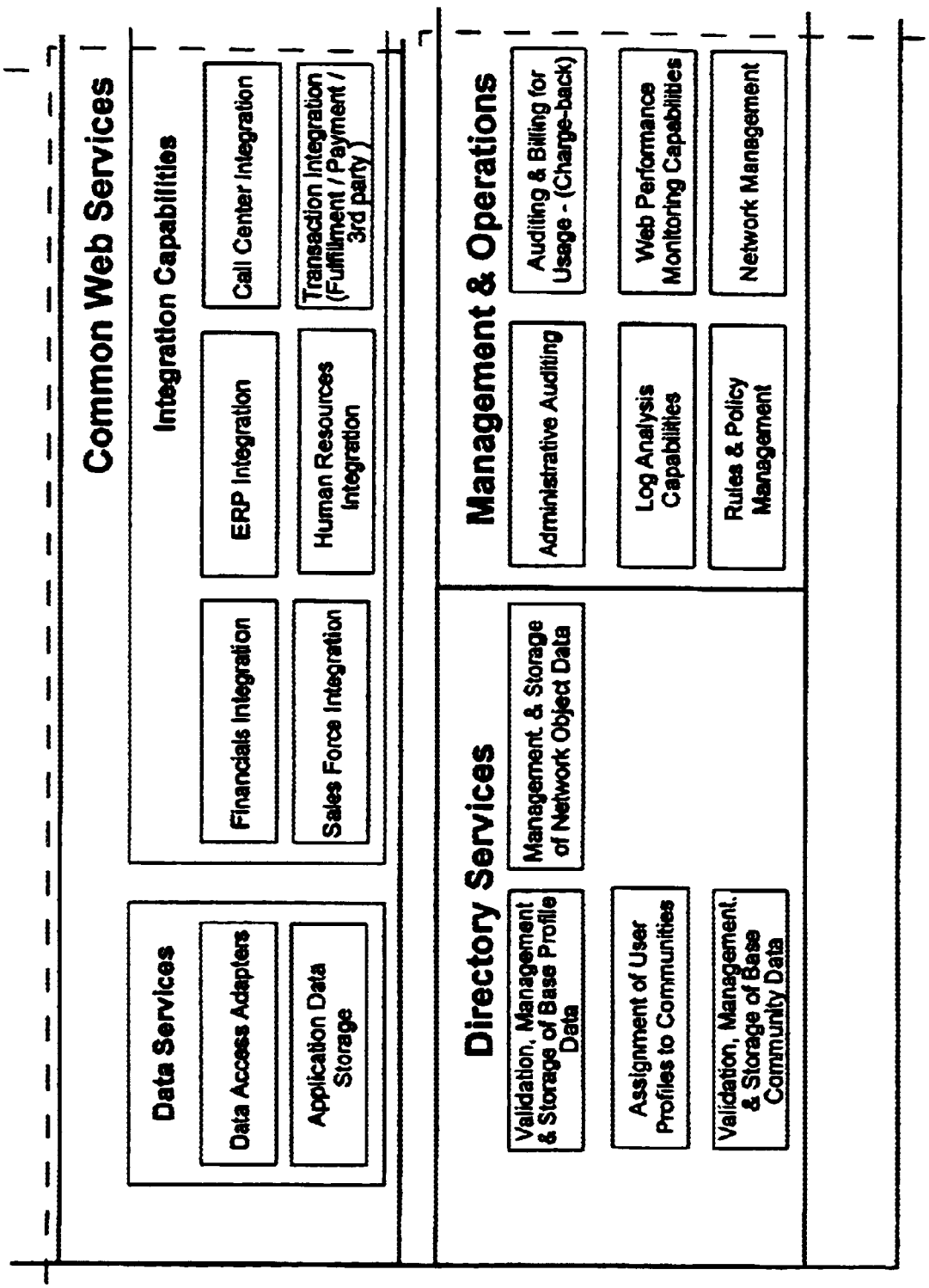
FIG 1N-E

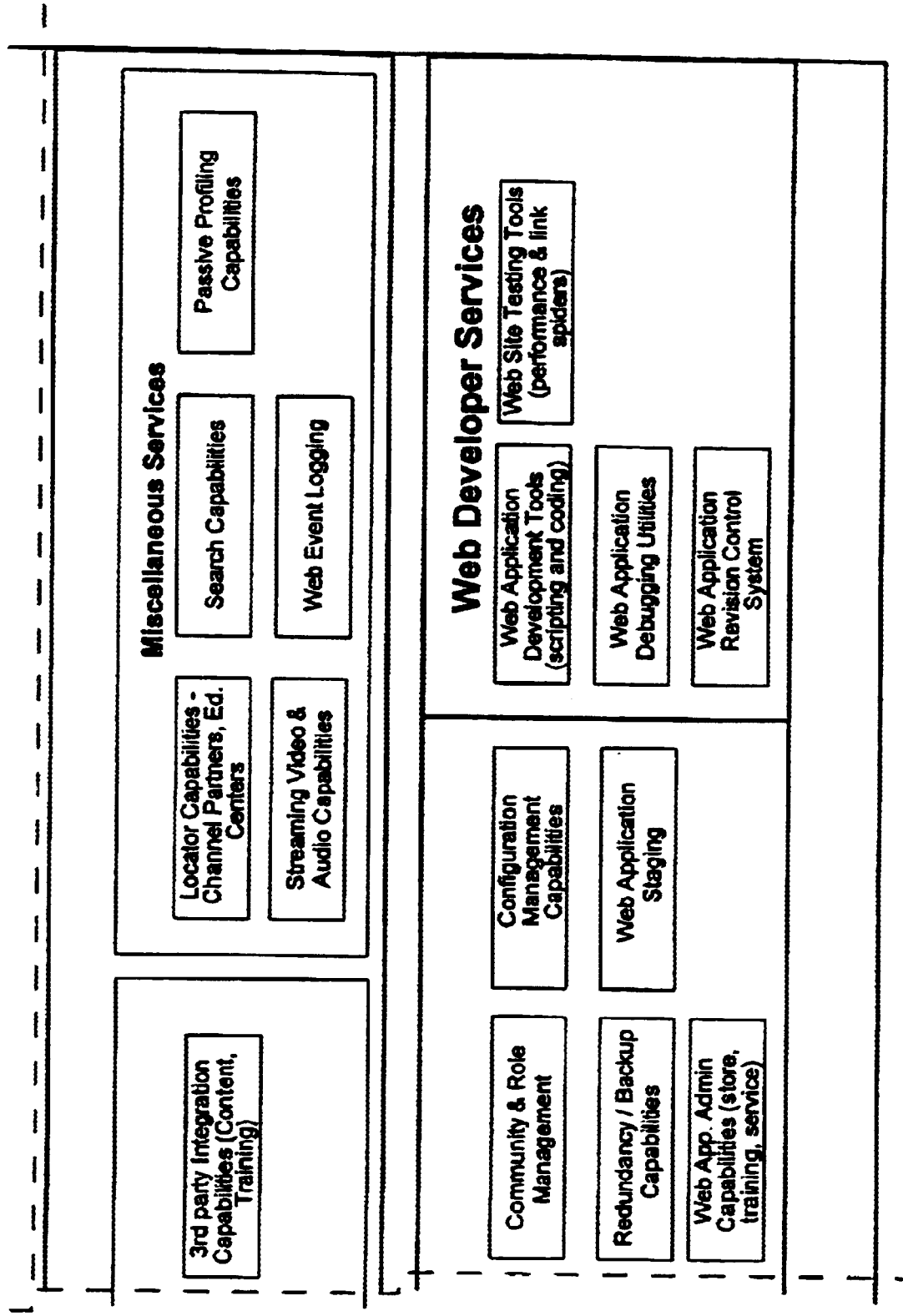
FIG 1N-F

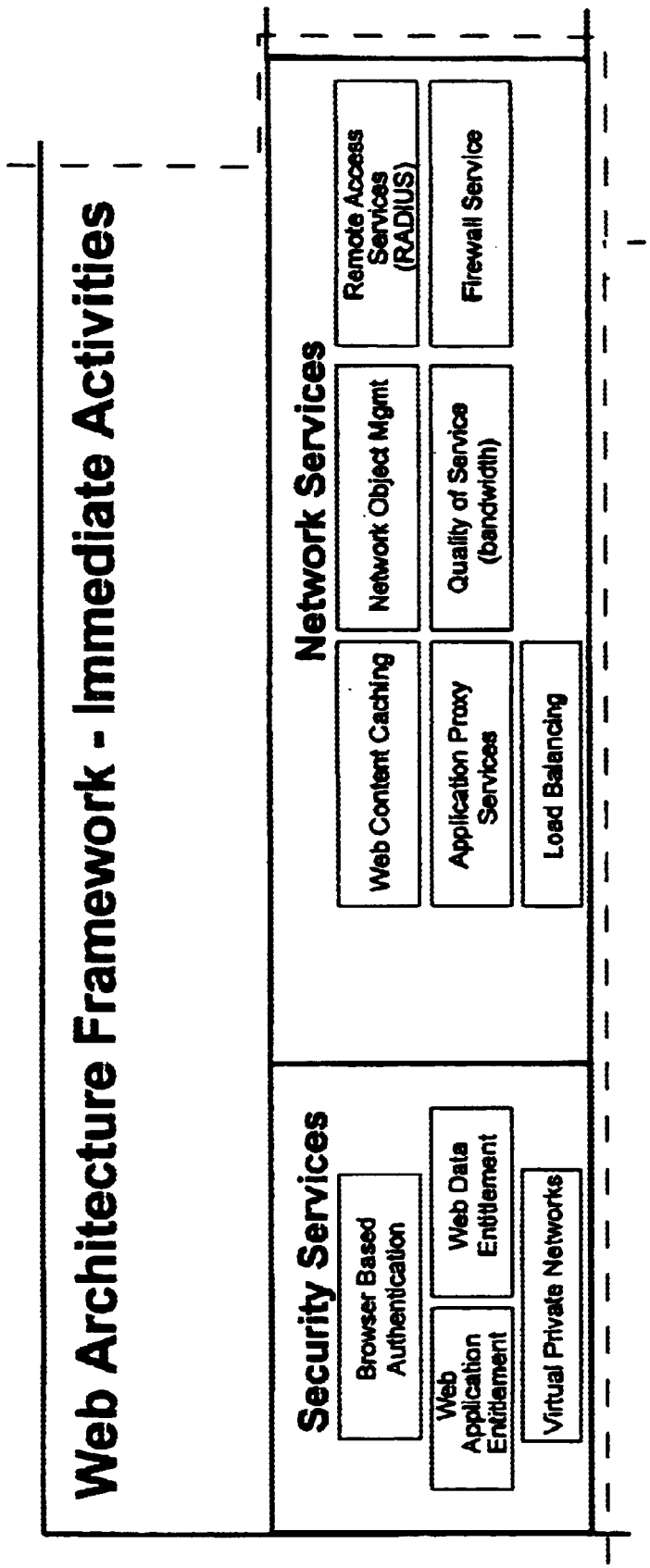
FIG 1P-A

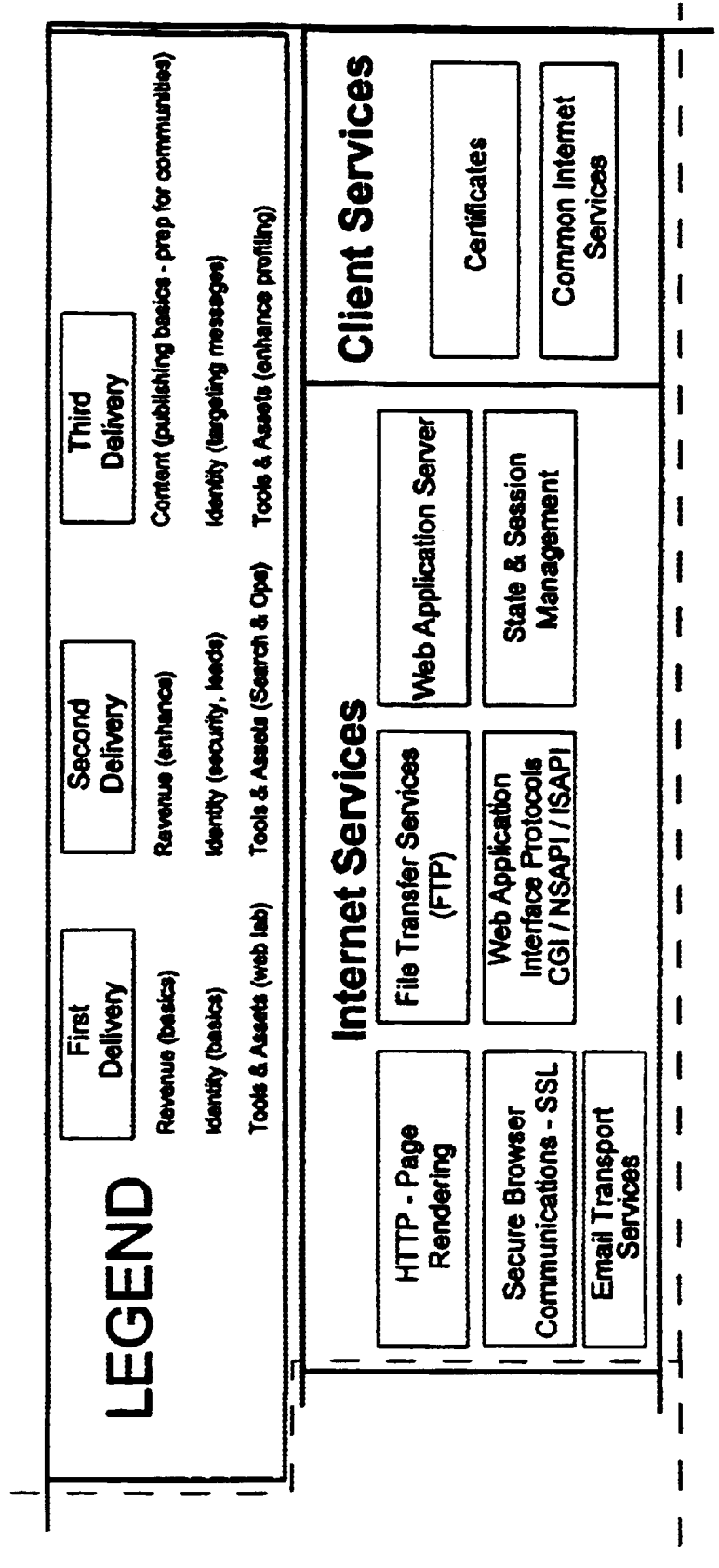
FIG 1P-B

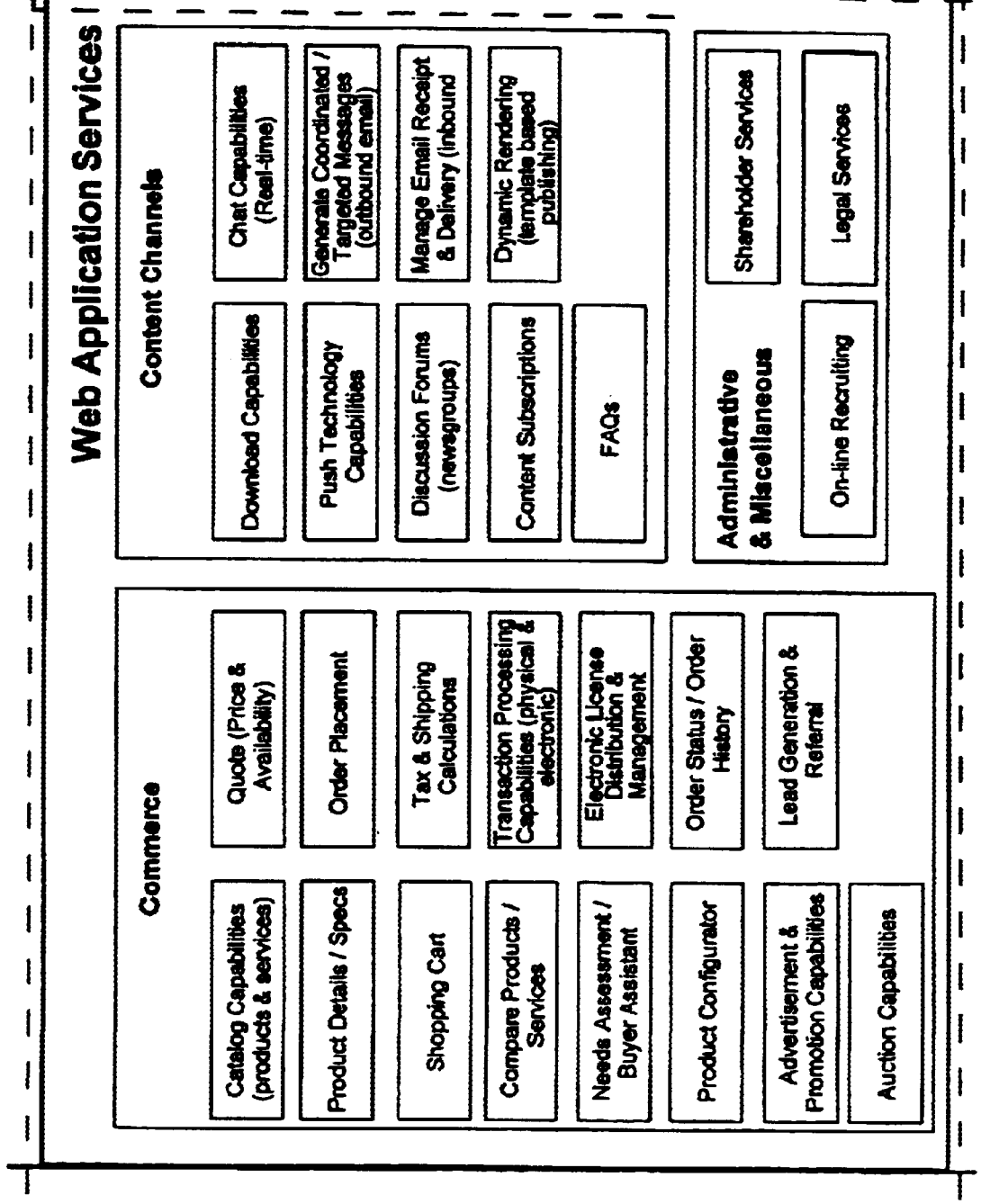
FIG 1P-C

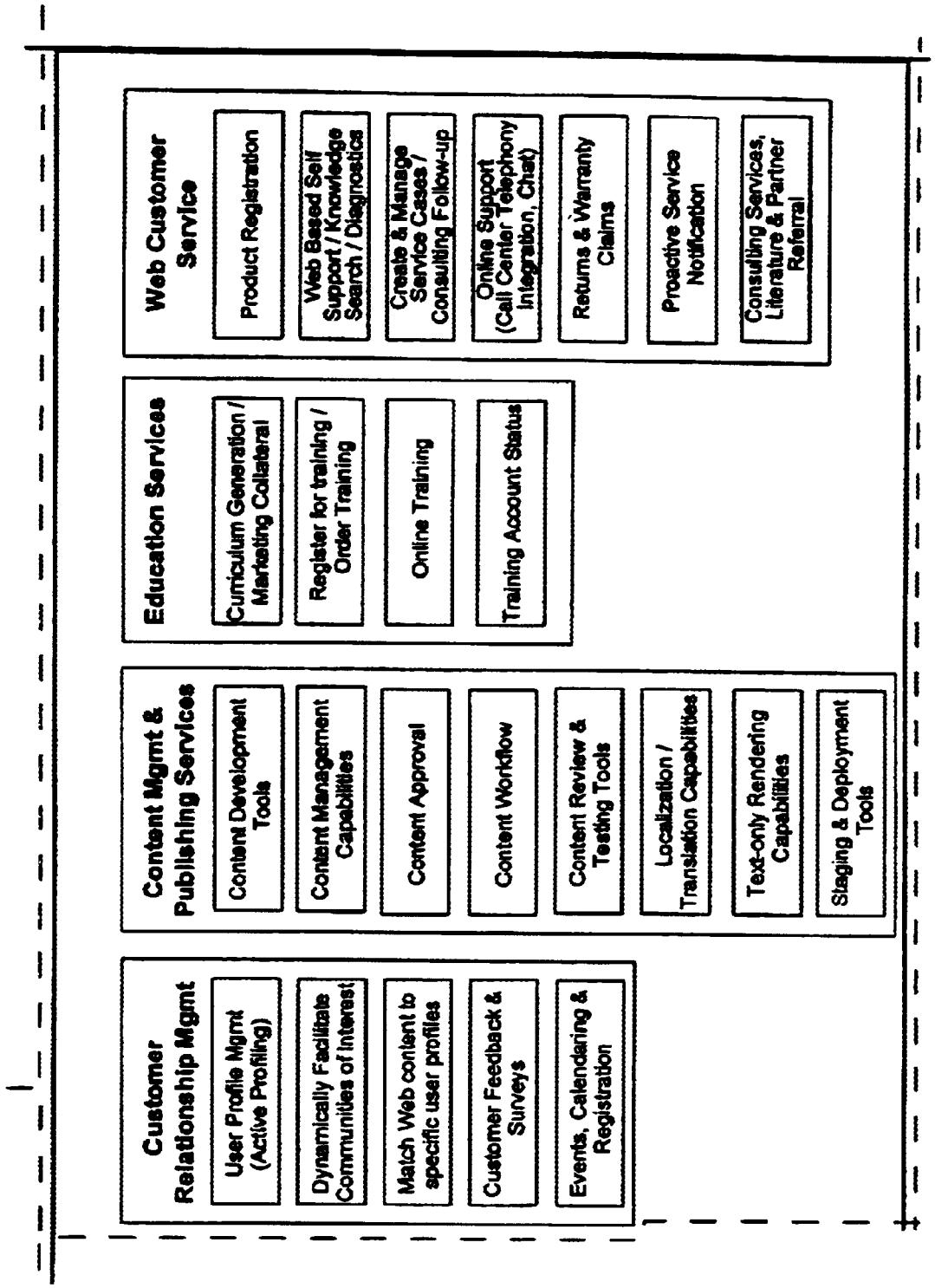
FIG 1P-D

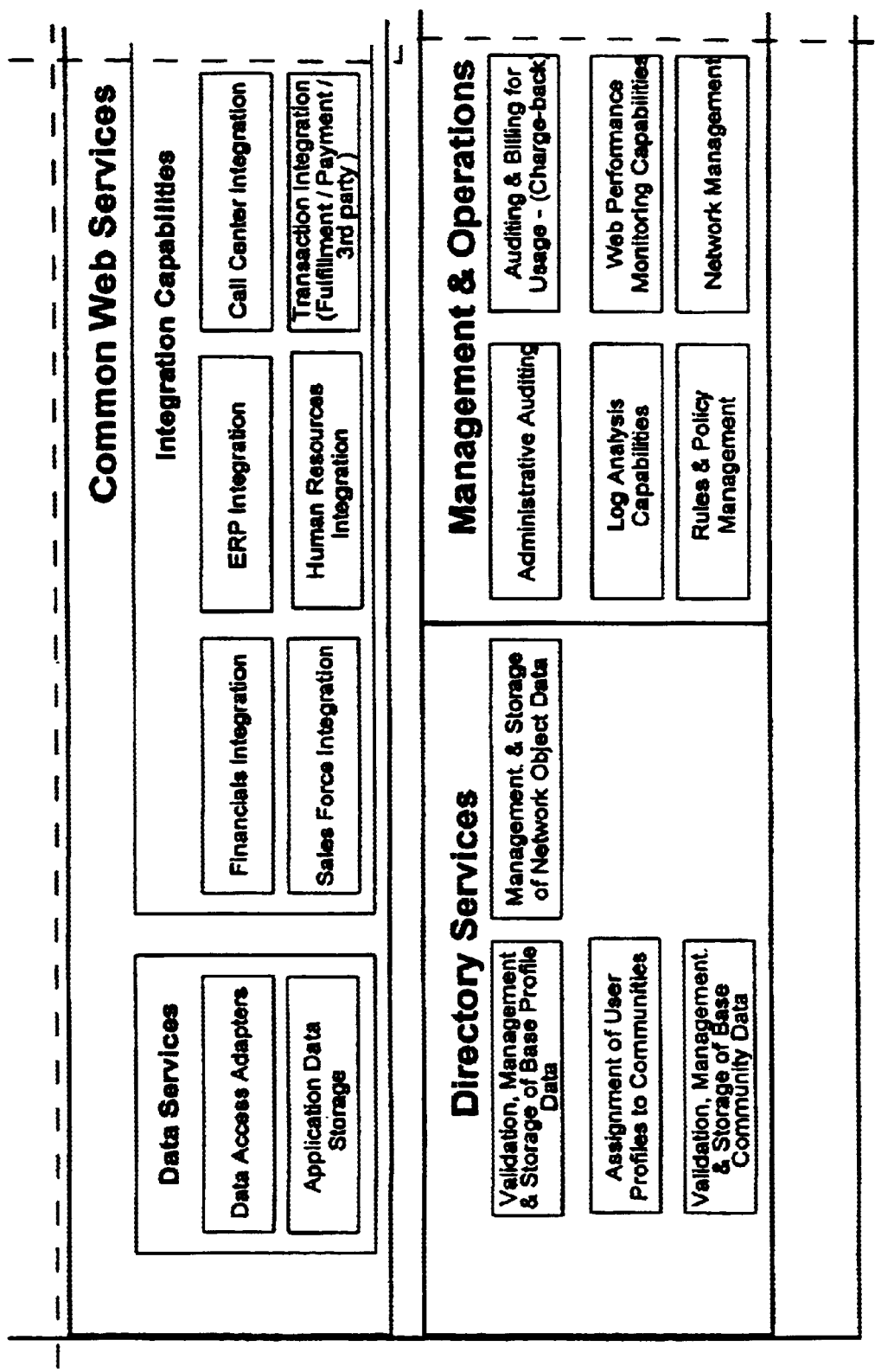
FIG 1P-E

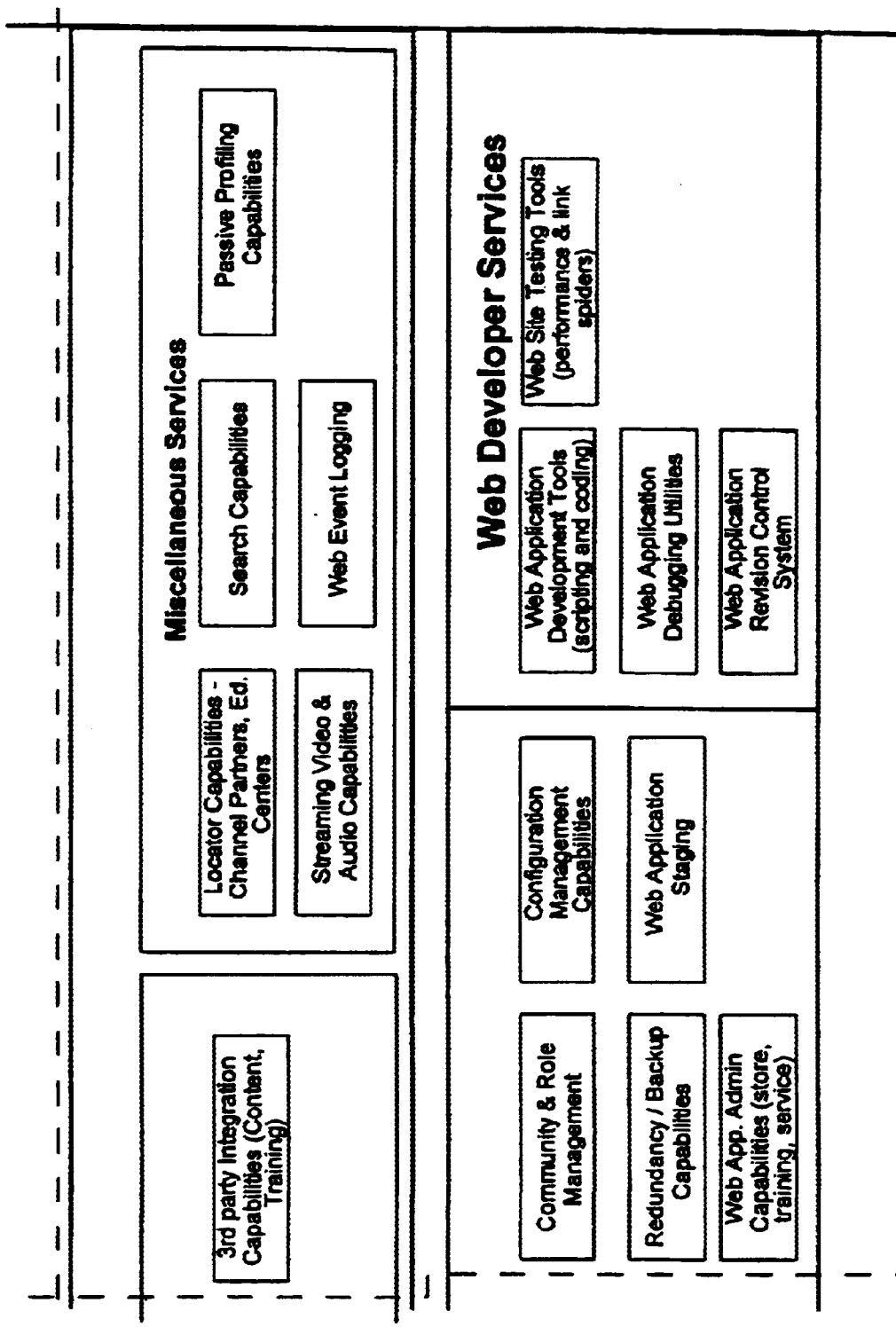
FIG 1P-F

| Fig. 1Q-C | Fig. 1Q-D |
|---|---|
| Fig. 1Q-A | Fig. 1Q-B |

Core Commerce Capabilities - Infrastructure Services

| Core Capabilities | Existing Capabilities |
|---|---|
| Browser Based Authentication | ☐ Verifies user identity using built-in browser functionality<br>☐ Maintains authentication information throughout sessions<br>☐ Utilizes centralized directory of profiles<br>☐ Provides LDAP compatibility<br>☐ Provides NDS Compatibility |
| Web Application Entitlement | ☐ Restricts access to specific web applications based upon user privileges<br>☐ Determines if a user or group of users have permission to perform an operation in a specific application<br>☐ Utilizes centralized directory of profiles for entitlement data<br>☐ Provides LDAP compatibility<br>☐ Provides NDS compatibility |
| Web Data Entitlement | ☐ Restricts access to web content and data based upon user privileges<br>☐ Determines if a user or group of users have permission to manipulate web data (create, read, update, delete)<br>☐ Utilizes centralized directory of profiles for entitlement data<br>☐ Provides LDAP compatibility<br>☐ Provides NDS compatibility |

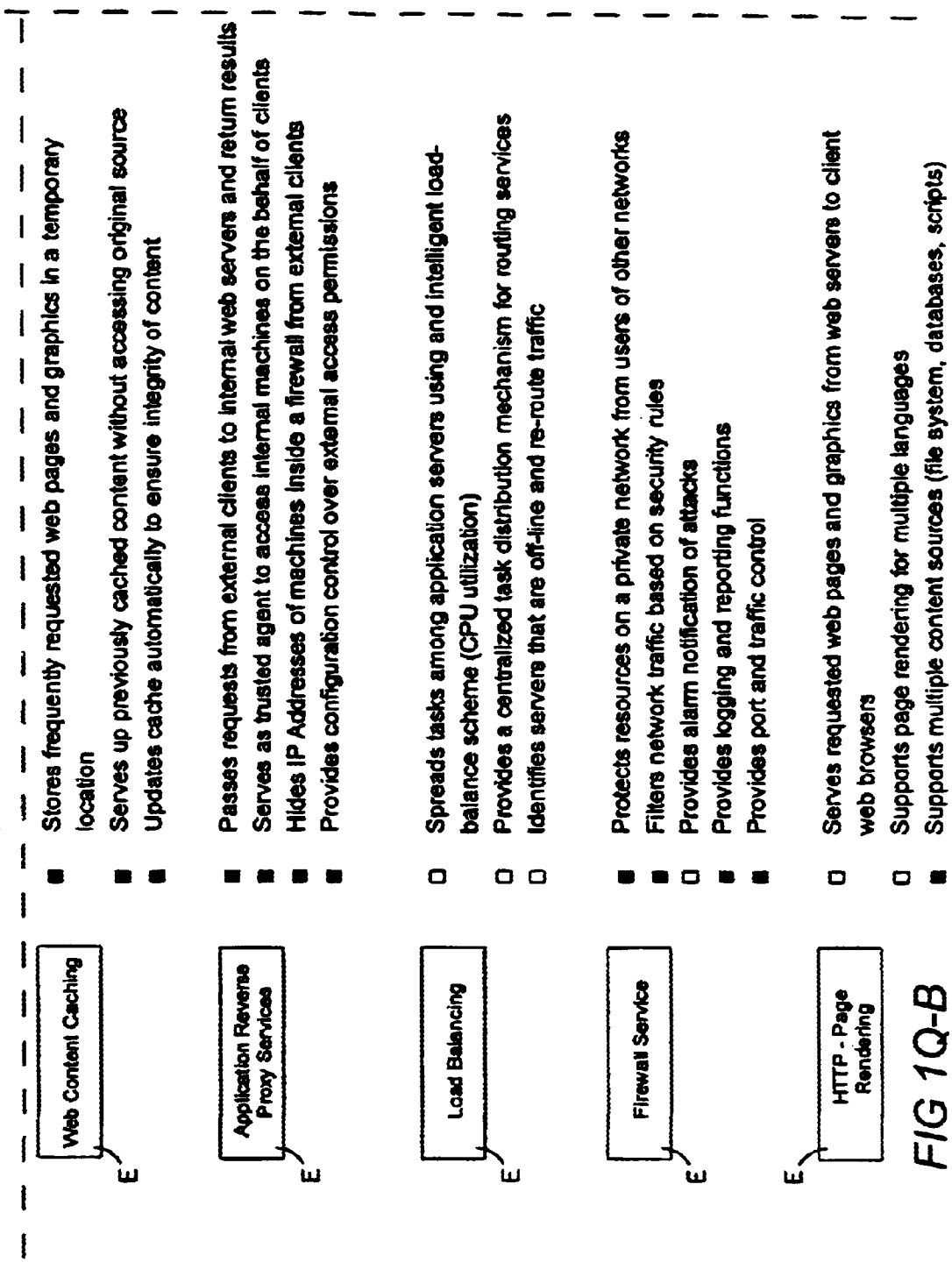
FIG 1Q-B

FIG 1Q-C

Legend: ■ Available Today

| Core Capabilities | | Existing Capabilities |
|---|---|---|
| Secure Browser Communications - SSL | ■ | Provides encrypted communication with common web browsers |
| | ■ | Supports the Secure Sockets Layer protocol 2.0 |
| | ■ | Supports the Secure Sockets Layer protocol 3.0 |
| File Transfer Services (FTP) | ■ | Transfers files between computers on the Internet using the standard File Transfer Protocol (FTP) |
| | ■ | Stores files on a file system or database |
| | ■ | Provides mechanism to manage access control for files on a FTP server |
| Web Application Interface Protocols CGI/NSAPI/ISAPI | ■ | Supports Common Gateway Interface (CGI) protocol |
| | ■ | Supports Netscape' API (NSAPI) protocol |
| | ❑ | Supports Microsoft's API (ISAPI) protocol |
| | ❑ | Provides alternative to the interface mechanism that may be used |
| Web Application Server Plug-in | ❑ | Executes web application logic |
| | ❑ | Utilizes user session information to support interactive applications |
| | ❑ | Provides scalability features |
| | ❑ | Provides fail-over features |
| | ❑ | Provides application programming logic |

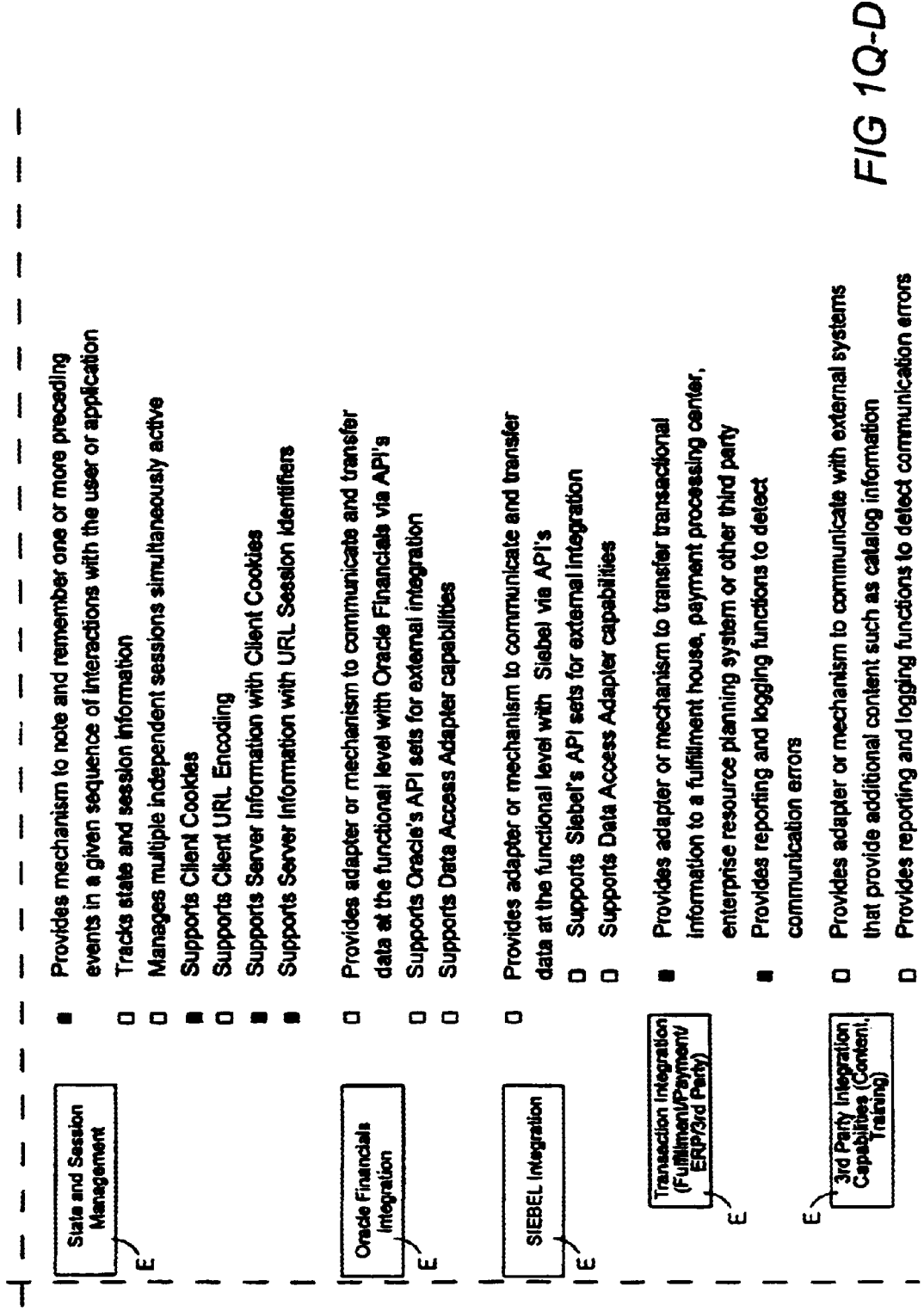
FIG 1Q-D

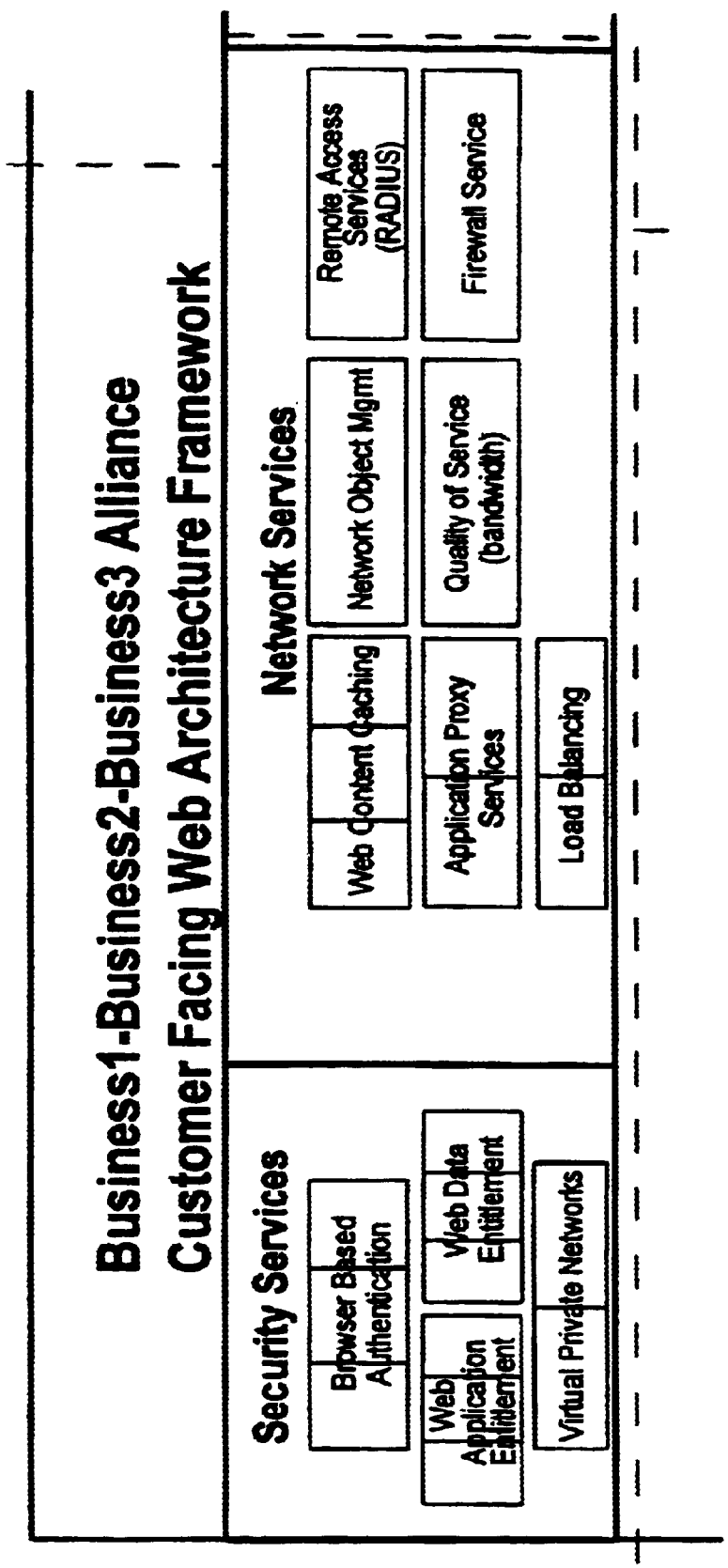

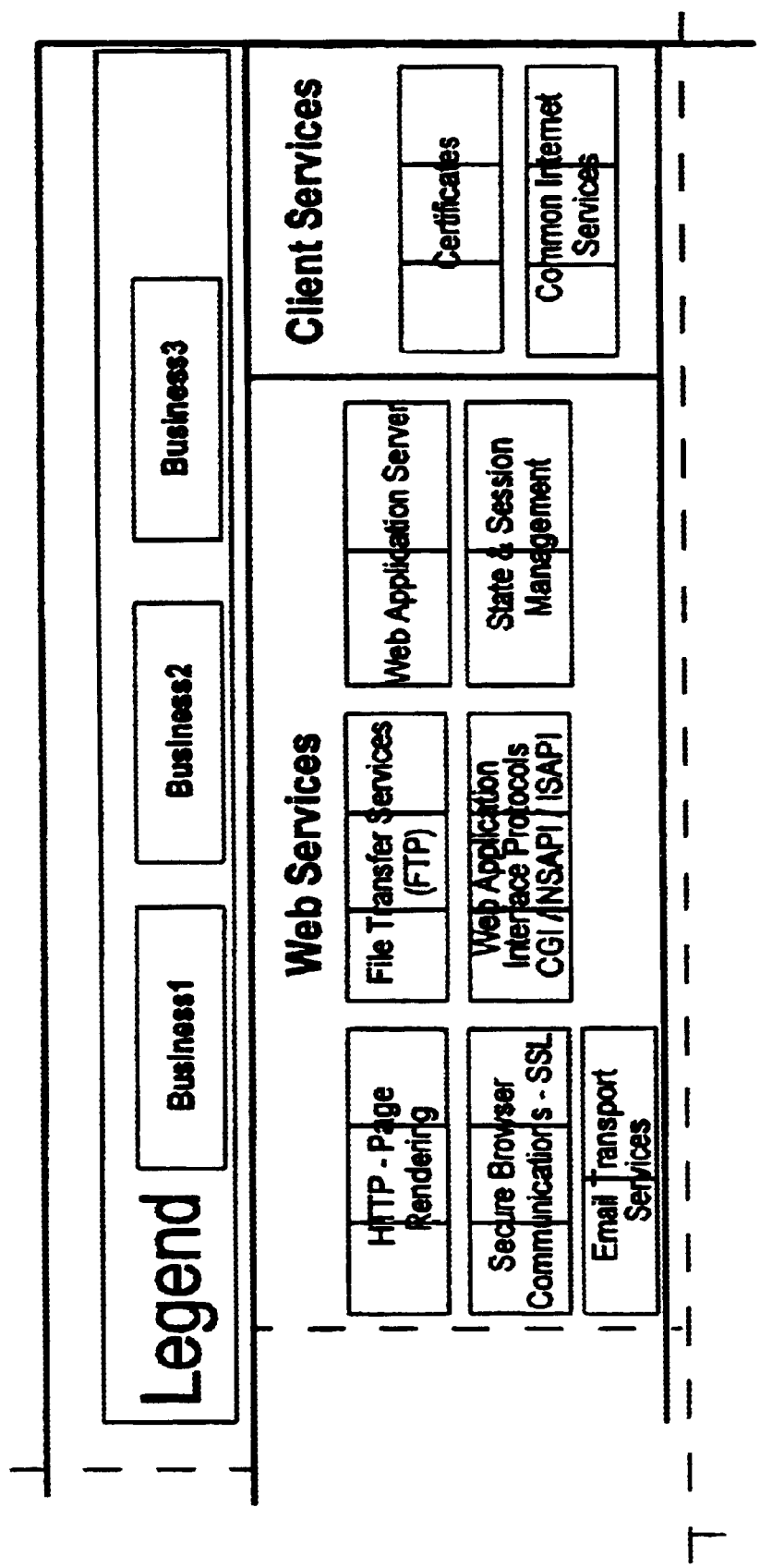
FIG 1R-B

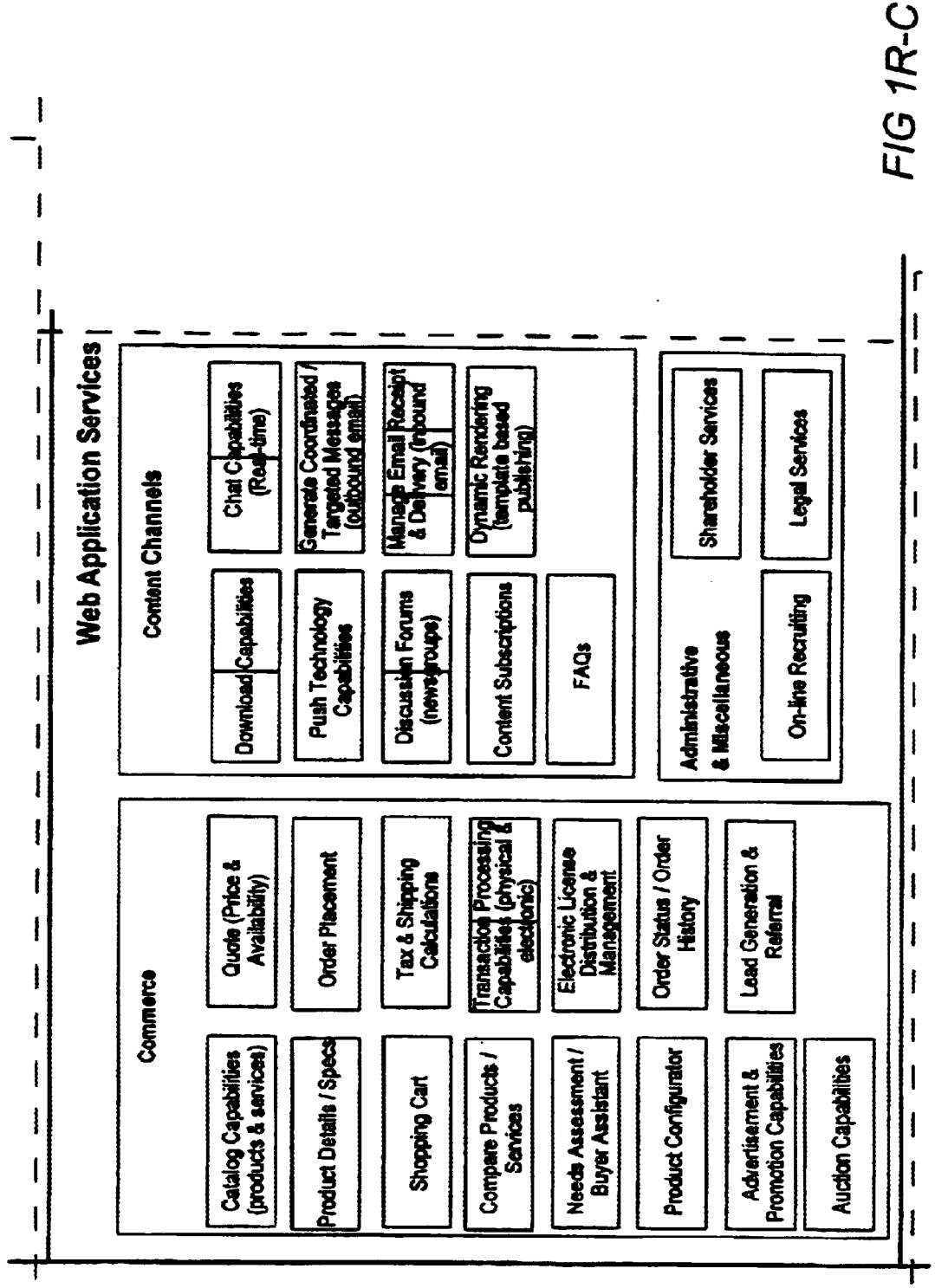
FIG 1R-C

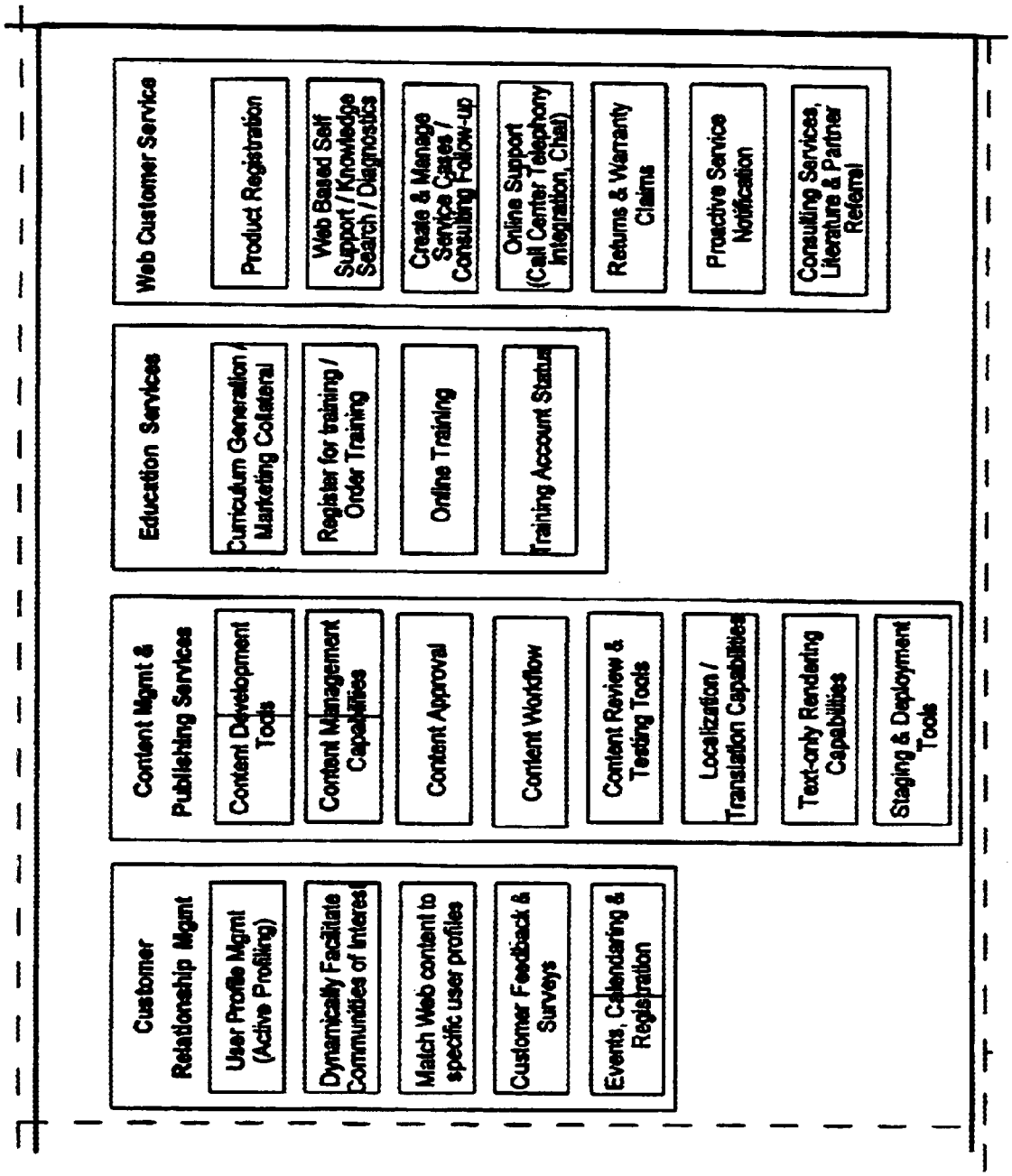
FIG 1R-D

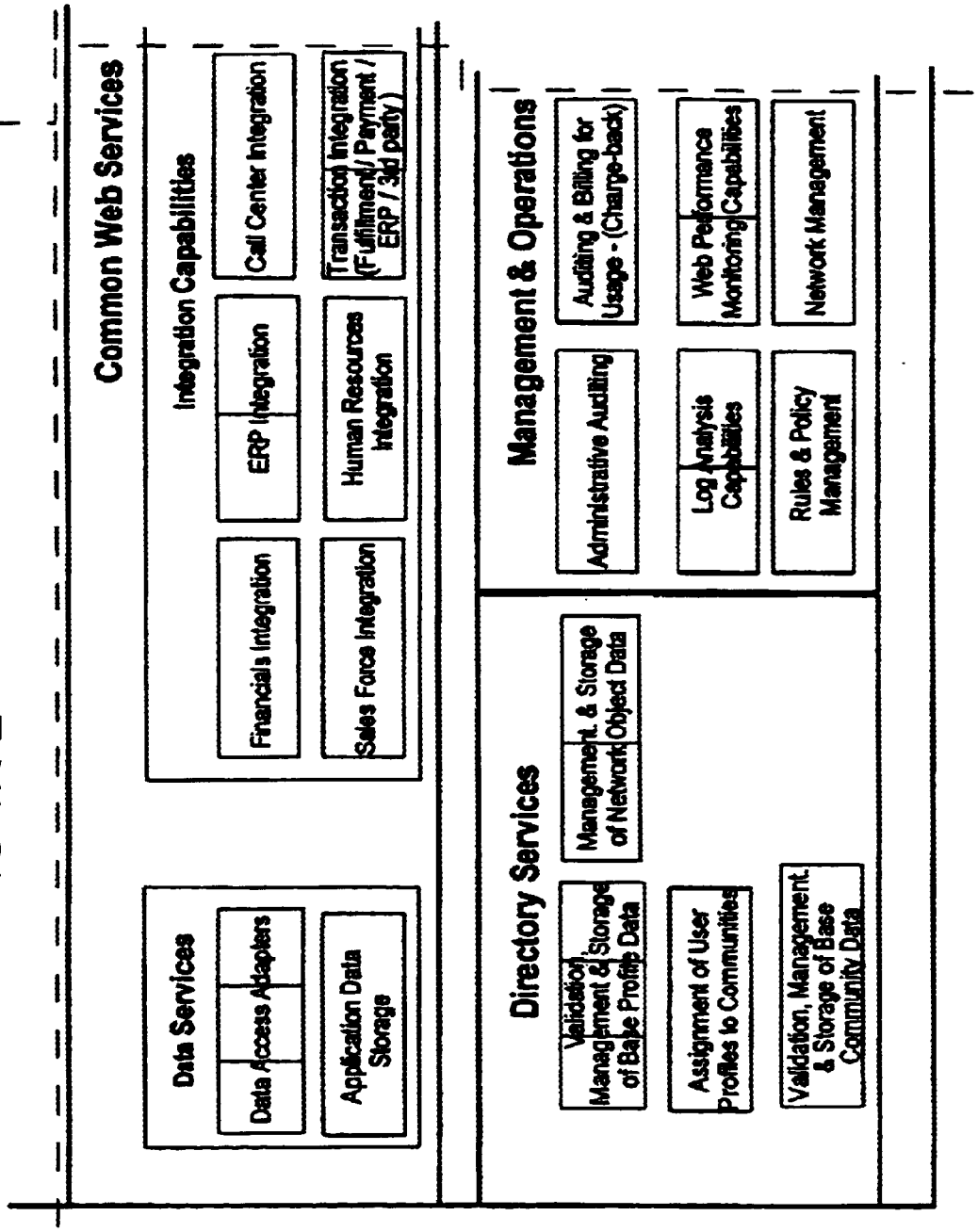
FIG 1R-E

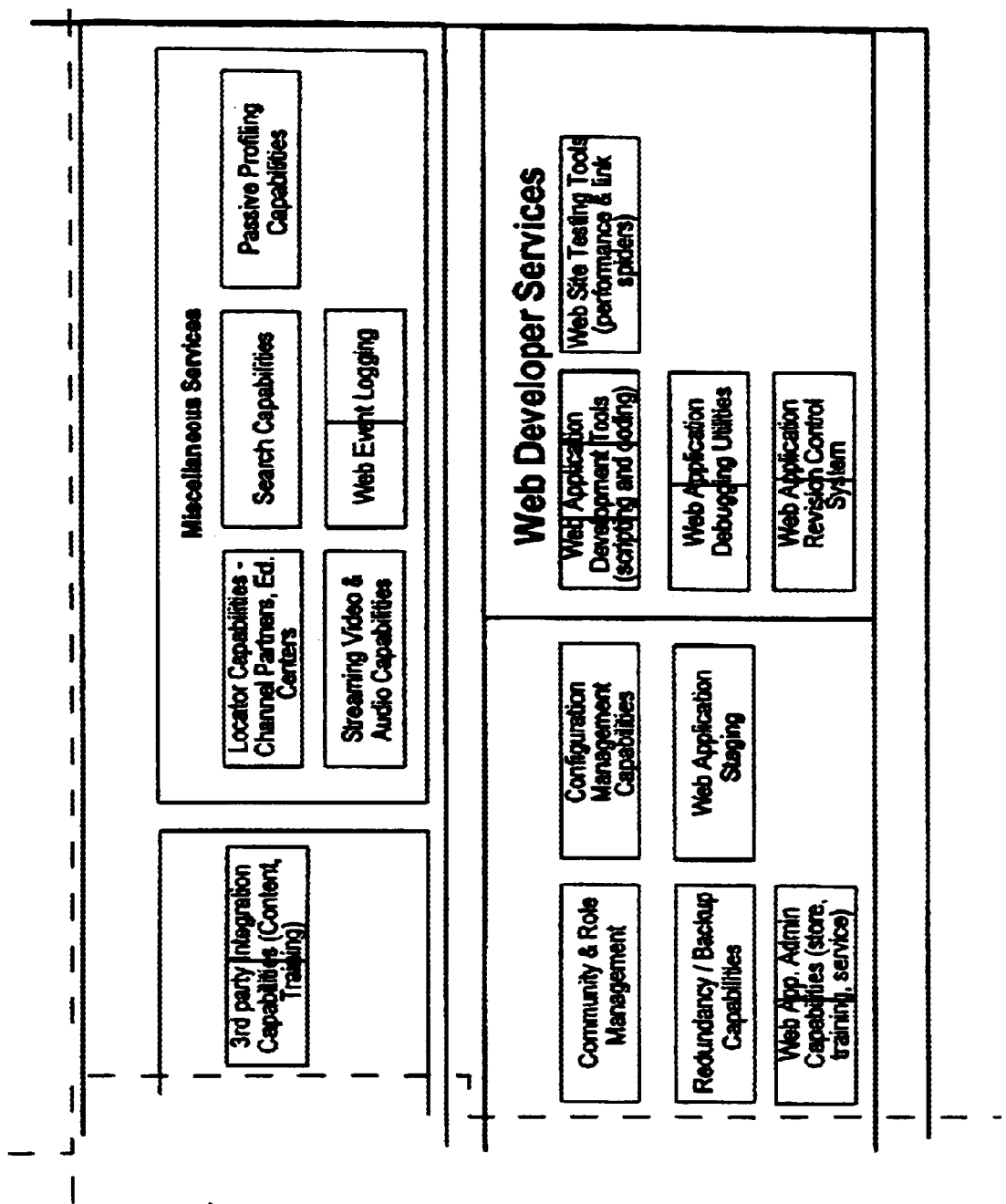
FIG 1R-F

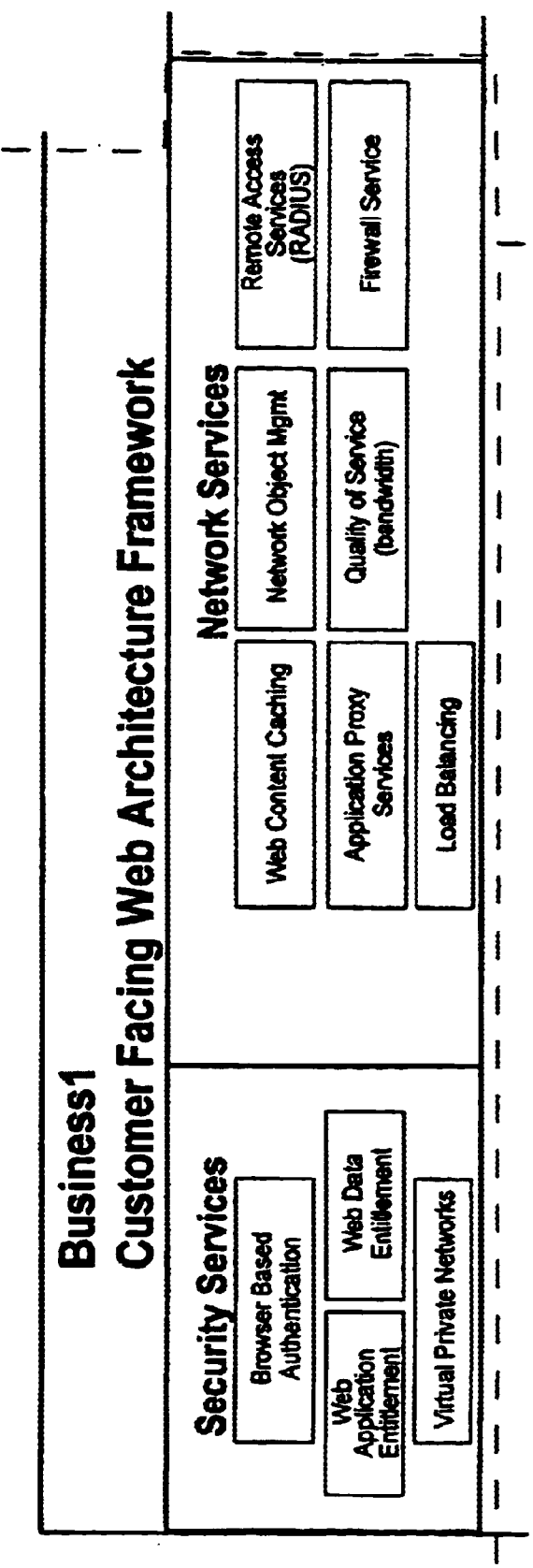
FIG 1S-A

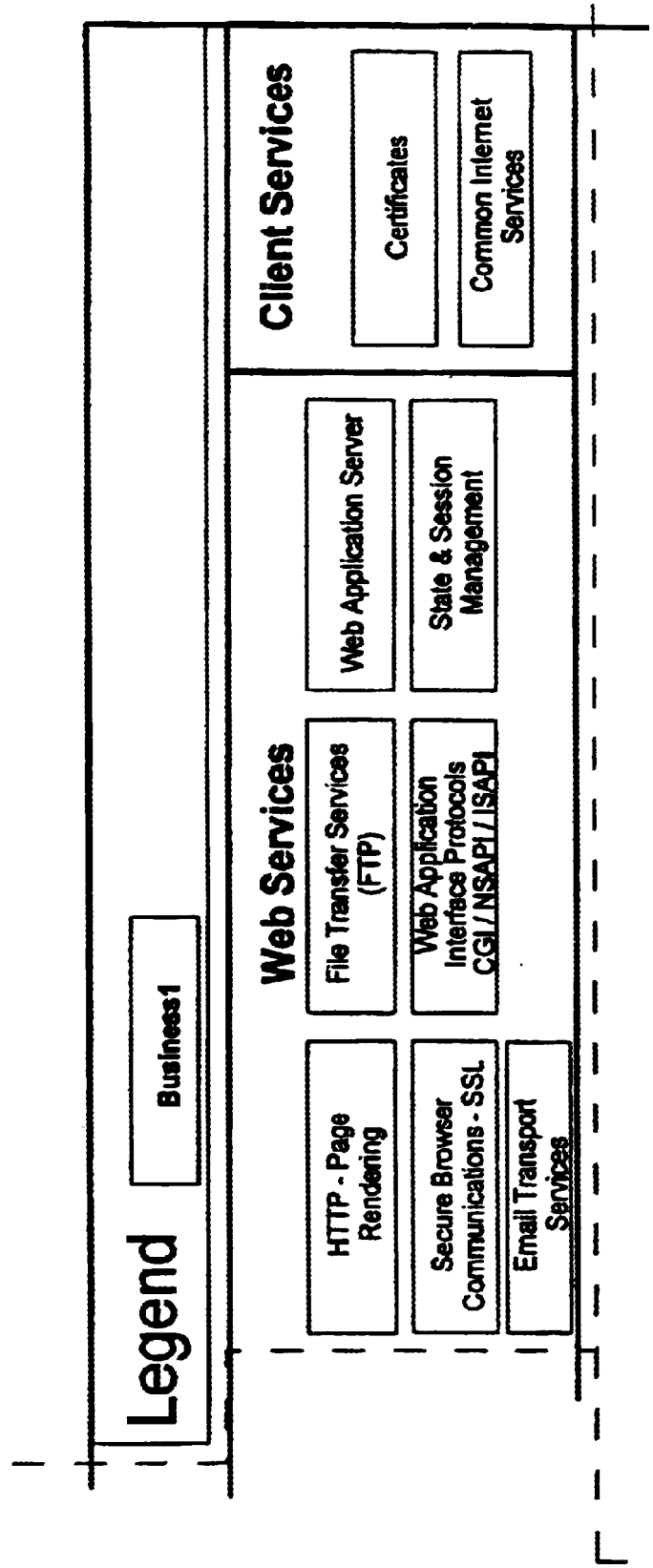
FIG 1S-B

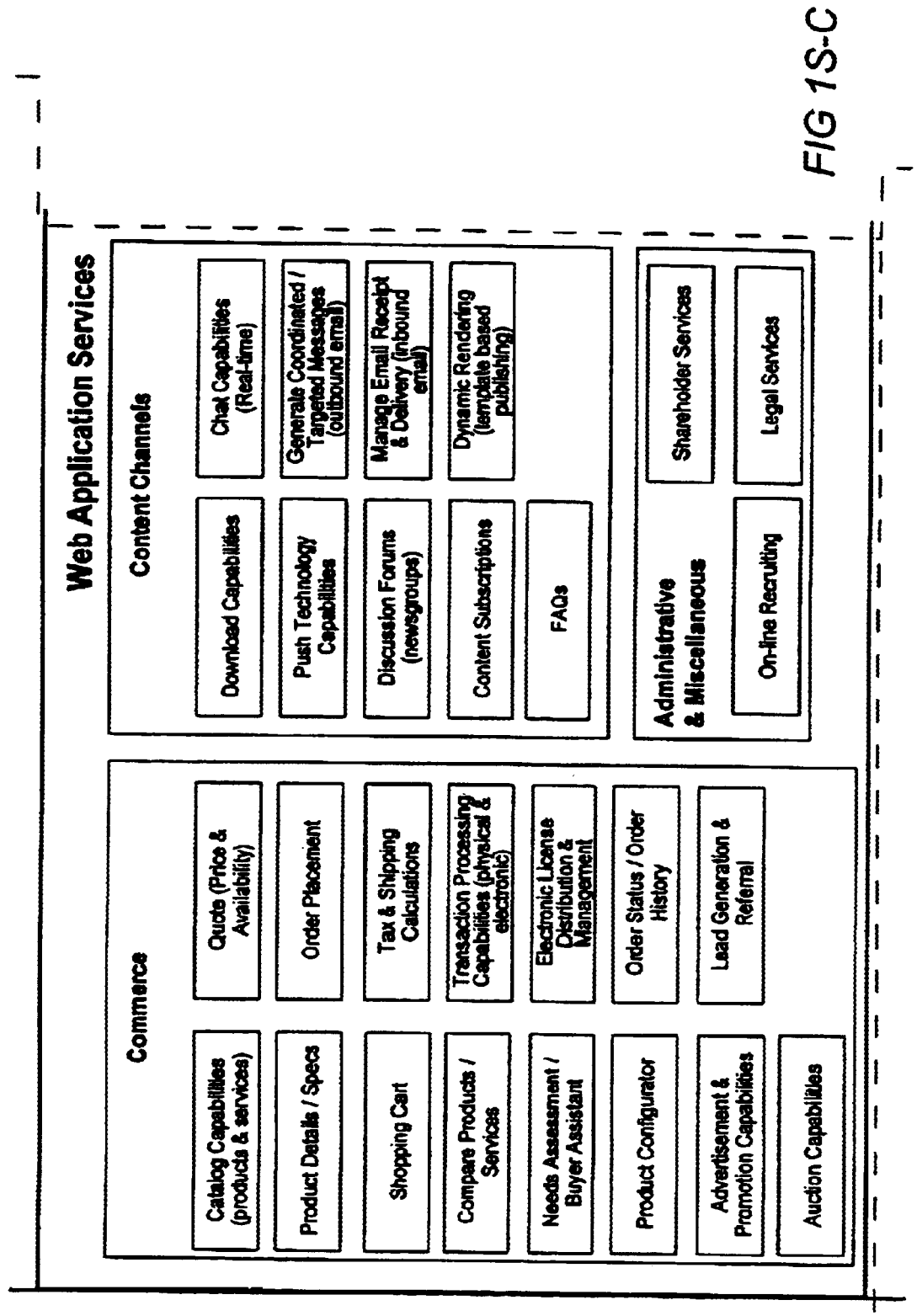
FIG 1S-C

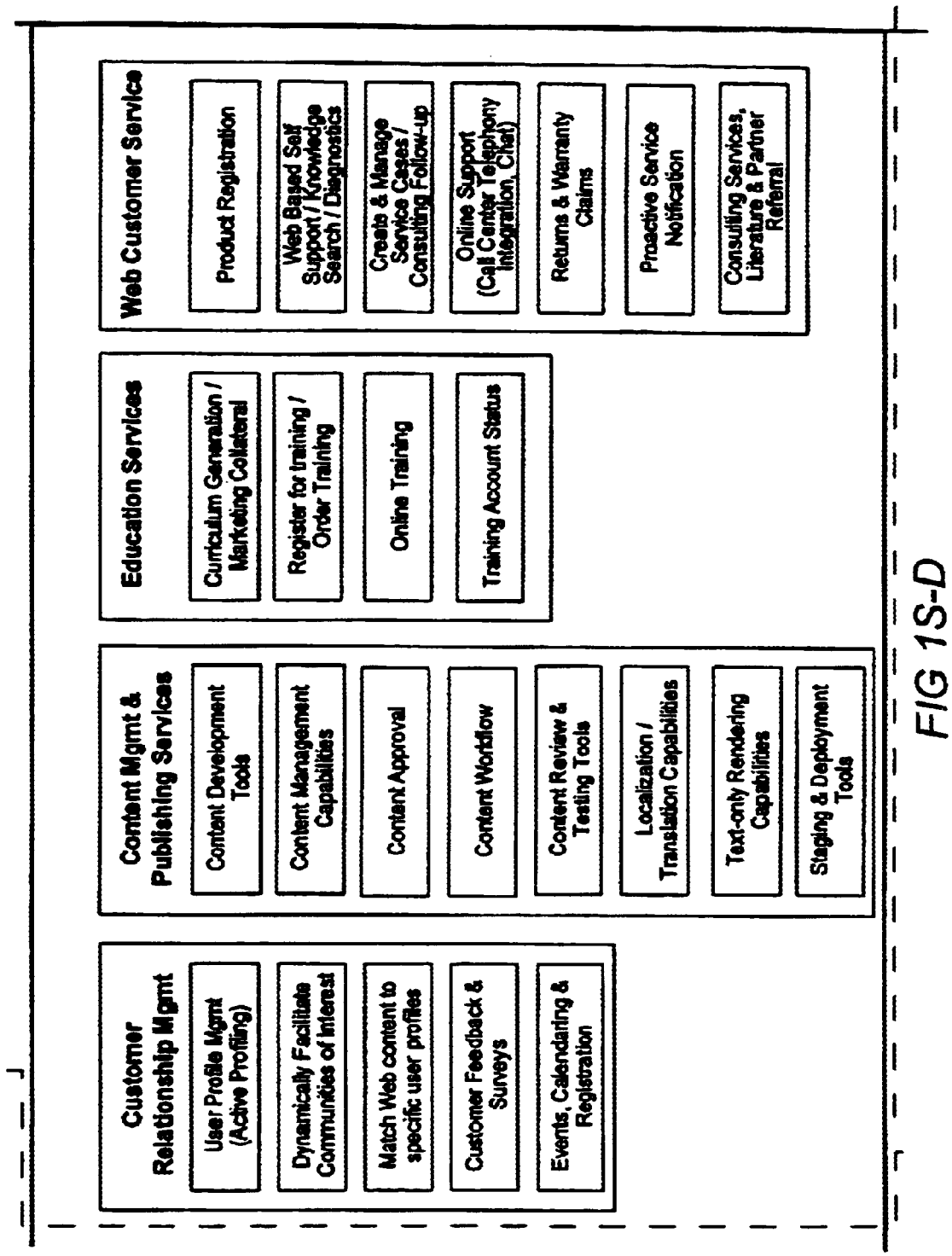
FIG 1S-D

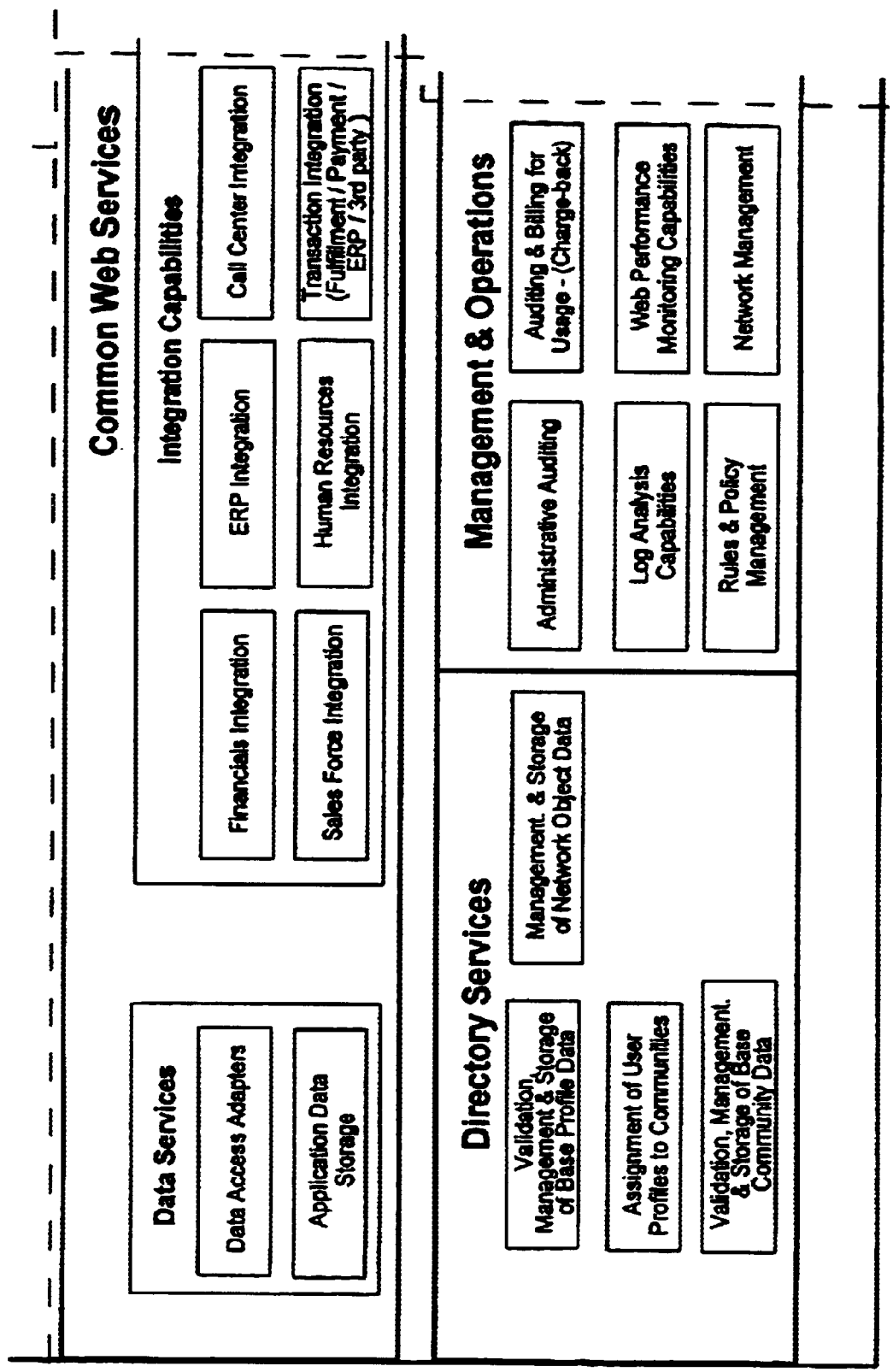
FIG 1S-E

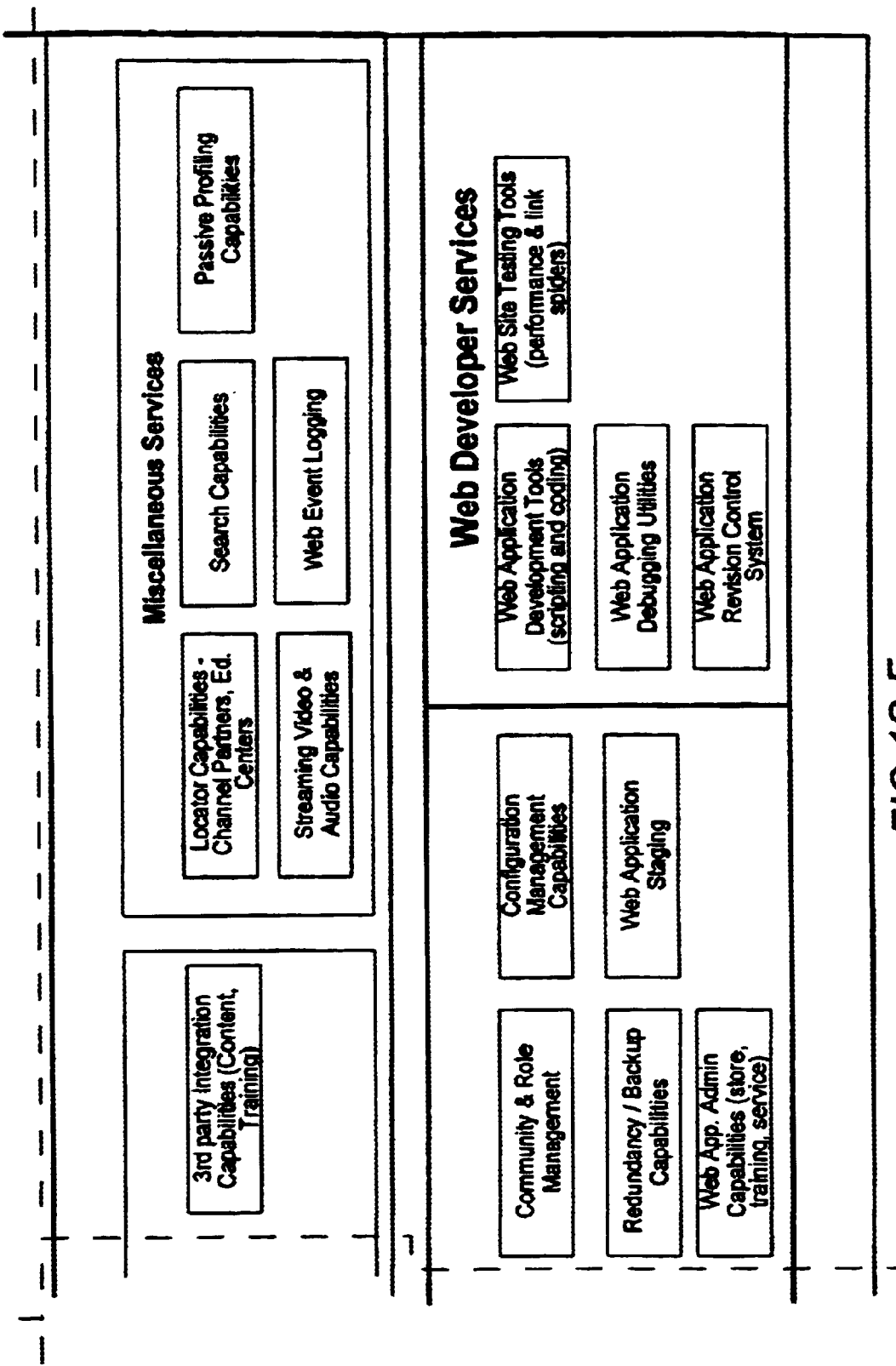
FIG 1S-F

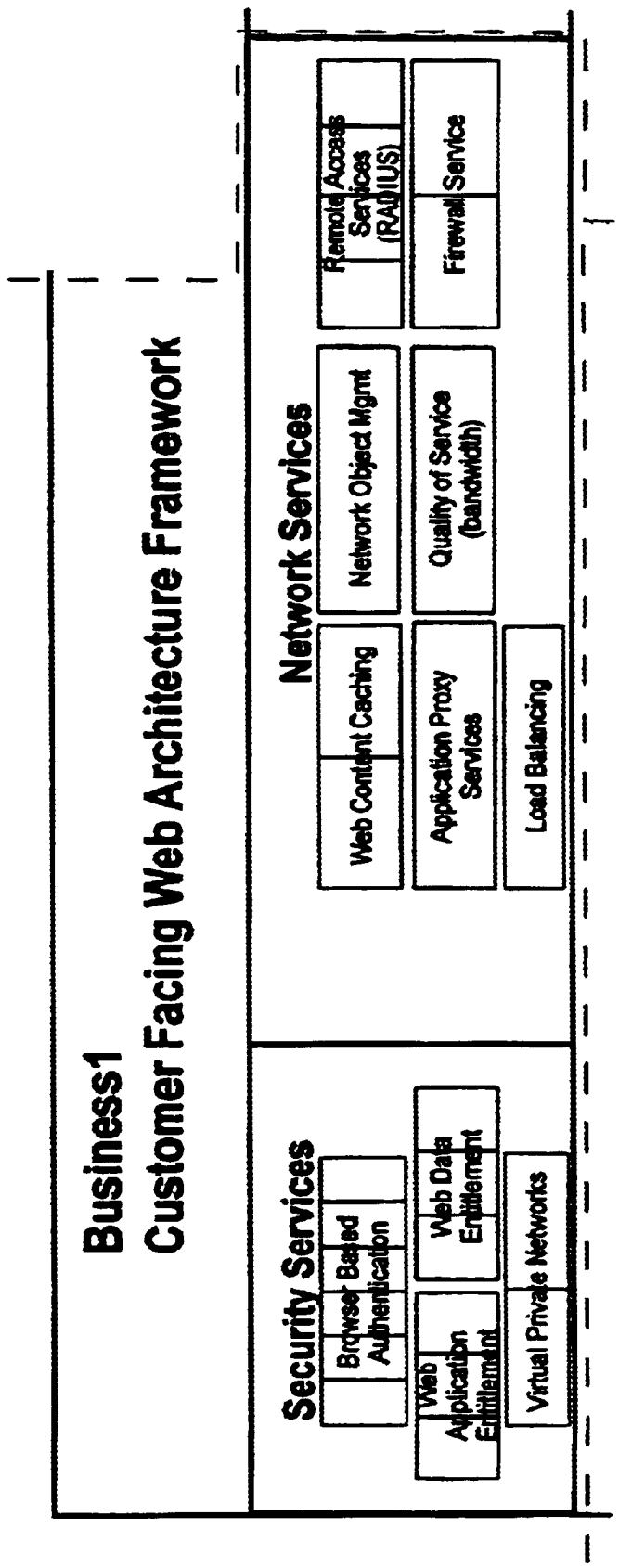
FIG 1T-A

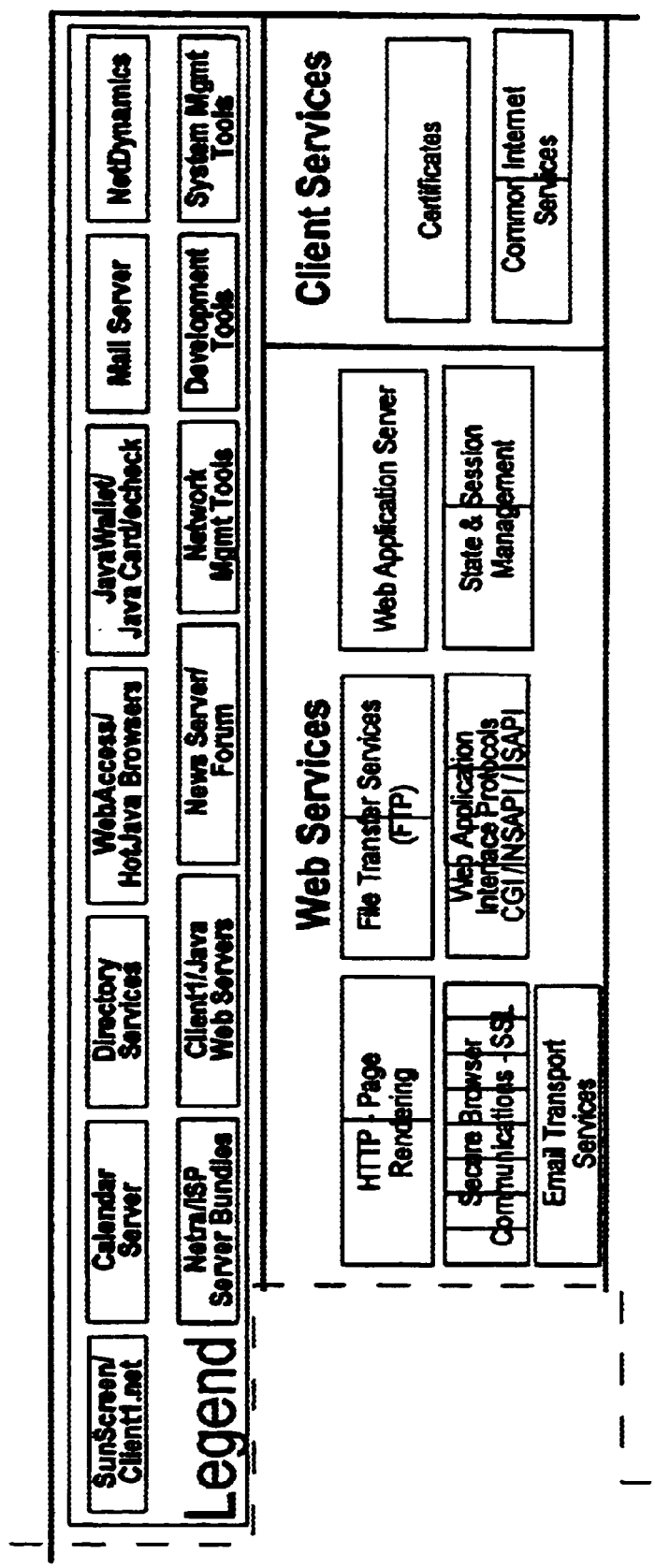
FIG 1T-B

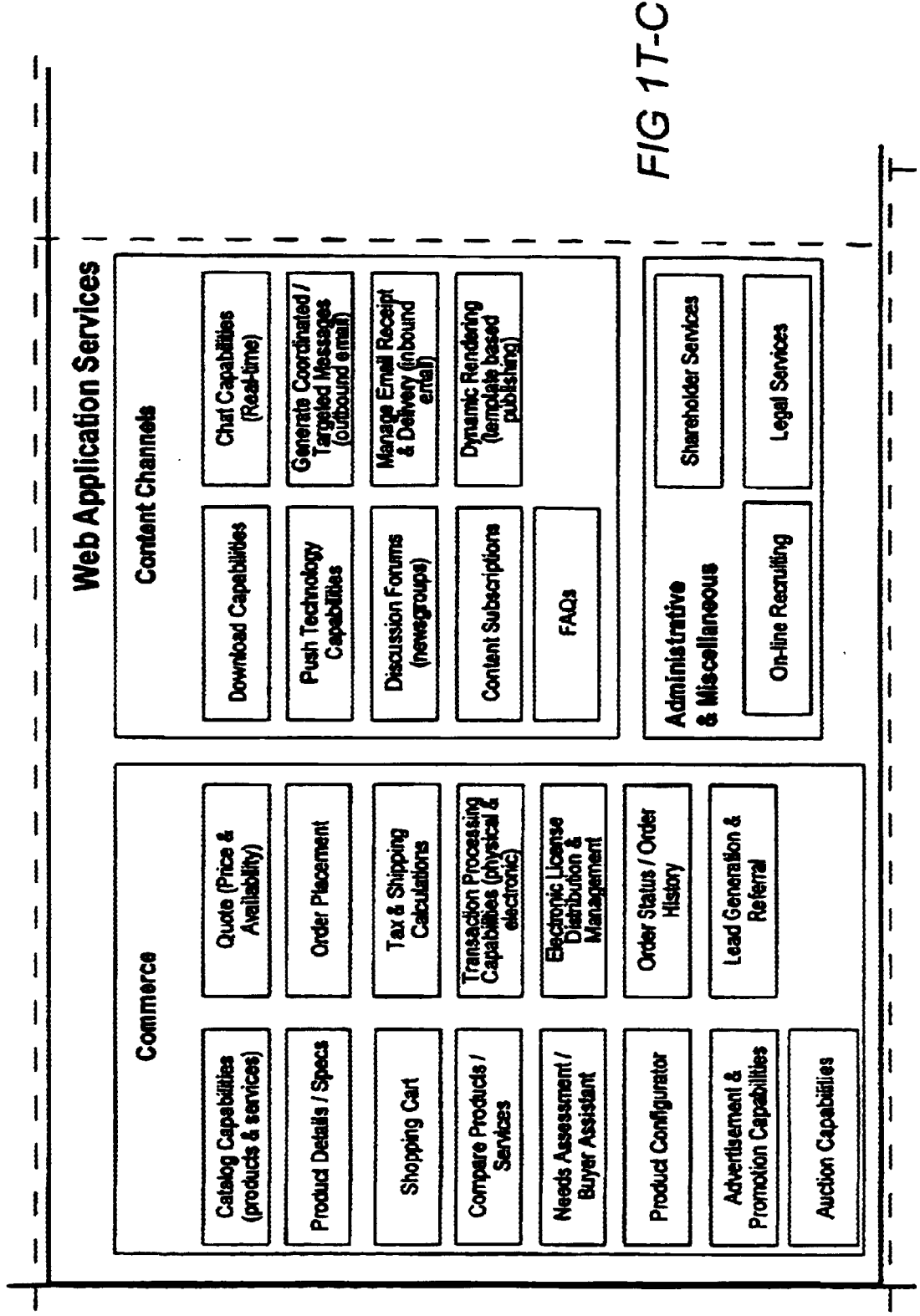
FIG 1T-C

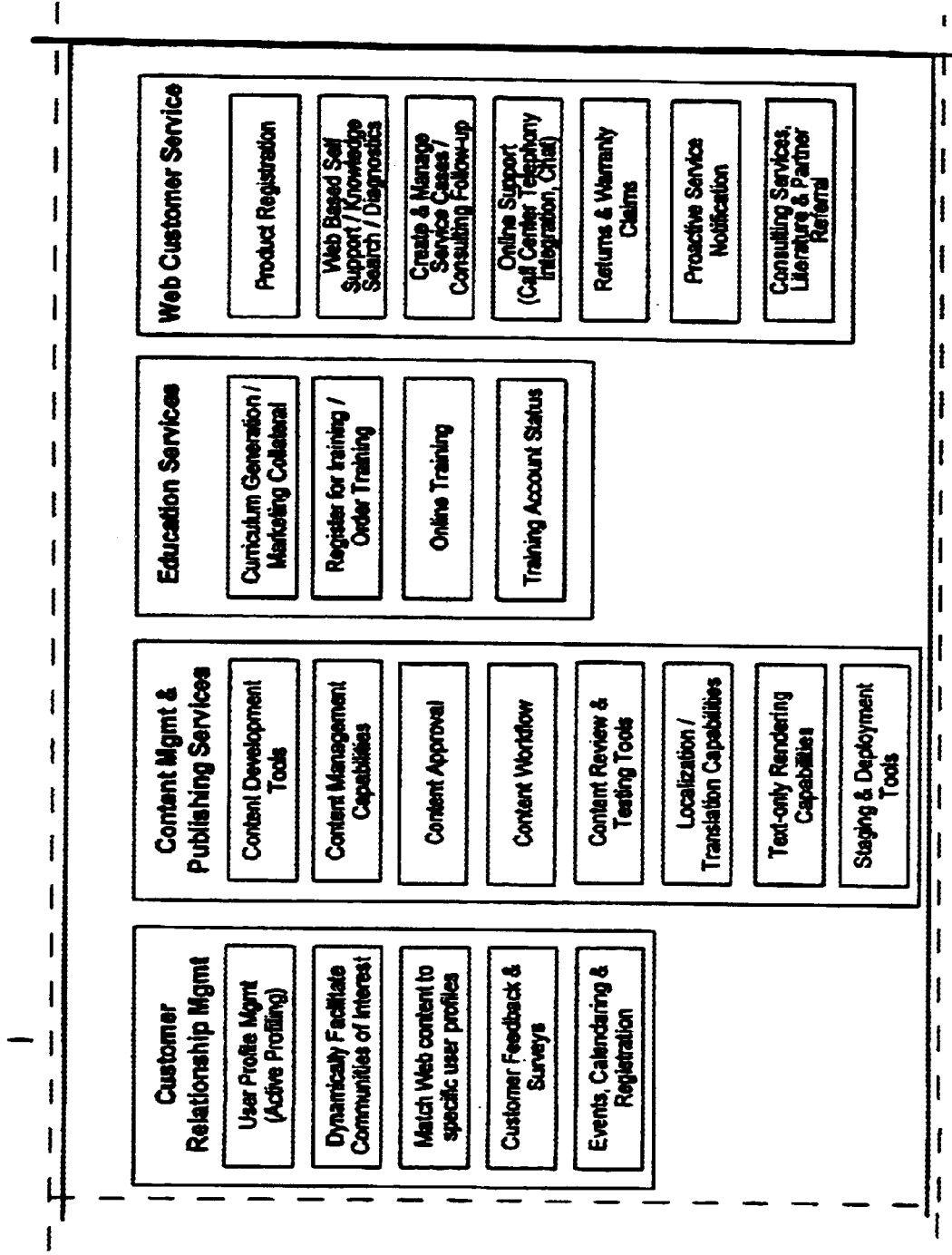
FIG 1T-D

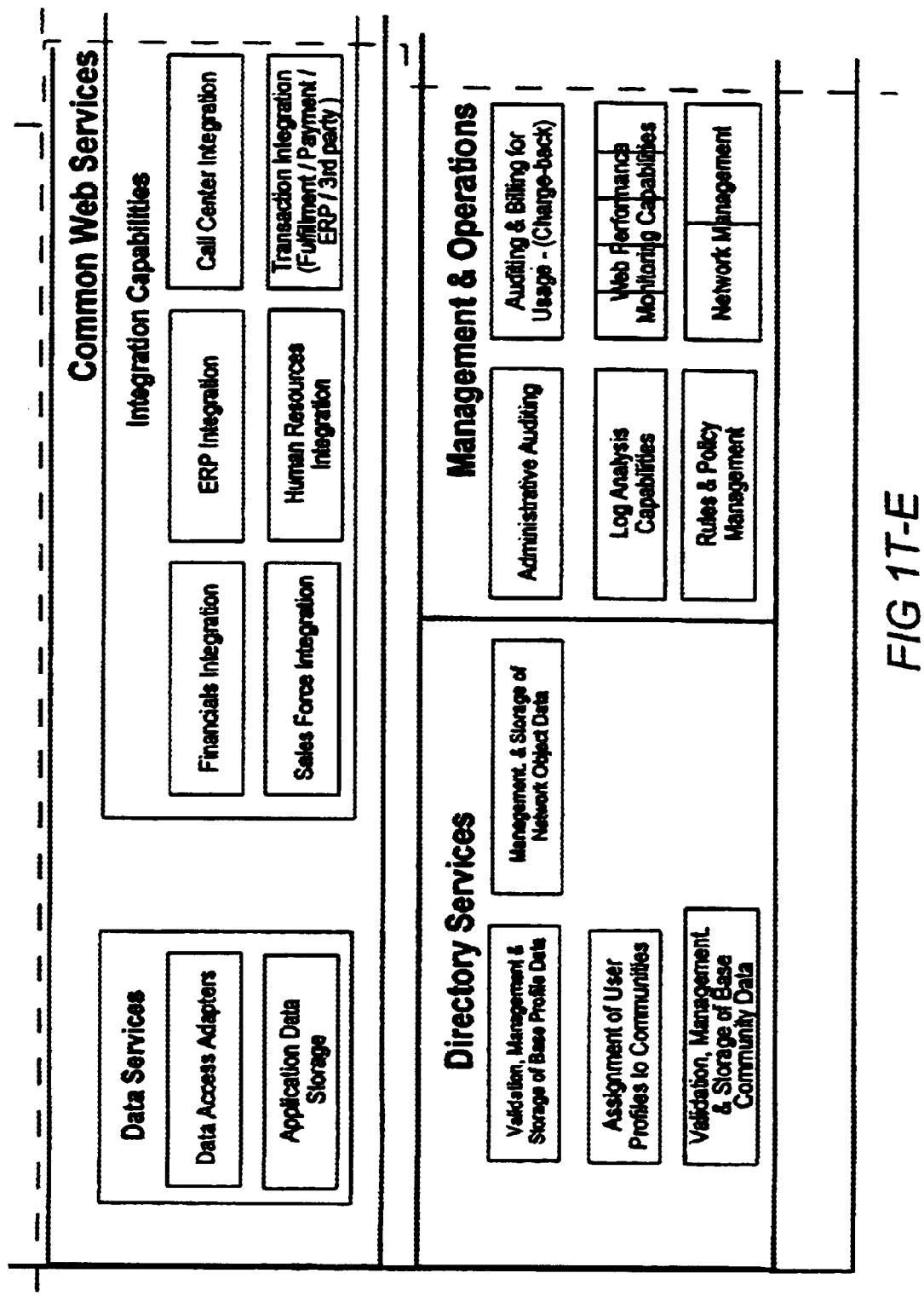
FIG 1T-E

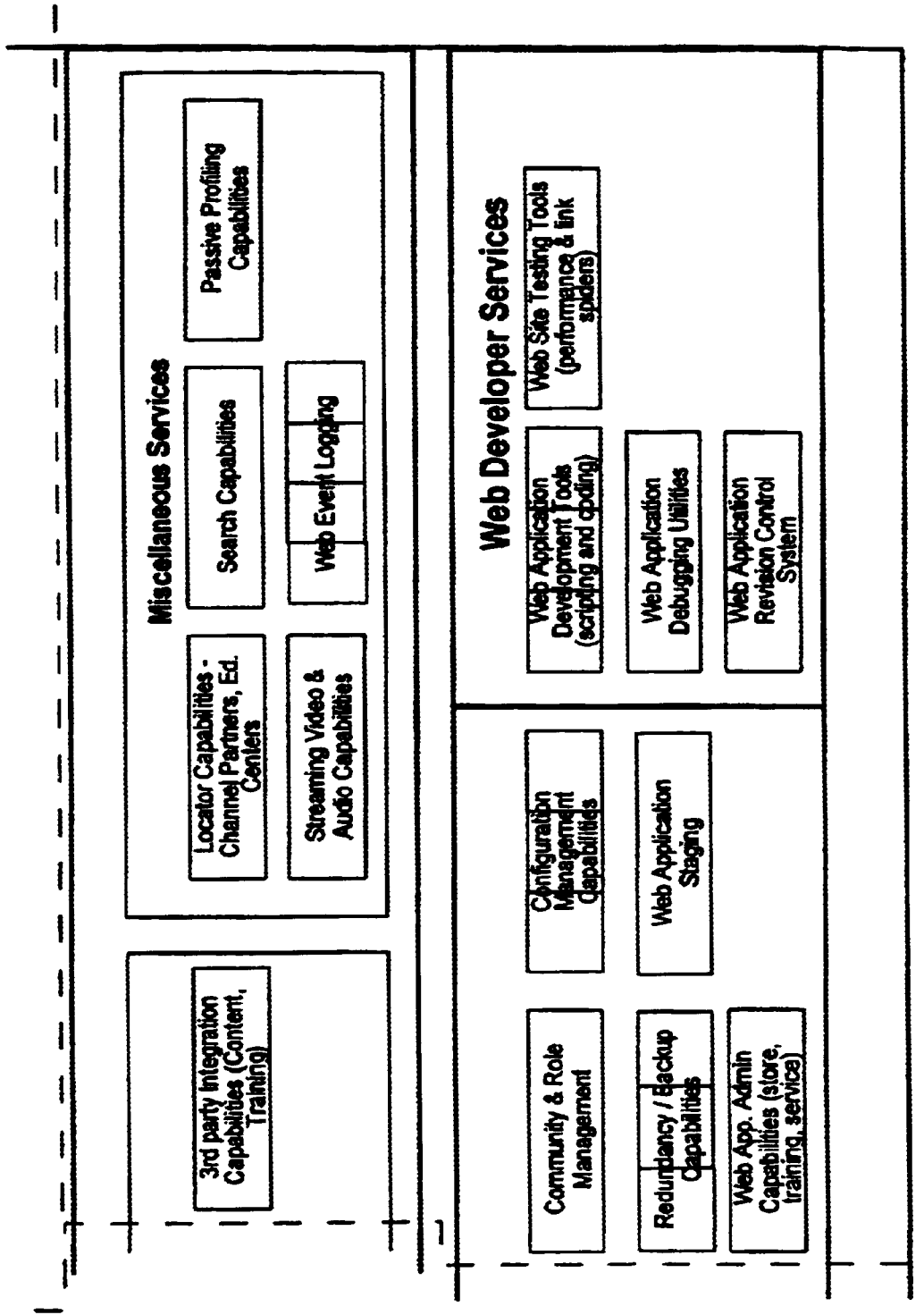
FIG 1T-F

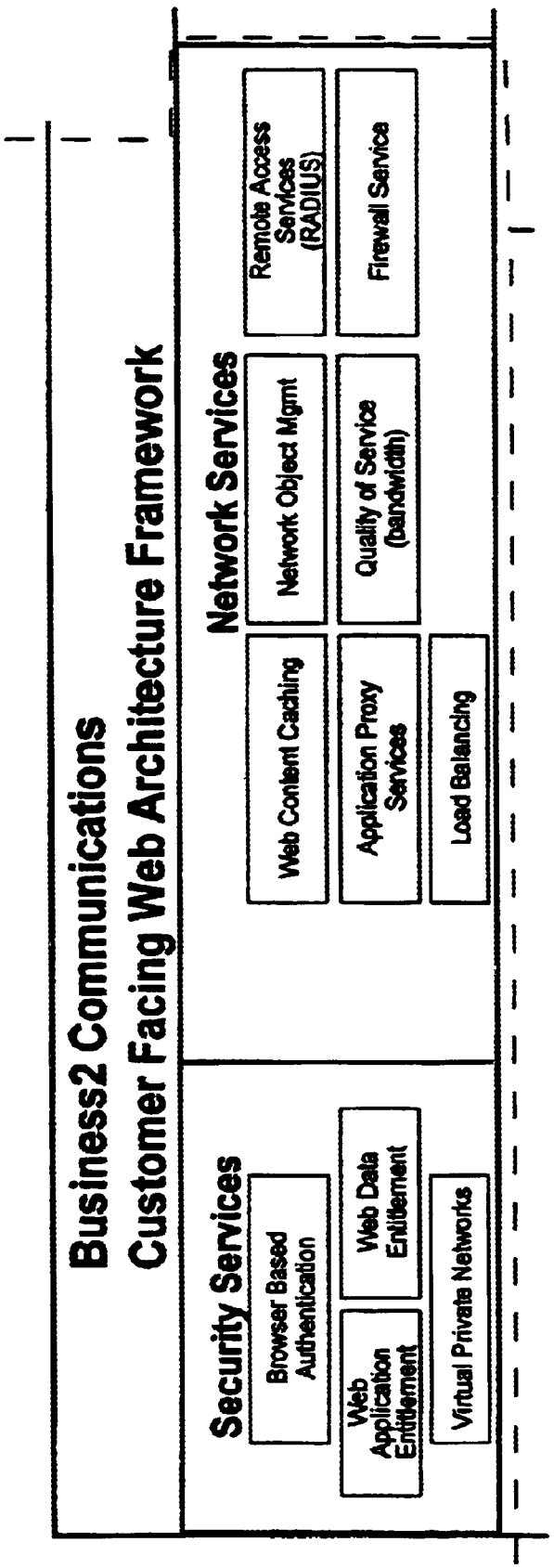
FIG 1U-A

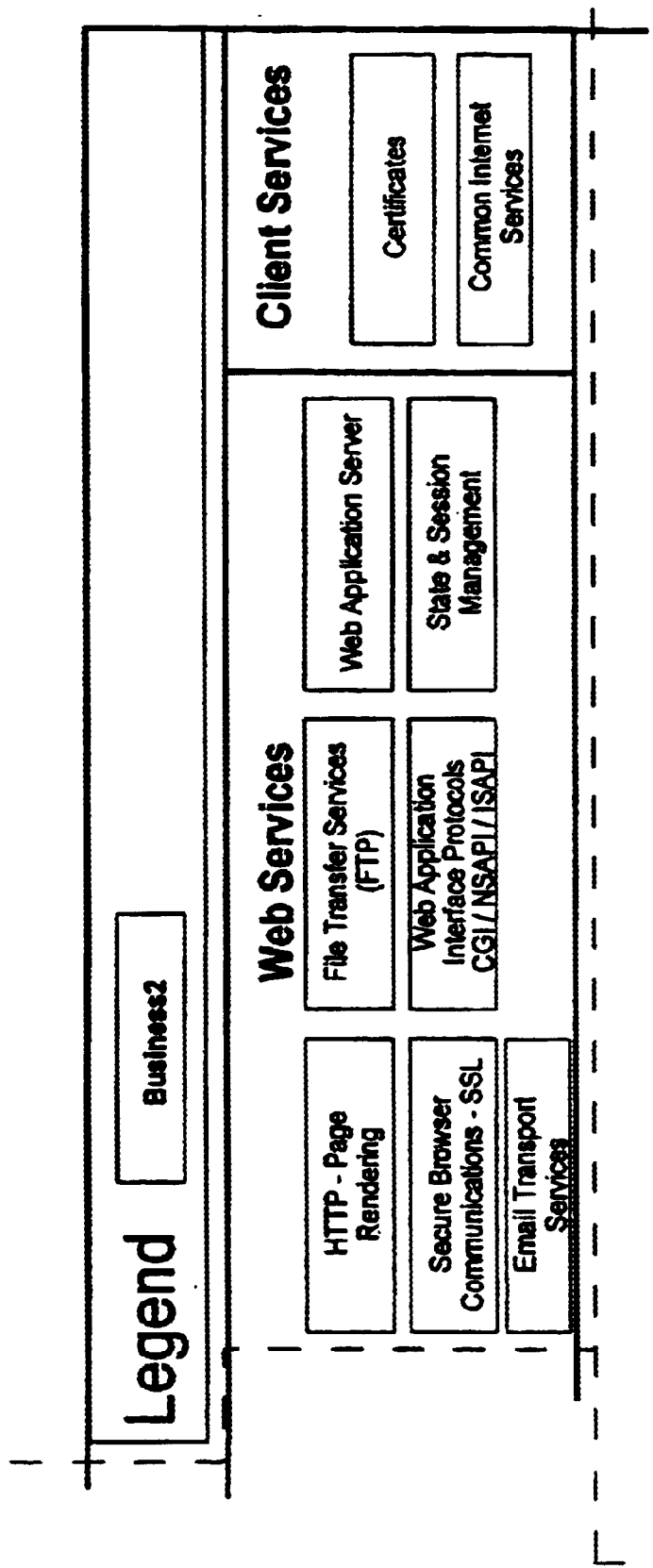
FIG 1U-B

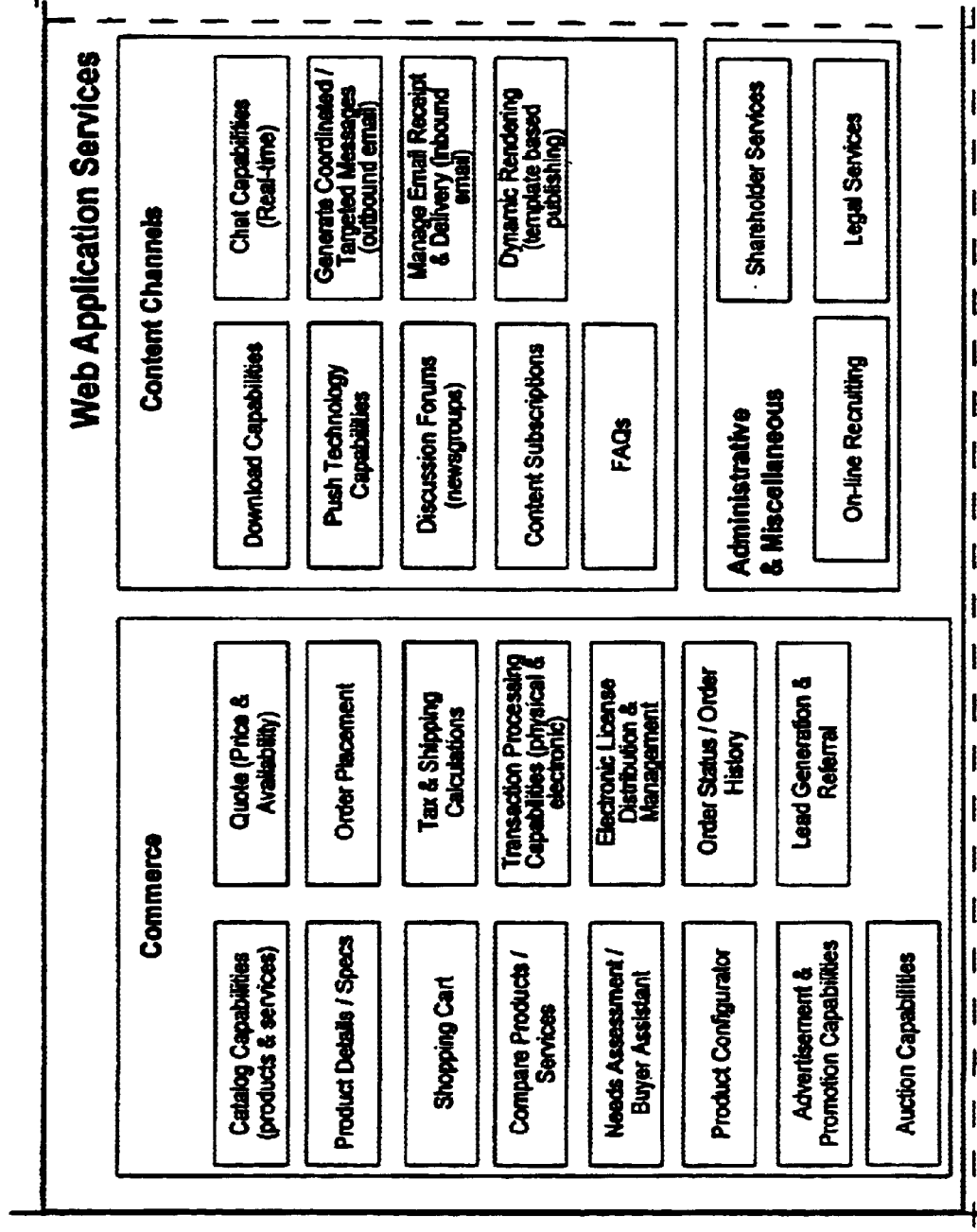
FIG 1U-C

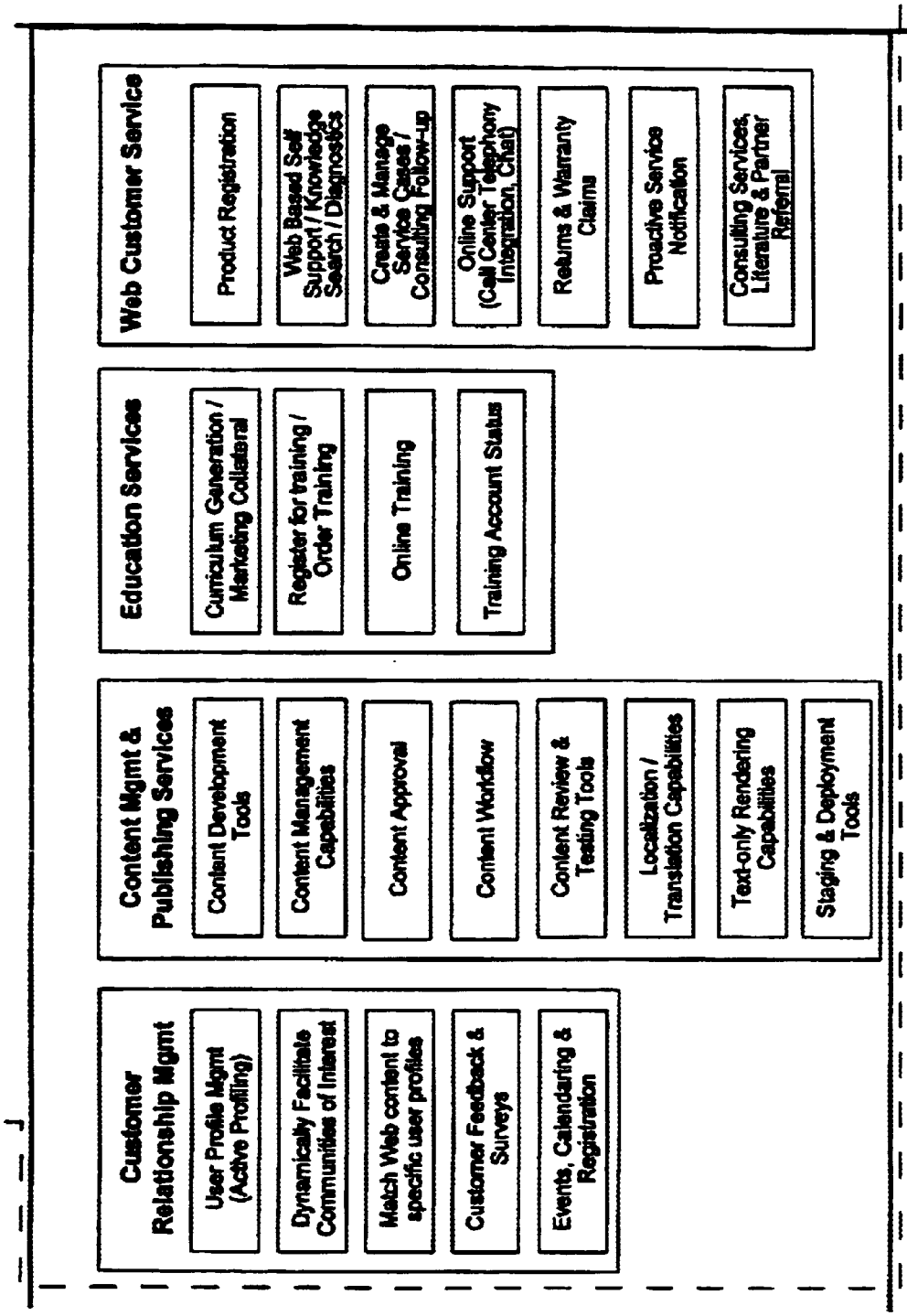
FIG 1U-D

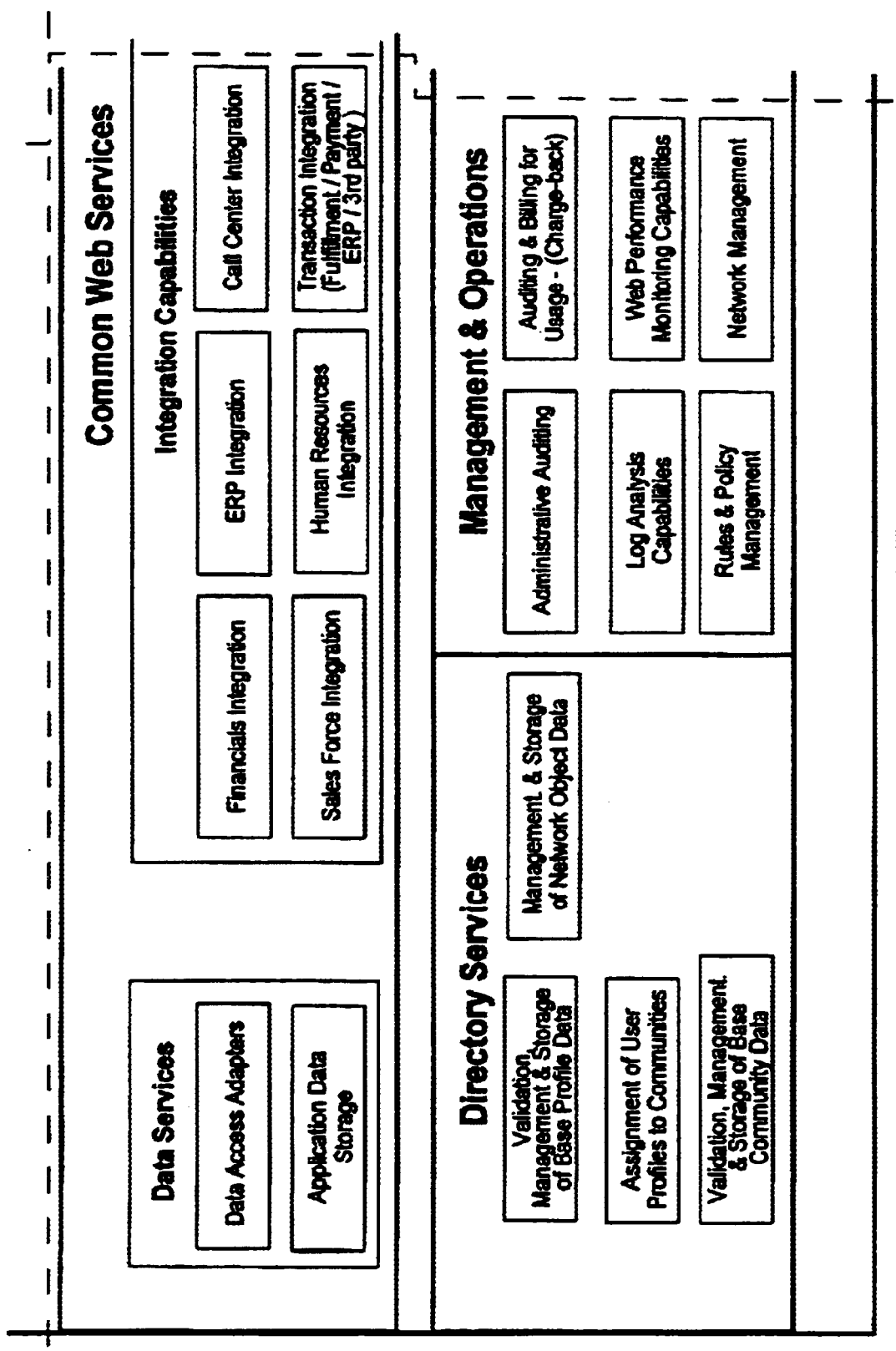
FIG 1U-E

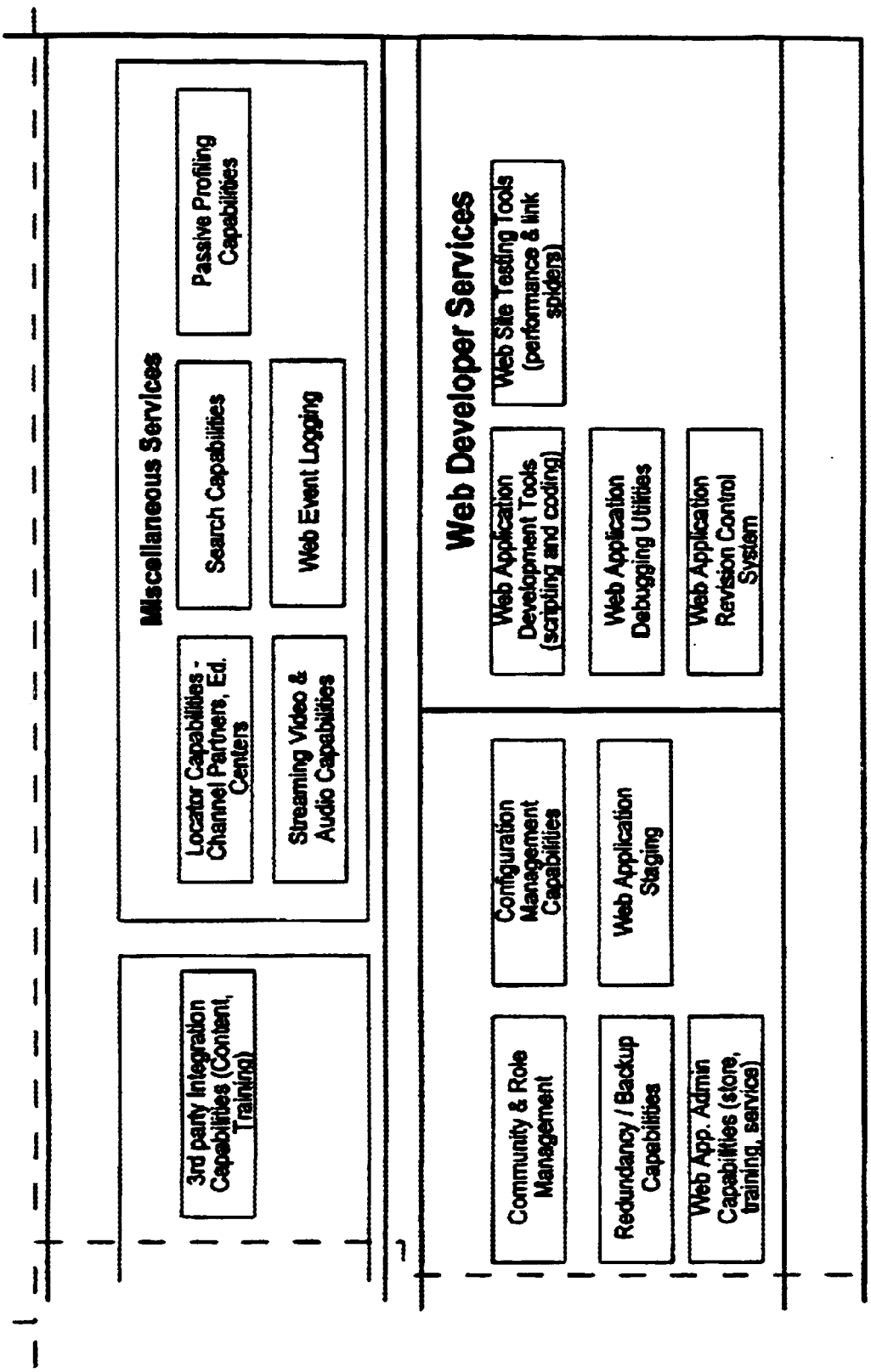
FIG 1U-F

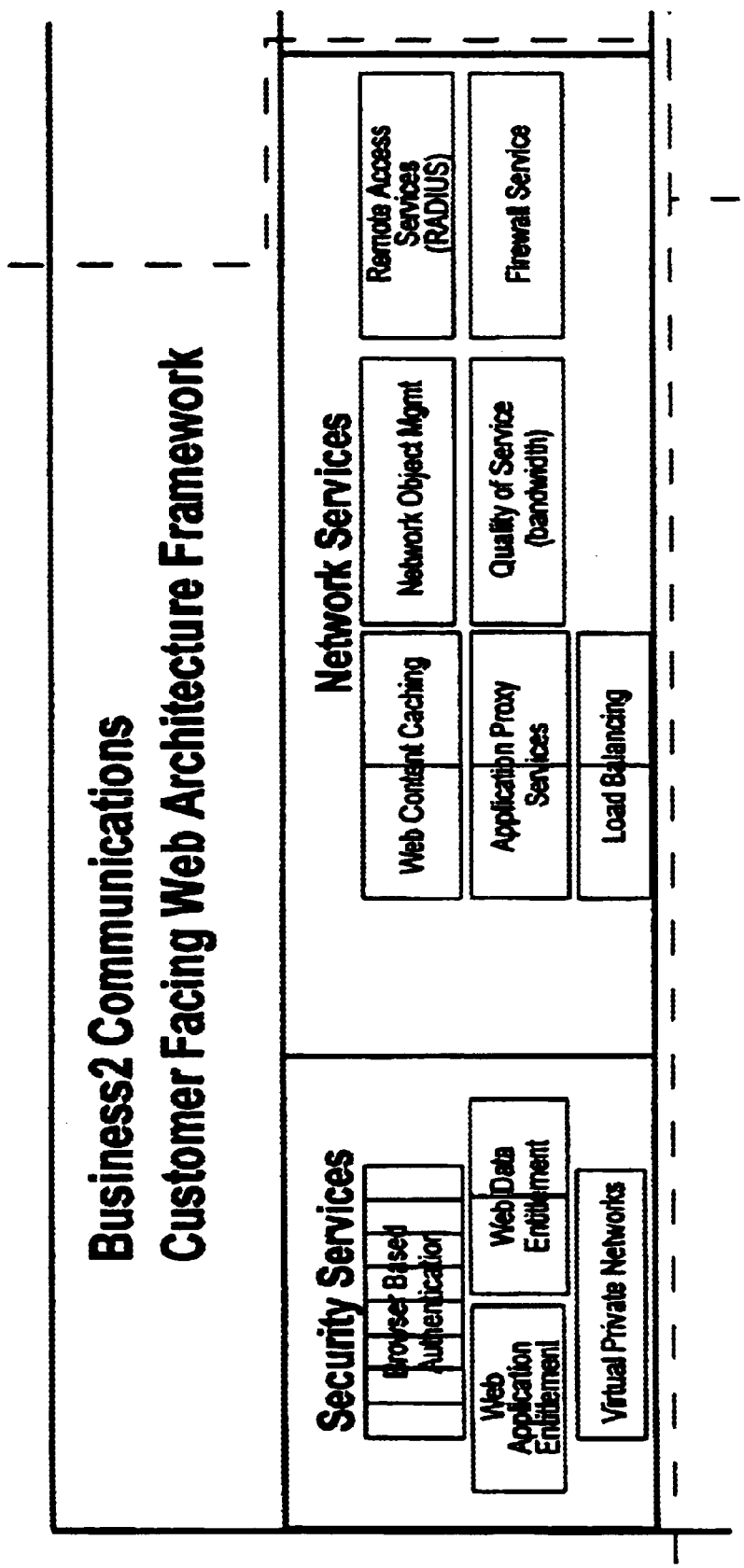
FIG 1V-A

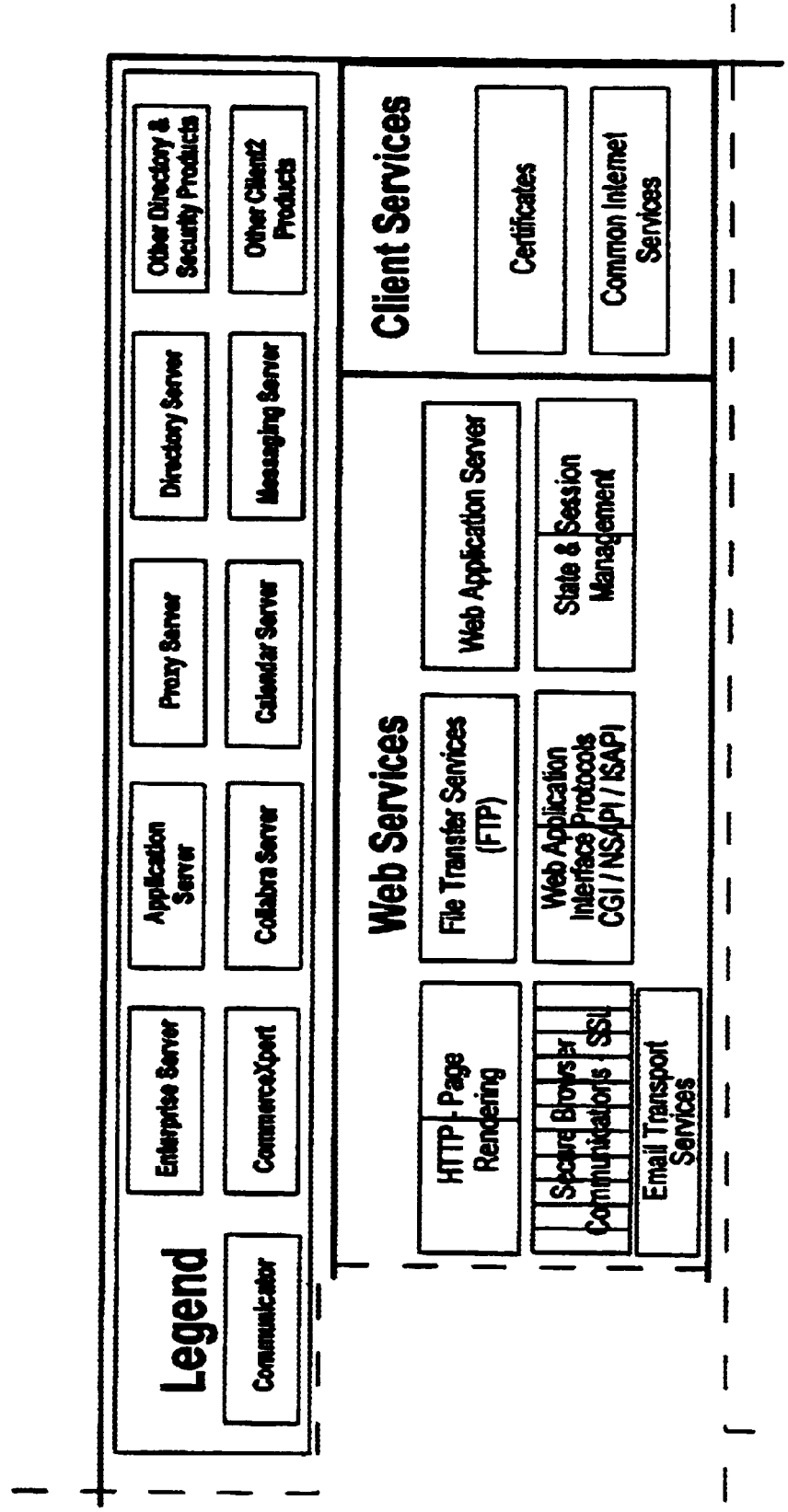
FIG 1V-B

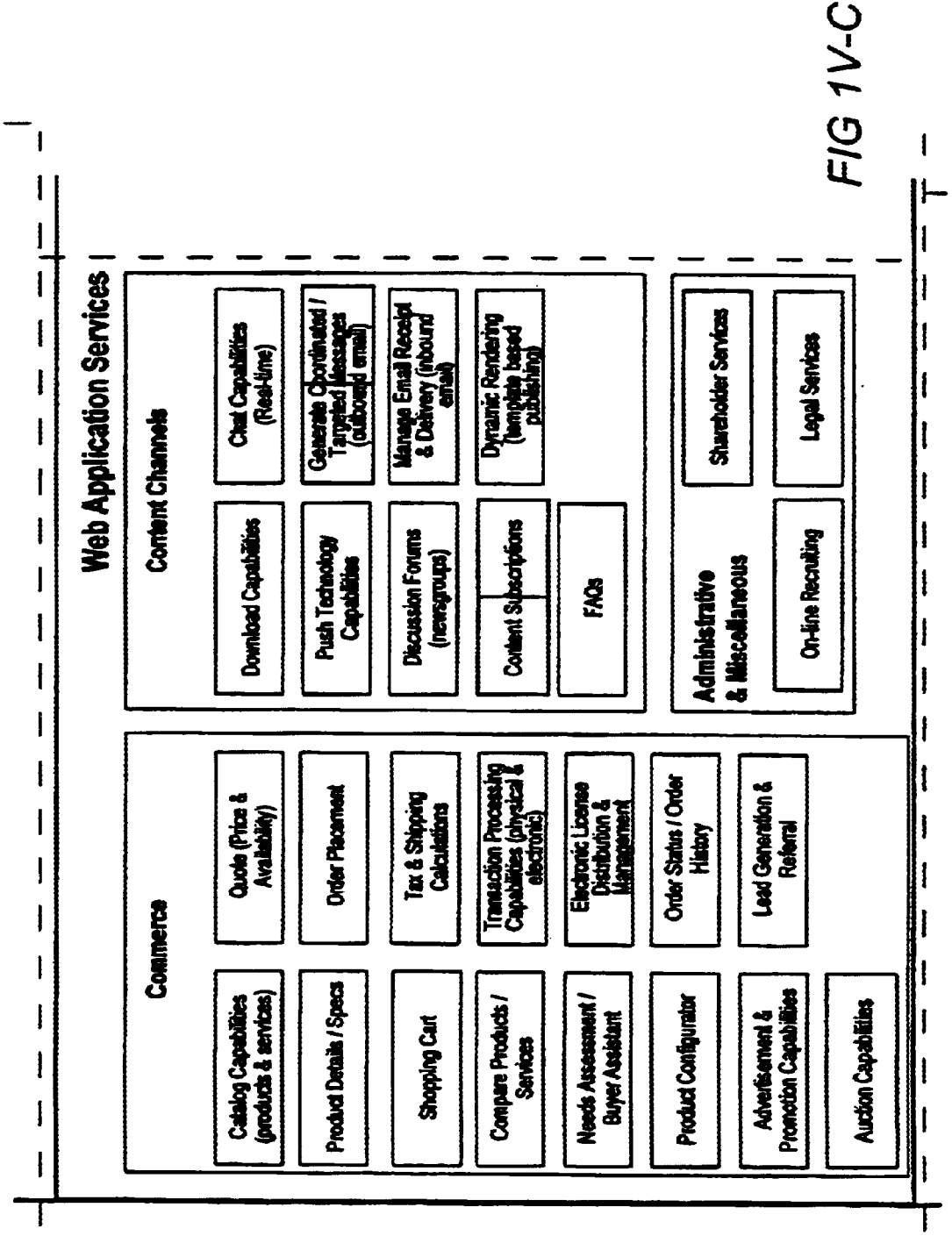
FIG 1V-C

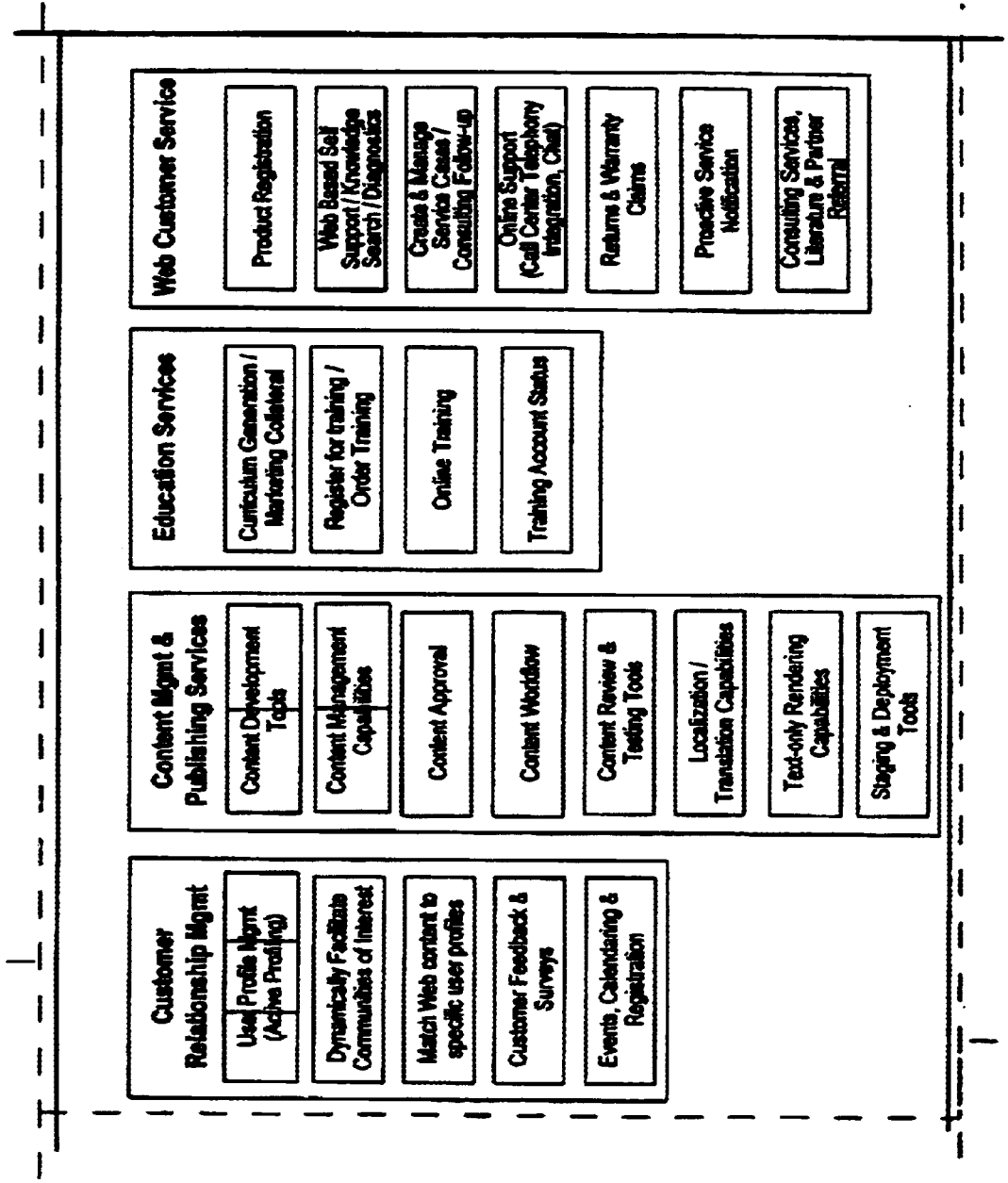
FIG 1V-D

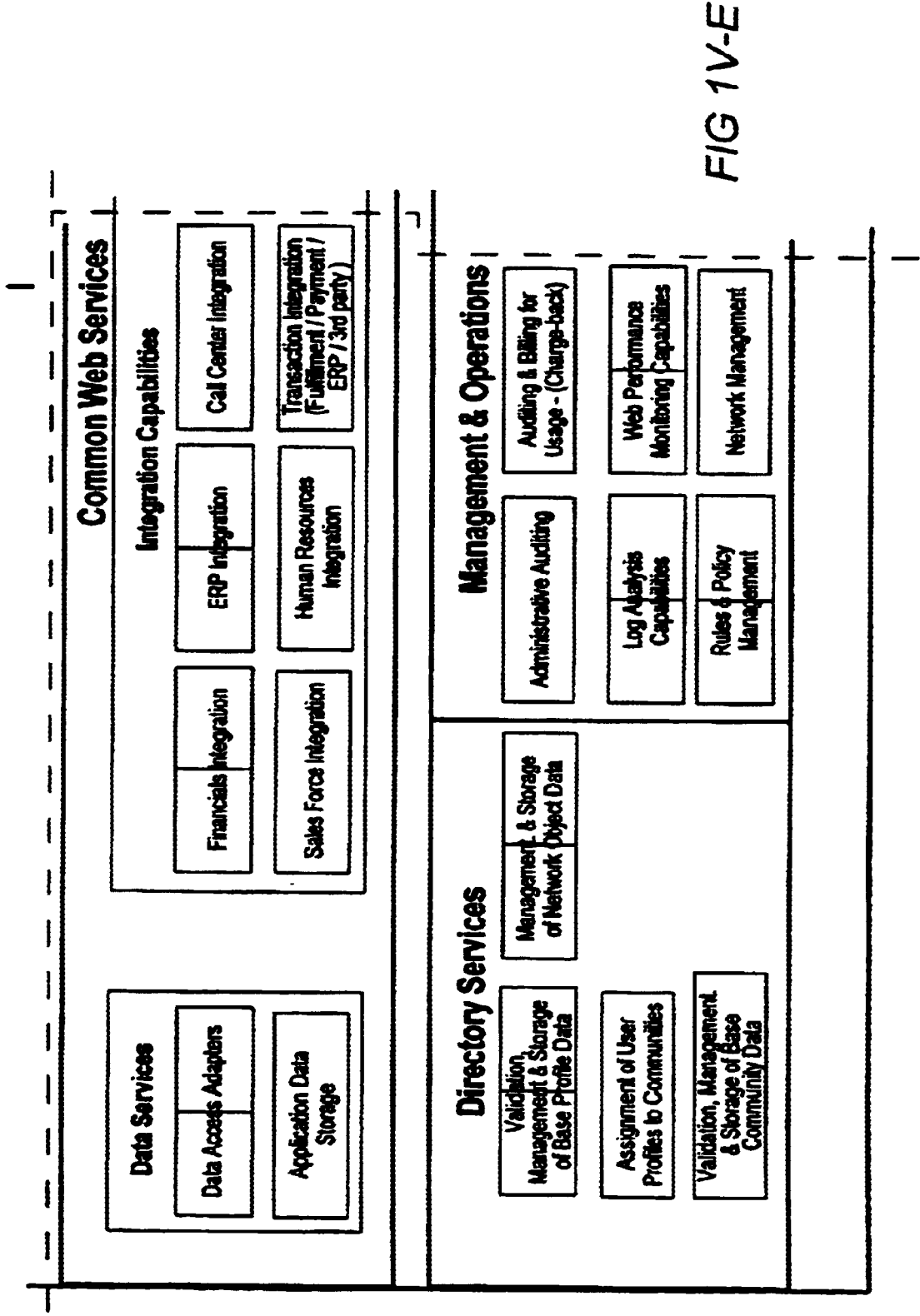
FIG 1V-E

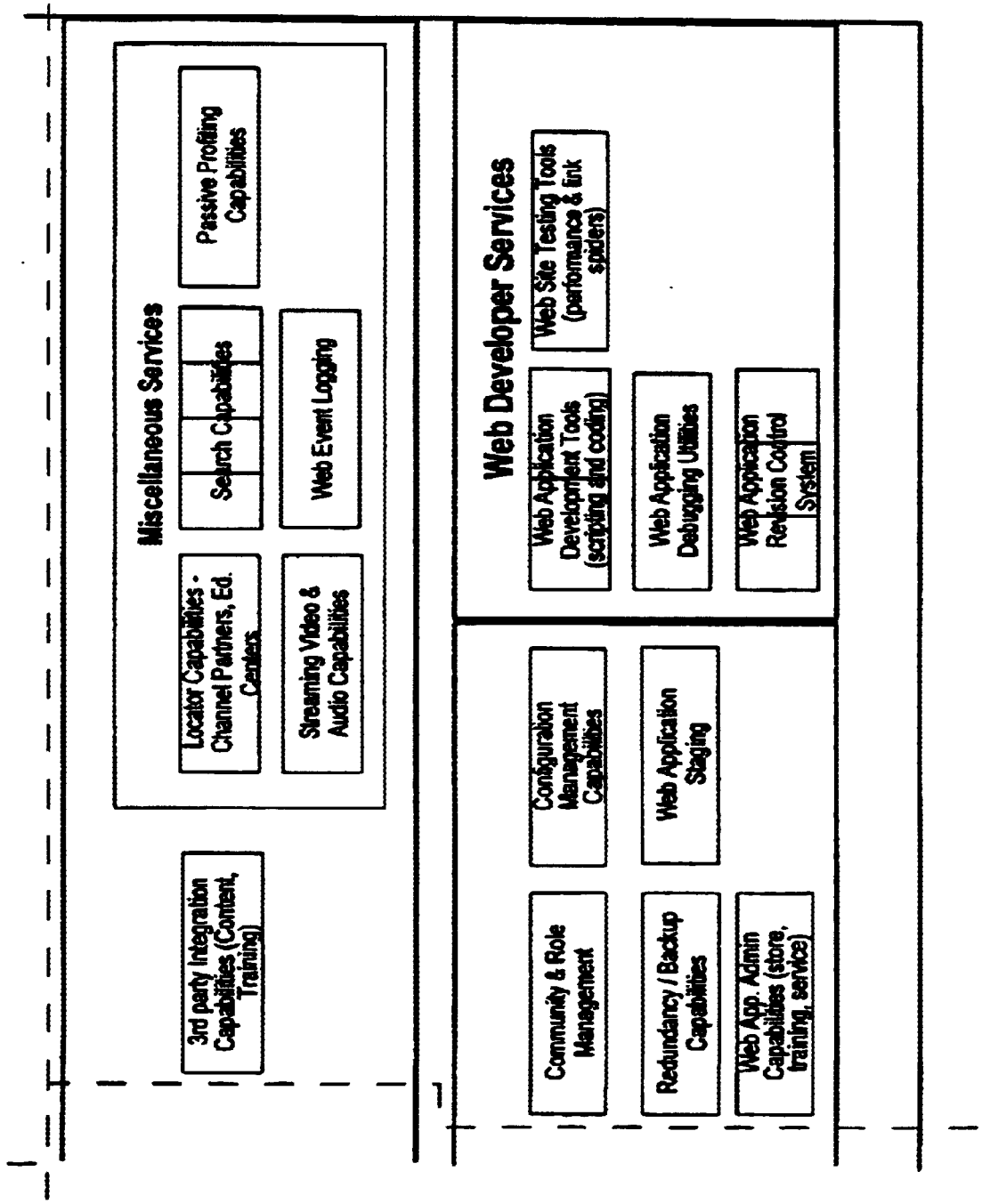
FIG 1V-F

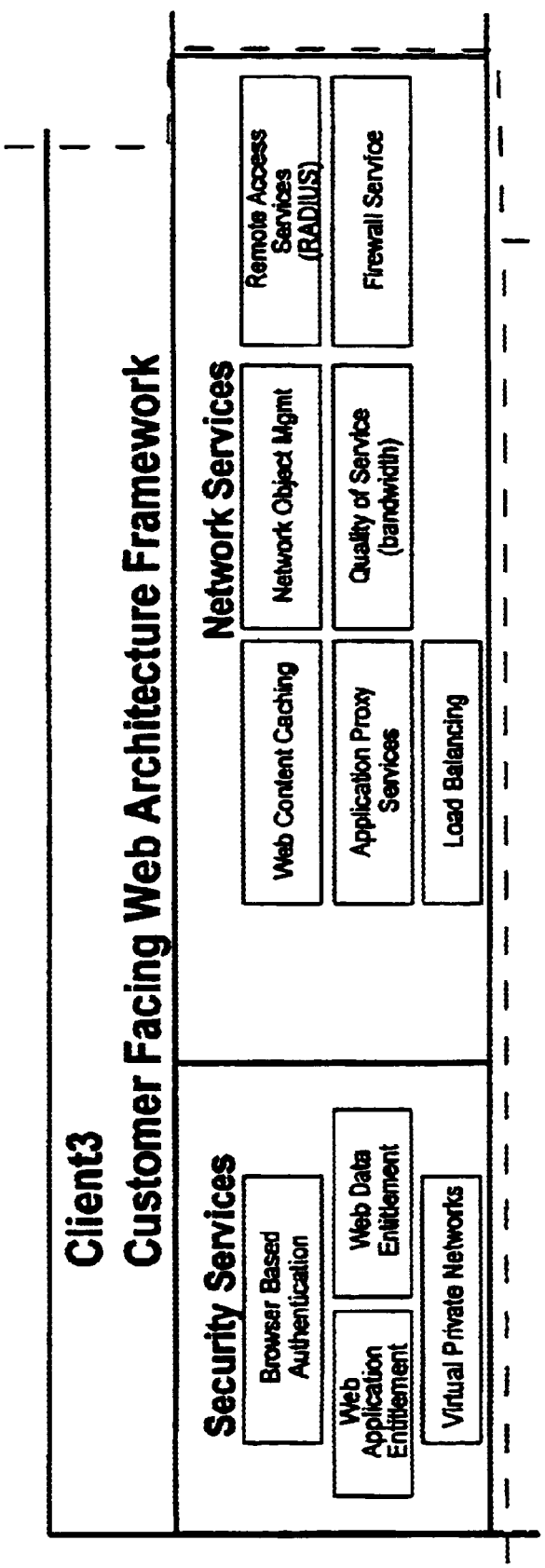
FIG. 1W-A

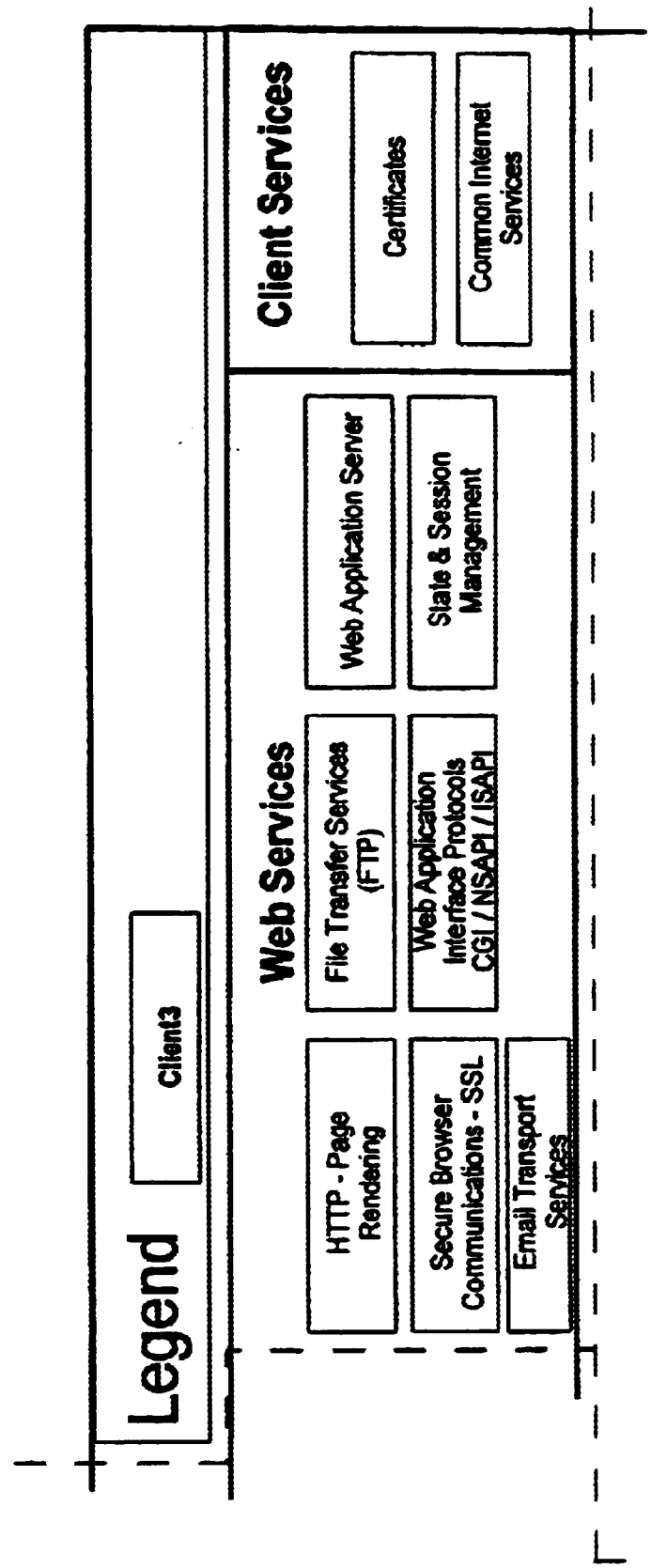
FIG 1W-B

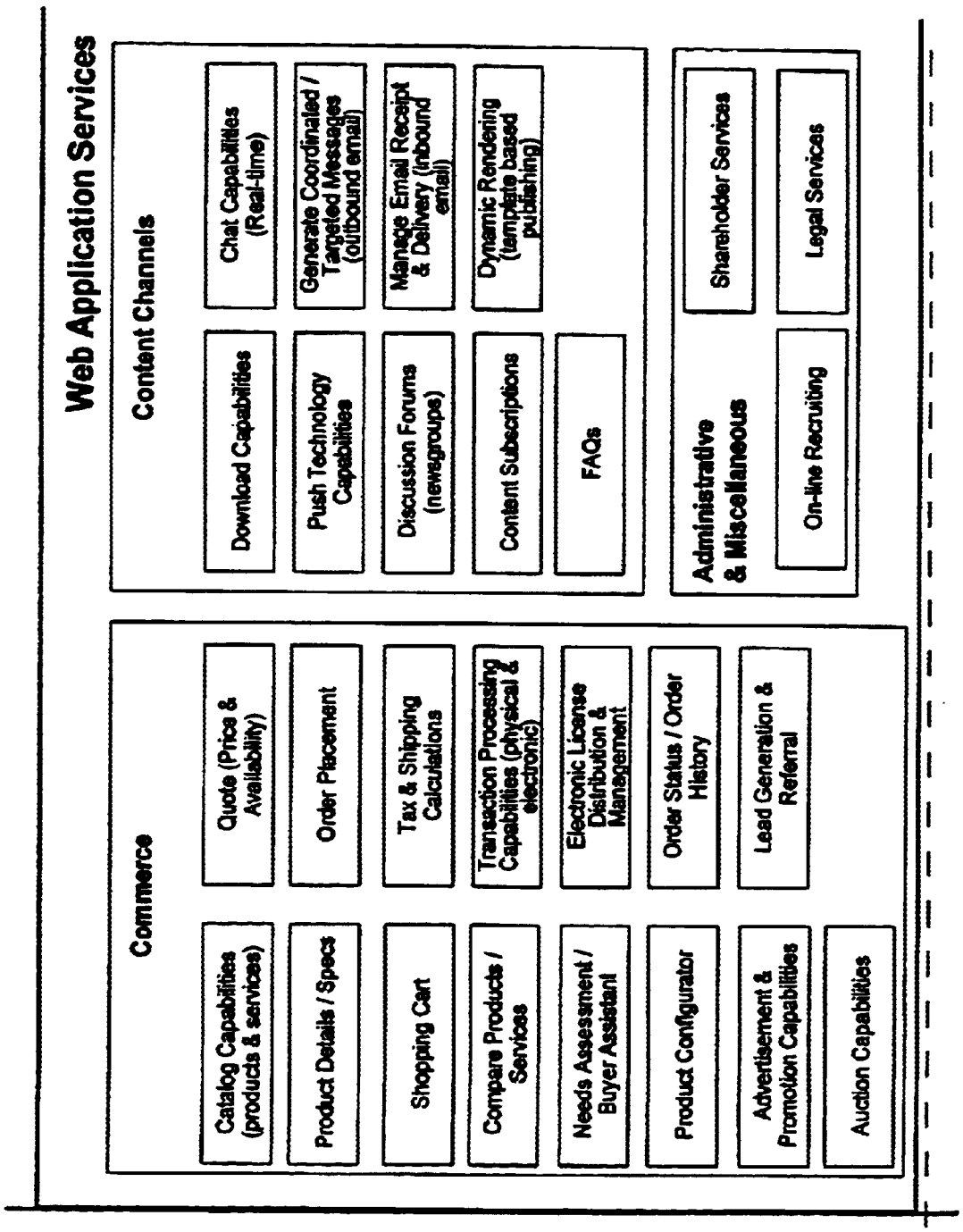
FIG 1W-C

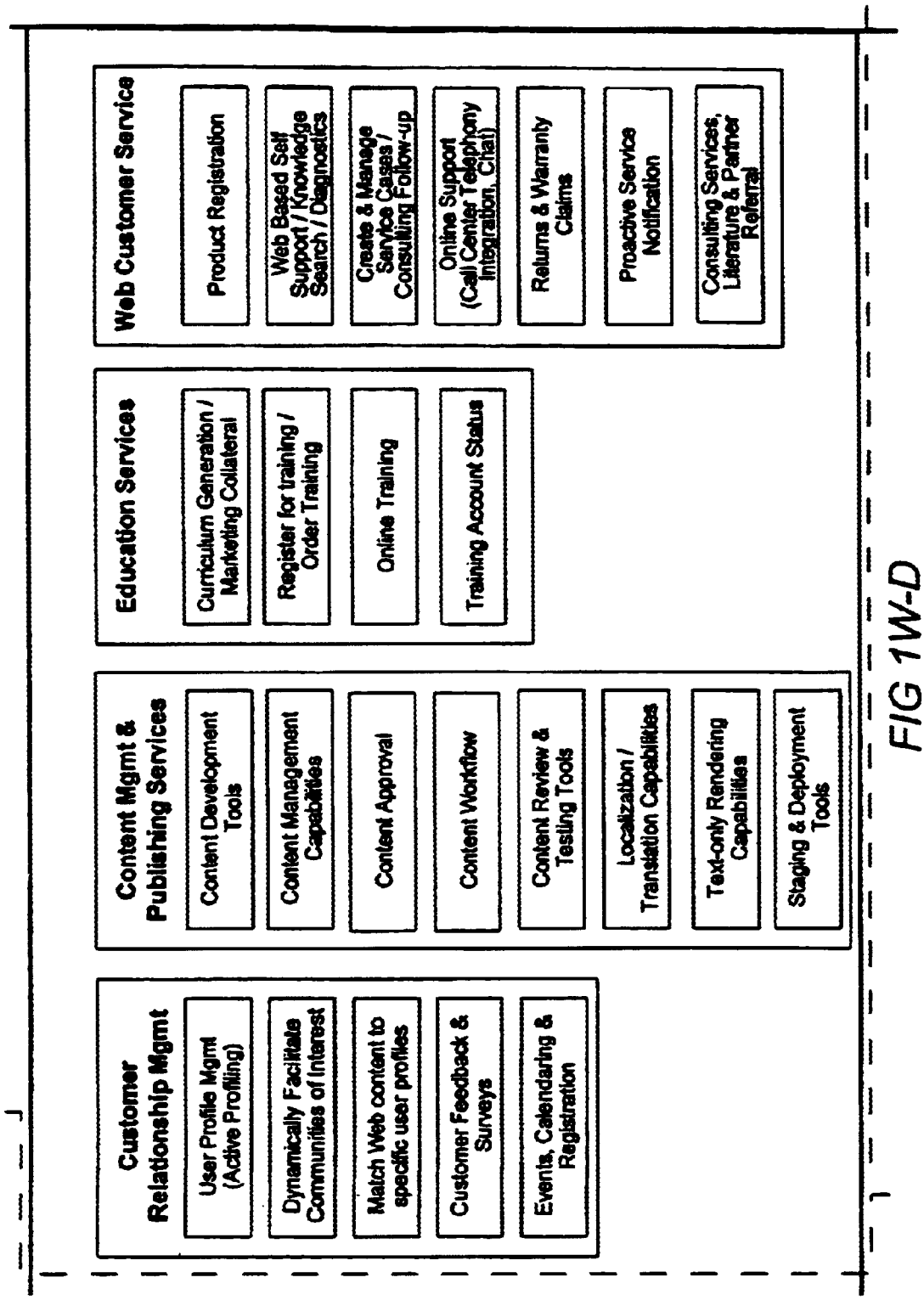
FIG 1W-D

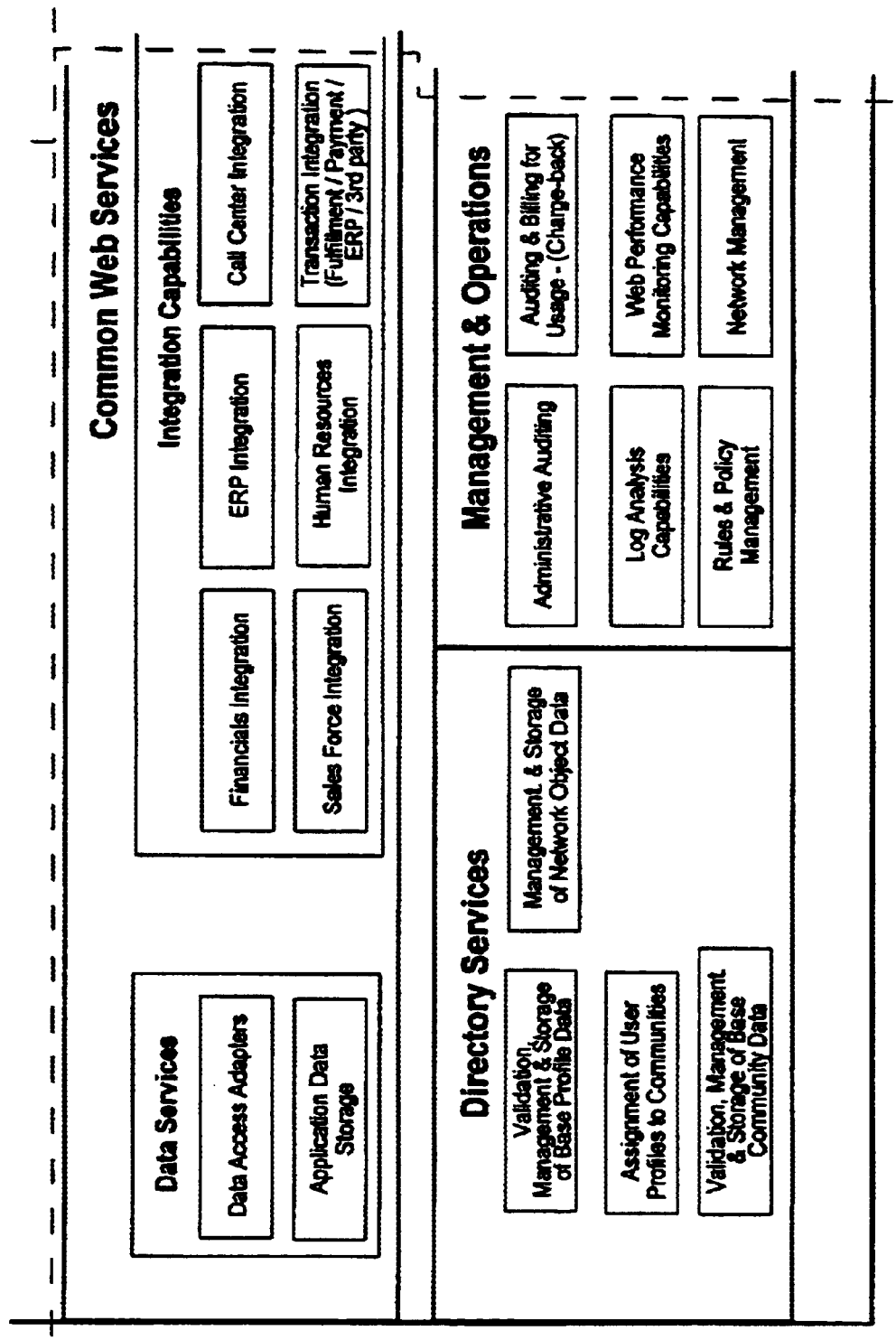
FIG 1W-E

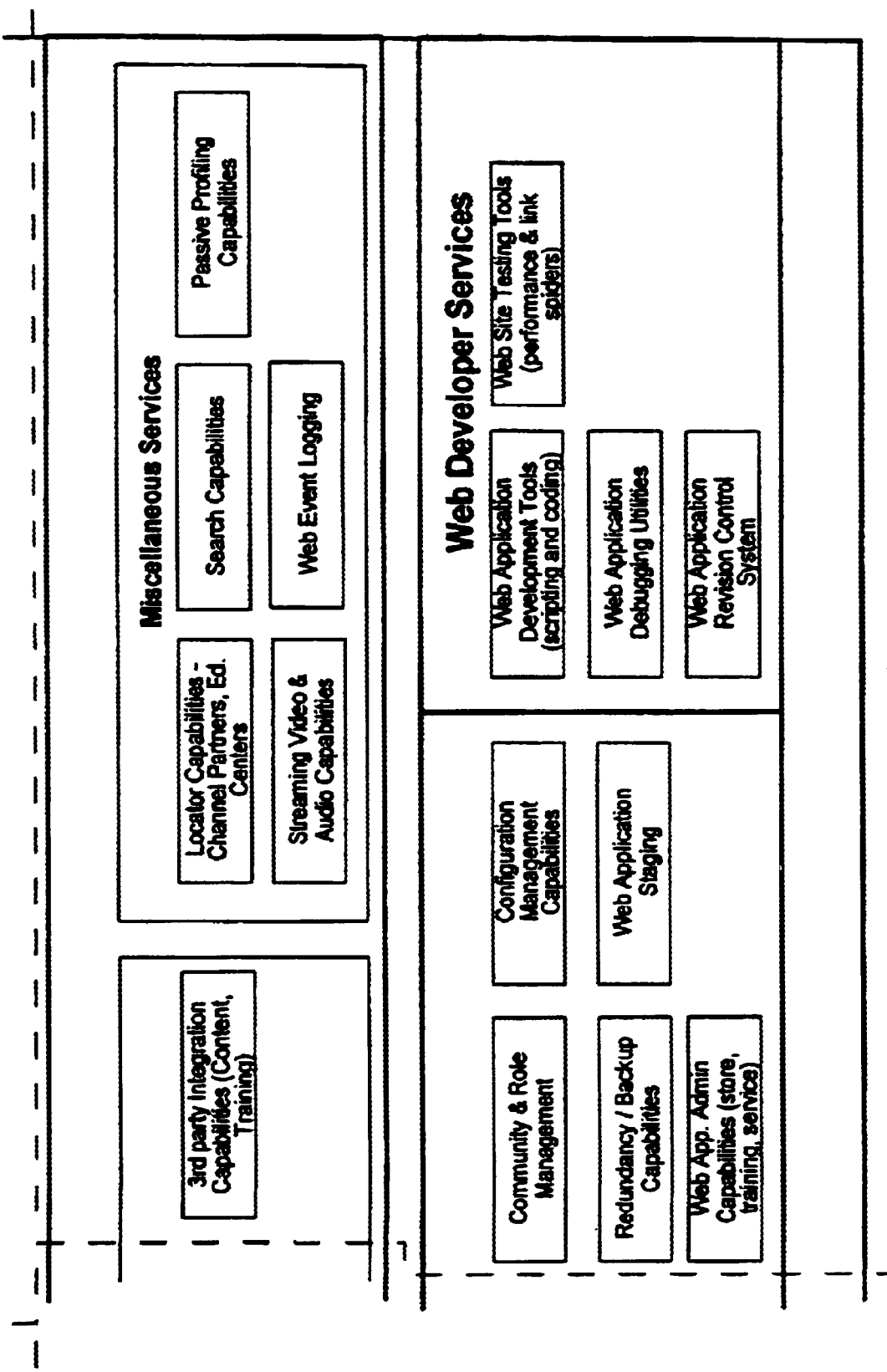
FIG 1W-F

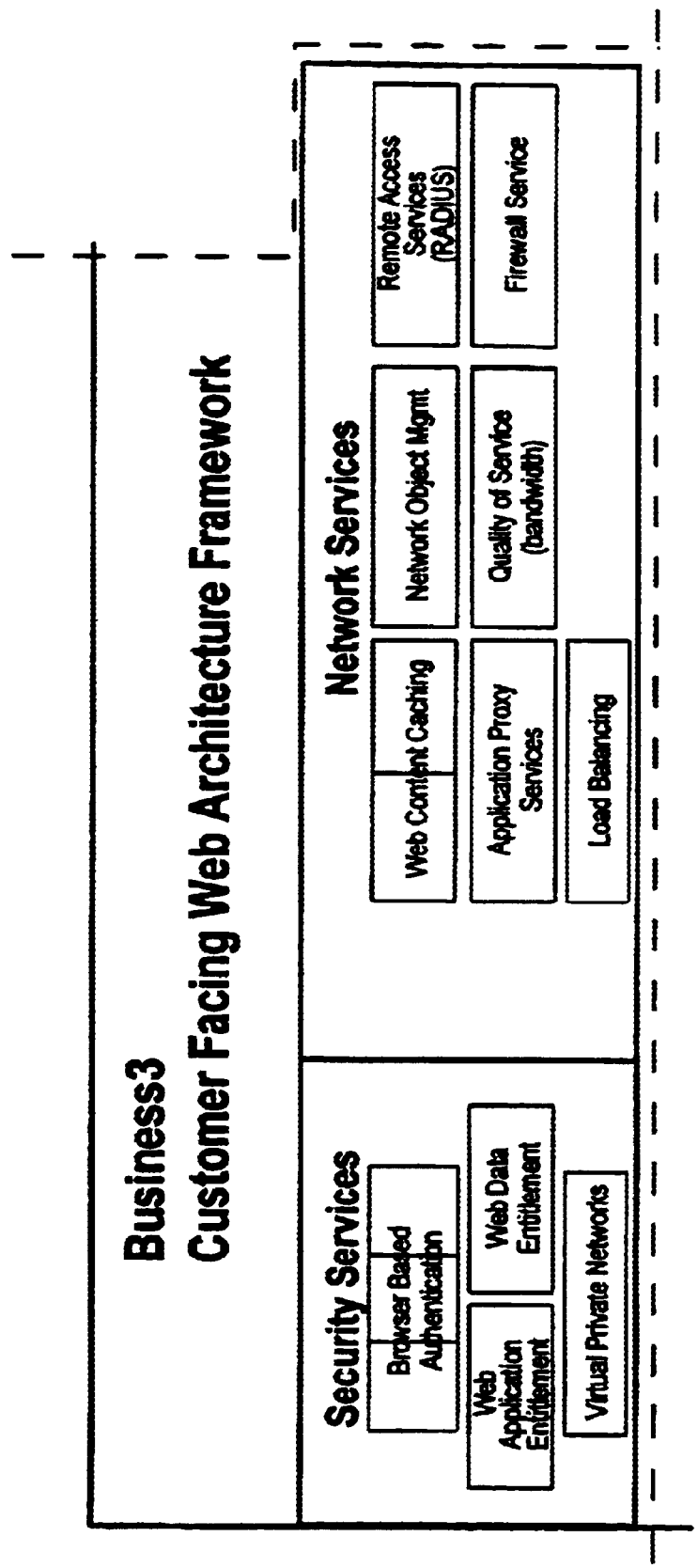
FIG 1X-A

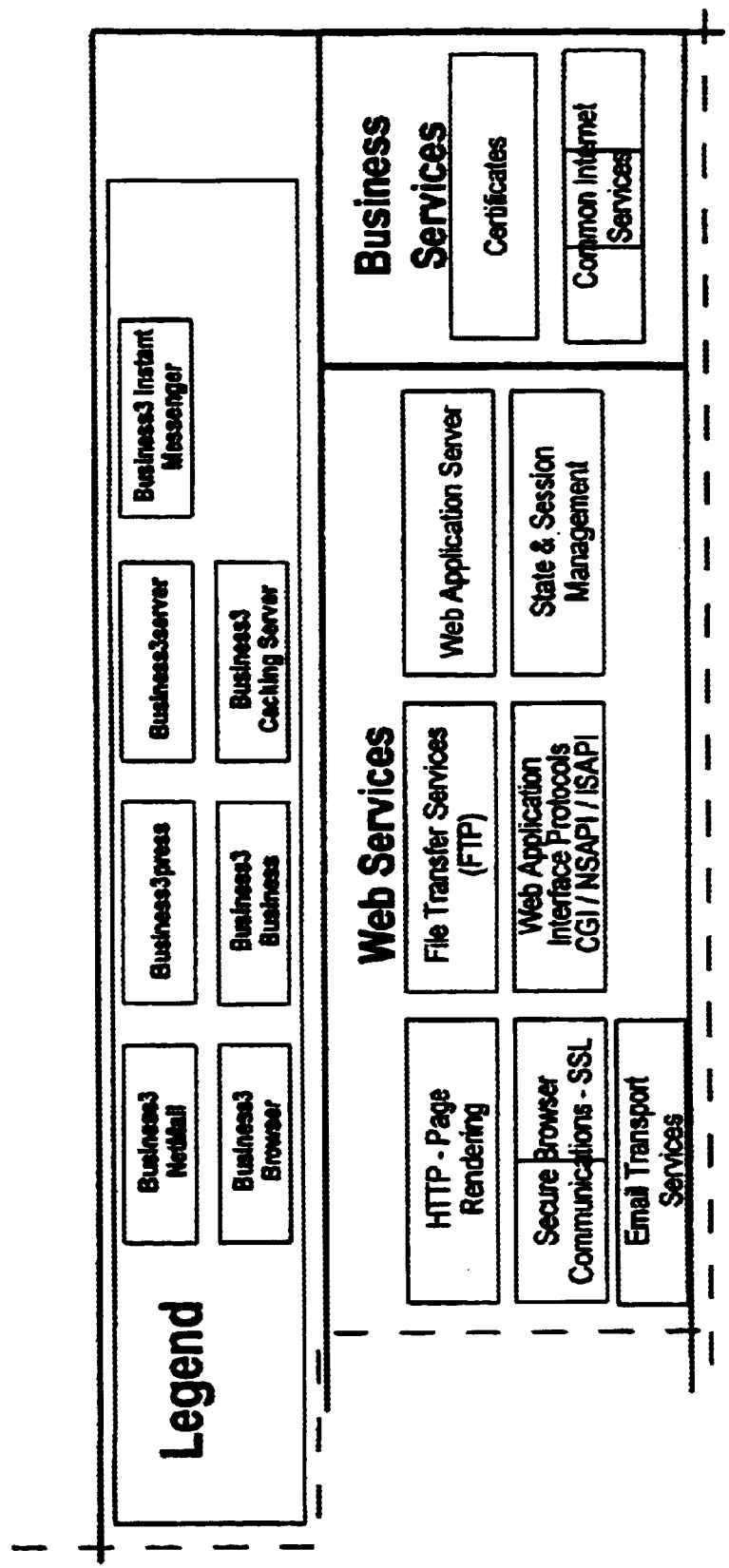

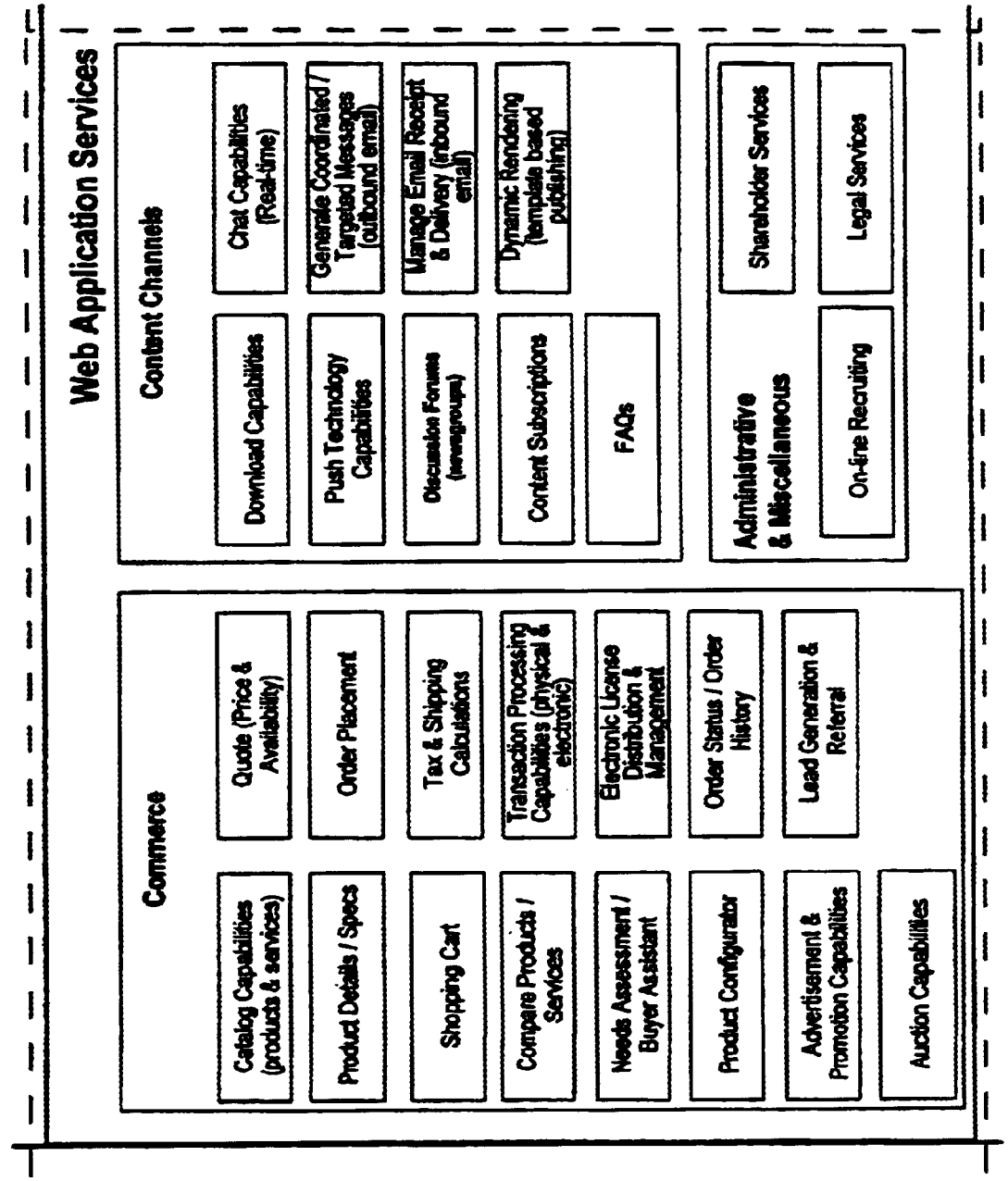
FIG 1X-C

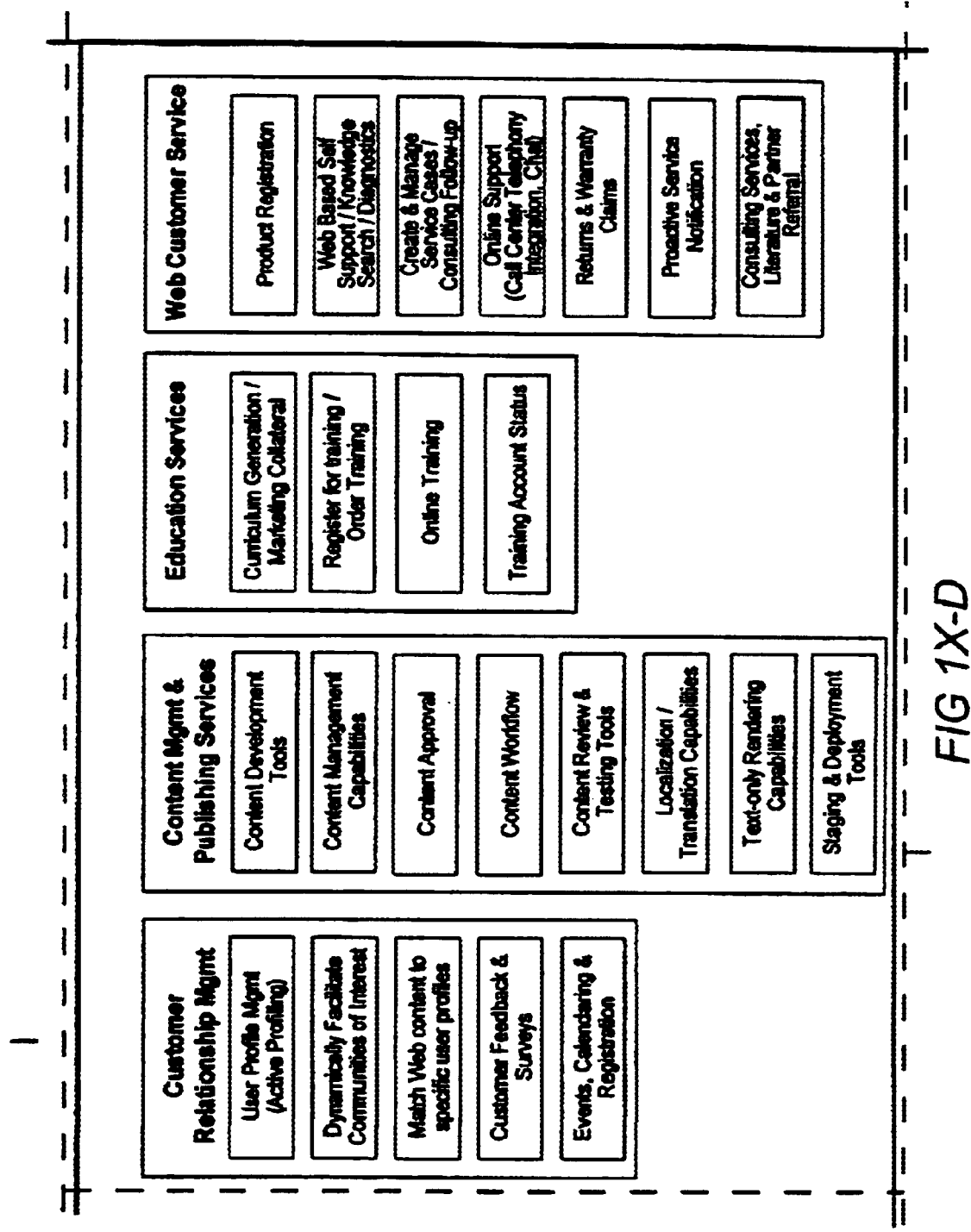
FIG 1X-D

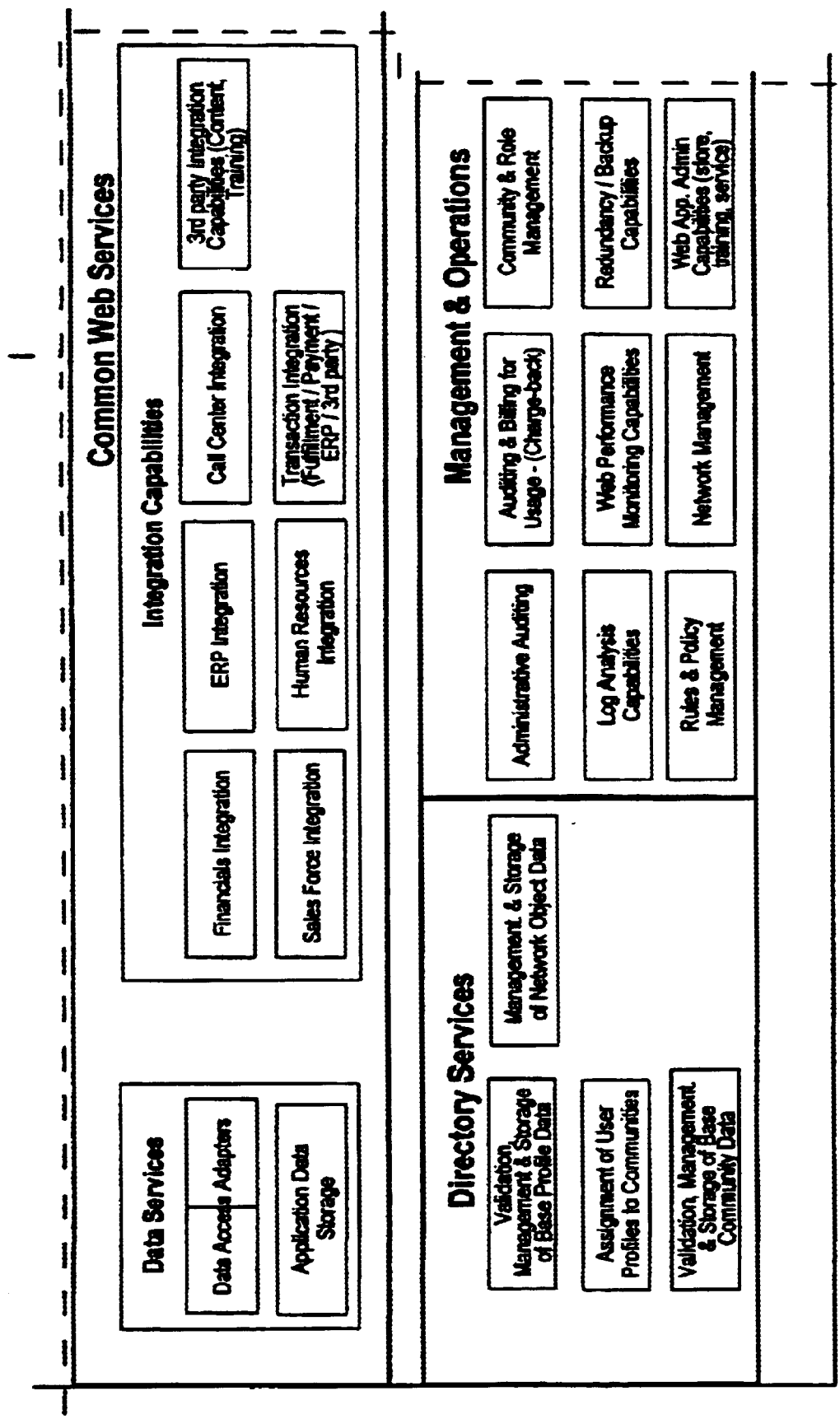
FIG 1X-E

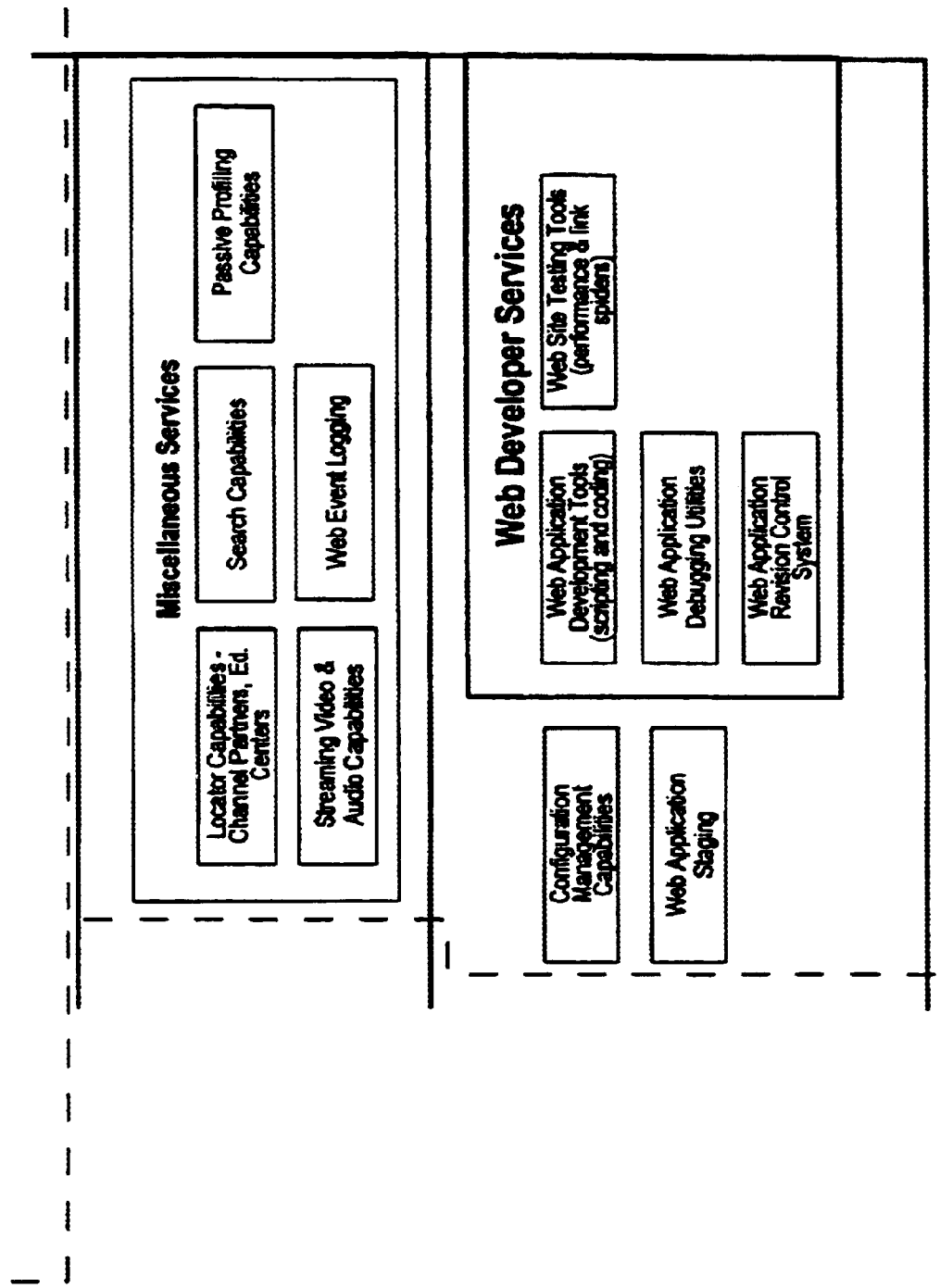

Business1

Customer Facing Capabilities - Infrastructure Services

Core Capabilities     Extended Detail

Security Services

Browser Based Authentication
- ☐ Verifies user identity using built-in browser functionality
- ☐ Maintains authentication information throughout sessions
- ☐ Utilizes centralized directory of profiles
- ☐ Provides LDAP compatibility
- ☐ Provides NDS compatibility

Web Application Entitlement
- ☐ ☐ ☐ Restricts access to specific web applications based upon user privileges
- ☐ ☐ ☐ Determines if a user or group of users have permission to perform an operation in a specific application
- ☐ ☐ ☐ Utilizes centralized directory of profiles for entitlement data
- ☐ ☐ ☐ Provides LDAP compatibility
- ☐ ☐ ☐ Provides NDS compatibility

Web Data Entitlement
- ☐ ☐ ☐ Restricts access to web content and data based upon user privileges
- ☐ ☐ ☐ Determines if a user or group of users have permission to manipulate web data (create, read, update, delete)
- ☐ ☐ ☐ Utilizes centralized directory of profiles for entitlement data
- ☐ ☐ ☐ Provides LDAP compatibility
- ☐ ☐ ☐ Provides NDS compatibility

Virtual Private Networks
- ☐ ☐ Offers guaranteed secure data transfer
- ☐ ☐ Allows remote login
- ☐ ☐ Provides ability to grant varying levels of access based on user identity

Network Services

Web Content Caching
- ☐ ☐ Stores frequently requested web pages and graphics in a temporary location
- ☐ ☐ Serves up previously cached content without accessing original source
- ☐ ☐ Updates cache automatically to ensure integrity of content

*FIG 1Y-A*

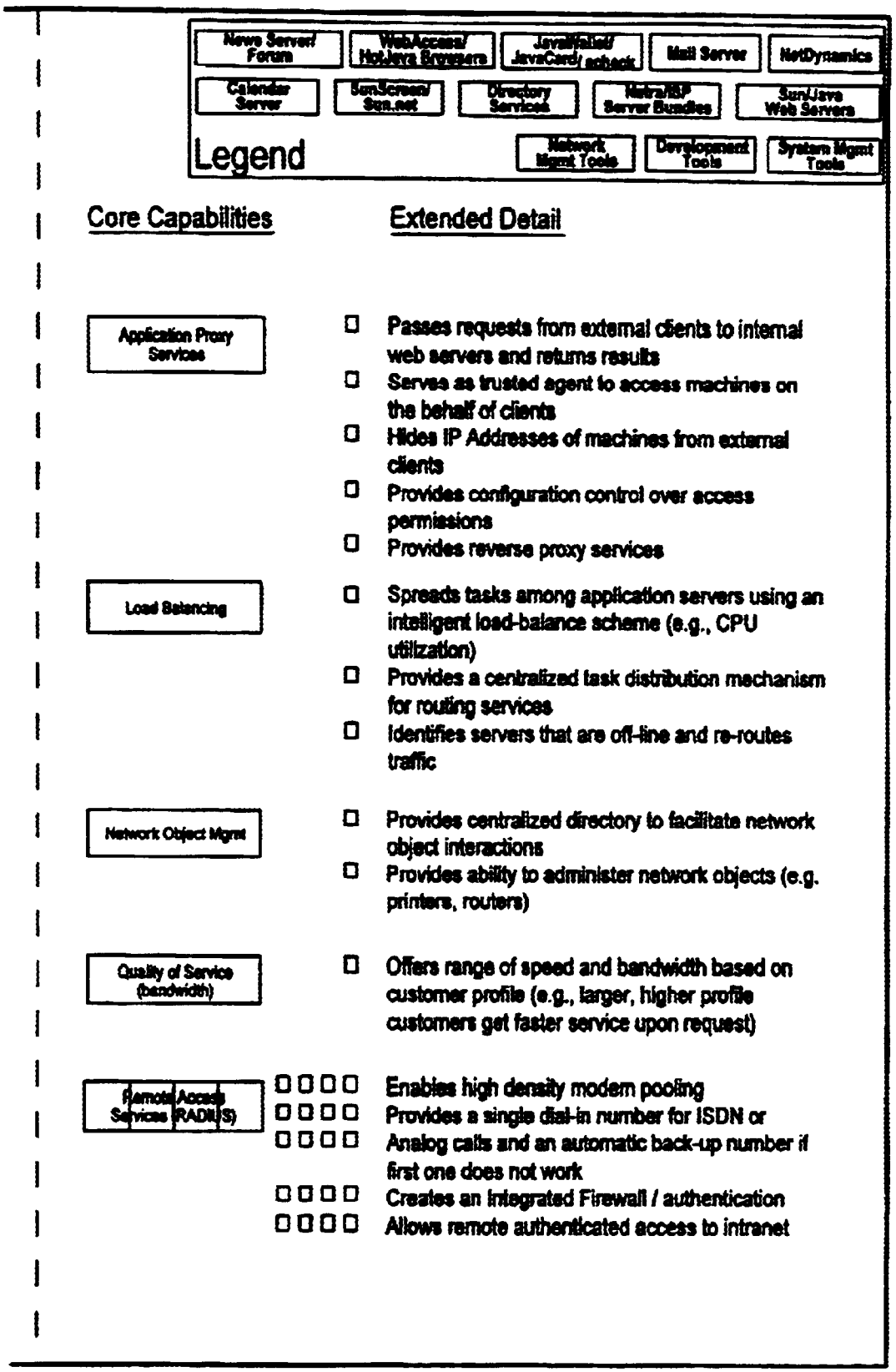
FIG 1Y-B

Client2 ECXpert

Client2 ECXpert

Client1 Personal WebAccess Browser

Solaris ISP Server Bundle

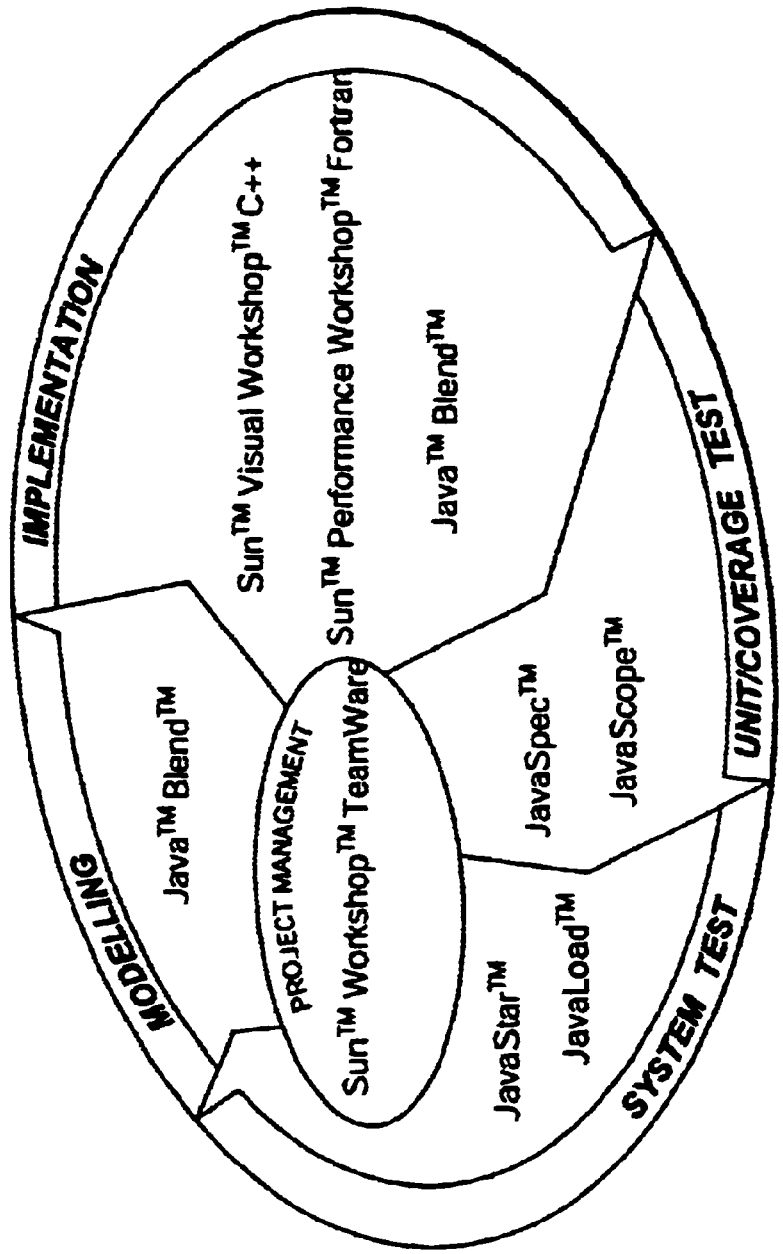

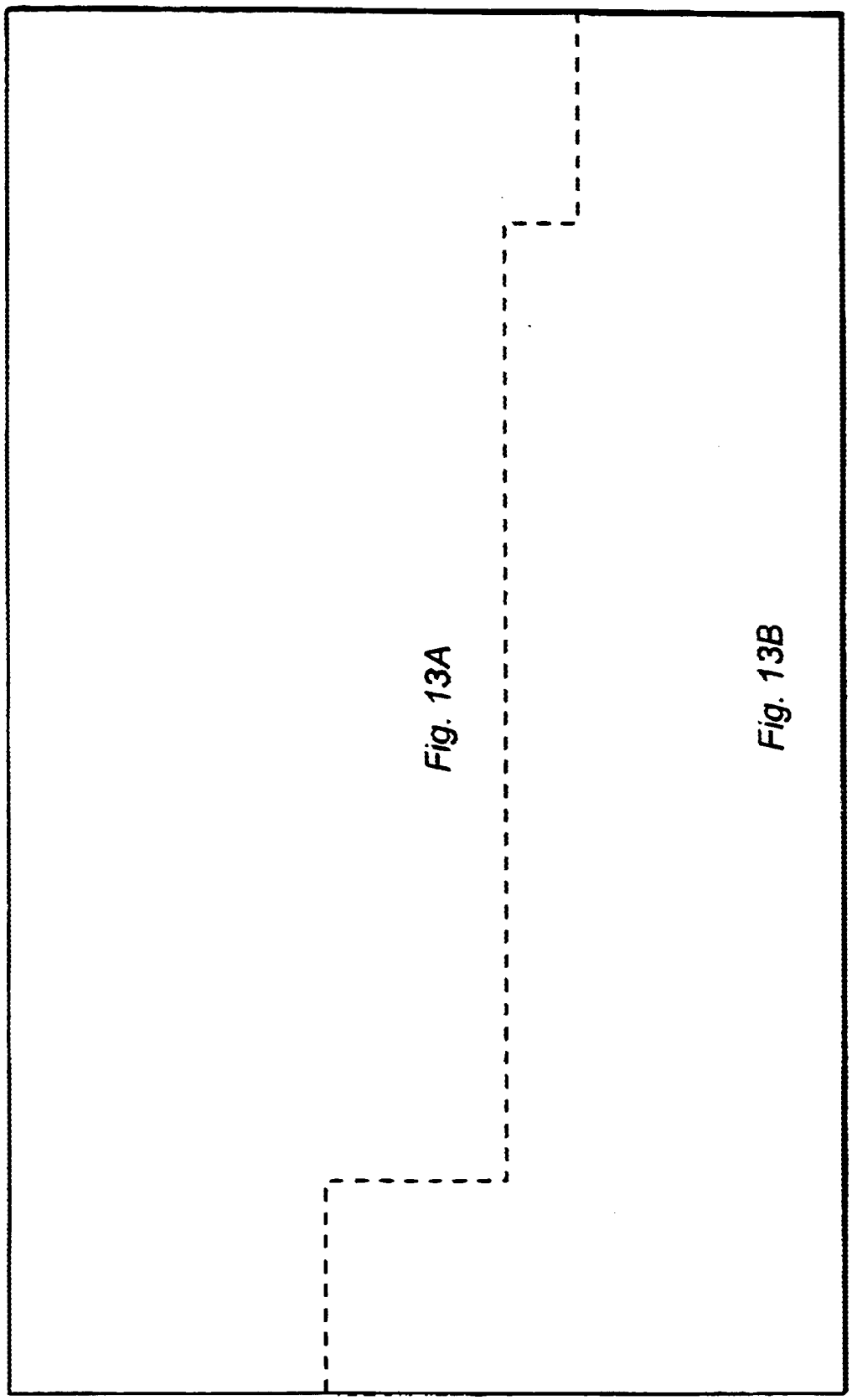

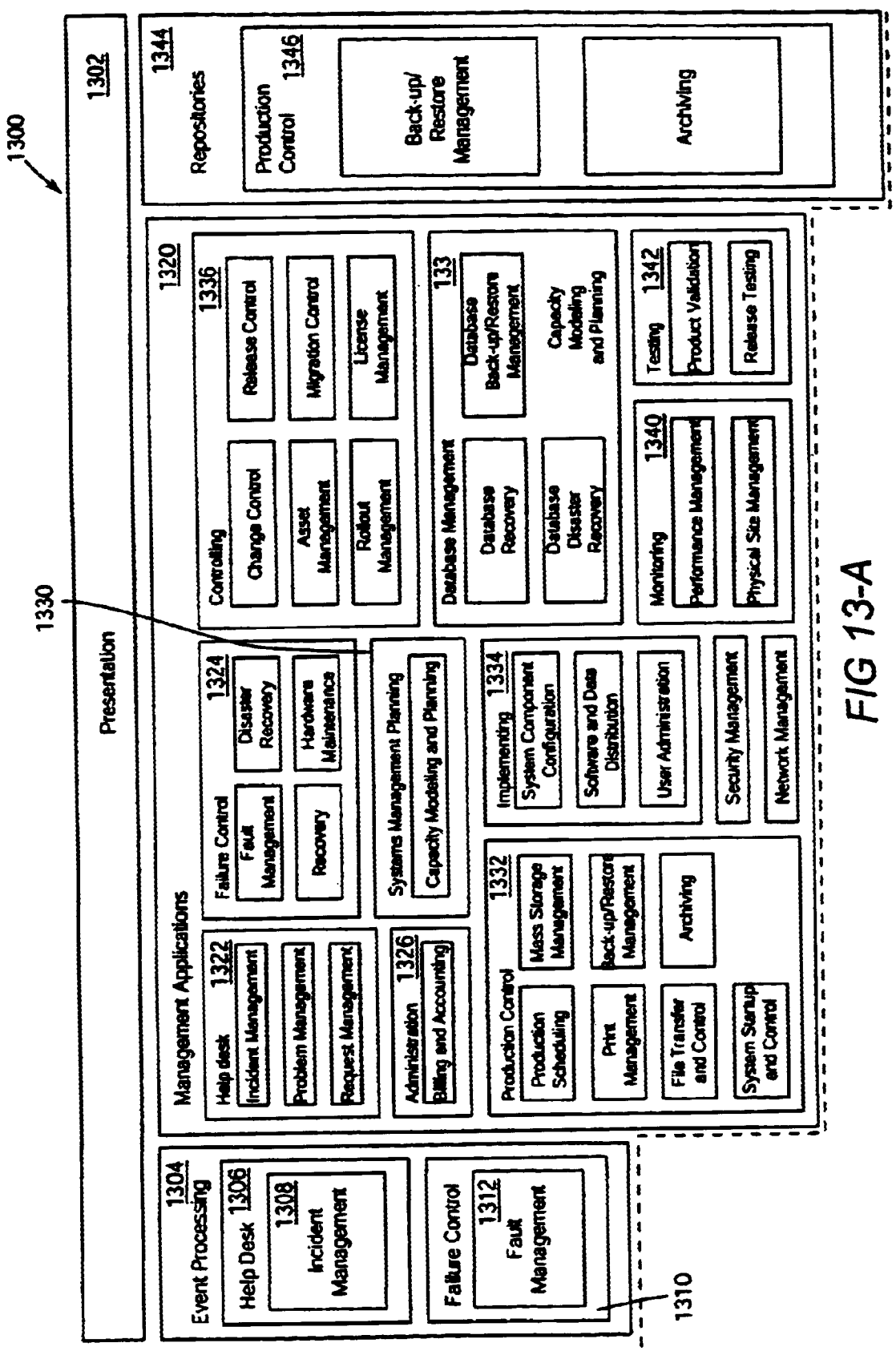
FIG 13-A

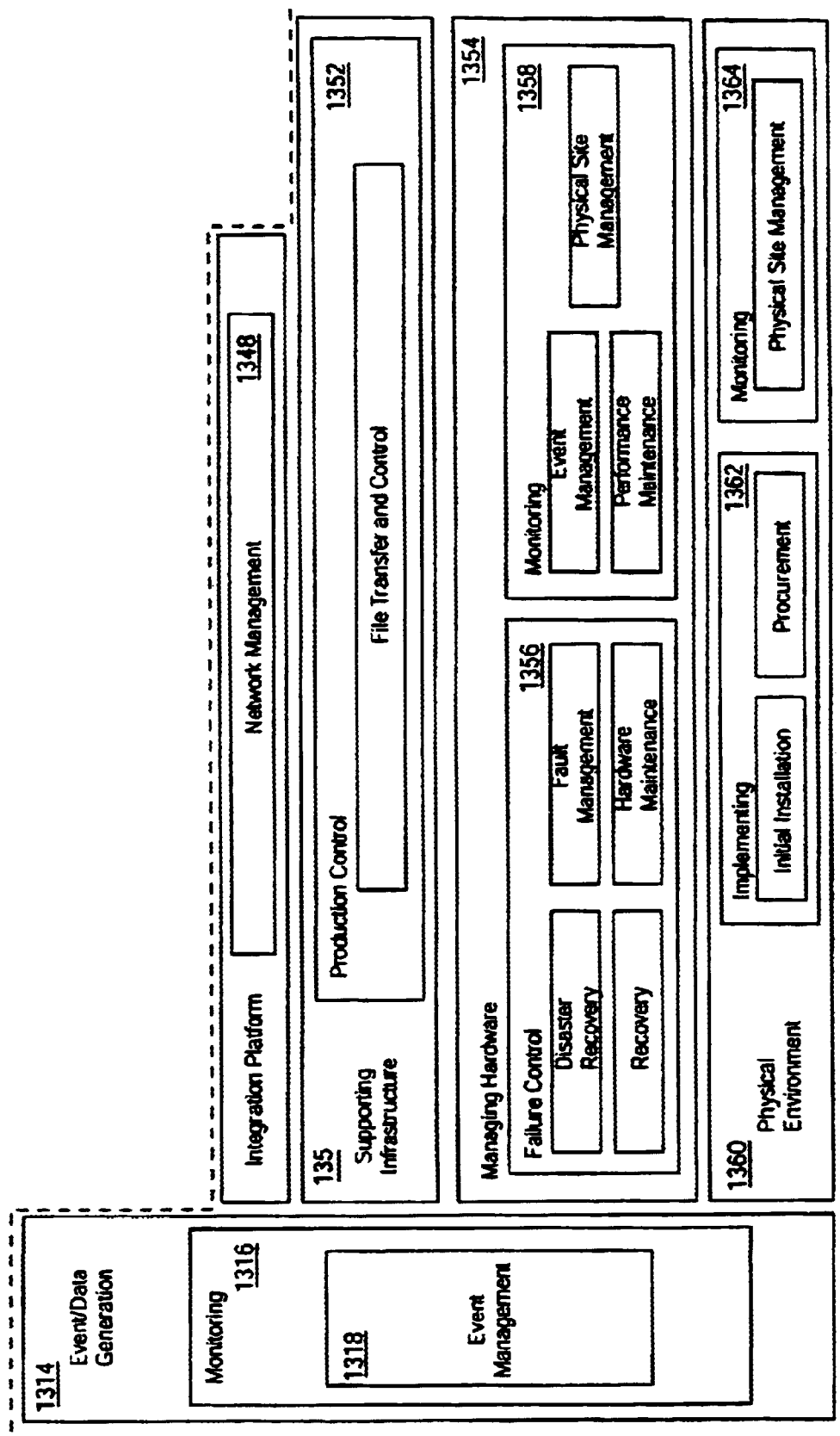
FIG 13-B

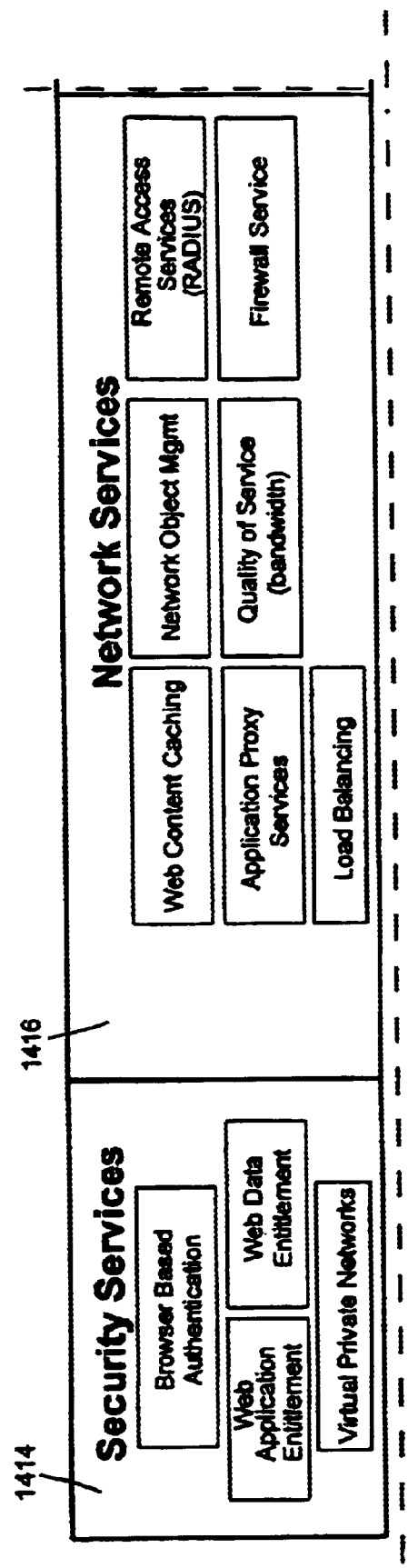
FIG 14-A

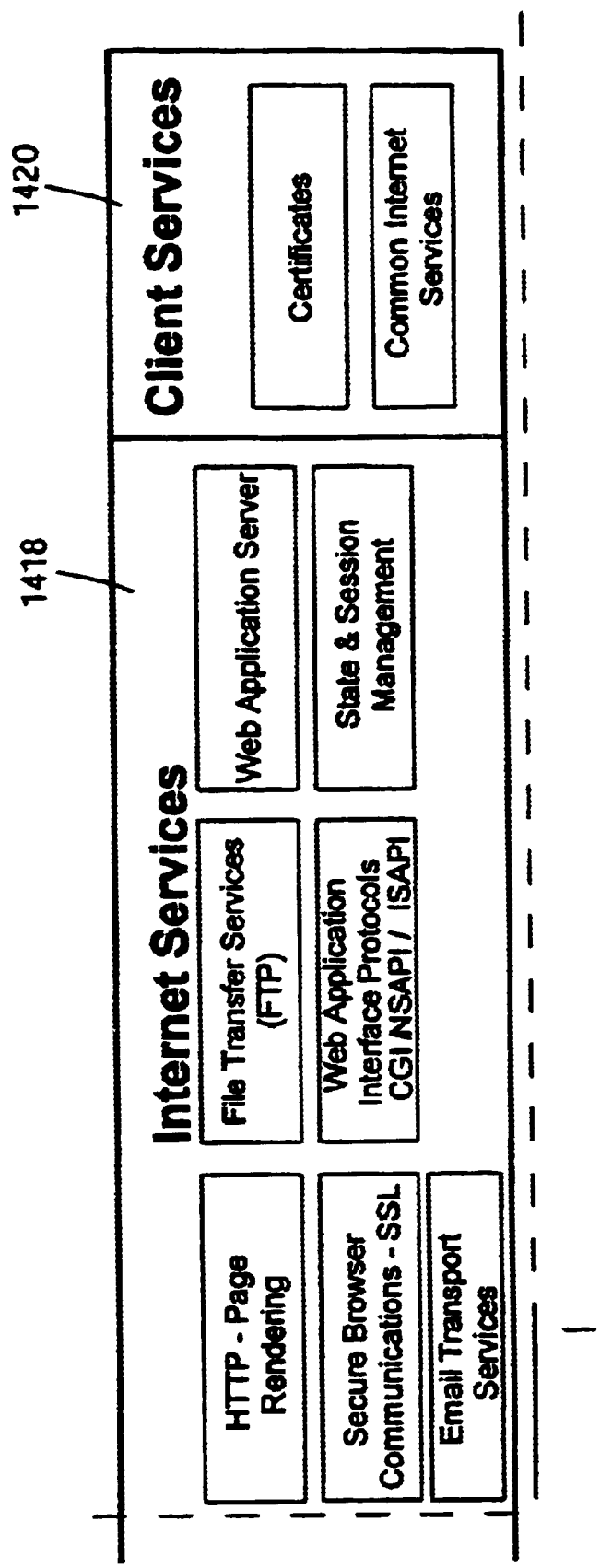
FIG 14-B

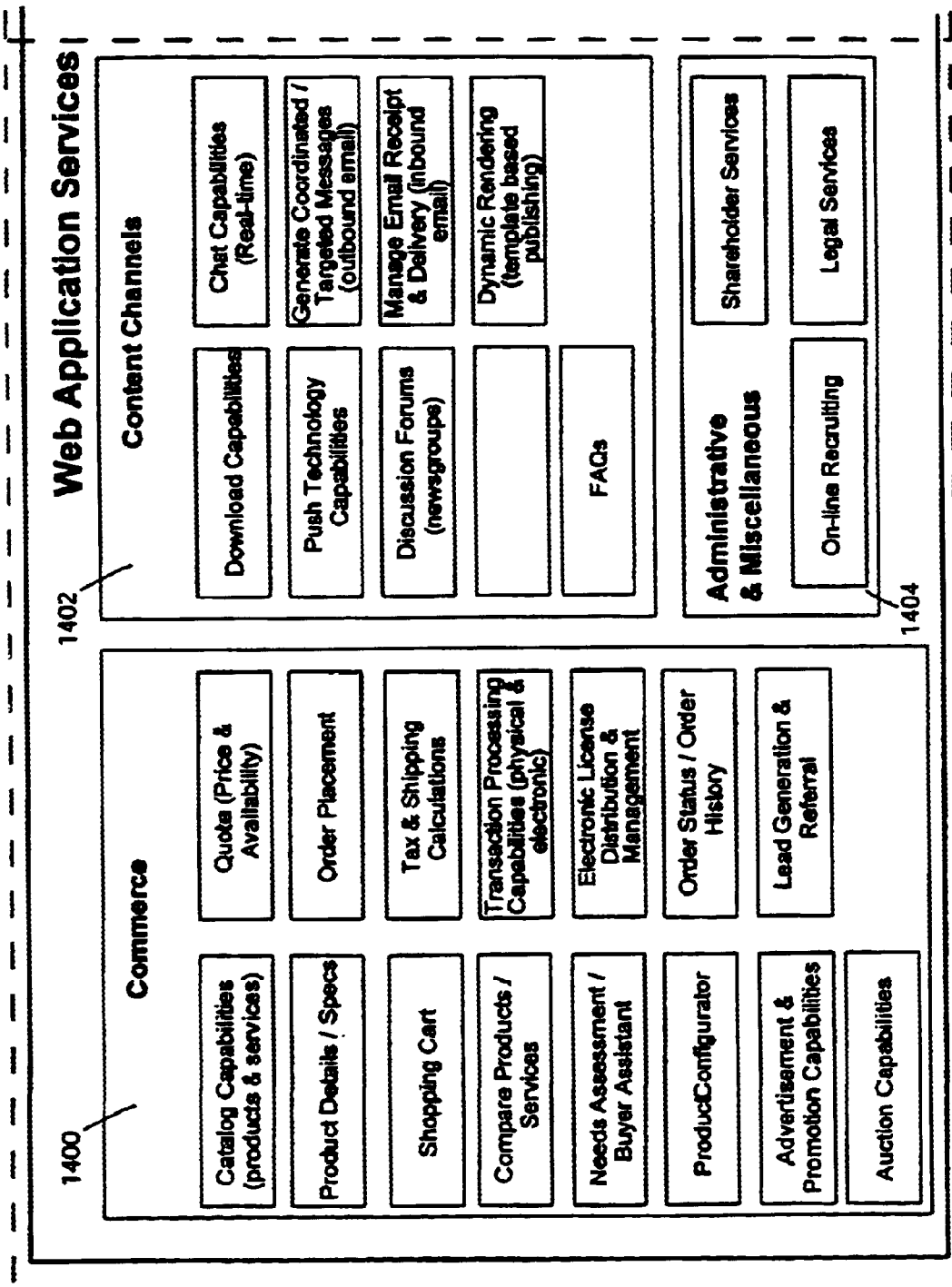
FIG 14-C

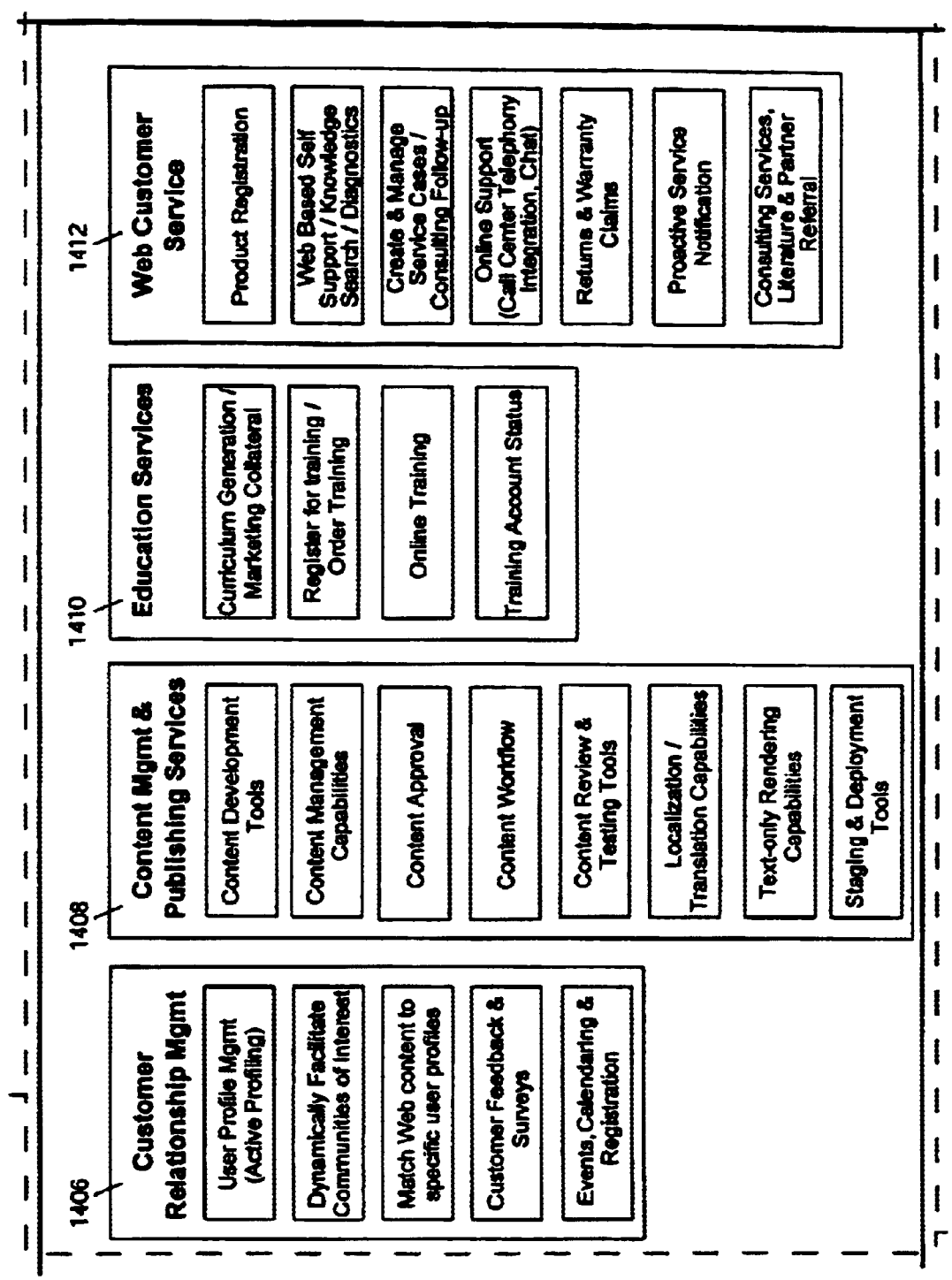
FIG 14-D

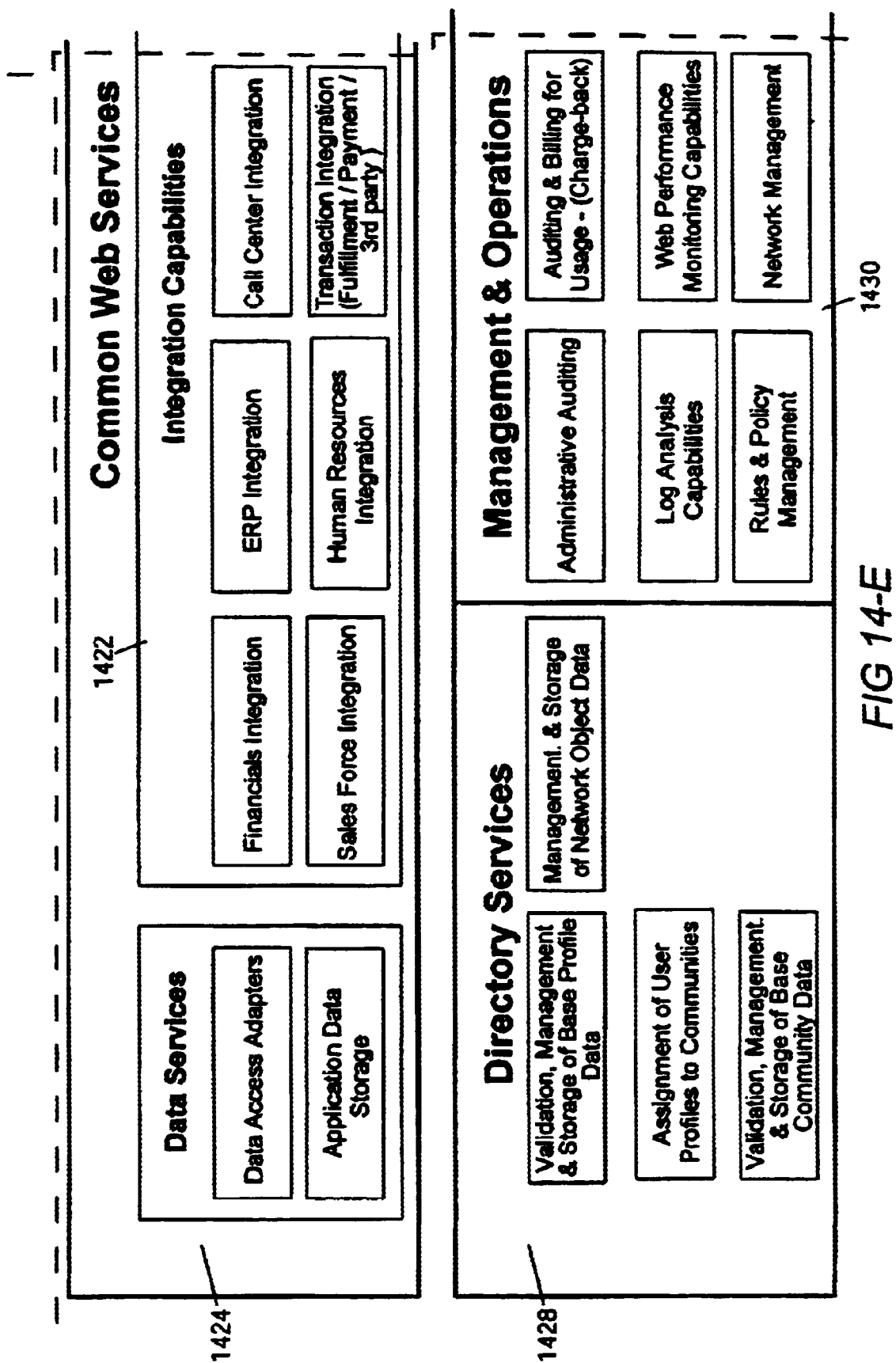
FIG 14-E

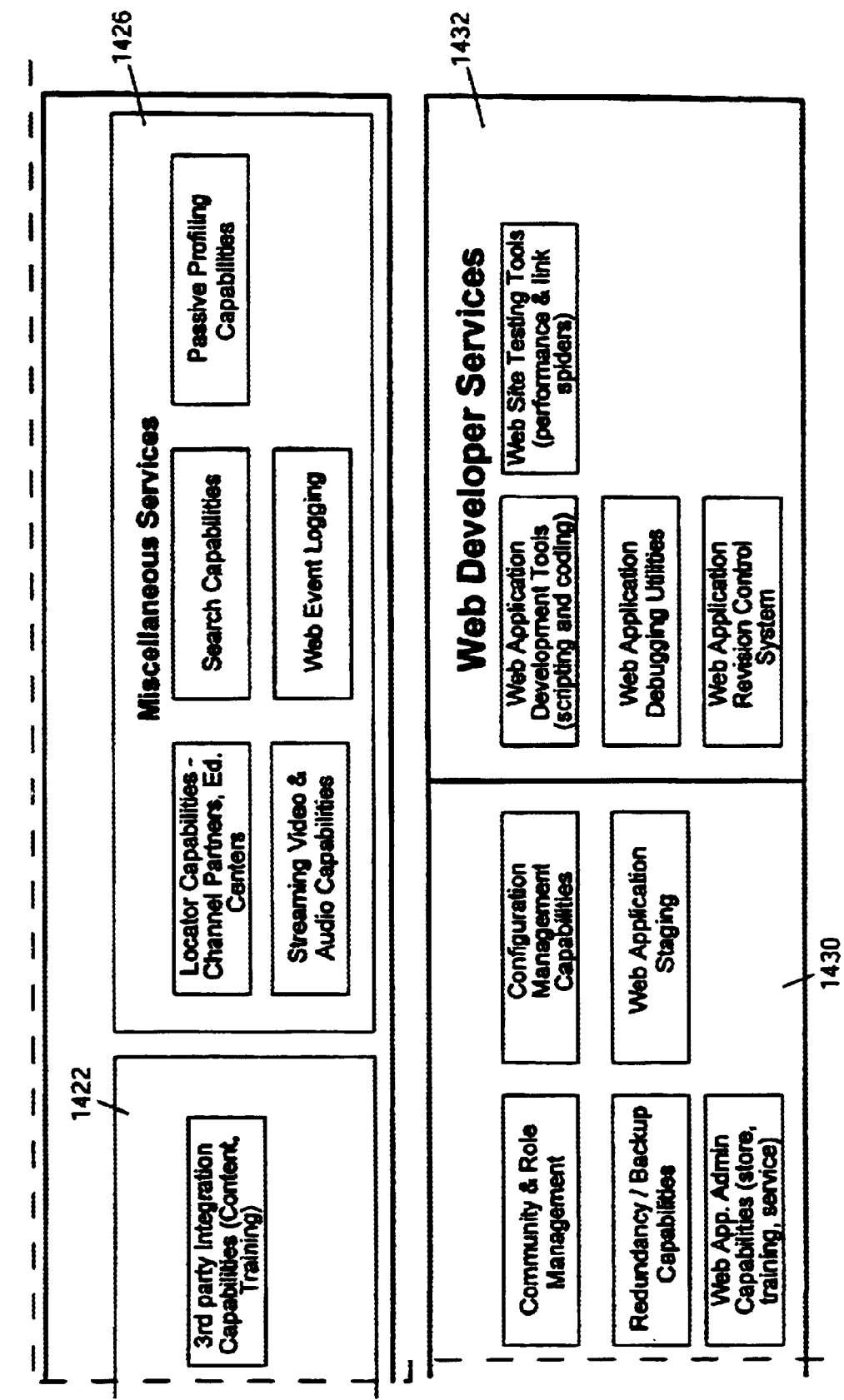
FIG 14-F

PRIORITIZING COMPONENTS OF A NETWORK FRAMEWORK REQUIRED FOR IMPLEMENTATION OF TECHNOLOGY

FIELD OF THE INVENTION

The present invention relates to conveying information regarding a web architecture framework and more particularly to demonstrating priority among components of a system that are required for implementation of technology.

BACKGROUND OF THE INVENTION

It is common in presentations and the like to present and convey information through graphic representations. These representations may take a variety of forms, such as alphanumeric characters, various sorts of graphs, as well as images of physical objects rendered on various mediums such as a computer display, paper product, transparency, etc. For example, various graphics such as line graphs, bar charts and pie charts have been quite popular in the presentation of business data such as sales, budgets and the like.

Typically, a person can absorb and manipulate information placed in a visual or graphical context much faster than if the same information is represented merely by alphanumeric text or conveyed verbally. The person is also much more likely to retain that information. However, a balance must be maintained between presenting information in a manner so as to be more likely to be retained by the viewer and keeping the graphic presentation simple enough to be easily and quickly comprehended.

Traditional graphs and charts, such as bar and pie charts, work well only for small amounts of information and are typically only useful for presenting statistical information. Attempting to produce such graphs and charts for large amounts of information leads to presenting the information in such small increments, such as bars (in a bar chart) or wedges (in a pie chart), as to lead to confusion, not to mention the greatly reduced chance that a viewer would retain the information presented.

Further, when similar types of information are being grouped together as a divisible unit, such as in the same bar or wedge of a chart, the confusion is compounded. Still further adding to the confusion would be the addition of indicia coding to selected information in the divisible unit, such as attempting to indicia code certain portions of a bar (in a bar chart) already having four components while ensuring that the individual components remain identifiable.

Nor do such charts and graphs do well in providing the overall picture of how the information is organized as a whole, such as how the divisible units (each formed of a variety of different types of information) are related to each other. Simply stating that two or more charts or portions of charts are related may not be enough to enable a viewer to comprehend the interrelationship of the information presented.

There is thus the need for a way to create and display information in a graphic representation that presents the information concisely and in a well organized manner in order to reduce the likelihood of confusion and maximize retention in a viewer and further to increase the viewer's understanding of the organization and interrelation of the various pieces of information with each other. There is further a particular need for such a system in the art of conveying information regarding network frameworks such as a web architecture framework.

SUMMARY OF THE INVENTION

A system and method are provided for prioritizing components of an existing network framework. First, a plurality of components required for implementation of a predetermined technology using an existing network framework are provided. Next, a priority listing of the components is complied such that the relative position of the components on the priority listing corresponds to a temporal priority among the components. The existing network framework and the components are pictorially represented. Next, a first component of the existing network framework is indicia coded in order to indicate that the first component must be installed first based on the component's position on the priority listing. Thereafter, a second component and any remaining components of the existing network framework is indicia encoded in order to indicate that the second component and any remaining components must be installed after the first component based on the second component's position on the priority listing.

In one aspect of the present invention, the present invention may be used to convey information regarding components of the existing network framework such as security services, network services, web services, client services, integration capabilities, data services, directory services, management services, operation services, or developer services. In the alternative, the components of the existing network framework may include commerce-related services, content-related services, administration-related services, customer-related services, or education-related services.

In another aspect of the present invention, the indicia coding may be selected from the group of indicia coding including texture coding, color coding, and shading coding. As an option, a legend may be presented which defines the indicia coding with respect to the priority of the components required in the implementation of the predetermined technology.

BRIEF DESCRIPTION OF DRAWINGS

The invention will be better understood when consideration is given to the following detailed description thereof. Such description makes reference to the annexed drawings wherein:

FIG. 1B-1 is a flowchart providing more detail of the method for identifying redundancies and omissions among components of a web based architecture in accordance with one embodiment of the present invention;

FIG. 1C-1 is a flowchart providing more detail of the method of conveying which components of a system are required for implementation of technology in accordance with one embodiment of the present invention;

FIG. 1D-1 is a flowchart providing more detail of the method of prioritizing components of a system that are required for implementation of technology in accordance with one embodiment of the present invention;

FIG. 1E-1 is a flowchart providing more detail of the method of indicia coding system components to be delivered in different phases in accordance with one embodiment of the present invention;

FIG. 1F-1 is a flowchart providing more detail of the method of comparatively analyzing network entities in accordance with one embodiment of the present invention;

FIG. 1G-1 is a flowchart providing more detail of the method for selling products in accordance with one embodiment of the present invention;

FIG. 1H-1 is a flowchart providing more detail of the method of identifying various components of a system for building, management, and support purposes in accordance with one embodiment of the present invention;

FIG. 1I-1 is a flowchart providing more detail of the method for mapping products or services in a network framework in accordance with one embodiment of the present invention;

FIG. 1K-1 is a flowchart providing more detail of the method for planning the testing of network components in accordance with one embodiment of the present invention;

FIG. 1L is an illustration of one implementation of operations 10 and 24 of FIG. 1A;

FIG. 1L-1 is an illustration of one implementation of operations 10 and 24 of FIG. 1A;

FIG. 1Q is an illustration of one implementation of operation 22 of FIG. 1A;

FIG. 1AA is an illustration of an architecture diagram for one implementation of operation 28 of FIG. 1A;

FIG. 1AB is an illustration of an architecture diagram for one implementation of operation 28 of FIG. 1A;

FIG. 1AC is an illustration of an architecture diagram for one implementation of operation 28 of FIG. 1A;

FIG. 1AD is an illustration of an architecture diagram for one implementation of operation 28 of FIG. 1A;

FIG. 1AE is an illustration of an architecture diagram for one implementation of operation 28 of FIG. 1A;

FIG. 1AF is an illustration of an architecture diagram for one implementation of operation 28 of FIG. 1A;

FIG. 1AG is an illustration of an architecture diagram for one implementation of operation 28 of FIG. 1A;

FIG. 1AH is an illustration of an architecture diagram for one implementation of operation 28 of FIG. 1A;

FIG. 1AI is an illustration of an architecture diagram for one implementation of operation 28 of FIG. 1A;

FIG. 1AJ is an illustration of an architecture diagram for one implementation of operation 28 of FIG. 1A;

FIG. 1AK is an illustration of an architecture diagram for one implementation of operation 28 of FIG. 1A;

FIG. 1AL is an illustration of an architecture diagram for one implementation of operation 28 of FIG. 1A;

FIG. 1AM is an illustration of an architecture diagram for one implementation of operation 28 of FIG. 1A;

FIG. 1AN is an illustration of an architecture diagram for one implementation of operation 28 of FIG. 1A;

FIG. 1AO is an illustration of an architecture diagram for one implementation of operation 28 of FIG. 1A;

FIG. 13 is an illustration showing an Operational Architecture Framework in accordance with one embodiment of the present invention;

DISCLOSURE OF INVENTION

The present invention includes a system, method, and article of manufacture for providing a web architecture framework and further a system, method, and article of manufacture for conveying various aspects of such web architecture framework. This may be done for presentation purposes or with any other objective in mind. For example, the present invention may be employed in optimally conveying to a client or customer information relating to a specific web architecture framework in order to make a point or for sales purposes. In the present description, the details of the presentation aspects will first be set forth after which details relating to a specific web architecture framework of the present invention will be described.

Figure 1A:
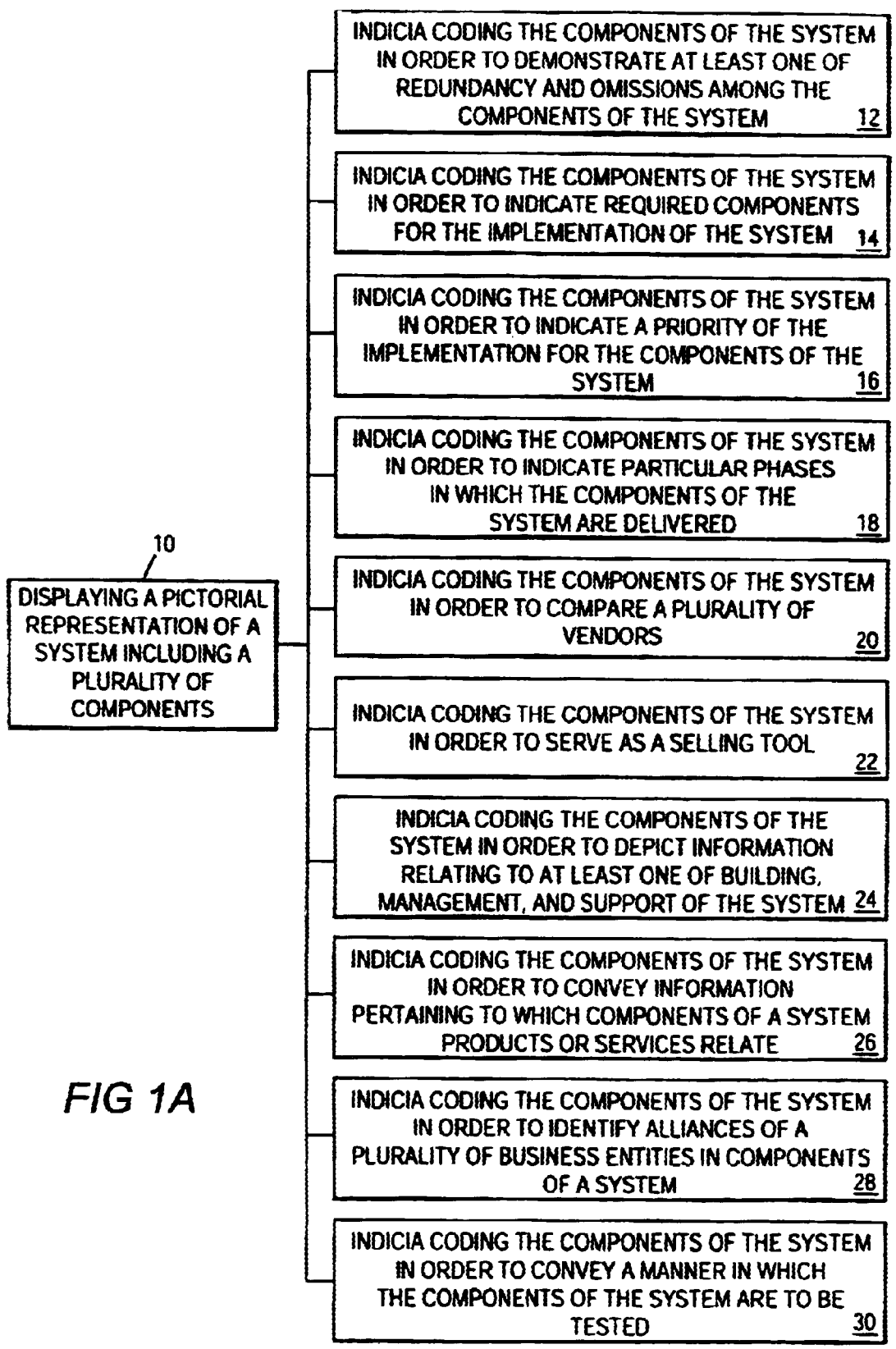
FIG. 1A is a flow chart depicting multiple coding methods for conveying various information relating to a system such as web architecture framework.

As shown in FIG. 1A, the presentation method of the present invention first includes displaying a pictorial representation of a system, i.e. web architecture framework, including a plurality of components. Note operation 10. Next, in operations 12–30, the pictorial representation is indicia coded in order to demonstrate any one or more of various aspects of the system. Such indicia coding may take the form of color coding, texture coding, shading coding, or any other coding which is capable of conveying the desired information.

It should be noted that the pictorial representation and indicia coding may be displayed in any manner that conveys the desired information. For example, the pictorial representation may take the form of a transparency with an outline of the various components of the system. Further, the indicia coding may take the form of an overlay removably situated on the transparency such that, together, the transparency and the overlay depict the indicia coding and the pictorial representation in combination. In the alternative, the transparency and overlay may comprise a single unitary display device. Further, such device may take the form of a slide, full size transparency, or any other device that conveys the desired information. In still yet another embodiment, the pictorial representation and indicia coding may be displayed via a computer with any desired presentation software. An example of such pictorial representation will be set forth hereinafter in greater detail.

Figure 1B:
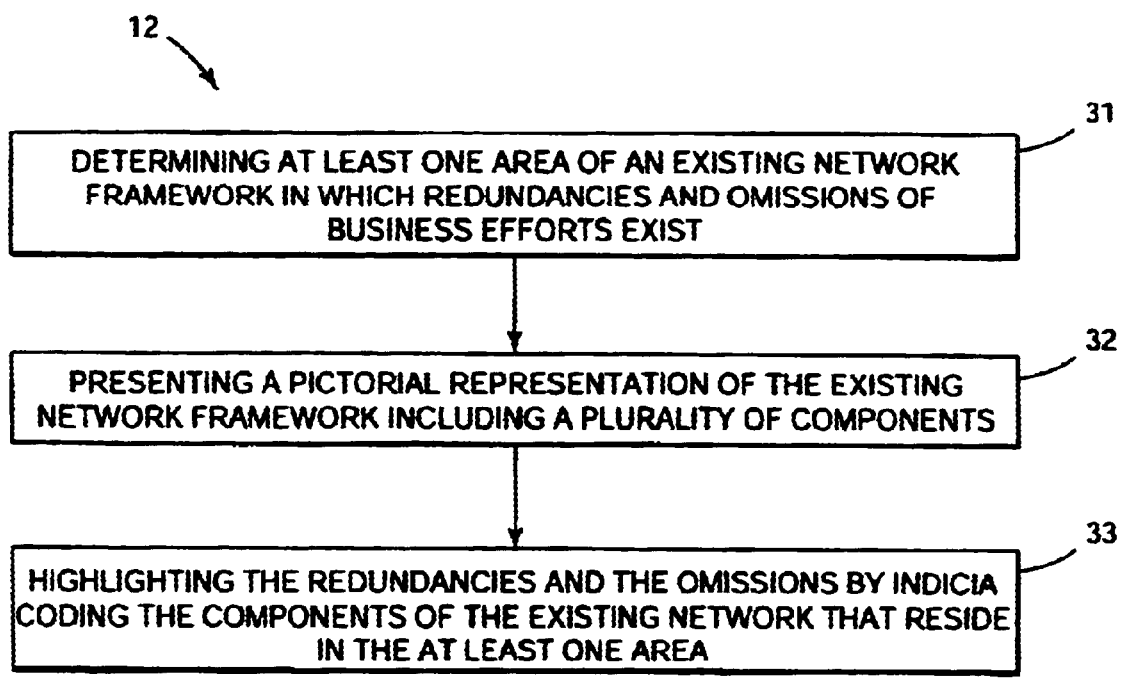
FIG. 1B is a flowchart illustrating the method for identifying redundancies and omissions among components of a web based architecture in accordance with one embodiment of the present invention.
Figures 1, 1B:
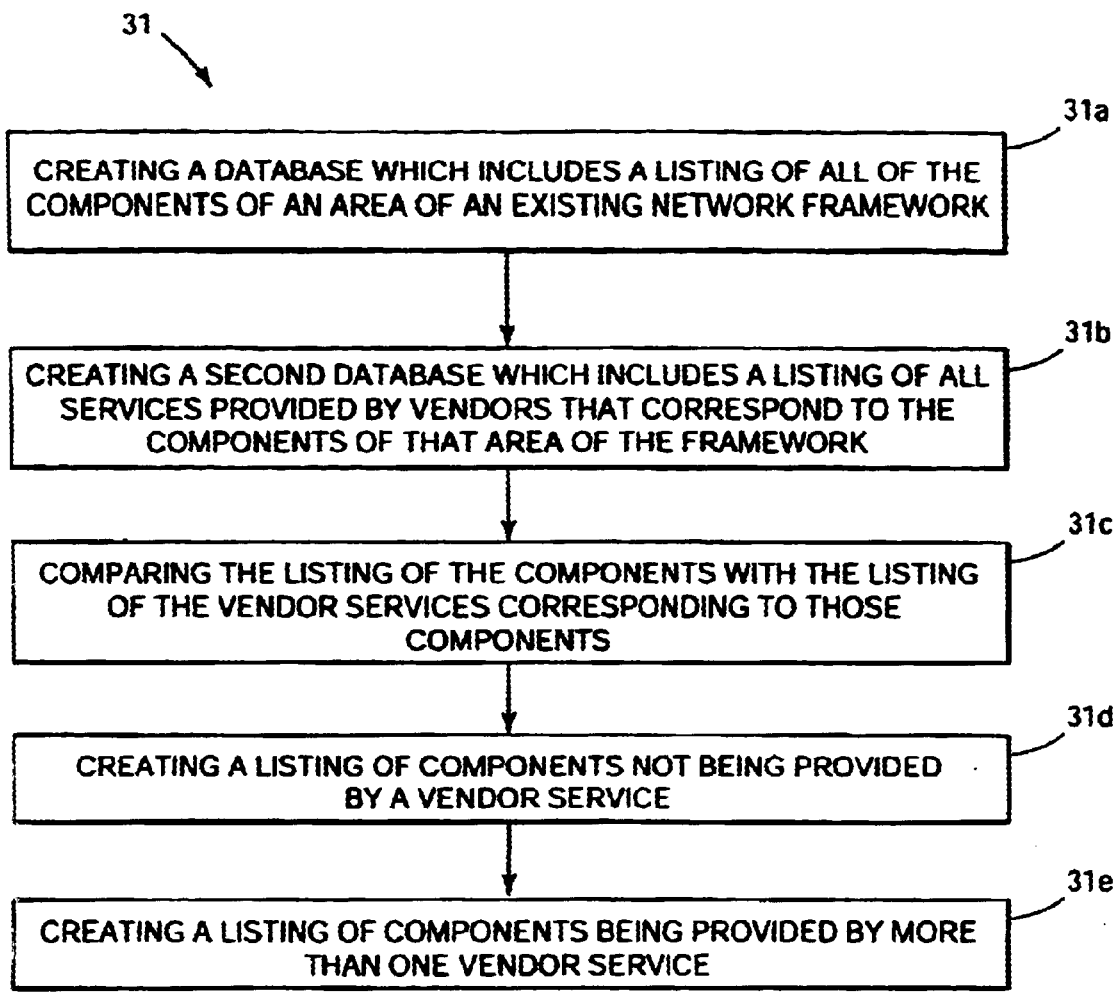
Figure 1C:
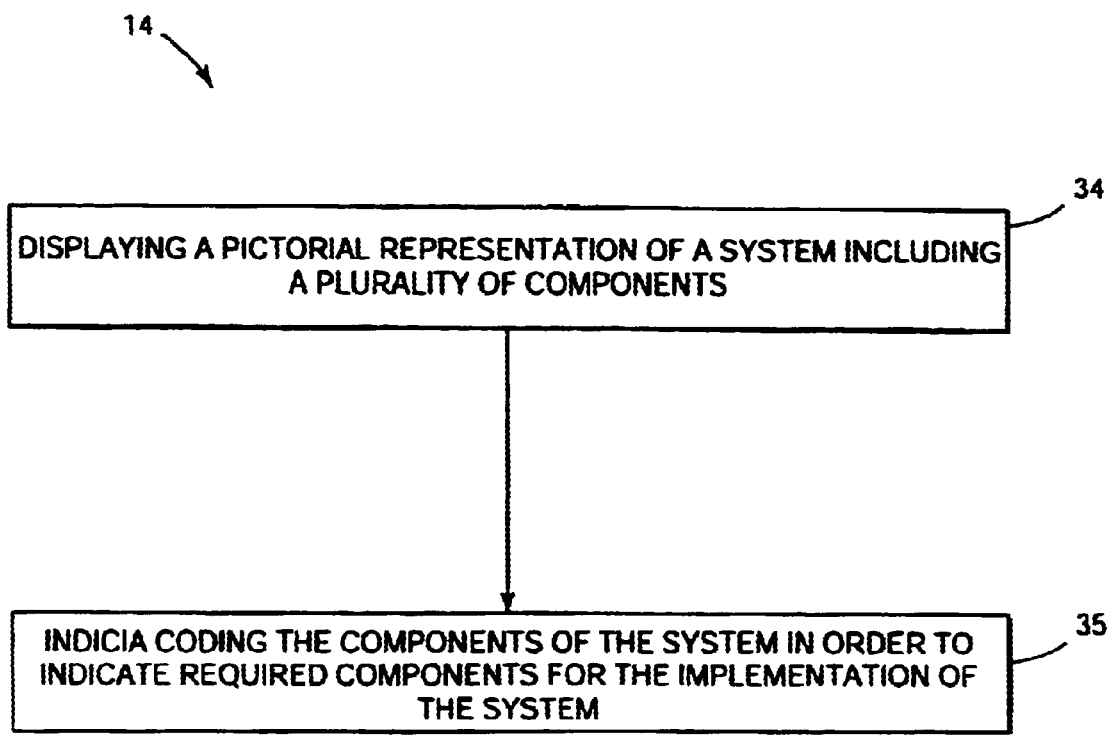
FIG. 1C is a flowchart illustrating the method of conveying which components of a system are required for implementation of technology in accordance with one embodiment of the present invention.
Figures 1, 1C:
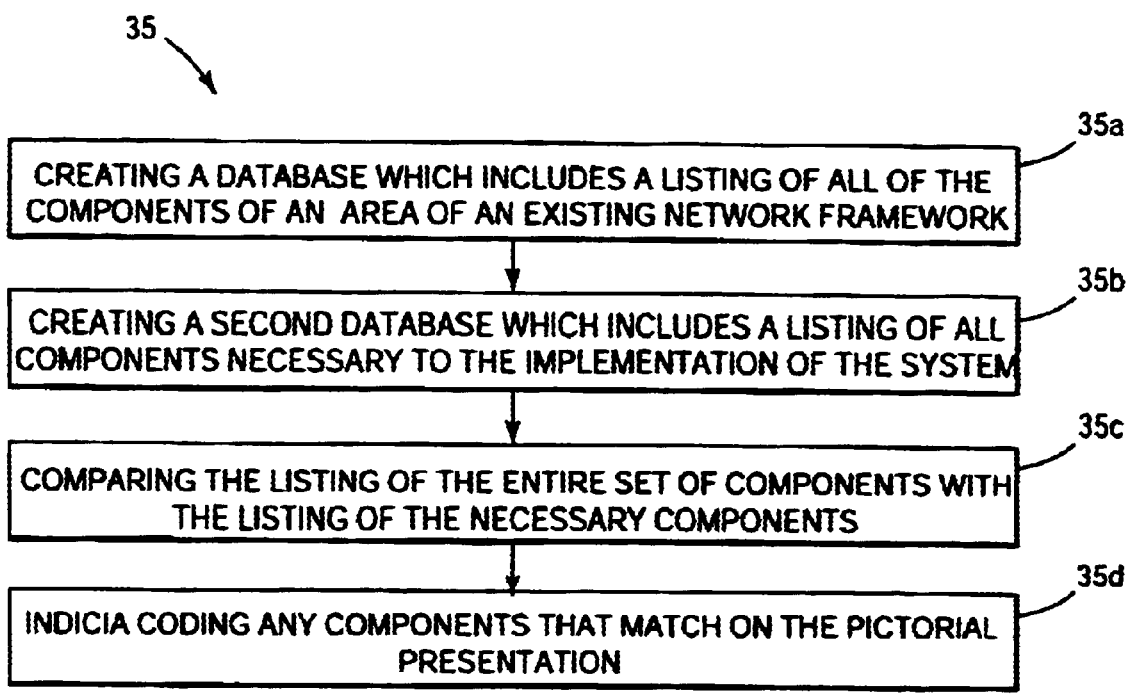
Figure 1D:
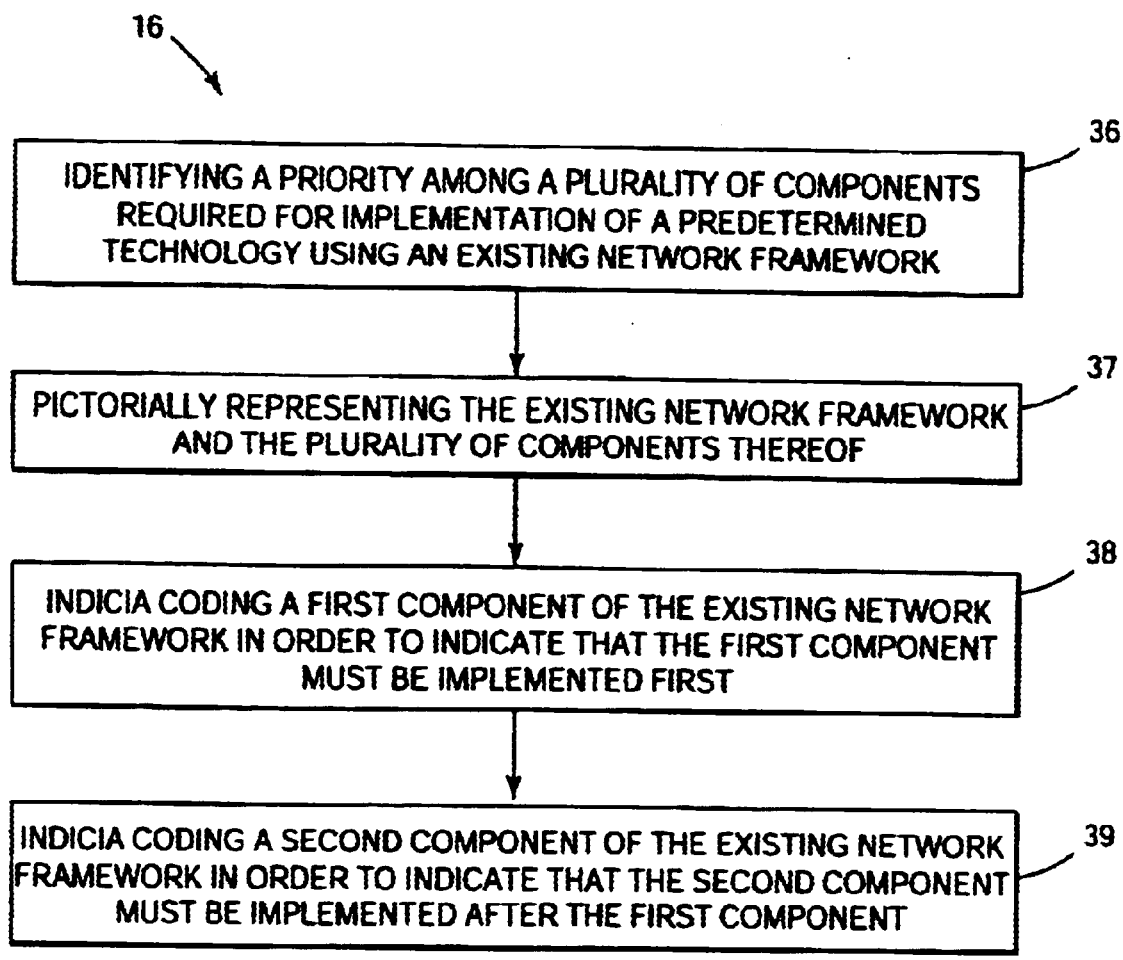
FIG. 1D is a flowchart illustrating the method of prioritizing components of a system that are required for implementation of technology in accordance with one embodiment of the present invention.
Figures 1, 1D:
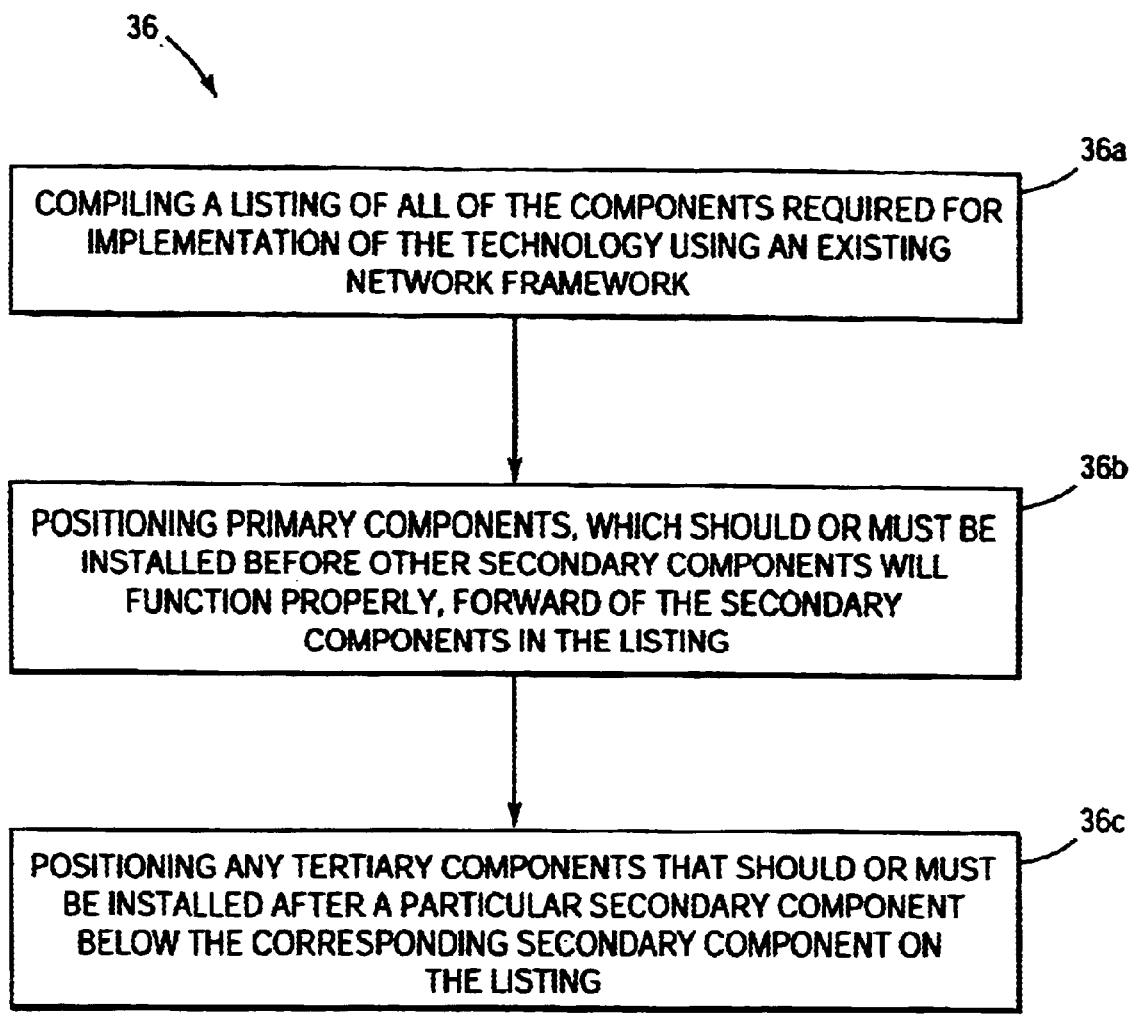
Figure 1E:
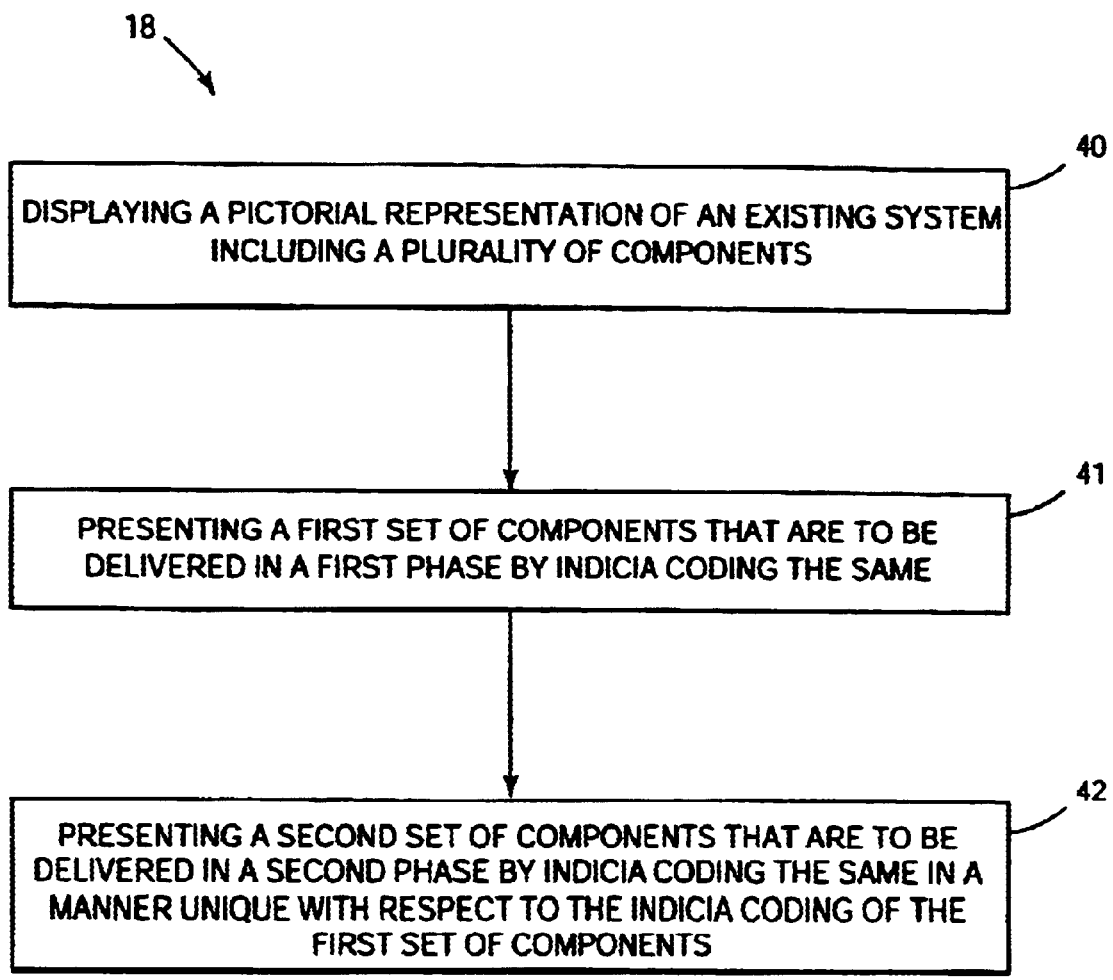
FIG. 1E is a flowchart illustrating the method of indicia coding system components to be delivered in different phases in accordance with one embodiment of the present invention.
Figures 1, 1E:
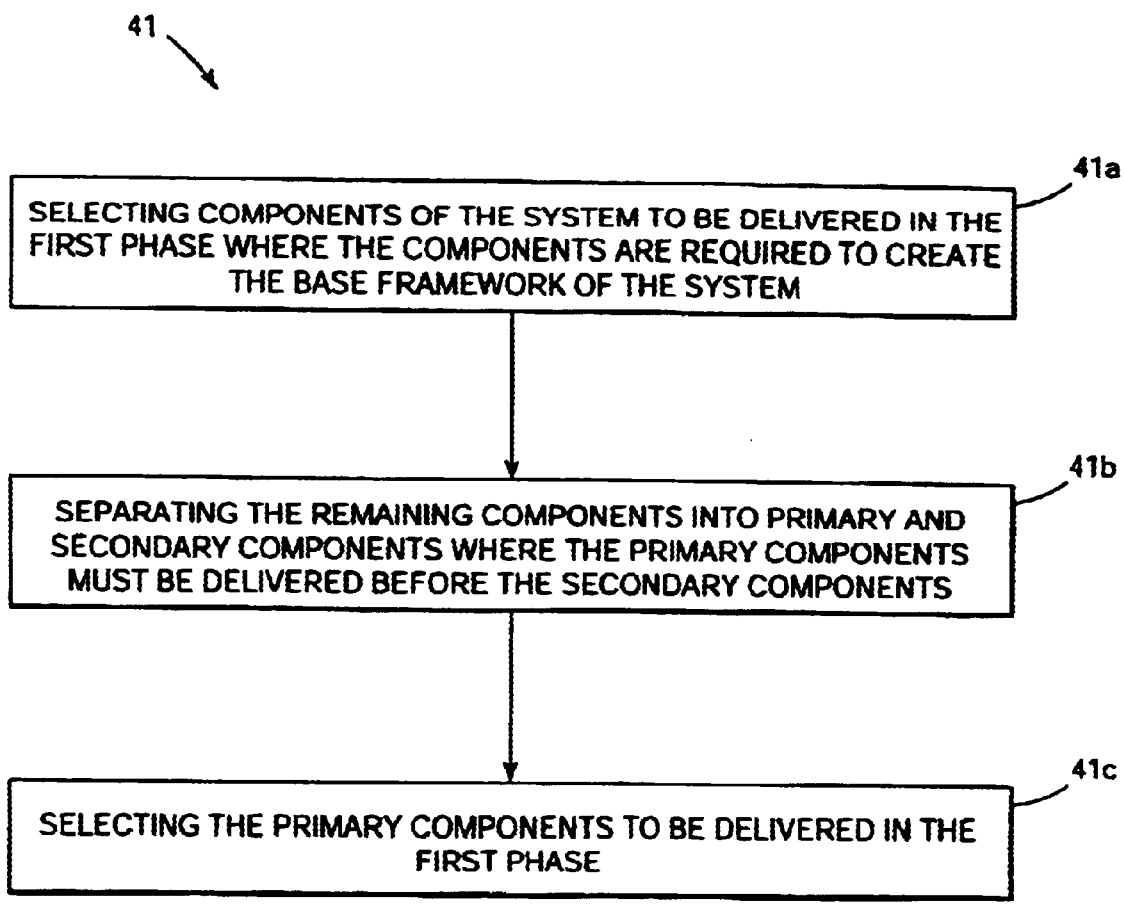
Figure 1F:
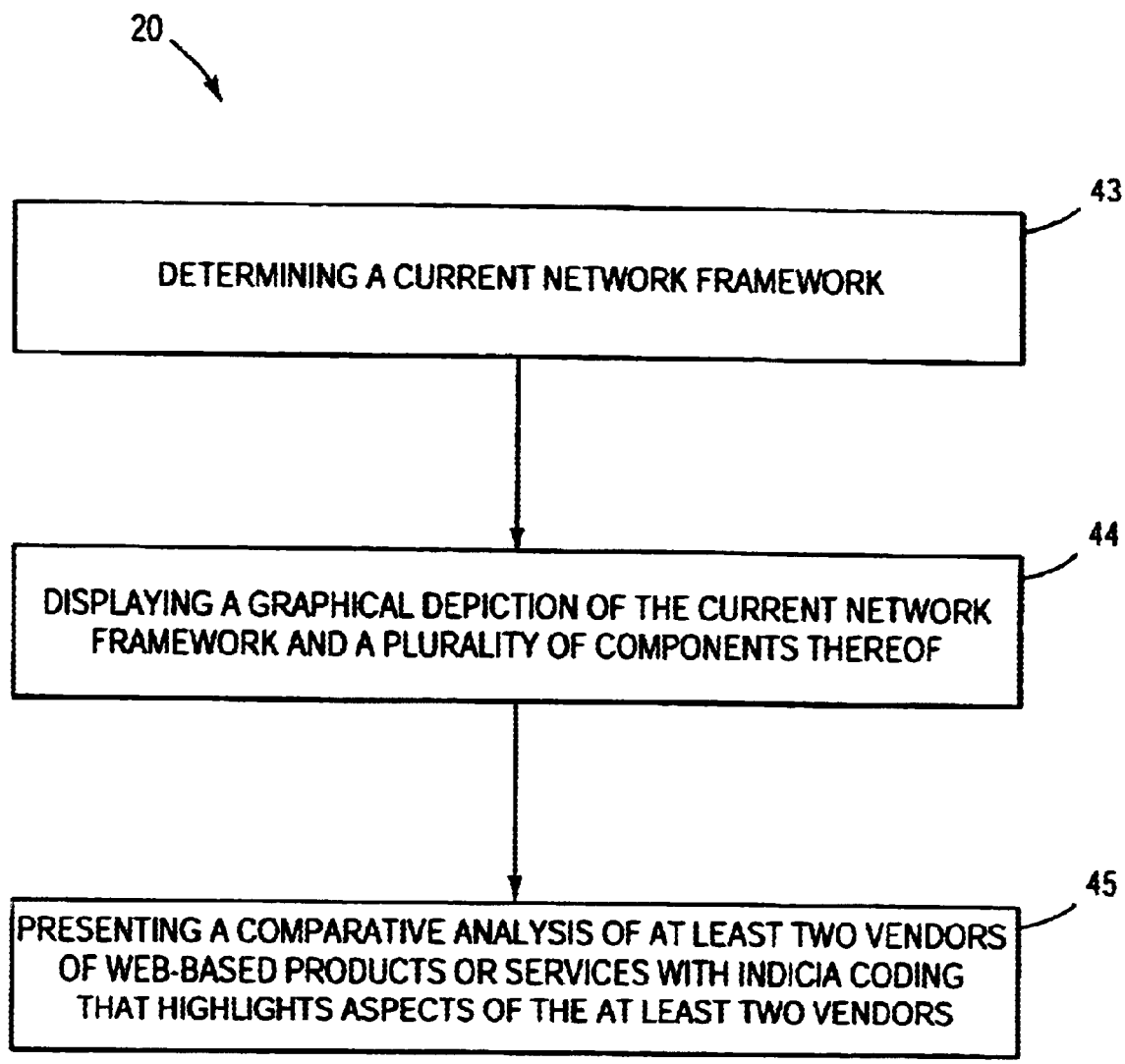
FIG. 1F is a flowchart illustrating the method of comparatively analyzing network entities in accordance with one embodiment of the present invention.
Figures 1, 1F:
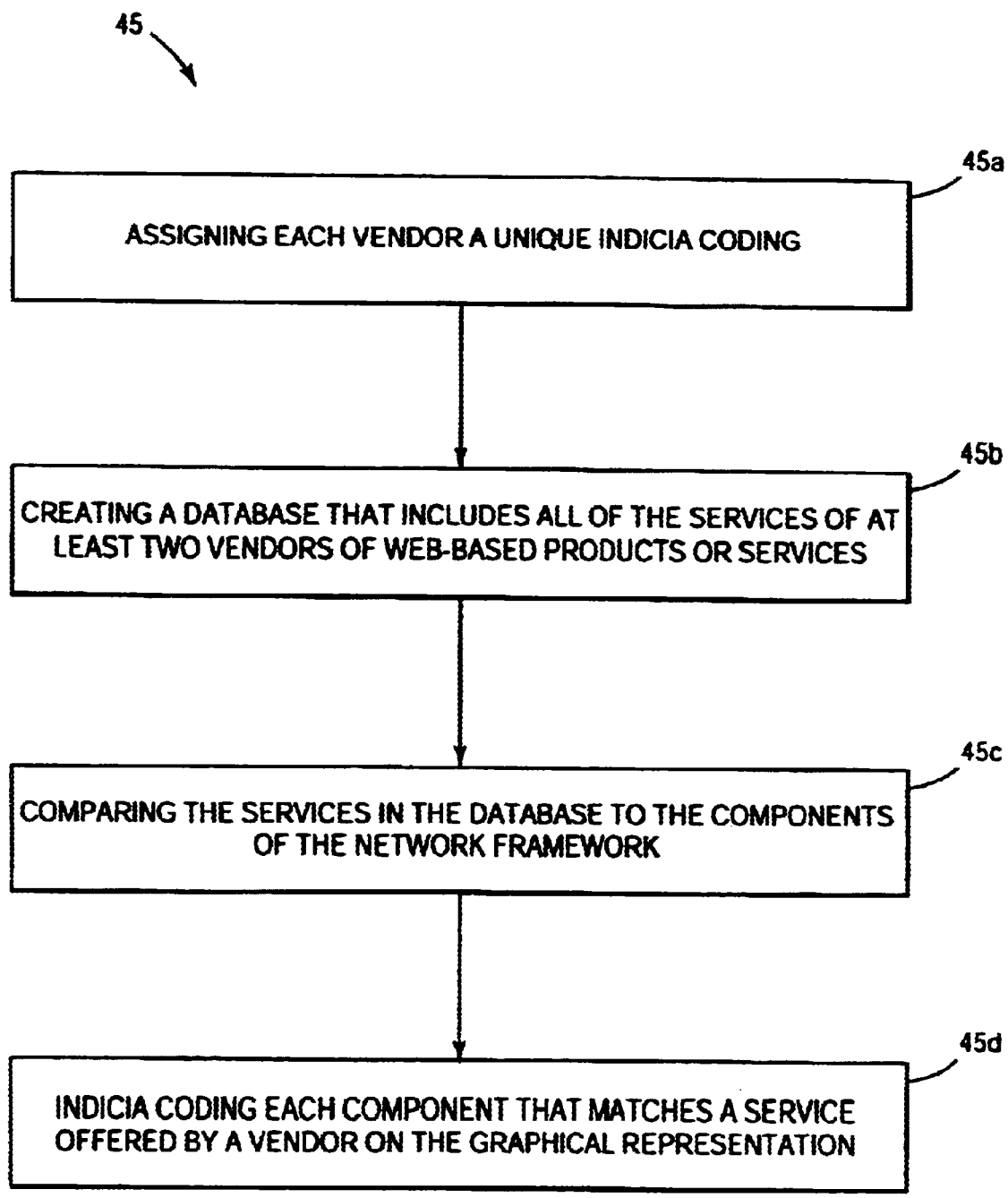
Figure 1G:
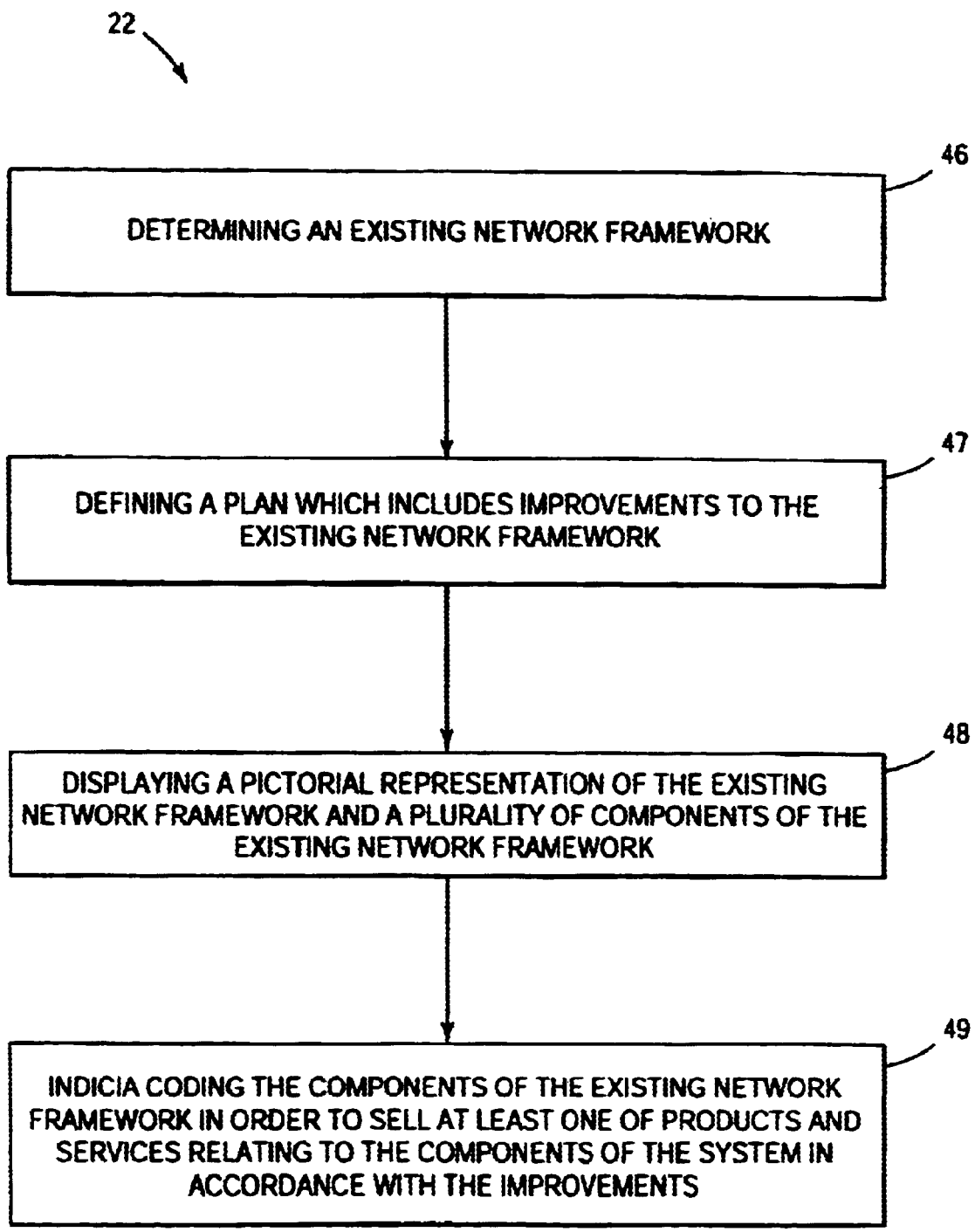
FIG. 1G is a flowchart illustrating the method for selling products in accordance with one embodiment of the present invention.
Figures 1, 1G:
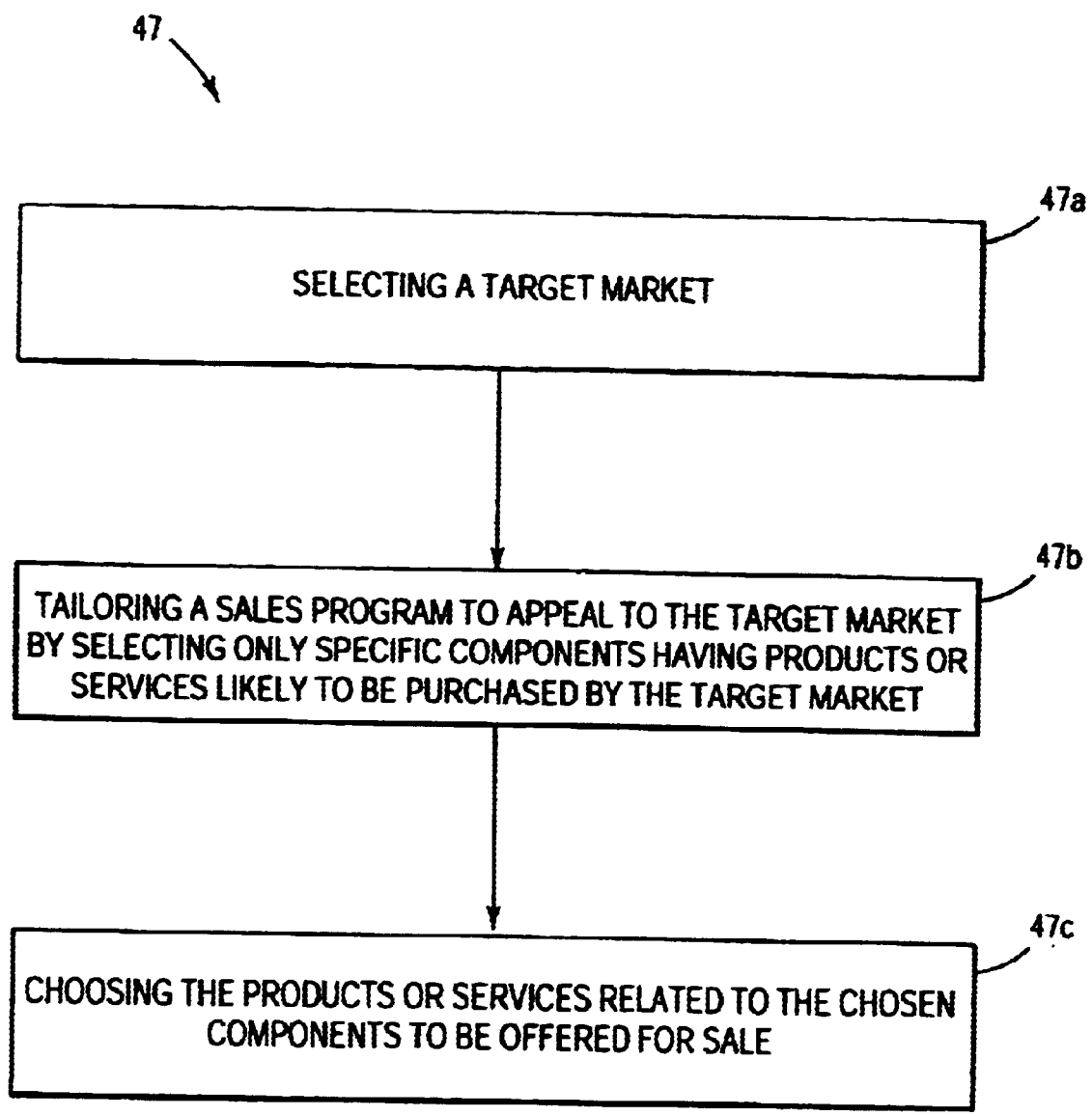
Figure 1H:
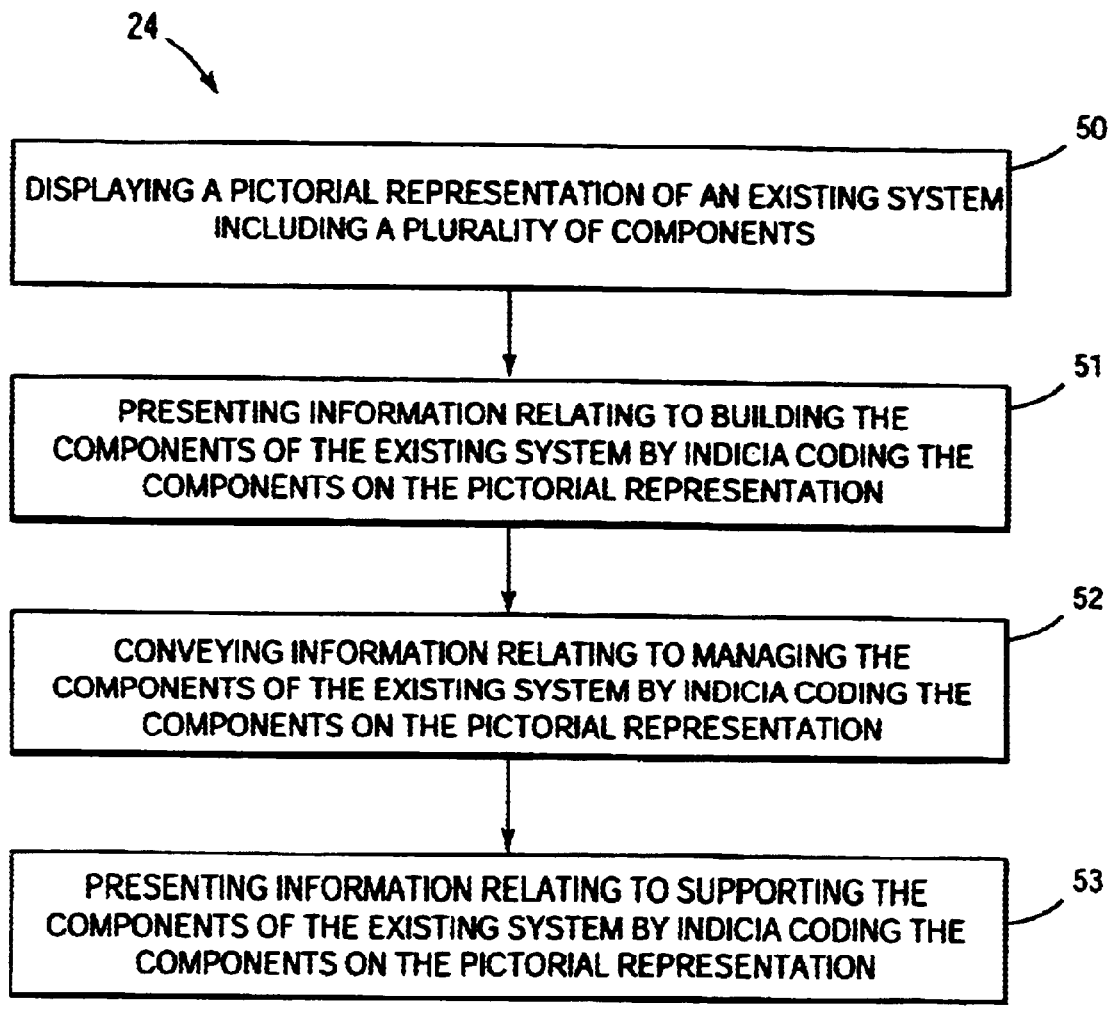
FIG. 1H is a flowchart illustrating the method of identifying various components of a system for building, management, and support purposes in accordance with one embodiment of the present invention.
Figures 1, 1H:
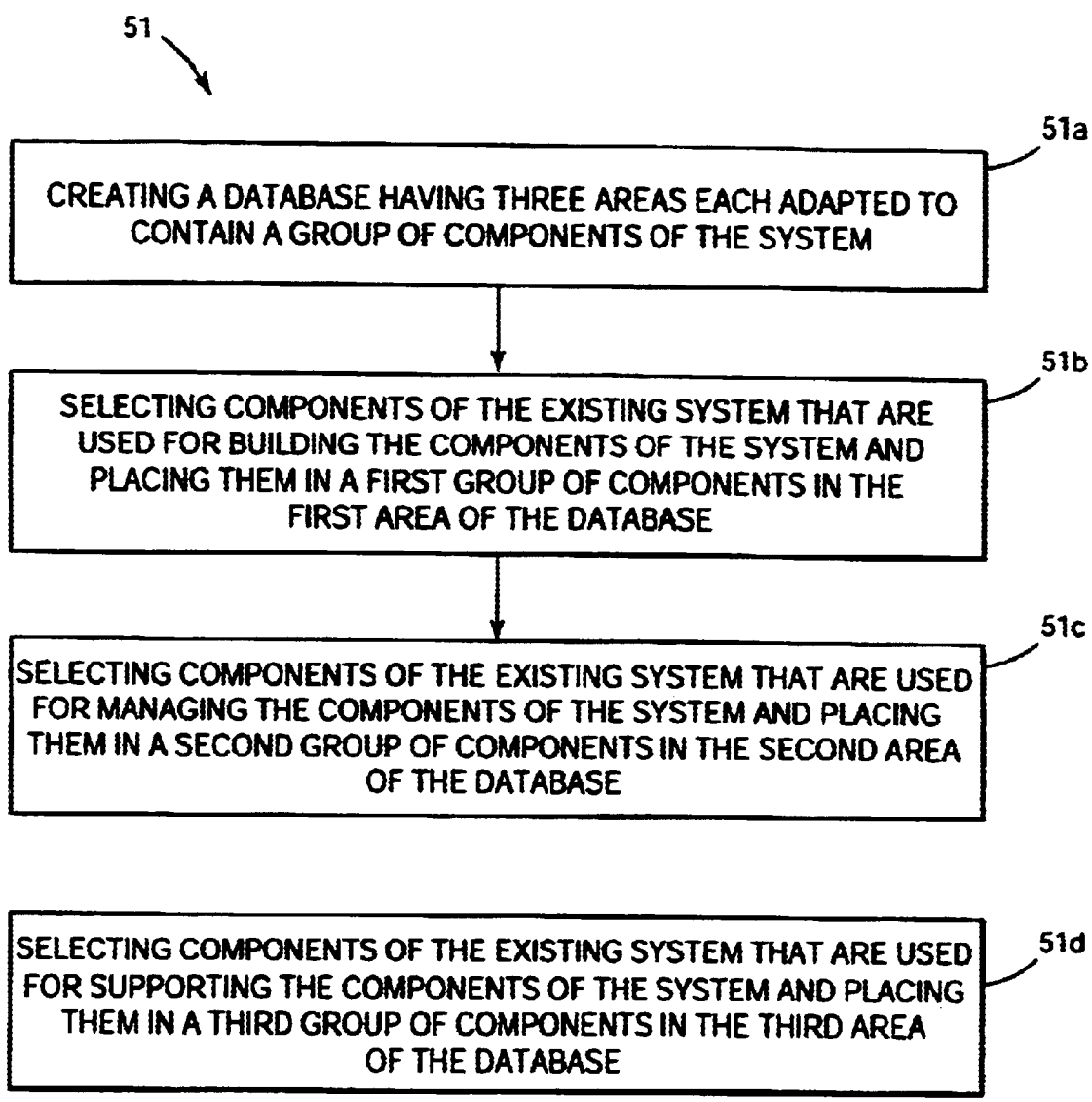
Figure 1I:
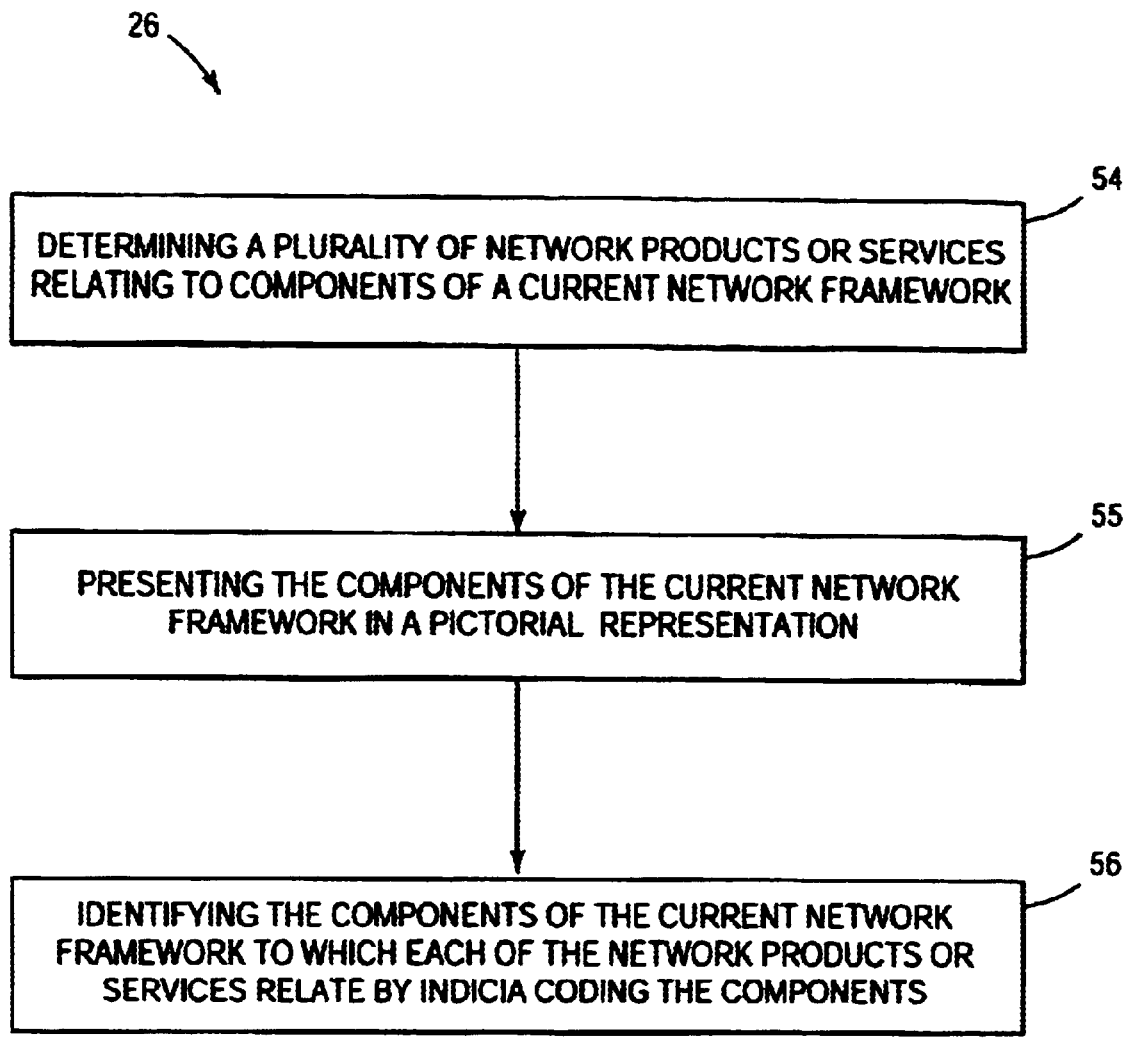
FIG. 1I is a flowchart illustrating the method for mapping products or services in a network framework in accordance with one embodiment of the present invention.
Figures 1, 1I:
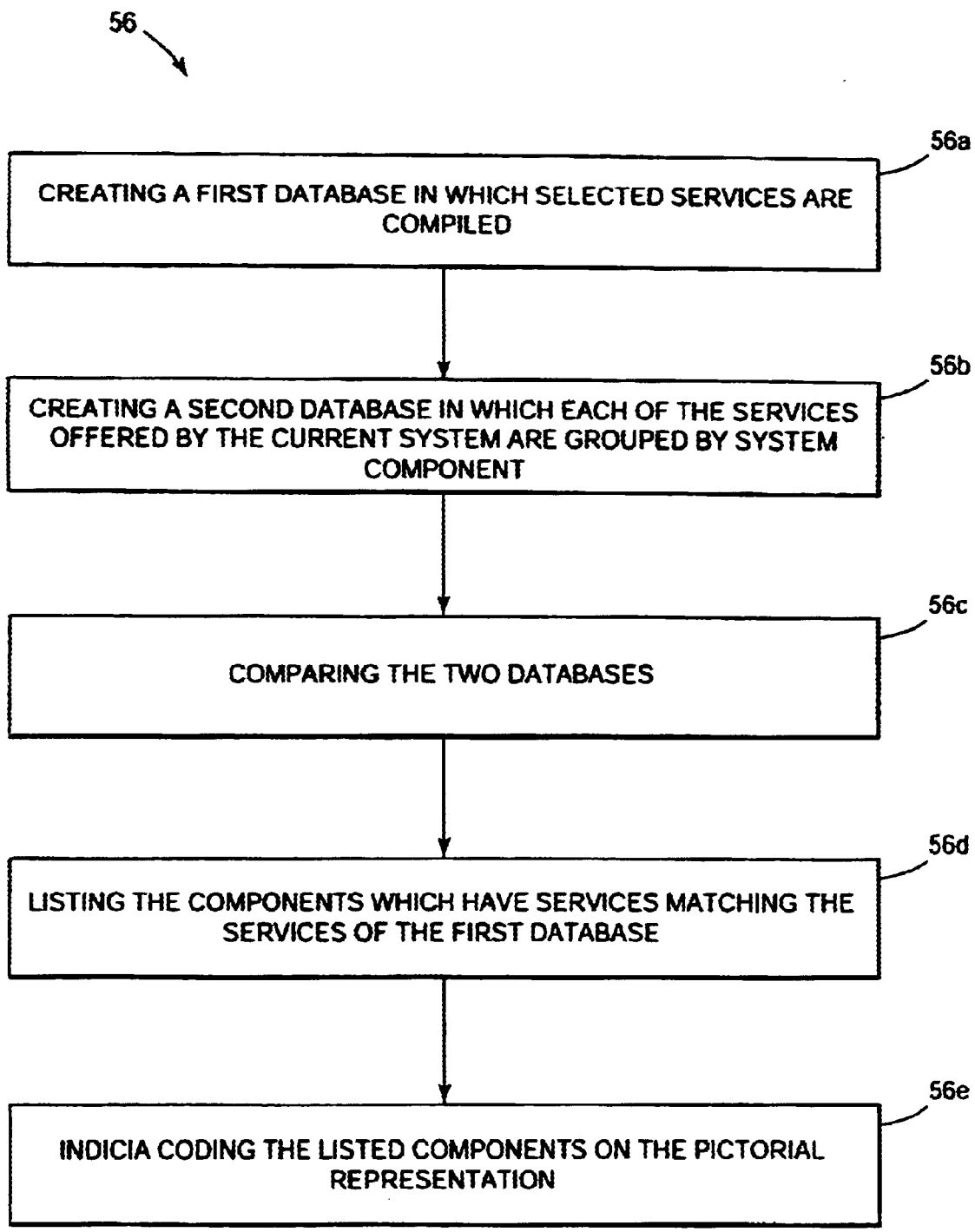
Figure 1J:
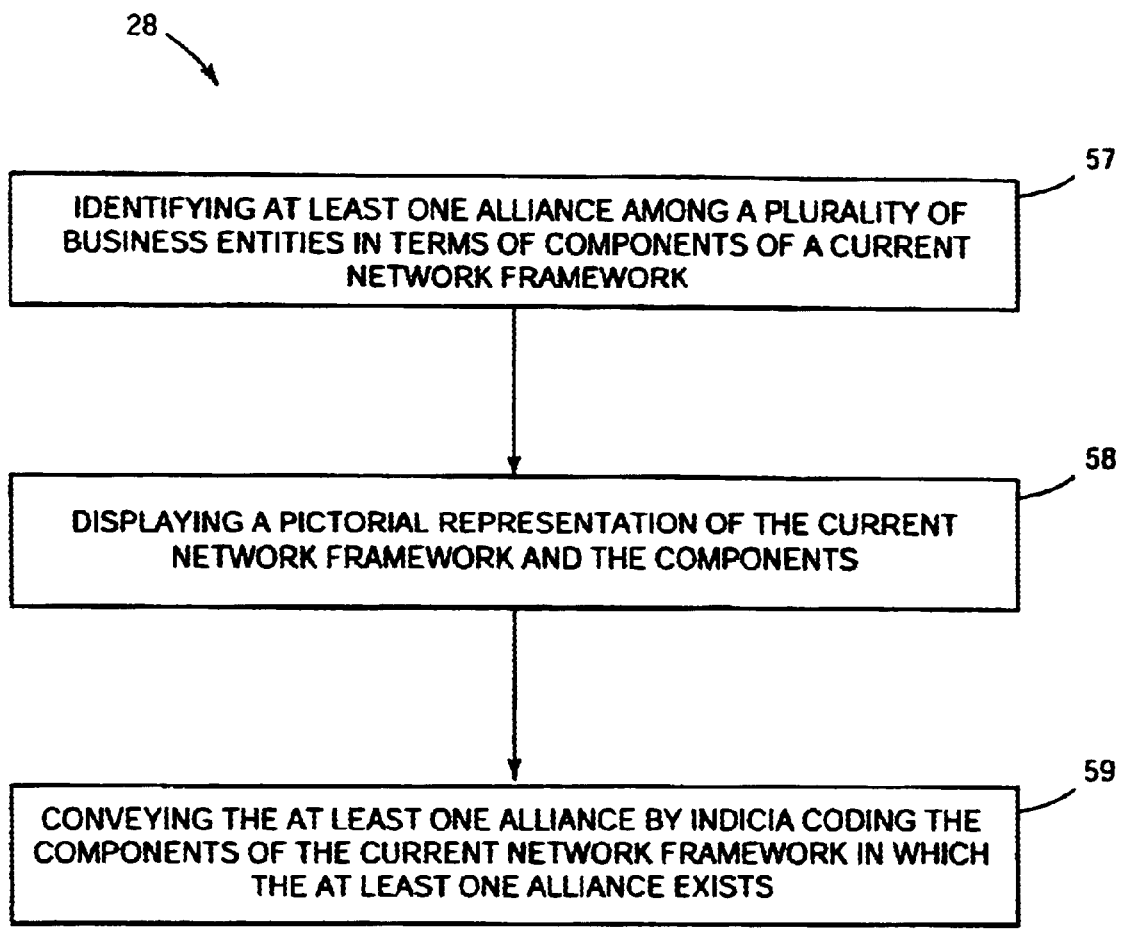
FIG. 1J is a flowchart illustrating the method of identifying alliances among a plurality of business entities in accordance with one embodiment of the present invention.
Figure 1K:
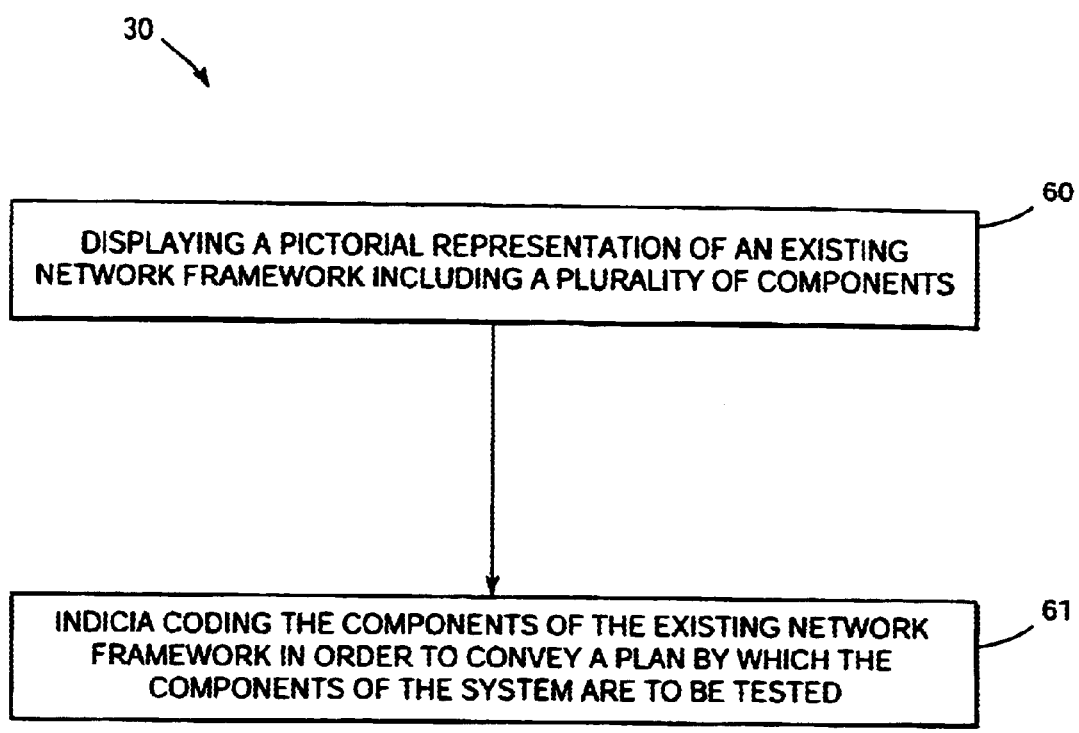
FIG. 1K is a flowchart illustrating the method for planning the testing of network components in accordance with one embodiment of the present invention.
Figures 1, 1K:
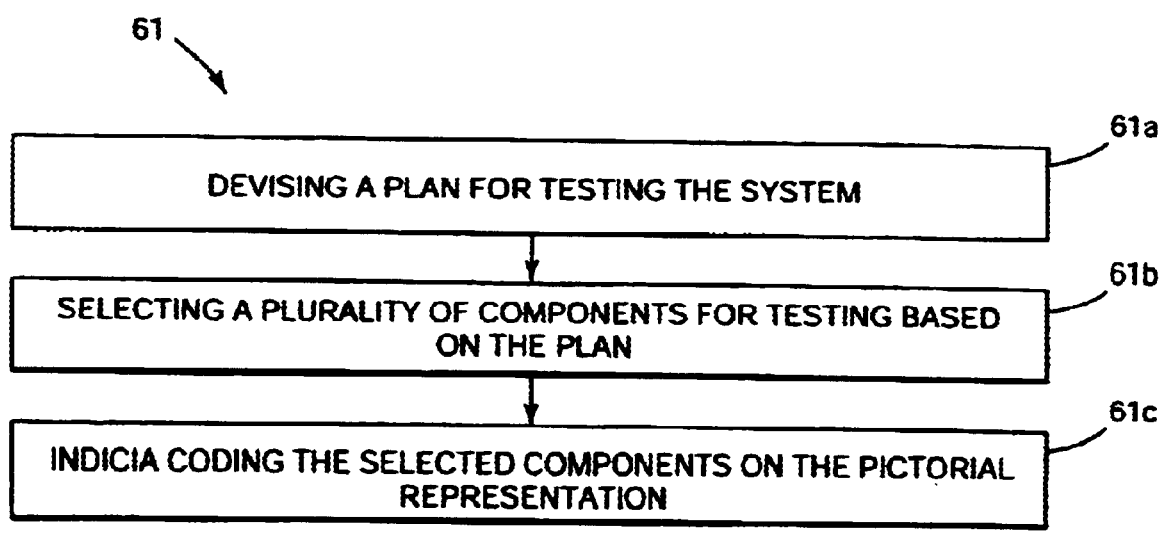
Figures 1, 1L:
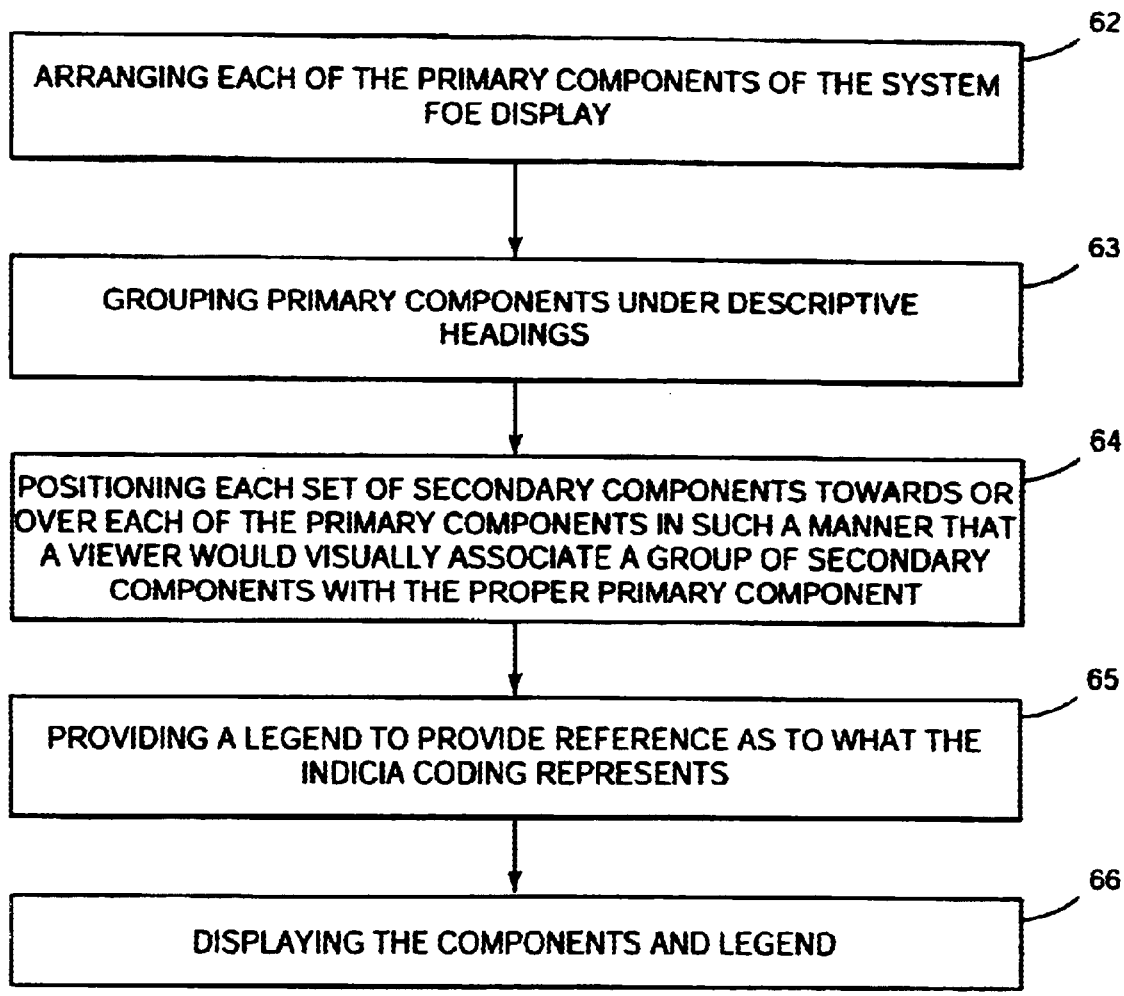

FIG. 1L shows an example of the aforementioned pictorial representation, or "base chart". In the example where the system is a web architecture framework, such pictorial representation depicts all of the application capabilities and associated infrastructure services required to establish a comprehensive web presence. A plurality of components are shown which are necessary to afford various activities over the Internet. Such components may include: an electronic commerce component, a content channels component, an administrative component, a customer relationship management component, a content management and publishing services component, an education related services component, and a web customer service component. More detail about these and other components is provided below and with reference to FIG. 14. In one embodiment, the pictorial representation may be used alone in order to convey various services which would be provided in a business offering.

To create such a pictorial representation, referring to FIG. 1L-1, each of the primary components of the system, such as the components listed above, are arranged for display in operation 62. Examples of primary components shown in FIG. 1L include "Security Services", "Commerce", and "Data Services". Preferably, the primary components are grouped under descriptive headings, as in operation 63. Examples of such headings shown in FIG. 1L are "Web Application Services" and "Common Web Services". Each of the primary components is formed of a group of secondary components. In operation 64, each set of secondary components is positioned towards or over each of the primary components in such a manner that a viewer would visually associate a group of secondary components with the proper primary component. A legend may be provided in operation 65 to provide reference as to what the indicia coding represents. Finally, in operation 66, the components and legend are displayed.

Figure 1M:
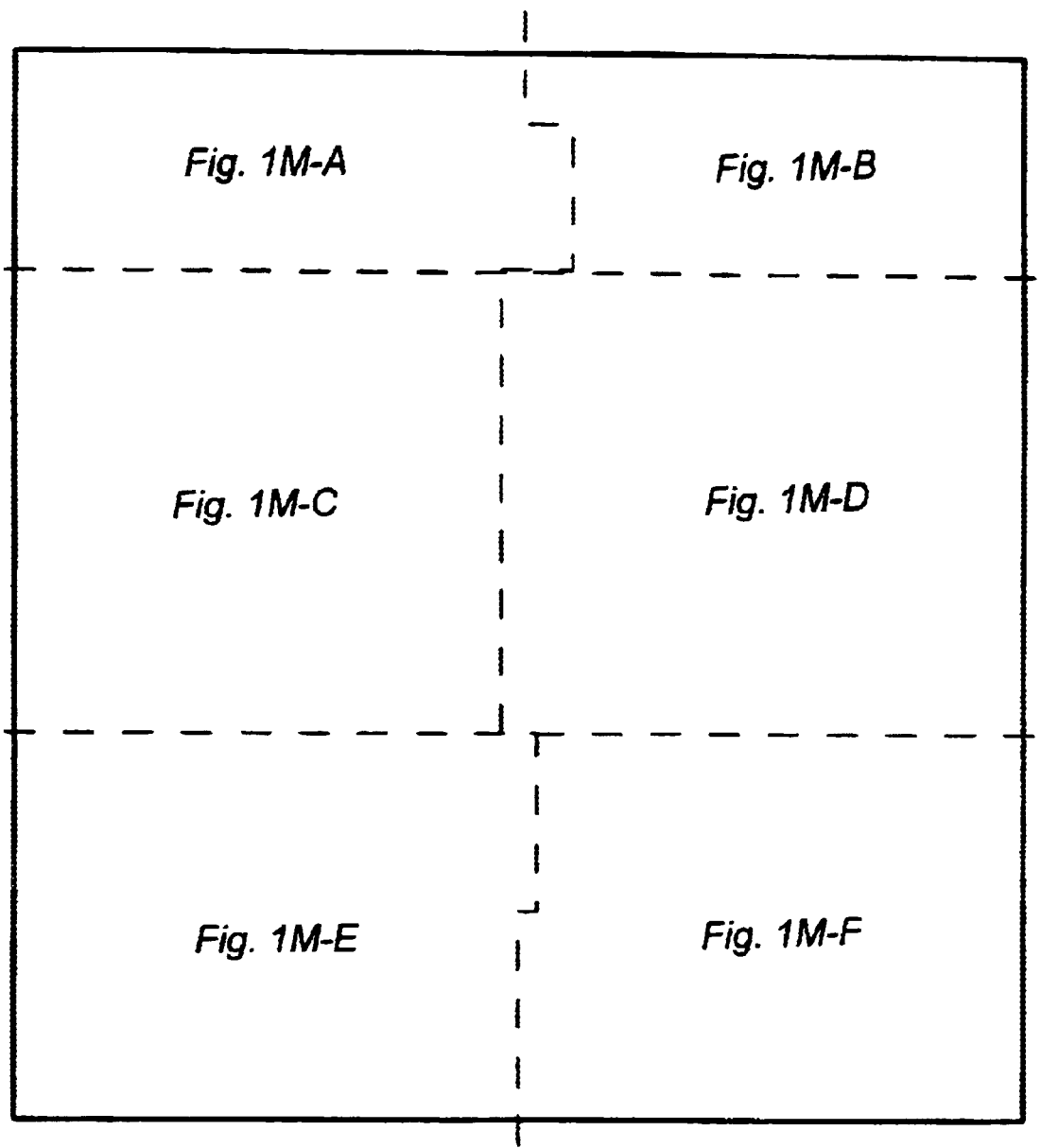
FIG. 1M is an illustration of one implementation of operations 12, 20, 22 and 26 of FIG. 1A.

With reference to FIG. 1A, operation 12 includes indicia coding in order to provide a diagnostic presentation of a past, current, and/or desired web presence. By this method, redundant efforts and omissions among the components of a particular implementation of a web architecture framework may be effectively conveyed. An example of indicia coding in accordance with the present description is shown in FIG. 1M. As shown, components of the web architecture framework without shading indicate that such components are omitted in the framework (i.e., not provided by services of any vendor). On the other hand, components of the web architecture framework with multiple types of shading indicate redundancy in such components (i.e., provided by services of more than one vendor). To accomplish this, referring to FIG. 1B, operation 31 determines at least one area of an existing network framework in which redundancies and omissions of business efforts exist. Operation 32 presents a pictorial representation of the existing network framework including a plurality of components, such as the pictorial representation shown in FIG. 1L. Then, in operation 33, the redundancies and omissions are highlighted by indicia coding the components of the existing network that reside in the area.

In one exemplary method to determine whether an area of an existing network framework has redundant or omitted components, a database may be created which includes a listing of all of the components of the area. See operation 31a of FIG. 1B-1. Also, listings of all services provided by vendors that correspond to the components of that area of the framework are created in the same or a second database in operation 31b. Then, the listing of the components is compared with the listing of the vendor services corresponding to those components in operation 31c to determine whether and how many vendors supply services to each particular component. A third listing is created in operation 31d. The third listing lists components not being provided by a vendor service. These components have been omitted by business efforts of the vendors. A fourth listing is created in operation 31e. The fourth listing includes all of the components that are provided by services of more than one vendor. These components are being served by redundant business efforts. Alternatively, the fourth listing could include components that are provided by more than one service of the same vendor. A pictorial representation, such as is shown in FIG. 1L, is prepared, as described above in operation 32. Then, referring to FIG. 1M, each vendor is assigned a unique indicia coding. Each of the components provided by a vendor service is indicia coded to indicate which vendor or vendors provide the services, as performed in operation 33. Any component omitted in the framework has no indicia coding, while any components having redundant business efforts have multiple types of indicia coding.

Figure 1N:
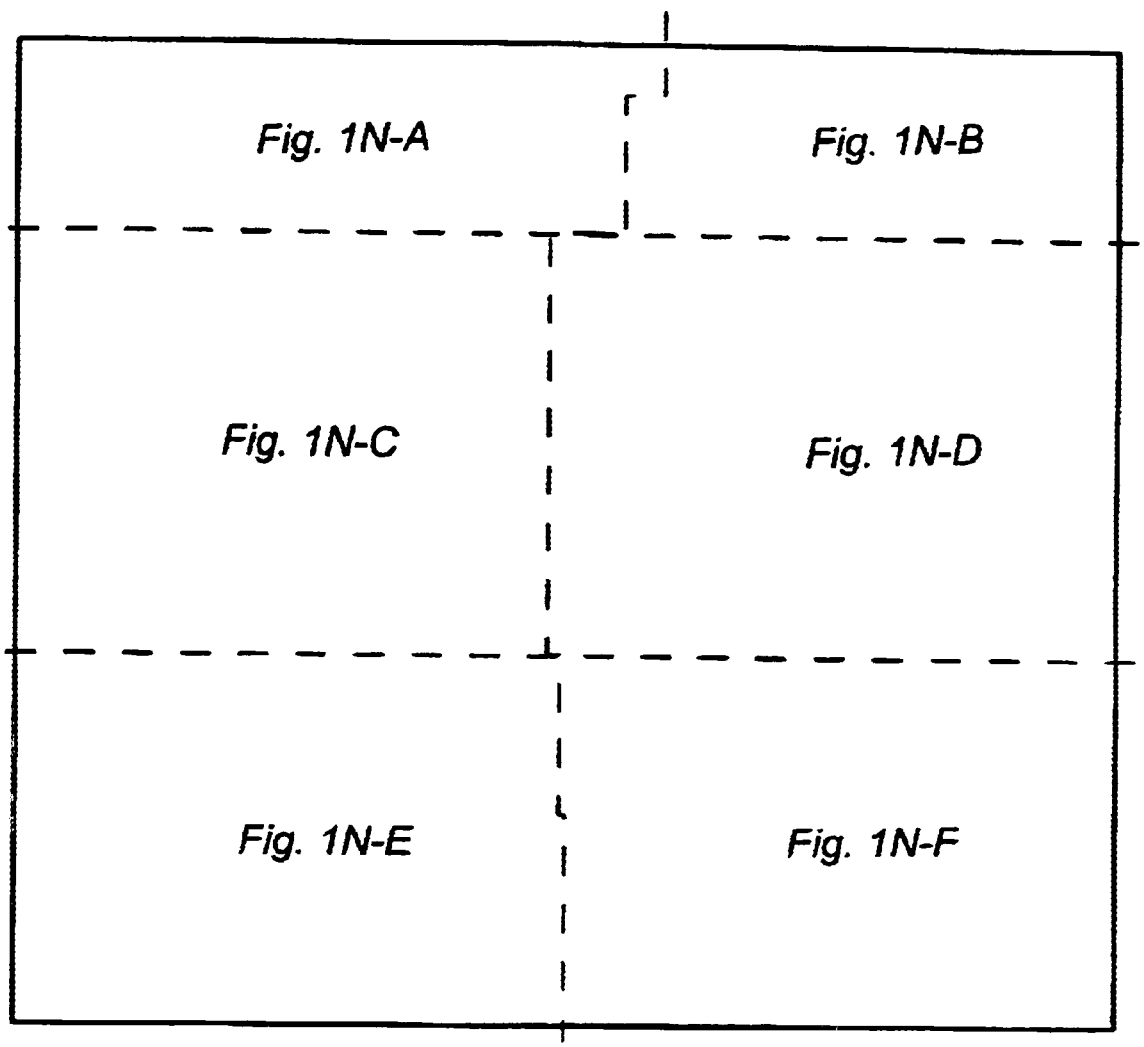
FIG. 1N is an illustration of one implementation of operations 14, 16 and 18 of FIG. 1A.

Operation 14 of FIG. 1A includes indicia coding for effectively conveying which components of a system are required for implementation of technology using the web architecture framework, thereby affording a project definition and an implementation plan. See also FIG. 1C. Operation 34 of FIG. 1C displays a pictorial representation of a system including a plurality of components, again, such as the pictorial representation shown in FIG. 1L. Then the components of the system are indicia coded in order to indicate required components for the implementation of the system. See operation 35. An example of such indicia coding is shown in FIG. 1N. As shown, components of the web architecture framework without indicia coding indicate that such components are not required for implementation of technology using the web architecture framework. In contrast, components of the web architecture framework with indicia coding represent components which are required for implementation of the technology. In the present description, such technology may relate to any sort of use of the web architecture, i.e. specific commerce implementations, etc.

In one exemplary method to determine which components are required for the implementation of the system in order to indicia code them in operation 35, a database may be created which includes a listing of all of the components of the system. See operation 35a of FIG. 1B-2. Also, listings of all components of the framework necessary to the implementation of the system are created in the same or a second database in operation 35b. Then, the listing of the entire set of components is compared with the listing of the required components in operation 35c. In operation 35d, any components that match are indicia coded on the pictorial representation created in operation 34.

As shown in operation 16 of FIG. 1A, the indicia coding may be further employed to indicate priority of implementation for components of the system. First, a priority is identified among the plurality of components required for implementation of a predetermined technology. See operation 36 of FIG. 1D. To accomplish this, referring to FIG. 1D-1, a listing of all of the components required for implementation of the technology using an existing network framework is compiled in operation 36a. Priority may be determined based on a requirement that certain components be in place before other components will perform properly. In such case, primary components, which should or must be installed before other secondary components will function properly, are positioned forward of, or in an otherwise prioritized relation to, the secondary components in the listing in operation 36b. Further, any tertiary components that should or must be installed after a particular secondary component should be positioned below the corresponding secondary component on the listing, as in operation 36c. Thus, the listing provides a particular order in which the components of the network framework should or must be installed. It should be noted that this procedure can be followed for any particular area of the network framework or the entire network as a whole.

Then, referring back to FIG. 1D, a pictorial representation of the existing network framework and its components is generated in operation 37. Operation 38 indicia codes a first component or components of the existing network framework in order to indicate that the first component is a primary component, as selected in operation 36b, which must be implemented first. Operation 39 indicia codes a second component and any remaining components of the existing network framework in order to indicate that the second component and remaining components are secondary components, as determined in operation 36c, and must be implemented after the first component. For example, second components which should be provided only after other necessary first components are in place may be distinguished from the primary components by having indicia coding unique with respect to the indicia coding of the first components, and likewise for tertiary components, etc.

Figure 1P:
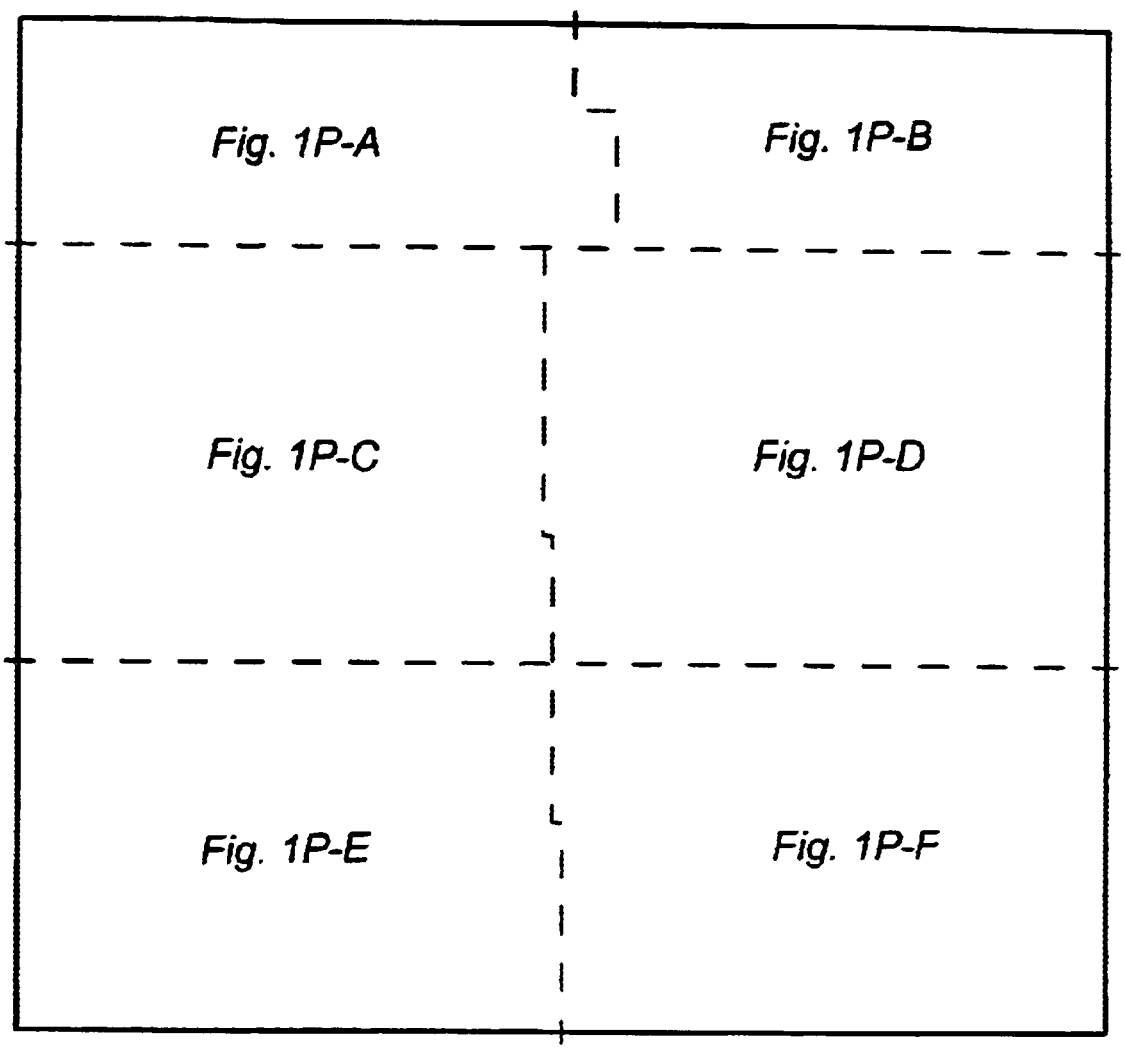
FIG. 1P is an illustration of one implementation of operations 14, 16, 18 and 30 of FIG. 1A.

Further, indicia coding may indicate particular phases in which components of the system are delivered, and more particularly the order of delivery of various components of the web architecture framework. Note operation 18 in FIG. 1A. Referring to FIG. 1E, operation 40 displays a pictorial representation of an existing system including a plurality of components. Then, in operation 41, a first set of components that are to be delivered in a first phase are selected and presented by indicia coding the same. To perform operation 41, for example, referring to FIG. 1E-1, components of the system that are required to create the base framework of the system are selected to be delivered in the first phase in operation 41a. Further, in operation 41b, the remaining components are separated into primary and secondary components, in which the primary components must be installed before the secondary components in order for the secondary components to function properly. The primary components may also be selected to be delivered in the first phase in operation 41c. Finally, in operation 42, a second set of components that are to be delivered in a second phase are selected and presented by indicia coding the same in a manner unique with respect to the indicia coding of the first set of components. Such second set of components may include some or all of the secondary components found in operation 41b. Referring to FIG. 1P, an exemplary first set of components is identified in the legend under "First Delivery". In FIG. 1P, second and third sets of components are identified in the legend under "Second Delivery" and "Third Delivery".

Operation 20 of FIG. 1A includes indicia coding for effectively comparing a plurality of entities which, in the present description, may refer to any organization including, but not limited to vendors, companies, and/or any other community or the like. In one embodiment, the present method may allow architecture definition and/or software/vendor assessment. In such embodiment, the components of the system are indicia coded in order to compare the services or products such as software of prospective third-party vendors who may stand alone, be part of a partnership, etc. In particular, operation 43 of FIG. 1F determines the structure and/or organization of a current network framework. Operation 44 displays a graphical depiction of the current network framework and a plurality of components thereof, such as the graphical depiction shown in FIG. 1L. A comparative analysis of the vendors is presented with indicia coding that highlights aspects of (i.e., services provided by) the vendors. See operation 45. The presentation of the comparative analysis is accomplished in operation 45a of FIG. 1F-1 by assigning each vendor a unique indicia coding. In operation 45b, a database is created that includes all of the products and services of at least two vendors of web-based products or services. The products and services in the database are compared to the components of the network framework in operation 45c. In operation 45d, each component that matches a service or product offered by a vendor is indicia coded on the graphical representation created in operation 44, with the indicia coding corresponding to the vendor of the service. Then a visual comparison of the services offered by each vendor in relation to the entire network framework may be made. FIG. 1M shows one way the present method may be implemented.

As stated above, various vendors may be represented by a unique corresponding indicia coding, i.e. color, for differentiation purposes. As such, one may assess vendors and third parties as a comprehensive, integrated solution. Further, investment opportunities may be assessed by coding their coverage, strengths, and weaknesses in terms of web architecture framework. For example, the instant method may be used to provide a valuable perspective where new start-up companies are positioned in the overall web architecture solution.

Operation 22 of FIG. 1A is provided for effectively conveying which of the components and capabilities of a system have products and services available for sale, thereby serving as a selling tool. This is accomplished by indicia coding the components of the system in order to show which of the components has services and products that can be provided. In particular, referring to FIG. 1G, operation 46 determines the organization and components of an existing network framework. A database is also created which includes a compilation of all of the products and/or services offered by the various components. Operation 47 defines a plan which includes improvements to the existing network framework. For example, in operation 47*a* of FIG. 1G-1, a target market is selected based on buying habits, age, gender or some other criteria. In operation 47*b*, a sales program is tailored to appeal to the target market by selecting only specific components having products or services likely to be purchased by the target market. Then, in operation 47*c*, the products or services related to the chosen components are chosen to be offered for sale.

A pictorial representation of the existing network framework and a plurality of components of the existing network framework are displayed in operation 48. In operation 49, the components of the existing network framework which were chosen according to the plan in operation 47*c* are indicia coded in order to sell at least one of products and services relating to the chosen components of the system in accordance with the improvements. It should be noted that the pictorial representation of the system displays the components which were not selected under the plan without indicia coding, such as if the products and services of the other components are available for sale though not featured, or such components may not be displayed at all.

Figure 1Q:
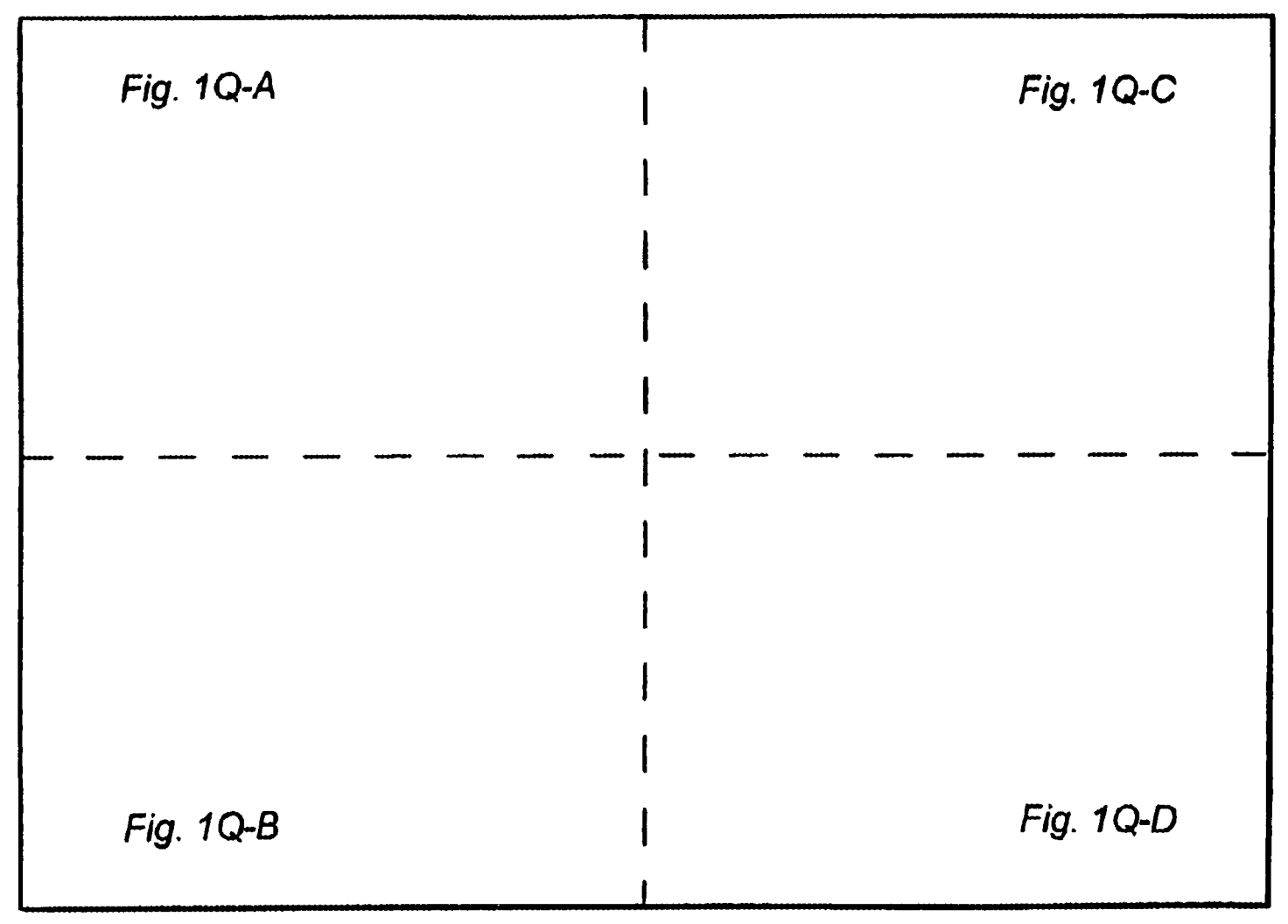

FIG. 1M shows an example of operation 22 of FIG. 1A. As shown, various available components are indicia coded. As an option, the available components, or capabilities, may be broken down in a bulleted format. Note FIG. 1Q, which is exemplary of a bulleted list of components. It should be noted that such a list may be provided for any combination of components, including all of the components. As an alternative to selecting products and services to sell, the present invention may specifically indicate which specific capabilities are available to potential clients or customers. As such, the present method of indicia coding is effective in showing such prospective clients or customers a comprehensive view of what it takes to implement solutions. Further, new opportunities may be identified through assessment of the displayed information.

In various other embodiments, the present invention may be used to clearly articulate all the services that would be provided in any type of new business offering. In operation 24 of FIG. 1A, the components of the system are indicia coded in order to convey information regarding building, managing, and/or supporting the various components of the system. As such, various capabilities may be conveyed in any type of business offering. A pictorial representation of an existing system including a plurality of components is displayed in operation 50 of FIG. 1H. FIG. 1L shows an example of such a pictorial representation.

In operation 51, information relating to building the components of the existing system is presented by indicia coding the components on the pictorial representation. For example, all of the components required to build the other components of the system are differentiated from the other components by the indicia. Thus, the skeleton of the system is presented. Information relating to managing the components of the existing system is conveyed by indicia coding the components on the pictorial representation in operation 52. Operation 53 presents information relating to supporting the components of the existing system by indicia coding the components on the pictorial representation.

In more detail, referring to operation 51*a* of FIG. 1H-1, a database is created having three areas each adapted to contain a group of components of the system. In operation 51*b*, components of the existing system that are used for building the components of the system are selected and placed in a first group of components in the first area of the database. These components are indicia coded on the pictorial representation in operation 51 of FIG. 1H. In operation 51*c*, components of the existing system that are used for managing the system and its components are selected and placed in a second group of components in the second area of the database. These components are also indicia coded on the pictorial representation, in operation 52 of FIG. 1H, but with a unique indicia coding. In operation 51*d*, components of the existing system that are used for supporting other components of the system are selected and placed in a third group of components in the third area of the database. These components are indicia coded on the pictorial representation, also with a unique indicia coding, in operation 53 of FIG. 1H.

Further, the present invention may be employed in product development planning to communicate where new products fit into an overall architecture picture. As shown in operation 26 of FIG. 1A, this is accomplished by indicia coding the components of the system in order to convey information pertaining to which components of a system products or services relate. As such, the present embodiment identifies where various products or services are focused in a system. Note FIG. 1M which is representative of an example, where "Vendor 1", "Vendor 2", etc. each represent a service or product. Operation 26 is performed by determining a plurality of network products or services relating to components of a current network framework and presenting the components of the current network framework in a pictorial representation. See operations 54 and 55 of FIG. 1I. Operation 56 identifies the components of the current network framework to which each of the network products or services relate by indicia coding the components.

In one example of operation 26, a first database is created in which selected services are compiled. See operation 56*a* of FIG. 1I-1. In operation 56*b*, a second database is created. The second database has each of the services offered by the current system grouped by system component. The two databases are compared in operation 56*c*, and the components which have services matching the services of the first database are listed in operation 56*d*. The listed components are indicia coded on the pictorial representation in operation 56*e*.

In operation 28 of FIG. 1A, one embodiment of the present invention identifies alliances among various business entities in certain components of a system. To accomplish this, the components of the system are indicia coded to indicate in which components of the system alliances exist between various business entities, i.e. companies, etc. This enables one to effectively discern how to use products in the components of the system where such alliances exist. The procedure for performing operation 28 begins by identifying at least one alliance among a plurality of business entities in terms of components of a current network framework. Note operation 57 of FIG. 1J. A pictorial representation of the current network framework and the components is displayed in operation 58. Operation 59 conveys the alliance or alliances by indicia coding the components of the current network framework in which the alliance or alliances exist. More detail is provided below.

Finally, in operation 30 of FIG. 1A, it is shown that one embodiment of the present invention may be used in test planning or the like. This is accomplished by indicia coding the components of the system in order to convey the manner in which the components of the system are to be tested. An example of such technique is shown in FIG. 1N. The present invention has a broad applicability across all industry groups through customization of the pictorial representation and indicia coding. In operation 60 of FIG. 1K, a pictorial representation of an existing network framework including a plurality of components is displayed. In operation 61, the components of the existing network framework are indicia coded in order to convey a plan by which the components of the system are to be tested. Looking to FIG. 1K-1, it is seen that one method of performing operation 61 includes devising a plan for testing the system. See operation 61a. The plan may be based on administrator or programmer testing specifications. In operation 61b, a plurality of components are selected for testing based on the plan. The selected components are then indicia coded on the pictorial representation in operation 61c. Thus, a pictorial depiction of the testing plan is created.

In various alternate embodiments, the indicia coding may be used to differentiate between base capabilities and technologies, indicate support for Internet Protocol, and/or convey any other aspect of implementation of technology. The present invention thus ensures a comprehensive implementation solution.

Figure 1R:
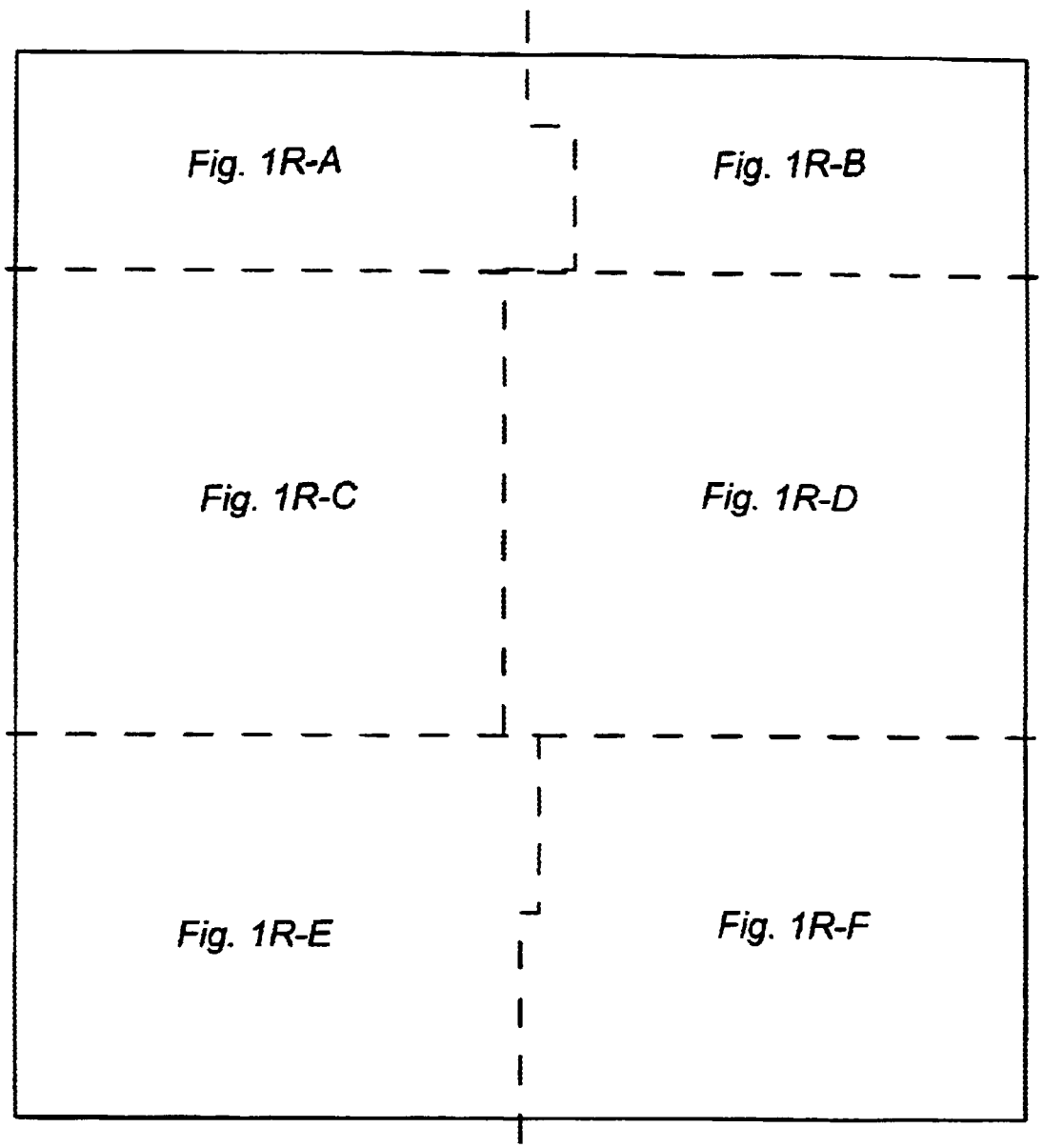
FIG. 1R is an illustration of one implementation of operation 28 of FIG. 1A.
Figure 1S:
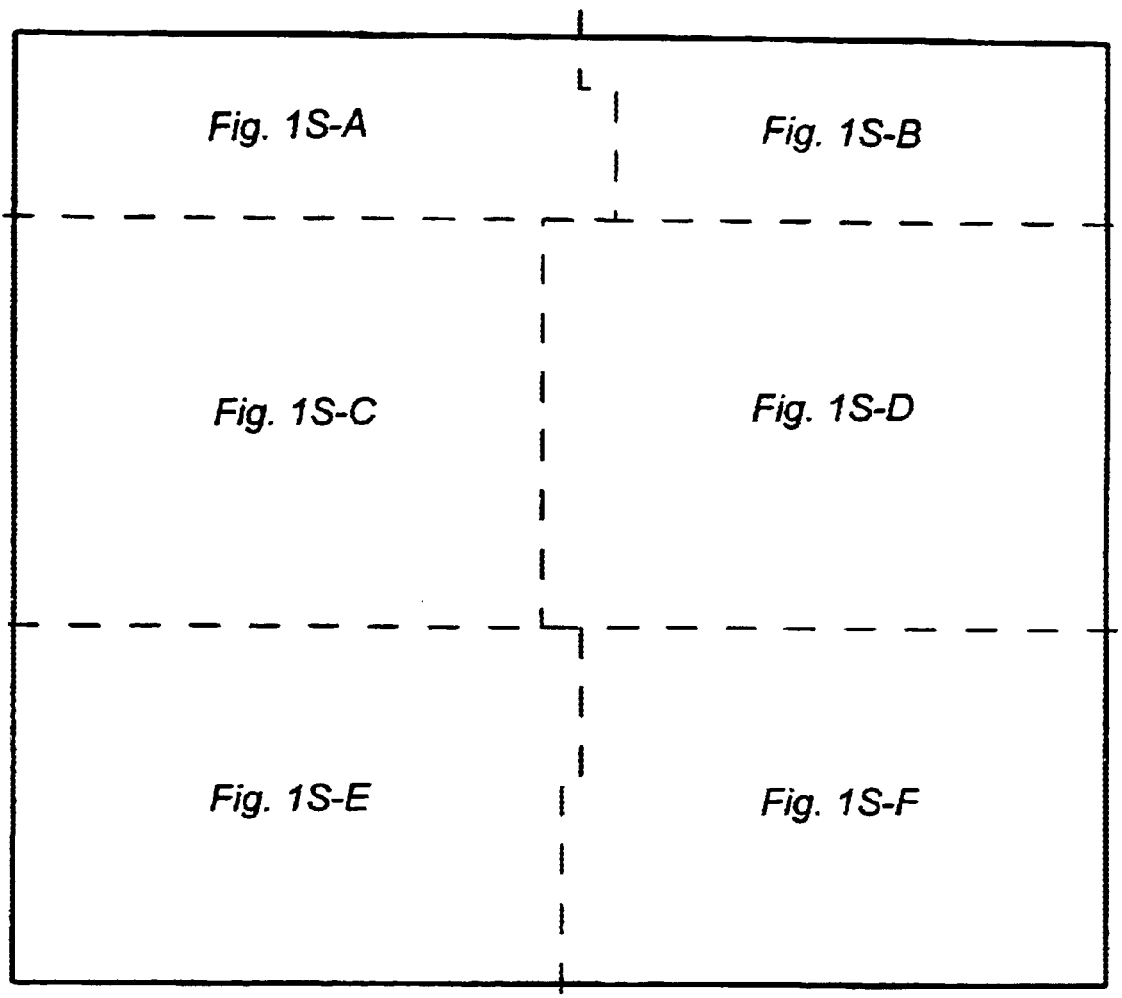
FIG. 1S is an illustration of one implementation of operation 28 of FIG. 1A.
Figure 1T:
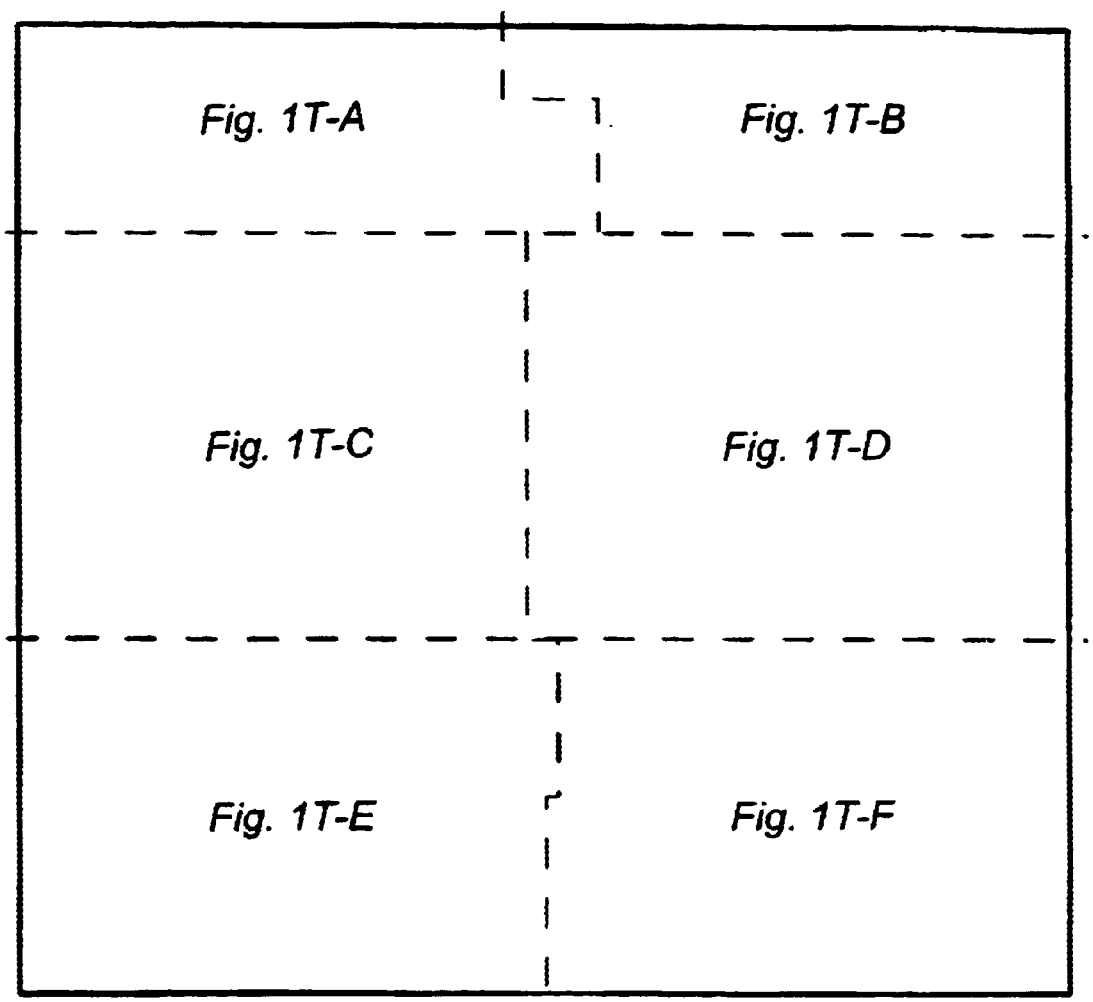
FIG. 1T is an illustration of one implementation of operation 28 of FIG. 1A.
Figure 1U:
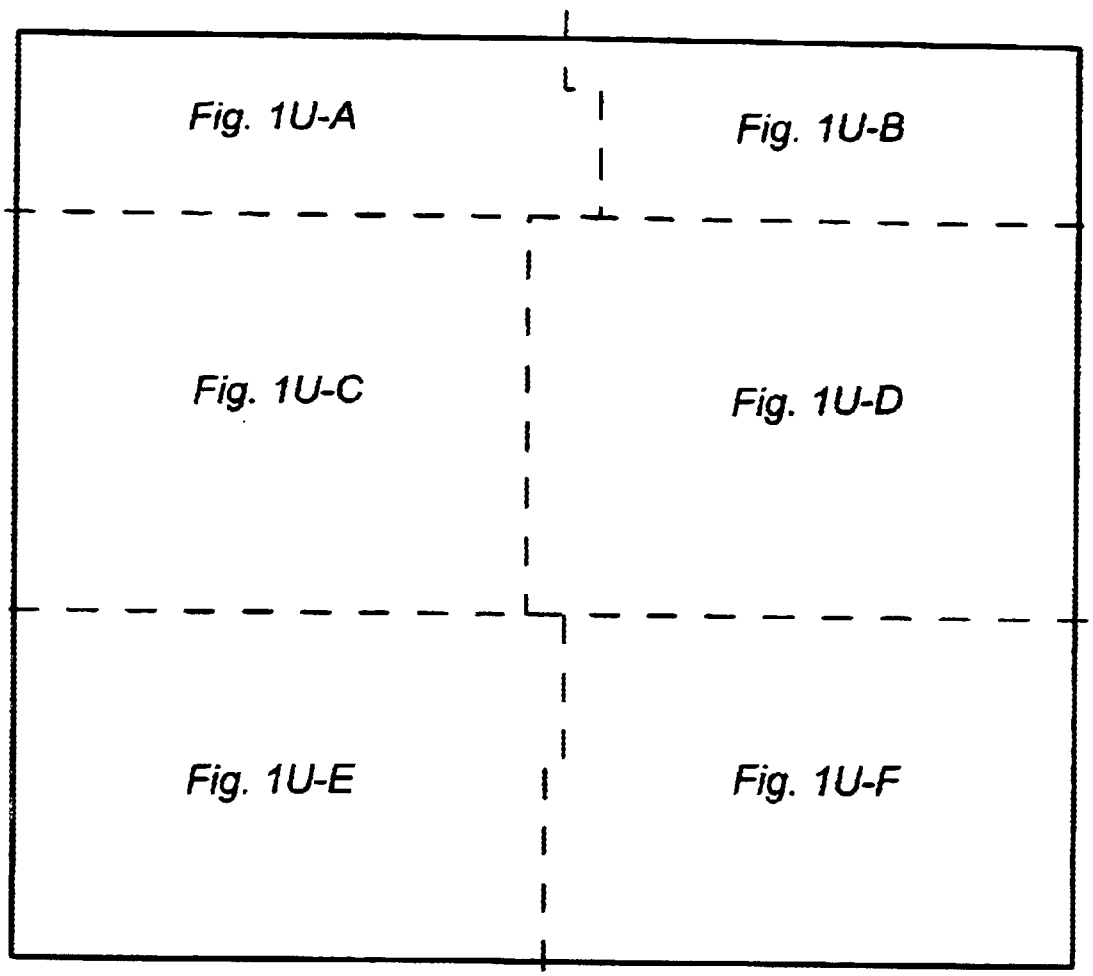
FIG. 1U is an illustration of one implementation of operation 28 of FIG. 1A.
Figure 1V:
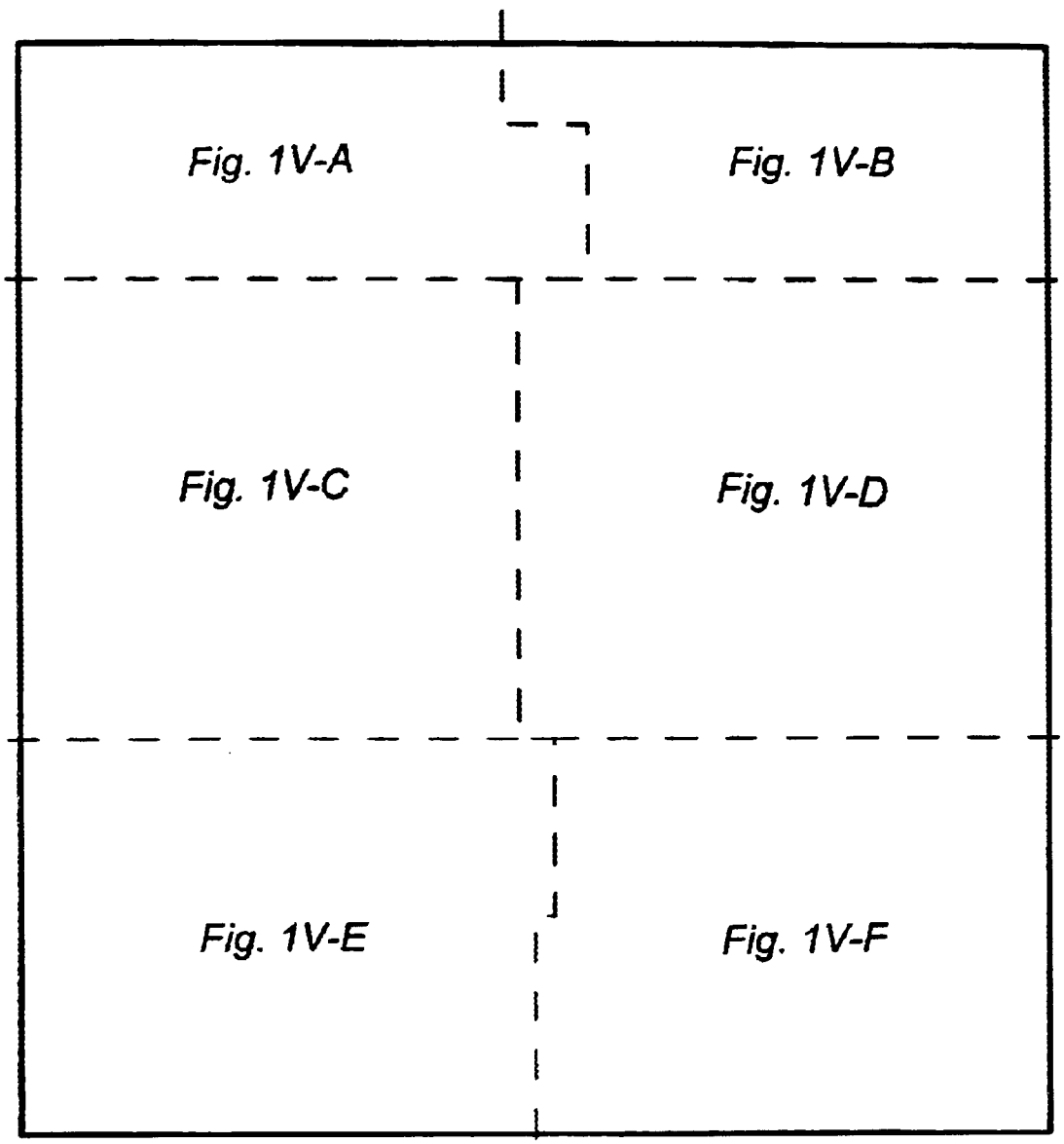
FIG. 1V is an illustration of one implementation of operation 28 of FIG. 1A.
Figure 1W:
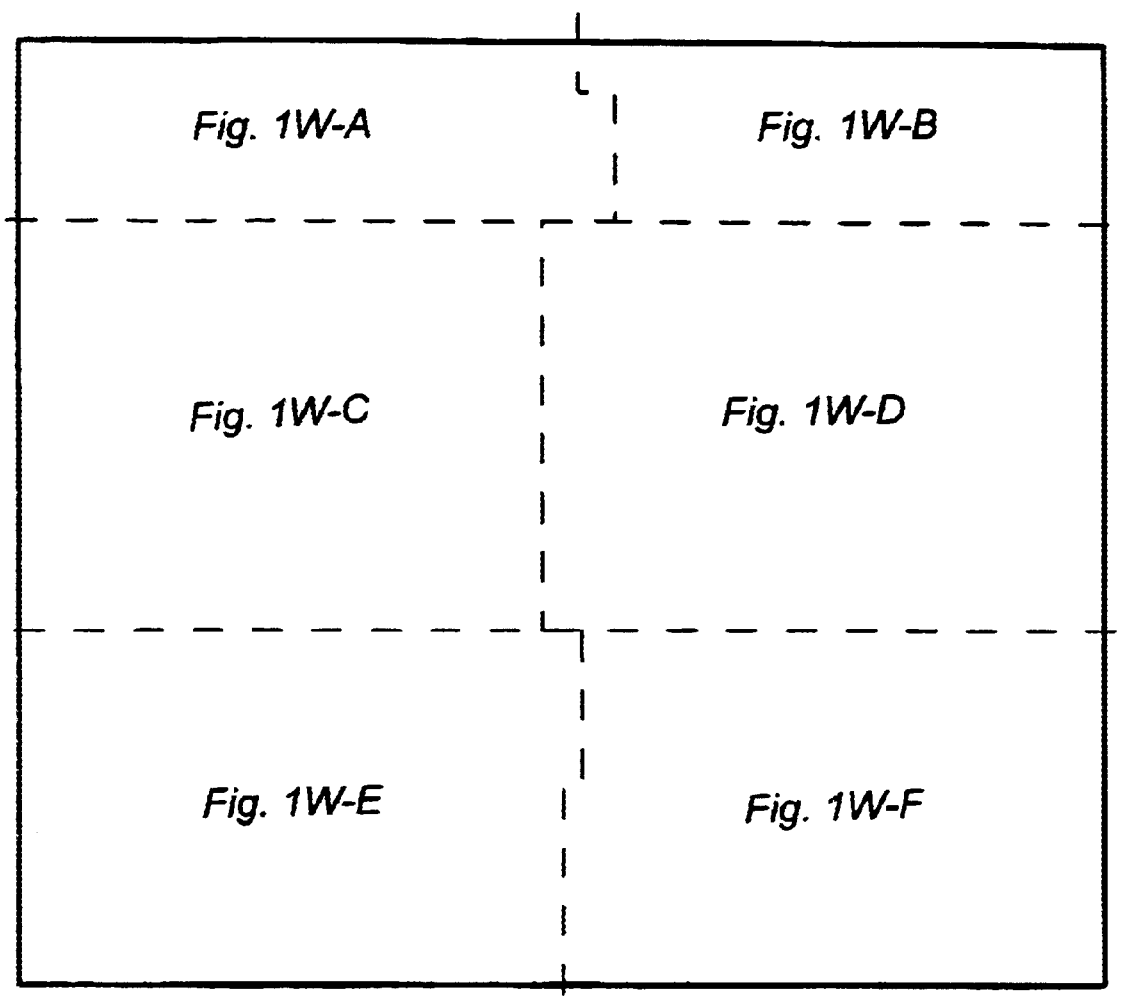
FIG. 1W is an illustration of one implementation of operation 28 of FIG. 1A.

Referring again to operation 28 of FIG. 1A, and more particularly to FIG. 1J and FIGS. 1R–1Y, it is seen that FIG. 1R provides an exemplary pictorial representation of various components of a web architecture framework, each component being represented by a box. Three business entities are represented in this example as Business1, Business2, and Business3. Each business entity has a unique indicia coding, as shown in the legend. Indicia coding is provided in each component box that has related products or services offered by a business entity. For example, in the Security Services section, the Browser Based Authentication component has all three types of indicia coding. Thus, all three of the business entities provide products or services related to that component. Also in the Security Services section, the Virtual Private Networks component has only two types of indicia coding. Referring to the legend, it is seen that only Business1 and Business2 offer products or services related to that particular component. For clarity, FIGS. 1S, 1U, and 1W are provided to illustrate the products or services offered by each individual entity.

Figure 1X:
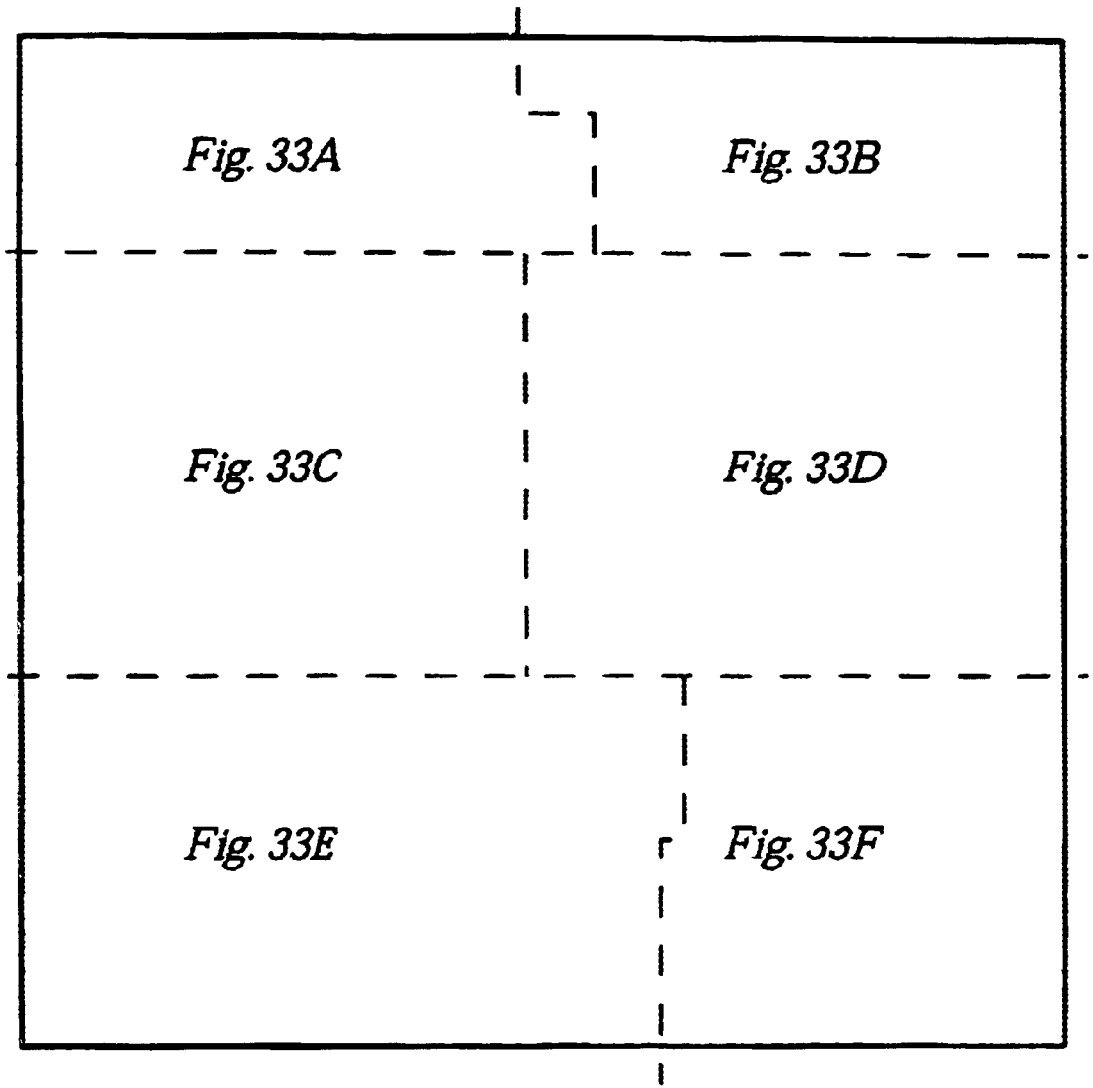
FIG. 1X is an illustration of one implementation of operation 28 of FIG. 1A.

The legends of FIGS. 1T, 1V, and 1X illustrate the particular services provided by Business1, Business2, and Business3, respectively. (The chart on the following pages provides more detail as to the services provided by each entity.) Each service has a unique indicia coding, as shown in the legend. Indicia coding is provided in each component box that has a component provided by that service. Looking to FIG. 1T in this example, it is seen that Business 1 offers 13 types of services. The Secure Browser Communication component of the Web Services component of the Web Architecture Framework is provided by eight of the services offered by Business1: Netra/ISP Server Bundles, System Management Tools, Business/Java Web Servers, News Server/Forum, Directory Services, Business.net, the Browsers, and the Wallet/Card/eCheck Service.

Figure 1Y:
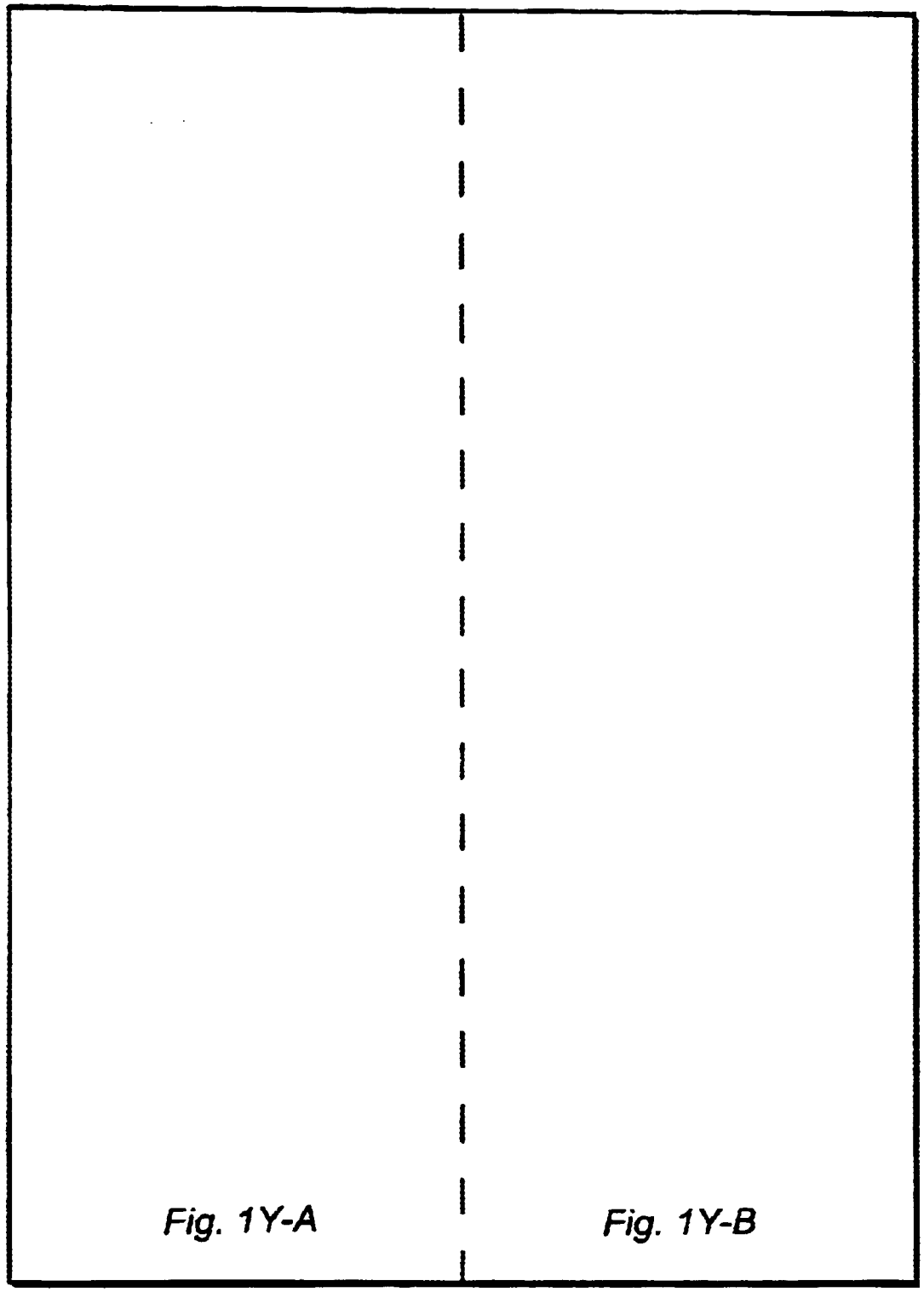
FIG. 1Y is an illustration of one implementation of operation 28 of FIG. 1A.

FIG. 1Y is an exemplary data page which provides even more detail for selected components of the Web Architecture Framework. It should be noted that such data pages may be provided to include each of the various components and subcomponents. Each component box has indicia coding again representative of the services which provide that particular component. Alongside each component are various operations associated with that component. Smaller boxes are provided adjacent each operation, one box for each service providing the main component. If a service performs the particular operation, indicia coding representing that service is provided in one of the boxes adjacent that operation. If the service does not perform the particular operation, its representative indicia coding will not appear in a box adjacent that operation.

Figure 1Z:
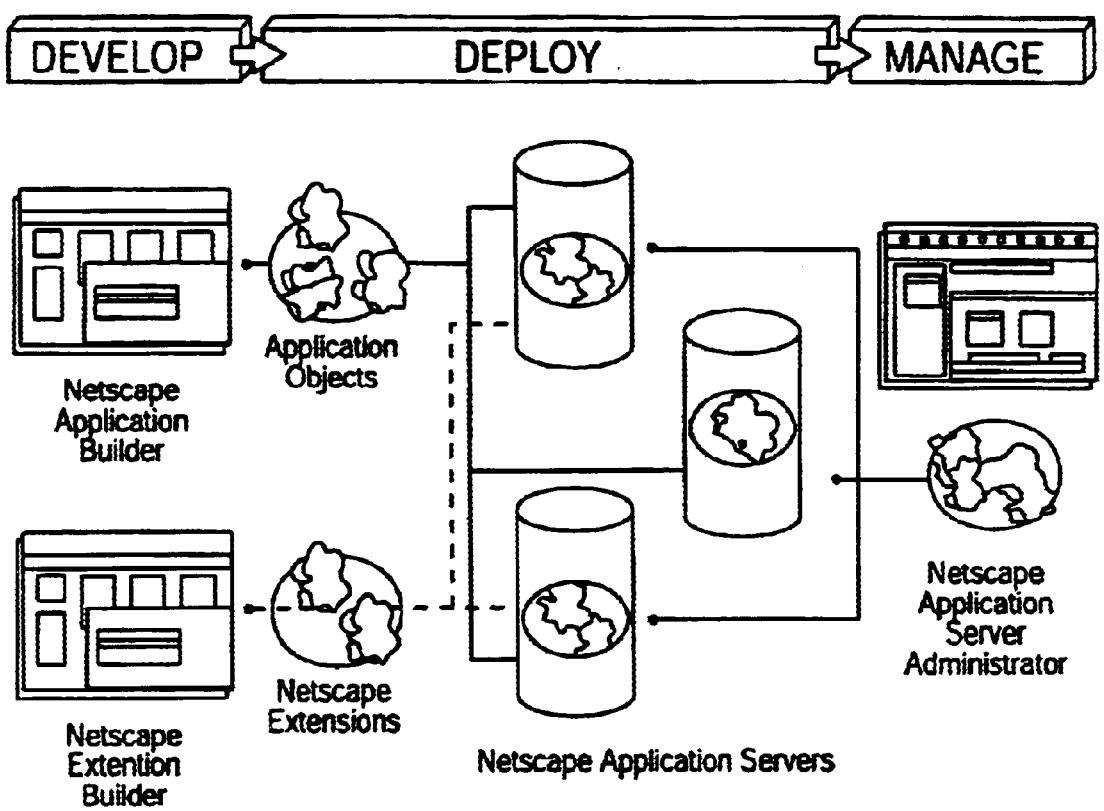
FIG. 1Z is an illustration of an architecture diagram for one implementation of operation 28 of FIG. 1A.
Figure 1A:
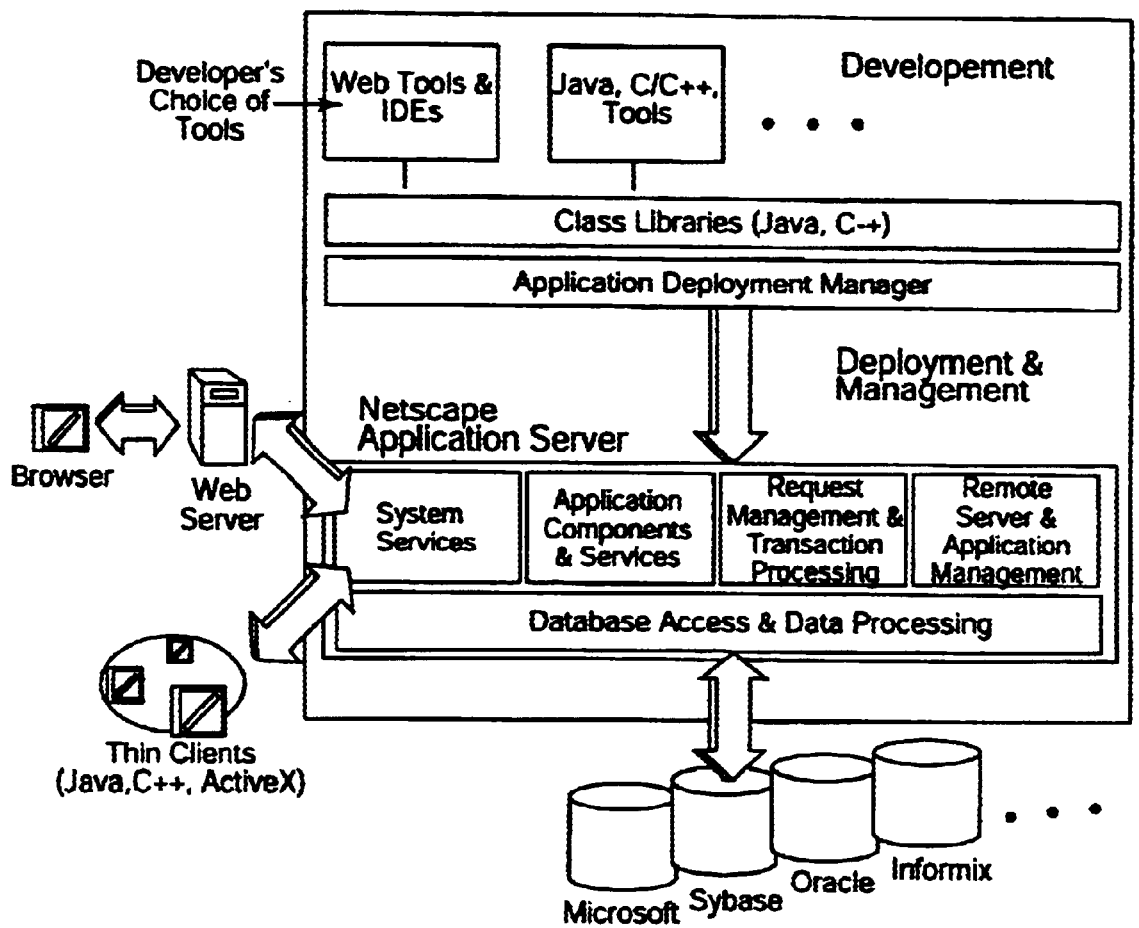
Figure 1A:
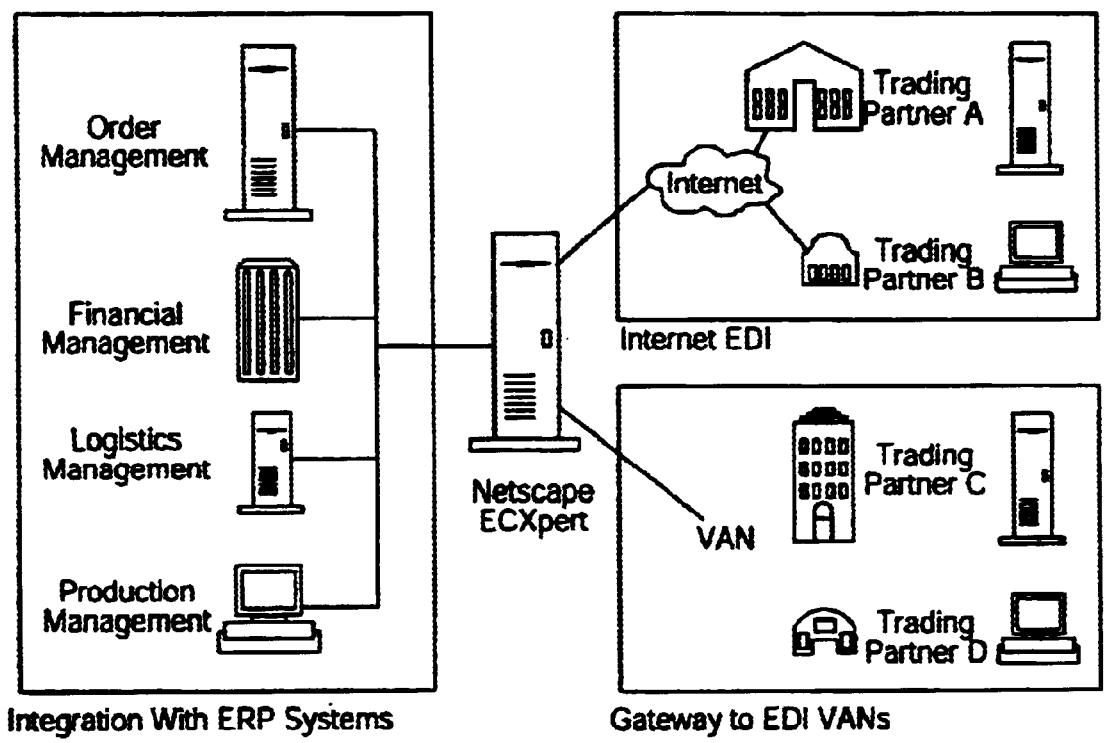
Figure 1A:
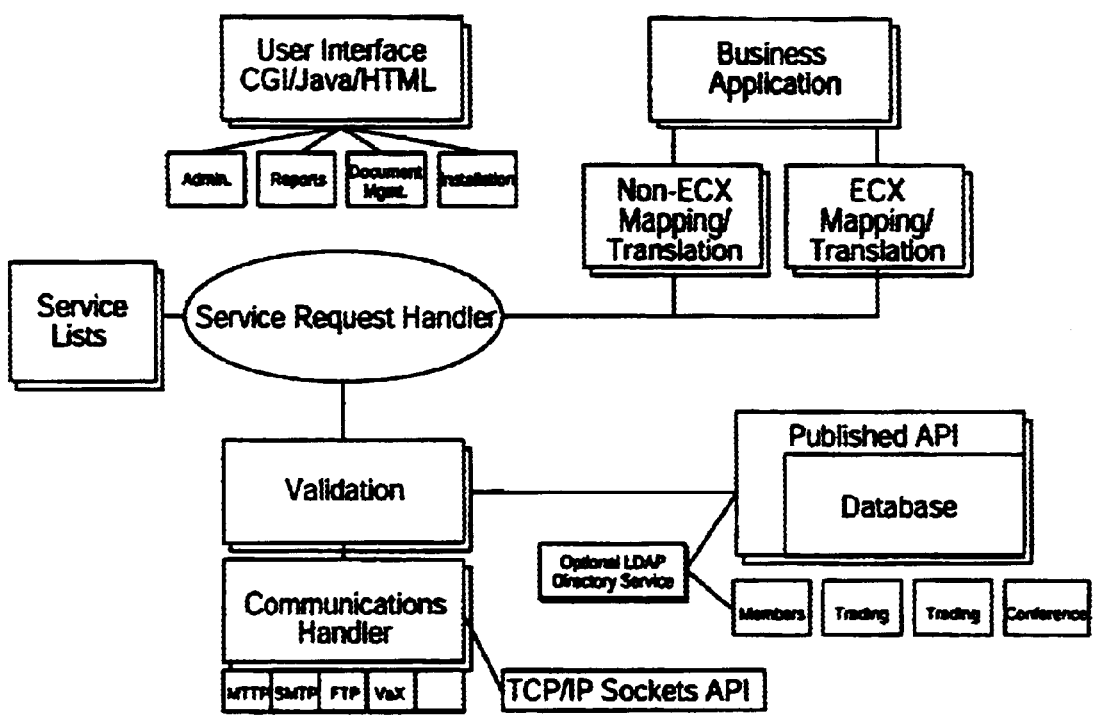
Figure 1A:
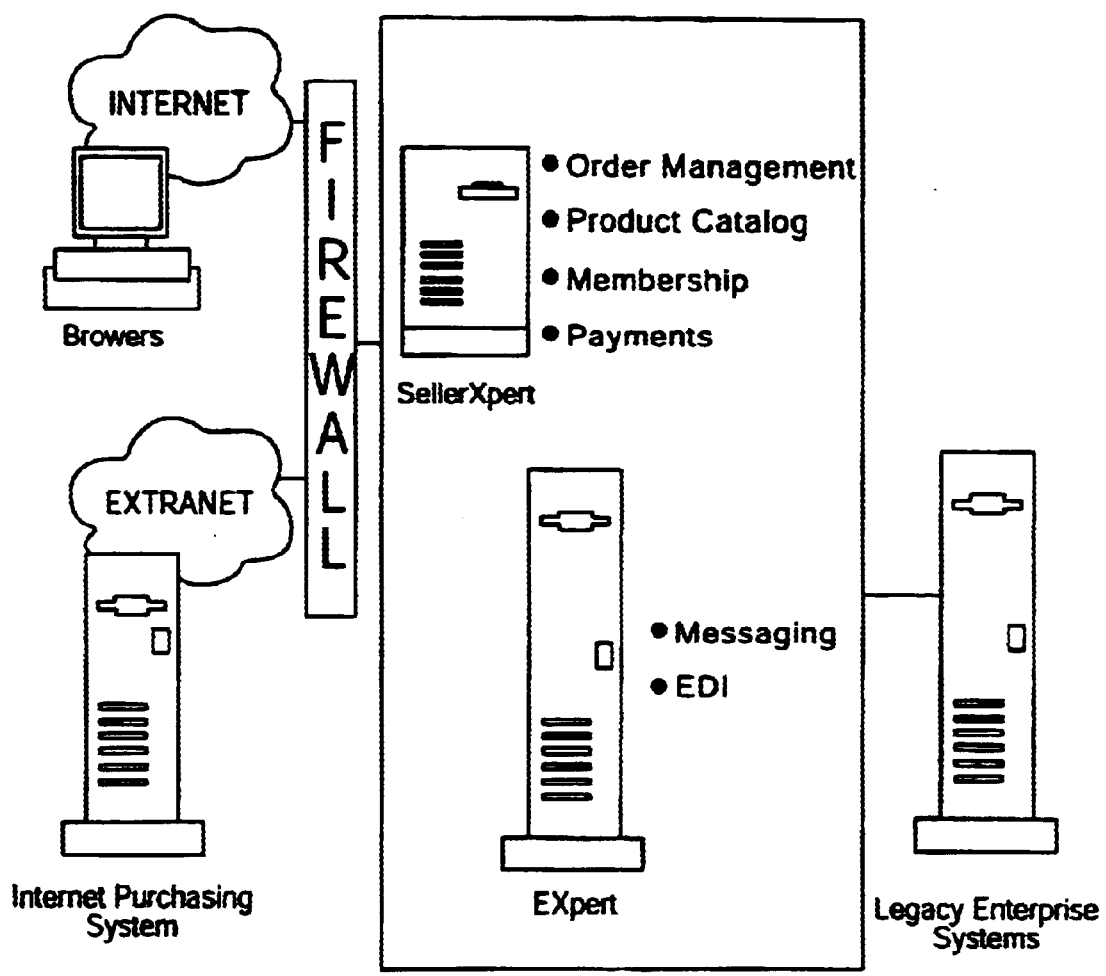
Figure 1A:
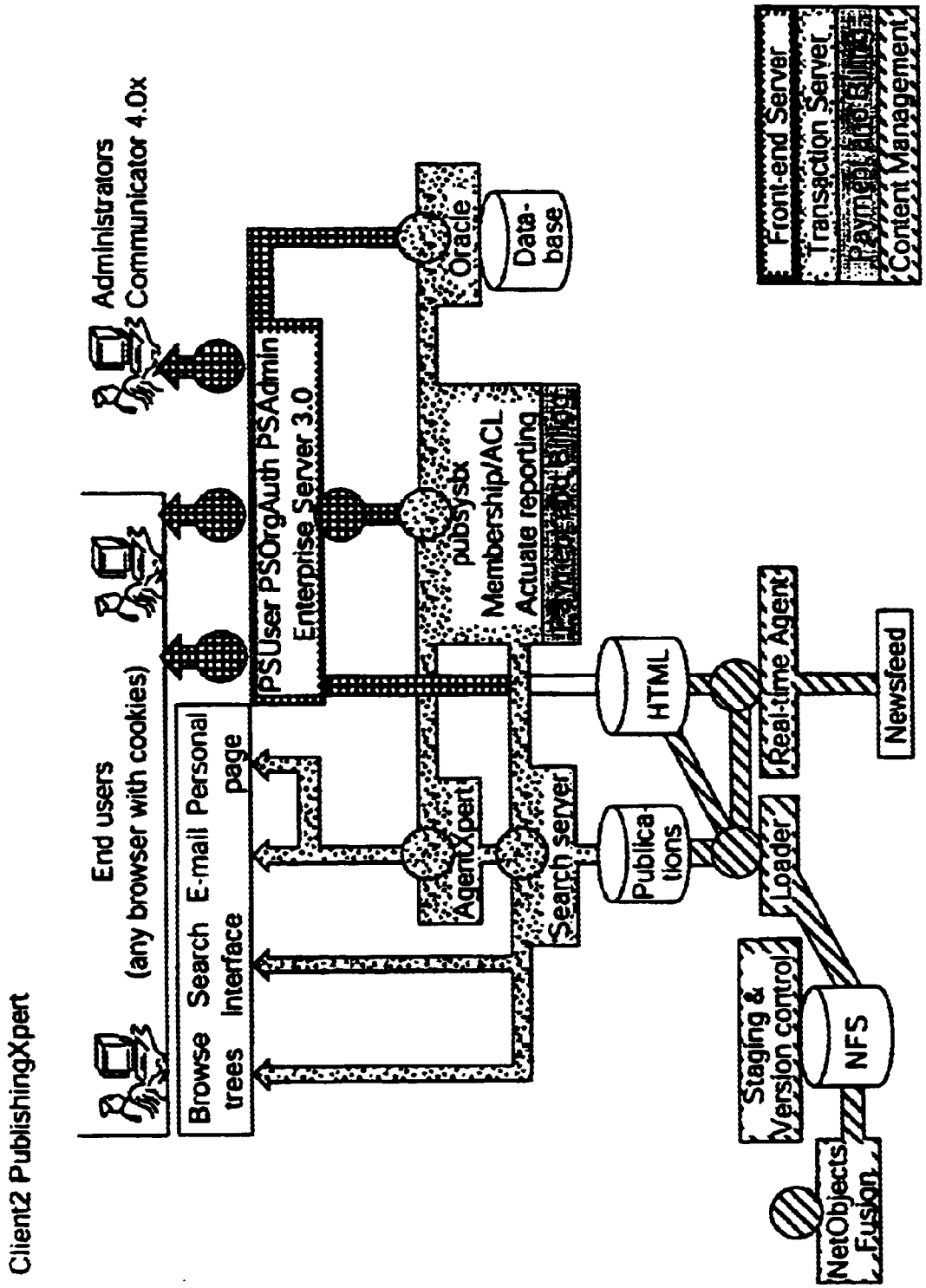
Figure 1A:
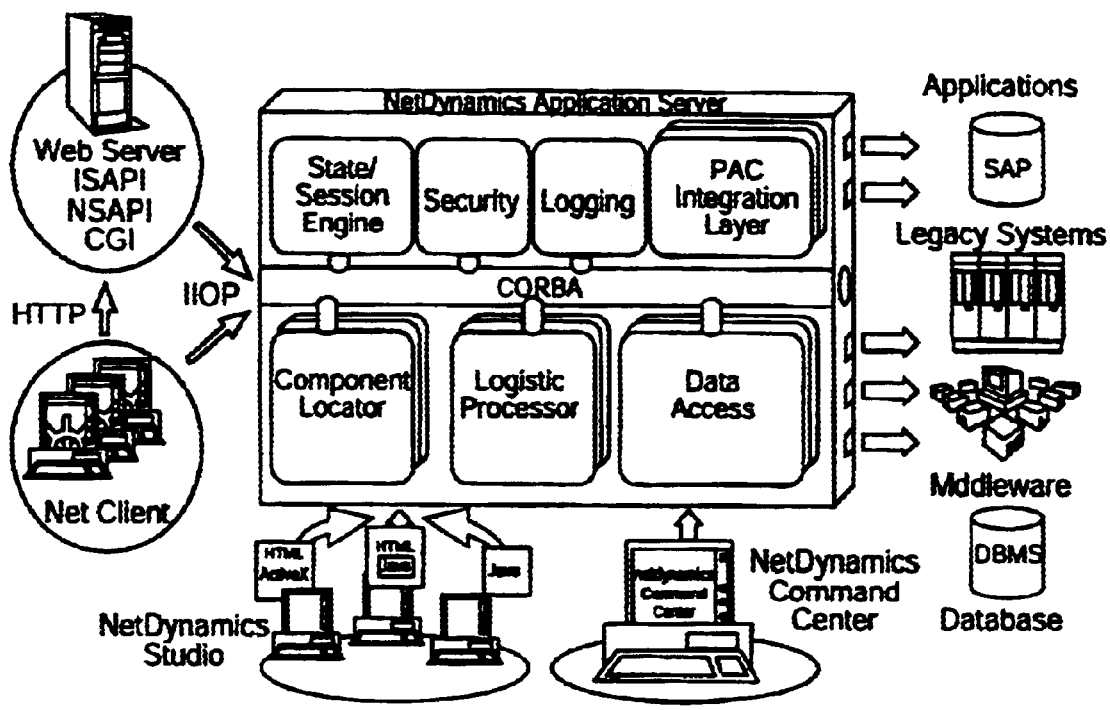
Figure 1A:
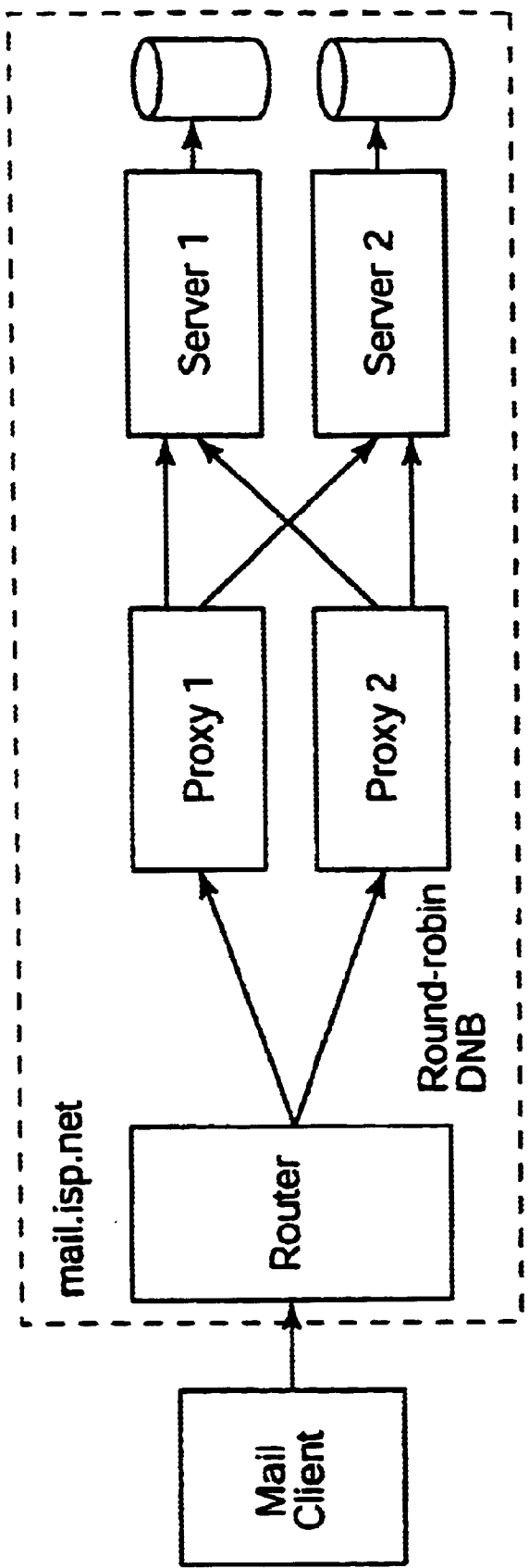
Figure 1A:
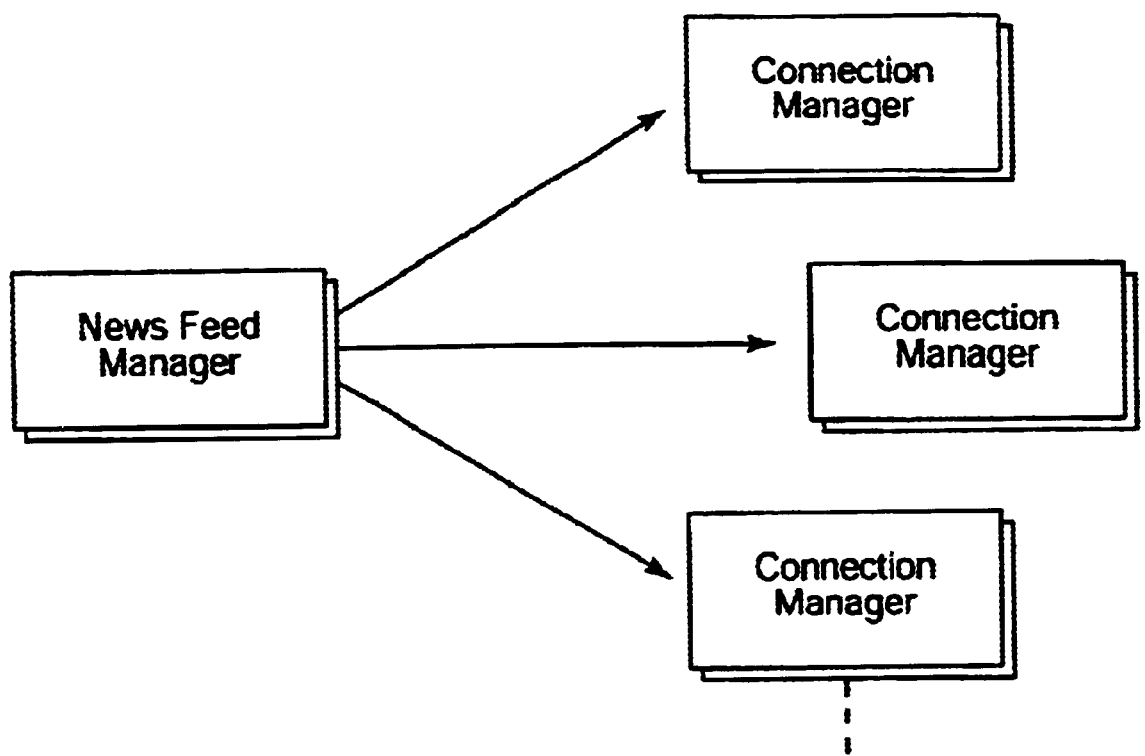
Figure 1A:
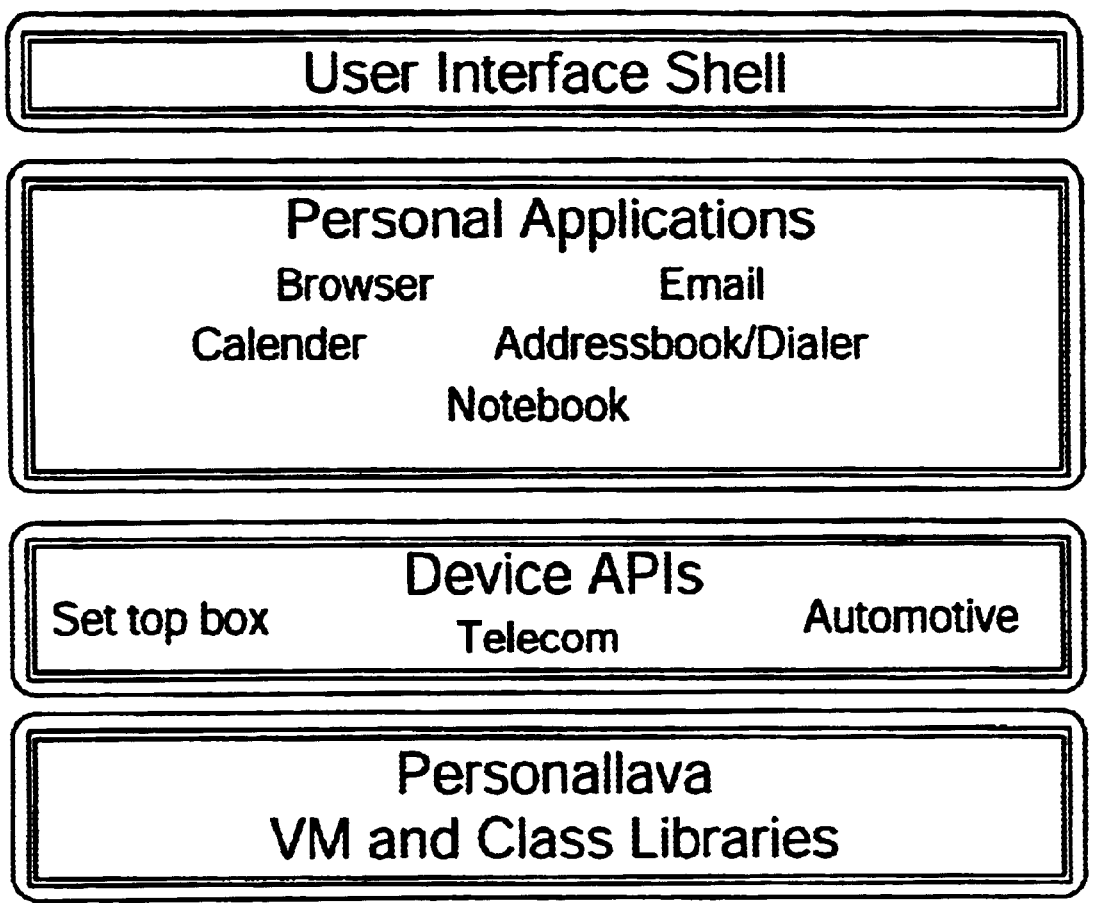
Figure 1A:
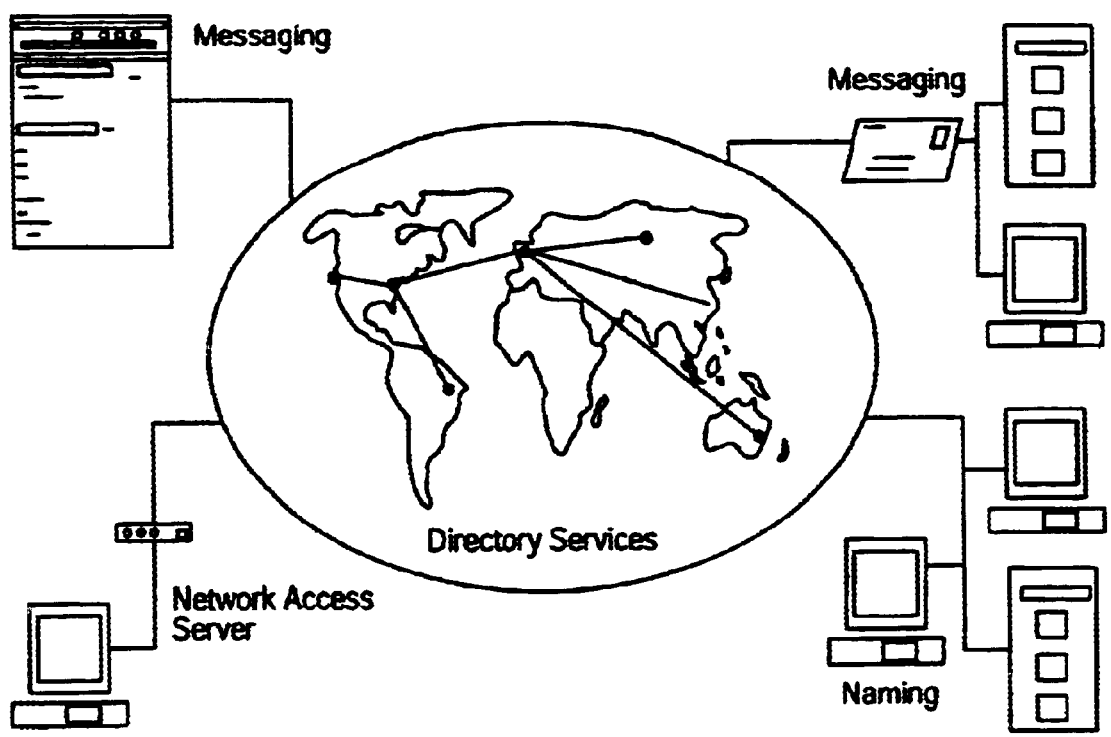
Figure 1A:
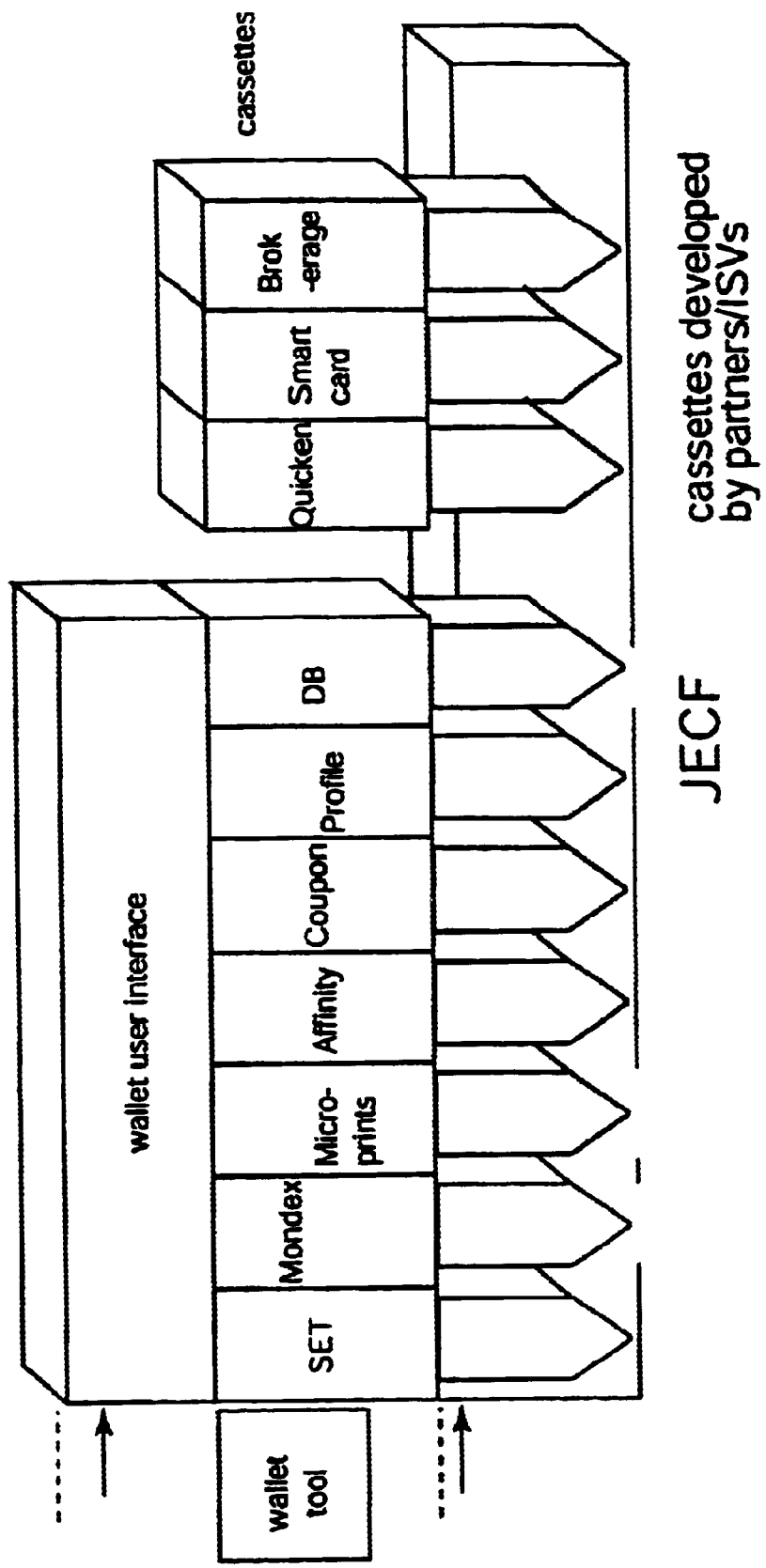
Figure 1A:
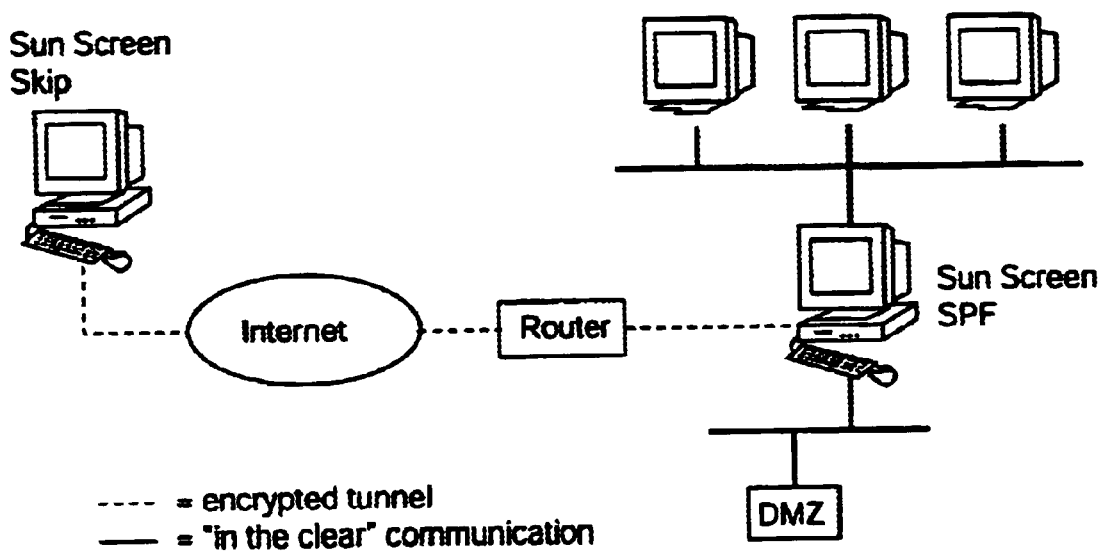
Figure 1A:
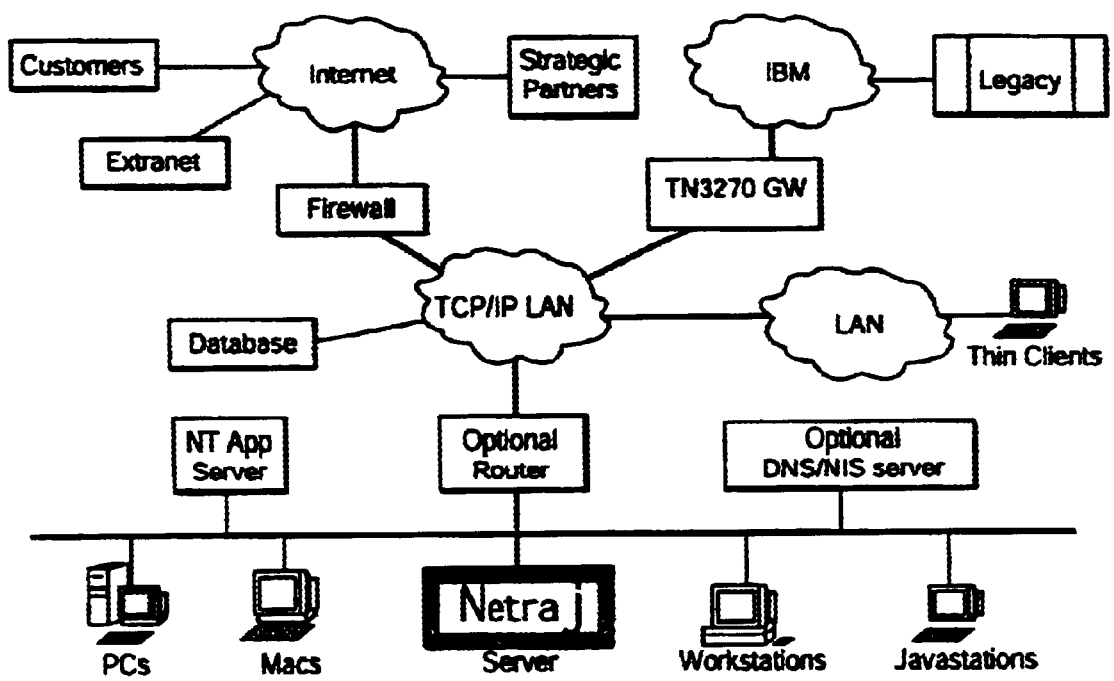
Figure 1A:
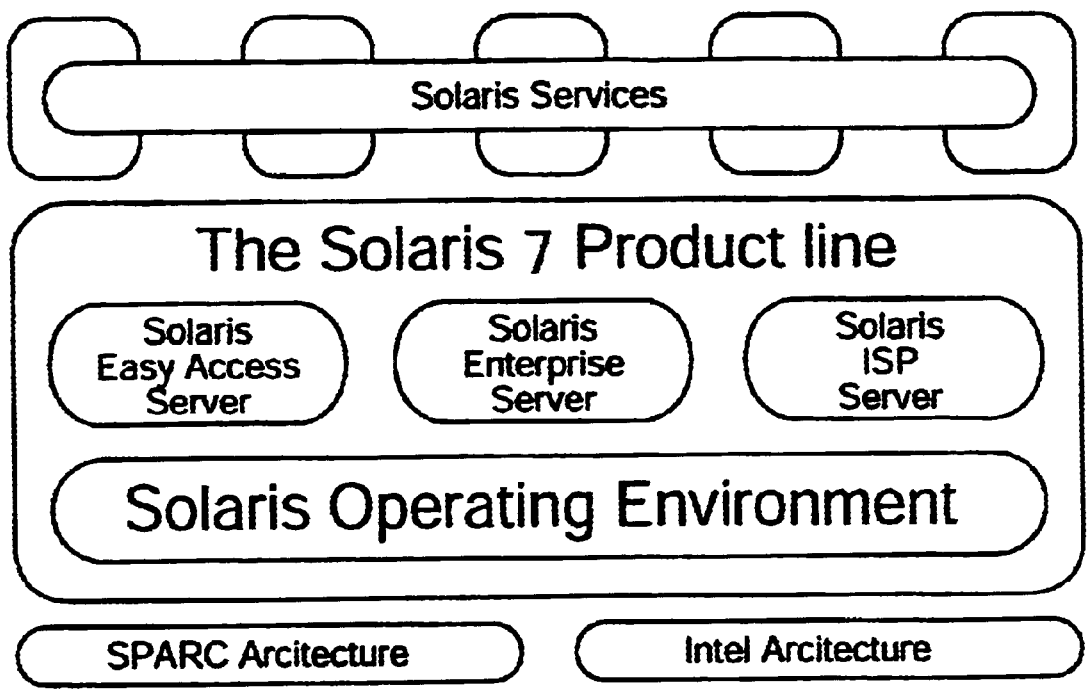

FIGS. 1Z through 1AO illustrate exemplary architectures of various components of the systems of Business1 and Business2. These Figures also correlate with the appropriate portions of the following chart.

1.1 Business1 (www.business1.com)

Business1 offers a variety of products in the hardware, networking, architecture, infrastructure, security and development tool areas. These products are used as the foundation to build applications and systems. Business1 offers limited products with out-of-the-box functionality or application capabilities.

Product Functionality

| Product Name/Category | Product Details |
|---|---|
| Application Server | A platform for the development, delivery and management of enterprise network applications. Based on CORBA and Java, Product1 uses an open and secure architecture to develop business applications. The Product1 product family consists of the following components:<br>    Product1 Studio — a visual integrated development environment tool for developing Java-based applications in Product1 and Java. It incorporates wizards and editors for creating web-based applications, including construction of user interface, data access and PACs. It also integrates with source code control, testing and deployment tools.<br>    Product1 Application Server — a Java- and CORBA-based server that provides state and session management, built-in load balancing, processing of application logic and integration with external databases and enterprise systems.<br>    Product1 Java Object Framework — a framework of reusable Java and JavaBeans objects. A host of Product1 Java classes and methods are available out-of-the-box for custom development.<br>    Product1 Command Center — a Java-based application that provides local and remote management and monitoring of the platform in real-time. This management console provides control of the application server, with the ability to configure a range of properties for each server component and the processes within them. It can also distribute |

-continued

| Product Name/ Category | Product Details |
|---|---|
| | components across multiple systems and manage multiple configurations.<br>The Product1 product family may be extended through these components:<br>    PAC SDK — Product1 platform that allows developers to build customized Platform Adapter Components (PACs) for external enterprise systems.<br>    PACs — Business1 provides a PAC for SAP and PeopleSoft. Business1 partners deliver other 3rd party PACs that can be purchased from partners directly. |
| Internet Mail Server (SIMS) | A family of Internet mail server products that securely handles mail messages in a variety of formats. SIMS also provides a secure Java Administration Console for centralized and remote administration, backup and restore features. SIMS is a replacement for the UNIX sendmail program which has been the target of frequent system break-ins. |
| Internet News Server | Targeted for internet service providers, the Internet News Server is a full-featured news server which offers user-focused interfaces, streamed feeder/reader design, web-based installation and administration and remote access.<br>The Internet News Server is a component of the Product2 ISP Server suite. |
| Forum | Workgroup collaboration tools that allow users to communicate in a heterogeneous environment of Business1 workstations, PCs and Macintosh computers. Forum allows users to share a whiteboard and applications with others and seamlessly transfer files and "chat" with co-workers. |
| Personal WebAccess Browser | Personal WebAccess — a customizable, compact web browser for devices that run the PersonalJava platform. Personal Web Access is designed for manufacturers who want to provide consumers with an easy way to access the Web and retrieve information from a variety of consumer devices, including screen phones, set-top boxes, and wireless hand-held devices. The browser supports common internet services such as authentication, FTP, applets, audio and media files. |
| HotJava Browser | HotJava Browser — a lightweight, customizable browser designed for OEMs and developers who create web-enabled devices and applications. |
| Product3 | A secure, standards-based web server for accessing, managing, and distributing information over the Internet, extranets, or intranets. Product3 supports Java servlet development and network caching of web pages.<br>Product3 simplifies management of website environments through delegation of administrative privileges such as access rights to administer meta-data components or load-balancing. |
| Java Web Server | The first commercially available Java service based on the JavaServer API framework for Java servlets. It uses servlet technology to enable server-side Java applications and provides access control and security features.<br>Java Web Server provides session tracking that provides a mechanism to track how people use and navigate websites. It also provides remote administration and logging features. |
| Directory Services | A multi-protocol, scalable global directory for storing information such as user definitions, user profiles, network resource definitions, and configuration parameters. It employs naming, directory, and authentication protocols on top of a shared, distributed, object repository. Users and applications can use the directory to locate and access information from anywhere in the network. |
| JavaWallet | Java Electronic Commerce Framework (JECF) is Business1's new initiative to create a standard, secure framework within which to conduct business transactions using any combination of currencies and payment instruments such as credit and debit cards, electronic cash and checks, and smart cards.<br>The initial component of the JECF is the JavaWallet, a client-side application that will be distributed as a core component of the Java environment. JavaWallet will allow users of any Java-enabled web browser or operating system to purchase goods and services from JECF-compliant merchant websites.<br>JavaWallet provides a single user interface for electronic transactions, secure from tampering. When a consumer uses a Java-enabled browser to navigate an online mall, selects goods and services for purchase, he can access the JavaWallet for home banking and portfolio management. The consumer owns the JavaWallet that will be used to complete purchases and banking transactions. The user may set spending limits and can monitor spending through an auditable transaction log. Privacy of all data is protected through the use of encryption and digital signatures.<br>Merchants offer goods and services for sale on the Internet using applets which adhere to the JavaWallet architecture. These applets may include interfaces to payment processing, security services, customer profile services and database services.<br>The Java Wallet family consists of the following components:<br>    Java Commerce Business (JCC) — a client side solution for eCommerce transactions. JCC provides users with a wallet-like user interface, a database, and a platform that enables a variety of payment instruments and protocols. |

-continued

| Product Name/ Category | Product Details |
|---|---|
| | Commerce JavaBeans — enables developers to write components to extend JCC functionality such as interfacing with payment servers and other transaction protocols.<br>Gateway Security Model — allows a secure shield around protected APIs and components. |
| Java Card | A card that is embedded with either a microprocessor and a memory chip or only a memory chip with non-programmable logic. The microprocessor card can add, delete, and otherwise manipulate information on the card, while a memory-chip card can only undertake a pre-defined operation. |
| echeck Server | A server that allows the use of electronic checks for transactions. Business1 echeck server verifies digital signatures, processes checks according to the business rules of the bank (e.g. a check over $25,000 requires two signatures), returns invalid checks, and settles all valid checks. |
| Product4 Product Suite | A range of security-based hardware and software that offers packet filtering, encryption, security administration, virtual private network and access restriction. The Product4 Product Suite includes the following components:<br>    Product4 Secure Net — a complete set of products designed to establish perimeter defense, secure intranets, secure remote access, and secure extranets including the following:<br>    Product4 EFS — firewall and security server software that screens network traffic as defined by the organization's security policy. It also acts as a high-speed encryption server to protect information going over untrusted networks.<br>    Product4 SPF-200 — security platform for perimeter defense and electronic commerce. It provides stealthing to help protect an organization from Internet attacks.<br>    Product4 SKIP — provides encryption and key management capabilities which enables PCs, workstations, and servers to achieve secure/authenticated communication. |
| Business1.net | A remote-access strategy and technology that enables users to securely access all personalized data, application and information from Java-enabled browsers. Business1.net uses recently acquired i-Planet's secure, remote access software. |
| Calendar Server | Designed to manage large-scale enterprise calendaring systems, Business1's Calendar Server is integrated with Business1 Internet Mail Server and provides the following features:<br>    Maintenance of Personal Calendars<br>    Group Scheduling<br>    Calendar Security |
| Product5 Internet Server Software Bundle | A web server package solution that includes third-party Internet and security products including the following:<br>    Product5 Administration Software — provides server setup, configuration, and management capabilities through a browser. The Product5 Internet Server can be administered remotely for user access control, email management, software installation and backup and recovery.<br>    Checkpoint FireWall-First! — firewall and security software that protects data and network from unauthorized access from the public Internet. It also offers packet-level filtering.<br>    Trend Interscan VirusWall — virus scanning software that verifies and filters out viruses in communications such as files and emails that interact with the Product5 Internet Server.<br>    Business1 Internet Mail Server — a family of Internet mail server products that securely handles mail messages in a variety of formats.<br>    Network Associates WebStalker-First Intrusion Detection — software that provides around-the-clock monitoring and response to intrusions and misuse of a site and its files.<br>    Business2 SuiteSpot Server including Business2's Calendar, Chat, Enterprise, Messenging and Directory Servers, LiveWire Pro and Informix database. |
| Product2 ISP Serv Bundle | Targeted for internet service providers, Business1's Product2 ISP Server provides users with a bundle of platform extensions including the following:<br>    Internet Administrator — provides secure, remote management of distributed ISP services<br>    Internet Services Monitor — monitors Internet services, identifies and manages network problems<br>    Directory Services — provides a multi-protocol, global directory for storing information<br>    Host Configuration — provides ISP host configuration features including quick, repeatable installation, Product2 security configuration, intrusion detection, server process monitoring, and log file management.<br>    Product4 SKIP — provides encryption and key management capabilities which enables PCs, workstations, and servers to achieve secure/authenticated communication |

-continued

| Product Name/ Category | Product Details |
|---|---|
| Network Management Tools | Product2 Bandwidth Manager — a software product that enables efficient network resource management. By preventing a small number of applications or users from consuming all available bandwidth, it ensures the quality of service to users and network availability to applications.<br>Product6 Enterprise Manager — Business1's distributed network management foundation that manages large heterogeneous networks. Product6 Enterprise Manager supports and manages Java applications built for various network types.<br>Product6 Site Manager & Product6 Domain Manager — offer centralized management for networks of up to 100 nodes. Product features include the following:<br>    Monitoring of events and network health for multiple local and remote environments<br>    Distribution of management data<br>    Management of file systems, print queues and user groups<br>    Balancing of management processing loads across the network |
| Development and Testing Tools | Business1 offers a variety of development and testing tools including the following:<br>Development Tools:<br>    EmbeddedJava Application Environment<br>    JavaBeans Development Kit<br>    JavaBlend<br>    Java Compiler Complier<br>    Java Development Kit<br>    Java Dynamic Management Kit (JDMK)<br>    JavaHelp<br>    Java Management API (JMAPI)<br>    Java JIT Compiler<br>    Java SDK<br>    Java WorkShop<br>    NEOWorks<br>    Personal Java Application Environment<br>    Servlet Development Kit<br>    Product6 ASN.1 Compiler<br>    Business1 Performance Workshop Fortran<br>    Business1 Visual WorkShop C++<br>    Business1 Workshop Teamware<br>Testing Tools:<br>    JavaCheck<br>    Java Heap Analysis Tool<br>    JavaPureCheck<br>    JavaScope<br>    JavaSpec<br>    JavaStar<br>    JavaLoad |
| System Management Tools | JavaPC Software — provides central administration and support for the Java platform on PC-based thin client devices. JavaPC is targeted at OEMs designing thin-client devices such as transaction terminals, cash registers, kiosks and ATMs.<br>Product2 Management Console — Java-based utility that provides views of servers on the network and applications on those servers. It allows administrators to add users, hosts or applications from any client on the network.<br>Product6 Backup — provides automated, backup, recovery and storage management services for files and applications in a wide array of systems on the network including UNIX, NetWare, Windows NT, PC or Apple Macintosh systems. It also provides centralized administration and control through a unified view.<br>Product6 AdminSuite — suite of tools for administering distributed systems and managing user accounts, hosts, groups, administrative data, printer, file system, disk and serial ports.<br>Product5 j Software — browser-based graphical administration tool that provides centralized administration of JavaStation network computers and Java Webtops on PCs. Product5 j provides Java technology clients with connectivity to legacy databases and applications.<br>Business1 Product7 — host-based software used to monitor and administer tape libraries via a Java-enabled Web browser. The Library Monitor allows event logging and notification, remote diagnostics, remote configuration, and remote monitoring of library activity and status. |

1.2 Business2 (www.business2.com)

Business2 Communications offer a variety of server products that support the development and deployment of Internet applications. Business2 also provides applications with out-of-the-box functionality such as electronic commerce.

| Product Name/ Category | Product Details |
|---|---|
| Business2 Commerce Product1 | A suite of pre-built applications that run on Business2's Application Server. These applications include buying, selling, merchandising, and delivering content over the Internet: <br> ECProduct1 — Software for the integration of eCommerce applications with legacy systems. It provides for the sending, receiving, and encrypted transmission of documents among heterogeneous systems of trading partners over the Internet. <br> SellerProduct1 — An application designed to support advanced business-to-business selling over the Internet. SellerProduct1 allows for the enforcement of trading partner agreements and business rules. SellerProduct1 provides the capability to create company-specific catalogs which can be set up to present different products to different users based upon purchase eligibility. SellerProduct1 includes search features, management tools, and order management (including tax, shipping, and payment services.) <br> BuyerProduct1 — An Internet-based corporate procurement application that automates order and delivery, supports complex trading relationships, and allows for the exchange of information via EDI or the Internet. <br> PublishingProduct1 — An application that utilizes both passive and active customer profiling capabilities to create targeted advertising, and to deliver personalized information for superior customer service. Content management tools are combined with application development tools to allow to host and deploy multiple sites. <br> MerchantProduct1 — An online business-to-consumer merchandising solution that provides the following features: <br>     A single shopping cart for each customer, forms filled with predefined account information, tax calculation and discounts, product availability, and up-to-date order status information. <br>     Payment systems, catalog creation and administration tools, an order management system, and rapid customization of a site's business processes through modifiable business rules and presentation templates. <br>     Search capabilities, including hierarchical menus, parametric searches by attribute, and simple keyword searches. <br> BillerProduct1 — An Internet bill presentment and payment (IBPP) solution, particularly for the banking and telecommunications industries. <br> TradingProduct1 — A commerce exchange application that enables trading partners of varying size and technical sophistication to transact business over the Internet through in-context document turnaround capabilities, and customizable prepackaged forms. |
| Business2 Produc | A comprehensive set of components that integrates browsing, email, web-based word processing, chat, and group scheduling to allow users to communicate, share, and access information. <br> Business2 Product2 includes: <br>     Product3 — web browser with support for Java, JavaScript, and SSL <br>     Product4 — an Internet mail client. <br>     Product5 — a web authoring tool. <br>     Instant Product4 — enables people to communicate easily and privately in real time over an intranet or the Internet, either one-on-one or in a group. <br>     Calendar — delivers group scheduling based on a scalable real-time architecture. <br> Browser Customization <br>     Business2 Business Customization Kit — enables Internet service providers, Internet content providers, hardware OEMs, and others to create customized versions of Product2. <br>     Business2 Mission Control Desktop — cross-platform administration tools to configure, deploy, centrally manage, and update Business2 Product2. |
| Business2 Enterprise Server | A high-performance, scalable web server software for deploying the largest-scale web sites. Business2 Enterprise Server includes a built-in search engine and supports standard security and authentication. The integrated LiveWire Pro software also adds content management, data access, and session management capabilities. <br> Business2 also offers FastTrack Server — an entry-level enterprise server with limited functionality. |

-continued

| Product Name/ Category | Product Details |
|---|---|
| Business2 Application Server | A middleware infrastructure that supports the development and deployment of transactional, business-critical Internet applications. Business2 Application Server operates with other Business2 products and includes the following two development tools:<br>    Application Builder — provides an integrated and productive web development environment that enables developers to rapidly deliver enterprise-class web applications.<br>    Extension Builder — allows corporations to develop custom integration with heterogeneous systems and applications across the enterprise. |
| Business2 Directo Server | A directory server that acts as the central repository for customer, supplier and employee information. Business2 Directory Server enables the integration, storage and management of directory information from disparate data sources. It also provides security, authentication and replication features.<br>A Directory Software Developer's Kit provides application programming interfaces that enable developers to directory-enable their applications. |
| Business2 Proxy Server | A system for caching and filtering web content, log analysis, and boosting network performance. |
| Bussiness2 Calend Server | A calendar server that supports the scheduling of meetings, appointments, and resources for thousands of users. |
| Bussiness2 Chat Server | A newsgroup server that provides collaboration services through discussion groups. Business2 Chat Server also supports the moderation of content and administration of discussion groups. |
| Bussiness2 Messaging Server | An email server that delivers messages with embedded sound, graphics, video files, HTML forms, Java applets, and desktop applications. |
| Other Directory & Security Products | Business2 sells a range of products that provide a user and security management infrastructure for large-scale eCommerce, extranet, and intranet applications.<br>    Business2 Certificate Management System — issues and manages digital certificates for extranet and e-commerce applications.<br>    Business2 Directory for Secure E-Commerce — expands the capabilities of Business2 Directory Server to provide additional flexibility of user and security administration for large-scale commerce and extranet applications.<br>    Business2 Delegated Administrator — provides customizable self-service administration for customers and partners to manage their own user and account information.<br>    Business2 Meta-Directory — enables Business2 Directory Server to be automatically synchronized with relational databases as well as network operating system, messaging, and enterprise resource planning system directories<br>    Business2 Security Services — enables developers to incorporate standard Internet security technologies into applications. |
| Other Bussiness2 Products | Process Manager — Enables enterprises to automate and modify business processes such as contract negotiation, bidding and contractor management. Business2 Process Manager supports the development and deployment of processes across extranets and intranets, and manages them for overall efficiency and precision.<br>Process Manager has four components:<br>    Business2 Process Manager Builder — a visual design environment for designing business processes using intuitive features such as drag-and-drop functionality and pick lists. Processes may be stored in Business2's Directory Server.<br>    Business2 Process Manager Engine — the server-based engine that hosts processes designed with PM Builder.<br>    Business2 Process Manager Express — browser-based user interface to Process Manager business processes.<br>    Business2 Process Manager Administrator — browser-based interface for centrally managing Process Manager business processes.<br>Compass Server — A profiling server that offers search, browse and profiling capabilities to help administrators gather and organize enterprise resources scattered across intranets so that users can find and retrieve information more efficiently.<br>Media Server — An audio publishing, broadcasting, and receiving system that enables the creation and delivery of media-rich information, both inside and outside the enterprise.<br>Media server includes four components:<br>    Media Server — play real-time audio feeds, provide on-demand access to pre-recorded audio clips, and synchronize audio with HTML documents, Java applets, and JavaScript applications.<br>    Media Proxy Server — a transparent intermediary between Media Player and Media Servers which provides safe passage through the firewall for audio connections and operates as a reverse-proxy outside a firewall. |

-continued

| Product Name/ Category | Product Details |
|---|---|
| | Media Converter — compresses and converts different audio formats.<br>Media Player — a plug-in needed to access audio files or a live feed from a Media Server. |

1.3 Business3 (www.business3.com)

Business3 primarily provides Internet services for web users. It offers a variety of services including internet access, portal sites, links to online shopping, and chatting. Business3 offers a very limited set of Internet products as it focuses on providing Internet services.

| Product Name/ Category | Product Details |
|---|---|
| Business3 NetMail | A software application that allows Business3 users to access their Business3 mail through a standard web browser without any Business3 software. |
| Business3press | A web publishing tool which may be published to any web server. Business3press offers the following capabilities:<br>　　WYSIWYG editing<br>　　Simple interfaces for creating forms and image maps<br>　　Integrated browsing and editing simultaneously<br>　　"Check Links" function to fix broken links<br>　　Database interaction<br>　　Permissions setting<br>　　Work archive<br>　　MiniWeb — site management tool that provides graphical overview of website structure. It provides a mechanism to save or move multiple pages while maintaining appropriate links. |
| Business3server | A multi-threaded web and publishing server that provides the following capabilities:<br>　　Serves HTML pages and other media files<br>　　Runs CGI scripts and processes server-side includes<br>　　Platform for dynamic web applications: Business3server Dynamic Pages (ADPs)<br>　　Supports Business3server's C and Tcl scripting and APIs<br>　　Supports database connectivity<br>　　Allows users to edit content across the network with Business3press or other authoring tools<br>　　Provides C API plug-in that can be used to serve and rotate web advertisements, as on Business3's site.<br>　　Supports simultaneous connections through multi-threading and in-memory caching<br>　　Supports site administration tasks including account management, document management (automatic version control and archiving), link management, and access control<br>　　Web-based server and page administration<br>　　Provides support for Art Technology Group's Dynamo server<br>Business3server is used extensively on Business3's sites and a number of other Internet sites including the following: primehost.com, Business3.com, digitalcity.com, tile.net, am.net, worldpages.com. |
| Client3 Instant Product1 | A software application that provides online chatting capabilities, directory services for user profiles, and personalized news. |
| Client3 Browser | A browser based upon Microsoft's Internet Explorer which supports common internet services such as graphics, sound, meta-tags, plug-ins, security, FTP, HTTP. |
| Client3 Client | A software application installed on end-user's machines to obtain access to Business3's private network. Business3 Business communicates with a host in Virginia through a proprietary protocol. |
| Client3 Caching Server | A server software that determines if a web page object should be cached and when it should be check for a new version. This procedure, instituted in the Business3 proxy subsystem improves the performance of a website. Business3 Caching Server detects images and automatically compresses them for quick storage and access. |

Now that the details regarding the presentation aspects have been set forth, information will be provided relating to the specific web architecture framework of the present invention. An overview of the hardware and software involved in implementation of the present invention will first be described after which the web architecture will be described in detail.

Figure 2A:
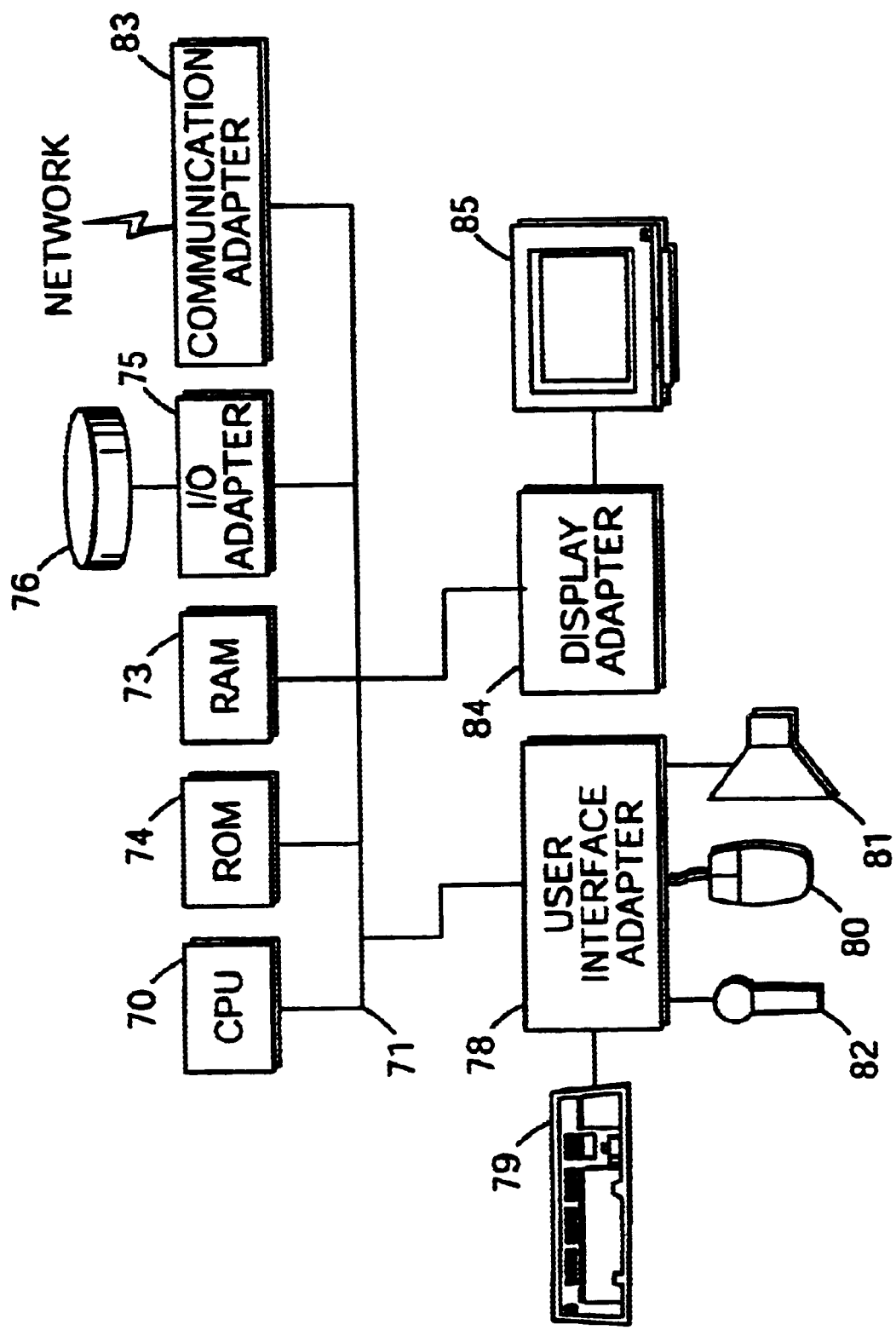
FIG. 2A is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 2A, which illustrates a typical hardware configuration of a workstation in accordance with a preferred embodiment having a central processing unit 70, such as a microprocessor, and a number of other units interconnected via a system bus 71. The workstation shown in FIG. 2A includes a Random Access Memory (RAM) 73, Read Only Memory (ROM) 74, an I/O adapter 75 for connecting peripheral devices such as disk storage units 76 to the bus 71, a user interface adapter 78 for connecting a keyboard 79, a mouse 80, a speaker 81, a microphone 82, and/or other user interface devices such as a touch screen (not shown) to the bus 71, communication adapter 83 for connecting the workstation to a communication network (e.g., a data processing network) and a display adapter 84 for connecting the bus 71 to a display device 85. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Development Framework (IDEA)

Figure 2B:
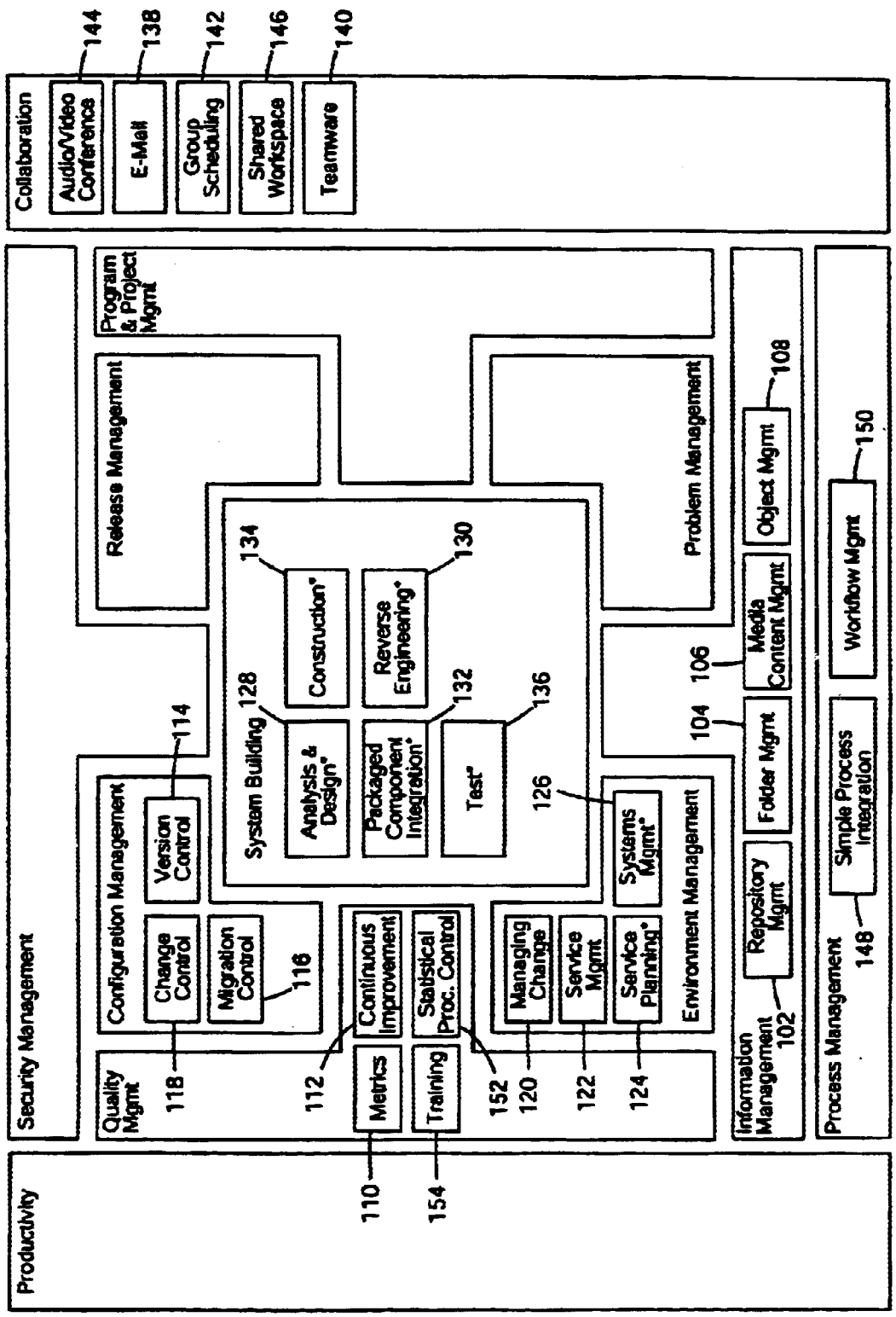
FIG. 2B is an illustration of the Integrated Development Environment Architecture (IDEA).

FIG. 2B is an illustration of the Integrated Development Environment Architecture (IDEA). The Integrated Development Environment Architecture provides a development environment framework and associated guidelines that reduce the effort and costs involved with designing, implementing, and maintaining an integrated development environment. IDEA takes a holistic approach to the development environment by addressing all three Business Integration components: organization, processes, and tools.

The development environment is a production environment for one or several systems development projects as well as for maintenance efforts. It requires the same attention as a similarly sized end-user execution environment.

The purpose of the development environment is to support the tasks involved in the analysis, design, construction, and maintenance of business systems, as well as the associated management processes. The environment should adequately support all the development tasks, not just the code/compile/test/debug cycle. Given this, a comprehensive framework for understanding the requirements of the development environment is be used.

Another reason for the comprehensive framework is that it is important to get the development environment right the first time. Changing the development environment when construction is fully staffed entails serious disruptions and expensive loss of productivity.

Experience has shown that within the same medium- to large-size project, with the same people, moving from a poor to a good development environment, productivity is improved by a factor of ten for many tasks. The improvements come in two categories:

The elimination of redundant and non value-added tasks

The streamlining of useful tasks

While it seems intuitive that most tasks can be streamlined, the following list gives a few examples of redundant tasks that must be eliminated:

Analysis to determine how to merge the uncoordinated changes applied by two programmers to the same module Re-entry of the source code and retesting of a module, which was accidentally deleted Recurring discussions about "what a design packet should contain" or "what constitutes good programming style in a particular context"

Repeated design, coding, testing, and maintenance of very similar logic (for example, error handling, date conversion and manipulation, main structure of a module)

Searching for the manuals of a particular productivity tool to find information

Remigration to system test of a cycle, because the impact analysis for a change request was incomplete Requesting support from another team (for example, environment support, information management) and waiting unnecessarily for a response On a smaller project, these problems can be solved using a brute force approach. This becomes very expensive as the project grows, and finally impossible. A well-designed development environment becomes important as the project team reaches 20–30 people and is absolutely critical with a project size of more than 50 people.

The investment required to design, set up, and tune a comprehensive, good development and maintenance environment is typically several hundred development days. Numbers between 400 and 800 days are commonly seen, depending on the platforms, target environment complexity, amount of reuse, and size of the system being developed and maintained.

Development Organization Framework

Figure 2C:
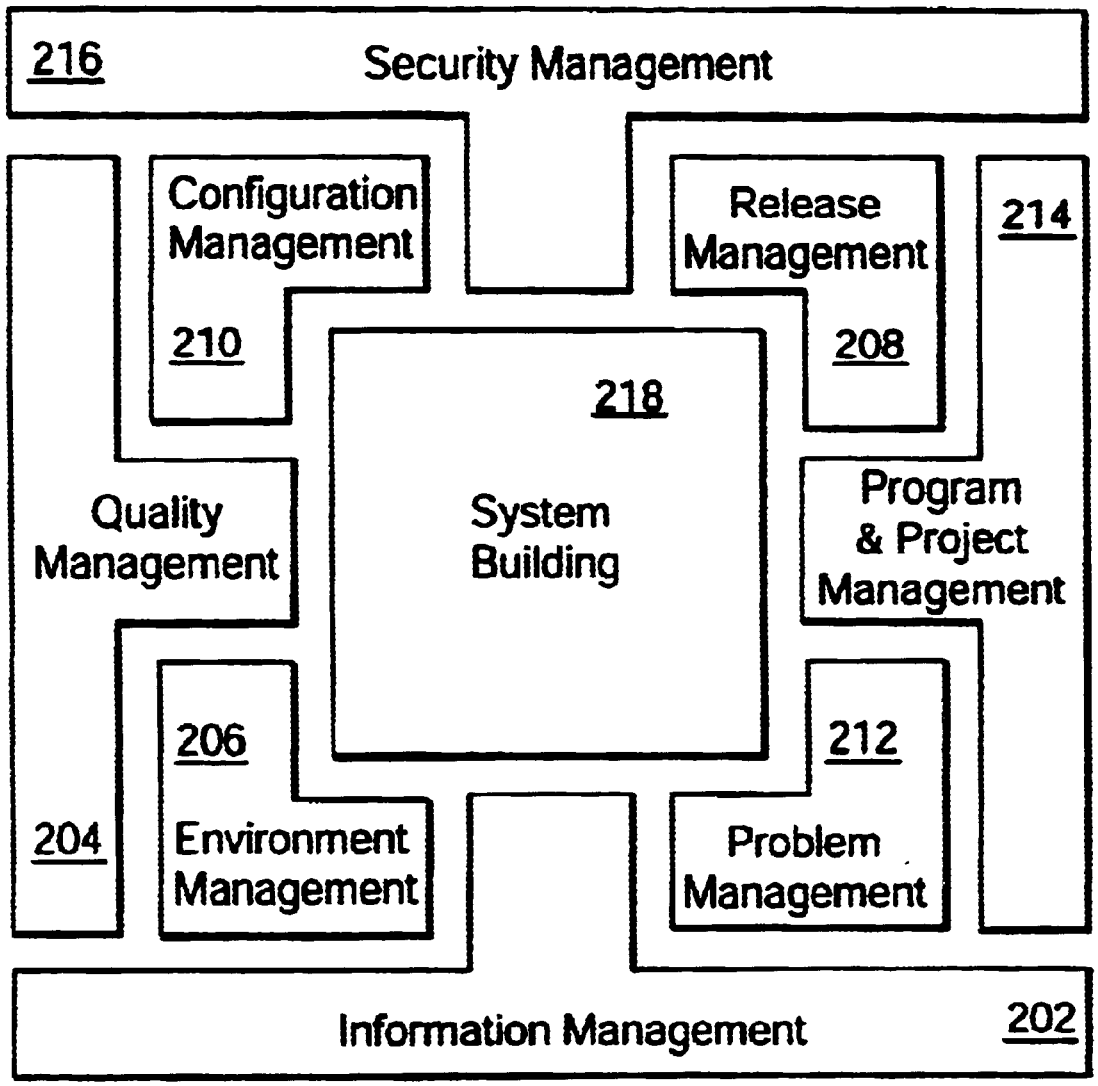
FIG. 2C is an illustration showing a Development Organization Framework in accordance with one embodiment of the present invention.

FIG. 2C is an illustration showing a Development Organization Framework in accordance with one embodiment of the present invention. When designing a business application, it is crucial to keep in mind the organization that will use the system. The same is true of the development environment. The development organization's size, structure, experience, and maturity should strongly influence the choice of tools and the way the tools are integrated. If this link is not understood, the benefit of tool support will be minimal in many areas, and may significantly reduce productivity.

In the same way, when a new business capability is introduced, it is crucial to keep in mind the needs for training and organizational change that which may accompany the technical change. This is also true of the development environment. When a new development environment is put in place, the developers need to learn not only how each individual tool works (for example, how to use the compiler), but also how the tools work together to support the organization as it performs well defined processes.

The Business Integration Methodology (BIM) provides valuable information on organizational issues.

Relying on the Business Integration Methodology and its project organization guidelines (0940—Organize Project Resource Task Package), the following should be prepared:

A list of responsibilities covering both responsibilities for end products and those for on-going processes A Responsibility, Accountability, and Authority profiles deliverable (RAA) for each role in the Development team, making sure that all the responsibilities listed earlier are covered The RAA profiles deliverable consists of statements about the responsibilities, accountability, and authority of each of the positions in the development organization. These statements define the role of each position in terms of:

Responsibility—What objectives the position is expected to accomplish

Accountability—How and by whom the performance will be measured

Authority—The position's decision-making capabilities and limits

In accordance with the IDEA Model, the following management teams with responsibilities for the key management functions are defined as:

The Information Management team 202

The Quality team 204

The Environment Management team 206

The Release Management team 208
The Configuration Management team 210
The Problem Management team 212
The Program and Project Management teams 214
The Security Management team 216

Together, these teams support the efforts of the System Building team, which is charged with the analysis, design, build, and test of the system to be developed. These teams represent real roles, and on a given program the same people may play different roles.

Security Management

The evolution of new technologies and expanded access to a virtual world has increased the security risk of conducting business. It is therefore essential to recognize the need for a new unit in the organization, specifically dedicated to ensuring that security is handled appropriately. At the Program level, the Security Management unit needs to:

Ensure all security issues are effectively addressed throughout the program (all business and IT processes).

Act as facilitator and approving body for all new and existing initiatives that contain security components.

Own responsibility for the organization and facilitation of working groups that would address security issues.

Be responsible for development and maintenance of the Security Plan.

Figure 3:
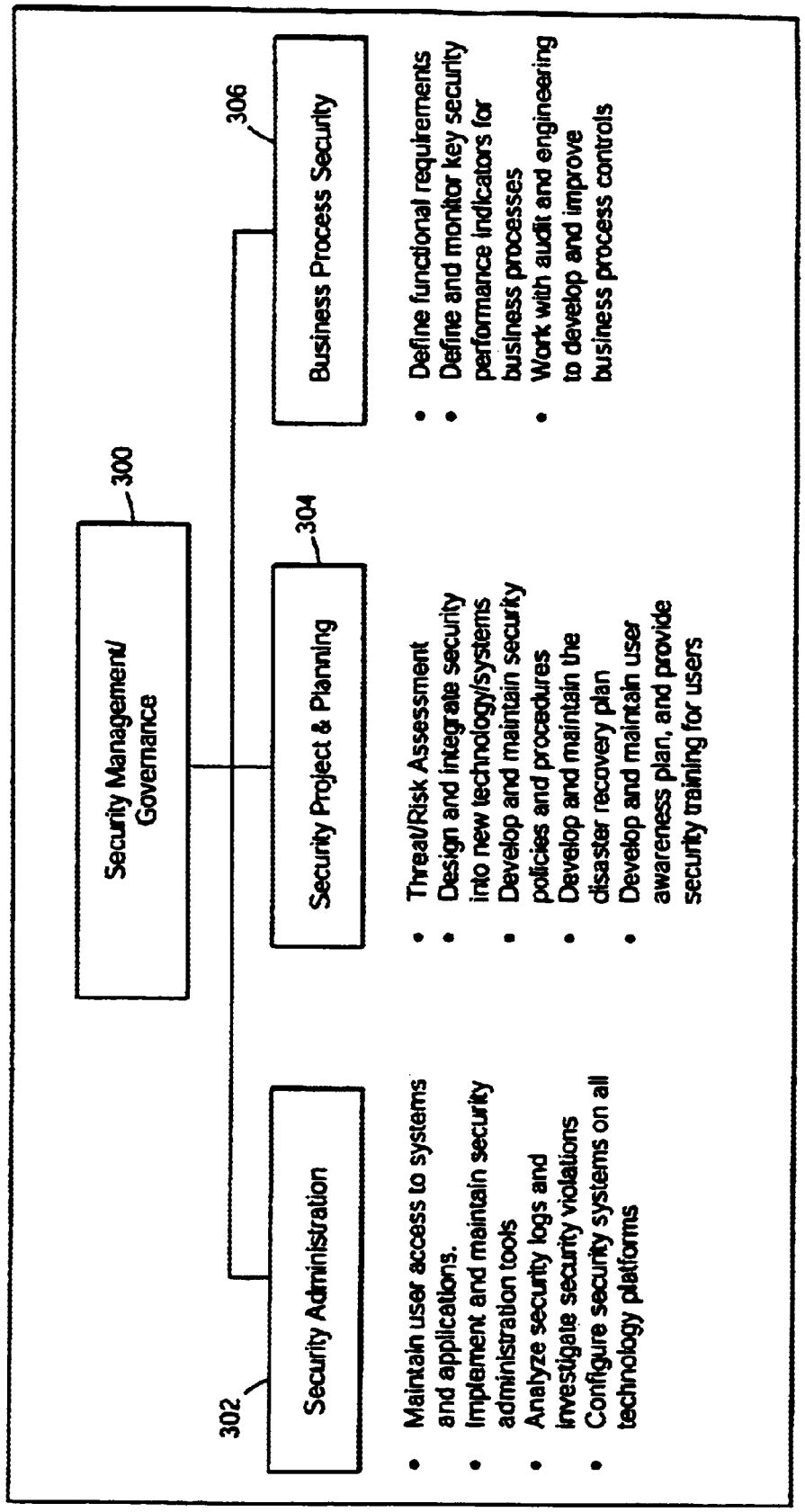
FIG. 3 is an illustration showing a security organization functional according to one embodiment of the present invention.

FIG. 3 is an illustration showing a security organization according to one embodiment of the present invention. A Security Management Team may have a security management 300, under which are an administration team 302, a projects & planning team 304, and a business process security team 306. The size of the Security Management team, and the way in which it is integrated into the development organization depends on the degree to which security is a factor for each specific environment. For example, the security risks associated with an Internet-based online banking system are far greater than those of a fully isolated client/server system, and therefore warrant a larger team with broader responsibilities and greater influence.

More details about the Security Management team, and other security aspects can be found in the *Security in eComerce Executive Planning and Implementation Guides* to be published by Global TIS Security.

Information Management

The Information Management team is responsible for ensuring that the project's knowledge capital and information resources are managed effectively. This includes:

Ensuring integrity

Ensuring accessibility

Ensuring quality and consistency

Information Management encompasses Repository management, but generally has a broader scope than merely the repository contents, because most repositories are not capable of holding all the information resources of a project. It is, for example, common to have key project information reside in a combination of repositories, teamware databases, flat files, and paper documents. It is the Information Management team's responsibility to ensure consistency across all these formats.

The responsibilities of the Information Management team therefore cover:

Repository Management

Folder Management

Object Management

Media Content Management

Information and data reuse coordination

In addition to managing the information for the System Building team, the Information Management team must also manage the information resources of the other management processes—quality management, environment management, and project management.

In order to delineate the responsibilities of the Information Management team, it is useful to state those areas that are out of scope. The following are not included:

Performance of daily backups—this is handled by the Environment Management team

Database administration—this is part of the Architecture team responsibilities

Performance tuning of the information repositories—this is handled by Environment Management Repository Management The Information Management team is ultimately responsible for the contents of the repository. They need to have an intimate understanding of the repository structure and the rules that govern how different objects should be stored in the repository. Although most of the input to the repository are entered by designers, the Repository Management team must manage this population process. Rather than taking a policing role on the project, they should work as facilitators—helping the designers do things correctly the first time, thereby maintaining the integrity of the repository. Without strong repository management, the benefits of using a repository quickly diminish.

In many situations the Information Management team must make decisions that affect functional areas. To empower the Information Management team, the Application teams should include the Information Management team in relevant design discussions. This facilitates the validation of design outputs.

Folder Management

Folders (or directories) can be very useful in gaining control over the overwhelming amount of information produced on a large project. Their utility greatly increases if they are managed appropriately. This management is based on easy-to-follow, easy-to-enforce standards.

Object Management

The responsibilities involved with object management are very similar to those involved with repository management. However, in order to facilitate and promote reuse, it is recommended to have a librarian whose responsibilities include:

Reviewing designs

Packaging classes and components for reuse

Managing maintenance and upgrades of common components (a strong relationship with Configuration Management team is required)

Media Content Management

The methods of handling media content are somewhat different from those surrounding more traditional development content such as code or documentation, for this reason, a role should be defined that is responsible for the management of all media content.

Quality Management

The Quality team is responsible for defining and implementing the Quality Management Approach, which means defining what Quality means for the Program Leadership, and then implementing the procedures, standards, and tools required to ensure the delivery of a quality program. The Quality Management Approach addresses concepts such as expectation management, quality verification, process management, metrics, and continuous improvement.

Since quality is the result of the interaction of many teams working on multiple processes, the Quality team is responsible for ensuring effective cooperation between teams and good integration of the development processes. The Quality team must therefore forge strong links with all the other project teams.

It is important to note that the Quality team is not only responsible for ensuring the quality of the system building process. The Quality team is also directly involved in ensuring the quality of the other IDEA management processes.

Program & Project Management

The Program Management team is responsible for delivering business capability. In this respect, it is responsible for the System Building and other management teams.

In addition, other management responsibilities that do not have a specific team or role defined within IDEA also belong to the Program Management team. These include:

Contingency Management

Financial Management

Issue Management (decisions to be made regarding the development of the business capability, not to be confused with problem management)

Program Performance Reporting

Resource Management

Risk Management

Vendor Management

The Project Management team is responsible for producing a deliverable or set of deliverables. As such, it is responsible for:

Planning and control of delivery

Milestones and schedule

Resource consumption

Risk and quality (at deliverable level)

Configuration Management

The Configuration Management team is responsible for defining the approach the program takes to deal with scope, change control, version control, and migration control, and for putting in place the policies, processes, and procedures required to implement this approach.

In other words, the team is responsible for maintaining the integrity of software and critical documents as they evolve through the delivery life cycle from analysis through deployment.

Release Management

Delivering a system on a release-based approach means delivering the system in a series of consecutive releases, increasing or refining functionality progressively. Some of the main drivers to such an approach include:

To release business benefits early

To mitigate impact on the organization

To keep the change program up to date

To optimize processes

To test proof of concept

To reduce risk

The Release Management team is responsible for:

Planning the capability release design and development effort, based on the capability development approach and timeline.

Measuring and monitoring progress using established processes to ensure that a capability release is delivered on time, within budget, and that it meets or exceeds expectations.

Managing project interdependencies to ensure delivery of the capability release.

Ensuring that resources are used effectively across projects for the release.

As with many other management responsibilities described in IDEA, Release Management is more a role than a function. It is good practice to have as many areas as possible represented in the Release Management team; for example, Design, Construction, Configuration, and Environment Management team members would make up a typical Release Management team, each providing input based on their own perspective.

Environment Management

Just as a business application requires support and system users require service, the development environment requires system operations daily, and developers require ongoing support in order to use the environment effectively (In fact, the complexity and frequency of these operations is often greater than that of the execution environment).

Figure 4:
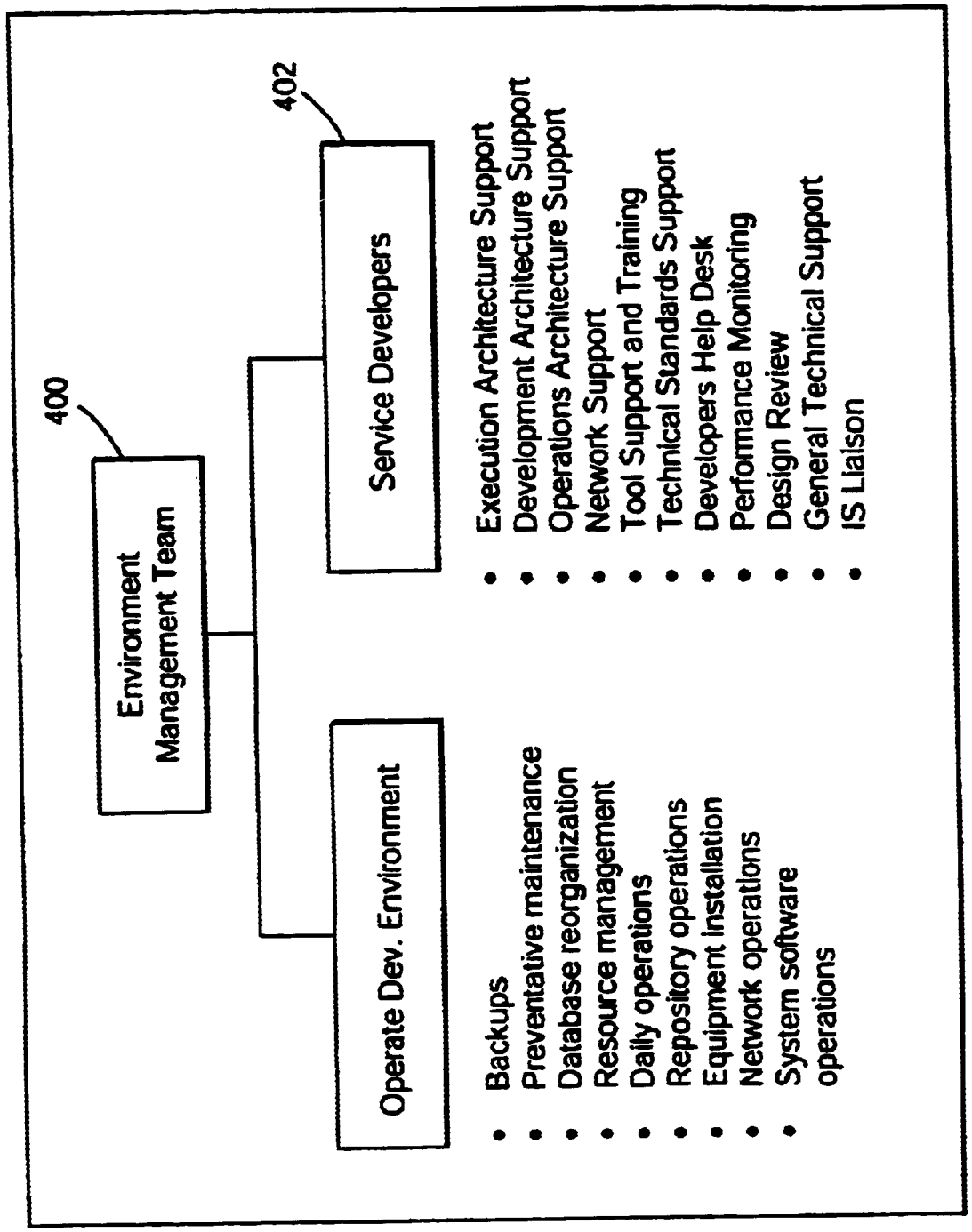
FIG. 4 is an illustration showing the responsibilities of an Environmental Management Team.

To ensure that this area receives the necessary attention, an Environment Management team 400 should be assigned these tasks. FIG. 4 is an illustration showing the Environmental Management Team responsibilities.

The Service Group 402 serves as a single point of contact for developers. It interfaces with the Architecture team to provide answers to questions from developers. To avoid adding overhead to the issue resolution process, the support group must be staffed adequately to ensure that all questions are answered. For example, the support group should recruit people from the Technology Infrastructure team at the completion of Technology Infrastructure development.

Problem Management

Problem Management is concerned with the discrepancies that result from the testing process and the management of design problems detected during verification or validation steps throughout the development process.

The Problem Management team is responsible for defining the problem tracking and solution process, and for providing tools and procedures to support the solution process.

System Building

The Business Integration Methodology (BIM) describes System Building under the following activities:

Design application

Build and test application

Design technology infrastructure

Build and test technology infrastructure

For this reason, the System Building teams are organized into application and technology Infrastructure.

Application Team

Figure 5:
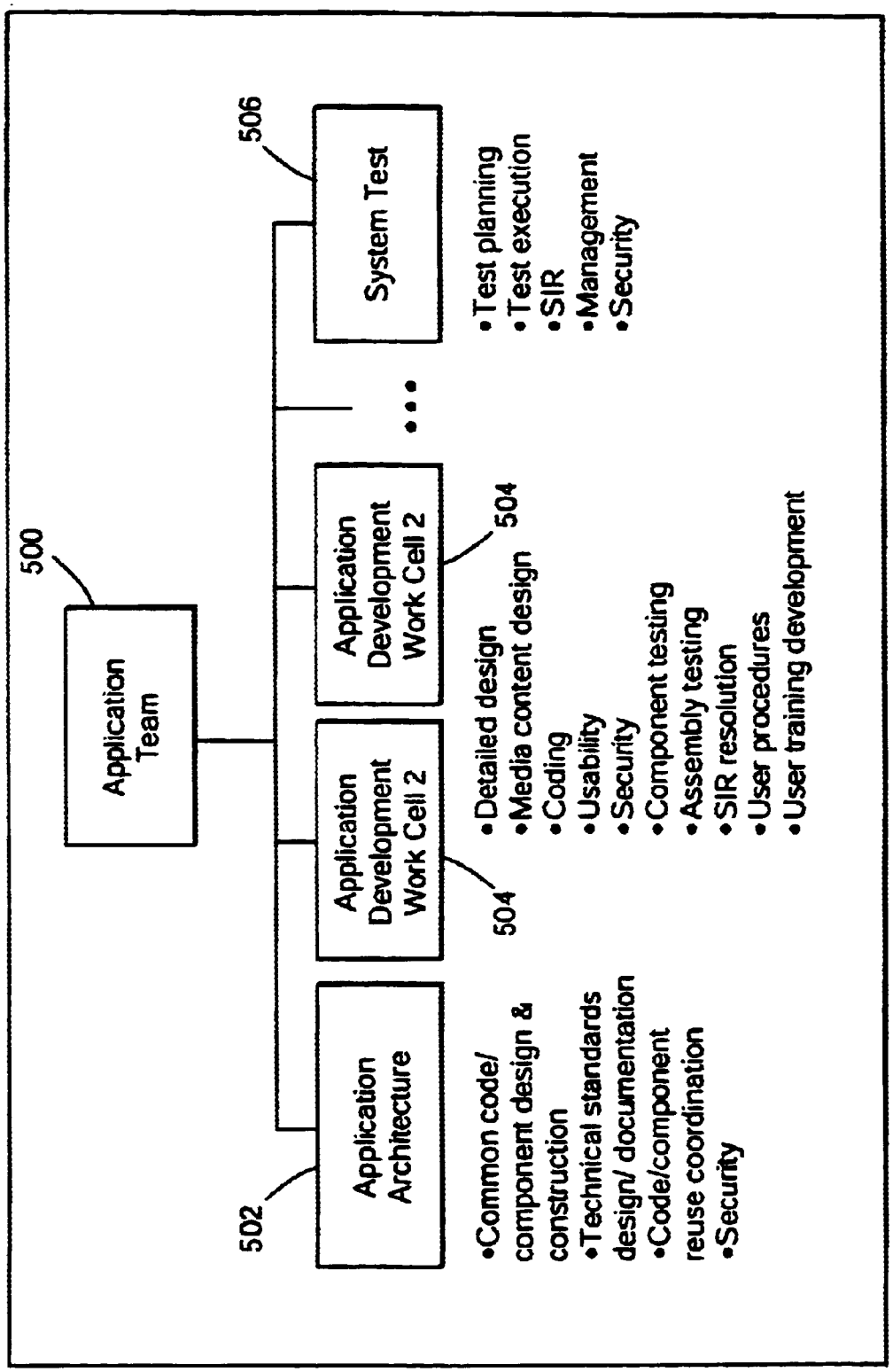
FIG. 5 is an illustration showing the responsibilities of an Application Team structure.

The Application team 500 consists of three separate subteams: Application Architecture 502, Application Development 504, and System Test 506. FIG. 5 is an illustration showing the Application Team structure and responsibilities.

The structure of the Application team evolves as the development process continues—as the development of the application architecture components is completed, the Application Architecture team's roles may change. While the team continues maintaining the application architecture components, some team members may be deployed to the Application Development team. Here their roles can include helping application developers to correctly use the architecture components, providing development support, and performing code reviews, and so forth.

As systems become more user-facing, important new roles are emerging that must be integrated into the Application Development teams:

a) Media Content Design

For any system with a user-facing component, it is extremely important that media and design specialists are involved as team members at an early stage in the design of the system. In systems with simple user interfaces, this helps to ensure usability and consistency. As user interfaces become more complex, the early involvement of design experts not only leads to more creative and attractive user interfaces, but also reduces the risk of further alteration to work at a later stage.

b) Usability

Often coupled with Media Content Design, it is vital that a role for usability is defined within the Application Development teams. This will ensure the usability of the system from the perspective of target user groups.

Technology Infrastructure Team

The technology infrastructure evolves throughout the project and responsibility for managing and evolving the infrastructure must be clearly defined. Therefore, rather than having a single amorphous 'technical team' (responsible for operations, support, architecture evolution, and more), it is important to define a dedicated technology infrastructure team. By allowing the technology infrastructure team to focus on the technology infrastructure, rather than the day to day running of the environment, the project increases the chances that the technology infrastructure will provide good support for the business applications.

In practice, the Technology Infrastructure team is the team that will implement the IDEA framework.

The Technology Infrastructure team is responsible for:

Data design and management

Database administration

Database tuning

Execution architecture design and construction

Development architecture design and construction

Operations architecture design and construction

Network design

Technical standards design and documentation

System software selection

Performance tuning of the final system

Security infrastructure development

Note: The responsibilities of the Technology Infrastructure team may overlap with those of the Application Architecture team, and on some projects the two teams are often combined.

Development Processes Framework

A thorough understanding of the development processes is a prerequisite for ensuring that the tools effectively support the organization and the processes they are intended to support.

The Development Process Model

The Development Process Model is a framework that facilitates the analysis of the many concurrent processes of systems development. This analysis helps understand process interaction, which, in turn, affects organizational interaction and defines a need for tools integration.

The Process model is simple—at its core is the system building process, which is surrounded by eight key management processes.

The core activity—systems building, depends strongly on support from the surrounding management processes, which all affect each other:

a) Information Management manages the information that supports the entire project—information that is used both in systems building and in other management processes b) Security Management covers all areas of development security, from coding standards, to security verification.

c) Quality Management pertains to all areas of the development environment d) Program and Project Management must manage all the management processes in addition to managing the systems building process e) Environment Management supports the environment where management processes are performed, and where systems are being built f) Release Management manages the simultaneous development of multiple releases g) Configuration Management, often closely linked with release management covers the version control, migration control and change control of system components such as code and its associated documentation h) Problem Management pertains to the problem tracking and solution process Process Definition For a given project, each of the processes must be defined at a greater level of detail than that which any methodology can achieve. This additional specification consists of a set of procedures and standards that specify how to perform the work and what to produce at each step.

Standards specify what the results should look like. They may include industry standards and more formal (de jure) standards, such as POSIX compliance, but most standards are project specific and determine, for example, how to structure and name system components and where to place system components. Standards make it possible for a large team to exchange information effectively and to work productively together.

Standards should focus on what must be common, and should not become a goal in themselves. Erring on the side of over-standardization stifles productivity. It is, however, often the case that unforeseen events (such as platform demise, tool evolution) will be easier to tackle the more unified the development approach has been. Unfortunately, there is no substitute for experience when making the detailed decisions on exactly what should be standardized. Factors to take into account must at least include:

Life expectancy of the system under development—the higher the life expectancy, the more standards are warranted Life expectancy of the development organization—the higher the life expectancy, the more standards are justified Attrition—a stable organization can tackle more detailed standards than a volatile one Expected change in the environment—a high rate of change provides greater opportunity to reap the benefits of a standardized approach Procedures specify how to perform a task. They are generally guided by the methodology but provide information at a lower level of detail. They are highly environment-specific, and take into account the organization, the standards, and the tools in the environment. Procedures often specify the techniques to be used. They may specify which tools to use and how to use the tools that support these techniques.

Many processes require individual judgment, and the way to perform these processes cannot be specified in detail. In such cases, it may be valuable to provide guidelines that do not have the mandatory flavor of procedures but rather that of valuable advice.

While it is easy to generate zeal to set up standards and procedures at the beginning of a project, it can sometimes be more difficult to ensure that these are enforced throughout the project. Two considerations are useful. Firstly, standards must be easy to follow. It should be easier to follow the standard than doing things any other way. This is generally achieved by supplying the training, tools, and support needed to facilitate a given work style. For example, developing and distributing application program shells, which respect the architecture and standards, facilitates programming and contributes to ensuring broad standards compliance. Secondly, the responsibility for enforcing standards must be clearly identified and assigned. Standards enforcement must take place as a natural part of the process and at well-defined check points before work flows to the next task, or (even more importantly) to the next group or team.

A very useful way of complementing the specification of procedures is to provide samples. Samples can sometimes convey a message much faster than pages of explanatory prose. Sample programs are generally very useful. Other samples may include logs, which demonstrate interaction with tools, a sample change request, or a sample request for technical support. Samples can sometimes be created efficiently by taking screen dumps. This can be much faster than specifying what the screen should look like in theory.

Samples and standards must be high quality—any quality breach will be multiplied when developers start using them. It is therefore imperative that samples and standards not be created in a vacuum but be based on concrete experience with the project's development environment. Some pilot development work often proves extremely useful when fine tuning the standards.

When documenting the process, it is useful to develop an approach and process description for each project segment and for each high-level process. This document summarizes the support available for that segment or process. It refers to all the standards, procedures, guidelines, and examples relevant to a collection of tasks. Such a summary document makes it easier for developers to navigate the standards and hence to follow them.

Process Integration

To ensure that the project team works effectively together, numerous processes must be integrated. A simple example is provided by the required integration between design and construction. A more subtle one is the integration of product quality inspection and the continuous improvement process.

As process integration frequently involves several teams, it is crucial to understand the interfaces between processes and teams to ensure good hand-offs. This understanding must have a direct impact on tools integration, so that integrated processes are supported by integrated tools. Tools that support multiple processes performed by the same individual must, at a minimum, be integrated at the user interface level and should ideally be integrated at the process level. Tools that support processes performed by different individuals may only have to be integrated at the data level.

Security Management

Processes must be put into place in order to ensure security is properly designed and built into the system that is being developed, including:
  Definition of security requirements based on business risk
  Development of security standards, guidelines and procedures
  Implementation of security controls
  Security validation Security Requirement Definition Security requirements are the outcome of the security Risk Assessment. This is the process of identifying business risks, identifying system vulnerabilities or weaknesses that can impact those risks, and recommending mechanisms to control the vulnerabilities. Specific confidentiality, integrity and availability requirements for the new system and the development environment are defined through this process.

Security Standards, Guidelines and Procedures

Security standards, guidelines and procedures provide security direction to the implementation. They will help define how the security requirements developed through the Risk Assessment must be addressed in all areas of the development environment. They will include security standards for the development environment infrastructure, procedures for the development processes, standards for the design of the security architecture and security guidelines for programming. It is especially important to ensure the security of the development environment because if these systems are broken into and back doors are introduced, it may lead to later compromise of the production system. It will be the responsibility of all developers that these security controls are implemented and adhered to throughout the development process.

Security Validation

In order to ensure the security of the system, periodical security audits should be arranged, in order to verify that the processes and architecture and application components that are being developed conform to security proven practices. This may be done by an external body specializing in security (such as Global TIS—Security) in the form of interviews, architecture and code reviews, and automated tool assessment.

Information Management (202)

A vast amount of information is generated within the development environment, which needs to be carefully managed (for example, design documentation, application code, media content, test plans and test data). Information Management generally involves Repository Management, Folder Management and, where applicable, Object Management and Media Content Management.

Since a number of teams rely on the service provided by the information management team, it is important that the level of service to be provided be chosen carefully, documented, and communicated. The arrangement should take the form of a Service Level Agreement (SLA). Such an SLA typically defines how quickly a new data element is created and how repository changes are communicated. More generally it defines the division of responsibilities between the information management team and the other project teams at a detailed level.

Repository Management (102)

Repository Management includes activities such as:
  Monitoring and controlling update activities in the repository
  Receiving and validating data element change requests
  Creating and modifying data elements
  Enforcing project standards regarding repository objects
  Validating the contents of the repository to avoid redundancy and inconsistencies
  Ensuring accuracy of the repository contents so that the repository reflects the applications being developed
  Importing and exporting from one repository to another
  Maintenance of the information model (or metamodel), which describes how data is represented within the repository As many repositories do not provide sufficient versioning functionality, it is common to have more than one repository on large projects. Typically, there may be one repository for development, one for system test, and one for production. This allows better control, but also requires significant resources to move repository objects from the development environment to the system test environment. By merging the development and system test repositories, the medium-sized project has a potential for productivity gains. If these gains are to be realized, great care must be taken when making corrections during system test. As a common repository is shared, any error analysis involving repository objects must take into account the possibility that these objects could have changed since the previous migration to system test. This situation can be managed by meticulously maintaining a comprehensive change log.

Another reason for maintaining several copies of the repository is the existence of concurrent projects focusing on different releases. If this is the case, it may be beneficial to maintain delta repositories, which document those components that have been modified. This requires strict repository management but the reward can be significant. It allows the merging of several releases, which have implemented complementary functionality, but which have modified a few shared components.

A single development environment may have to deal with multiple repositories:

For functional reasons, one repository might be integrated with an upper-case design tool and the other with a lower-case generation tool In a multisite environment, repositories may be distributed over different locations. In order to keep these repositories synchronized, well defined development processes must be implemented.

Repository Management can be divided into the following areas:

Security

Maintenance

Validation and mass change

Analysis, reporting, and querying

Security

Restricted access to various repository object types is necessary to ensure high quality repository content, because developers sometimes take shortcuts and make unauthorized changes to meet their deadlines. When standards have been set, a good way to enforce them is to restrict personnel through the use of locking mechanisms. Access to repository object types will change throughout the project.

The data elements should usually be controlled by the Repository Management team, because they are the basic building blocks of the system and have broad reuse. Poorly defined data elements can cause inconsistency, redundancy, and generation errors.

Data elements should therefore be locked at least by the time construction starts, and possibly earlier, depending on the discipline of the team. Project members must be allowed to browse the data elements, but only the Repository Management team should be allowed to modify or unlock data elements. In some repositories, it is difficult to restrict the creation of repository objects. If this is the case, it may be acceptable to let designers create data elements if these are reviewed and locked at the end of each day. Increased control can be obtained by having designers submit requests for new data elements to the repository administrator. This allows the repository manager to evaluate whether the new data element is justified, or whether an existing one should be used.

Repository Maintenance a) Creating and Maintaining Data Elements

Requests for data element changes can be forwarded using a database or paper-based system. Based on functional and technical knowledge, the repository administrator evaluates the requests and may involve other teams to make appropriate decisions.

The database used to request data element changes during design and programming should be separate from the project's change request database. This will simplify and speed up the change process. When data elements have to be changed during system test, however, the impact can be much greater, and the regular change request database should be used.

Whenever a data element is changed, impact analysis must be performed to understand the side-effects. Whereused reports are useful to determine these side-effects. The repository manager must be able to obtain the list of direct references and the list of all components affected indirectly (transitive closure). In the latter case, a message based on a record containing a group, which makes reference to a changed data element is considered to be indirectly affected by the change.

When adding a data element, no functional equivalent must exist, because redundancy creates difficulties for impact analysis and future maintenance.

b) Creating and Maintaining Other Repository Objects

The objects related to dialog definitions, reports, messages, and so forth, are usually maintained by the designers and programmers. When the dialogs and report programs are tested, approved, and ready to be promoted to the system test environment, the related objects must be locked. This is the responsibility of the Repository Management team.

Repository Validation and Mass Changes

Keeping thousands of data elements consistent and in compliance with project standards requires a sustained effort. This daily effort is crucial to avoid a massive cleanup, which would be necessary if the repository manager ever lost control of the repository.

Detailed, project-specific standards should exist for defining repository objects. These standards can form the basis for a repository validation program, which can run through the entire repository and report on detected deviations from standards. In some cases, this program can also enforce the standard.

Mass changes to the repository can be performed when the validation reports show the occurrence of many standards violations that follow a common pattern. This may occur in cases where:

Project standards have been incomplete

Project standards have changed

Repository management has been poor

New objects have been imported from another repository

Analysis, Reports, and Queries

Certain reports should be run daily, such as the list of new data elements or modified data elements. These reports can serve as an audit trail of changes and can be used to communicate changes to the entire team. Procedures should specify which reports are run daily and what their distribution should be.

The Repository Management team performs certain analyses repeatedly. Standard analyses such as impact analyses should be specified in detail to facilitate staffing flexibility.

When supporting specific kinds of repository analysis, the Repository Management team can provide custom reports or ad hoc queries that satisfy particular needs.

Folder Management (104)

It is important to set up and communicate a detailed folder structure with specified access rights from the beginning. Contents of folders must be checked regularly to ensure that folders contain what they are supposed to.

Two main strategies exist.

- Folders can be organized by type of component so that one folder contains all the include files, one folder contains the source modules, one folder contains executables, and so on.
- Folders can also be organized functionally so that all the common components reside in one folder and each application area stores its components in its own folder.

Choosing the strategy depends on how components are named, on the number of components, and on the tools used. If naming standards make it easy to identify the component type (for example, by using suffixes), organizing them by functional area is generally useful and straightforward to administer. Some tools assume that closely linked files (for example, source and object modules) reside in the same folder.

Another important distinction is the one between work in progress and completed documents that have been approved. This distinction can be supported by a folder structure with carefully chosen access rights.

This distinction makes it easy to retrieve a consistent copy of project documentation for someone who is new to the project.

While scratch folders may be useful in certain contexts, the proliferation of miscellaneous folders with cryptic names can make it very difficult to navigate the information. Some useful guidelines include:

- Keep the folder structure under central control.
- Within personal folders, allow users to create any folder structure.
- Clearly assign ownership for the contents of each folder.
- Document each folder, either in a central location, or in the form of a readme type file within the folder itself. The high-level documentation should include the purpose of the folder and the kinds of contents it should hold.
- Perform regular clean-up, by backing up redundant or misplaced files and then removing them.

Media Content Management (106)

The unique nature of media content means that it cannot be treated in the same way as 'standard' formats, such as source code or design documentation. The major differentiating factors are its sheer volume (media files can range from a Kilobyte to multiple Gigabytes), and the complexity of its associated formats (i.e. it is not easy to 'look into' a media file and understand its contents). For this reason, some of the processes that support multimedia content management must be handled differently.

The three major processes that are required to support media content management are:

- Storage management
- Metadata management
- Version control

Storage Management

Storage management concerns the methods of storing and retrieving media content. The cost of data storage may be decreasing, but it is still the case that for large volumes of media it is often uneconomical to store everything on-line. For this reason, processes must be implemented to manage where data should be stored, and how it may be transitioned from one location to another. There are three ways to store data:

- On-line (Instant access, for example, hard disk)
- Near-line (delayed access, for example, CD-ROM jukebox)
- Off-line (manual access, for example, CDs or tapes on shelves)

When deciding on where media content should be stored, there is always a trade-off between accessibility and cost (on-line storage being the most accessible and most expensive, and off-line the cheapest but least accessible). The decision of which method to use for which data may depend on a combination of its type, volume, version (i.e. latest or historic) and accessibility requirements.

Metadata Management

Data about the media that is being stored is an important commodity that must be managed. As the volume of media content grows, it is vital to be able to understand characteristics of the media, in order to be able to manage it correctly. Examples of metadata include:

- Media type (for example, MPEG video, JPEG image)
- Media settings (for example, sample rate, resolution, compression attributes)
- Usage details (which module uses the content)
- Media source (for example, Source, author, creation date)
- Legal information (for example, whether the media is copyrighted)

Version Control

As with standard development code, when media content is created and edited, a revision history of changes should be retained. This way, if it is necessary to revert to an original piece of media content, it is not necessary to go all the way back to the original source (which in the case of finding an image in a CD-ROM library containing 10,000 images, for example, could be a difficult task). In practice, this may mean storing the original and final copies of media (especially where volume is an issue). For this reason, a process for managing multiple versions of media content must be put into place.

The more advanced media content management tools may provide much of the functionality required to support these processes, but where this is not the case, the processes must be implemented manually.

c) Legal Issue Management

When dealing with media, it is often the case that content may be subject to copyright laws. It is important that the legal implications surrounding all content in the system is understood, and where necessary, royalties paid to the appropriate parties.

Object Management (108)

Object Management processes are very similar to those involved with Repository Management. However, they should promote reuse through specific processes:

- Design review
- Classes and components packaging for reuse
- Common components maintenance and upgrade

Quality Management (204)

Quality Management is described at length in the Business Integration Methodology (BIM).

The Quality Management processes are covered by the following tasks:

- 0623—Define Quality Management Approach
- 0732—Implement Quality Management Approach The objective of these tasks is to ensure that, early in the life of a program, program leadership explicitly defines what quality means for the program. This results in the production of the quality plan. Then the infrastructure and processes are put in place to ensure delivery of a quality program.

The Quality Management Approach defines the following processes:

Expectation Management
Quality Verification
Process Management
Metrics
Continuous Improvement
Rewards and Recognition
Training and Orientation Focus here is on those processes that have a direct impact on IDEA and its components (that is, Systems Building and the management processes).

Expectation Management Process

Expectations can be thought of as quality objectives expressed in measurable terms such as:

Functionality
Reliability
Usability
Efficiency
Maintainability
Portability
Security Quality Verification Process The targets for quality verification should be defined. Processes and deliverables are key candidates.

In development terms, the V-model is the preferred method by which the quality verification process is managed. The V-model ensures that deliverables are verified, validated, and tested. It is based on the concept of stage containment (enforcing for a given deliverable the identification of the problems before it goes to the next stage) and entry and exit criteria (describes conditions in which a deliverable passes from one stage to another).

The quality verification process owner may not be responsible for executing the V-model, but is responsible for making sure that the V-model is in place and complied with.

Metrics Process (110)

To fine-tune the development process, the important quality attributes must be measured. Sample metrics include:

Development environment availability
Time needed for a new user to learn to use a function of the development environment
User error rate per function
User satisfaction per function
Code complexity
Code structure
Productivity
Average number of defects per design packet at the moment construction starts
Average number of defects per program at the time of its first migration to system test Once the key metrics are agreed upon, procedures must be put in place to:

Perform the measurements (these should flow from the development processes in a natural way)
Compare results with the goals documented in the quality plan
Analyze deviations, with key focus on the process that caused the deviation
Adjust the processes so that similar deviations do not occur in the future Continuous Improvement Process (12)

The first stage of the Continuous Improvement Process (CIP) is to capture continuous improvement opportunities. These may include:

Gaps identified by metrics
Analysis of program performance-internal quality verification results
Process reviews
Capability Maturity Model (CMM) assessments
Suggestions made by program team members; for example, through a suggestion box The CIP then plans and manages improvement related activities such as:

Define explicit criteria for assigning priority
Consider raising the priority of low-priority opportunities that can be completed quickly
Maintain a mix of high-priority and sure successes to ensure the continued momentum of the Continuous Improvement program
Define the opportunity selection process
Identify the resource allocation process
Define the scheduling process
Identify how the effort will be monitored
Identify the procedure for communicating results to the organization
Establish a continuous improvement organization to support the process
Prioritize and classify opportunities
Select projects
Allocate resources and scheduling
Monitor effort
Support a standard process improvement process across the project While maintaining quality at a program level, the Quality Management team must liaise with each of the organizational units within the development environment in order to monitor the quality management processes within these units.

Standards and Procedures

The Capability Maturity Model (CMM) for Software describes the software engineering and management practices that characterize organizations as they mature their processes for developing and maintaining software.

The CMM provides a software organization with guidance on how to gain control over their processes for developing and maintaining software and how to evolve toward a culture of software engineering and management excellence. The model defines five levels of software process maturity as well as how to move from one level to the level above.

For more details, refer to Consistently Delivering Value: The CMM—How to Help Your Project Measure Up The V-model is a framework that promotes stage containment by organizing the verification, validation, and testing in and across all the methodology elements throughout the delivery phase of the Business Integration Methodology.

For more details, please refer to the V-model overview job-aid in the Business Integration Methodology.

The IMPROVE Job Aid (provided with the BIM Guide) describes the process for solving problems or improving a process. In this Job Aid, you will find an introduction to the five step process your team can use to solve both simple and complex problems. The Quality Action Team (QAT) is responsible for applying IMPROVE to improve a process or solve a problem.

Program and Project Management (214)

Program Management

Program Management focuses on the continuous oversight needed to support the delivery of business capability through multiple projects and releases. Appropriate disciplines, techniques, and tools are used to plan and organize the work, and to manage the incremental delivery of the new business capability.

Program Management consists of three major activities, each split into a number of task packages.

a) Plan Program
- 0610—Understand Program Expectations
- 0620—Plan Management Processes
- 0640—Develop Program Master Plan
- 0650—Design Initial Teamwork Environment*
- 0670—Plan Delivery
- 0680—Create Program Plan b) Mobilize Program
- 0710—Obtain and Deploy Resources
- 0730—Implement Management Processes
- 0750—Establish Program Management Office
- 0770—Implement Initial Teamwork Environment*
- 0790—Establish Orientation and Training c) Manage and Improve Program
- 0810—Direct Program
- 0820—Execute Management Processes
- 0830—Analyze Program Performance
- 0840—Plan and Implement Program Improvements
- 0850—Operate Program Management Office
- 0860—Authorize Build and Test
- 0870—Authorize Deployment
- 0880—Operate Team Work Environment*
- 0890—Conduct Program Close-Out

*The Team Work environment, in the domain of the development environment, includes those parts of the development environment which are consistent across the entire program (e.g. Collaborative tools)

Project Management

Project Management focuses on providing specific deliverables through balanced management of scope, quality, effort, risk, and schedule. Project Management processes follow a cycle of planning the project's execution, organizing its resources, and controlling its work. The Project Management team oversees all other teams within the development environment.

Project Management comprises a single activity containing a number of task packages.

a) Plan and Manage Project
- 0920—Plan Project Execution
- 0940—Organize Project Resources
- 0960—Control Project Work
- 0990—Complete Project Configuration Management (210)

Configuration Management is not only the management of the components in a given environment to ensure that they collectively satisfy given requirements, but it is the management of the environment itself. The environment consists not only of system components, but also of the maintenance of these components and the hardware, software, processes, procedures, standards, and policies that govern the environment. Configuration Management in systems building consists of four major interdependencies:

Packaging

Version control 114

Migration control 116

Change control 118

Standards and Procedures a) Packaging Plan

Packaging is the combination of systems software and application component configurations (source code, executable modules, DDL and scripts, HTML) together with their respective documentation. It may also include the test-data, test scripts, and other components that must be aligned with a given version of the configuration. Packaging allows the grouping of components into deliverable packets of application software that can be developed, tested, and eventually delivered to the production environment. Packaging defines the underlying architecture that drives version, change, and migration control. Each of these control processes defines how changes to configuration packages are versioned and migrated to the various development and test phases in the systems development life cycle.

A sample packaging strategy would take into consideration some of the following factors in determining a unique method to handle a given configuration packet in terms of version, change, and migration control:

Base package type—identifies the various types of application components that are developed during systems building such as executables, JCL, HTML scripts, and Java applets.

Package release type—identifies the types of commonality that components can have. There are usually four basic types of components that are developed during systems building:

Technology architecture packages—these packages are developed by the Technology Architecture team and are used by all other projects in a program Program-wide packages—these packages are developed by the Application Development teams but are used by other projects in the program. They are common components that are not owned by the Technology Architecture team Application common packages—these packages are developed by the Application Development team and are used internally on the project by application developers Application packages—these packages are the most rudimentary of all packages developed. They consist of basic application components developed by application developer Package platform type—identifies the eventual delivery platform of the package. Identifying this early on in development and encapsulating this information within the package definition, allows developers to envisage the production environment at an early stage during the systems development life cycle.

Given these three basic package definitions, a configuration management cube can be defined, which uniquely identifies version, change, and migration control characteristics of a given package. The cube can be used to implement a table-driven configuration management control system for all software developed on the program. The configuration control system consists of version and migration control. Therefore, the cube defines all processes associated with version control and migration of a package.

b) Version Control (114)

Version control and compatibility are key considerations when managing these packages. Note that version control not only applies to software components, but also to all components of a given package, including test scripts, test data, and design documentation. It is also of great importance to keep track of which version is in which environment. If incompatibilities are discovered, it must always be possible to "roll back" to a previous consistent state, that is, to revert to an earlier version of one or more components. It must be possible to define releases of a configuration—a list of version numbers, one for each component of the package which together form a consistent configuration. The smallest unit that can be version controlled should be the package as defined in the packaging plan. This ensures that the lowest common denominator in all version control activities is managed at the package level.

c) Migration Control (116)

Figure 6:
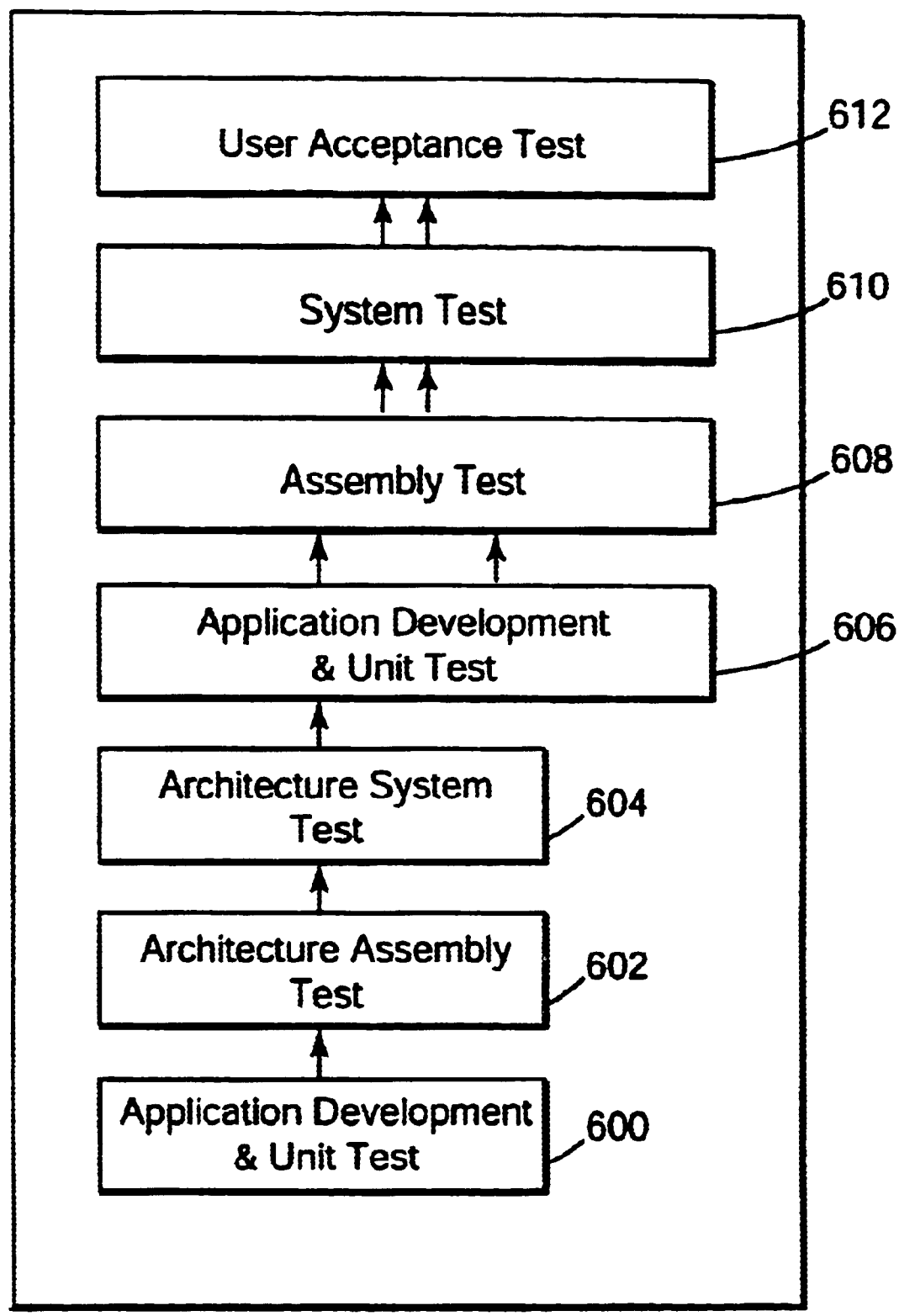
FIG. 6 is an illustration showing a model migration plan in accordance with one embodiment of the present invention.

A systems building environment can have many development and test stages. On a large project these may include:

Development and unit test
Assembly test
System test
Integration test
User acceptance test Migration of packages or consistent configurations from one stage to another is a central part of Configuration Management. The key to successful migration is the knowledge of what constitutes each stage. Examples of migration include:

Migration from development and unit test to system test
Migration from user acceptance test to production
Migration of development tools from the Technology Architecture team to the developers on the project
Migration of architecture components from the Technology Architecture team to the developers on the project Stages and their constituents exist as a result of certain user and technical requirements. The technical requirements are derived from the user requirements. It is crucial to develop a migration plan that maps out the progression on configuration packages throughout the systems development life cycle. FIG. 6 is an illustration showing a model migration plan in accordance with one embodiment of the present invention.

The FIG. 6 model allows the development and testing of architecture components independent of application components. The Technology Architecture team can develop 600, assembly test 602, and system test 604 their components before delivering them to the development environment for the application developers. This ensures that the architecture is thoroughly tested before being used by the Application teams. The model also illustrates the progression of architecture and application components through the systems development life cycle. The application developers can then develop 606, assembly test 608, and system test 610 their components before user acceptance tests 612. The model is a temporal one and thus suggests that architecture must be present at a given stage before the introduction of application components.

The version control plan must align with the migration control plan. The version control plan defines the points where version control activities will take place. In the above example, version control will take place at the development stages, architecture development and unit test, and application development and unit test.

Migration control defines how these version control configuration packages will be migrated successfully from one stage to the next until the package is eventually released to the production environment.

d) Change Control (118)

Change requests as a consequence of changing requirements and changes requested due to nonconformities (or defects), either in the application software, or in the system software must be analyzed, authorized, scheduled, staffed, and tracked in a defined way. What, why, when, and who made a change must be tracked from the point of analysis to the reintroduction of the defective or changed component at the appropriate stage. Change control therefore governs what software component is changed, version controlled, and when it is remigrated to a given development stage.

It is important to link the general change request with the requests produced during formal testing phases. This makes the processes clearer.

Configuration Management becomes more complex in a component-based development environment as the system is broken down to a greater level of granularity.

Release Management (208)

Release Management involves coordinating activities that contribute to a release (for example, cross-project management) and the coordination of products that contribute to a release (such as architecture, integration, and packaging). It is concerned with managing a single release rather than cross-release management.

The Release Management approach documents critical decisions regarding the management, tracking, and integrity of all components and configurations within a given release. The Release Management approach must be closely coordinated with the definition of the Configuration Management approach and the Problem Management approach. Release Management involves two main components:

The coordination of activities that contribute to a release
The coordination of products that contribute to a release The coordination of products that contribute to a release is the maintenance of a bill of materials for a release. It is an inventory of all software and hardware components that are related to a given release. The development environment is directly affected by the Release Management strategy. The way a program decides to plan releases affects the complexity of the development environment.

It should be noted that delivering a system in a series of releases significantly increases the effort.

Standards and Procedures

Figure 7:
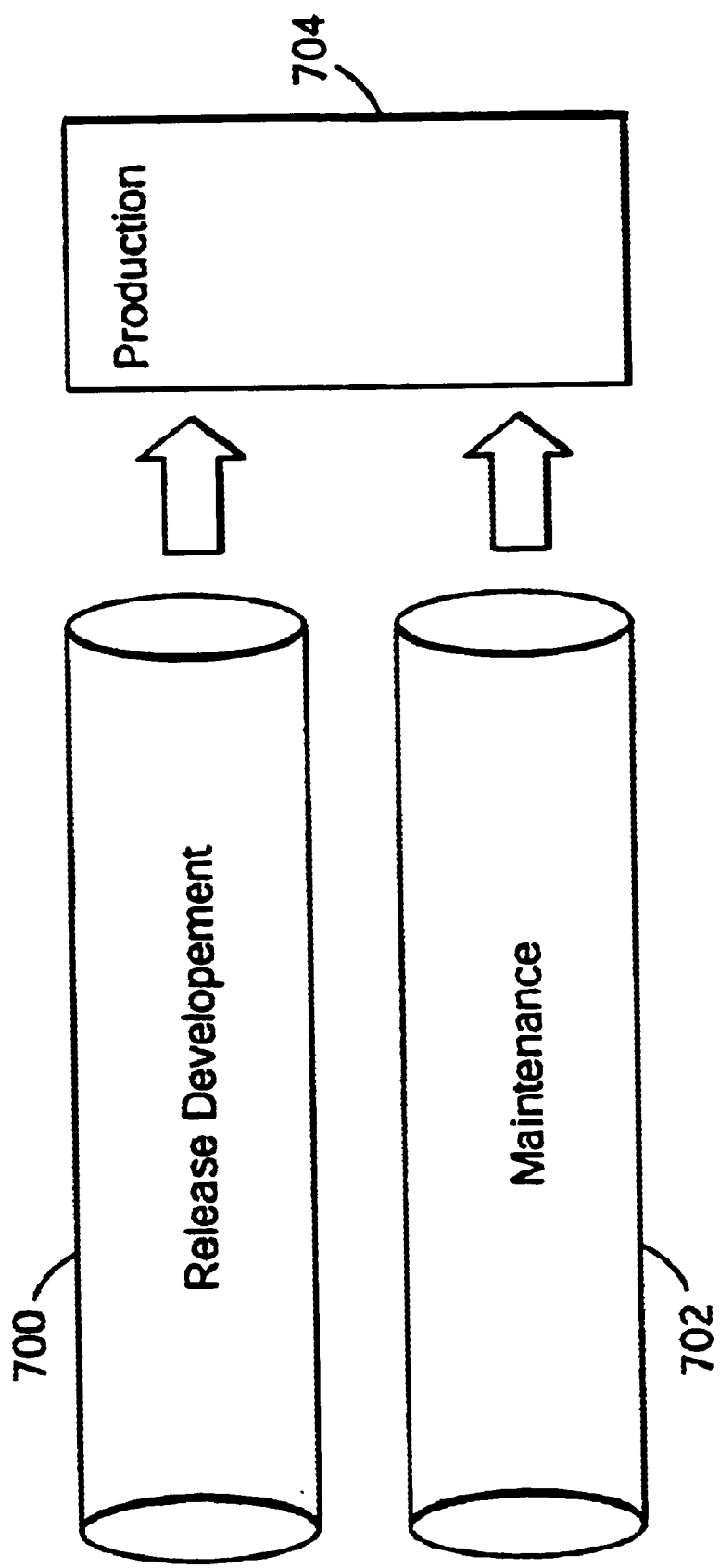
FIG. 7 is an illustration showing a single release capability development pipeline in accordance with one embodiment of the present invention.

If the release plan dictates that there will be parallel development of two releases of software, the development environment and configuration management must be able to support the release plan. In the most general development case, a program can have a single release capability mechanism 700 but must simultaneously perform maintenance activities 702 for components that are in production 704. There must be an ability for the program to design, build, and test the applications for production. FIG. 7 is an illustration showing a single release capability development pipeline in accordance with one embodiment of the present invention.

The ability to perform all development stages for a given release can be defined as a development pipeline. The pipeline consists of all development and testing stages necessary to release the software to production.

The pipeline strategy of a program depends directly on the release strategy. A program is potentially developed on three different timelines:

Short term 800—production bug fixes
Middle term 802—production service packs
Long term 804—new releases of software To support this release plan, the development environment must be separated into pipelines that are replicas of a single migration path to production 704. A pipeline consists of all the necessary development and testing stages required to deliver a piece of software to production. Therefore, because of simultaneous development and testing of three code bases, there needs to be three development and testing pipelines that deliver software to production.

Figure 8:
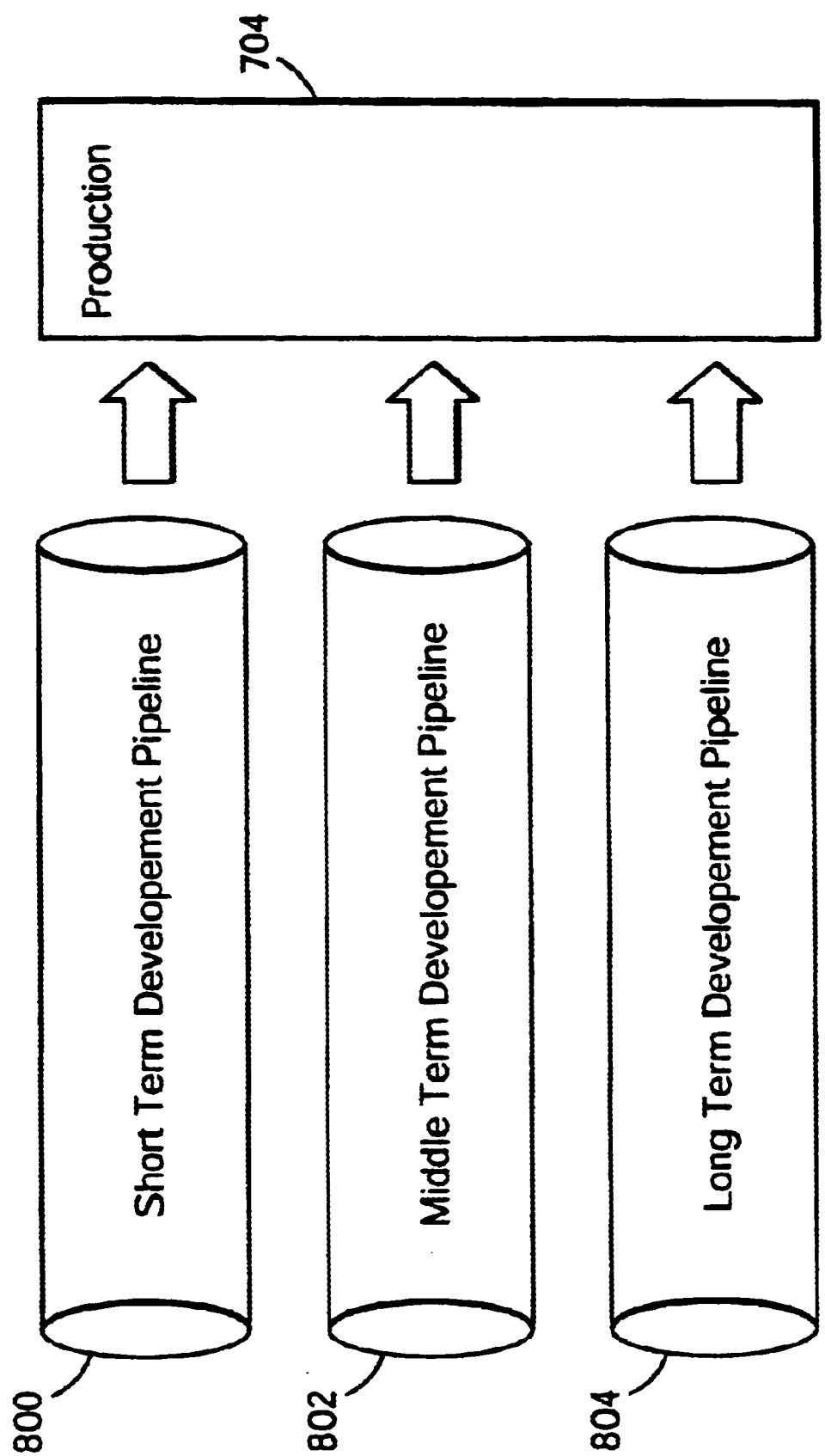
FIG. 8 is an illustration showing a multiple release capability development pipeline in accordance with one embodiment of the present invention.

The pipelines must be capable of allowing the developer to design, build, and test applications as well as architecture components. FIG. 8 is an illustration showing a multiple release capability development pipeline in accordance with one embodiment of the present invention.

As can be derived from the above illustrations, the more flexible a release plan, the more complex the development environment. As the number of development pipelines increase, the complexity of working in the development environment also increases. All development environment tools must support the pipelining strategy and so must the configuration management and problem management processes.

Figure 9:
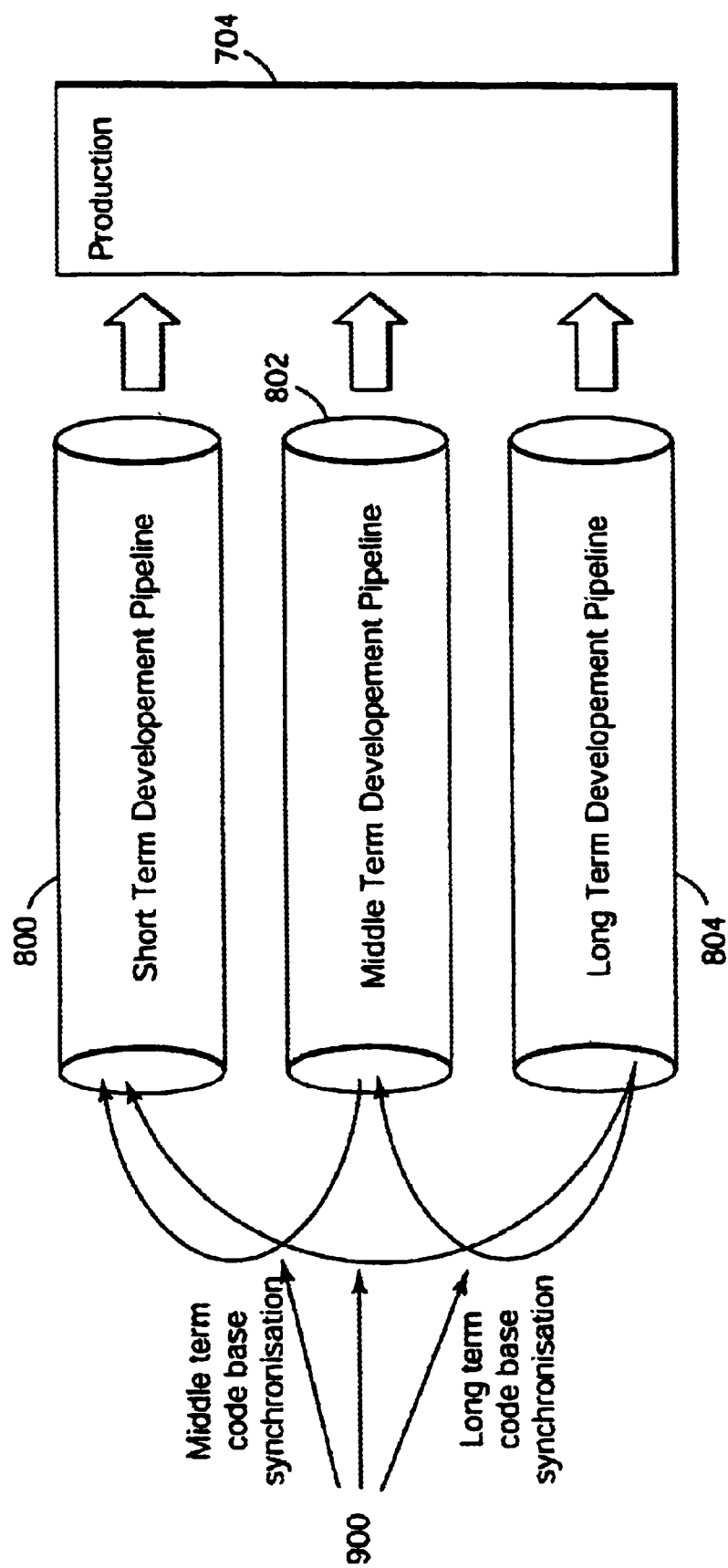
FIG. 9 is an illustration showing a multiple release capability development pipeline with code base synchronization among three pipelines.

The pipeline strategy for a program must incorporate code base synchronization. Code base synchronization must occur among the three pipelines to ensure that the three code bases eventually result in one version in production. FIG. 9 is an illustration showing a multiple release capability development pipeline with code base synchronization among three pipelines.

Environment Management (206)

Since the development environment is a production environment, it follows that environment management must be planned, organized, and executed to ensure a predictable and productive environment. Andersen Consulting has a comprehensive framework for the Management Of Distributed Environments (MODE). It describes four central functions:

Managing Change 120

Service Management 122

Service Planning 124

Systems Management 126

MODE provides an excellent framework for specifying the management responsibilities that apply to the development environment. These responsibilities are often assigned to the technical group, but as discussed above, there are benefits associated with establishing a dedicated environment management team.

The Environment Management component described here uses MODE as a framework, adopts MODE terminology, and focuses on those management tasks, which are particularly important in the development environment.

Adopting a structured approach to environment management, which applies the same principles to development as it does to production, has several advantages:

High-quality support for developers

Significant experience with the operations management tools in an environment, which is generally smaller and which carries lower risk than the full production environment The ability to tune the environment management approach before production roll-out In some respects, the development environment is simpler than the production environment. It is, for example, generally smaller in terms of the number of hardware components and the number of locations. In other respects, however, the development environment is more complex. For example, the amount of change in this environment is generally higher than in the production environment. In fact, the environment can be so fluid that extreme care must be taken to maintain control. On a large engagement, one dedicated technical support person per ten designers and programmers is recommended. The greatest need for technical support is generally during detailed design and programming. It is, however, necessary to start building the technical support function before detailed design.

All processes that are performed by the Environment management team must be documented in a centralized database that allows quick and easy reference.

Service Management (122)

Service Management provides the interface between the Environment Management team, the Development teams, and external vendors or service providers. It manages the level of service that is provided to the developers. In order to maintain this service, three areas must be managed:

Management of Service Level Agreements (SLAs)

Management of Operations Level Agreements (OLAs)

Help Desk

Service Level Agreements

In order to plan and organize the development work appropriately, a Service Level Agreement (SLA) must be in place between the Service Management group (typically part of the Environment Management team) and the developers. As with all other components of the development environment, this agreement should be kept simple. It should specify the following:

The responsibility of the Environment Management team

How developers should request technical support

How quickly a request for support will be serviced

How the Environment Management team will notify developers of environment changes such as changes to databases and common technical modules Specifications of service levels should be precise and the service must be measurable. The SLA should also specify how to measure this service (for example, system response times, request service times, backup frequencies). In addition, the SLA must be managed. It may have to be modified as the environment changes, and it must be reviewed with developers on a regular basis to see if the service level is adequate.

a) Operations Level Agreement Management

The Environment Management team is responsible for providing the specified level of service, but frequently relies on external vendors and suppliers to perform certain tasks. For example, hardware service is typically provided by the hardware vendor.

To provide the agreed level of service to the developers, the Environment Management team must ensure that external vendors provide their services as required. This generally means establishing a contract with the vendor and following up that the contract is respected.

As the relationship between the Environment Management team and external vendors becomes less formalized (for example, Internet Service Providers, mass market software vendors), it becomes more difficult to provide guarantees on the level of service that will be delivered.

b) Help Desk

The Help Desk function is an important part of the interface between the Service Management group and the developers. The Help Desk makes sure that questions are answered and requests serviced in a timely manner by the right people. In a complex, leading-edge environment, the Help Desk is crucial to maintaining productivity. The Help Desk needs particular focus when:

The system software is immature

The development environment is weakly integrated

The environment is heterogeneous

The amount of newly released custom infrastructure is large

The developers are less experienced

While supervisors and coordinators who work with the developers may alleviate the impact of these factors, the more difficult questions must be resolved by the Environment Management group. As some of these will be repeat questions, the ability to log the question, the analysis, and the result in a structured way provides the basis for performing smart searches and answering the question quickly. Repeat questions may also trigger:

Additional training

Modifications of existing training

Additional entries in a "technical hints" database

Changes in tools, procedures, and responsibilities

Efficient searches in the Help Desk database can, in some cases, be greatly facilitated by extending the basic functionality of the Help Desk tool. This can be achieved, for example, by adding a smart word search capability on top of the Help Desk history database.

Comprehensive training must be given to Help Desk personnel in order to ensure the best possible level of service to the developers.

In addition to serving internal project needs, the Help Desk must be prepared to coordinate the activities of external suppliers to solve problems. This occurs when several new versions of hardware and system software are introduced, and compatibility issues arise. Part of the coordination is the tracking of request IDs, which refer to the same question but which are assigned differently by each supplier.

To manage communication with external vendors, a contacts database with the following information is useful:

Company name

Products supplied

Details on support arrangements

Address, phone and fax numbers

Main contact

Secondary contacts

Regional office address/fax/phone/contacts

World headquarters address/fax/phone/contacts

Based on this information, it is useful to log the exchanges with the external company, indicating:

Date

Individuals involved

Key information exchanged c) Quality Management

Defining the SLA, with its specific, measurable criteria, is the basis for continuous improvement. The continuous improvement effort may focus on providing the same level of service with fewer resources, or on providing better service. An important part of quality management is ensuring that the Environment Management team understands the key performance indicators for service delivery, that these indicators are monitored, and that all personnel are adequately equipped with the tools and training to fill their responsibilities. While the entire team is responsible for delivering quality, the responsibility for Quality management should be assigned to a specific individual on the Environment Management team.

Systems Management (126)

MODE divides Systems Management into:

Production control

Monitoring

Failure control

Security management

Staffing considerations

Production Control

In the development environment, a number of activities must be performed according to schedule, including:

Reorganization of databases, including the repository

Rerunning of database statistics

Performing backups

Transportation of backups off-site

Performing periodical file transfers between environments/sites

Preventive maintenance of equipment

Many of these activities can be scheduled and performed automatically, but must have some level of manual control to ensure that they are executed correctly. Control tasks may include checking and archiving activity logs. Standards and procedures that describe the control function must be established.

Monitoring

The Environment Management team must systematically monitor the development environment to ensure that it is stable, provides adequate response times, and satisfies the needs of the developers. This monitoring involves looking at trends and extrapolating them to anticipate problems with disk capacity, system performance, network traffic, and so forth.

Failure Control

Failures must often be corrected quickly to restore service. The time needed to restore service is affected by the time it takes to isolate and repair the fault. In many cases, elapsed time can be shortened by allowing remote administration of system components.

Security Management

Security management involves:

Defining security requirements

Preventing security breaches

Limiting the effect of security breaches

Detecting security breaches

Correcting the effect of security breaches

Although direct sabotage is rare, inexperienced developers, perhaps new to the project, can wreak havoc to the system under development by inadvertently deleting or modifying system components. Focus must be on defining access rights so that developers have the right level of access (read/write) to all the information that is useful and relevant to their work.

With the opportunity to connect development environments to the internet comes new risks. There is a potential for security breaches or the transfer of viruses and other malicious programs. In extreme situations, where security is of great importance, it may be prudent to isolate the development environment, and allow Internet access only via a dial-up connection on stand-alone machines. The overlap of responsibility for Security Management between the Environment Management team and the Security Management team will need to be defined at the program level.

Outsourcing Considerations

In the development environment, it may be possible to outsource certain Systems Management tasks. For example, the LAN supplier may be willing to take responsibility for LAN support, upgrades, and so on. Similarly, an existing data processing center may be willing to take responsibility for host operations. Such agreements are very beneficial and make it possible to use project team members more effectively. However, outsourcing the development environment carries a risk, which can be mitigated by defining a Service Level Agreement with the provider.

This will generally be very similar to the SLA established between the Environment Management team and the developers. One important difference is that punitive measures (to be applied if the SLA is not respected) must be specified to ensure that outside suppliers are strongly motivated to abide by the agreement.

Service Planning (124)
  MODE divides Service Planning into:
  Service Management Planning
  Systems Management Planning
  Managing Change Planning
  Strategic Planning All these planning stages apply in the development environment and are analogous to the kind of planning that must occur in the business application's production environment. One of the most important success factors when providing technical support is being proactive and anticipating the need for intervention.

Service Management Planning

Once the SLA is defined, the resources required for delivering the service can be specified. Questions to address include the staffing of these resources and training to ensure that they are equipped to deliver service as agreed.

Systems Management Planning

Daily tasks must be specified, assigned, and followed up. Systems management planning determines who is responsible and how follow-up is performed.

Managing Change Planning

Managing change planning is of great importance in the development environment. During a large project, several very significant changes to the development environment must be accommodated. They include:
  New hardware
  Rewiring of the network
  New development software
  New releases of existing development software
  New releases of infrastructure components (custom-built technology architecture)

The release of these components into the environment requires very careful planning to ensure minimal disruption for developers. Techniques commonly used include:
  Fallback options if a new component does not function as planned
  Partial rollout to a subteam to limit the consequences if a component does not work as planned
  Ample information to developers about timeframes for rollout and expected effects of new components
  Well planned testing
  Sufficient training for new tools or changes to existing tools Planning for change includes choosing options based on a thorough understanding of the positive and negative impacts of change to the environment. Changes to the development environments should be analyzed and planned for as orderly releases rather than a stream of small modifications. Changes should be packaged into releases, and each new release of the development environment should be tested by developing a small, but representative part of the system using the new environment. Ideally, this test should be performed by real developers rather than by the Environment Management team. This may be very helpful in order to obtain better buy-in.

Strategic Planning

Strategic planning is traditionally regarded as being less important in a development environment than in the production environment, mainly because the development environment is often viewed as a temporary entity that does not warrant serious strategic considerations. This may be changing however, with the concept of the enterprise-wide development environment—a single, generic development environment architecture that is tailored to each specific project. In this case, strategic planning for the development environment is vitally important if the environment is to evolve, and allow the organization to remain competitive. Strategic planning of the environment management function may, for example, include such questions as support for multisite development and coordination of multisourced systems management.

Managing Change (120)

The development environment is subject to constant change (for example, the addition of new tools, or changes to code libraries), which needs to be managed carefully. The Managing Change component comprises three sub-components: Controlling Change, Testing Change, and Implementing Change.

Controlling Change

After planning for and scheduling change, it must be controlled. This ties in closely with Configuration Management.

Testing Change

Thorough testing is required to reduce the risk of productivity loss due to environment changes. Techniques commonly used include:
  Careful scheduling of events to minimize disruptions (typically weekends and evenings are used to enable a strictly controlled test of new components released to the design and construction environment).
  Rigorous testing of Environment Management tools themselves. This test must be as rigorous as the testing of the execution environment.
  A hardware and systems software acceptance test environment where components from external suppliers are validated before the component is accepted into the environment.
  One or more separate architecture build and test environments where new or modified custom-built components can be thoroughly verified before they are made available.

In addition to reducing risk, testing should also verify that the expected positive benefits of the change are indeed obtained.

Implementing Change

After planning and testing the change to be introduced, it must be implemented. The most common kinds of change in the development environment are the introduction of additional hardware, new releases of databases, subroutines and infrastructure, and upgrades to tools. Each change implementation should be viewed as continuous improvement so that any difficulties or inefficiencies are analyzed and resulting improvements are planned and implemented. To be effective over time, this requires that procedures be documented and regularly reviewed and enhanced.

When the database is changed, new versions of test-data must be developed and distributed. When infrastructure components are modified, they may have to be distributed across platforms, and the ripple-effects (for example, the need for recompilation or code changes in affected components) must be understood and coordinated. Some projects have experimented with incentives to ensure that the infrastructure components do not change too frequently. One such strong incentive is to make the Architecture team responsible for all ripple effects and have them implement all the application level changes that result from an architecture modification.

Problem Management (212)

Problem Management is generally associated with the discrepancies that result from the testing process, though it may also be applied to the management of design problems detected during verification or validation steps. Problem Management is a crucial process in the system development life cycle. It ensures that quality software is designed, developed, and tested so that initial benefits defined in the business case are in fact realized. A development environment must have a formally defined problem management process to ensure that this objective is met.

Formal problem tracking helps to control the analysis and design process by maintaining documentation of all problems and their solutions. Problem tracking improves communication between developers and business representatives, which is particularly helpful in minimizing misunderstandings at later stages of the development cycle.

Such formal problem tracking also helps to facilitate the solution process by formalizing a procedure for reviewing, acting on, and solving problems in a timely manner. By circulating problem documentation to all affected parties, management can minimize the risk of misunderstandings at a later date. In addition, the documentation serves as an audit trail to justify design and implementation decisions.

It is, however, important to note that not only the software that is developed for business case benefits realization must have a formal problem tracking mechanism, but the development environment architecture must also have a formal problem tracking mechanism. The development environment tools and processes support the design, development, testing, and delivery of quality software. Therefore, the foundations of design, build, and test must be stable and problem free. All problems identified in the development environment architecture must be tracked formally and solved as the development environment is also a production environment for developers.

System Building (218)

Understanding the systems building process is important since well defined development tasks and workflows form the basis for achieving high productivity and consistent process quality. Tools to support these processes may be found in *Tools—System Building*.

The development environment varies by segment of a systems development project. The following model is used when discussing different components of the development environment.

The development process is iterative and can be entered at different stages depending on the complexity of the changes. Small corrections may not require explicit design, and small enhancements may not require any high-level design. The shaded, elliptical labels in the above figure indicate how the development process can be entered depending on the magnitude of the change.

The iterative nature of the development process is important since it implies that components of the development environment, which are put in place for design (for example), must be maintained, since they will continue to be used until the end of system test and beyond. Multiple releases of the business application may also be under concurrent development at different stages. This may lead to very active use of design, construction, and testing tools at the same time.

Analysis & Design (128)

Analysis and design in this context, refer to the two Business Integration Methodology activities:

Design Application

Design Technology Infrastructure

The most critical and perhaps the most difficult work occurs up front. The success of the entire design effort depends on the quality of the work performed to gather, document, communicate, and analyze requirements in the early stages. Standards for how to document these requirements are very important. They facilitate communication, which, in turn, ensures a common view of the problem to be solved. Communication must be ensured within the analysis team but also with the (possibly future) designers and programmers.

Tool support may help enforce standards, and such tools are discussed under *Tools—System Building—Analysis & Design*

The design process includes numerous activities, which range from high-level general considerations to low-level detailed issues. The overall objective of design is to transform functional and technical specifications into a blueprint of the system, one that will effectively guide construction and testing. While requirements analysis and specification deals with what the system must do, design addresses how the system will be constructed. Validating that the design actually meets the requirements for functionality, performance, reliability, and usability is essential.

The quality of the design process directly affects the magnitude of the efforts required to construct and test the system, as well as the maintenance effort. Investments in defining high-quality design standards and procedures and integrating tools is therefore particularly important. It may, for example, have a direct impact on the degree of reuse achieved. In addition, adequate training must be provided to ensure that the designers make optimal use of the environment provided.

Information on how to approach system design can be found in the following Andersen Consulting sources:

Delivery Vehicle Frameworks

Network-Centric Architecture Framework

The Graphical User Interface Design Guidelines

Design Application Architecture

New tools and processes link detailed design and construction more closely than before. To realize the expected benefits from repositories and code generation, the output from detailed design must be exact and correct, leaving little room for interpretation. This requires careful quality control and very specific exit criteria associated with the completion of detailed design.

It is important that the development environment accommodates concurrent effort in different areas. For example, parts of design may occur after system test starts, as in the case of an urgent change request, or when a significant inconsistency is detected in system test. Some reverse engineering work may also occur before design or during construction.

When standards, procedures, and tools are developed for a task, it is important to consider where the task belongs in the sequence of tasks that contribute to the development. For example, the use of a repository early in the development process reduces the need for re-entering information while enhancing consistency and facilitating standards compliance.

Usability and User Interface Design

Usability is an important (and often overlooked) consideration in system design. Usability is more than a well-designed user interface—the way in which business processes are modeled, how they are implemented within the system, and how they are presented to the user all contribute to the overall usability of the system. Usability is an iterative process of refinement that results in systems that are easy to learn, efficient, and enjoyable. In the very broadest sense, usability is the thoughtful, deliberate design approach that considers users throughout the solutions-building process, from start to finish. For this reason, usability guidelines should be defined and followed at every stage of system design. This, along with regular usability reviews and tests both internally, and by target user groups (by using prototypes), helps to reduce the risk of a poorly received system.

The User Interface has become increasingly important as systems become more and more user-facing. As multimedia technologies evolve allowing the development of richer user interfaces, so the design processes must adapt to reflect these new technologies. The processes that surround the design of media content are similar to that of regular system design, and many of the same issues that apply to designing traditional user interfaces also apply to the design of media content. The major change is the involvement of media content designers—a group of people not traditionally associated with system design and development. As their presence is relatively new to the scene of systems development, it is often the case that media content designers are not fully integrated into the development team—a potentially costly mistake. It is important to ensure that media content designers are involved in the design process at a very early stage, and that they are fully integrated into the application design and construction teams.

The approach to Interface design is evolving as media technologies become more advanced. Modern media creation tools allow the development of not only media-rich interfaces, but also the functionality that lies behind them. This means that the role of the media content designer may now range from that of designing the look and feel of a user interface, to developing the entire presentation layer of an application. In this situation, the role division between media designer and application developer becomes a difficult one to define, reinforcing the argument for fully integrating media designers into the application development team.

Standards and Procedures

Well documented, comprehensive standards make designers more independent and enable them to produce more consistent, high quality designs. Common standards include:

Detailed specifications of deliverables from each design step

Window and report design standards

Naming standards for design objects and documents

Navigation standards

Standards that specify the design techniques to use

Documentation standards that specify format

Technology infrastructure design standards that specify how to ensure security, handle errors, and manipulate context data While the standards focus on what to do during design, procedures focus on how to do it. Procedures must be in place to specify:

How to resolve functional and technical issues

Which tools to use and how to use them

How to perform design validation

When and how to initiate and perform functional and technical design reviews

How to cope with design teams distributed across locations*

Guidelines give assistance in areas where judgment is important and where standards are not easy to define. Valuable guidelines may include:

Usability guidelines

Style guidelines

Guidelines on how to use a tool effectively

Sample design packet for each kind of system component to be designed

Designers must understand standards and procedures other than the ones listed above. For example, repository related standards are very important to designers. These standards are discussed in *Processes—Information Management*

Implementation Considerations a) Multi-site Development

In the case of systems being developed by multiple parties or across multiple locations, it is vital that a process of regular communication is implemented. This communication should involve all the parties involved in the design of the system, and is usually conducted in the form of an audio conference. Through this process, it must be ensured that all parties are approaching problems from the same direction, and that they are thinking about the design in the same way. If this is not achieved, there is great potential for misunderstanding across teams, which generally leads to a badly integrated system. In this type of situation, where parties are not working together on a day to day basis, it is also important that any definition (requirements or design) is completely free of ambiguity (if anything is left open to interpretation, there is a high risk that it will be misinterpreted). Practically, this means that quality controls on documentation need to be more stringent than on a traditional single-site project.

Reverse Engineering (130)

Reverse Engineering is a set of techniques used to assist in reusing existing system components. Most of the time, this work is performed manually: one person studies thick listings to understand data layouts and processing rules. The person gradually builds a higher-level understanding of how the components work and interact, effectively reverse engineering the system into a conceptual model. It may be necessary to study certain pieces of code to understand how they work, but reverse engineering is not limited to code. For example, these techniques might help understand the datamodel of a legacy application, in order to better design the new applications that will coexist with it.

The process can be very time-consuming and is notoriously difficult to estimate. Tools to support the effort do exist, and have been used successfully to streamline the process. The main problem with such tools, however, is the hasty (and erroneous) conclusion that tools automate everything. They do not, just as design tools do not automate the design process. Human intelligence is still required to drive the effort. The supporting tools can, however, reduce the amount of manual effort needed and significantly lessen the amount of non value-added activities, such as "find all the places in a program that affect the value of a given variable".

The goal of a specific reverse engineering effort generally falls into one of the following categories:

To determine which parts of existing systems must be replaced and which can be reused To determine how a particular component works in order to design other components that interface with it To extract components for reuse To prepare for cleaning up those parts of a system that will be retained In component-based development, a concept known as "round-trip reengineering" provides the developer with a way of modifying a component model and generating the code, then at a later date modifying the code at predefined locations in the source code and regenerating, thus enabling the model to maintain a 2-way-synchronization.

Note that components to be reverse engineered can be both part of a custom-built system, or part of a software package.

Projects dealing with the Year 2000 issues have had much experience in reengineerng.

Standards and Procedures

The following reverse engineering guidelines should be used as input when developing standards and procedures for a particular context.

Reverse engineering can provide important input both to the design process and to the construction process. Timing of the activities is therefore important.

The interplay between design and reverse engineering can be intricate: a high-level design is needed to determine which components from existing systems are of interest. Once this is determined, these components can be extracted, generalized, and fed into the detailed design process as one source of information.

The value of reuse will vary with the functional and technical quality of the code.

It may be useful to clean up existing code before it is extracted for reuse.

Tools should be chosen based on knowledge of the system, the amount of code to be processed, and the experience of the personnel involved.

The end should be kept in mind. With powerful tools, it may be tempting to "investigate for fun" rather than extracting what is needed.

As with all other tools, adequate training is important.

Packaged Component Integration (132)

Packaged Component Integration applies to the use of any third party (or previously developed) technical components that may be integrated into the target system. This can range from simple components offering limited functionality (worksheet or charting GUI components), to components handling a significant portion of the application architecture (data access components and firewalls). The process involves a number of stages:

Package or Component Selection

Component Customization

Component Interfacing

Standards and Procedures

A proven practice in the component-based development world, when dealing with purchased components, is to "wrap" them, i.e. encapsulate them so that the visible piece of any component remains fully controlled. This way, when a component is replaced (either for an update or because it has proved to be defective), no other system components that refer to that component will need to be altered.

Construction (134)

Construction covers both generation of source code and other components as well as programming and unit test. It may also involve help text creation and string test.

As construction is a large part of system building, the benefits of streamlining this process are significant. Since several aspects of construction are rather mechanical, it is often fairly easy to simplify this process and to automate parts of it, particularly if the design holds high quality.

The arrival of Integrated Development Environments (IDEs), has further simplified the automation of construction processes to the degree that a single tool can manage the majority of the process.

As with Analysis and Design, usability must not be ignored in the construction of a system. Especially in the case of an iterative development approach, it is vital that those responsible for usability and target user groups are involved in regular reviews as the system is being developed.

Standards and Procedures

Important standards include:

Programming standards for each programming language, including procedural languages, job control languages, and data access languages Test documentation standards Important procedures include:

Code generation procedures, including pre-processing of the code shell and post-processing of the generated code Testing procedures Test-data handling and common test-data usage Procedures for functional and technical reviews Code review checklist Migration procedures which specify how to make common modules public Important guidelines include:

Usability guidelines

Shell usage guidelines

Tools usage guidelines

Test (136)

System test is performed to validate that the gathering and transformation of information is complete and correct.

As automation progresses and an increasing number of business processes are supported by computer systems, system test is changing in nature. Firstly, the testing of interfaces to other systems is becoming an ever larger part of systems test. Secondly, system test increasingly applies to a new release of an existing system. In addition, it is worth noting that as design and construction is increasingly automated, system test is becoming a larger part of the total development effort.

Both of these factors increase the value of automated testing tools, given that the work associated with checking that system changes do not have unintended side-effects, is becoming an ever larger part of system test. Another trend affecting system test is the demand for traceability. Increasingly, users and management wish to know the purpose of a given test condition. This is answered by referring back to the design and to user requirements.

System test is a very large part of any systems development effort and can, especially when requirements are changing, exceed one third of the entire effort. A streamlined environment, which enables high productivity is therefore of utmost importance.

IMPORTANT: When planning system test, it is vital that the testing of all target platforms is included in the test plan. For each platform that is supported by the system, there must be a separate set of tests.

The necessity of impact of volume and stress testing early in the development process is becoming more common, due to the proliferation of new technologies and tools which have little or no performance track record. It is important that the performance and reliability of such tools and technologies is established as early as possible in the project to avoid possible problems further down the line.

Component-based development may have an impact on the way in which testing should be performed.

Standards and Procedures

System test relies heavily on configuration management, repository management, and quality management.

Configuration management provides the basis for promoting a configuration from the construction environment to the system test environment. As test cycles are run and fixes implemented, migration can become complex, requiring flexible mechanisms for locking and unlocking system components and analyzing the impacts of change.

Information management, and in particular repository management, guarantees a correct view of the interrelationships between system components. This is required to ensure that impact analyses are complete and correct, which, in turn, makes for effective regression testing.

Quality management, together with well-defined standards and procedures, ensures that the outputs from each test activity are documented at the right level of detail and fed back to the design and construction teams, in accordance with the quality plan.

Each of the following system test activities needs well-documented standards and procedures and should be supported by tools:

Promote configuration (migrate configurations from the construction environment to the system test environment)

Run test cycle

Compare expected results and actual results

Log System Investigation Requests (SIRs)

Analyze deviations and identify components requiring change (either expected results, test-data, or system components)

Define Change Requests (CRs) and perform impact analysis

Package those change requests that affect the same areas and that naturally belong together, into change packages Schedule and staff the changes Unlock components for change Perform changes and refine impact analysis based on added understanding Verify changes before re-submitting to system test Migrate to system test based on updated impact analysis and re-lock components Implementation Considerations a) What model of testing does the firm follow?

The following is an overview of the firm's testing methodology as documented by RTP. It describes the framework for the testing process, or the V-model of verification, validation, and testing.

b) Are program specifications being tested?

The following is an overview of the component test as documented by RTP. It describes the testing methods used to validate the detailed design stage where program specifications are tested.

Component Test—A component test is the testing of an individual piece of the solution. All components, including application programs, conversion programs, and input/output modules, are subject to component test. The objective is to ensure that the component implements the program specifications. At the end of component test, all lines of code should have been exercised, keeping in mind the specified functional and quality requirements.

c) Are systems design being tested?

The following is an overview of the assembly test as documented by RTP. It describes the testing methods used to validate the technical design stage where system designs are tested.

Assembly Test—The assembly test tests the interaction of related components to ensure that the components, when integrated, function properly. Assembly test ensures that data is passed correctly between screens in a conversation or batch process and that messages are passed correctly between a client and a server. The specification tested is the technical design. The application flow diagram within the technical design depicts the assemblies, either on-line conversations or batch assemblies, that will be assembly tested. Testing is therefore organized by assembly rather than by business function.

By the completion of assembly testing, the system should be technically sound, and data flow throughout the system should be correct. Component and assembly testing ensures that all transactions, database updates, and conversation flows function accurately. Testing in later stages will concentrate on user requirements and business processes, including work flow.

d) Are benefits being tested?

e) Are costs being tested?

f) Are intangibles being tested?

The following is an overview of the benefits realization test as documented by RTP. It describes the testing methods used to validate the business case stage where benefits, costs, and other intangibles are tested.

Benefits Realization Test—The benefits realization test tests that the business case for the system will be met. The emphasis here is on measuring the benefits of the new system, for example: increased productivity, decreased lead times, or lower error rates. If the business case is not testable, the benefits realization test becomes more of a buyer signoff.

Ideally, benefits realization test occurs prior to complete deployment of the system and utilizes the same environment that was used for the service-level test piece of operational readiness test. Tools are put in place to collect data to prove the business case (e.g., count customer calls). A team of people to monitor the reports from the tools and prove that the business case is achieved is still needed. The size of the team depends upon the number of users and the degree to which tools can collect and report the data. The benefits realization test tests that the business case for the system will be met. The emphasis here is on measuring the benefits of the new system, for example: increased productivity, decreased lead times, or lower error rates. If the business case is not testable, the benefits realization test becomes more of a buyer signoff.

g) Are quality requirements being tested?

h) Are technical requirements being tested?

i) Are functional/user requirements being tested?

The following is an overview of the product and operational readiness test as documented by the RTP. It describes the testing methods used to validate the requirement/definition stage where quality, technical and functional/user requirements are tested.

The Product Test—The product test tests the entire application to ensure that all functional and quality requirements have been met. Product testing may occur at multiple levels. The first level tests assemblies within an application. The next level tests applications within a system, and a final level tests systems within a solution. Within the multiple levels, the purpose is the same.

The product test tests the actual functionality of the solution as it supports the user requirements: the various cycles of transactions, the resolution of suspense items, the work flow within organizational units and among these units. The specification against which the product test is run includes all functional and quality requirements. The testing is organized by business function.

The Operational Readiness Test—The objective of the operational readiness test is to ensure that the application can be correctly deployed. The operational readiness test is also commonly known as the readiness test, roll-out test, release test, or the conversion test. The operational readiness test becomes especially key in client/server environments. It has four parts:

Roll out test—ensures that the roll out procedures and programs can install the application in the production environment.

Operations test—ensures that all operational procedures are in place and acceptable, and that the production system can be operated by the personnel responsible for supporting production.

Service level test—ensures that once the application is rolled out, it provides the level of service to the users as specified in the Service Level Agreement (SLA).

Roll out verification—ensures that the application has been correctly rolled out at each site. This test, developed by the work cell or team performing operational readiness test, should be executed during each site installation by the work cell or team in charge of the actual roll out of the application.

The operational readiness test assumes a completely stable application and architecture in order for it to be successful, and therefore, is heavily reliant on the previous testing stages.

The operational readiness test is the point in the development process where all the application development, architecture development, and preparation tasks come together. The operational readiness test ensures that the application and architecture can be installed and operated in order to meet the SLA.

Development Tools Framework

Figure 10:
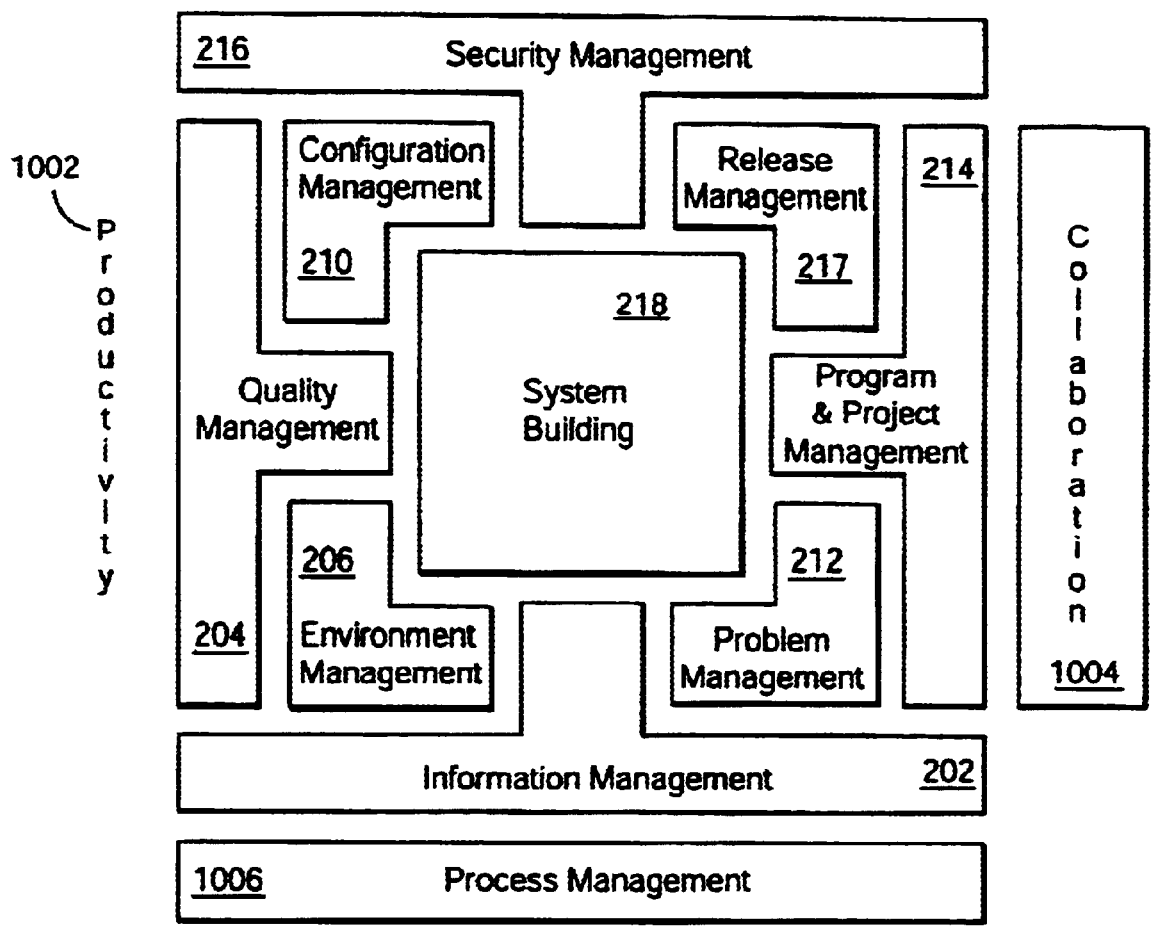
FIG. 10 is an illustration showing a Development Tools Framework in accordance with one embodiment of the present invention.

FIG. 10 is an illustration showing a Development Tools Framework in accordance with one embodiment of the present invention. The development environment is built upon an integrated set of tools and components, each supporting a specific task or set of tasks in the development process. As with processes and organization, the central component, System Building, is supported by the eight management components:

Information Management tools 202 manage the information that supports the entire project—information that is used both in systems building and in other management processes Security Management tools 216 enable the development of security components Quality Management tools 204 support all quality management processes Program and Project Management tools 214 assist the management teams in their daily work Environment Management tools 206 provide the facilities to maintain the development environment Release Management tools 218 manages the simultaneous development of multiple releases Configuration Management tools 210 cover the version control, migration control and change control of system components such as code and its associated documentation Problem Management tools 212 pertains to the problem tracking and solution process In addition, three other components are required to fully support development:

Productivity tools 1002 provide the basic functionality required to create documents, spreadsheets, and simple graphics or diagrams Collaborative tools 1004 enable groups of people to communicate and to share information, helping them work together effectively, regardless of location Process Integration tools 1006 enforce the correct sequencing of tasks and tools in conformance with a pre-defined methodology An efficient development environment requires good tools. For general issues regarding tool selection, please refer to the general Product Selection Considerations.

Productivity (1002)

While many tools are developed in order to support a specific task (for example, source code editor), there is a family of tools that are generally required across the board, often known as productivity tools or office automation tools. These tools, typically packaged as integrated suites of software, provide the basic functionality required to create documents, spreadsheets, and simple graphics or diagrams. More recently, the ability to access the Internet and browse electronic documentation has been added to the suite of productivity tools.

Specifically, productivity tools include:

Spreadsheet

Word Processor

Graphics Editor

Personal Organizer (may be linked to Group Scheduling)

Methodology Browser

Internet Access

These tools are generally versatile enough to take the place of specialized tools (such as planning tools) in certain circumstances.

Implementation Considerations a) How secure does the development environment need to be?

In environments where security is a factor, the way in which team members gain access to the Internet must be carefully considered. For example, on high security projects, it is often the case that isolated machines with a single dial-up connection provide the only way to access the Internet, thus ensuring that the development environment remains completely isolated.

b) Are people using the Internet for its intended use?

Studies have shown that employees spend a lot of time using their Internet access for purposes unrelated to work. Therefore, the benefits and damages of providing Internet access must be assessed.

Collaboration (1004)

It is well understood that both good communication and knowledge sharing are vital for the success of any team. As development projects get bigger and teams more distributed, it becomes increasingly difficult to maintain communication between project team members. Collaborative tools have been developed with this very purpose in mind—to enable groups of people to communicate and to share information, helping them work together effectively, regardless of location.

More information on collaboration may be found in the *Collaboration Extensions Framework* in the database, and the *Collaboration Architecture Framework* in the Technology Library.

Implementation Considerations a) How distributed are the project teams?

On projects with development sites that are geographically distributed, it is usually the case that communication by e-mail alone is not a sufficient substitute for meetings when attempting to coordinate the teams involved. In order to keep all teams updated and moving in the same direction, regular (for example, weekly) conference calls between all parties—chaired by project management—is much more efficient. It is important that these conference calls are closely monitored, well prepared, and that the agenda is closely followed. Action points and commitments made during these calls must also be documented. Where issues arise that cannot be resolved using an audio conference (usually because the subject is based on a visual concept), video conferencing may be necessary.

E-Mail (138)

E-mail provides the capability of sending and receiving messages electronically. In addition to the ability to send simple ASCII text, e-mail systems usually provide the capability to attach binary files to messages. E-mail is a convenient tool for distributing information to a group of people, as it has the advantage of delivering content directly to the 'mailbox' of each individual, rather than relying on individuals to access a central data repository in order to retrieve the information.

Implementation Considerations a) Is e-mail likely to contain sensitive information?

When setting up an e-mail system, it is important to consider the content that will be transferred using the system and to apply the appropriate security controls accordingly.

Is communication outside the local environment necessary?

Is remote access required?

If so, a gateway will be required to manage communication beyond the local environment. This will bring with it security implications, as the local environment will no longer be isolated.

b) Do e-mail capabilities already exist at the development site?

If adequate capabilities are already present at the development site, it may well be prudent to take advantage of these capabilities.

Product Considerations a) Is e-mail to be supported on multiple platforms?

The choice of which product to use may depend on the platforms upon which the system must run.

b) How many people should the system support?

Low-end e-mail solutions may be perfectly adequate for small development teams.

Teamware (140)

In a creative environment, it is vitally important that people are able to easily share ideas and information. Teamware provides the ability to capture and share information across a project through the use of common-access, structured databases. A good example of teamware is the Knowledge Xchange.

Teamware may be used to share many different types of information, for example:

Technical support requests

Technical hints, which facilitate trouble-shooting

Change requests

Resource reservation (for example, meeting rooms)

Standards and procedures

Status reports/meeting minutes

Project member availability

Project events and milestones

Functional and technical issues

Suggestions

Project methodology

In order to guarantee the value of a teamware environment, it is vital that:

Consistency is maintained

Relevant updates are made (including deletions)

Storage is not abused

Security is enforced

To ensure that information is consistent across different formats, it is useful to view the management of all these information sources as part of a more general information management process. Effective information management beyond repository management is required to ensure that the anticipated benefits of electronic mail and teamware materialize.

For example, certain teamware databases require continuous maintenance in order to remain relevant. The management of the database contents may require significantly more work than either the initial installation of the tools or the technical support for the tools. This effort is frequently underestimated.

In addition to setting guidelines for general usage, the project must designate mail administrators and knowledge managers who are responsible for:

Maintaining user accounts

Maintaining security profiles

Managing database contents

Removing obsolete information

Managing resource usage (for example, disk space)

Implementation Considerations a) What size is the project team?

Teamware will generally only be effective when used within large groups of people. Unless a critical mass of people is achieved and content is regularly added to the system, interest will soon dwindle, and the system will no longer be of any value.

Group Scheduling (142)

Group scheduling tools help to centrally manage the personal schedules of a group of people. This offers the advantage of being able to coordinate events that require the participation of a number of people automatically by checking 'group availability' rather than checking with each person individually. These tools may also be used to schedule other resources such as meeting rooms and equipment.

For the use of group scheduling tools to be successful, the personal schedules of each member of the group must always be current. This is the responsibility not only of the group scheduler, but also of the individuals involved.

Audio/Video Conference (144)

In an ideal world, all meetings would be conducted face to face. In reality, however, it is often the case that not all the individuals who are required to take part in a meeting are on the same site. To overcome this problem, audio and video conferencing tools allow many individuals in different locations to communicate simultaneously. Audio conferencing is not a new concept, but remains a valuable tool for conducting meetings where the issues being discussed do not require the support of visual aids. Video conferencing takes this one step further, allowing people to interact both aurally and visually, making for a much richer method of communication.

Implementation Considerations a) Is there enough bandwidth to support a video conferencing system?

Adding bandwidth intensive applications such as audio, video, and data conferencing could have severe effects on the network infrastructure and this must be anticipated. This type of implementation is also based on a number of different, emerging standards. The video conferencing system should be designed with that fact in mind and provide for some degree of interoperability between dissimilar systems. For example, being able to connect a desktop-based video conference user with a room-based video conference user.

b) Is video conferencing the right medium for the desired purpose?

Video conferencing is an advantage when one person needs to see the other person's face, his or her reactions, read body-language, build relationships, and so on. On the other hand, when communication is more technical, for example, fixing a bug, collaborative design, document writing, or presenting a demonstration, it is more critical to be able to see what the other person is seeing, or to be able to show information at hand. In this case, application sharing assumes greater importance. It is a common misconception that video conferencing replaces working in the same place. The logistics involved in setting up a group video conference for different time zones, and the complexity of sharing a common whiteboard, limit the value of the solution to occasional situations. In a development environment, the real value of synchronous communication is not in being able to see someone else at the other end, it is in being able to share a working session on a work object.

Shared Workspace (146)

Shared workspace systems may be categorized as follows:
Electronic whiteboarding
Application sharing Electronic Whiteboarding An electronic whiteboard provides a large, clear screen that can be viewed close up and at a wide angle, upon which participants may 'write' with an infrared pen or a mouse. Images may also be pasted onto the whiteboard.

Regular workstations on a network may also be used for electronic whiteboarding, providing the appropriate software is installed. Electronic whiteboarding often works in conjunction with video conferencing applications.

Application Sharing

Application sharing allows participants to see and control the same application running on multiple PCs. In this way they can simultaneously create and edit a single, common file. Application sharing may be combined with audio conference.

Process Management (1006)

Process Management may be categorized into two areas:
Simple process integration 148, which concerns the simple integration of a sequence of tasks, according to a prescribed development methodology.
Workflow management 150, which concerns more sophisticated situations where several complex processes require the participation of multiple groups.

In either situation, the aim of the process management tools is to enforce the correct sequencing of tasks and tools. Task integration must be provided in accordance with the methodology and should provide direct support for the methodology. Effective task integration therefore reduces the need to consult the methodology.

Simple Process Integration (148)

Simple Process Integration concerns the integration of a limited sequence of tasks, for an individual, according to a prescribed development methodology. For example, the construction process can be supported within an integrated development environment tool by a menu with the following choices:

Generate module template
Generate windows and dialogs
Edit code
Compile
Link
Edit test plan
Generate testdata
Execute test with debug
Execute test without debug
Edit script
Compare results The sequencing of the menu items help to remind the programmer of the steps needed to complete the construction of the program.

Going beyond mere sequential use of tools, real-time integration of tools enables real-time data interchange. The most common example is perhaps the edit/compile/debug cycle. Here it can be very helpful to work in an integrated environment that uses the editor and places the cursor at the position corresponding to a syntax error or to a given break-point defined to the debugger. This integration is generally offered as a standard feature of an integrated development environment.

Task integration for the individual can be achieved using scripting tools or a desk top manager.

Real-time tools integration is most commonly provided by vendors who deliver integrated environments.

Workflow Management (150)

When processes become complex and require the participation of multiple groups, simple integration techniques are not adequate for managing the process flow.

Workflow Management tools address this problem by providing the ability to define, manage, and execute automated business processes through an electronic representation of the process, both in terms of what has to be done, and by whom.

For any process where multiple groups are involved, well-defined procedures must be in place to ensure that work flows from one task to another. Each participant must have access to the information required to perform the task, including the information from previous steps in the flow. This can be handled manually or supported by tools. If handled manually, it requires dedication, attention to detail, and significant training.

Workflow Management can be applied to many processes within the development environment, such as quality assurance, migration, design/construction, system test, and standards development.

Implementation Considerations

Efficient tools support for Workflow Management requires standards and procedures that specify:
Which tasks exist
Expected and maximal duration of each task
What the decision points are How the tasks fit together to form a workflow How work is routed depending on the nature of the case/issue Which roles exist Which roles can perform which tasks Which individuals can fill which roles Priority of cases (for example, depending on the originator)

Product Considerations

Workflow Management tools must at a minimum provide support for

Workflow definition

Case Routing with
 Flexible assignment
 Escalation
 Exception handling

Reporting

Tools to assist Workflow Management should support the following:

Specification of individuals, their roles and tasks, and their relationships

Specification of the workflow

Automatic routing of cases

Exception handling if a task is not performed within a prescribed elapsed time

Routing of a case based on its contents (for example, different decision processes depending on the importance of the decisions)

Assignment of cases to roles and to individuals, with manual override

Assignment based on priority

Re-assignment of cases

Reporting

Security Management (216)

Security Management tools provide the components that make up the security layer of the final system, and may provide required security controls to the development environment. While some of these tools may be considered as nothing more than security-specific Packaged Components, many are an integral part of the development environment toolset.

Security Management tools include:

Intrusion detection—discovers and alerts administrators of intrusion attempts.

Network assessment—performs scheduled and selective probes of the network's communication services, operating systems, and routers in search of those vulnerabilities most often used by unscrupulous individuals to probe, investigate, and attack your network.

Platform security—minimizes the opportunities for intruders to compromise corporate systems by providing additional operating system security features.

Web-based access control—enables organizations to control and manage user access to web based applications with restricted access.

Fraud services—methods of verifying the identity of credit card users to reduce the amount of fraudulent credit card transactions.

Mobile code security—protects corporate resources, computer files, confidential information, and corporate assets from possible mobile code attack.

E-mail content filtering—allows organizations to define and enforce e-mail policies to ensure the appropriate email content.

Application development security toolkits—allow programmers to integrate privacy, authentication, and additional security features into applications by using a cryptography engine and toolkit.

Encryption—provides confidential communications to prevent the disclosure of sensitive information as it travels over the network. This capability is essential for conducting business over an unsecured channel such as the Internet.

Public key infrastructure—provides public-key encryption and digital signature services. The purpose of a public-key infrastructure is to manage keys and certificates. A PKI enables the use of encryption, digital signatures, and authentication services across a wide variety of applications.

Authentication system—provides a business with the ability to accurately know who they are conducting business with.

Firewall—protects against theft, loss, or misuse of important data on the corporate network, as well as protection against attempted denial of service attacks. Firewalls may be used at various points in the network to enforce different security policies.

These tools will be discussed in detail in the Security Product Evaluation Framework to be published by Global TIS Security as part of the Security in eCommerce project.

Product Considerations a) Does the tool use Role-based access control?

Role-based access control establishes access rights and profiles based on job functions within the environment. If different access rights are required for security administrators vs. code developers vs. code reviewers vs. testers, then the correct access can be established based on these functions.

b) Does the tool have flexible auditing capabilities?

The security administrator should be able to granularly configure what is being audited by the tool. The audit logs should be able to optionally record User ID, time-of-day, location of access, successful and unsuccessful access or change attempts, etc.

c) What are the performance implications of the tool?

Some security services, such as content scanning or auditing, may add noticeable processing time and requirements to the system. Tools should be architected in such a way that performance impacts are or can be configured to be minimal.

d) Does the tool comply with industry accepted standards?

Many standards are emerging in the security technology marketplace. These include standards for cryptographic services, directory services, IP security, etc. In order to enhance future integration possibilities, choose vendors who are developing open solutions which comply with standards.

Information Management (202)

Information Management of the development architecture is provided through an integrated development repository. At this level of integration, tools share a common repository of development objects, design documents, source code, test plans and data. Ideally, the repository would be a single database with an all-encompassing information model. Realistically, the repository must be built by integrating the repositories of the different development tools through interfaces. Tool vendors may also build part of the integrated repository by integrating specific products.

Implementation Considerations a) Is there a desire to enforce consistency in the development effort?

Engagement teams should consider the use of a repository to enforce consistency across development efforts. A repository can store standard data, process, design, and development objects for use during application development activities. Developers then use these standard objects during implementation. As objects are defined once in the repository and reused throughout the implementation process, applications display a consistent look, feel, and flow while enforcing the standards inherent in the repository objects.

b) Will analysis and design objects be reused?

Based upon engagement experiences, an engagement team should consider using a repository when the development team reuses analysis and design objects and deliverables during later phases of the development process. A repository houses many application development components including data definitions, process models, page designs, window designs, common GUI widgets, message layouts, and copybooks.

These components can be reused across large development projects to increase developer productivity and decrease the risks associated with coding and testing the same components multiple times.

c) How large is the development team?

Large development teams require more standardization and control in order to ensure that the team remains productive and maximizes reuse of analysis and design components. A repository provides the development teams with the ability to reuse objects defined in the repository in a controlled manner. Most engagements consider using a repository once the number of developers exceeds ten.

d) Is the development team geographically dispersed?

An Information Management repository is crucial when teams whose designs must integrate are in different places. The repository becomes a means of communication that is formal and enforces the agreed interfaces.

e) Do a number of tools need to be integrated?

A repository management tool may be required to provide an integration platform for existing and future tools, providing communication among all tools where appropriate.

Product Considerations a) Is support for user defined objects required?

he repository may need to be extended by the Engagement team to support custom objects defined by the Application Development team. Some repositories support user-defined objects as part of the base functionality. Others allow customization of the repository by the user while some are not designed for customization at all. If the repository requires extensive customization, a buy versus build decision may be required.

b) Is a logical or physical repository more beneficial?

The Engagement team must consider the costs and benefits of a physical repository versus a logical repository. A physical repository is implemented as a single product. Many CASE tools employ this type of repository by housing all application development objects in a single source. Application development tools are then tightly integrated with the repository.

A logical repository integrates multiple tools to form an application development repository. The various tools employed in the development environment are bridged together by custom architecture components. This approach is commonly used when the Engagement team takes a best of breed approach to tool selection.

c) What are the current and proposed future platforms?

The Engagement team should determine whether the repository must support multiple platforms. The selected tool should not only support current platforms but also support the future platform direction of the project.

d) Does the product support multiple versions of objects?

The repository should support multiple versions of objects. By doing this, the repository can support applications in multiple phases of development. The repository tool should control access to the versions of objects by providing check-in and check-out functionality. This allows multiple developers in various phases of development to work from the same repository while allowing only one developer update access to a particular object at a time.

e) Are there existing tools that influence the selection of the Information Management tool?

Engagement teams have found that tools used in other parts of the client organization influence the selection of a repository tool. Clients may have experience and existing skills with certain Information Management tools that drive the decision to use those tools corporate-wide on other initiatives. The KX may also provide input to the tool selection process based on previous experience and skills of team members.

f) What are the other capabilities of the tool?

Engagement teams often chose a tool that can be used in other areas of the development environment. Many Engagement teams select data modeling tools that can double as Information Management tools. Using one tool for multiple purposes results in fewer integration points in the architecture and less time and cost training personnel on multiple tools.

g) Should the Information Management tool support multiple repositories?

As many repositories do not provide sufficient versioning functionality, it is common to have more than one repository on large projects. Typically there would be one repository for development, one for system test, and one for production. This improves overall control. Another reason could be that there is concurrent development of different releases, each requiring its own repository. Hence, on a large project, a tool that supports multiple repositories is often a requirement.

Does the Repository Management tool allow only authorized changes to be made to its contents by providing some form of access control?

The repository contents are effectively the building blocks of the system and have broad reuse. A facility for security is required to prevent unauthorized changes to the repository elements and hence to ensure high quality and consistent repository content. For example, restrictions are often placed on making changes to data elements because ad-hoc changes by a single designer could have devastating impacts on other parts of the design.

Repository access control is important where developers in the development environment need to be assigned different rights to the repository. Typically, the developers will be placed in groups with diminishing access rights such as repository administrator, technical support, designer, or programmer. These access rights may relate to read/write/modify/delete authority. This method of access control is far more flexible than simple object locking.

h) Does the tool provide repository reporting facilities?

Repository reports serve as an audit trail for changes to objects within a repository and can be used to communicate these changes to the entire team. The Repository Management tool should provide this utility.

Reports for impact analysis are extremely useful in the change control process. As the repository maintains relationships between repository objects, 'where-used' and 'contains' report facilities can be very useful when dealing with change requests.

i) Is the tool an active or passive Information Management tool?

Active Information Management tools can be used to generate components, whereas passive tools are used to hold information about the tool but are not used to build the system. The use of an active Information Management tool increases productivity because of the facility to generate components.

Does the tool need to be customized to provide an integration platform for all the tools in the current development environment as well as those to be supported in the future?

If the repository needs to be customized in order to integrate with all the required tools, then it is important that the Repository tool has a published interface and underlying data model. Using such a repository makes interfacing other tools with the repository considerably easier and less time consuming.

Flexibility is important if a number of point tools are to be used in the development process as opposed to using an integrated CASE tool.

j) Does the tools repository support validation?

All key characteristics of repository objects (for example, data elements) and their inter-relationships should be validated. Taking data elements as an example, these characteristics may include:

Naming standards for data element names

Naming standards for variable names associated with each programming language

Data element types

Data element length and precision

Data element window display and internal precision.

At a minimum, naming standards must be validated to allow better navigation of the repository and easier reuse of elements.

Does the tool provide a means of describing entities, such as source code files that do not exist as repository objects?

The integrity of references to entities that exist outside the repository but within the folder management system must be maintained. If the tool does not directly support this, procedures will have to be put in place to ensure the consistency of references to these entities.

Repository Management (102)

Repository Management is the key information management tool. The repository should be:

Open, with a published interface and an underlying data model. In some development environments multiple repositories may be used. One repository can be integrated to an upper-case design tool, and another one to a lower-case design tool, each of them offering the best capabilities in their respective domain. It is then key that repositories offer import/export capabilities, so proper bridging/synchronizing capabilities can be developed.

Extensible, affording the flexibility for extending the type of information that can be captured.

Integrated, with the tools that are used to populate the repository and to draw information from the repository.

Scalable, the repository-enabled environment must be able to support tens to hundreds of users simultaneously, and tens to hundreds of thousands of repository relationships. It should also scale downwards, so that it can also be easily used by small projects. This is a major criteria for usability.

A development repository results in three important benefits for a development organization and for the business units they support:

Information is kept in one place, in a known and organized structure. This means that effort is not wasted initially in recreating work that already exists and effort is not wasted later on when reconciling relevant information. This is often referred to as "full life-cycle support."

Design information, created for one step of the development process, can be fed to the next step, reducing effort and knowledge "gaps" or misunderstandings.

The repository captures information relevant to each stage in application development: design 1102, construction 1104, testing 1106, migration, execution, and operation 1108.

Figure 11:
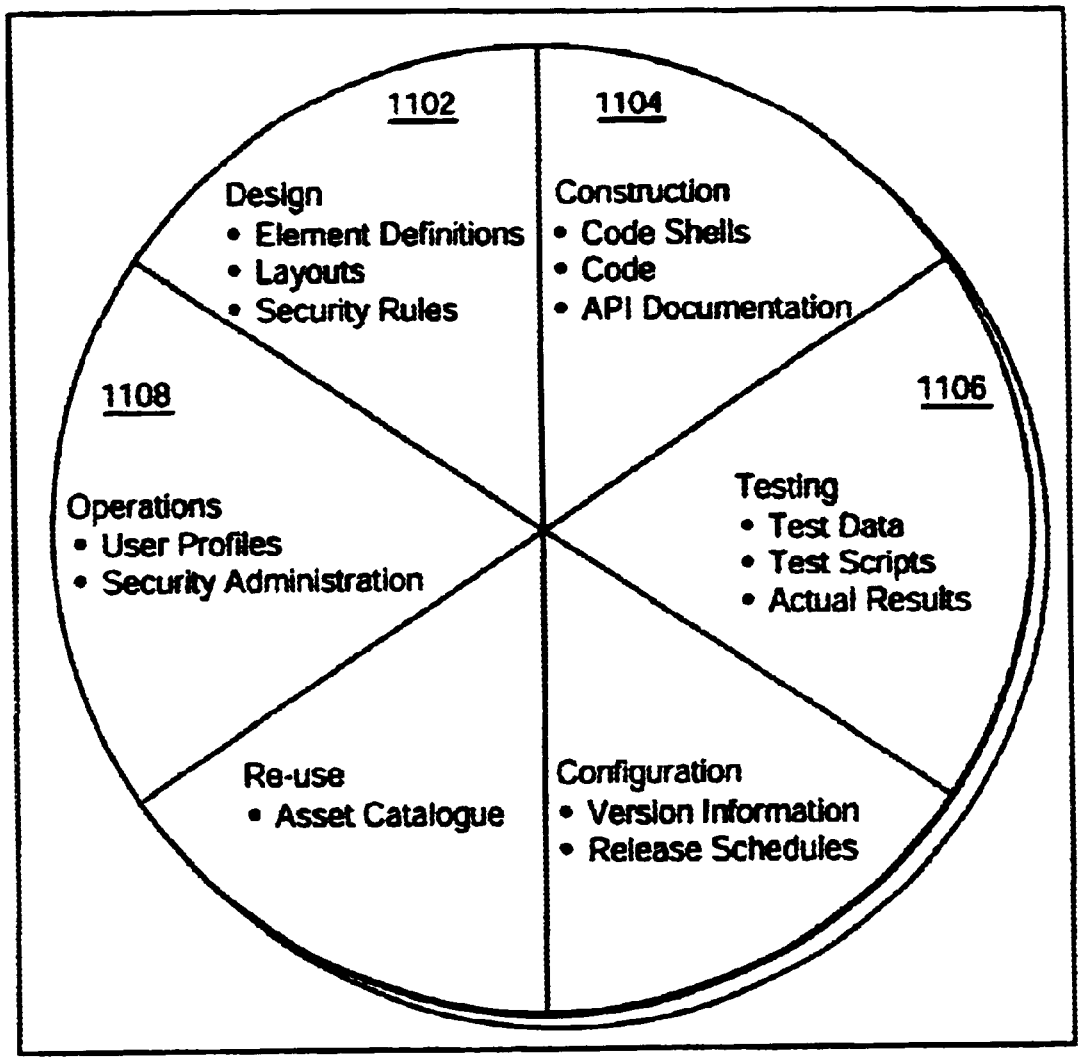
FIG. 11 is an illustration showing information captured in the Repository and reused.

FIG. 11 is an illustration showing information captured in the Repository and reused.

The challenge is to create such a repository. Most of the available tools on the market do not explicitly support this comprehensive concept of a repository.

The alternative is to:

Extend the repository. This is why the extensibility of the repository is so important. When extending the repository, consider how well future versions of the base repository will accommodate the extensions. Migrating to a future version may be more difficult after extending the repository. Extending the repository therefore requires a careful trade-off.

Use several repositories. It is not infrequent to see two repositories coexisting; for example, one upper-case and one lower-case repository. Bridges between these repositories are key. Quality of import/export capabilities of the various repositories are key.

In many instances, content may not be stored directly in the repository and must be placed in storage. In this case, only a reference is stored in the repository.

Figure 12:
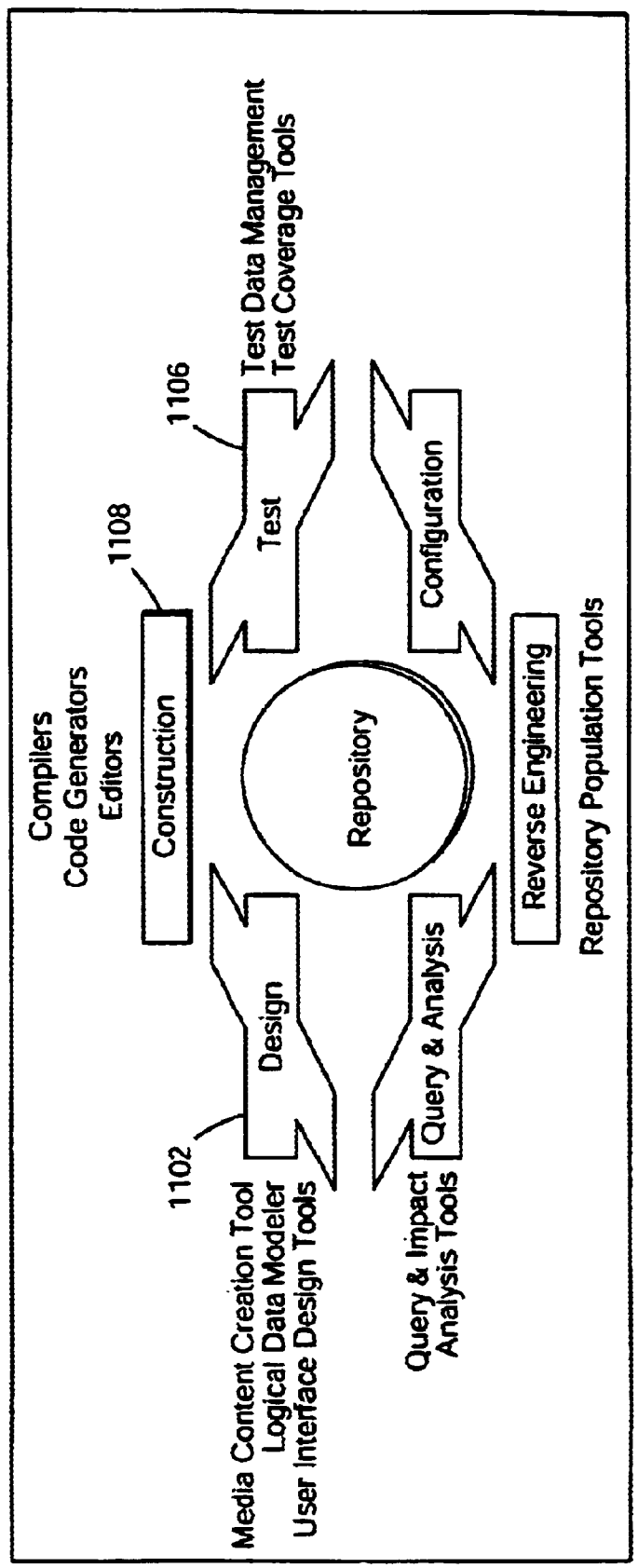
FIG. 12 is an illustration showing the Repository's central role in the development environment.

When complete integration is achieved, the repository can serve as a communication enabler for a large collection of development tools. FIG. 12 is an illustration showing the Repository's central role in the development environment.

This can be achieved either by using an integrated CASE tool, or by integrating point tools around a common repository.

In addition to the repository, which plays a key role, other important tool categories include the following.

k) Security

Repository access can sometimes be controlled using an access control function, which comes with the repository. A common technique is to group users and assign different access rights to the different groups. Each of these groups is also assigned specific read/write/delete/modify authority. For example, the following groups may be defined as having increasing rights:

Programmer

Designer

Technical support

Repository administrator

A less flexible alternative is to lock objects. A locked object cannot be changed until the repository administrator unlocks it. This is a less flexible approach but may be used when flexible access control functionality is not part of the repository.

A tricky, and somewhat risky, approach to compensate for lacking access control functionality is to use information about the repository's internal storage mechanism to design an access control scheme. For example, if data elements are stored in a particular directory, tools from the network operating system can be used to limit access to that directory. If data elements are stored in a particular table, tools from the DBMS can be used to limit rights to that table. How well this works depends on how gracefully the repository handles error messages from the network operating system or the DBMS. This approach should be tested before it is implemented.

l) Repository Maintenance

Creating and Changing Data Elements—As soon as data element maintenance becomes structured and is based on formal requests, it is practical to make the requests available to the developers in electronic format. Ideally, the requests should be entered into a database, which also contains information on status, comments on the request, and other pertinent information. This database can be a useful communication vehicle.

An alternative approach to maintaining history in cases where the repository does not offer good versioning capabilities, is to maintain a shadow repository where previous versions of repository objects are stored. This only works for those repository objects whose maintenance is strictly controlled.

Creating and Changing Other Repository Objects—It often occurs that the repository is part of an integrated CASE tool. Here, the tools used to populate the repository come with the repository and the integration work is already complete.

This, however, is not always the case. In some instances, the tools for populating extensions of the repository are not provided, and in other cases, a stand-alone repository is used. In these cases, the integration between the design tools and the repository must be performed by the Technology Infrastructure team. This was achieved on a number of projects that chose a "best-of-breed point tool" approach where they integrated these point tools around a repository. The integration may require some challenging work writing parsers, which analyze the output from the individual point tool, and use this to populate the repository. These technical complexities should be hidden from designers and programmers by providing friendly interfaces to the parsers, or by having the repository administrator trigger the parsing at regular intervals.

Repository Validation and Mass Changes—All key characteristics of data elements, and their inter-relationships, should be validated, including:
Naming standards for the element name
Naming standards for the variable name associated with each programming language
Type (for example, numeric and alphanumeric)
Length and precision
Window display and internal precision Similar validation can be performed on other repository objects depending on project standards. At a minimum, naming standards must be validated. This helps designers navigate the repository and thereby encourages reuse.

Import and export utilities, which provide exchanges between the repository and flat files, can be useful in several ways. They make it easy to take a snapshot of the repository for archiving, and they allow for reuse of the contents of other repositories.

m) Analysis, Reports, and Queries

Reports for impact analysis are extremely useful in the change control process. As the repository maintains relationships between repository objects, where-used and contains reports are usually provided with the repository. Storing the names of affected repository objects in an area-affected table can be useful when grouping change requests during assignment, or when defining a release. The area-affected table is also a valuable tool that can be used to facilitate migration from development to system test.

The ability to easily create various repository reports is important to leverage the information in the repository. A scripting language, a simple report builder, or a query tool provides this capability. Having a query tool with an intuitive user interface and good report formatting features is a necessity on a large project. The query tool can be used to provide standard reports for designers and programmers, printed design information for external reviews, and ad hoc requests for the repository administrator.

Folder Management (104)

It is not always practical to store all information in the same repository. One reason for this is the repository's physical implementation. For example, if the repository is implemented on top of a relational DBMS, this supporting structure does not provide good support for storing flat files. It may therefore often be most practical to populate the repository with place-holders for entities which reside outside the repository. With this scheme, the place-holder serves as a logical pointer. This scheme obviously requires some work to ensure integrity, but in practice it can work quite well. It works better if the objects outside can be organized in a structured way. This is where folders come in. They can be used to impose a structure on flat files; a structure, which can correspond to the structure of the repository. Folders should provide:

Flexible access rights based on user profiles, which differentiate (at least) between read and write access
Efficient search for a component across several folders
Migration between folders
Nested folders
Links to avoid duplication of components while still showing that a component belongs to several folders Media Content Management (106)

Methods for storing and managing media content range from simple folder management techniques to multimedia digital asset management systems, capable of indexing and manipulating numerous multimedia data types. There are a number of key requirements for Media Content Management—in particular, a Media Content Management system should have the ability to:

Manage multiple file formats
Efficiently store high volume files
Manage metadata on files within the system
Manage multiple versions of media files
Manage revision history of changes to media files
Control media storage across locations (online, near line, offline)

Whether the functionality described above is handled as an integral part of the system, or by manual processes implemented by the Information Management team depends on the richness of functionality provided by the tools chosen.

Additional functionality provided by advanced Media Content Management tools may include:

Intelligent indexing of media types (allowing specialized search facilities)
Capabilities for browsing media content (low-res images, previews)
High performance proprietary file systems (both in terms of speed and volume)

Implementation Considerations a) What formats need to be supported?

The method of Media Content Management depends heavily on what media is to be stored. Ensure that the target media formats are understood before implementing the Media Content Management approach.

b) Where should media content be stored?

Where to store media content greatly depends on the volume of media to be stored, and the performance requirements for retrieving that data. One thing is certain however; when dealing with large quantities of media, it is necessary to employ a dedicated media server, thus avoiding volume and performance hits with the rest of the development environment, while allowing the possibility of tuning the media server for optimal performance.

The cost of data storage is not insignificant, especially when considering the total cost (not just that of the hardware and software, but also the effort required to support it). This means that much thought must be put into a media storage strategy. This includes a strategy for deciding which media should be on-line (instantly accessible), near-line (accessible with short delay, for example, CD juke box), or even possibly off-line (manual intervention required).

Object Management (108)

Object Management tools provide capabilities for viewing objects, their methods and attributes, and the dependencies between these objects.

Object Management tools also provide specific analysis tools, in order to understand interdependencies between the core classes and the components. When classes and components are modified, impact analysis tools are required to see where the modified entity is being used, allowing them to understand what is the overall impact of the change. This is more complex than with traditional systems as a veritable spider's web of dependencies between classes, components, and applications may ensue. In addition, OO features such as inheritance and polymorphism make tracking down dependencies with simple text search tools much more difficult.

Note: At the time of writing, none of the object management tools currently available on the market provide component management capabilities.

Quality Management (204)

Quality Management is a management discipline that promotes a customer satisfaction focus and continuous improvement. Quality Management tools support the definition and implementation of quality.

A number of integrated Quality Management tools are available that may combine the functionality of all the required quality subcomponents into a single product. Many quality processes however, (such as Expectation Management) do not require specialized tools, and are therefore supported by standard productivity tools.

Metrics (110)

Metrics are an important part of quality management in that they provide a method of measuring (for example, sampling, testing, and determining) whether a process or product meets a given criterion. With Metrics, different stakeholders can agree that a product objectively meets an expectation, or that a process has been improved by a measurable amount. Without Metrics, stakeholders can only have subjective opinions that may or may not agree.

Measurement tools are used to measure process quality and product quality. Process quality may include Metrics such as the time it takes to process a change request. Product quality should be measured for all the product expectations the project has set. This measurement process is the inspection part of quality management.

Statistical Process Control (152)

Statistical Process Control tools are used to analyze the results obtained with the measurement tools. These display trends that can be used as the basis for process improvement or, in other cases, product rework.

Continuous Improvement (112)

Continuous Improvement tools are used to analyze and improve the development processes.

Continuous Improvement is a process management technique by which action is taken to modify a process when the measurement or outcomes of that process are unsatisfactory. Process improvement is required whenever the number of defects exceeds the desired level, productivity falls below a desired threshold, or client expectations fail to be met. Once the process has been modified, it is remeasured to see whether the expected gain was actually achieved.

Training (154)

Training tools provide methods to apply a standardized training approach to a large group of people. Training tools can complement or take the place of traditional instructor-led training depending on the type of information that must be communicated. Computer-Based Training (CBT) tools offer the advantage of being able to train personnel directly on the target environment.

At the more basic level, training tools can also include online or paper-based training materials—not offering all the advantages of CBTs, but still providing the flexibility and convenience because they can be conducted as and when the trainee requires, and in any location. This removes the need to organize classes.

The decision of whether to use CBT, online, paper-based or instructor-led training is affected by the number of people that have to be trained, the complexity of the subject, and the availability and distribution of the people to be trained.

Program & Project Management (214)

Program and Project Management tools assist the management teams in their daily work. These tools, typically packaged as integrated suites of software, provide the basic functionality required for planning, scheduling, tracking, and reporting at both the program and project level.

Planning

Planning tools are used to assist in program and project planning including the development of the Program Resource Plan, the Work Breakdown Structure (WBS), the Organization Breakdown Structure, Cost Accounting, milestones, and deliverables.

Scheduling

Scheduling Tools are used to allocate resources against the WBS, to determine the timeline for a specific project, and to schedule the allocation of resources at the program level.

Tracking

Project tracking tools enable the project manager to track the actual project status against the original plan and schedule. Integration with the time reporting system and techniques such as Estimates to Complete (ETCs) are valuable in tracking project status.

Reporting

Reporting Tools are used to summarize status and metrics to program and project management.

Configuration Management (210)

Configuration Management tools ensure that consistency between components and a given environment is maintained over time as components are changed.

Implementation Considerations a) Does the testing effort involve numerous applications with common components?

Engagement teams frequently require Configuration Management tools to support the testing process. Large development efforts may have multiple releases of an application in the development pipeline (development, unit test, integration test, user acceptance test, and production). Additionally, some environments have multiple applications that share common components. Multiple versions of common components may be required depending upon the application being tested.

Configuration Management tools assist in migrating code between these environments. These tools can also be used to manage different versions of test scripts for various releases of an application.

b) Where is the development team located?

Configuration Management tools are essential when development teams are not centralized at one location. These tools provide services, such as version control, when geographically distributed teams need to access common modules or data, such as code tables. Configuration Management tools may still be necessary even if the development team is centralized, depending upon other criteria such as development team size.

c) How large is the application or development team?

Large applications, as well as large development teams, require Configuration Management tools to help control versioning of code, changes to code, and migration of code (and accompanying design and test documentation) through the development and testing environments.

As the size of the team increases, the communication between team members becomes more cumbersome. The Configuration Management tools provide a structure for communication between team members regarding version control, change control, and migration control.

As the size of the application increases so does the number of objects, files, or components. The management of these items becomes increasingly difficult to manage and track during the development process. The Configuration Management tool provides structure for managing the objects, files, and components and reduces the risk of lost information caused by version problems, or by items not being migrated properly.

d) Is the development effort to be sustained over a prolonged period?

Over time, a large number of configurations will evolve and Configuration Management tools can be used to control the evolution and to document these configurations.

e) Is there a large number of components?

It may be necessary to keep track of and control configurations consisting of objects such as training materials, documentation, hardware components, system software and even building characteristics. The existence of a large number of such components makes the task of managing their configurations complex, and a dedicated Configuration Management tool becomes crucial to the process.

f) Are multiple organizations contributing?

Configuration Management tools are particularly important when there are multiple vendors and subcontractors involved and there is a need to align what is assembled in preparation for the integration test.

g) Does the system exceed 100 modules?

Configuration Management tools are needed once the system becomes large and many modules (which may include programs, header files, copybooks, shared components, subroutines, and so on) have to be managed.

There is a significant cost involved in formal configuration management. If the system has a little over 100 modules, the Configuration Management component may consist merely of a whiteboard or Excel spreadsheet. As the number of modules grows to about 1000, a dedicated tool is required.

h) Do the generations or versions of components change frequently?

A Configuration Management tool is important if many generations or versions are to be managed. This will generally be the case if the project involves a large development team. There may be external factors that the project team has no control over such as hardware vendors who change their configurations frequently. The internal components, for example, software modules must be configured to match external components such as operating systems and hardware components.

Product Considerations a) Should the engagement team build a custom configuration management tool or purchase an existing one?

An engagement team must determine whether to purchase a Configuration Management tool or build one. The build decision should consider the cost of designing and developing the functions required by the engagement team. Additionally, the project must consider the resources and development time required to build the tool and when the tool is needed in the application development schedule.

The buy decision can still be expensive and requires additional investments for training project personnel. These tools also provide many features that may not be required by the engagement team.

b) Does the engagement team have more experience with certain tools?

Engagement teams found that tools used in other parts of the client organization influence the selection process. Clients may have experience and existing skills with certain Configuration Management tools that drive the decision to use those tools on other initiatives corporate-wide. Andersen Consulting may also provide input to the tool selection process based upon previous experience and skills of team members. Using tools that the engagement team already has experience with provides several advantages, especially a reduction in training costs.

c) Does an existing component satisfy this requirement?

Engagement teams sometimes choose tools that provide multiple development functions, including Configuration Management tools. The decision to choose between available Configuration Management tools may already have been decided as a result of using certain other tools within the development environment.

d) Does the product integrate with the existing or proposed architecture?

The engagement team should select tools that integrate with other tools in the development environment and operate on the same platform. Project teams should select tools where vendors provide support for the integration between the Application Development tool and the Configuration Management tool. Such integration helps to easily and effectively manage the objects or files created by the Application Development tool.

How does the project define a configuration?

Does the tool handle all types of components in the configuration?

The components involved in Configuration Management typically involve hardware, system software, and application components together with their documentation. The tools should be able to manage and keep track of all the component types that make up a configuration.

e) Does the tool provide capabilities for exception reports?

If for some reason a repository component is not at the correct promotion level, the tool should be able to report on this when required.

f) Will a source control system suffice as a Configuration Management tool?

Generally, source control systems must be enhanced to provide a basic Configuration Management tool. The functional enhancements are typically:

Definition of a grouping mechanism for files to associate them with certain versions.

Promotion mechanisms

Definition of interconfiguration dependencies such as between a particular version's files and that version's related test data.

g) Does the tool provide ease of access to information?

The tools should automate the storage and retrieval of all dependent software components indicated by an impact analysis report.

Version Control (114)

Version Control tools control access to source code as it is developed and tested and allow multiple versions to be created, maintained, or retrieved. For example, a source code comparator can be used to identify changes between different versions of programs.

The component-based development raises a new challenge: when a single component is used by several applications, versioning becomes significantly more complex and therefore, advanced versioning software, including system support for versioning, is required.

Implementation Considerations a) Should the evolution of the system be tracked in terms of who makes changes or why certain decisions are made along the way?

Version Control tools allow systematic storage of information about who makes changes in what order so that the evolution of the system can be tracked.

The tools usually provide a facility to report on differences in versions so the version that existed when a critical change was made can be identified and recreated or retrieved. The tools can also provide a means of documenting why decisions are made during the evolution of the system. These decisions would have been made based on the version of the documentation for the system that existed at that time. Version Control tools allow the state of the system at a particular time to be recorded. Hence improved auditability for decisions can be achieved.

b) Is there a large development team?

Version Control tools allow developers to work semi-independently and to choose the degree of integration they need at any given time. They can shield themselves from the tentative development performed on shared components and test a portion of the system with a stable environment around them. This prevents the development team from having to develop one full sequence at a time and increases the ability of a large number of people to work productively together, thus compressing the time required to develop a system.

c) Is there concurrent development of multiple versions of the system?

A comprehensive Version Control tool set is critical if there is concurrent development of multiple versions of the system. This is often the case when system development is to be sustained over an extended period.

Special provisions must be made to ensure that the library and repository structures are rich enough to be able to support the necessary versions. In this environment, a log of changes also becomes very important as fixes applied to earlier versions generally have to be applied to later versions as well.

d) Is it likely that the system will need to be rolled back to a previous version at some stage in the development?

This is typically the case when the project is breaking ground, using new techniques or untried architectures.

Version Control tools provide a means of taking snapshots of the system in time. If there are changes in the environment that force the system to be rolled back to a previous stage in the development, Version Control tools allow access to previous versions and mechanisms for reverting to an earlier version.

e) When should I set up version control?

Version Control should be set up from the beginning. By delaying version control, manual Version Control must be used. This result can be an increased cost in disk space in the development environment (because of the number of versions of each module that must be kept) and can lead to some human versioning errors.

f) What kind of information should I add to version control?

There are different approaches: Everything (hand-made code, generated files, documentation, even compiled exec file or DLLs), some of the above etc. In general, documentation should be added if no additional design repository exists, otherwise, use the repository, which usually has a versioning capability. Adding binary files will usually have to be considered during the initial setup phase, as this requires significantly more memory and not all tools can handle binary files in a correct manner.

g) Which stages to add?

The stages in the version control (Dev, Assembly test, system test, etc.) should be added according to the development approach. Strong relationship to migration control. Should also be automated and is usually supported by the tools.

Product Considerations a) Does the tool provide capabilities to cater for a system running on multiple platforms or a distributed system?

Ideally, the Version Control tool must be able to operate on all the platforms in use, whilst at the same time performing Version Control for all components across the entire system.

b) Does the tool provide support for actions like mass builds?

Usually, custom tools are put on top of the vendors tools to support actions like mass builds etc. Some tools (or add-ons) support this already. This is vital for the project, as it allows huge productivity gains in later phases of the project.

c) How easy is it to implement batch solutions?

It should be considered if a batch/API interface exists for implementing batch solutions.

Change Control (118)

The Change Control system should provide the following features:

Free format description of changes

Classification of changes in several different ways (area affected, priority, estimated cost, authorization)

Flexible, customizable sorting and reporting to ensure that a change is handled in a timely manner Ideally, the Change Control system should also be integrated with workflow support, the repository, and the source code control system. This ensures rapid processing of the change, accurate analysis of the area affected, and correct locking and unlocking of repository objects and source modules.

Implementation Considerations a) Does the project require strict scope control?

Specifications and scope may be changed at any time if Change Control tools and standards are not implemented.

This can result in the project running over budget, or being delivered late with inconsistent quality because requirements change continuously.

b) Is the system complex?

Change control has broader applicability than to just application source code. It may also affect the look and feel, training materials, documentation, and so forth. Change Control must be formalized if the system is complex with many components.

c) Do changes need to be authorized by specific personnel?

Change control tools provide a vehicle for ensuring that only authorized changes are made and signed off. This ensures conceptual, proper ownership of the total look and feel of the application. Change requests may also be rejected or deferred by an authorized person.

d) Is coordination of changes required?

Facilities to track interdependencies between change requests (for example, change request A must be completed before change request B can start) are provided by Change Control tools. This can be used to encourage efficient scheduling and to ensure that work is not duplicated.

e) Should a record be kept of changes that fall beyond the capacity of the project at that time?

Change Control tools can provide a vehicle for capturing good ideas. If the project does not have the capacity to implement those ideas at present, the Change Control tool can be used to capture those ideas. These ideas can be reinvestigated when a future release is planned.

f) Are conflicting change requests likely to occur?

Change request tools can be used to identify changes that conflict, for example, one user wants a green background and another wants a blue background. The changes must be resolved through some kind of dialog or discussion and Change Control can be used to initiate this process.

g) Is it likely that the system will need to be rolled back to a certain state?

This is typically the case when the project is breaking ground by using new techniques or untried architectures. Change control tools provide a means of identifying at what point in time a critical change was implemented and that information can be used to find out what version existed at that time.

h) Is there a need to evaluate the impact of implementing a change on the project?

Change control tools typically support some kind of impact analysis and may be integrated with an impact analysis tool set. Impact analysis is important in order to group changes so that they can be implemented effectively. Multiple changes may affect the same component and it would be wasteful to open that component many times over and implement the changes one at a time. Impact analysis can be used to ensure that all relevant changes to that component are implemented together. Hence impact analysis is important for scheduling purposes and for estimating cost.

Product Considerations a) Does the tool provide a capability to classify change requests?

Change requests may occur as a consequence of changing requirements, or as a result of nonconformities (or defects) in the system. The tool should be able to classify change requests into categories such as incidents, faults, or enhancements. The tool should also have the ability to update these categories if required.

Classification of different change requests in several different ways such as area affected, priority, estimated cost or authorization is important to ensure correct scheduling of the implementation of changes. Flexible, customized sorting and reporting based on this classification is required to ensure that change is handled in a timely manner.

b) Should an Impact Analysis tool be purchased or developed?

Impact analysis tools are typically required to provide analysis of a wide range of types of documents such as Word, Excel, or PowerPoint.

If an impact analysis tool cannot be found that supports the entire environment, it is critical to develop procedures or utilities that will report on where items are used. The first step is to identify the items to be searched, and to build procedures around searching them (for example, databases, files, workspaces, programs, screens/forms, reports). It is also important to identify who will be responsible for the impact analysis (DBA, analysts, programmers, team leaders, and so on) to avoid this work falling between the cracks.

c) Does the tool provide free format description of changes?

Free format descriptions are important because this allows better and more understandable documentation of change requests and associated decisions.

d) Are there going to be multiple releases of the software?

The tool should allocate change requests to different releases based on priority and resource availability. It should also provide a means of attaching a deadline to a change request.

Does the tool provide a means of indicating which development team member is best suited to perform the implementation of that change request?

This functionality should be available as part of the scheduling capability. An added feature would be the capability to balance workload across the team.

e) How does the tool handle exceptions?

The tool should provide a capability to generate exception reports that highlight issues such as change requests that are in danger of not meeting the release to which it was allocated.

f) What is the prediction for volume of change requests for the project?

The tool should be able to cope with the expected volume of change.

g) Is validation of data entered into the change request form a consideration?

It may be necessary to ensure that the data entered on a change request form is valid. This is particularly important if the development team is inexperienced or if the project is particularly complex. An example of data validation would be to ensure that the change is assigned to a valid team to prevent a change request from falling through the cracks.

h) Is recording of resolution details and root causes required?

This capability provides useful tracking across the complete life cycle of a change request.

i) What reporting capabilities are needed on the project?

Some Change Control tools can report on status of change requests at the individual, team, and project level. Such reports can provide information about work done to date and Estimate to Complete (ETC) values.

j) How many users will simultaneously be accessing the system?

The tool should cater to the size of the project. Maintaining consistency of information may otherwise become a problem with simultaneous access. The tool should provide some kind of protection of change requests if simultaneous access is likely to occur.

k) Does the tool provide a means of prioritizing change requests?

The tool should provide capabilities for prioritizing change requests based on business impact and the impact of implementing the change.

Does the tool provide capabilities for predicting the cost, risk, and instabilities created as a result of implementing a change request?

These capabilities need not provide completely automated prediction but should work in conjunction with an analyst.

l) Does the tool identify component dependencies?

This is an important aspect of impact analysis that is required to ensure that all components impacted by a change request are identified.

Migration Control (116)

Migration Control tools control multiple versions of source code, data, and other items as they are changed, tested, and moved from one development environment into another, for example, from development to test and from test to production. Data migration control tools manage multiple versions of the database and its data to ensure that accurate data and structure are maintained in the environment, and to ensure that versions of application code and database are deployed consistently. Types of data that would be migrated include base codes data and converted data.

Other Migration Control tools manage other types of objects to ensure that complete versions of all components reside in the production environment (for example, test definitions and scripts).

Implementation Considerations a) Are there multiple environments running in parallel?

Multiple environments are typically required when the project is faced with serious time constraints. Typically the project team performs integration or systems testing on one portion of the system, while developing the next portion. The team corrects errors based on one test while at the same time, the next test cycle or testing of the next part of the system is performed. This means that multiple environments exist that are configured differently and use a different version of the system components. The migration of these different versions and configurations between environments must be carefully controlled using Migration Control tools. For successful migration there must be consistent migration of all components and their dependents.

b) Are multiple releases being developed in parallel?

If multiple releases are being developed in parallel, it is vital to provide a consistent means of migrating configurations and versions from one environment to the next. This ensures that there is no confusion of components in each release as the move is made from, for example, a unit test environment to a system test environment.

c) Is the development effort to be sustained over a prolonged period?

Migration control tools keep a log of what is migrated. It may be required to review what has happened over time, in order to gain an understanding of the current status of the system.

d) Is there a need to control who activates migration from one environment to the next?

Migration control tools ensure that only authorized personnel can trigger the migration of components from one environment to the next.

e) Is the system complex (consisting of more than 1000 components)?

The task of promoting components and locking these components to prevent concurrent or unauthorized updates to them or their dependents becomes very intricate as the number of components reaches 1000. Migration control tools can be used to improve productivity by facilitating and controlling the migration from one environment to another and by automating the process. It is possible to bring a large project to a complete halt if Migration Control is not properly enforced.

Product Considerations a) Does the tool support the migration of all the components that make up a migration object?

The Migration Control tool should be able to manage and control the migration of all the components (for example, source code, database access, make files, run-time data, environment variables, code libraries, code tables, third-party software, and so forth) which make up the object to be migrated. The complexity of the Netcentric world with so many integrated vendor solutions dramatically increases the number and variations of object types.

b) Does the tool facilitate the migration of many components together as well as migrating components individually?

Migration from a development environment to a system test environment either involves a large number of components (migration of all the components belonging to a test cycle) or single components (after code fixing in a program). Either way the Migration Control tool should lock the migrated component to control changes and allow better coordination with the system test team.

c) Does the tool support all the required platforms?

In a development environment where there may be different platforms, it is important that the Migration Control tools be able to synchronize source migration across platforms. Unit and system tests are normally performed on every platform so the migration tool should be able to promote the components across platforms as well as from environment to environment.

d) What is the migration strategy?

A push strategy should be facilitated by the migration tool if it is decided that modules should be tested when those modules are ready for testing. This is normally the case for unit testing. A pull strategy is needed if the order of component testing is important as is normally the case for system testing.

In implementing a push strategy it is usual for the individual programmer to be responsible for migrating the module. If this is the case then the tool should be easy to learn and use. Using a pull strategy may decrease the number of people required to know how to use the tool.

Release Management

Release Management tools should provide:

Planning functionalities, to help planning design and development effort

Monitoring functionalities, in order to measure progress towards delivery goals

Project interdependencies management

Interface with the change control system

Ideally, the Release Management system should also be integrated with workflow support, the repository, and the project/program management system.

Environment Management (206)

The modern development environment is both complex and sophisticated. It supports many different functional and technical requirements (illustrated by the execution architecture), many different development teams, tools from many different product vendors, and often must support projects at different stages of the development life cycle. As such, it is a mission-critical production environment and must be managed based upon an operations architecture. The extent to which the areas of the operations architecture are implemented must also be a factor of project size and duration.

The environment management requirements in this section are based upon the MODE (Management of Distributed Environments) conceptual framework. This section uses MODE as a framework, adopts MODE terminology, and focuses on those management tasks from MODE which are particularly important in the development architecture.

MODE identifies four main areas:

Service Management

Systems Management

Managing Change

Service Planning

The subcomponents of Environment management reflect these four MODE areas.

Service Management (122)

Service Management tools support the various aspects of supporting and managing the interface with developers.

As defined in MODE, these include the following:

Tools to support and manage the Help Desk

Tools to support the creation, management, and reporting of Service Level Agreements (SLAs) and Operations Level Agreements (OLAs)

Tools to manage and support the quality of the development environment

Systems Management (126)

Systems Management Tools support and manage the operation of the distributed system. Many specific monitoring and analysis tools are covered in detail in the Network Performance Management practice aid and the Technology Products and Vendors database, both available on the Knowledge Xchange.

Startup & Shutdown

A comprehensive development environment rapidly becomes sufficiently complex that the startup and shutdown of the environment must be managed carefully, and preferably automated. This is key to ensuring the integrity of the environment. Startup may involve the carefully sequenced initialization of networking software, databases, web servers and more. Similarly, shutdown involves saving configuration changes as needed and gracefully taking down running software in the correct sequence.

Backup & Restore

The incremental value of the daily work performed on the development project is high. This investment must be protected from problems arising from hardware and software failure, and from erroneous user actions and catastrophes such as fires or floods. The repositories and other development information must therefore be backed up regularly. Backup and restore procedures and tools must be tested to ensure that system components can be recovered as anticipated. The large volumes of complex data generally require automation of backups and restores.

The advent of Netcentric technologies has introduced an increase in media content that requires storage. The environment may support a high volume of media files, which must be considered in the backup/restore plans. Storage capacity planning should allow for the typically increased size of these file types.

As the amount of storage will grow significantly over time on a large project, the hardware requirements will increase. Sufficient room for growth should be planned when selecting the tools and hardware. Switching tools and hardware can be problematic due to lack of upward compatibility (DDS-DLT, various tools etc.).

The time required for backups must also be considered. Usually the number of hours without development per day decreases over time and if backups can only be performed when no user is logged in, this might become a problem. It is generally the case that the project will benefit from buying the fastest and largest backup hardware/software it can afford.

Archiving

Archiving can be particularly useful to safeguard information from previous versions or releases. More generally, it is used to create a copy of information that is less time-critical than the current environment at a given time. Archiving may be performed to a medium, which is different from the backup medium, and may involve other tools which, for example, provide a higher compression ratio.

Security

Security tools are required in the development environment to ensure against unauthorized access by individuals and system processes, to limit damages caused by such unauthorized access, and to audit access the environment services. At the security management level, it may be valuable to have tools which help manage security profiles, security groups, and access rights.

Product Considerations a) Does the tool use Role-based access control?

Role-based access control establishes access rights and profiles based on job functions within the environment. If different access rights are required for security administrators vs. code developers vs. code reviewers vs. testers, then the correct access can be established based on these functions.

b) Does the tool have flexible auditing capabilities?

The security administrator should be able to granularly configure what is being audited by the tool. The audit logs should be able to optionally record User ID, time-of-day, location of access, successful and unsuccessful access or change attempts, etc.

c) What are the performance implications of the tool?

Some security services, such as content scanning or auditing, may add noticeable processing time and requirements to the system. Tools should be architectured in such a way that performance impacts are or can be configured to be minimal.

Performance Monitoring

Performance Monitoring tools help ensure that the available resources are sufficient to meet the developers' performance requirements. These tools can be used to assess end-to-end performance of both batch processes such as backups, and interactive processes such as repository-based file retrieval.

Service Planning (124)

Service Planning is the planning required to anticipate and implement changes to the following areas:

Service management

Systems management

Managing change

Strategic planning

All these areas relate to the development environment and are analogous to the kind of planning that must occur in the business application's production environment. Key types of tools for development environments include Performance Modeling and Capacity Planning tools.

Performance Modeling

Performance modeling tools in this category support the analysis of the development environment's performance, as opposed to that of the client/server application being developed. A simple spreadsheet may be suitable in some well-known and understood environments, but dedicated performance modeling tools should be considered on any project with high transaction volumes or complex environments involving multiple platforms.

Capacity Modeling

Capacity modeling tools support the maintenance of adequate processing capacity for the development environment (for example, workstations, servers, storage devices, and network capacity). These tools range from spreadsheets to dedicated capacity modeling and simulation tools.

Managing Change (120)

Managing Change tools support the various aspects of identifying and managing change in the development environment. Specific tools are discussed in detail in the MODE Products Database on the Knowledge Xchange.

Data and Software Distribution is a key tool in this category for development environments that have several developers. These tools enable automated distribution of data and software to the workstations and servers in the development environment.

Problem Management (212)

Problem Management tools help track each system investigation request—from detection and documentation to resolution (for example, Problem Tracking, Impact Analysis, Statistical Analysis).

Problem Management tools log information about problems detected, classify them, and generate reports. This is essential for capturing metrics information.

The major functions of Problem Management are:

Problem source and metrics information

Problem solution information

Planning support for problem fixing and migration preparation

Impact analysis capability:
  Link to the application design repository to get a precise impact analysis on a problem
  Link to the test plan management system to keep track of the cycle and test the condition where the problem occurred, to determine the test stage work unit affected by the problem It is important to select an automated Problem Management system that is integrated with the program's testing and Configuration Management tools. Therefore, the Problem Management system must be able to support the testing model selected, for example, the V-model, and have tight integration with the Migration and Version Control tools associated with Configuration Management.

An automated test script tool can be integrated to allow users to reference scripts that were being used when the error or defect was found. A data repository can be integrated into the Problem Management application that will allow the users to build relationships between problems and design and test documentation and application components.

An ability to associate problems with affected work packages and a mechanism for version control changes for the work package is necessary so the package can be migrated back into the testing environment.

When considering an automated tool, also consider what type of security is required for the Problem Management application. This is closely tied with the Configuration Management tools. Only one person should have the rights to review and approve problem analysis tasks as well as problem migration activities.

Implementation Considerations
  a) How are problems handled at each stage?
  b) How do I plan for trapping problems?
  c) Do I retest problems at different stages?

The following is an overview stage containment as documented by the Reinventing Testing Project (RTP).

Stage containment is an approach to identify problems in the system before they pass to the next stage. It is a measure that helps build quality into the system. The goal of stage containment is to minimize the number of errors being passed to the next stage. For the purpose of stage containment, problems are sorted into categories. Errors are defined as problems found in the stage where they were created. Defects are problems found in a stage successive to the stage where they were created. Faults are problems found in production. The longer a defect remains undiscovered, the more difficult and expensive it will be to correct. Because each stage relies on the decisions made during the creation of the specification in the previous stage, detecting an error in a stage after it was made may invalidate some or all of the work done between the time the issue was created and the time it was discovered.

The V-model specifies that testing in one stage must be completed before moving on to the next stage of testing. Before moving up to the next stage, it is key that the exit criteria defined for that stage have been met. A part of the exit criteria for each stage is that the test has been successfully executed, therefore ensuring the test objectives (or primary focus of the test) are accomplished before moving on to the next stage.

Once the objectives of one test stage are met, there is no need to repeat the same testing at the next stage. This is a key concept of the V-model and one that proves difficult to accept and use in practice. There is often a desire to retest just to "make sure everything is OK." Doing so, inevitably leads to time-consuming testing. In addition, it leaves less time to do the testing required for the current stage of testing, ultimately resulting in minimal, if any, time for the last stage of testing. In other words, minimize gaps and overlaps between the testing stages while ensuring quality of delivery.

It is possible, however, that testing at one stage may, and should, use test scripts from previous stages. Two stages of testing may be executed together, using the same scripts, but both sets of test conditions must be covered (that is, both sets of objectives must be met). All stages of testing are required. For example, a thorough assembly test cannot make up for inadequate component testing, as the objectives of each test stage are different.

d) What other components does the Problem Management system interface with?

RTP has identified the following components as interfaces with the Problem Management system.

Configuration Management—When a defect is ready for migration, the Migration Control system can be used to pass the list of components to migrate. The Problem Management system can keep track of the migration date obtained from the Migration Control system.

Design Repository—An impact analysis of a specific component in error will be performed directly on the design repository by providing a means to use the appropriate design repository function or having the Problem Management system referencing the design repository objects.

Test Data Management—Test results, expected results, and data comparison results can be linked to a defect to provide centralized access to the information.

Integration also aids in keeping track of the cycle where the problem occurred, the test condition, and therefore the business function affected by the problem.

e) How many design repositories should be used?

f) What does the design repository interact with?

Typically, the design repository represents the basis of the application development. It is mainly involved during the construction phase of the application and is used to centralize the application definition data. The design repository can be complex, providing impact analysis and application generation features.

In a testing environment, the design repository is a safe means of analyzing the impact of a problem on the whole application.

Having two separated systems, one for Problem Management and one for application design, duplicates the information and introduces errors. Therefore, the interaction between the design repository and the Problem Management, Test Planning, and Configuration Management components significantly increases productivity and reduces the risk of errors.

Product Considerations a) Are there any Problem Management tools identified?

Problem Management tools log error information, generate error reports (such as System Investigation Reports or SIRs), classify problems, and record information on the source of the error. Problem Management tools are essential for the capture of stage containment metric information.

b) What engagement factors affect the use of Problem Management tools?

Risk rating of the engagement—In general, management and planning tools help better address the engagement risks. A high risk rating for the engagement affects positively the decision to use tools such as Test Planning, Test Data Management, Problem Management, and Configuration Management.

Criticality of the engagement—In general, management and planning tools help better manage the engagement and ensure the timely delivery of a quality system. Therefore, dealing with a highly critical engagement will most likely affect positively the decision to use tools such as Test Planning, Test Data Management, Problem Management, and Configuration Management.

c) What testing team factors should be considered when using a Problem Management tool?

Communication between development team and testing team—A Problem Management tool can be used to track issues, design changes, and so on, and serve as a communication tool between teams. As part of a Change Control mechanism for the engagement, such a tool can help improve communication between the development and testing teams. Thus, bad communications between teams can still have a positive influence on the decision to use Problem Management.

Size of the testing team—The size of the testing team has an impact on the decision to use a Problem Management tool. If the testing team is large, keeping all team members informed on the status of identified problems is a more complex endeavor than with a small team. The larger the testing team, the more benefits will be derived from using a Problem Management tool to support testing.

Similarly, the larger the testing team, the more benefits will be derived from using a Test Data Management tool (easier control over the test data for the various testers), a Configuration Management tool (easier control over all system configurations and component versions) and a Test Plan Management tool (easier control over all test cycles, subcycles, their execution statuses, and so on).

System Building (218)

System Building tools comprise the core of the development architecture and are used to design, build, and test the system. All the system building tools must be integrated and share development objects appropriately.

Analysis & Design (128)

Analysis tools are used to specify the requirements for the system being developed. They are typically modeling and diagramming tools, which provide the ability to diagram system requirements and specify "what" a system must do.

Design tools are used to specify "how" a system will implement these system requirements. They are typically diagramming tools, which graphically depict how the system will be built in terms of its key components. This differs between classical client/server systems and component-based systems:

The standard client/server model comprises application logic, presentation, and communication components, which together support the business processes. For a client/server system, each of these components must be individually defined.

The component-based systems, however, have the data model and process models encapsulated within the object model. In addition, the design of the component model is directly affected by the business processes which govern the way these objects interact. Therefore, with component-based systems, the object and component models encapsulate the data and process models.

Data Modeling

Data Modeling tools provide a graphical depiction of the logical data requirements for the system. These tools usually support diagramming entities, relationships, and attributes of the business being modeled on an Entity-Relationship Diagram (ERD). Several techniques have evolved to support different methodologies (e.g., Chen, Gane & Sarson, and IDEF).

As systems are often built on top of legacy databases, some data modeling tools allow generation of an object model from the legacy database data model (DDL). By understanding the E-R diagram represented by the database, it is easier to create an efficient persistence framework which isolates business components from a direct access to relational databases. Caution is required, however, as the resulting model is at best only partial, as an object model has dynamic aspects to it as well as static relationships, and may not correctly reflect the analysis performed in the problem domain.

When a component or object-based approach is used, data modeling is not performed. Rather, the object model contains both the data and the behavior associated with an object. In most systems relational databases are used and the object model must be mapped to the data model. Standard mechanisms for mapping objects exist. Tools such as Persistence (Persistence Corp.) and DBTools (Rogue Wave) can generate the code necessary to map objects to a database.

Implementation Considerations a) Can the development process benefit from a DDL generation tool?

Data modeling tools allow DDL to be generated from the data model. The tools should support DDL generation for the chosen RDBMs (Sybase, Oracle, DB2). In addition, the DDL generator should take advantage of the specific advanced features supported by each of the RDBMs.

b) Can developers benefit by a graphical depiction of the logical and physical data requirements?

Data modeling tools help to graphically develop the logical and physical data requirements for an application. These tools depict logical constructs such as entities, attributes, and relationships between entities, along with physical constructs such as database definitions and table indices.

It is useful for developers to have read-only access to either a hard or soft copy of the data model during development. This document rapidly becomes a key discussion document in design discussions. It is useful to show tables, columns, primary keys, and foreign keys (if all of this will fit on a diagram at the same time!) in the document Graphical depiction is not only useful but essential to data architects, DBAs and also to application developers (the latter group is often omitted). As in most cases, a picture speaks a thousand words.

c) Is there a need for consistency in data across applications?

Data modeling tools promote consistency in application development by defining standard names and attribute characteristics for the application data. Application developers then use the standard entity and attribute definitions across various application development initiatives. This results in a consistent definition and usage of data. For example, all applications that require customer number will use the standard name and attribute length defined in the data model. Database administrators will also use the data model to generate physical database definitions that are consistent with the application under development. Thus, the data model acts as a single source for data definition.

All applications should have data consistency that is linked back to a set of business data standards. Failure to achieve an agreed set of definitions will jeopardize the ability of the separate applications to perform as a business unit, for example, applications will not be able to share data if they are in different formats or use different code lookups. Data consistency must be agreed FUNCTIONALLY during analysis and design. Data modeling tools will help to document data definitions but they will not automatically enforce data consistency.

d) Are there more than 100 entities in the data model?

At this level of complexity a dedicated data modeling tool is necessary.

Does the system incorporate object oriented methods?

Is a relational database being used to store persistent objects?

Fully normalized data models are a different view of the corresponding object models. On the one hand, the data model does not show behaviors (methods). On the other hand it does show resolving entities that are normally modeled as container objects and may be internal to an object. A data modeling tool is useful for showing how the persistent objects map to the relational database.

e) Is there a need to communicate the business data requirements without regard to the DBMS or platform?

A data model is a technology-independent model of an organization's data requirements consisting of diagrams and descriptions of entity types, attribute types, relationship types, and integrity constraints. It is a flexible, non-redundant, non-constraining model. As a simplified representation of reality, it has no regard for such physical matters as how data is to be retrieved or how long it will take. The data model presents a concept of the business data in an idealized structure. It is a useful tool to communicate the scope of the project.

f) Is the system complex and changing?

Good data modeling requires a full understanding of the business data involved. Data modeling becomes more important as systems become more complex and sophisticated. The data structures which support such systems must be flexible and be able to accommodate change. The data model is the best means of identifying and representing these changes.

g) Is database design going to be performed?

The finalized data model is used as a basis for the logical database design. The logical database design converts the finalized Project Data Model to one of four basic structures, according to which DBMS is used:

Hierarchical (rarely used today)
Network (e.g., IDMS)
Relational (e.g., DB2)
Inverted List (e.g., ADABAS)

Although entity-relationship diagrams are independent of specific DBMSs or access methods, a logical database design is not. This design is highly dependent on the platform components and may need to be repeated for each location type and platform type. This process is simplified if a data model is used.

h) Does the system interface with external systems having their own data definitions?

Data modeling tools allow documentation of the data in so far as it appears in the data model (and ultimately in the database). However, there is usually a significant number of other data definitions which will never appear in the database, and whose definition is different to the data model attributes. For example, most systems have interfaces to external systems, and inherit a legacy of interface files whose data definitions may differ to those on the data model, but which do logically correspond to fields on the model. These data definitions must also be documented and stored but are effectively outside the data model. The data modeling component should be used to implement procedures to address all the data definitions that affect the system.

Product Considerations a) What is the intended use of the tool?

The features required in the data modeling tool will depend on the intended use of the tool. If the tool is to be used to develop logical data models, it should support logical constructs such as entity definition, attribute definition, subtyping, and supertyping. If the tool is to be used for physical data design, it should support the physical constructs required for the targeted RDBMs, such as transforming a logical model into a physical model, database definition, index definition, and DDL generation.

b) Does an existing component satisfy this requirement?

The development architecture may already have tools that support data modeling. For example, many information management tools (repository) provide data modeling capabilities. Using a single tool for multiple functions reduces the developer learning curve and provides integration between the components of the development architecture.

c) What other utilities are available with the data modeling tool?

It is important to consider the various utilities available with the data modeling tools. Two such utilities include impact analysis and reporting.

Impact analysis capabilities allow the user to understand the impact of a change to the data model. Impact analysis functionality is one of the key tools used by engagement teams to assist with change management and change control activities.

Some products will also include report generators which are useful for generating data and attribute definition reports as well as ad hoc reports.

d) Does the development team have any prior experience with data modeling tools?

A data modeling tool may be chosen based upon prior experience with the tool by the client or members of the engagement team. This reduces the learning curve associated with integrating a new tool into the development environment.

e) How well does the data modeling tool integrate with other development tools?

Data modeling tools commonly integrate with the repository and with system building tools such as window painters and Application Logic Design tools. If the tool does not provide seamless integration with other components of the development environment, the engagement team can build bridges between components, or develop manual procedures in order to share information.

It is important to consider how the data modeling tool integrates with the design repository. It is important to maintain a cross-reference of the attributes on the model, with the definition of data elements in the design repository. Such data element definitions will also address non-database data definitions (e.g. external i/face files).

f) What level of data modeling is required?

During the early conceptual design, data modeling need not be very detailed. It should be a participative, team activity, and is usually very unstable. In this case, a tool such as a white board or PowerPoint will suffice.

As the design becomes more detailed, more sophisticated tools are needed. At the lowest level of detail consistency is vital and a repository-based tool can be used to ensure consistency across the data model.

g) Should the data modeling tool provide database design facilities?

There are some tools which do not incorporate this feature, such as ARIS, which is strictly a data modeling tool. This may be helpful to guard against moving too far into the design during the analysis phase.

Most data modeling tools allow you to develop the database design at the same time. This has the advantage of keeping costs down as two separate tools need not be purchased, and of ensuring consistency by providing a direct interface between the two phases.

h) Does the data modeling tool support submodeling?

Submodeling enables complex models to be broken down into smaller more manageable and understandable models while still maintaining unique object definition. This is particularly important for large teams where data modeling is divided among several teams.

i) Does the data modeling tool provide support for a multi-designer environment?

The information management component may provide the security needed in a multi-designer environment. If this is not the case then a multi-designer data modeling tool should be used. The tool may provide a central dictionary which allows design data to be shared between several designers and includes security checks to monitor any conflicts in overlapping access rights between designers.

j) Does the tool provide facilities to add color to the data model?

The facility to add color to the data model is useful for communicating additional dimensions such as data ownership.

k) Is entity life history required to be documented?

The data modeling tools must support a facility for ELH modeling for entities that have their status changed by a wide range of events. Any entity which has an attribute containing the word status is a likely candidate.

l) At what point should inconsistencies in the design be controlled?

Designs should be consistent. However, enforcing internal consistency at all times can lead to design gridlock which prevents innovation or progress. The tool should support the project decisions regarding consistency.

Process Modeling

Process modeling tools provide a graphical depiction of the business functions and processes being supported by a system. The tool(s) selected must support the modeling techniques being used in the development methodology. These include process decomposition, data flow, and process dependency.

Implementation Considerations a) Are the processes that the system is to support ill-understood or is there little consensus on what these processes are?

Process modeling is a method for clarifying and communicating the business design of the system. The process model can provide an effective means of bringing people together, creating a shared vision of how the business is to function.

b) Do the processes vary from region to region and need to be standardized?

A process model provides a means of standardizing a set of similar processes which exist, for example, at different branches of the business.

c) Does the project include process re-engineering or process-streamlining?

The re-engineered processes in the process model may form a basis for the systems design which is to come afterwards. Requirements and constraints for the system design can be well represented and communicated in a process model.

d) Is process simulation required?

Advanced process modeling tools provide process simulation capabilities. Process simulation ensures that the process design is adequate as a basis of the functionality of the software that is to be developed.

Product Considerations a) What approach is to be used for process modeling?

The tool may need to support the creation of business function decompositions or data flow diagrams depending on the approach used.

Data flow diagramming is used when the application has a complex or innovative workflow or if the analysis and design teams have little experience with the application.

Business function decomposition is used when the application is fairly routine and the team has extensive experience with similar applications.

b) Does another component support procedure diagramming?

A business function decomposition diagram can be produced using a procedure diagramer.

c) Are common process symbols to be reused?

The tool should provide a facility to create custom symbols for the process flow and these should be reusable.

d) Does the tool support the expected size of the process model?

The process model may include hundreds or even thousands of processes. The tool should be able to support the expected size of the process model.

e) Does the data flow diagramer support leveling of diagrams?

Some tools allow leveling of the diagram in which a process box on a high level diagram is decomposed into multiple processes on a lower-level diagram. To ensure that the diagrams are easy to understand and that they easily convey information, it is useful to keep the diagram size to one window or one printed page. The facility to level a large diagram can help to achieve this.

f) How does the data flow diagramer support data stores that are used by more than one process?

It is often the case that processes that share a data store cannot be placed near each other on the diagram. To avoid complicating the diagram, some tools allow data stores to be depicted more than once on the diagram. The tools may provide facilities to differentiate these stores from stores that have not been duplicated in this manner.

g) Can control flows be represented by the data flow diagramer?

It may be necessary to depict control flows. The tool may represent these as data flows without any data elements, such as, for example, a signal from a timer function.

h) Does the tool support validation of the diagram?

To ensure that a data flow diagram is complete, each process should have at least one input and one output. Unless data stores are shared with other systems, each attribute of each data store must have at least one input flow associated with it. The tool should facilitate the identification of exceptions to these general rules.

i) Is a detailed process model with complex processes to be documented?

At the lowest level of a data flow diagram or a business function decomposition, there may be processes that are still too complex to be explained by a label or even a short paragraph. For example, this may be the case if complex interest rate calculations are to be performed by the process. An elementary process description may be required for each such process. The process modeling component should include tools that enable the description to be documented. The description may be formatted as plain English, structured English (resembling pseudo-code), decision tables, or as action diagrams.

Event Modeling

Event modeling tools provide graphical depiction of the events and associated responses for the system. A variety of tools and techniques can be used for event modeling, for example, word processors to develop simple textual lists of events and data flow diagramming to show events and responses.

For component-based development, event modeling or interaction sequence modeling may be performed through interaction diagrams, both at the object and component level. The event model is often used as input for test scripting.

Implementation Considerations a) Is there a need to capture the essence of how the business functions without becoming tangled in the current sequence of processes?

Event modeling does not fix the sequence of processes. A process starts when a specified event occurs, and may generate other events when it has finished. Event modeling notation allows focus on what steps the process must do as opposed to "how" it sequences the steps. This form of representation is especially useful for processes that will be re-engineered, since it allows steps to be re-arranged easily.

b) Is there some uncertainty about the functional requirements or scope of the system?

An event model represents external actions which the system must recognize and responses which the system must produce. Events express the system's perception of external activities. Therefore, event modeling allows the external environment to influence the requirements definition, rather than basing the environment on the applications structure. This approach supports the applications consistency with the workflow and other business activities and thus clearly defines the scope of the system.

c) Are the business requirements of the system to be communicated to a large team or to the users?

An event model represents the user requirements in concise business terms. When used in conjunction with the process model, this provides an effective means of communicating the system requirements from the business design team to the systems design team or to the users.

d) Does the architecture have several disjoint systems that need to respond to the same business event?

By using event modeling and a central event router architecture, interfaces to several systems can be easily and flexibly provided. Each system registers itself with the event router and indicates which business events it is interested in. Whenever an event is triggered, the router is notified. It then triggers all the applications that registered themselves as being interested in that event.

Applications can generate events as required to ensure that appropriate next steps in the process are performed after they have completed their part.

e) Is a real-time system to be developed?

Real-time systems require very strict responses to events within specified time frames. Event modeling is critical to ensure that real-time systems meet this requirement.

f) Is the extent of change to the business particularly large such that a detailed requirements model is needed?

The requirements model (event, process, and data models) provides a clear means of depicting the system. The requirements model summarizes the relationship between events, data, and processes. It consists of the event model, the process model, and the data model. The event model is important because it details the business transactions and events enough to understand the process and data models. Event modeling tools must be provided to complete the requirements model.

Product Considerations a) Do other tools provide the required functionality?

Event modeling and process modeling go hand in hand and are typically provided by the same tool.

b) Are events triggered by time easy to represent?

The modeling tools chosen should provide a means of clearly depicting events that are triggered by time e.g. the year end event.

c) Does an existing component provide all the necessary facilities?

A flow charter is generally required to graphically depict the events. There is also a text description of the events which can be documented using a tool such as MS Word or MS PowerPoint. Entity life cycle diagrams, Event-Stimulus-Response diagrams or matrices, or Context diagrams may be required to complete the model.

d) Is the system complex?

As the number of events increases, the complexity of the event model increases and the diagramers may need to support certain facilities such as intelligent connectors. Simple graphics packages may not suffice at this level.

Performance Modeling

The performance of a system must be analyzed as early as possible in the development process. Performance modeling tools support the analysis of performance over the network. A simple spreadsheet may be suitable in some well-known and understood environments, but dedicated performance modeling tools should be considered on any project with high transaction volumes or complex distributed architectures involving several platforms.

In the case of Internet-based applications, as the Internet is not a controlled environment, performance modeling is limited to those components within the domain of the controlled environment (i.e. up to the Internet Service Provider). However, In the case of intranet-based systems, where the environment is controlled from end-to-end, performance modeling may be performed across the entire system. Performance modeling for components involves the analysis of the projected level of interaction between components and the level of network traffic generated by this interaction. It is important for performance reasons that communication between components is minimized, especially if these components are distributed.

Implementation Considerations a) Is the system complex or heterogeneous?

A performance model ensures that performance requirements are met in a complex or heterogeneous environment. Performance is usually a critical quality requirement in such environments.

b) Does the system involve extensive communication over a Wide Area Network?

The complexity involved in designing systems over a WAN makes performance modeling tools critical to success for such systems.

c) Are there hundreds of users?Are there tens of servers?

Due to the complexity of such systems, performance modeling tools are important in ensuring performance requirements are met.

d) Do experience and benchmarks indicate that there may be difficulties in meeting the performance requirements as stated for the system?

In this case performance modeling tools are critical, since penalties may be incurred if the system does not meet the performance requirements. A performance model provides a means of deciding early on whether the system is feasible or not.

e) Is what if analysis required for future growth?

f) Is what if analysis required for alternative hardware configurations?

g) Is what if analysis required for hardware loading?

Performance modeling tools provide a means of analyzing how much future growth or what alternative hardware configurations can be sustained before the system breaks down. This component may be needed even though it is obvious that the system will meet the current performance requirements.

h) Are high transaction volumes or complex architectures expected for the system?

Dedicated performance modeling tools should be considered for any project that involves high transaction volumes or a complex architecture with several platforms.

Performance is critical for such systems and a performance model is required in order to predict and optimize that performance.

Product Considerations a) Does a generic tool such as a spreadsheet package suffice as a performance modeling tool?

A specialized performance modeling tool should be used when the system is complex and involves high volumes of data, or is heterogeneous.

As design progresses from high level conceptual design to detailed design, to technical design, there is a corresponding sequence of activities involved in performance modeling. As the design becomes more detailed, so does the performance model. The model may start as a simple spreadsheet and evolve into a collection of spreadsheets with many sheets in each book. As the structure and parameters become overwhelmingly complex, a dedicated modeling tool with its own data model, user interface etc. is a good investment.

A performance modeling tool should not be purchased due to a lack of understanding or inexperience of performance modeling, since the tool will not clarify the issues any more than a spreadsheet model.

b) Does the tool allow empirical data to be fed back into the performance model?

Performance modeling must be backed up with empirical data at the earliest possible stage. Initially, this will be through performance benchmarking usually using a small equivalent of the production system. The results should be fed back into the performance models to improve their accuracy. There should be a means of differentiating empirical data from estimates in the model.

Object Modeling

An object model usually contains the following deliverables:

Class Diagram (1 per functional area or 1 per component)

Class Definition (1 per class)

Class Interaction or Sequence Diagram (1 or more per scenario/workflow)

Class State Transition Diagram (1 per Class with complex state)

Guidelines for creating object models can be found in the ODM MKB database.

Tools such as MS Word, MS PowerPoint, ABC Flowchart (Micrografix), may be used to produce these deliverables. Specific modeling tools do exist, however, and provide advantages such as cross referencing (for example, are all the methods used in the Interaction diagrams described in the class definitions?), automatic propagation of changes to other diagrams, generation of reports, and generation of skeleton code. However, some tools have problems with:

Usability and stability

Single users or small numbers of concurrent users

Proprietary repositories (usually file-based, rather than DB-based)

Support of extensions/customizations

As well as providing the usual editing and graphical functionalities, a good modeling tool should:

Interface with a repository (to support versioning)

Support multiple users

Generate code from the design

The use of UML notation to represent the object model is becoming more and more common. In this case other diagrams such as Use Cases (from Ivar Jacobson) and Collaborations Diagrams complement the model.

Component Modeling

Component modeling can mean either designing components from scratch, or customizing and integrating packaged software. No specific component modeling tools exist, and current object modeling tools only offer limited support for components (e.g. for packaging related classes together). Class packages can be used to separate the object models for different components, with a separate class package(s) for the component model. This approach, however, is not enforced by current modeling tools, and requires project naming and structuring standards.

When component modeling is being performed using existing packaged software, some form of reverse engineering or importing is required from the modeling tool to capture the existing design.

During component design the partitioned component model is designed, which defines physical interfaces and locations for components. It is important for performance reasons that communication between components is minimized, especially if they are distributed.

Reuse Support

It is during analysis and design that really large savings can be obtained by reusing existing solutions. At this stage, reuse is often at the subsystem level but can extend down to the service and module level. Asset navigation tools, which permit the retrieval of reusable components, can therefore be of great value.

For a component-based or object-based solution, reuse is usually with a specific aim. It occurs at different levels and requires different types of support.

At the analysis and design stage, common classes and components are used across applications. Repository management is required that allows easy browsing and sharing of pieces of design.

During the construction phase, there may be strong interdependencies between the core classes and the components. This must be taken into account when planning the work. When classes and components are being fixed or modified, impact analysis tools are needed to see where the modified entity is being used. This is more complex than traditional systems as a veritable spider's web of dependencies between classes, components, and applications may ensue. In addition, OO features such as inheritance and polymorphism make tracking down dependencies with simple text search tools much more difficult.

In terms of tools, a class or library browser is required, which allows easy navigation and identification of candidate components and classes.

In many cases, there can be a mismatch between design and build, especially if no detailed design phase exists. This may result in the existence of two repositories. The object or component model produced in the design phase is at a higher level and gives a good introduction or overview. The actual code, however, is where developers tend to go to find out how an application really works. When this is the case, the source code can be used as the detailed design. There are tools that extract documentation (from comments in a given format) and generate HTML pages. Examples of such tools include:

Java—javadoc, part of the jdk

C++—available from http://www-users.cs.umn.edu/~kotula/cocoon/cocoon.htm

The ideal situation is a single repository for analysis, design, and code, allowing developers to move from design to code and vice versa. However, most tools have proprietary repositories and their import/export facilities are not sophisticated enough to merge the two. For the moment, source code and design documentation remain two separate repositories.

Prototyping

It is frequently difficult to obtain specific, reliable, and complete requirements that truly express what users need. This may stem from users being unavailable or inexperienced with computer systems, or it may arise from the nature of the system under design. For example, if the system incorporates very new technology, it may be difficult for users to visualize the possibilities.

Prototyping can address this problem by simulating key user interface components, thus enabling the development team to measure the usability of the proposed system at a very early stage. The most important quality of a prototyping tool is its development speed. If prototyping can be performed in hours or days rather than weeks or months, it becomes possible to perform more iterations, which explore different options. This may lead to a much better system, given that the user's perception matures with each iteration. This, in turn, improves the quality of user input.

Very rapid, lo-fidelity prototypes (for example, paper-based) play an important role in early prototyping. Hi-fidelity prototypes, used later on in the design process, should be as close to the target system as possible, and highly detailed—even down to the characteristics of a button click (e.g. click-down image, click sound, length of click etc.). This way, everyone (including the design teams) can determine exactly what the final system should look like.

User involvement at the prototype stage is of the utmost importance—regular user reviews as the prototype evolves will ensure buy-in from the users, and avoid unpleasant surprises at later stages of development.

Caution must be taken not to raise the expectations of the users in terms of the length of time it will take for the final product to be delivered. Prototyping will deliver something that looks like it "works" very quickly. It should be clear that what is delivered is a model and not an application. Clients may expect real application functionality to be developed and delivered quickly due the fast turnaround of the prototyping process, which will invariably not be the case.

Prototypes may also be used to prove architecture concepts (for example, to verify the flow of messages from the client to the host), to ensure that the system is not based on an architecture that is fundamentally flawed.

It is important to determine whether to carry forward and extend the prototype, or throw it away after requirements have been determined and perform technical design from scratch. Some prototyping tools offer the possibility of reusing code from the prototype. Although this is a valuable option, it is often available at the cost of slower prototype development. An interesting compromise may be to keep portions of the prototype (for example, user interface components) and rebuild other components from scratch.

In component based development, prototyping may be a valuable way of checking that component boundaries are well defined. However, this implies that the architecture must be defined at the time of prototyping.

Specific multi-platform prototyping facilities may be required when developing and deploying applications across multiple platforms.

Prototyping functionality is usually included in Integrated Development Environments (IDE).

WARNING: If the prototyping tool used is not part of the execution environment, the use of features that are difficult to implement in the target environment should be avoided. Prototypes will set user expectations, which may be difficult to meet once construction starts. Specifically, it is important to ensure that the performance of the prototype does not exceed the projected performance of the target system. If user expectations are built upon a highly-performant prototype, there is the potential of considerable disappointment when the final system is rolled out.

Implementation Considerations a) Will the target system run on multiple platforms?

If so, it may be important to ensure that the prototype also runs on multiple platforms (particularly if the prototype is a technical prototype as well as a functional one).

b) Is application performance an important consideration?

Prototyping tools can be used to identify potential performance problems in an application. A development team can use a prototyping tool to implement a portion of an application to identify performance problems. The team can then use this information to improve designs and provide guidelines and standards for designs. Thus, prototyping leads to a better designed and more consistent end product.

c) Do the users have experience with GUIs?

Prototyping tools allow engagement teams to demonstrate the look and feel of an application to the end user. The tool should be capable of providing a realistic understanding of the final application without requiring an extensive construction effort.

Prototypes can be used to interactively gather business requirements and design the application with the end user. If the tool supports interactive prototyping, changes can be quickly incorporated into the prototype and demonstrated back to the user. This is important when users are inexperienced with GUI. Prototyping the look and feel of the application and interactively gathering business requirements assist in gaining user acceptance of the system.

d) Are the system requirements ill defined, vague and poorly understood?

A prototype provides a means of communicating what the system is intended to do and can clarify system requirements. The prototype may become a throw-away if it becomes clear that the development style of the prototype is not conducive to a quality product. It is often more cost effective to start afresh incorporating the added understanding which was developed during the prototyping stage.

e) Are the user requirements vague?

It is frequently difficult to obtain specific, reliable, and complete requirements that truly express what users need. Prototyping can solve this problem by simulating key user interfacing components. User interface issues which are detected later are generally costly to change.

f) Is this a high usage and dedicated system, where throughput matters?

If the system is to be used by dedicated people where the measure of productivity is solely the number of transactions they can get through per second, then user interface prototyping tools are important. Prototyping tools provide a means of getting to the easiest and most efficient interface. Prototyping tools facilitate selection between alternative styles of interaction and provide a means of addressing performance issues.

g) Do the users have a choice of whether or not to use the system?

User interface prototyping tools are important since they allow developers to obtain user input early on in the GUI design process. This induces user ownership and acceptance of the system.

h) Is user input a criterion for getting the system adopted, such as might be the case when a union or organized labor is involved?

By using prototyping tools to get user input, ownership and acceptance of the system is facilitated. Adoption of the system by users and ensuring that their expectations are reasonable can make the system less expensive to deploy.

i) Does the technical architectural design use new or unfamiliar components or does it use a proven system?

Prototyping the technical architecture provides an ideal way to quickly determine if the design is feasible before a major commitment is made to a design that cannot work.

j) Are selected parts of the system to be piloted on the project?

Portions of the application could be selected for design and coding in advance of the full-scale design/code effort. This will help iron out architecture issues, user design preferences, standards, designer/development training requirements, and produce quick wins for the project which can build morale for the team and client. A prototype can serve as a means of identifying the portions to be piloted.

k) Are new team members likely to join throughout the project?

A prototype can serve to quickly familiarize new team members with the user requirements, reducing the ramp-up time for new team members. Project team members should be familiar with the goals and use of a system in order to effectively develop an application.

l) Is the project management team unfamiliar with the development team they will be working with?

Prototyping allows the project management team to judge the capabilities of a development team with whom they are unfamiliar. The prototyping effort allows some preliminary assessment of skill sets.

m) Is there some uncertainty about the product to be used in construction?

Prototyping can allow the project team to validate the capabilities and characteristics of products which will later be used for development. Many products (PowerBuilder, Visual Basic, etc.) are marketed as being the best, but may fall short of project requirements. Use of such tools during prototyping allows some "qualification" of a product's true capabilities. Performance, compatibility with existing client infrastructure, etc., can be tested.

Use of a product during prototyping (that is early purchasing) also allows a development team to determine the quality of the technical support within the company providing the product. It also allows time to work through some of the business models of those companies (their willingness to negotiate on issues, pricing, etc.).

n) Is system performance an important factor?

Prototyping and benchmarking the performance of a technical environment enables possible performance problems to be identified as early on as possible.

o) Do the users have little or no experience with the interface technology?

Prototyping serves as a means of introducing the users to the interface. Problems the users may have in working with the interface can be identified early on, and can be accounted for in training materials that are developed.

p) Is there a high degree of innovation in the workflow?

Prototyping allows the developers to experiment and, with input from users, come up with the best solution to a new and unproven workflow.

q) Do the project team and client fully understand the review and sign-off process?

Prototyping allows the project team and the client to work through the issues and mechanics of the review and sign-off process prior to the intensive development phase.

Product Considerations a) What is the purpose of the prototype deliverable?

b) Is the deliverable used to document the design of the application or provide an accurate depiction of the look and feel of the application?

An engagement team should select a prototyping tool to support the level of detail for the prototype deliverable. Initial application prototypes may use low-fidelity prototyping techniques (prototypes built using MS PowerPoint or pencil and paper, etc.) in order to document initial window designs and determine dialog flow (navigation). Some advantages of low-fidelity prototyping include little or no learning curve, lack of standardization which increases designer creativity, and ease of modification. However, this type of prototyping can not provide the user with the look and feel of the final application. High fidelity prototypes require more sophisticated tools which can provide a more realistic depiction of the application.

c) Is the prototype demonstrating the application behavior to the users?

d) Is the depiction of application behavior used in development decisions?

A prototyping tool should deliver an accurate depiction of the application including window flow and business functions. The prototyping tool should allow the display of data in a window with the look and feel of the navigation.

e) Is reusability of prototype deliverables a requirement?

f) What is the objective of the prototype?

Depending on the objectives and timing of the prototype, all or part of the prototype deliverable can be reusable during later stages of the application development process. Some projects create prototypes in the very early stages of design to demonstrate the capability of the tool and obtain user acceptance, rather than gathering business requirements and documenting design based on the requirements.

If the objective of the prototype is to document designs based upon business requirements, then prototyping tools should be chosen with reuse in mind.

g) Is the prototype used to gather business requirements?

h) Is the prototype developed during Joint Application Design (JAD) sessions with users?

The prototyping tool should be easy to use so the application designer can quickly incorporate changes to the prototype. User input should be incorporated as quickly as possible into the prototype and demonstrated back to the user. This helps to acquire user sign off on the application design and to gain acceptance of the application.

i) Does the prototyping tool support reuse?

Prototypes often represent a large investment, and in situations where a prototype is successful it should be possible to reuse the prototype in the remaining construction process.

Although prototyping tools may have the facility to provide reusable code for the system development, it is often available at the cost of having a slower prototyping tool. The reuse of code may not be a good idea since some of the design methods used for prototype development may not be suitable or desirable for application development.

Another option which is supported by some tools is that certain prototyping components can be reused e.g. window definitions. The tool selected for prototyping should allow easy transfer of the required components into the development environment.

j) Can the prototyping tool be used to design and build the front end?

The prototyping tool could also be the tool that will be used to design and build the front end. Using the same tool eliminates double entry of repository information and reduces the chance of errors when prototype information is transferred to the application design phase of the project.

k) Does the prototyping tool support functionality not provided by the construction tool of choice?

If the prototyping tool provides functionality not available in the construction tool then standards need to be put in place to ensure that the development team only produce the prototypes using features that can be implemented in the development environment. The amount of additional effort required to develop features that are easy to implement with the prototyping tool but which require work-arounds in the construction tool should be a consideration. Prototyping features which cannot be delivered will result in failure to meet user expectations.

Application Logic Design

Application Logic Design tools are used to graphically depict an application. These tools include application structure, module descriptions, and distribution of functions across client/server nodes.

A variety of tools and techniques can be used for Application Logic Design. Examples are structure charts, procedure diagrams (module action diagrams), and graphics packages to illustrate distribution of functions across client and server.

Application Logic Design functionality is also provided by a number of Integrated Development Environments (IDEs).

With component-based development, Application Logic Design is performed through object and component modeling. The functionality is captured in use cases, scenarios, workflows and/or operations diagrams along with interaction diagrams/sequence diagrams. These are usually produced using MS Word, MS PowerPoint, ABC Flowcharter (Micrografix), or an object modeling tool.

Implementation Considerations a) Is there a need for logic representation?

Use Application Logic Design tools to graphically depict the logic of an application. This is a common requirement on most engagements.

b) Is there some uncertainty about the validity of the business case?

The Application Logic Design tools provide a means of confirming the complexity estimates and hence facilitate a revision of estimates before going into construction. By confirming the validity of the complexity estimates, the business case is also confirmed. It is at this stage that the decision is made whether or not to continue with construction.

c) Is performance modeling required?

Application Logic Design tools can provide a basis for performance modeling, based on the processing ability of the CPU, parallelism, and pipelining. The tools can be used to graphically depict system complexity, from which a performance model can be derived.

d) Is the programming team inexperienced?

Application Logic Design tools provide a vehicle for communication from designer to programmer. This is particularly important when programmers are relatively inexperienced and need detailed guidance, which comes from the detailed design that is documented using these tools.

e) Is system maintenance part of the project definition?

Application Logic Design tools, and the designs that they contain, provide documentation of the system which will support maintenance in the long run.

If the maintenance team is very experienced, or if the system is a throw-away prototype, which will not be reused or maintained in the future, then Application Logic Design tools may not be required.

Product Considerations a) Should the engagement team build a custom Application Logic Design tool or purchase an existing one?

Engagement teams must determine whether standard design templates provided by vendors meet project needs, or if the architecture must provide custom solutions. CASE tools tend to provide standard Application Design documentation. Most custom solutions utilize word processing tools to build Application Logic Design shells for use by development teams.

b) Are several tools to be used to provide Application Logic Design facilities?

A single tool may not provide all the facilities required. The different tools must interface with one another in order to promote consistency of the Application Logic Designs.

c) Does an existing tool provide the required functionality?

The development team may require facilities to produce procedure diagrams, flowcharts, or pseudocode. These facilities may already be provided by existing tools, for example, pseudocode can generally be produced by an application development tool.

d) Does the Application Logic Design tool reflect the close relationship between application logic and the user interface?

In a good GUI program design, the application logic is often closely linked to the user interface. A single design document capable of capturing this relationship could serve as a key input into the programming process. Traditional tools only provide separate presentation design and application processing module design documents.

Database Design

Database design tools provide a graphical depiction of the database design for the system. They enable the developer to illustrate the tables, file structures, etc., that will be physically implemented from the logical data requirements. The tools also represent data elements, indexing, and foreign keys.

Many data design tools integrate data modeling, database design, and database construction. An integrated tool will typically generate the first-cut database design from the data model, and will generate the database definition from the database design.

With an object-based or component-based solution the data modeling task changes. In most cases, relational databases are still used, even where there are no dependencies on legacy systems. As there is an 'impedance mis-match' between an object model and a data model, a mapping activity must be undertaken. There are standard mechanisms for doing this. There are also tools on the market which allow the mapping of classes to relational tables, and which generate any necessary code to perform the database operations (e.g. Persistence, DBTools, . . . ).

There is a tendency (especially when dealing with legacy systems) to treat data models and object models the same. It is important to recognize that at best, the data model represents only the static part of the object model and does not contain any of the transient or dynamic aspects. The physical data model may also change significantly (for DB optimization), further confusing the issue.

There can be performance problems with objects mapped to a relational database. In a worst case scenario, an object can be spread across many tables, with a single select/insert for each table, and as each object is loaded one by one, the performance becomes very poor. Some tools provide lazy initialization (only loading the parts as they are needed) and caching (minimizing DB hits).

The current trend seems to be for object-relational databases, with vendors such as Oracle adding object features to their core products. Although the support provided at the moment is limited, it is likely that in future versions Java or C++ classes will be able to interface directly.

Implementation Considerations a) Do the design ideas need to be communicated to a large team of developers?

Database design tools are important where design ideas must be communicated to the development team. Where the development team exceeds ten people, this design must be formalized. Database design tools provide a graphic depiction of the database design for a system, whilst at the same time enabling the developer to illustrate tables and other structures that will be implemented physically.

b) Is system performance a major consideration?

Database design tools become especially important if performance is critical, since database design contributes substantially to the overall performance of the system. Database design tools provide quantifiable performance data which is a crucial component of the overall performance model.

Database Design tools also provide a means to model I/O on devices such as hard disks, optical drives, and tapes etc. This information can be used in a performance model.

c) Does the project have multiple teams working on multiple functional domains?

The database design component is important in the case where multiple teams are working on different functional domains, since they often model different parts of the database separately and then incorporate these models at the end into one large database model. Database design tools can be used to enforce consistency of the different database designs.

d) Does the database include a very large number of tables and elements?

Navigation through a large number of tables is complicated and can be simplified significantly if dedicated database design tools are used.

e) Are there likely to be conflicting system requirements?

Different teams or users may have different requirements which conflict. These requirements may have to be rationally traded-off against each other. Where these requirements are performance related, the trade-off can only be rationalized on the basis of a good database model.

Product Considerations a) Does the product provide the following features?

Support for definition of DBMS advanced features (e.g. triggers, stored procedures, replication, application logic, application generation, referential integrity)

Support for versioning and change control

Cross platform and DBMS integration b) Should the database design tools support database construction?

Many database design tools allow for database construction. Such tools may help translate a logical database design into a physical design, or they may generate Data Definition Language (DDL) code or Data Manipulation Language (DML) code. The advantage of using a tool that provides this facility is that it simplifies the transfer of design information into a physical representation and can be used to ensure consistency from design into construction of the database.

Presentation Design

Presentation design tools provide a graphical depiction of the presentation layer of the application, such as windows, dialogs, pages, navigation and reports. Tools in this category include window editors, report editors, and dialog flow (navigation) editors. Window editors enable the developer to design the windows for the application using standard GUI components. Report editors enable the developer to design the report layout interactively, placing literals and application data on the layout without specifying implementation details such as page breaks. The majority of these tools generate the associated application code required to display these components in the target system.

Dialog flow (navigation) editors enable the developer to graphically depict the flow of the windows or screens.

The Control-Action-Response (CAR) diagram is a commonly used technique for specifying the design of GUI windows. It is typically developed using a matrix or spreadsheet tool such as Microsoft Excel.

The majority of Netcentric systems use Web browsers to provide a common cross-platform user interface. Presentation design for this type of environment therefore entails the generation of HTML pages, often with additional components (JavaScript, 3rd party ActiveX controls, Plug-ins) providing enhanced functionality or media content. Many tools are currently available for designing and creating web content, although HTML remains the common denominator, at the very least as a placeholder for the content.

In the case of systems published on the Internet, defining the target audience is less straightforward than in traditional systems, but equally important. Having a good understanding of the intended audience will be a big advantage when thinking about user interaction with the system, and therefore, the presentation layer of the system.

Implementation Considerations a) Does the project want to use a single tool for prototyping and GUI design?

Presentation design tools provide the ability to use a single tool for both prototyping and GUI design. This decreases the learning curve during design and permits components of the prototype to be reused.

b) Are user requirements clearly defined?

c) Are numerous iterations of design anticipated?

These tools make application development easier and faster through point-and-click capabilities and built-in functions. Reduction in the overall presentation layer design/development effort allows for more design iterations, and thus more chances for user feedback.

d) Has a specific construction tool been selected for the project?

If the tool to be used for construction is not known at design time then specific tools for presentation design are needed.

e) Is the design complex?

f) Does the design have to be presented to multiple users?

g) Do the users have conflicting interests?

h) Does the design have to be signed off?

i) Does the design have to be maintained over time?

In these cases a dedicated presentation design tool can be used to provide maintainable documentation of the presentation design which can be used to clarify and communicate issues.

Product Considerations a) How much does the tool cost?

Product components, maintenance agreements, upgrades, run-time licenses, and add-on packages should be considered.

b) Will the design tool be used for programming of client applications? What programming language is supported?

If the design tool is used for programming, there are several features of a tool that must be considered. These features can have an impact on the productivity of programmers, performance of the applications, skill sets required, and other tools required for development. These features include:

What programming language is supported? Is the programming language interpretive or compiled? Is it object oriented or a structured procedural language?

Does the tool support programming extensions to Dynamic Link Libraries?

What are the debugging capabilities of the tool?

c) Will the tool be used with a large development team?

If the development team is more than 5 people, a tool should provide support for multiple developers. This support includes features such as object check-in/check-out, a central design repository for the storage of application objects and user interface definitions, and version control. Additionally, the development team should be able to cleanly divide the application(s) into pieces that can be worked on by multiple developers.

d) If the tool is also going to be used for application development, how well does the tool perform during production?

Computational, network, data retrieval, and display speeds differ for products. Factors to consider are whether the application will consist of heavy data entry, transaction processing, or a large user base.

Does the product integrate with other tools and/or support other tools in the development and execution environments?

It is important to determine how well the product integrates with other design and development tools, presentation services (graphics, multi-media, etc.), data access services (databases and database API libraries), distribution services (distributed TP monitor), transmission services (SNA, HLLAPI, etc.), data dictionary, desktop applications, and programming languages for call-out/call-in. Additional consideration should be given to add-on and third-party products/enhancements such as specialized widgets, report writers and case tools.

e) Is the tool scalable?

The tool should be scalable to support growth in application size, users, and developers.

f) What functions are required in the control set?

At the minimum, a tool should support basic widgets (push buttons, list boxes, etc.), window styles, (multi-window, multi-document, paned-window), and menu styles, along with validation and inter-application communication. Consideration should also be given as to the extensibility of the toolset via add-ons and third party products.

g) What databases are supported?

h) What protocols are used to communicate with the database?

Important considerations include the supported databases and protocols used to communicate with the databases. The tool must support the selected database.

Additionally, if database selection may change, it is important that the tool have the ability to support other databases with minimal impact on the application development. Native database interfaces tend to have better performance than open standards such as ODBC.

i) What level of technical support, documentation, and training is required to ensure the productivity of developers?

The extent of support (on-site, phone, bulletin board, world-wide, etc.), quality of documentation, and availability and location of education/training should be considered.

j) What type of learning curve is associated with the tool?

Developers using the product should be able to become productive quickly. Factors which reduce the learning curve include an easy to learn and intuitive interface, thorough and clear documentation, and on-line help.

k) Can the tool be used for both prototyping and GUI design?

The ability to use a single tool for both prototyping and GUI design will reduce the development learning curve. Tool integration with all other development tools should also be considered.

l) What platform(s) are supported?

The platform(s) that must be supported, i.e., MS-DOS, Windows, IBM OS/2, UNIX, or UNIX Motif, are an important consideration, as are any hardware restrictions.

m) Is there a need for consistency across multiple screens or windows?

Some presentation design tools provide the facility for reuse of elements. This can be used to enforce consistency across multiple screens and can accelerate development. This feature is not available in low-end presentation design tools, such as MS PowerPoint.

One means of ensuring reuse is for the tool to support a central library of predefined widgets or screen elements. This library should be extendible and customizable, allowing developers to create new widget/element definitions or to enhance existing ones.

n) Is multi-language support a consideration?

Special characters, differences in field lengths, and differences in number formats are some of the things that contribute to the complexity of a multi-language application. Window and report design are among the areas affected by differences in the language used for presentation.

Strategies on how windows are displayed are affected if multi-language support is a requirement. Are separate windows painted for each language or are window literals dynamically replaced? The former will produce windows that are more visually appealing but requires more significant effort to create and maintain.

The presentation design tools should facilitate documentation of these differences for design purposes and allow the design strategies to be implemented.

o) Is the tool integrated with the repository of choice?

The presentation design tools should be tightly integrated with the system components stored in the repository, such as windows, reports, screens, and other more abstract models to ensure consistency.

p) Is a multi-media application to be developed?

Touch screen hotspots, video clips, hypertext, pointer device hotspots and other similar design objects must be supported by the presentation design tool if the design is for a multimedia application.

Communication Design

An increasingly important aspect of system design is communication design. After the fundamental communication paradigms have been chosen, each exchange must be designed to allow for the detailed design of each module (clients, services, functions), and to lay the basis for more refined performance modeling. To ensure against interface problems, these tools should be tightly integrated with the design repository. One simple way to document communication interfaces is to define include files, which hold the interface definitions.

Implementation Considerations a) Is performance simulation or modeling required?

Thorough performance simulation or modeling requires a communication model. A performance model is particularly important if the system is large, heterogeneous, and complex.

A valid performance model can only be created once a detailed communication design has been developed for the system. The performance model is derived from the detailed communication design. Communication design tools provide a means of documenting the physical design of the system, such as protocol stacks, message sizes, routers, bridges, gateways, LANs, WANs, MANs, etc. as well as the logical design, both of which are used to develop the performance model and to simulate performance.

b) Is the system migrating from a central to a distributed environment?

c) Is the system migrating from a LAN to a WAN environment?

d) Is the system migrating from a country wide WAN to a global network?

When development takes place in a mainframe environment, performance is relatively predictable. In a distributed environment, response time is dependent on the communication design.

Migrating from a LAN to a WAN, or from a WAN to a global network will drastically impact the performance of the system, and this type of migration requires the development of a complete communication design from which a performance model can be derived. Thus, tools to facilitate the communication design become a critical part of the development architecture when migration of this sort is involved.

e) Is high network performance required?

Communication design tools are essential in developing systems where critical business operations have to have maximum availability and minimum down time. One of the primary contributing factors to high performance in client/server environments is a good network design. A good network design can only be achieved through a good communication design.

Product Considerations a) Is the tool repository based?

The best support for detailed communication design for a large development team is provided by a repository. Here the messages, calls, and queries can be modeled and designed as entities in their own right. These entities provide a necessary basis for performance and module design, which can be shared by all developers.

b) Is there a need for a graphical depiction of the communication design?

A graphical depiction of the communication design may be required. For simple designs, tools such as PowerPoint are normally adequate. Data flow diagrams may be used to show how clients send messages to services. The tools used should help developers to ensure that objects in the diagrams are linked to the actual objects (Windows, Services, etc.) in the repository. This will maintain consistency of the design documentation with the actual objects used in development.

c) Do existing tools provide the necessary functionality required to produce the communication design for the project?

A simple and effective method of defining interfaces is by using include files to hold the interface definitions. The application development tools usually provide this facility.

A spreadsheet package such as Excel may also be used to design message layouts.

For simple graphical depictions of the communication design, a tool such as PowerPoint is adequate.

d) Does the tool encapsulate knowledge of the services provided by the middleware layer?

The middleware layer provides the basic functions for applications in a heterogeneous environment to interface with operating systems, networks and communication protocols.

If the tools used encapsulate knowledge of the middleware services, low level design of communication (e.g. designing at the level of named pipes and sockets) need not be supported or investigated. The middleware component abstracts this level of detail so that the designers need not concern themselves with complex technical issues.

Usability Test

From a development perspective, systems that are designed and tested with usability in mind offer clear advantages. This is providing Usability Testing is executed from the user perspective, and from the very beginning of the development process.

Usability Testing can help developers:

Reduce risk by confirming that they are building the right solution

Identify new system requirements

Decrease development time and money by reducing rework

Achieve a smoother conversion, with less disruption to business

Each system is designed to meet the unique requirements of its users, and therefore benefits from a different mix of testing techniques. In many cases, designers find that the best starting point is to build and test low-fidelity prototypes. These are paper-and-pencil versions of user interfaces that allow developers to demonstrate the behavior of systems very early in development. Before any code has been written, developers build prototypes on paper and test them with real users, simulating the human-computer interaction. Designs are adjusted and retested several times until a usable solution emerges. When it is time to begin coding, developers already have an excellent idea of how the system should work and what the users want.

Once the user interface has been coded, the high-fidelity prototype is ready for online usability testing. The test results are compared with previous tests and routed back to the developers. If lo-fi prototypes were used earlier, the major design issues have already been resolved. Refinements at the "hi-fi" stage should focus on perfecting the details.

In the later stages of development, usability laboratories can be extremely helpful for evaluating system design. Usability labs, which can be stationery or portable, rely on videotape and screen capture methods to record how users interact with prototype systems. Within a few hours of testing, lab administrators can create a highlights videotape of problems that users encountered. These tapes can be used immediately by developers and project managers to modify the hi-fi prototype as required. The average usability test results in 70 to 100 specific recommendations for improvement.

Remote testing, or telecasting, is an online variation of the usability lab. This still-emerging method relies on computer networks to conduct system evaluations. Remote testing enables developers to test a large number of users efficiently and without incurring travel expenses.

Reverse Engineering (130)

Reverse engineering tools are used to capture specific, relevant functional and design information from a legacy system for use in a new, client/server system or to restructure the existing system for improved performance and maintenance.

Interactive Navigation

Developers use interactive navigation tools to identify requirements for a new system from the functionality and design of a legacy system. These tools enable the developer to interactively and graphically navigate the legacy system, determining the system's characteristics such as system structure, module flow, flow control, calling patterns, complexity, and data and variable usage. An alternate form of presentation is through reports. These provide cross-reference listings or graphical representations of control or data flows.

Graphical Representation

Graphical representation tools are used to display important system information in a form, which is easier to assimilate. These tools may, for example, produce structure charts, database schema diagrams, and data layouts. They can also print matrices that indicate relationships between modules and files or between jobs and programs.

Extraction

An extraction tool, in conjunction with a repository population tool, enables the developer to reuse selected portions of a legacy system. The extraction tool can typically read and extract information from source code, screens, reports, and the database. The most common information extracted from a legacy system, however, is the data: record/table structure, indexes, and data element definitions.

In component-based architectures, as systems are often built on top of legacy databases, some extraction tools allow generation of an object model from the legacy database data model (DDL). By understanding the E-R diagram represented by the database, it is easier to create an efficient persistence framework which isolates business components from a direct access to relational databases. Caution is required, however, as the resulting model is at best only partial, as an object model has dynamic aspects to it as well as static relationships, and may not correctly reflect the analysis performed in the problem domain.

Repository Population

The repository population tool is used to load the information from the extraction tool into the development repository. These tools convert the information from the legacy system into the syntax of the development tools repository. The extent of the information loaded into the repository is a function of the Information Model of the development tool repository. Information that is not represented in the development tool repository cannot be loaded into the repository.

Restructuring

Restructuring tools are not analysis tools like the previous categories of reverse engineering tools, but design and construction tools. They enable the developer to rebuild a legacy system, rather than replace it. Examples of this type of process include restructuring spaghetti code with structured code, replacing GOTO's, streamlining the module calling structure, and identifying and eliminating dead code.

Data Name Rationalization

Data name rationalization tools extract information on variable usage and naming, and show relationships between variables. Based on these relationships and user input, these tools can then apply uniform naming standards throughout the system.

Packaged Component Integration (132)

Packaged components are generally third party components that provide ready-made business logic that is customizable and reusable. These can range from simple components offering limited functionality (for example, worksheet or charting GUI components), to components that handle a significant portion of the application architecture (for example, data access components and firewalls). The advantage of using such components is that they have already been coded, tested, optimized, and documented.

The fact that these components come from third-party software houses does not always guarantee their quality. In order to minimize the dependency of the final system on these components (thus reducing the impact of possible changes within the libraries), it is recommended that wrappers are written to enclose any third-party components. This way, if any changes are made to the internals of the components, only the wrappers would be affected, allowing the application and architecture code to remain unchanged.

Frameworks may be found on the market which provide generic components for general business processes such as general ledger, sales order processing, inventory management or product distribution. For example, IBM San Francisco offers business components for the Java environment (see htt://www.ibm.com/Java/Sanfrancisco)

Product Considerations a) Does the component require significant customization?

When selecting components, it is important to get as close a match as possible to the functionality that is required.

b) Will the vendor guarantee required functional enhancements?

If functionality is missing from a component that cannot be added using the standard customization tools provided, it is vital to get a vendor guarantee that the enhancements will be made, and to agree on a deadline for these enhancements.

c) Will the vendor guarantee consistency of all interfaces across future releases?

The biggest danger in using packaged components is that the vendor will make changes to the component interfaces.

When selecting packaged components make sure the vendor guarantees backwards compatibility of all the existing interfaces provided by the component. If this is not the case, it will entail much reworking of the application code in order to be able to take advantage of (potentially important) upgrades to the component.

d) What are the performance implications of using a packaged component?

Components are often developed with a preferred platform in mind. Components optimized for one platform may have severe performance problems on others. If performance is a factor (and it nearly always is) ensure that components are designed specifically for the platform of the target system.

e) Does the component provide standard or proprietary interfaces?

When choosing between packaged components, always choose standard interfaces over proprietary ones. It will always be easier to customize and interface a component whose language is known to the development team, rather than one which requires developers to learn a new proprietary language.

Customization

Packaged components usually do not provide the exact functionality that is required of the target system because they are created by third parties. They may have to be configured in order to behave in the desired fashion. The majority of packaged components allow one of two methods of customization—either by using standard construction tools (such as an editor and a C compiler), or by using proprietary toolkits provided by the vendor.

Implementation Considerations a) What level of support is provided by the component vendor?

It is vital that the vendor provides an appropriate level of support for the component such as documentation, telephone support, remote support, training, and onsite support. It might also be necessary to include vendor developers on the Application team. This is especially important where component customization relies on proprietary toolkits.

Construction (134)

Construction tools are used to program or build the application: client and server source code, windows, reports, and database. Along with the onset of Visual Programming, the more traditional form of construction tools have been superceded by Integrated Development Environments (IDEs) which take all the basic components required for construction, and integrate them into a single system. Although IDEs are now the preferred tools for most construction, the components that make up these tools remain the same—Source Code Editor, Compiler/Linker/Interpreter, Generation Tools and Debugging Tools.

Visual Programming tools, initially associated with the rapid development of the client-side of client/server applications, have now matured and expanded their domain to cover entire client/server development (e.g. Visual C++) and Netcentric development (e.g. visual Java IDEs).

IMPORTANT: While IDEs provide the basic components for construction, not all the functionality offered by the components listed here is provided (for example IDEs do not generally provide Help text generation or DDL generation). IDEs can usually be customized in a way that other tools (Version Control, Generation, Repository Access etc.) can be integrated. It is necessary to plan time for this upfront. It should not be left to the developers to do this individually.

In addition to the standard construction components, a new set of utilities exist which can help increase the quality of code generated by developers. QA Utilities verify the quality of constructed code, and its conformance to standards set down for the development environment.

It is important to ensure that developers use tools that are standard to the development environment. Now that Internet access is a standard facility for developers, there may be the tendency for people to download their own preferred tools, or upgrades to standard tools. This not only affects the management of the development environment, but could easily result in the generation of code that is incompatible with the rest of the code in the development system (for example, consider the effect of developers on the same team using tools which employ different version of the JDK).

Product Considerations a) What size is the development team?

When IDEs were first developed, they were targeted at individual developers. This means that support for team development is still not fully mature in the majority of IDEs, although some are closely integrated with third-party configuration management packages. When selecting an IDE it is important to ensure that team development is sufficiently catered for.

b) On what platform is the system expected to run?

c) Is the target system expected to run on multiple platforms?

The construction tools selected must be able to support the target platform(s) of the system to be developed.

Source Code Editor

A source code editor is used to enter and edit source code for the application. Complexity varies from simple ASCII text editors to fully integrated editors such as those provided by Integrated Development Environments. Typically however, they are linked with a debugger so that coding errors which are identified during compilation can be more easily corrected, since the error and the source code generating the error can be viewed simultaneously.

Other features include:

Dynamic syntax checking, improving productivity by detecting errors as they are made, rather than at compile time.

Color coding, which automatically applies different colors to text depending on its type or context (e.g. comments, variables, reserved words etc.), thus making the code more readable.

Automatic layout, which indents code depending on its logical level (e.g. loops, conditionals etc.)

On the whole, these features will help ensure that code developed by the team is following project standards as opposed to individual programming styles.

Implementation Considerations a) Web-based development

Due to the tendency of Web-based applications to combine multiple components (such as HTML, Javascript, Java applets, CGI scripts etc.), numerous source code editors may be required for the development of any single web application.

Product Considerations a) How well integrated is the editor with other tools in the development environment?

The level of integration with the rest of the environment is an important consideration when selecting a source code editor. Most editors now come as part of an IDE, and are therefore fully integrated.

b) Does the editor support multiple languages?

Some IDEs provide support for many languages using the same interface (for example, MS Developer Studio supports C, C++, Java, Fortran). This has the advantage of providing the user with a common approach to coding, regardless of the language being used.

c) What features are provided by the editor?

As mentioned in the component description, many features may be provided by the editor, which can save time and improve code quality. A feature-rich editor is therefore often worth the investment.

d) Is the product easy to learn and use?

The source code editor should be easy to use with little or no training required.

e) Is an acceptable source code editor already provided by the operating system or other tools in the development environment?

Most Development tools and operating systems already include a source code editor. These source code editors are usually just simple text editors.

f) What is the amount of the application code?

Some source code editors may not have the ability to handle extremely large files while other tools are built specifically for that purpose.

Compiler/Linker/Interpreter

This component is responsible for taking raw code (usually in ASCII format) and creating the necessary object, library, byte-code, or executable files that become components of the final system. The actual tools required depend on the development language, but always consist of one or a combination of the following components:

Compiler

Linker (preferably incremental—the linker can substitute a new version of a single module rather than having to re-link the entire program)

Interpreter, which can speed up the test/correct cycle by eliminating the compile and link steps In the majority of Integrated Development Environments, the Compiler, Linker and/or Interpreter are included as an integral part of the system. In addition, the management of compilation and linking is automated using MAKE utilities which understand the dependencies between modules in the system. This allows the system to trigger all necessary re-compilation and re-linking when a module in the system is changed, thus avoiding the time consuming task of re-compiling and re-linking the entire system.

Product Considerations a) Is the tool easy to use?

The tool should be relatively easy to use in order to reduce the learning curve.

b) Does the tool support the platform in the development environment?

The compiler/linker/interpreter tool must be compatible with all the platforms upon which the application is being developed. Besides compatibility, tool performance may be platform dependent.

Source Code Debugger

A source code debugger is a tool used to unit test a program. This tool provides information about the activity of programs and systems, enabling automatic analysis and diagramming, assisted code tracing, editing capabilities, and automatic documentation. The debugger allows the developer to enter program break points and step through a program, tracking the progress of execution and identifying errors interactively. It is typically used in conjunction with the source code editor so that coding errors identified can be more easily corrected, since the error and the source code generating the error can be viewed simultaneously.

Symbolic source code enables easier identification of where errors occur. Preferably, the debugger should be flexible enough to work with any combination of compiled modules and source modules. In addition, the debugger should be able to handle calls to the database and to other modules.

Product Considerations a) What testing team factors should be considered when using a source code debugging tool?

Communication between development team and testing team

A code analysis tool can help the testing team detect unreported changes in the application code, and therefore help alleviate possible bad communications between the development and testing teams. Thus, bad communications between teams will still influence positively the decision to use code analysis tools.

Generation

Generation tools include:

Shell generation

Make file generation

Window/page generation

Data Definition Language (DDL) generation

Data Manipulation Language (DML) generation

Code generation

Include file generation

Help text/module description generation

Trace code generation

Shell generation is the process of generating a starting point for programming. Shell generation is typically repository-based but can also be based on interaction with the programmer, where the generation utility requests key information about the program, and generates a starting point as a result of this. Key information (whether obtained from the repository or through a dialog with the programmer) may include:

Data base tables accessed

Methods and attributes defined (for objects)

Interface information

Based on this information, the generator selects the appropriate include files and creates skeleton code which may be used as a template for the programmer. This template may also include audit history for the module and standard code such as error handling.

Make file generation is integrated into the majority of IDEs Window/page generation (which is an integral component of Visual programming tools) allows the developer to rapidly design windows and pages using a point and click graphical interface. The relevant source code is subsequently generated from these designs.

The generation of DDL and DML is often hidden from the developer by using data access functions or objects, provided by a large proportion of IDEs (e.g. MFC, JDK) Help text and module description generation (not usually provided by IDEs) analyzes develope's raw code (including comments) and creates descriptions which may be used by developers to understand the contents of modules or objects. This is particularly useful for component-based development, where methods and attributes of objects may be automatically documented.

Trace code generation allows the insertion of traces into raw code in order to aid debugging.

Implementation Considerations a) Does the project want to isolate developers from the technical environment as much as possible?

b) Are there a large number of developers which makes it difficult to enforce standards and consistency among developers?

Generators are typically used to enforce and maintain consistency throughout an application. The main benefit is a reduction in training. In addition, the code generated will automatically be checked for errors, shielding the developers from many complexities of the technical environment.

c) Are there a large number of developers or a large amount of code?

d) Can significant time be saved by creating generators to generate code for reuse and regenerated code to propagate changes?

Generators are used to leverage the powers of code reuse and code regeneration. The ability to reuse code reduces both the time and resources required on a project. Code regeneration eases maintenance issues by propagating changes throughout multiple sections of code.

Product Considerations a) Can the generation tool provide code which meets performance requirements?

The code/applications generated by the tools vary in performance. Optimized code usually results in faster run times. It is important to identify the high priority components that will benefit most from the tool.

b) Should the engagement team build a custom generation tool or purchase an existing one?

The decision to custom build or to buy available case tools must be determined by the development team. Most generators are usually custom built because often the technical environment and architecture have custom components that cannot be handled by a package generator. Associated with custom building are the issues of added cost and development time, but performance can be closely monitored and changes performed on the spot.

c) Does the generation tool support the development and execution platforms?

The tool must support the current or proposed platform.

QA Utilities

QA Utilities verify the quality of completed code, and that it conforms to project and international standards. These types of tools include the following:

Code Analysis—Code analysis provides the objective information and metrics needed to monitor and improve code quality and maintenance (e.g. static analyzer, documentor, auditor).

Code Error Checking—Checks code for common errors (e.g. syntax errors, uninitialized and badly assigned variables, unused variables)

Code Beautification—Re-formats code in order to make it easier to read and maintain.

UNIX Portability Checking—Checks compliance with basic portability standards—particularly with programming standards that ensure portability across UNIX platforms (e.g. POSIX compliance and OS/2-to-Windows portability).

100% Pure Java Checking—Checks that Java code conforms to the 100% Pure Java standard.

Code/Object Libraries

Code and Object libraries provide the developer with ready-made components (such as GUI components or simple utilities), which may be integrated into architecture or application code. The advantage of using such components is that they have already been coded, tested, optimized, and documented.

Code and Object libraries may be differentiated from packaged components in two ways:

They contain little or no business logic

Source code is usually provided (as opposed to the 'black box' component approach)

That these libraries come from third-party software houses does not always guarantee their quality. In order minimize the dependency of the final system on these components (thus reducing the impact of possible changes within the libraries), it is recommended that wrappers are written to enclose any third-party code. This way, if any changes are made to the libraries, only the wrappers would be impacted, allowing the application and architecture code to remain unchanged.

Implementation Considerations a) Does the object/library really need to be wrapped?

It may not always be prudent to wrap all third party objects/code that are to be used on a project. Sometimes the cost involved may outweigh the value of wrapping an object/code. As objects/code become more complex, with more functions/interfaces, then the value of wrapping them becomes more tangible.

Media Content Creation

As systems become increasingly user-facing, it is important to design user interfaces that are not only functional, but also engaging and informative. This is especially true of Internet and kiosk-based systems, where users have a notoriously short concentration span.

This requirement for more attractive user interfaces has triggered the evolution of media-rich applications, the development of which requires new tools and processes, and brings with it a whole new set of issues.

Media content can be broken down into three major media types, each with its own set of tools:

2D/3D Images/Animation

Video

Audio

2D/3D Images/Animation

Tools to handle these images range from simple paint packages to highly complex multi-layered animation graphics packages. The images created by these tools may be pixel-based (bitmaps) or vector-based, each with their own advantages.

Pixel-based tools (traditional graphics and image processing tools) offer more image flexibility especially in terms of color gradation and shading, but produce relatively large files. This format is therefore useful where the use of high-quality textured images, or highly colored images is important, but where file storage and transmission is not an issue (where the media content is local to the client application, such as in a kiosk).

Vector-based tools (where the image is defined by formulae rather than pixel position) offer much smaller file sizes, and dynamic image re-sizing, while producing excellent print quality, but cannot easily handle shading and color gradation. This format is more appropriate where file size is an issue (web pages).

Video

The high cost and complexity of video production equipment, along with the skills required to manage the process of video production mean that it is usually outsourced to a third party. It is important however that the personnel charged with creating video content are an integral part of the Application team.

Audio

The tools required for creating audio content depend on the quality required, and whether or not the content is original. For 'sound bites' or pre-recorded audio, simple desktop audio editing applications are adequate. For high-quality original content, a professional recording studio is recommended. Again, if third parties are involved, it is important that they are fully integrated into the team.

For both image and audio, it is possible to purchase re-usable content from agencies, usually delivered in the form of CD-ROMs.

NOTE: Tools required to store and manage media content (and storage formats) are discussed in *Tools—Information Management—Media Content Management*

Test (136)

Testing applications (client/server or Netcentric) remains a complex task because of the large number of integrated components involved (for example, multiplatform clients, multiplatform servers, multitiered applications, communications, distributed processing, and data), which, in turn, results in a large number and variety of Testing tools.

For any large scale testing effort, it is vital to have a repository that is capable of managing the data required by each of the test subcomponents. The repository should manage the following entities:

Test conditions

Test cycles

System Investigation Requests (SIRs), triggered by a deviation of actual results from those expected Test data Requirements Within the repository, the following relationships between entities must also be managed:

Test cycle and the system component to which it refers

Test condition and the test cycle it belongs to

Requirement and the test condition that tests that requirement

These relationships make it possible to analyze efficiently the impacts of change and to document the state of system test. For example, the number of outstanding SIRs per cycle can easily be provided based on these relationships.

In some cases, the mentioned entities and relationships cannot be managed within the repository, and may have to be modeled outside the repository (for example, in a teamware database). In this case, the link between the repository and the external tools must be provided by a judiciously chosen set of procedures and custom integration tools.

Component-based development may have an impact on the way in which testing should be performed.

A number of firm initiatives have conducted considerable research into the field of testing:

Year 2000 Testing Contacts and KX Resources

The Technology Library contains further information including tool evaluations, practice aids, and newsletters Integrated Testing Environment Job Aid Product Considerations a) When should vendor tools be used in the testing process?

Vendor tools are more appropriate when the requirements are totally dependent on the software development platform. Moreover, when the technology evolves too quickly, it requires a software organization to handle the changes.

Test Data Management

Test Data Management tools allow developers to create and maintain input data and expected results associated with a test plan. They include test data and archiving tools that assist in switching between cycles and repeating a cycle based on the original data created for that cycle.

Test Data Management functionality may be provided by the following tools:

Test data generation tools—usually generate test data by permutation of values of fields, either randomly or systematically.

Test design repository tools—facilitate structured design and maintenance of test cases. They help the developer find existing test cases, cycles, and scripts that may be appropriate for reuse.

Data management tools—provide backup and restore facilities for data. They also provide configuration management for multiple versions of data, maintaining consistency among versions of test data.

Implementation Considerations a) What guidelines should be followed when creating component and assembly test data?

To minimize testing errors when creating component and assembly test data, follow the guidelines provided by the AC Methods job aid for quality test data. Follow the doclink to view the *Tester's View of the Methods*.

Product Considerations a) What testing team factors should be considered when using a Test Data Management tool?

Size of the Testing Team

The larger the testing team, the more benefits will be derived from using a Test Data Management tool (easier control over the test data for the various testers), a configuration management tool (easier control over all system configurations and component versions), and a test plan management tool (easier control over all test cycles, subcycles, their execution statuses, and so on).

b) What engagement factors affect the use of Test Data Management tools?

Risk Rating of the Engagement

In general, management and planning tools help better address the engagement risks. A high risk rating for the engagement will affect positively the decision to use tools such as test planning, Test Data Management, problem management, and configuration management.

Criticality of the Engagement

In general, management and planning tools help better manage the engagement and ensure the timely delivery of a quality system. Therefore, dealing with a highly critical engagement will most likely affect positively the decision to use tools such as test planning, Test Data Management, problem management, and configuration management.

Test Data Manipulation

Test Data Manipulation tools are used to create original test data and, sometimes, to modify existing test data. Such modifications may be needed to process a change in the database schema and to correct intermediate results in order to complete a test cycle. Some test data manipulation tools generate test data very effectively.

Test Planning

A Test Plan consists of several components:

Test schedule

Test execution tracking

Test cycles

Test scripts

Test conditions

Test condition generation

Input data

Expected results

Test Planning definition and maintenance tools define and maintain the relationship between components of a Test Plan.

Implementation Considerations a) What guidelines should be followed when assembly testing the technology architecture?

When deciding which areas of the technology architecture to test, follow the guidelines provided by the AC Methods job aid for technology architecture assembly testing. To view the guidelines, follow this doclink to the *AC Methods job aid.* b) What guidelines should be followed when creating test scripts?

When preparing to test system components, scripts can be used to verify that the system design specifications are properly implemented. *An AC Methods job aid* provides guidelines for creating product test scripts.

c) What guidelines should be followed when creating test cases for the component test?

When preparing component test data, the *AC Methods checklist* helps ensure that all cases are thought up so that component testing is complete. To view the test case checklist follow the doclink.

d) What components interface with the Test Planning component?

The following components interface with the Test Planning component:

Tools—System Building—Test—Test execution. This interface relates to the actual Test Planning scripts for an automated script playback capability. The scripting tool can be call directly from the Test Planning tool, which runs it or loads it to the target platform. More generally, all scripts, and actual results should be linked to the cycles.

Tools—System Building—Test—Test Data Management. Before beginning the cycle, the transfer, load, and refresh of test data can be run from the Test Planning tool.

Tools—Information Management—Repository Management. Each conversation, dialog, or executable tested in a cycle can be cross-referenced so that it is possible to know from the design where a functionality is tested.

Tools—Configuration Management. Each conversation, dialog, or executable tested in a cycle can be cross referenced so that it is possible to know from the design where a functionality is tested.

e) What is a repeatable test model?

f) What is the importance of a test database?

g) What is the team member retention with a repeatable test?

h) How does a repeatable test model affect testing automation?

The following is an overview of the repeatable test model as documented by the Reinventing Testing Project (RTP).

A repeatable test model consists of tests that can be easily executed by staff who have little or no experience of the application being tested. A repeatable test script provides the detailed steps necessary to test the functionality. In addition, the script provides the tester with detailed expected results to verify the operation of the test script.

In order to plan detailed script steps and expected results, it is necessary to know the test data. A large portion of the test data will typically be contained in test databases. These databases are called baseline databases, and are critical for a repeatable test model to exist. Baseline databases can be developed automatically (through execution of online activity in the system), manually (through test data manipulation tools), extracted from production databases, and so on. Once the baseline databases are selected and created, the repeatable test model can be developed. As the test model is based upon these databases, the impact on the test model of any changes to the baseline databases must be analyzed.

With a repeatable test model, most of the team members' knowledge is captured in the tests. Retention of team members is therefore far less critical than with a non-repeatable test model, and expected costs of training new team members are reduced.

If the application does not change, repeating the tests yields the same results every time, given the same baseline databases. To remain repeatable, a test model must be maintained to reflect changes made to the application (fixes, isolated enhancements, new releases, and so on).

To ensure the quality of the application as well as testing efficiency and effectiveness over time, the tests contained in the test model must be repeatable. Automation facilitates the engagement's ability to execute a repeatable test model. The decision to automate the test execution only affects whether the tests will be repeated manually or automatically.

Automating the execution of a non-repeatable test model is a waste of resources, as the test tool will not be able to re-execute the tests automatically or perform full regression tests with little effort. Little or no benefits will be achieved from automation.

Product Considerations a) Has RTP (Reinventing Testing Project) developed a test plan management system?

b) What tools can be used for problem tracking?

The RTP Tools Development team has documented their evaluation summaries of the internal test plan management system. The following is a brief description of the product. To view more detailed information, follow this doclink to the *RTP Tools Initiative* document.

The Test Plan Management System is an online GUI application that is used to facilitate the creation and maintenance of test models and to support the planning and performing of each test stage. Each test model is stored in a central repository accessible by all team members.

Any test model data must be manually entered in the system or copied from a previously entered test model.

Multiple test models can be accessed or viewed at one time.

In addition, the TPMS provides the capability to research previously entered test elements through online queries.

A reporting option is planned to produce metrics and management type reports.

c) What testing team factors should be considered when using a Test Planning tool?

Size of the Testing Team

The larger the testing team, the more benefits will be derived from using a Test Data Management tool (easier control over the test data for the various testers), a Configuration Management tool (easier control over all system configurations and component versions), and a Test Plan Management tool (easier control over all test cycles, subcycles, their operating statuses, and so on).

d) What engagement factors affect the use of Test Planning tools?

Risk Rating of the Engagement

In general, management and planning tools help better address the engagement risks. A high risk rating for the engagement will affect positively the decision to use tools such as Test Planning, test data management, problem management, and configuration management.

Criticality of the Engagement

In general, management and planning tools help better manage the engagement and ensure the timely delivery of a quality system. Therefore, dealing with a highly critical engagement will most likely affect positively the decision to use tools such as Test Planning, test data management, problem management, and configuration management.

e) What application factors should be considered when using a Test Planning tool?

Starting Point of Automation in the Development Life Cycle

If the testing process is to include the use of a test plan management tool, test model components may be more easily reused across test stages resulting in time and cost savings during Test Planning and preparation. This obviously has a positive influence on the decision to use the test plan management tool.

Test Execution

Test Execution tools support and automate the conduct of system tests. Test Execution support includes the tools required to:

Extract input data and expected results from the repository

Load this data into the appropriate Test Execution tools

Automate the test

Such tools include dynamic analyzers and execution logs. The Test Execution platform may differ from the development platform if development is conducted in one environment (for example, Windows NT workstations) and deployed on a different environment (UNIX workstations).

A typical Test Execution tool supports test scripting and playback. These tools program or record the running of a test plan in an online environment by capturing key stroke sequences, mouse clicks, and other actions. They then record them in a script. Once the script is programmed or recorded, it can run repeatedly on the same application, effectively emulating the user. While defining the script takes some time, it saves tremendous effort when cycles must be re-run, particularly after relatively small changes (for example, the format of an output field is modified). When the application is modified, the script can be updated directly without re-entering long sequences of user input. This makes it easier to prepare for regression testing. Scripts may also be used for stress testing, where a single machine can run scripts simultaneously, emulating large numbers of users.

Implementation Considerations a) What development approach factors should be considered when automating Test Execution?

Reinventing Testing Project (RTP) has identified the following factors that either contribute to or take away from the successful implementation of an automated Test Execution tool. Further detail is available through *RTP's Test Automation Strategy*—Version 1.1. The type of system development approach to be considered is:

Maturity of the testing process

Number of technical platforms b) What testing tool factors should be considered when automating Test Execution?

RTP has identified the following factors that will either contribute to or take away from the successful implementation of an automated Test Execution tool. Further detail is available through *RTP's Test Automation Strategy*—Version 1.1. Testing tool factors to be considered include:

Cost of testing tools (including training and support)

Cost of test model maintenance (including test data)

Testing tool ability to work with GUI application builder

Vendor support capability

Proximity of vendor support personnel to the project site

Availability of tool support person on the testing team c) What engagement factors should be considered when automating Test Execution?

RTP has identified the following factors that will either contribute to or take away from the successful implementation of an automated Test Execution tool. Further detail is available through *RTP's Test Automation Strategy*—Version 1.1. Engagement factors to be considered include:

Fixed fee engagement

Risk rating of the engagement

Criticality of the engagement

Risk of not automating testing d) What application factors should be considered when automating Test Execution?

RTP has identified the following factors that will either contribute to or take away from the successful implementation of an automated Test Execution tool. Further detail is available through *RTP's Test Automation Strategy*—Version 1.1. Application factors to be considered include:

Application life expectancy

Number of planned releases

Use of application software packages

Frequency of upgrades in application software, system software, and hardware

Stability of the application

Starting point of automation in the development life cycle

Scope of the test automation

Number of passes per test cycle e) What testing team factors should be considered when automating Test Execution?

RTP has identified the following factors that will either contribute to or take away from the successful implementation of an automated Test Execution tool. Further detail is available through *RTP's Test Automation Strategy*—Version 1.1. Testing team factors to be considered include:

Willingness and ability to maintain the test model

Communication between development team and testing team

Control over the test environment

Acceptance of automation (attitude toward change)

Experience with test automation

Experience with the testing process used on the engagement

Experience with specific testing tools

Anticipated learning curve with automated testing tools

Experience with the technology used on the engagement

Size of the testing team

Performance Management

Performance Management tools support application performance testing. Owing to the large number of components in modem systems, performance modeling can be a complex task and requires tools to effectively manage the process. These tools monitor the real-time execution and performance of software. They help to maximize transactions and response time to the end user. They are also useful in identifying potential bottlenecks or processing anomalies.

In the case of Internet-based applications, as the Internet is not a controlled environment, performance management tools can only measure performance within the domain of the controlled environment (up to the Internet Service Provider). However, in the case of intranet-based systems, where the environment is controlled from end-to-end, Performance Management may be performed across the entire system.

Emulation

Emulation tools emulate components that are part of the target environment but are not in the development environment. These emulation tools include:

Target platform architecture components, including both custom infrastructure and system software products such as an X-window emulator on a PC to access a Unix platform.

Stubs, which emulate subroutines in a minimal fashion.

Harnesses and drivers, which call up a module and emulate the context in which the module will be called in the production environment.

Test Result Comparison

Test Result Comparison tools are utilities used to compare expected and actual results. These tools outline the differences between actual and expected results by comparing files and databases. Most of these tools offer functionality such as byte-by-byte comparison of files and the ability to mask certain fields such as date and time.

Test Coverage Measurement

Test Coverage Measurement tools are used to analyze which parts of each module are used during the test. Coverage analyzing tools are active during program operation and provide comprehensive information about how many times each logic path within the program is run. This Test Management and Quality Management tool ensures that all components of an application are tested, and its use is a vital and often overlooked component of the test process.

SIR Management

SIR Management Tools help track each system investigation request from problem detection through documentation resolution.

Operations Architecture Framework (1300)

Operations Architecture

Figure 14:
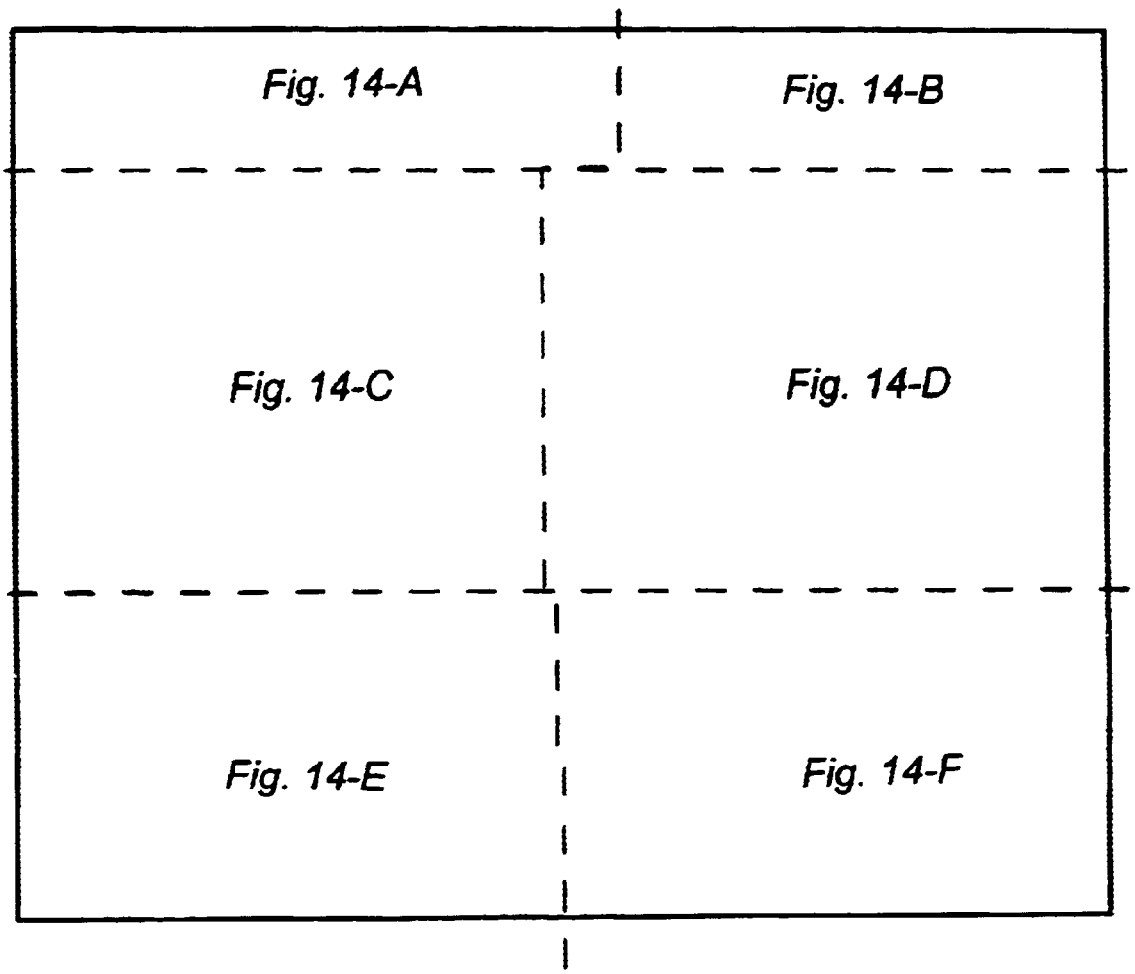
FIG. 14 is a block diagram of a Web Architecture Framework in accordance with one embodiment of the present invention.

As shown in FIG. 14, the Operations Architecture is a combination of tools, support services, procedures, and controls required to keep a production system up and running efficiently. Unlike the Execution and Development Architectures, its primary users are the system administrators and the production support personnel.

The following databases provide information on the Operations Architecture and list requirements and current tools solutions for the managing of the various Operations Architecture areas. All areas of the Operations Architecture have the appropriate MODE sub-functions listed, along with requirements for management solutions and current tools that assist and automate management solutions.

Cautions and Caveats

Unlike the Application and Execution Architectures, every function of the Operations Architecture must be reviewed. All components of the Operations Architecture are integral to the successful management of a distributed environment. Any processes, procedures, or tools developed or chosen as an operational management solution for a specific operational area must be able to integrate with any existing or planned process, procedure, tool solutions for other Operations Architecture areas.

While the tools data and suite information was current and accurate at the time of publication of this document, there is no guarantee that that information is still accurate, or that the vendor is still in business. It is imperative that the following actions are taken when choosing a tool-based solution:

determine that the vendor is still a viable candidate (i.e. still in business, good recent product support track record)

verify the version of the tool to be installed will still provide the management solution required verify the tool(s) will integrate with existing tool(s)

verify the tool(s) will integrate with other planned tool(s) acquisition(s).

General Implementation Considerations

Some key design decisions are specific to the design of certain functions, while others apply more generically across every function. This section presents the generic key design questions. Key design decisions that relate specifically to a function are presented in each of the subsequent functional grouping chapters.

The following generic decisions impact need for specific components:

When and how frequently, does the function need to be performed?

The timing and frequency of each function may have an effect on its staffing, the tool(s) required, the capacity of systems and networks needed to support the tools.

Who will be performing the function?

Responsibilities need to be defined for each function, as the set up tasks will differ dramatically depending on whether the function is to be performed in-house or outsourced. In addition, the individuals who will be performing the function should be involved in the design of how the function will be performed.

Will the function be centralized or distributed?

Central control will mean a stronger focus on remote management, with skills focused in one place, whereas distributed control will mean skills will need to be more widely dispersed. Distributed functions may require less powerful tools due to their placement.

Will the solution be manual or automated?

A number of functions could be managed manually, especially if the functions are not directly related to the systems, or are performed infrequently. Many of the functions, however, require an interface to the systems, or involve large volumes of data.

Is integration with any existing systems required?

If integration with existing systems is necessary, hooks may need to be built into both the existing and new systems.

What are the data sharing requirements with other functions?

Integration between functions will either require a tool capable of supporting both functions, or hooks between tools.

What are the expected data/transaction volumes, and how much historical data will be required?

Volumes of data, both real-time and historical, will have an impact on both system and network sizing.

What platform/protocol constraints exist?

Platforms and protocols are central both to the overall approach as well as the selection of tools to support the individual functions.

Is the intention to use tools or to custom develop some or all of the functions?

The choice of tools in the marketplace is increasing, but custom development may still be required. This decision will impact how the function is established initially as well as its ongoing support and maintenance.

Will existing data/databases be used, or will data be built from scratch?

Many of the functions may already exist within the clients environment. As such, data which is necessary for supporting the system may already exist. If so, it must be determined whether or not the existing data can be used, either in its original or a converted state.

General Product Selection Considerations

It is important to note that there may be requirements which cannot be met by any tools. In this case, in-house development may be an alternative. This approach is likely to be more expensive, however, and more difficult to support the long term, and thus should usually be avoided if possible. Were possible, the tool with the closest match should be purchased, and customized to meet the necessary requirements.

Some additional considerations are outlined below:

Central vs. Distributed Control

The answer to this question may limit the selection of tools as not all tools are capable of controlling functions remotely. If control is centralized, technical expertise at distributed sites will not be necessary. This may, however, mean that a more complex, expensive tool is required.

If control is distributed, technical expertise will be needed at remote sites, and there is the potential for problems with the interfaces between tools.

Platform Constraints

Systems-based tools (e.g., for monitoring or control purposes) will clearly be platform dependent. Functional tools (e.g., to support Incident Management or Change Control), however, can run independently from the systems tools and may only need to run on a limited number of systems.

Integration with other Functions

Integration between some of the functions is highly desirable. Integrated toolsets offer integrated functionality across a number of functions, thus simplifying the interfaces between them (e.g., data will automatically be consistent across functions). Purchase of such tools will help reduce costly customization or the development of add-ons.

It is important to understand the level of integration between products, however, before buying them. Integration varies from vendor to vendor and can mean anything from simply having an icon on a desktop to fully integrated applications and data. In addition, integrated toolsets are likely to be stronger in some functions than in others, and may preclude selection of the best possible tool for every function.

Anticipated Volume of Data & Transaction Throughput

Understanding the anticipated volumes will provide key input to sizing the system. Predicted business volumes stated in the SLA should be used to help determine the appropriate sizes for machines, databases, telecommunications lines, etc. Alternatively, experience from previous engagements can provide useful input.

Number of Users for the Tool

Users may not be limited to the number of support personnel accessing a tool alone. Keep in mind that users of the tools may either be support personnel, vendors, users, senior managers, etc.

Some tools will only support a limited number of users, or may only support users within certain geographic boundaries. It is important to understand if there are any such limitations prior to purchasing a tool.

In addition, the number of users will affect the budgetary requirements for the purchase of a tool, particularly as they relate to hardware and communications requirements.

Level of support Required

If third party software is to be purchased, suppliers must be assessed on their ability to ensure the availability, reliability, performance and user support for these tools will be sufficient to deliver the appropriate levels of service to the users of the system. It may even be necessary to visit reference sites for the vendors to determine whether these requirements are being met.

Presentation (1302)

The presentation component provides the interface between the manager(s) of the system and management data generated by the system. Data can be manipulated for various forms of output. By integrating the operational architecture it is possible to reduce the number of front-end interfaces required. Commonly, the presentation component uses a GUI front-end interface. This component is also responsible for real-time and historical report generation.

Event Processing (1304)

Event processing manipulates the raw data obtained in the event/data generation layer into a more workable form. This layer performs functions such as event filtering, alert generation, event correlation, event collection and logging, and automated trouble ticket generation. Event processing routes the processed information on to either the presentation or management applications layers. Again it is important to consider the interface of the event processing component with the other components of the operational architecture.

Help Desk (1306)

As with End User Services in the centralized model, the Help Desk is the single point of contact for all end users. This unit has end-to-end accountability for all user incidents and problems regardless of whether or not it has the resources to fix them (i.e., it must contact the necessary technical resources in either IS organizations to ensure the incidents and problems get resolved).

Incident Management (1308)

Incident Management provides the interface between the users of the system and those operating and maintaining the system when an incident arises. Incident Management is responsible for:

receiving incidents from users informing users of known work-around where possible ensuring that support personnel are working on an incident keeping users informed of incident resolution progress ensuring that incidents do not get lost as they are passed around support teams informing users when incidents have been resolved and ensuring resolution was complete.

In addition, Incident Management is responsible for ensuring that outstanding incidents are resolved in a timely manner. As part of Incident Management, incidents are reviewed, analyzed, tracked, escalated as necessary, and resolved.

Failure Control (1310)

Involves the detection and correction of faults within the system whether they be minor (e.g., workstation is down) or major (i.e., a disaster) has occurred.

Fault Management (1312)

When a negative event has been brought to the attention of the system, actions are undertaken within Fault Management to define, diagnose, and correct the fault. Although it may be possible to automate this process, human intervention may be required to perform at least some of these management tasks.

Event Data Generation (1314)

Event/data generation interacts with all the managed components in the execution and development environments in order to obtain the required management information. This component also interacts with the physical environment, managing hardware, and supporting infrastructure components of the operational architecture to obtain management information. It is important to consider these interfaces when choosing event/data generation components. Agents and proxies are two common types of event/data generation tools. Often these tools use broadcasting and trapping methods to capture information. Application generated events from vendor packages and user applications also fit into this component of the operational architecture.

Monitoring (1316)

Verifies that the system is continually functioning in accordance with whatever service levels are defined.

Event Management (1318)

An event is an electronic message generated by any component (e.g., application software, system software, hardware, etc.) in the system. Event Management receives, logs, classifies and presents event messages on a console(s) based on pre-established filters or thresholds.

Management Applications (1320)

Management applications are those tools which are used to manage the system. Most of the MODE functions tie directly into this component. The management applications component ties in directly with the integration platform component as the management applications tools must comply with the standards set by the integration platform. For example, if the integration platform is HP OpenView, then the management applications must be HP OpenView software (API, SNMPx) or hardware (card) compliant. Management applications receive data from the event/data generation, event processing, and repositories components and then send data to the presentation or repositories components. Management applications tools include capacity planning tools, performance management tools, license management tools, remote management tools, systems monitoring tools, scheduling tools, help desk tools, etc. Some Enterprise Management tools even poll the event/data generators for information but these options may impact network performance. Web Server management is been introduced as part of the management operations framework. As Corporate Internets and Extranets implement Web based software products to sell and advertise business services, corresponding administrative, security, event notification and performance requirements must be performed similarly for the companies web based system. The critical path issues for Web based server software is typically security and performance based levels of service.

Help Desk (1322)

As with End User Services in the centralized model, the Help Desk is the single point of contact for all end users. This unit has end-to-end accountability for all user incidents and problems regardless of whether or not it has the resources to fix them (i.e., it must contact the necessary technical resources in either IS organizations to ensure the incidents and problems get resolved).

Implementation Considerations

The following are functional requirements for Incident, Request and Problem Management.

Logging Incidents/Requests

Call logger should be presented with a unique incident/request identifier, and should be able to enter a free format description as well as the key data items specified in the data requirements section. Data and time stamps should be automatically registered and Incident and Request management staff should have access to display all open incidents and requests as well as the incident/request history for a specific user location.

Progress Incidents/Requests

Facilities should be given to provide a free format update of actions and investigations, to assign the incident/request to a support group, or to escalate the incident. Date and time stamps should be attached to each action and the full incident/request history should be available to the person performing the update.

Re-assign Incidents/Requests

Possible for incidents and requests to be assigned to different support groups, if further investigation is required.

Close Incidents/Requests

Incidents and requests should be closed with a date and time stamp to help trend analysis and service level reporting.

Log Problems

Problems can be logged both as a result of one or more incidents, or through proactive monitoring of the system, before any incidents have been logged.

Support the Functions Either Centrally or on a Distributed Basis

If the Incident, Request and Problem management functions are to be centralized, these functions need to be able to control and monitor incidents and problems, but other functions should be able to gain access to input detailed technical information or progress updates. If Incident and Request management is distributed, it is recommended that remote locations are given access to the central system, rather than operating local systems. (Some problem areas are local sites operating on different time zones and standardizing escalation procedures from local sites.)

Facility for Auto-logging Incidents

Event/alert based automatic logging of incidents to provide proactive management of incidents and problems by informing Incident management of issues before the user logs a call. This facility is conceptually desirable, but is only likely to be available if the Incident management functionality is part of the monitoring tool. The costs of building hooks between tools and applications are likely to prove prohibitive. In medium or large environments, this facility is extremely desirable, and must be built into the requirements.

Assess Incidents Automatically, Based on Previous Experience and Rules

Knowledge and case based incident management systems are becoming prevalent in the market place, and are built into Help Desk offerings. Use of these systems can help improve the responsiveness and reputation of the entire organization. (Case based tools will require building up over time.)

Incident Management

Incident Management provides the interface between the users of the system and those operating and maintaining the system when an incident arises. Incident Management is responsible for:

receiving incidents from users informing users of known work-around where possible ensuring that support personnel are working on an incident keeping users informed of incident resolution progress ensuring that incidents do not get lost as they are passed around support teams informing users when incidents have been resolved and ensuring resolution was complete.

In addition, Incident Management is responsible for ensuring that outstanding incidents are resolved in a timely manner. As part of Incident Management, incidents are reviewed, analyzed, tracked, escalated as necessary, and resolved.

Implementation Considerations

Will users be given access to the Incident Management system?

Users will benefit by gaining up to date information on the progress of incidents, and could be given the facility to log incidents directly, which would relieve some of the load of the Incident Management function. However, this adds complexity to the solution, and increases communications requirements costs.

Which support personnel will be given access to the Incident Management system?

Support personnel would be able to enter progress against incidents without contacting Incident Management. The ability to scan incidents may also aid the Problem Management function. However, this adds complexity to the solution, and may increase communications requirements/costs.

How many incident support levels will be in place, and how expert will the Incident Management function be?

This will depend on the knowledge and experience at the user locations. The level of technical expertise within the Incident Management function will drive the systems requirements.

Problem Management

Problem Management utilizes the skills of experts and support groups to fix and prevent recurring incidents by determining and fixing the underlying problems causing those incidents. Within Problem Management, related incidents are correlated to problems and ultimately to order or change requests. All problems are logged, tracked and archived. Where possible, work-around are determined and information regarding the work-around is distributed to the appropriate support personnel and user communities.

Implementation Considerations

Will problems be automatically logged or only by manual association with an incident?

Automatic logging of problems will require interfaces to be built with the Event Management system, and perhaps the execution architecture for application errors.

Request Management

Request Management is responsible for coordinating and controlling all activities necessary to fulfill a request from either a user, vendor, or developer. Request Management determines if and when requests will be fulfilled through interaction with the particular function(s) impacted by the request. Following such interaction, accepted requests will be planned, executed, and tracked.

Implementation Considerations

Will users be given access to the Request Management system?

Users will benefit by gaining up to date information on the progress of incidents, and could be given the facility to log incidents directly, which would relieve some of the load of the Incident Management function. However, this adds complexity to the solution, and increases communications requirements/costs.

Failure Control (1324)

Involves the detection and correction of faults within the system whether they be minor (e.g., workstation is down) or major (i.e., a disaster) has occurred.

Fault Management

When a negative event has been brought to the attention of the system, actions are undertaken within Fault Management to define, diagnose, and correct the fault. Although it may be possible to automate this process, human intervention may be required to perform at least some of these management tasks.

Disaster Recovery

In the event of a significant system failure, Disaster Recovery processes will be invoked to re-route the system resources to a secondary, stable configuration until the primary resources can be restored. Within a distributed environment, disaster recovery must account for differing levels of disaster whether at a central or distributed site(s).

Implementation Considerations

What is a disaster?

The way in which a disaster is defined will be dependent upon which resources are critical to the business. For example, a data center failure may be critical for one client whereas a server failure for another is more critical.

How quickly will disaster recovery be required for each service?

This will be defined in detail within the SLA, but high level service recovery targets must be understood, so that high level recovery plans can, in turn, be produced.

Recovery

Recovery manages all of the actions needed to restore service delivery after a system failure. With critical business applications being rolled out on distributed technologies, the recovery of these systems must be easy, quick and efficient to guarantee availability of core business systems as expressed in the agreed service levels and operational levels.

Implementation Considerations

What are some of the limitations that are encountered?

Recovery capabilities span the range from those required to bring up a device after it has failed to those required in the event of a major disaster. With critical business applications being rolled out on distributed technologies, the recovery of these systems must be easy, quick and efficient. Loss of the system for even a short period of time can result in significant financial losses to a clients business.

Hardware Maintenance

Hardware Maintenance maintains all of the components within a distributed system to protect the investment of the organization. Generally agreed upon in the SLAs, maintenance contracts are carried out, monitored and recorded for each asset as appropriate.

Administration (1326)

Billing and Accounting

Billing & Accounting gathers the necessary accounting information for calculating actual costs, determines chargeback costs based on pre-defined algorithms and bills users for service rendered.

Billing & Accounting also makes payments to service providers for services and equipment provided in accordance with agreed upon SLAs. As part of this payment process Billing & Accounting reconciles bills from service providers against monitored costs and SLA/OLA violations.

Systems Management Planning (1330)

Capacity Modeling and Planning

Capacity Modeling & Planning ensures that adequate resources will be in place to meet the SLA requirements, keeping in mind operational requirements which may require additional capacity. Resources can include such things as physical facilities, computers, memory/disk space, communications lines and personnel. Through this component, changes to the existing environment will be determined, modeled and planned according to the necessary requirements.

Production Control (1332)

Ensures that production activities are performed and controlled as required and as intended.

Production Scheduling

Production Scheduling determines the requirements for the execution of scheduled jobs across a distributed environment. A production schedule is then planned to meet these requirements, taking into consideration other processes occurring throughout the distributed environment (e.g., software and data distribution, remote backup/restoration of data.) It plans the production workload and then submits the tasks to the system in the proper sequence, stops processing upon detecting a failure, provides on-line task tracking and workload forecasting.

Implementation Considerations

In a distributed environment are processes across entire or multiple platforms and systems?

Processes may be taking place across the entire system on multiple platforms in either a parallel or a serial fashion. Batch dependencies may be required across platforms, and multiple time zones may be involved. In addition, many non-mainframe based products do not provide production scheduling capabilities with the platform.

Therefore, one can see that scheduling processes across a distributed environment can be quite complex, requiring significant management effort to ensure that processes occur appropriately.

How many schedulers will be used to control the schedules?

Depending on how the function is to be controlled, and how many platforms are to be supported:

Local control of a single device with a single scheduler (typically mainframe)

Remote control of a single device with a single scheduler

Remote control of multiple but independent devices with a single scheduler

Product Considerations

What is the Intended use of the tool?

The component plans for the production workload and then submits the tasks to the system in the proper sequence, stops processing upon detecting a failure, provides on-line task tracking and workload forecasting. In addition, requirements are determined for the execution of scheduled jobs across the environment.

Does and existing component satisfy this requirement?

Production Scheduling contains specific requirements that addresses a distributed environments complexity of multiple platforms and system placed in either a parallel or serial fashion.

What other utilities are available with the tool?

The tool should provide control dependencies to schedule workloads such as: Task/job sequence enforcement, external/internal event driven. Graphically displays work flow from the scheduling criteria and includes such information as task/job name, task description, average run time and resource requirements. Allow clients to define user schedules that can be based on predecessor events in the production environment. Reporting capabilities for forecasting, simulation and analyzing scheduled workload. Monitoring capability of past, present and future workloads as well as tracking of current workload termination notification of normal or abnormal completion.

Does the development team have any prior experience with the tool?

The development should be able to identify the component linkages as well as the functional requirements critical for successful operational integration of the tool into the observed environment.

What level of the component is required?

Due to the complexity of a distributed environment one must account for the processes taking place across the entire system on multiple platforms in either a parallel or a serial fashion. Therefore, production scheduling capabilities across platforms is critical as well as the ability to rerun/restart from single point of failure or provide checkpoint restart- ability.

Does the tool provide facilities to add color to MODE architecture model?

Communication with Performance management component to forecast resource requirements, such as near line storage, DASD space, and etc.

Interface with the Configuration management component facility to obtain configuration data in workload forecasting.

The scheduler will communicate with other schedulers on other systems to run a in a close relationship with the ability to support multiple heterogeneous platforms: MVS, Windows NT, UNIX, and AS/400.

Communicates with Backup/Restore to identify scheduling constraints due to backup and restoration functions.

Communicates with the recovery facility to dynamically switch workload from one processor to another in the event of a system failure.

Print Management

Print Management monitors all of the printing done across a distributed environment and is responsible for managing the printers and printing at both central and remote locations. The purpose of a print architecture is to make formats applications independent, so that the only thing applications need to do is obtain the data.

Print Architecture offers:

It provides independence from printer devices and languages

It makes it easy to develop and maintain report

Paper consumption may be reduced

Reports arrive to the addressee more quickly

It is possible to sign reports electronically

Confidentiality is improved as people can only see information that can be accessed with their security level.

Implementation Considerations

What types of printers will be required (e.g., laser, impact, inkjets, etc.)?

The types of printers will be dictated by the business requirements. The types of printers, will in turn, determine what tools can be used to manage printing may or may not be required.

Where are the printers going to be located?

The business will help determine where the printers need to be located based on where/when printing needs to take place. In some instances local printing may or may not be required.

What spooling facilities will be available?

If spooling is available, printing can be handled as a background task, freeing up system resources for use on-line.

Will review before print facilities be provided?

If these facilities will be provided, all material will not need to be printed. If the material does need to be print; however, the location of the printing must be determined, and the system must be able to forward the printing on to the appropriate location.

Will printing of large documents be necessary?

Large print jobs may utilize system resources considerably (e.g., WAN, LAN, printer), and may tie up the printing queue for other individuals. This type of printing should be performed in off-hours or delayed to avoid contention for the printer during business hours.

What are some limitations that may be encountered?

In a distributed environment the sizing and routing of print traffic is more complex. With new systems being installed, only educated guesses about how and when printing will take place can help determine print routing functionality. In most cases, some adjustments will be required to the print routing algorithms post-rollout to reflect the printing reality.

Product Considerations
What is the intended use of the tool?
Controls report production and distribution form the moment the report is created to the time the printed report is dropped in the end-use s mailbox (electronic, paper, microfiche, etc.)
What other utilities are available with the tool?
Provide queue management and ability to prioritize.
Provides a full featured on-line viewing system.
Provides for the archival of reports in a compressed format first on disk, for a user specified time and then to tape of optical.
Process reports in due-out-sequence.
Automatic report balancing and archives the balancing reports for easy auditor review.
Provides a common output spooling and printer device control capability across the network.
Provide report reprint capability, avoid reruns in lost report situations.
Provide centralized management of report setup and delivery information
How well does the tool integrate with other tools in the environment?
Interfaces with the performance monitoring to identify bottlenecks in the distribution process
Notifies the service level management facility of any missed service commitments.
Communicates with the documentation management facility to obtain the distribution information, media type and service level commitments.
Communicates with the recovery management facility to delete reports that will be recreated.
Communicates report volumes to the resource consumption management facility.
Does the tool provide support for specific areas?
Support multiple printer types as well as report delivery across them. This includes printer format translation (PCL, Postscript, etc.) and code translation.
Any other specific functional requirements?
Output management issues require leverage of existing print capability, local and remote printing, and distribution management through a software package or an equivalent alternative.

File Transfer & Control
File Transfer and Control initiates and monitors files being transferred throughout the system as part of the business processing (e.g., nightly batch runs). File transfers may occur between any two or more devises within the system.

System Startup & Shutdown
System Startup and Shutdown performs the activities required for the startup or shutdown of the entire system (e.g., hardware, applications), or portions of the system depending upon the identified requirements. Within a distributed environment, the system includes both centralized and remote resources.
Implementation Considerations
Will devices need to be shutdown/started remotely as well as be automatic or manual (e.g., using scripts, embedded in schedule)?
If expertise will not be available locally, it is imperative that remote control of the startup/shutdown processes be available. The presence of skills, the availability of tools, and the uniqueness of the application/environment will dictate whether or not startup/shutdown is automatic or manual.

How will clean shutdowns of all processes be ensured?
If a system failure takes place, it is important that all processes be shut down well, to ensure that the processes can be re-started and that the integrity of the information will be maintained.
In what order will hardware and software components be started/shutdown?
Based upon the technical requirements of the system (e.g., databases should be started before applications) as well as defined service levels (e.g., one particular application is critical and must be started first), the order of startup/shutdown will be determined.
Are periodic re-boots required (e.g., to clean up memory)?
If this is necessary, automatic/manual startup/shutdown of the system should be scheduled (e.g., UNIX systems require this).
Analysis of the system and other resources need to be addressed?
The state of an application, the system or a specific resource must be known at all times. Common activities performed as part of Startup/Shutdown include:
logging on
virus checking
version checking
process initiation/completion
housekeeping
logging off.
Some limitations that may need to be taken into account?
System startup and shutdown is no longer confined to a centralized site. The system is distributed, in effect creating islands of technology which may be started or shutdown with the flip of a power switch on a workstation. Processes which rely on the system being up and running (e.g., software and data distribution) may fail if a user has switched his/her machine off before leaving for the evening. Such failures will impact the following days processing capabilities and must be accounted for either by the system or through training. In addition, controlled machine startup may be required to initiate tasks or to perform activities such as configuration checking or virus detection/correction.

Mass Storage Management
Mass Storage Management involves those activities related to the handling of various types of centralized and distributed storage media including the monitoring and controlling of storage resources and their usage.
The objectives of Mass Storage management are to: implement the top level of storage management, control the usage level of each storage device in the distributed environment, control all storage related naming standards and placement details in the installation.
Mass Storage Management is more complex in a distributed environment than in a centralized environment since many more storage options become available, as storage may take place centrally or on a distributed basis and the number and characteristics of storage devices have increased.
Implementation Considerations
What DBMS will be used and what utilities does it have?
The DBMS will often provide much of the necessary storage management functionality; this decision impacts further requirements.
Will databases be distributed or centralized?
Storage management for centralized databases will clearly be simpler then for distributed databases were a global view becomes more difficult to obtain, and where data consistency becomes more of an issue.

What media types will be used?

It is essential that the types of device to be used are understood before detailed decisions are taken.

Distributed Environmental Constraints?

The allocation and sharing of storage media is more difficult to plan since users are distributed. Mass Storage Management is more complex in a distributed environment as many more storage options become available; storage may take place on disks, tapes, etc. Either centrally or de-centrally.

Product Considerations

What is the Intended use of the tool?

Control and manage the data storage environment including any/all media, disk, optical and tape.

Technology's ability to support the Operating Systems within the distributed environment?

The tool must run in the platform selected in order to control usage of disk space, main memory, cache, etc. In addition, determining the space available helps control the device usage, storage capacity.

What other utilities are available with the tool?

Continuous analysis of the data storage environment to insure optimum storage utilization and location.

Eliminate fragmentation by reordering files

All storage devices managed independently of their type and location in order to avoid storage problems, bottlenecks, etc.

Should the tool provide specific component functionality?

The tool should take into account the complexity of the distributed environment as well as the flexibility of the scenario that storage may take place centrally or on a distributed basis and the number and characteristics of storage devices have increased.

Does the tool provide support for the databases selected for the distributed environment?

Additional facilities may be required, even although databases typically have built-in utilities or tools to perform these function and do not generally require a separate tool.

Does the tool provide facilities to add color and support linkages to MODE architecture model?

Communicates with the Performance management facility to identify any performance problems and relocate data based on the performance analysis.

Communicates with operation system error logging and/ or the Operations Automation to identify any potential media or hardware failures and relocate data, automatically files a problem log for corrective action.

Interface with the Capacity/Resource manager to create a definable resource forecast.

Backup/Restore Management

Backup and Restore Management considers all of the back-up and restorations that need to take place across the distributed system for master copies of data. Depending on the need, these processes may occur centrally or remotely.

Implementation Considerations

What data/files will be backed up?

Files that are either unique, store site specific data or are highly volatile should be backed up. This will help ensure that important, business critical data will not be lost in the event of a system failure or disaster. All files do not necessarily need to be backed up as each file backup utilizes storage space and ma impede the performance of the system.

What will be the frequency of the backup, the number of copies made, and the number of generations maintained?

The critically and volatility of the information will determine the frequency of the backups and whether or not multiple copies of the data are maintained centrally/locally. In addition the stability of the system needs to be considered as well as any performance impacts of backing up the data as required.

The number of generations maintained will be dependent on the disaster recovery policies in place as well as any government/regulatory controls in existence.

How will the integrity of a backup or restore be ensured?

Because databases can be located throughout the distributed environment, care must be taken to ensure that data integrity is maintained. This may mean storing the master copy of data centrally, or synchronizing the commits of updates of the information appropriately.

Will the data be backed up centrally, locally, or at an alternate site?

Centrally located devices will require the use of both LAN and WAN bandwidth to backup the data, and restoration of the data will be slower. This may be hard to achieve if there are numerous devices in the system. Central location, however, will ensure that backed up data will be stored in one place, potentially making recovery from a system failure or disaster recovery easier as well as centrally less expensive to maintain. In addition, central control over the backup/restore process will require expertise at a single location whereas local control will necessitate expertise in multiple locations. Alternate site control may provide the best mix of central/local placement of skills.

In contrast, local devices do not utilize the WAN bandwidth, and typically provide faster data restoration. Local devices, if available, may be more expensive and may require local expertise.

Alternate site backup combines both of the strategies in that WAN bandwidth to the central site is not over-utilized, and restoration of the data can happen fairly quickly as well as securing information as information is stored in multiple locations.

Will copies be held at multiple locations?

Backup copies may need to be stored at multiple locations for security purposes (i.e. in the event of a system failure, or disaster, some backup copies may have been destroyed.)

Product Considerations

What is the intended use of the tool?

Provide services and facilities to enable the client to effect timely and accurate recovery in the event of an interruption to processing capability.

What other utilities are available with the tool?

The backup product should have fundamental management capabilities. Automatic restore, unattended operation and command line processing of the product should be available. Basic tape functions such as cataloging, internal labeling, initialization, certification, scratch protection and write protection are musts.

Performs automatic backup of data files on site standards.

Designed along the lines requester-server model; more specifically the tool runs on the server machine and acts as a shared resource for data access, integrity, security recovery, etc.

Full auditing capability should be present for backups as well as error detection and notification that a backup has failed should be available.

Provide full and incremental backups, partial restore, and compression/decompression.

Capable of managed and systematic restore process.

How well does the tool integrate with other tools in the environment?

Backups are typically embedded into production scheduling with restores on an ad hoc basis. Backup/Restore needs to ensure that a file can be only backed up/restored by users with the right access level. Furthermore, file transfer utilities need to be used when the information to archived is sent through the network as well as security for file control access and global authorization should be available and done in concert with the security management facility.

Should the tool provide specific component functionality?

Database backup/restore is inherently more complex than backup of standard files.

It is important to ensure that all relationships are resurrected after restoring database files. (Integrated with the functionality of the DBMS)

Does the tool provide support to specific areas?

- The product should support multiple heterogeneous platforms: Windows NT, AS/400, MVS and UNIX.
- Software features of the product should support items such as direct file access, direct volume access and extended attributes. The ability to backup the operating system files. Support should also handle open file backups either waiting and retrying or taking a fuzzy backup.
- Dual logging support in the DBMS is required, both for online and archived logs.
- Pint in time recovery of database and database components must be supported.
- Ability to support various types of storage devices (magnetic disc, cartridge, tape, optical disc.)

Does the tool provide support for a specific environment?

The ability to support unattended operations reduces the need for operations expertise in both central and remote locations.

Does the tool add color to MODE architecture model through performance measures?

Performance of the backup product is essential. The tool should backup all production data in the processing window provided and the restore capability should match availability and disaster recovery requirements. Performance can be enhanced through the ability to throttle the backup process to reduce network traffic.

Archiving

Archiving saves and stores information across the distributed environment, either centrally or in distributed locations. Archiving moves datasets, files, etc. from one device to another, usually lower speed, device based on a number of parameters. Archiving can be used to move information to or from distributed and centralized sites.

Implementation Considerations

Which files and databases will be archived?

Some files and databases need to be stored on fast devices so users can access them quickly. In addition, certain files may need to be maintained for either historic or government/regulatory reasons.

What media will be used for archiving?

The cost of the media, space available and its performance capabilities should determine which archiving medium is used as well as the existence of central or local expertise.

How long should archived data be maintained?

It is important to define the maximum time that data needs to be stored before being deleted, including the number of generations that need to be maintained. This is because the amount of archival space should be determined up front. The maximum time will likely be determined by either government/regulatory controls or disaster recovery requirements.

How will the integrity of retrieved data or files be ensured?

Because databases can be located throughout the distributed environment, care must be taken to ensure that data integrity is maintained. This may mean storing the master copy of data centrally, or synchronizing the commits or updated of the information appropriately.

Will archiving devices reside centrally or locally?

Central control over the archiving process will require expertise at a single location whereas local control will necessitate expertise in multiple locations.

Centrally located devices will require the use of both LAN and WAN bandwidth to archive the data, and retrieval of the data will be slower. This may be difficult to achieve if there are numerous devices in the system. Central location, however, will ensure that archived data will be stored in one place, potentially making recovery from a system failure or disaster recovery easier. In addition, central devices may be less expensive to maintain.

In contrast, local devices do not utilize the WAN bandwidth, and typically provide faster data retrieval. Local devices, if available, may be more expensive, and may require local expertise.

Implementing (1334)

Executes change within the distributed environment with tested components and techniques according to the appropriate plan(s). Implementing includes such things as: initial installation, software & data distribution, license management, etc.

System Component Configuration

System Component Configuration provides a mechanism to configure equipment (i.e., hardware and software) which has configuration parameters to set and to manage the inter-relationships between configured components within the system. Configuration information for particular equipment must be coordinated across the system to ensure that all equipment can function together properly.

Implementation Considerations

Where does the function get input from?

Configuration settings can be retrieved from different sources. The release and the rollout schedule will contain a detailed description of equipment and its configuration and can therefore be used as input. Alternatively, the asset inventory system can be updated in advance and then used as an active database to drive the configuring process.

Product Considerations

What is the Intended use of the tool?

Definition and implementation of consistent configurations for all configurable components within the system.

What other utilities are available with the tool?

- Hardware and Software should be configured accurately and with minimal business disruption during initial installation.
- Ability to re-configure hardware and software both locally and remotely.

How well does the tool integrate with other tools in the environment?

The asset data has to be updated accordingly and must reflect the actual state of hardware and software and all their relationships. Configuration data may be distributed to the device by Software & Data Distribution; therefore, System Component Configuration needs to get access to Software & Data Distribution processes.

Software & Data Distribution

Software and Data Distribution sends out the correct version of the release package to the distribution locations and updates the locations with the contents of the release package (e.g., software, data, configuration information, procedures and training/support materials.).

The software and data distribution mechanism itself updates either the software, data, or configuration information on a machine(s), reports the relative success/failure of the distribution and updates the asset information for the sites/machine(s) affected by the distribution.

Implementation Considerations

What are some limitations that may be encountered?

Training Planning also impacts how well service will be delivered within the distributed environment. The skill sets required by support personnel will change with the introduction of distributed technologies. Support personnel will be required to have greater breadth of knowledge. No longer can an individual simply understand the network or the applications. The intertwined nature of a distributed environment will force individuals to understand, at least at a high-level, how the system fits together. In addition, support personnel will need to have some specialized skills. As no one individual can fully understand the detail behind the entire system, teams of specialized support personnel will be required to work together to a greater extent in these environments. This group interaction may require new skill sets not frequently found in traditional support organizations.

What are some focus areas to determine an appropriate training plan?

The existing skills must be assessed and a forward-thinking training direction must be defined. The training plan will likely emphasize newer technologies and different methods of training with the underlying goal of providing the appropriate level of service as required by the SLAs.

Product Considerations

What is the intended use of the tool?

Support the ability to distribute software components to interdependent, multiple heterogeneous platforms from a single source. The features should be automated and only require minimal operator involvement.

What other utilities are available with the tool?

Centralized control and administration of distribution function.

Backout, configuration restoration capability.

Schedulable, unattended distribution and installation of software.

Ability to generate distribution candidate lists from asset/inventory management database.

Logging of status/failures to centralized system monitoring facility.

Ability to distribute release packages constructed in module control/versioning facility.

Pre-defined installation and de-installation scripts.

Ability to perform complete back-out of all related segments quickly and automatically, without impacting other, successfully installed updates.

Features should include: data compression and decompression, check-pointing, and retry.

Users should be allowed to postpone distribution to their workstation.

What level of the component is required?

The function must be able to access a release library, to identify release packages, release component groups and release components, and to associate the correct version number with these components.

Ability to select destination nodes by certain criteria, such as location, hardware type, standard configuration at these nodes and to address these nodes in the network.

The function must send to and install software and data at remote locations reliably and within an agreed time scale causing minimum disruption.

The function must be able to back out remotely, either as part of the distribution or as a separate process. The mechanism must be able to regress to the previous operable state prior to disruption.

Ability to synchronize data and time between systems.

How well does the tool integrate with other tools in the environment?

Software & Data Distribution needs to access and update asset data in the asset inventory system to reflect implemented changes (automatically). In addition the function may be based on the same file transfer protocol as File Transfer & Control; unless the tools uses their own proprietary file transfer method based on a standard communication protocol.

Does the tool provide support for specific environments?

Specialized functionality to support operation across the wide-area network environment including: parallel distribution and data compression. In addition, support of platform specific functions and capabilities due to awareness of platform specific information resident in the asset/inventory database.

User Administration

User Administration handles the day-to-day tasks involved in administering users on the system. These tasks include such things as: adding new users, changing user Ids, re-establishing user passwords, maintaining groups of users, etc.

Security Management

Security Management controls both physical and logical security for the distributed system. Due to the nature of a distributed environment, security may need to be managed either centrally, remotely or through a combination of the two methods.

Security Management also handles the logging of proper and illegal access, provides a way to audit security information, rectify security breaches and address unauthorized use of the system.

Implementation Considerations

Some limitations that may be encountered?

Security must exist in various levels throughout the system in order to prevent unauthorized access. Security components must be packaged into a security architecture which can be effectively managed by an organization through their security management strategies. The Kerberos security approach within client/server architecture, for example, utilizes interconnected security servers and distributed security clients to provide security for the distributed environment.

The number of security components required to secure a distributed environment will increase due to the computing power available through the use of these new technologies and the heterogeneity of the environment. Although things such as dial-up access, LAN access, multiple host access, etc. introduce new user capabilities, they simultaneously introduce security risks into the system.

What are the benefits of single logon capabilities?

Due to the number of components, users may be required to have multiple ID(s) and passwords unless the system is designed to allow a user to access all of the required resources through a single logon. As most products on the market typically allow access to only a subset of resources, single logons with multiple ID and password coordination may be difficult to achieve. Issues such as periodic required password changes can be difficult to overcome while maintaining adequate security.

Product Considerations
  What is the Intended use of the tool?
  Protects all computer resources, facilities and data from accidental or intentional destruction, modification, disclosure and/or misuse.
  What other utilities are available with the tool?
    One User-ID for access to all software (central point for all security checking).
    Maintains a security log and user profile of what was accessed when, from a computer resource, facility and data view point.
    Security Administration ability to monitor the activity of a user of resource.
    Allows users capability, when authorized, to maintain their own security profiles by individual or group.
    Access authority for database objects (data-sets) as they appear outside the DBMS must be controlled.
    Database authorities must be manageable at a group/role level.
    Single user setup and sign-on capability across all platforms and applications.
    Virus protection on all platforms.
    Support for external security devices and dial access equipment, etc.
    Encrypted flow of security information across the network.
    Comprehensive access logging and auditing capability.
    Enhanced security capability beyond normally supplied UNIX levels. This includes being able to support scoped UNIX administrative users (root subsets, limited root functionality).
Network Management
  Network & Systems Management Planning is responsible for the planning activities involved in running the day-to-day operations and maintenance of the production systems (e.g., capacity planning, performance planning, etc.).
Controlling (1336)
  Monitors change to make sure that change is delivered on-time according to established plans, making adjustments to the plan when unforeseen issues or events arise (e.g., rollout management, change control, asset management etc.).
Change Control
  Change Control is responsible for coordinating and controlling all change administration activities within the distributed environment (i.e., document, impact, authorize, schedule, implementation control.)
Implementation Considerations
  What types of changes will be controlled by Change Control and what is the anticipated volume of changes?
  The types of changes Change Control should cope with need to be defined. Changes can range from a minor document change to the introduction of a complete new service. However, moving a workstation from one desk to another may not require a change request.
  Design of the function heavily depends on its size. It may be a relatively small environment with little expected change, or it could be a huge distributed system with many locations, many users and many different platforms.
  It is easy to underestimate the volume and complexity of changes in a distributed environment. Changes to different platforms can easily become very complex. Experiences from previous engagements should be used to help predict figures. In a typical distributed environment, several hundred changes per month can be expected.
  To what extent should Change Control be integrated with the asset inventory system, maintained by Asset Management?
  Impact analysis can use Asset Management to get a detailed list of assets which are dependent on the subject to be changed. It may be a mandatory requirement to provide this list before a change request can be accepted.
  To what extent should Change Control be integrated with Incident and Problem Management?
  Change requests might be closely tied to incidents and problems, thus when a change is implemented, the corresponding incidents and problems can be cleared.
  Which media will be used for change request submission?
  Pure electronic forms will be easy to forward over different locations, but it is more difficult to include a signature feature for authorization, and it is not easy to attach documents to provide additional information.
  Therefore, further paper forms are typically used for raising change requests but the change administrator then stores the most important information in a change request database. The decision will depend primarily on the size of the system.
  There are some limitations that may be encountered within a distributed environment.
  There will be multiple change drivers including the users, developers/architects and vendors. The change these groups will wish to introduce must be coordinated on a wide-scale basis as the impact of change within these environments is great. Change Control allows the impact of the change to be assessed along with its merits, timescales, etc. It also provides a way of evaluating and rationalizing multiple change requests against one another to determine what changes should actually take place.
Product Considerations
  What is the intended use of the tool?
  Integrated central repository of source, change and configuration data used to pro-actively manage all events impacting user service. Manage the process of change activity, while maintaining the integrity of both application development and the production environment. Support change control from the initiation of the change, through production configuration across multiple platforms.
  What other utilities are available with the tool?
    Change requests need to be registered in the system, with a unique number assigned as well as related incidents and problems.
    The system must support update of change requests. Updates may include changing priorities, results of the assessment, and adding a summary of the implementation.
    Once a change has been implemented the change administrator must complete the log by closing the change request.
    Centralized repository for software releases, including current and back-level generations.
Asset Management
  Asset Management ensures that all assets are registered within the inventory system and that detailed information for registered assets is updated and validated throughout the assets lifetime. This information will be required for such activities as managing service levels, managing change, assisting in incident and problem resolution and providing necessary financial information to the organization.
Implementation Considerations
  What data will be stored?
  There are four options to consider, when designing the scope of the Asset Management function. Usage of the Asset inventory only as a production system database (core database), including hardware devices, software versions loaded in the production environment, their licenses and network configuration data. Thus the asset inventory system only stores the core systems components in the production environment.

In addition to the production system data as describes above, it contains any existing. release and release components such as software modules, documents and procedures. It also contains service level agreements and actual figures for user groups and devices, incidents, problems and change requests. It may also contain additional data such as performance data or log of all backups taken.

How will data be kept up-to-date?

This can be achieved by regular and ad hoc audits, using manual and automated procedures. An alternative approach would be to use asset data to drive Software & Data Distribution. The Software & Data Distribution processes would get data from the asset inventory system as input. If these processes configured the devices according to the asset inventory it would be up-to-date by definition.

What phases of an assets life cycle should be covered by Asset Management?

It may be appropriate to control assets within the first stage of the life cycle (i.e., from development on) or it my prove more appropriate to implement Asset Management only from the point of delivery.

Product Considerations

What is the intended use of the tool?

Maintain a central repository for all software licenses and assets.

What other utilities are available with the tool?

Software asset tracking by location/server, automatic detection of correct level of software.

Authorize license use.

Perform periodic searches for unlicensed software.

Central inventory system

Ability to back up and archive the asset inventory system

What are some of the inventory maintenance issues that need to be addressed?

Ability to maintain a data model representing the basis for an asset inventory system that reflects the types of assets to be managed and their relationships. The model should be flexible to cope with future structural changes. A record needs to be added to the inventory system when an asset is purchased or created, or when changes to the environment are performed.

How well does the tool integrate with other tools in the environment?

Asset data needed to support various other management functions such as:

Hardware Maintenance

Release Testing

Procurement

Initial Installation

System Component Configuration

Software & Data Distribution.

Does the tool provide support for a specific environment?

Current asset data from the distributed environment needs to be retrieved frequently through regular and ad hoc audits.

Rollout Management

Rollout Management is concerned with delivering new sites or services to existing sites on-time based on the rollout schedule. Rollout Management monitors the rollout progress of all functions against the rollout schedule to ensure that the schedule is maintained. Review of the rollout schedule takes place regularly to determine how well rollout is progressing and to make any adjustments to the rollout schedule based upon any problems or issues which arise.

Implementation Considerations

What are some principles that should be applied in determining rollout planning?

At the beginning of a rollout, the number of incidents can be dramatic. This happens due to initial problems with hardware and system software as well as the unfamiliarity of the users. In addition to an increased support load, support teams will need more time to process an incident and to solve an underling problem since they will need to become familiar with the new service. Once support teams have become familiar with the system and know how to resolve the most common problems, rollout can be accelerated.

Since many problems will occur initially during rollout, it is important to have quick access to support teams and development teams. If sites are close, support personnel can get to the sites quickly. Once the system is more stable, remote installation can occur.

Instead of planning a tight schedule that keeps teams busy all the time, some windows should be left in the schedule to allow catching up time in case of delays. Otherwise, small deviations to the schedule cannot be handled and larger delays to the entire schedule will result.

When rollout continues over a period of time, hardware and system software updates will affect the initial implementation of the system. The service to be implemented itself may also be updated during rollout. Therefore it is important to review hardware and software maintenance and release plans and to reflect these plans in the rollout schedule.

Will the system be rolled out in one big bang or through a phased rollout over a longer period of time?

Rollout of a new service can either be performed at one specific point in time for all locations or phased over a certain period of time. Phased rollout is the preferred approach because it limits the risk of serious business disruptions. In some cases, however, it may be necessary to complete rollout simultaneously for business reasons.

What are some of the limitations encountered in a distributed environment?

Rollout Planning handles the greatest period of change in distributed systems management—system rollout and installation. During rollout every site and every user may be impacted by the changes taking place. Since delivery of the system will affect how well it is received by the users and is oftentimes defined by an SLA(s), delivery of the system must take place smoothly with minimal interruption to the users. This can be challenging when both old and new architecture domains must exist concurrently until the rollout has been completed.

Interdependencies within the schedule must be identified prior to rollout to highlight the importance of the schedule and the effort required from each group involved.

Release Control

Release Control is concerned with delivering a release on-time based upon the release schedule. Release Control monitors the release progress of all activities against the schedule to ensure that the schedule is maintained. Review of the release schedule takes place regularly to determine how well the release is progressing and to make any adjustments to the release schedule based upon any issues or problems which arise.

Implementation Considerations

What will be the versioning strategy?

It is necessary to determine how a release will be named and versioned. The following points should be considered when defining a versioning strategy. The versioning strategy should be kept simple and meaningful. Versions should be applied not only for complete releases, but for all logical groups of release components as defined in the release definition data model. Asset Management needs to reflect the release component data model in order to be able to store the asset information. In addition, the versioning strategy will affect Software & Data Distribution to ensure that the appropriate version of software/data is resident on the unit prior to implementing the new release, and co-requisite checking ensures that implementations of software/data will leave a machine in a valid state.

How frequently should new releases be packaged?

A minimum time interval between two regular releases needs to be defined. Most planned releases typically occur within three to six months of one another.

Will delta releases be allowed?

The need for delta releases as part of the overall policy must be determined. Delta releases are high risk, as they require a much better understanding of what is already implemented.

Delta releases have the advantage of requiring less storage space on the target machine but it may be more difficult to ensure that the base components are compatible. This can become a particular problem when many components have changed and several delta releases have accumulated.

Will simultaneous changes across platforms be required?

Implementing releases in a distributed environment requires complex synchronization across machines and platforms. An appropriate strategy needs to be determined.

What are some limitations that may be encountered at distributed sites?

Release Planning coordinates the release of updates (e.g., software, data, procedures, etc.) to the distributed sites. An application, for instance, can no longer be delivered upon successful completion of its system test. This is due to the fact that any change in the distributed environment will impact other components in the distributed environment. Releases must therefore be planned carefully to ensure that a change will not negatively impact the distributed system.

Product Considerations

What is the intended use of the tool?

Monitoring and delivery of releases as well as review of release schedule versus planned schedule.

What other utilities are available with the tool?

Provide management of source code, objects, executables, graphics, and documentation.

Track and manage multiple versions of an application, such as development, staging, certification, production, and prior versions of production.

Provide automatic file versioning, configuration versioning, release control, change tracking, etc.

Populate multiple platforms with the correct code at the same time or on schedule, and provide update status.

Confirmation of release scheduling and determine if the release is on schedule and report on progress of release.

If schedules have to be changed, changes need to be authorized by all involved functions and components.

How Well Does the Tool Integrate with Other Tools in the Environment

Release Planning and Release Control naturally use the same tool, typically a spreadsheet, for creating and maintaining the release schedule.

Migration Control

Migration Control is a function underneath Release Control. Updates to the distributed system must be tested prior to being released into the distributed environment. To control the updates as the move from the development into the production environment, Migration Control ensures that the proper updates are received from development, versioned according to the version strategy of Release Planning, moved into the test environment, moved form the test environment into the production environment after the pre release tests have been successfully completed.

Implementation Considerations

What units are subject to migration?

The groups of components, which are allowed to be migrated, must be determined, for example: single software modules or documents can be migrated on their own and only complete releases (including delta releases) with all their components may be migrated.

Where will the release library be located?

The library can either be held centrally or can be distributed over various sites. A centralized approach is preferable in order to avoid inconsistencies.

Which platforms and media are used for the release library?

The release library may reside of several platforms. UNIX software may be stored on UNIX servers, host software on hosts and third party workstation software may be on floppy disks.

License Management

License Management ensures that software licenses are being maintained throughout the distributed system and that license agreements are not being violated.

Implementation Considerations

What data will be stored?

There are four options to consider, when designing the scope of the Asset Management function. Usage of the Asset inventory only as a production system database (core database), including hardware devices, software versions loaded in the production environment, their licenses and network configuration data. Thus the asset inventory system only stores the core systems components in the production environment.

In addition to the production system data as describes above, it contains any existing release and release components such as software modules, documents and procedures. It also contains service level agreements and actual figures for user groups and devices, incidents, problems and change requests. It may also contain additional data such as performance data or log of all backups taken.

How will data be kept up-to-date?

This can be achieved by regular and ad hoc audits, using manual and automated procedures. An alternative approach would be to use asset data to drive Software & Data Distribution. The Software & Data Distribution processes would get data from the asset inventory system as input If these processes configured the devices according to the asset inventory it would be up-to-date by definition.

What phases of an assets life cycle should be covered by Asset Management?

It may be appropriate to control assets within the first stage of the life cycle(i.e., from development on) or it my prove more appropriate to implement Asset Management only from the point of delivery.

Product Considerations

What is the intended use of the tool?

Maintain a central repository for all software licenses and assets.

What other utilities are available with the tool?
Software asset tracking by location/server, automatic detection of correct level of software.
Authorize license use.
Perform periodic searches for unlicensed software.
Central inventory system.
Ability to back up and archive the asset inventory system.
What are some of the inventory maintenance issues that need to be addressed?
Ability to maintain a data model representing the basis for an asset inventory system that reflects the types of assets to be managed and their relationships. The model should be flexible to cope with future structural changes. A record needs to be added to the inventory system when an asset is purchased or created, or when changes to the environment are performed.
How well does the tool integrate with other tools in the environment?
Asset data needed to support various other management functions such as:
Hardware Maintenance
Release Testing
Procurement
Initial Installation
System Component Configuration
Software & Data Distribution.
Does the tool provide support for a specific environment?
Current asset data from the distributed environment needs to be retrieved frequently through regular and ad hoc audits.

Database Management (1338)
Database Management is the management and administration of database technologies, including monitoring, physical file placement, performance, and sizing.

Database Recovery
Database Recovery is the process of providing recovery of database entities following a logical or physical database failure. This includes database software failure and local disk failure.

Database Disaster Recovery
Database Disaster Recovery is the process of recovering the database entities following a catastrophic failure. This process should be fully integrated in the enterprise-wide disaster recovery plan.

Database Backup/Restore Management
Database Backup/Restore Management is the process of providing point-in-time backup and recovery for logical database restores. This includes application-driven data errors, dropped tables, and corrupt data.

Capacity Modeling & Planning
Capacity Modeling & Planning ensures that adequate resources will be in place to meet the SLA requirements, keeping in mind operational requirements which may require additional capacity. Resources can include such things as physical facilities, computers, memory/disk space, communications lines and personnel. Through this component, changes to the existing environment will be determined, modeled and planned according to the necessary requirements.
Implementation Considerations
What are some limitations that may be encountered?
Capacity Planning & Modeling must coordinate the requirements across the system (e.g., networks, servers, workstations, CPU, etc.) Capacity is driven by the need to meet SLAs with the user communities and as part of the planning and modeling process, future threats to capacity should be identified.

Capacity planning cannot, however, be done separately for each piece of the system. Capacity planning must be done for the system as a whole to understand how the capacity of one portion of the system affects the capacity of another. Due to the large number of components within a distributed environment with any-to-any connectivity that will affect the systems capacity, the equation for determining capacity quickly becomes large, with many interdependencies.

Monitoring (1340)
Verifies that the system is continually functioning in accordance with whatever service levels are defined.

Performance Management
Performance Management ensures that the required resources are available at all times throughout the distributed system to meet the agreed upon SLAs. This includes monitoring and management of end-to-end performance based on utilization, capacity, and overall performance statistics. If necessary, Performance Management can make adjustments to the production environment to either enhance performance or rectify degraded performance.
Implementation Considerations
What are some of the critical elements to focus on in a centralized environment and distributed environment?
Performance Management in a centralized environment typically focuses on three main factors: CPU utilization, disk I/O, memory occupancy.
Within the distributed environments, however, these factors extend out into the environment across networks, increasing the complexity of gathering the necessary performance information.
View performance as a typically business driven?
Performance Management needs to consider performance from a business perspective, not merely a systems one. Most transactions in distributed systems utilize a wide variety of resources, and the measurement of end-to-end response time becomes the sum of the time expended by each one of the components sequentially involved in the transaction less the time while components were processing in parallel.
What devices/users will be monitored and at which locations? Will this information change?
Understanding the scope of devices/users, and their locations is key to managing performance. Understanding whether or not the scope will change will help determine how Performance Management needs to be approached.
Will performance be measured from end-to-end or merely for individual components?
The issues associated with each of these approaches are described above. The approach chosen will have a profound effect on determining the issues that need to be resolved.
Will monitoring be continuous or by demand?
Continuous monitoring can generate significant performance overhead, whereas targeted, periodic monitoring may only be necessary. This strategy will impact the design of the technical infrastructure as well as the tools chosen the manage the systems performance.
Will only selected transactions be measured, and if so, should this selection be configurable?
It may be necessary to measure business critical transactions only; specified within the SLA. If the facility to select specific transactions is required, significant customization of the system may be necessary.
Will response times be required for all transactions of a particular type, or can sampling be used?
Once transaction have been selected for monitoring, the decision needs to be taken whether or not every transaction of that type should be monitored, or only a sample set of those transactions. Full monitoring may increase network and processing overheads.

The ability to dynamically adjust the system to improve performance is also critical?

As SLAs will likely be tied in some way to performance, it is important to monitor and correct the systems performance as it degrades to ensure that operational levels are maintained and that the SLA(s) will not be violated.

Product Considerations

What is the Intended use of the tool?

Collect, analyze and display in graphical format real-time performance characteristics from a wide range of resources. Analyze current workload and configuration data and forecast future requirements, as well as providing input into the Financial planning process.

What other utilities are available with the tool?

Provide real time monitoring and interactive tuning of the environment. Ability to input threshold alerting based on high/low watermarks and proactively act.

Monitoring capabilities include the ability to measure CPU and disk utilization, memory occupancy, transaction response time, reports (storage & distribution), printers, network utilization and performance, circuit utilization, backup facilities, WAN/LAN utilization.

Instance level tuning and configuration parameters (memory, I/O, journalling) to address performance problems.

Other integrated tools needed to provide support for this environment?

May require use of some or all of the following monitoring tools: operating system monitor, on-line monitor, batch monitor, data base monitor, (host, server) and network monitor (WAN, LAN).

How well does the tool integrate and interface with other tools/components in the environment?

Performance measures must be consistent with Service Level management techniques.

Performance statistics are essential to facilitate ongoing Capacity Planning and Modeling.

Resource utilization statistics may be used to generate costing, and potential billings for customers.

Passes data to the resource consumption management facility to report on the recurring processing cost of each business application.

Physical Site Management

Physical Site Management monitors the central and distributed sites environmental and regulatory levels. Physical Site Management ensures that adequate power, cooling facilities, fire suppression, etc. are provided and maintained to prevent system outages. When necessary, corrective actions are issued and monitored according to pre-defined environmental control plans.

Testing (1342)

Ensures that changes to the distributed environment will not negatively impact the distributed environment and that changes will cause positive things to take place (e.g., better system performance, improved operability, etc.).

Product Validation

Product Validation tests potential hardware and software for the distributed environment prior to procurement to determine how well a product will fulfill the requirements identified. Product Validation also ensures that the implementation of a new product will not adversely affect the existing environment.

Implementation Considerations

To what extent will the production environment be reflected?

The design of the test environment should reflect the production environment as closely as possible. In principle it is desirable to have an identical set up in both environments. However, this may be cost prohibitive and some parts of the configuration may not be critical to business. The contents of the test environment therefore need to be decided. Yet it is difficult to judge which components of a distributed environment may actually impact services. For example, networking components, such as bridges, are often seen as transparent and not required in a test environment, which my mean that several LANs in production are only reflected by one LAN in the test environment. The risk of adopting this approach must be addressed thoroughly, and should be approved be senior management.

What are some limitations that may be encountered within a distributed environment?

Because the technologies are new, it may not be possible to accurately assess what needs to be tested for a particular product. There are many configuration variants in the distributed environment, a single test environment for the validation becomes difficult to achieve and multiple test environments may be required.

Release Testing

Release Testing receives the proper version of a release package (e.g., software, data, procedures, support materials) and tests the release of the upgrade in a test environment to ensure that the:

entire release package is compatible with the existing environment release package may be released successfully by the planned methods release can be supported by support personnel.

Implementation Considerations

To what extent will the production environment be reflected?

The design of the test environment should reflect the production environment as closely as possible. In principle it is desirable to have an identical set up in both environments. However, this may be cost prohibitive and some parts of the configuration may not be critical to business. The contents of the test environment therefore need to be decided. Yet it is difficult to judge which components of a distributed environment may actually impact services. For example, networking components, such as bridges, are often seen as transparent and not required in a test environment, which my mean that several LANs in production are only reflected by one LAN in the test environment. The risk of adopting this approach must be addressed thoroughly, and should be approved be senior management.

Will release tests cover the full business cycle and use full business volumes?

To ensure that the Operability Principles have been satisfied, each release should, in principle, undergo a release test of a full business cycle (to show that Operations can run it) and full business volumes (to show that SLA targets can be achieved). These tests are, however, expensive in terms of dedicated hardware requirements, people, and elapsed time.

In practice, Release Planning will propose an approach dependent on the magnitude and sensitivity of change for each release. The approach must be approved by senior management. If service levels are not to be compromised, major releases must undergo a full release test.

Repositories (1344)

Repositories contain all the management data generated or used during the management process. This includes historical data, capacity data, performance data, problem knowledge bases, asset databases, solution sets, and management information bases (MIBs). The repositories component interacts with the management applications, integration platform, supporting infrastructure, and presentation components. Again it is important to make sure that the other components of the operational architecture are compatible with the database tools.

Production Control (1346)

Ensures that production activities are performed and controlled as required and as intended.

Backup/Restore Management

Backup and Restore Management considers all of the back-up and restorations that need to take place across the distributed system for master copies of data. Depending on the need, these processes may occur centrally or remotely.

Archiving

Archiving saves and stores information across the distributed environment, either centrally or in distributed locations. Archiving moves datasets, files, etc. from one device to another, usually lower speed, device based on a number of parameters. Archiving can be used to move information to or from distributed and centralized sites.

Integration Platform (1348)

The integration platform provides a common platform for the operational architecture. At the lowest level this means deciding on common standards, interfaces, massage formats, and file logging forms to be used with all the management tools. Third party integration platforms are also readily available. Some of the more well known platforms include IBM NetView, HP OpenView, Sun Solstice EM, SunNet Manager, Spectrum, CA-Unicenter, and Tivoli Management Environment. There are basically two types of third party platforms available. The first group are products like HP OpenView which are very modular. Each tool within the suite can be run separately, however, they all conform to a common framework which allows for greater compatibility and integration and better performance. The other group of products, including the Tivoli Management Environment, require the use of a separate integration platform component into which the management applications are connected. The integration platform and the management applications components of the MAP Operational Architecture Model are integrally related. Many third party vendors insist that they provide solutions which incorporate the event/data generation, event processing, repositories, and presentation components of the MAP operational architecture. It must be noted however that some of these total solution providers may sell a proprietary based solution, at best, and/or may include customized Application Programming Interfaces (API) or Software Development Kit capabilities in order to completely integrate your non-proprietary network. In Addition, some vendors also may not conform to the recent CORBA Open Standards Framework model.

Lastly, some environments use a home grown integration platform. The choice of integration platforms depends upon its ability to integrate with the execution and development environments.

Network Management

Network & Systems Management Planning is responsible for the planning activities involved in running the day-to-day operations and maintenance of the production systems (e.g., capacity planning, performance planning, etc.).

Supporting Infrastructure (1350)

The supporting infrastructure is the subset of operating systems, utilities, languages, and protocols used to support the management of the system. The supporting infrastructure is most often determined by the execution and development environments and the business applications on the system. It is necessary to ensure that the other components of the operational architecture are compatible with the existing supporting infrastructure. This limits the number of possible tool set solutions. Examples of operating systems include HP-UX, AIX, Solaris, SCO, Novell NOS, MVS, OpenVMS, NT and DOS. Examples of support utilities include PS, GREP, IBCOPY, TAR, CPIO and clock correlation. Examples can be broken down according to their function within the OSI model. Session protocols include SNMP, CMIP, FTP, and RPC. Transport protocols include TCP and UDP. Network protocols include IP and IPX. Data-Link protocols include Token Ring, Ethernet, X.25, ATM, SONET, and Frame Relay.

Production Control (1352)

Ensures that production activities are performed and controlled as required and as intended.

File Transfer & Control

File Transfer and Control initiates and monitors files being transferred throughout the system as part of the business processing (e.g., nightly batch runs). File transfers may occur between any two or more devises within the system.

Implementation Considerations

What platforms will be involved in the file transfers?

The platforms will be determined by both the business and the technical requirements. This will impact the selection of the file transfer tools, and, in particular, how the file transfers are controlled from platform to platform.

How many files will be transferred? With what frequency?

The number of files to be transferred as well as their frequency will impact the capacity required on the system (e.g., network bandwidth) as well as the production schedule. In addition, if the volume of data is significant, data compression may be required.

Will store and forward be supported?

Store and forward techniques can help reduce the contention for system resources during business hours. Store and forward can also reduce the amount of traffic in the system based upon the routing tables defined within the system. Instead of having one machine send the same file to multiple machines, for instance, a cascading forwarding mechanism can be used. This also improves the system performance as files are sent a minimal number of times to certain devices which then forward the files on to other devices.

What are some limitations that may be encountered?

File transfers in a distributed environment are not confined between hosts. File transfers can take place in a bi-directional fashion between hosts, servers and workstations. Due to the geographical disparity and number of devices in these environments, file transfers will increase the traffic over the network and will require careful scheduling to ensure that the necessary file transfers take place amidst the rest of the processing.

Managing Hardware (1354)

Managing hardware is all hardware directly used to manage the environment. This includes all staging components. These components are devoted to systems management functions. Examples of managing hardware include management servers, management controllers, management consoles, probes, and sniffers. One significant component in the hardware monitoring arena is Firewall access control policy management. Firewalls are regularly used for network based security management. It is typically a system or group of systems that enforce access control between two or more networks and/or perform network data packet filtering. Usually packet filtering router hardware and application gateways are used to block unauthorized IP packets and enforce proxy defined user commands.

Failure Control (1356)

Involves the detection and correction of faults within the system whether they be minor (e.g., workstation is down) or major (i.e., a disaster) has occurred.

Disaster Recovery

In the event of a significant system failure, Disaster Recovery processes will be invoked to re-route the system resources to a secondary, stable configuration until the primary resources can be restored. Within a distributed environment, disaster recovery must account for differing levels of disaster whether at a central or distributed site(s).

Fault Management

When a negative event has been brought to the attention of the system, actions are undertaken within Fault Management to define, diagnose, and correct the fault. Although it may be possible to automate this process, human intervention may be required to perform at least some of these management tasks.

Implementation Considerations

What are some limitations that may be encountered?

In order to correct faults in a distributed environment, remote fault diagnosis and correction tools may also be required. It may not be possible to count on having technical expertise on-sites, forcing fault management to be handled from a centralized area. Products which perform these functions at present, however, provide somewhat limited capabilities in this arena.

Recovery

Recovery manages all of the actions needed to restore service delivery after a system failure. With critical business applications being rolled out on distributed technologies, the recovery of these systems must be easy, quick and efficient to guarantee availability of core business systems as expressed in the agreed service levels and operational levels.

Hardware Maintenance

Hardware Maintenance maintains all of the components within a distributed system to protect the investment of the organization. Generally agreed upon in the SLAs, maintenance contracts are carried out, monitored and recorded for each asset as appropriate.

Implementation Considerations

What will the Hardware Maintenance targets be?

Different hardware components will likely have different maintenance targets. These targets should be defined based upon information provided by the vendor as well as information provided from other client engagements.

Where will Hardware Maintenance be required?

Hardware Maintenance may be required at both the central and remote locations. Careful consideration must be given as to how the hardware at remote locations will be maintained (e.g., by a local expert, third-party vendor, etc.)

Monitoring (1358)

Verifies that the system is continually functioning in accordance with whatever service levels are defined.

Event Management

An event is an electronic message generated by any component (e.g., application software, system software, hardware, etc.) in the system. Event Management receives, logs, classifies and presents event messages on a console(s) based on pre-established filters or thresholds.

Implementation Considerations

What type of events will be monitored? More specifically, what services need to be monitored across which devices (e.g., servers, workstations, routers, hubs, bridges)?

The scope of events to be monitored will have a major impact on the approach taken for Event management and the tools selected.

Where will devices reside on the network, and how frequently will they be polled?

The number of devices, their respective locations and polling requirements will significantly contribute to network bandwidth usage.

Where can event filtering be applied?

In order to reduce bandwidth, it is preferable that event filtering be performed locally to avoid sending all event information across the network, utilizing bandwidth and central processing capability unnecessarily.

What management protocols need to be supported?

The protocol requirements will impact the selection of the tool. For more information on management protocols, refer to the management protocols using SNMP and CMIP as examples.

What are some of the limitations that may be encountered?

The number of events generated in the system will increase due to the complexity of the system. Devices will generate events as well as applications, the technical infrastructure, etc. Common event handling mechanisms will be required to provide management information in a simple, consistent format and to forward important events on for management purposes. In addition, filtering capabilities may also be needed at remote locations to prevent the streaming of events to central/master management consoles.

Performance Management

Performance Management ensures that the required resources are available at all times throughout the distributed system to meet the agreed upon SLAs. This includes monitoring and management of end-to-end performance based on utilization, capacity, and overall performance statistics. If necessary, Performance Management can make adjustments to the production environment to either enhance performance or rectify degraded performance.

Physical Site Management

Physical Site Management monitors the central and distributed sites environmental and regulatory levels. Physical Site Management ensures that adequate power, cooling facilities, fire suppression, etc. are provided and maintained to prevent system outages. When necessary, corrective actions are issued and monitored according to pre-defined environmental control plans.

Implementation Considerations

What are some of the limitations that may encountered?

Important to ensure that adequate power, cooling facilities, fire suppression, etc. are provided and maintained to prevent system outages from external environmental factors. With increased computing power at multiple sites, these tasks may not be simple.

Physical Environment (1360)

The physical environment includes all the support indirectly involved in maintaining and managing the distributed environment. Initially it was thought client/server technology would make data centers obsolete. However, with the migration of mission critical processes to client/server environments, many servers are being maintained in data centers in an effort to increase reliability. As a result, the importance of managing the physical environment has increased. Partially because it was initially believed not to be very important and because it does not relate directly to the information systems, the physical environment of the operational architecture is often overlooked. These systems include UPS, raised floor, power, site survey and preparation, wiring/cabling, climate control, etc.

Related MODE functions The breakdown the MODE functions by operational architecture layer is meant to provide a guideline. The MODE functions mentioned within each component are applicable to that component though the function may not be included in that component. For example, Physical Site Management relates to the physical environment in that the physical environment contains the hardware managed through Physical Site Management. Physical Site Management tools do not necessarily reside in the physical environment layer. Some MODE functions do not require the use of a tool, while other MODE functions have tool solutions that work in different ways. For this reason some functions were included in multiple layers while other functions were omitted.

Implementing (1362)

Executes change within the distributed environment with tested components and techniques according to the appropriate plan(s). Implementing includes such things as: initial installation, software & data distribution, license management, etc.

Initial Installation

Initial Installation prepares the physical location for the rollout of a new site or service, pre-assembles the equipment (hardware and software) based on developed specifications, installs the equipment and tests that the equipment is fully functional prior to allowing the users to utilize the system in a production environment.

Implementation Considerations

Some guiding principles:

Precise build procedures must be delivered early enough to drive Release Testing, Procurement, and rollout plans. It must be clear exactly what the install process will cover. Who will perform which tasks when and where? Software and Data must be available in time to create copies for the hangar. This means development teams need to ensure availability of software up to a number of weeks before going live.

To what extent will configuration be performed centrally prior to installation?

Some of the configuration tasks can be performed in a central hangar. Assembly of the machines may include configuration and software installation. Only minor tasks, such as setting networking addresses have to be performed after the equipment has been delivered to the remote site.

Product Considerations

What is the intended use of the tool?

Prepare physical locations and devices (both HW and SW) for new rollout based on developed specifications and perform installation and functional testing of new devices prior to release to the users.

What other utilities are available with the tool?

Initial Installation must be able to load rapidly, reliably and consistently a large number of devices with a standard configuration. Automatic update of asset data accordingly, asset inventory must reflect the actual state of the devices; their set up and their networking address.

How well does the tool integrate with other tools in the environment?

During Initial Installation, software and data is loaded at the machines. The Software & Data Distribution function may be used to ship software and data to the location where it is to be installed (e.g. remote sites).

Procurement

Procurement is responsible for ensuring that the necessary quantities of equipment (both hardware and software) are purchased and delivered on-time to the appropriate locations. Procurement is also responsible for logging all assets into the inventory as they are received.

Implementation Considerations

Will equipment be resourced from multiple or single suppliers?

It is likely that organization will have close and long-term relationships to certain suppliers. In many cases, suppliers will offer discounts to their most loyal customers. These partnerships are advantageous for both sides, as long as they do not lead to supplier lock-in, i.e. the organization becomes technically dependent on one supplier. Technical portability and interoperability help support independence.

What will be the payment policy (immediate or delayed)?

A management decision is required, which compares cash flow benefits through payment as late as possible against discounts for early payment. This will usually be an extension of an existing policy.

Monitoring (1364)

Verifies that the system is continually functioning in accordance with whatever service levels are defined.

Physical Site Management

Physical Site Management monitors the central and distributed sites environmental and regulatory levels. Physical Site Management ensures that adequate power, cooling facilities, fire suppression, etc. are provided and maintained to prevent system outages. When necessary, corrective actions are issued and monitored according to pre-defined environmental control plans.

Web Architecture Framework

The foregoing development and operation architecture framework of FIGS. 2–13 may thus be employed in the generation of an Internet architecture framework like the one shown in FIG. 14 to support various features such as an electronic commerce component 1400, a content channels component 1402, an administrative component 1404, a customer relationship management component 1406, a content management and publishing services component 1408, an education related services component 1410, or a web customer service component 1412.

The present invention provides a new kind of web architecture framework (called "WAF" in this document) that secures, administers, and audits electronic information use. WAF also features fundamentally important capabilities for managing content that travels "across" the "information highway." These capabilities comprise a rights protection solution that serves all electronic community members. These members include content creators and distributors, financial service providers, end-users, and others. WAF is the first general purpose, configurable, transaction control/rights protection solution for users of computers, other electronic appliances, networks, and the information highway.

The Internet is a method of interconnecting physical networks and a set of conventions for using networks that allow the computers they reach to interact. Physically, the Internet is a huge, global network spanning over 92 countries and comprising 59,000 academic, commercial, government, and military networks, according to the Government Accounting Office (GAO), with these numbers expected to double each year. Furthermore, there are about 10 million host computers, 50 million users, and 76,000 World-Wide Web servers connected to the Internet. The backbone of the Internet consists of a series of high-speed communication links between major supercomputer sites and educational and research institutions within the U.S. and throughout the world.

Protocols govern the behavior along the Internet backbone and thus set down the key rules for data communication. Transmission Control Protocol/Internet Protocol (TCP/IP) has an open nature and is available to everyone, meaning that it attempts to create a network protocol system that is independent of computer or network operating system and architectural differences. As such, TCP/IP protocols are publicly available in standards documents, particularly in Requests for Comments (RFCs). A requirement for Internet connection is TCP/IP, which consists of a large set of data communications protocols, two of which are the Transmission Control Protocol and the Internet Protocol.

The International Telecommunication Union-Telecommunication Standardization Sector ("ITU-T") has established numerous standards governing protocols and line encoding for telecommunication devices. Because many of these standards are referenced throughout this document, summaries of the relevant standards are listed below for reference.

ITU G.711 Recommendation for Pulse Code Modulation of 3 kHz Audio Channels.

ITU G.722 Recommendation for 7 kHz Audio Coding within a 64 kbit/s channel.

ITU G.723 Recommendation for dual rate speech coder for multimedia communication transmitting at 5.3 and 6.3 kbits.

ITU G.728 Recommendation for coding of speech at 16 kbit/s using low-delay code excited linear prediction (LD-CELP)

ITU H.221 Frame Structure for a 64 to 1920 kbit/s Channel in Audiovisual Teleservices ITU H.223 Multiplexing Protocols for Low Bitrate Multimedia Terminals ITU H.225 ITU Recommendation for Media Stream Packetization and Synchronization on non-guaranteed quality of service LANs.

ITU H.230 Frame-synchronous Control and Indication Signals for Audiovisual Systems ITU H.231 Multipoint Control Unit for Audiovisual Systems Using Digital Channels up to 2 Mbit/s ITU H.242 System for Establishing Communication Between Audiovisual Terminals Using Digital Channels up to 2 Mbits ITU H.243 System for Establishing Communication Between Three or More Audiovisual Terminals Using Digital Channels up to 2 Mbit/s ITU H.245 Recommendation for a control protocol for multimedia communication ITU H.261 Recommendation for Video Coder-Decoder for audiovisual services supporting video resolutions of 352×288 pixels and 176×144 pixels.

ITU H.263 Recommendation for Video Coder-Decoder for audiovisual services supporting video resolutions of 128×96 pixels, 176×144 pixels, 352×288 pixels, 704×576 pixels and 1408×1152 pixels.

ITU H.320 Recommendation for Narrow Band ISDN visual telephone systems.

ITU H.321 Visual. Telephone Terminals over ATM

ITU H.322 Visual Telephone Terminals over Guaranteed Quality of Service LANs

ITU H.323 ITU Recommendation for Visual Telephone Systems and Equipment for Local Area Networks which provide a non-guaranteed quality of service.

ITU H.324 Recommendation for Terminals and Systems for low bitrate (28.8 Kbps) multimedia communication on dial-up telephone lines.

ITU T.120 Transmission Protocols for Multimedia Data.

In addition, several other relevant standards exist including:

ISDN Integrated Services Digital Network, the digital communication standard for transmission of voice, video and data on a single communications link.

RTP Real-Time Transport Protocol, an Internet Standard Protocol for transmission of real-time data like voice and video over unicast and multicast networks.

IP Internet Protocol, an Internet Standard Protocol for transmission and delivery of data packets on a packet switched network of interconnected computer systems.

PPP Point-to-Point Protocol

MPEG Motion Pictures Expert Group, a standards body under the International Standards Organization(ISO), Recommendations for compression of digital Video and Audio including the bit stream but not the compression algorithms.

SLIP Serial Line Internet Protocol

RSVP Resource Reservation Setup Protocol

UDP User Datagram Protocol

The popularity of the TCP/IP protocols on the Internet grew rapidly because they met an important need for worldwide data communication and had several important characteristics that allowed them to meet this need. These characteristics, still in use today, include:

1) A common addressing scheme that allows any device running TCP/IP to uniquely address any other device on the Internet.

2) Open protocol standards, freely available and developed independently of any hardware or operating system. Thus, TCP/IP is capable of being used with different hardware and software, even if Internet communication is not required.

Independence from any specific physical network hardware, allows TCP/IP to integrate many different kinds of networks. TCP/IP can be used over an Ethernet, a token ring, a dial-up line, or virtually any other kinds of physical transmission media.

An understanding of how information travels in communication systems is required to appreciate the recent steps taken by key players in today's Internet backbone business. The traditional type of communication network is circuit switched. The U.S. telephone system uses such circuit switching techniques. When a person or a computer makes a telephone call, the switching equipment within the telephone system seeks out a physical path from the originating telephone to the receiver's telephone. A circuit-switched network attempts to form a dedicated connection, or circuit, between these two points by first establishing a circuit from the originating phone through the local switching office, then across trunk lines, to a remote switching office, and finally to the destination telephone. This dedicated connection exists until the call terminates.

The establishment of a completed path is a prerequisite to the transmission of data for circuit switched networks. After the circuit is in place, the microphone captures analog signals, and the signals are transmitted to the Local Exchange Carrier (LEC) Central Office (CO) in analog form over an analog loop. The analog signal is not converted to digital form until it reaches the LEC Co, and even then only if the equipment is modern enough to support digital information. In an ISDN embodiment, however, the analog signals are converted to digital at the device and transmitted to the LEC as digital information.

Upon connection, the circuit guarantees that the samples can be delivered and reproduced by maintaining a data path of 64 Kbps (thousand bits per second). This rate is not the rate required to send digitized voice per se. Rather, 64 Kbps is the rate required to send voice digitized with the Pulse Code Modulated (PCM) technique. Many other methods for digitizing voice exist, including ADPCM (32 Kbps), GSM (13 Kbps), TrueSpeech 8.5 (8.5 Kbps), G.723 (6.4 Kbps or 5.3 Kbps) and Voxware RT29HQ (2.9 Kbps). Furthermore, the 64 Kbps path is maintained from LEC Central Office (CO) Switch to LEC CO, but not from end to end. The analog local loop transmits an analog signal, not 64 Kbps digitized audio. One of these analog local loops typically exists as the "last mile" of each of the telephone network circuits to attach the local telephone of the calling party.

This guarantee of capacity is the strength of circuit-switched networks. However, circuit switching has two significant drawbacks. First, the setup time can be considerable, because the call signal request may find the lines busy with other calls; in this event, there is no way to gain connection until some other connection terminates. Second, utilization can be low while costs are high. In other words, the calling party is charged for the duration of the call and for all of the time even if no data transmission takes place (i.e. no one speaks). Utilization can be low because the time between transmission of signals is unable to be used by any other calls, due to the dedication of the line. Any such unused bandwidth during the connection is wasted.

Additionally, the entire circuit switching infrastructure is built around 64 Kbps circuits. The infrastructure assumes the use of PCM encoding techniques for voice. However, very high quality codecs are available that can encode voice using less than one-tenth of the bandwidth of PCM. However, the circuit switched network blindly allocates 64 Kbps of bandwidth for a call, end-to-end, even if only one-tenth of the bandwidth is utilized. Furthermore, each circuit generally only connects two parties. Without the assistance of conference bridging equipment, an entire circuit to a phone is occupied in connecting one party to another party. Circuit switching has no multicast or multipoint communication capabilities, except when used in combination with conference bridging equipment.

Other reasons for long call setup time include the different signaling networks involved in call setup and the sheer distance causing propagation delay. Analog signaling from an end station to a CO on a low bandwidth link can also delay call setup. Also, the call setup data travels great distances on signaling networks that are not always transmitting data at the speed of light. When the calls are international, the variations in signaling networks grows, the equipment handling call setup is usually not as fast as modem setup and the distances are even greater, so call setup slows down even more. Further, in general, connection-oriented virtual or physical circuit setup, such as circuit switching, requires more time at connection setup time than comparable connectionless techniques due to the end-to-end handshaking required between the conversing parties.

Message switching is another switching strategy that has been considered. With this form of switching, no physical path is established in advance between the sender and receiver; instead, whenever the sender has a block of data to be sent, it is stored at the first switching office and retransmitted to the next switching point after error inspection. Message switching places no limit on block size, thus requiring that switching stations must have disks to buffer long blocks of data; also, a single block may tie up a line for many minutes, rendering message switching useless for interactive traffic.

Packet switched networks, which predominate the computer network industry, divide data into small pieces called packets that are multiplexed onto high capacity intermachine connections. A packet is a block of data with a strict upper limit on block size that carries with it sufficient identification necessary for delivery to its destination. Such packets usually contain several hundred bytes of data and occupy a given transmission line for only a few tens of milliseconds. Delivery of a larger file via packet switching requires that it be broken into many small packets and sent one at a time from one machine to the other. The network hardware delivers these packets to the specified destination, where the software reassembles them into a single file.

Packet switching is used by virtually all computer interconnections because of its efficiency in data transmissions. Packet switched networks use bandwidth on a circuit as needed, allowing other transmissions to pass through the lines in the interim. Furthermore, throughput is increased by the fact that a router or switching office can quickly forward to the next stop any given packet, or portion of a large file, that it receives, long before the other packets of the file have arrived. In message switching, the intermediate router would have to wait until the entire block was delivered before forwarding. Today, message switching is no longer used in computer networks because of the superiority of packet switching.

To better understand the Internet, a comparison to the telephone system is helpful. The public switched telephone network was designed with the goal of transmitting human voice, in a more or less recognizable form. Their suitability has been improved for computer-to-computer communications but remains far from optimal. A cable running between two computers can transfer data at speeds in the hundreds of megabits, and even gigabits per second. A poor error rate at these speeds would be only one error per day. In contrast, a dial-up line, using standard telephone lines, has a maximum data rate in the thousands of bits per second, and a much higher error rate. In fact, the combined bit rate times error rate performance of a local cable could be 11 orders of magnitude better than a voice-grade telephone line. New technology, however, has been improving the performance of these lines.

The Internet is composed of a great number of individual networks, together forming a global connection of thousands of computer systems. After understanding that machines are connected to the individual networks, we can investigate how the networks are connected together to form an internetwork, or an internet. At this point, internet gateways and internet routers come into play.

In terms of architecture, two given networks are connected by a computer that attaches to both of them. Internet gateways and routers provide those links necessary to send packets between networks and thus make connections possible. Without these links, data communication through the Internet would not be possible, as the information either would not reach its destination or would be incomprehensible upon arrival. A gateway may be thought of as an entrance to a communications network that performs code and protocol conversion between two otherwise incompatible networks. For instance, gateways transfer electronic mail and data files between networks over the internet.

IP Routers are also computers that connect networks and is a newer term preferred by vendors. These routers must make decisions as to how to send the data packets it receives to its destination through the use of continually updated routing tables. By analyzing the destination network address of the packets, routers make these decisions. Importantly, a router does not generally need to decide which host or end user will receive a packet; instead, a router seeks only the destination network and thus keeps track of information sufficient to get to the appropriate network, not necessarily the appropriate end user. Therefore, routers do not need to be huge supercomputing systems and are often just machines with small main memories and little disk storage. The distinction between gateways and routers is slight, and current usage blurs the line to the extent that the two terms are often used interchangeably. In current terminology, a gateway moves data between different protocols and a router moves data between different networks. So a system that moves mail between TCP/IP and OSI is a gateway, but a traditional IP gateway (that connects different networks) is a router.

Now, it is useful to take a simplified look at routing in traditional telephone systems. The telephone system is organized as a highly redundant, multilevel hierarchy. Each telephone has two copper wires coming out of it that go directly to the telephone company's nearest end office, also called a local central office. The distance is typically less than 10 km; in the U.S. alone, there are approximately 20,000 end offices. The concatenation of the area code and the first three digits of the telephone number uniquely specify an end office and help dictate the rate and billing structure.

The two-wire connections between each subscriber's telephone and the end office are called local loops. If a subscriber attached to a given end office calls another subscriber attached to the same end office, the switching mechanism within the office sets up a direct electrical connection between the two local loops. This connection remains intact for the duration of the call, due to the circuit switching techniques discussed earlier.

If the subscriber attached to a given end office calls a user attached to a different end office, more work has to be done in the routing of the call. First, each end office has a number of outgoing lines to one or more nearby switching centers, called toll offices. These lines are called toll connecting trunks. If both the caller's and the receiver's end offices happen to have a toll connecting trunk to the same toll office, the connection may be established within the toll office. If the caller and the recipient of the call do not share a toll office, then the path will have to be established somewhere higher up in the hierarchy. There are sectional and regional offices that form a network by which the toll offices are connected. The toll, sectional, and regional exchanges communicate with each other via high bandwidth inter-toll trunks. The number of different kinds of switching centers and their specific topology varies from country to country, depending on its telephone density.

Using Network Level Communication for Smooth User Connection In addition to the data transfer functionality of the Internet, TCP/IP also seeks to convince users that the Internet is a solitary, virtual network. TCP/IP accomplishes this by providing a universal interconnection among machines, independent of the specific networks to which hosts and end users attach. Besides router interconnection of physical networks, software is required on each host to allow application programs to use the Internet as if it were a single, real physical network.

The basis of Internet service is an underlying, connectionless packet delivery system run by routers, with the basic unit of transfer being the packet. In internets running TCP/IP, such as the Internet backbone, these packets are called datagrams. This section will briefly discuss how these datagrams are routed through the Internet.

In packet switching systems, routing is the process of choosing a path over which to send packets. As mentioned before, routers are the computers that make such choices. For the routing of information from one host within a network to another host on the same network, the datagrams that are sent do not actually reach the Internet backbone. This is an example of internal routing, which is completely self-contained within the network. The machines outside of the network do not participate in these internal routing decisions.

At this stage, a distinction should be made between direct delivery and indirect delivery. Direct delivery is the transmission of a datagram from one machine across a single physical network to another machine on the same physical network. Such deliveries do not involve routers. Instead, the sender encapsulates the datagram in a physical frame, addresses it, and then sends the frame directly to the destination machine.

Indirect delivery is necessary when more than one physical network is involved, in particular when a machine on one network wishes to communicate with a machine on another network. This type of communication is what we think of when we speak of routing information across the Internet backbone. In indirect delivery, routers are required. To send a datagram, the sender must identify a router to which the datagram can be sent, and the router then forwards the datagram towards the destination network. Recall that routers generally do not keep track of the individual host addresses (of which there are millions), but rather just keeps track of physical networks (of which there are thousands). Essentially, routers in the Internet form a cooperative, interconnected structure, and datagrams pass from router to router across the backbone until they reach a router that can deliver the datagram directly.

The changing face of he internet world causes a steady inflow of new systems and technology. The following three developments, each likely to become more prevalent in the near future, serve as an introduction to the technological arena.

Asynchronous Transfer Mode (ATM) is a networking technology using a high-speed, connection-oriented system for both local area and wide area networks. ATM networks require modern hardware including:

1) High speed switches that can operate at gigabit (trillion bit) per second speeds to handle the traffic from many computers.
2) Optical fibers (versus copper wires) that provide high data transfer rates, with host-to-ATM switch connections running at 100 or 155 Mbps (million bits per second).
3) Fixed size cells, each of which includes 53 bytes.

ATM incorporates features of both packet switching and circuit switching, as it is designed to carry voice, video, and television signals in addition to data. Pure packet switching technology is not conducive to carrying voice transmissions because such transfers demand more table bandwidth.

Frame relay systems us packet switching techniques, but are more efficient than traditional systems. This efficiency is partly due to the fact that they perform less error checking than traditional X.25 packet-switching services. In fact, many intermediate nodes do little or no error checking at all and only deal with routing, leaving the error checking to the higher layers of the system. With the greater reliability of today's transmissions, much of the error checking previously performed has become unnecessary. Thus, frame relay offers increased performance compared to traditional systems.

An Integrated Services Digital Network is an "international telecommunications standard for transmitting voice, video, and data over digital lines," most commonly running at 64 kilobits per second. The traditional phone network runs voice at only 4 kilobits per second. To adopt ISDN, an end user or company must upgrade to ISDN terminal equipment, central office hardware, and central office software. The ostensible goals of ISDN include the following:

1) To provide an internationally accepted standard for voice, data and signaling;
2) To make all transmission circuits end-to-end digital;
3) To adopt a standard out-of-band signaling system; and
4) To bring significantly more bandwidth to the desktop.

An ISP is composed of several disparate systems. As ISP integration proceeds, formerly independent systems now become part of one larger whole with concomitant increases in the level of analysis, testing, scheduling, and training in all disciplines of the ISP.

ATM (asynchronous transfer mode) pushes network control to the periphery of the network, obviating the trunk and switching models of traditional, circuit-based telephony. It is expected to be deployed widely to accommodate these high bandwidth services.

WAF supports a general purpose foundation for secure transaction management, including usage control auditing, reporting, and/or payment. This general purpose foundation is called "WAF Functions" ("WAFFs"). WAF also supports a collection of "atomic" application elements (e.g., load modules) that can be selectively aggregated together to form various WAFF capabilities called control methods and which serve as WAFF applications and operating system functions. When a host operating environment of an electronic appliance includes WAFF capabilities, it is called a "Rights Operating System" (ROS). WAFF load modules, associated data, and methods form a body of information that for the purposes of the present invention are called "control information." WAFF control information may be specifically associated with one or more pieces of electronic content and/or it may be employed as a general component of the operating system capabilities of a WAF installation.

WAFF transaction control elements reflect and enact content specific and/or more generalized administrative (for example, general operating system) control information. WAFF capabilities capabilities which can generally take the form of applications (application models) that have more or less configurability which can be shaped by WAF participants, through the use, for example, of WAF templates, to employ specific capabilities, along, for example, with capability parameter data to reflect the elements of one or more express electronic agreements between WAF participants in regards to the use of electronic content such as commercially distributed products. These control capabilities manage the use of, and/or auditing of use of, electronic content, as well as reporting information based upon content use, and any payment for said use. WAFF capabilities may "evolve" to reflect the requirements of one or more successive parties who receive or otherwise contribute to a given set of control information. Frequently, for a WAF application for a given content model (such as distribution of entertainment on CD-ROM, content delivery from an Internet repository, or electronic catalog shopping and advertising, or some combination of the above) participants would be able to securely select from amongst available, alternative control methods and apply related parameter data, wherein such selection of control method and/or submission of data would constitute their "contribution" of control information. Alternatively, or in addition, certain control methods that have been expressly certified as securely interoperable and compatible with said application may be independently submitted by a participant as part of such a contribution. In the most general example, a generally certified load module (certified for a given WAF arrangement and/or content class) may be used with many or any WAF application that operates in nodes of said arrangement. These parties, to the extent they are allowed, can independently and securely add, delete, and/or otherwise modify the specification of load modules and methods, as well as add, delete or otherwise modify related information.

Normally the party who creates a WAF content container defines the general nature of the WAFF capabilities that will and/or may apply to certain electronic information. A WAF content container is an object that contains both content (for example, commercially distributed electronic information products such as computer software programs, movies, electronic publications or reference materials, etc.) and certain control information related to the use of the object's content. A creating party may make a WAF container available to other parties. Control information delivered by, and/or otherwise available for use with, WAF content containers comprise (for commercial content distribution purposes) WAFF control capabilities (and any associated parameter data) for electronic content. These capabilities may constitute one or more "proposed" electronic agreements (and/or agreement functions available for selection and/or use with parameter data) that manage the use and/or the consequences of use of such content and which can enact the terms and conditions of agreements involving multiple parties and their various rights and obligations.

A WAF electronic agreement may be explicit, through a user interface acceptance by one or more parties, for example by a "junior" party who has received control information from a "senior" party, or it may be a process amongst equal parties who individually assert their agreement. Agreement may also result from an automated electronic process during which terms and conditions are "evaluated" by certain WAF participant control information that assesses whether certain other electronic terms and conditions attached to content and/or submitted by another party are acceptable (do not violate acceptable control information criteria). Such an evaluation process may be quite simple, for example a comparison to ensure compatibility between a portion of, or all senior, control terms and conditions in a table of terms and conditions and the submitted control information of a subsequent participant in a pathway of content control information handling, or it may be a more elaborate process that evaluates the potential outcome of, and/or implements a negotiation process between, two or more sets of control information submitted by two or more parties. WAF also accommodates a semi-automated process during which one or more WAF participants directly, through user interface means, resolve "disagreements" between control information sets by accepting and/or proposing certain control information that may be acceptable to control information representing one or more other parties interests and/or responds to certain user interface queries for selection of certain alternative choices and/or for certain parameter information, the responses being adopted if acceptable to applicable senior control information.

When another party (other than the first applier of rules), perhaps through a negotiation process, accepts, and/or adds to and/or otherwise modifies, "in place" content control information, a WAF agreement between two or more parties related to the use of such electronic content may be created (so long as any modifications are consistent with senior control information). Acceptance of terms and conditions related to certain electronic content may be direct and express, or it may be implicit as a result of use of content (depending, for example, on legal requirements, previous exposure to such terms and conditions, and requirements of in place control information).

WAFF capabilities may be employed, and a WAF agreement may be entered into, by a plurality of parties without the WAFF capabilities being directly associated with the controlling of certain, specific electronic information. For example, certain one or more WAFF capabilities may be present at a WAF installation, and certain WAF agreements may have been entered into during the registration process for a content distribution application, to be used by such installation for securely controlling WAF content usage, auditing, reporting and/or payment. Similarly, a specific WAF participant may enter into a WAF user agreement with a WAF content or electronic appliance provider when the user and/or her appliance register with such provider as a WAF installation and/or user. In such events, WAFF in place control information available to the user WAF installation may require that certain WAFF methods are employed, for example in a certain sequence, in order to be able to use all and/or certain classes, of electronic content and/or WAF applications.

WAF ensures that certain prerequisites necessary for a given transaction to occur are met. This includes the secure execution of any required load modules and the availability of any required, associated data. For example, required load modules and data (e.g. in the form of a method) might specify that sufficient credit from an authorized source must be confirmed as available. It might further require certain one or more load modules execute as processes at an appropriate time to ensure that such credit will be used in order to pay for user use of the content. A certain content provider might, for example, require metering the number of copies made for distribution to employees of a given software program (a portion of the program might be maintained in encrypted form and require the presence of a WAF installation to run). This would require the execution of a metering method for copying of the property each time a copy was made for another employee. This same provider might also charge fees based on the total number of different properties licensed from them by the user and a metering history of their licensing of properties might be required to maintain this information.

Commerce-Related Web Application Services

Figure 15:
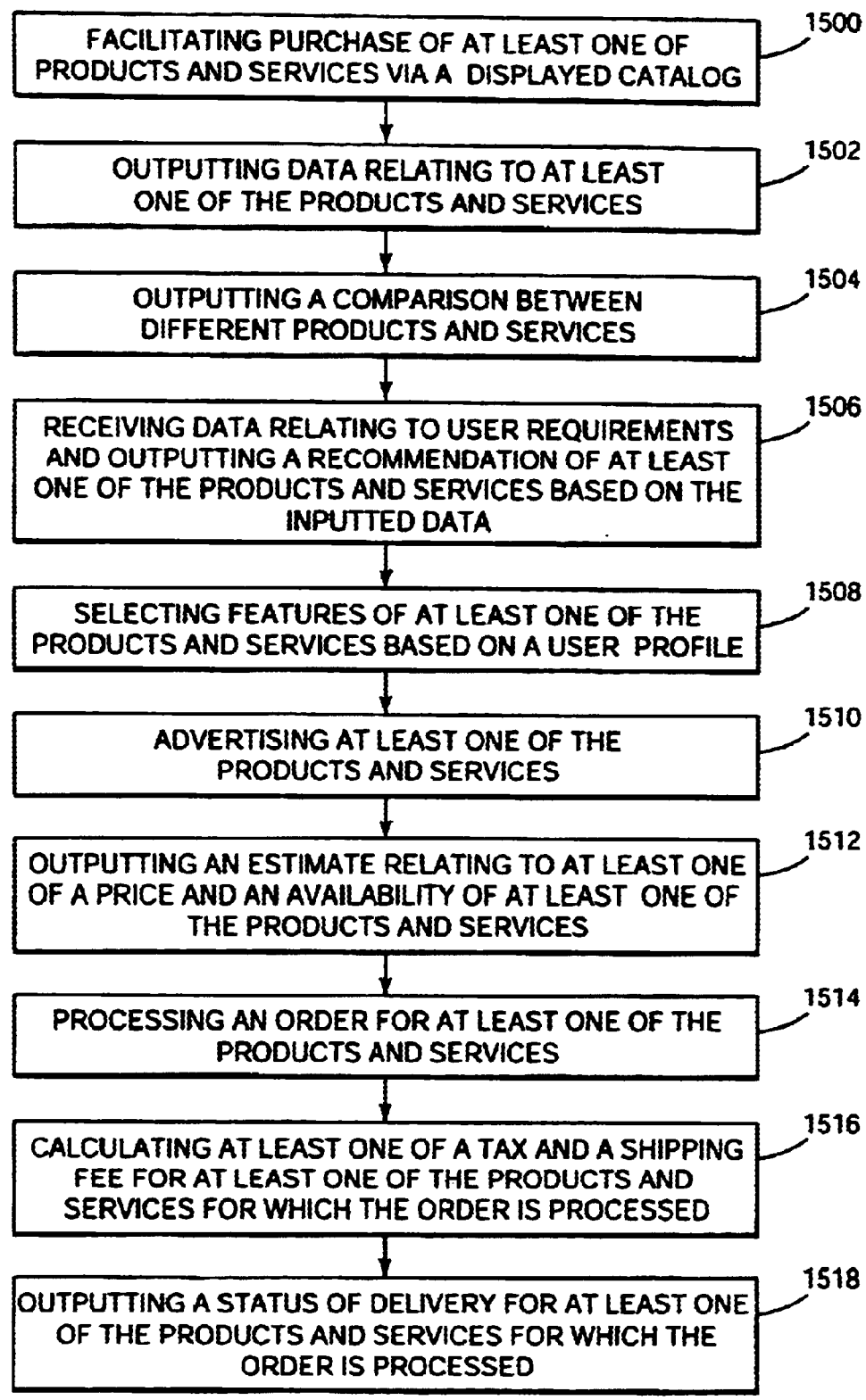
FIG. 15 is a flowchart illustrating the commerce-related web application services in accordance with one embodiment of the present invention.

One embodiment of the present invention, as shown in FIG. 15, is provided for affording a combination of commerce-related web application services. Various features are included such as allowing purchase of products and services via a displayed catalog in operation 1500. As an option, a virtual shopping cart environment may be provided. Further, in operations 1502 and 1504, data, i.e. specifications, details, etc., relating to the products and services are displayed along with a comparison between different products and services. Data relating to needs of a user may also be received for the purpose of outputting a recommendation of the products and services based on the inputted needs. See operation 1506. Optionally, features of the products and services may be selected in operation 1508 based on user profile in order to configure a specifically tailored product or service. Alternatively, features of the products and services may be listed in order to allow the user to configure a specifically tailored product or service. Operation 1510 allows one or more of the products or services to be advertised. Yet another aspect of the present invention includes outputting an estimate relating to a price and/or availability of the products and services. Note operation 1512. Further, in operations 1514 and 1516, an order for the products and services may be received and processed, after which a tax and a shipping fee are calculated. A status of delivery for one or more of the ordered products and services may be provided in operation 1518.

Optionally, the displayed catalog may be customized based upon the user profile. Further, the data relating to at least one of the products and services may include a link to related data. The comparison between different products and services could include a comparison to a competitor's product. Alternatively, the comparison between different products and services could include identification of at least one advantage of the at least one of products and services. Optionally, the recommendation of at least one of the products and services includes a financial analysis of at least one of the products and services. The features of at least one of the products and services may be generated by a product configuration. The advertising could include customized advertising based upon the user profile. The step of calculating at least one of the tax and the shipping fee may further include calculating a plurality of taxes and shipping fees applicable to international transactions. These and other options will be discussed in more detail below.

Through use of WAF's control system, traditional content providers and users can create electronic relationships that reflect traditional, non-electronic relationships. They can shape and modify commercial relationships to accommodate the evolving needs of, and agreements among, themselves. WAF does not require electronic content providers and users to modify their business practices and personal preferences to conform to a metering and control application program that supports limited, largely fixed functionality. Furthermore, WAF permits participants to develop business models not feasible with non-electronic commerce, for example, involving detailed reporting of content usage information, large numbers of distinct transactions at hitherto infeasibly low price points, "pass-along" control information that is enforced without involvement or advance knowledge of the participants, etc.

The present invention allows content providers and users to formulate their transaction environment to accommodate:

(1) desired content models, content control models, and content usage information pathways, (2) a complete range of electronic media and distribution means, (3) a broad range of pricing, payment, and auditing strategies, (4) very flexible privacy and/or reporting models, (5) practical and effective security architectures, and (6) other administrative procedures that together with steps (1) through (5) can enable most "real world" electronic commerce and data security models, including models unique to the electronic world.

WAF's transaction management capabilities can enforce:

(1) privacy rights of users related to information regarding their usage of electronic information and/or appliances, (2) societal policy such as laws that protect rights of content users or require the collection of taxes derived from electronic transaction revenue, and (3) the proprietary and/or other rights of parties related to ownership of, distribution of, and/or other commercial rights related to, electronic information.

WAF can support "real" commerce in an electronic form, that is the progressive creation of commercial relationships that form, over time, a network of interrelated agreements representing a value chain business model. This is achieved in part by enabling content control information to develop through the interaction of (negotiation between) securely created and independently submitted sets of content and/or appliance control information. Different sets of content and/or appliance control information can be submitted by different parties in an electronic business value chain enabled by the present invention. These parties create control information sets through the use of their respective WAF installations. Independently, securely deliverable, component based control information allows efficient interaction among control information sets supplied by different parties.

WAF permits multiple, separate electronic arrangements to be formed between subsets of parties in a WAF supported electronic value chain model. These multiple agreements together comprise a WAF value chain "extended" agreement. WAF allows such constituent electronic agreements, and therefore overall WAF extended agreements, to evolve and reshape over time as additional WAF participants become involved in WAF content and/or appliance control information handling. WAF electronic agreements may also be extended as new control information is submitted by existing participants. With WAF, electronic commerce participants are free to structure and restructure their electronic commerce business activities and relationships. As a result, the present invention allows a competitive electronic commerce marketplace to develop since the use of WAF enables different, widely varying business models using the same or shared content.

A significant facet of the present invention's ability to broadly support electronic commerce is its ability to securely manage independently delivered WAF component objects containing control information (normally in the form of WAF objects containing one or more methods, data, or load module WAF components). This independently delivered control information can be integrated with senior and other pre-existing content control information to securely form derived control information using the negotiation mechanisms of the present invention. All requirements specified by this derived control information must be satisfied before WAF controlled content can be accessed or otherwise used. This means that, for example, all load modules and any mediating data which are listed by the derived control information as required must be available and securely perform their required function. In combination with other aspects of the present invention, securely, independently delivered control components allow electronic commerce participants to freely stipulate their business requirements and trade offs. As a result, much as with traditional, non-electronic commerce, the present invention allows electronic commerce (through a progressive stipulation of various control requirements by WAF participants) to evolve into forms of business that are the most efficient, competitive and useful.

WAF provides capabilities that rationalize the support of electronic commerce and electronic transaction management. This rationalization stems from the reusability of control structures and user interfaces for a wide variety of transaction management related activities. As a result, content usage control, data security, information auditing, and electronic financial activities, can be supported with tools that are reusable, convenient, consistent, and familiar. In addition, a rational approach—a transaction/distribution control standard—allows all participants in WAF the same foundation set of hardware control and security, authoring, administration, and management tools to support widely varying types of information, business market model, and/or personal objectives.

Employing WAF as a general purpose electronic transaction/distribution control system allows users to maintain a single transaction management control arrangement on each of their computers, networks, communication nodes, and/or other electronic appliances. Such a general purpose system can serve the needs of many electronic transaction management applications without requiring distinct, different installations for different purposes. As a result, users of WAF can avoid the confusion and expense and other inefficiencies of different, limited purpose transaction control applications for each different content and/or business model. For example, WAF allows content creators to use the same WAF foundation control arrangement for both content authoring and for licensing content from other content creators for inclusion into their products or for other use. Clearinghouses, distributors, content creators, and other WAF users can all interact, both with the applications running on their WAF installations, and with each other, in an entirely consistent manner, using and reusing (largely transparently) the same distributed tools, mechanisms, and consistent user interfaces, regardless of the type of WAF activity.

WAF participants in a commercial value chain can be "commercially" confident (that is, sufficiently confident for commercial purposes) that the direct (constituent) and/or "extended" electronic agreements they entered into through the use of WAF can be enforced reliably. These agreements may have both "dynamic" transaction management related aspects, such as content usage control information enforced through budgeting, metering, and/or reporting of electronic information and/or appliance use, and/or they may include "static" electronic assertions, such as an end-user using the system to assert his or her agreement to pay for services, not to pass to unauthorized parties electronic information derived from usage of content or systems, and/or agreeing to observe copyright laws. Not only can electronically reported transaction related information be trusted under the present invention, but payment may be automated by the passing of payment tokens through a pathway of payment (which may or may not be the same as a pathway for reporting). Such payment can be contained within a WAF container created automatically by a WAF installation in response to control information (located, in the preferred embodiment, in one or more permissions records) stipulating the "withdrawal" of credit or electronic currency (such as tokens) from an electronic account (for example, an account securely maintained by a user's WAF installation secure subsystem) based upon usage of WAF controlled electronic content and/or appliances (such as governments, financial credit providers, and users).

WAF allows the needs of electronic commerce participants to be served and it can bind such participants together in a universe wide, trusted commercial network that can be secure enough to support very large amounts of commerce. WAF's security and metering secure subsystem core will be present at all physical locations where WAF related content is (a) assigned usage related control information (rules and mediating data), and/or (b) used. This core can perform security and auditing functions (including metering) that operate within a "virtual black box," a collection of distributed, very secure WAF related hardware instances that are interconnected by secured information exchange (for example, telecommunication) processes and distributed database means. WAF further includes highly configurable transaction operating system technology, one or more associated libraries of load modules along with affiliated data, WAF related administration, data preparation, and analysis applications, as well as system software designed to enable WAF integration into host environments and applications. WAF's usage control information, for example, provide for property content and/or appliance related: usage authorization, usage auditing (which may include audit reduction), usage billing, usage payment, privacy filtering, reporting, and security related communication and encryption techniques.

WAF's fundamental configurability will allow a broad range of competitive electronic commerce business models to flourish. It allows business models to be shaped to maximize revenues sources, end-user product value, and operating efficiencies. WAF can be employed to support multiple, differing models, take advantage of new revenue opportunities, and deliver product configurations most desired by users. Electronic commerce technologies that do not, as the present invention does:

support a broad range of possible, complementary revenue activities, offer a flexible array of content usage features most desired by customers, and exploit opportunities for operating efficiencies, will result in products that are often intrinsically more costly and less appealing and therefore less competitive in the marketplace.

Some of the key factors contributing to the configurability intrinsic to the present invention include:

(a) integration into the fundamental control environment of a broad range of electronic appliances through portable API and programming language tools that efficiently support merging of control and auditing capabilities in nearly any electronic appliance environment while maintaining overall system security;

(b) modular data structures;

(c) generic content model;

(d) general modularity and independence of foundation architectural components;

(e) modular security structures;

(f) variable length and multiple branching chains of control; and (g) independent, modular control structures in the form of executable load modules that can be maintained in one or more libraries, and assembled into control methods and models, and where such model control schemes can "evolve" as control information passes through the WAF installations of participants of a pathway of WAF content control information handling.

Catalog Capabilities

Displays linkable pictures and text

Customizes rendering based on user preferences

Provides multiple ways to traverse the catalog (ease of navigation)

Shows Quick-buy link throughout catalog

Incorporates multiple languages and localized content

Integrates to centralized publishing for fresh content

Displays guest view of catalog (default set)

Creates personal catalog

Referring to operation 1500 of FIG. 15, one embodiment of the electronic commerce component of the present invention is provided for allowing purchase of products and services via a display catalog. The display catalog may display linkable pictures, such as visual representations of products for sale. The display catalog may also display linkable text which could represent a product or family of products, as well as services offered. Other linkable text or pictures could be implemented to provide multiple ways to traverse the display catalog to ease navigation along a page or between various pages. An exemplary link would include at least one textual or picture link displayed on each page of the display catalog that would permit a user to purchase the good or service shown on that page or associated with a particular good or service displayed on the page. Such link may resemble a shopping cart.

Preferably, the default setting of the display catalog would be preset, but the display format of the display catalog would be customizable based on user preference or automatically based on user profile. For example, the user may be permitted to customize the format of the display catalog for his or her particular session, or the customizations may be saved so that the user's personalized settings are used each time the display catalog is opened by that particular user. The display format may also be customized to display localized content, such as by being based on the location of the user. Text may also be displayed in a language selected by the viewer.

Product Details and Specifications

Links to all related documentation (datasheets, whitepapers)

Drills-down for additional detail

Integrates to centralized publishing for integrity

Downloads information

Tracks downloads for proactive notification (spec updates)

As shown in FIG. 15, operation 1502 outputs data relating to at least one of the products and services. Such data may include details of the products or services as well as specifications. The data and comparisons may be accessed through linking of pages containing the data with linkable pictures and text. For example, a more detailed picture of a particular product illustrating its most salient features may be linked to a smaller or more generic picture of the product on a page displaying various similar products. More links may be used on the page displaying the data to obtain additional detail.

Optionally, the data may be integrated to centralized publishing for integrity. In such case, updated data would be downloaded to ensure the correctness and currentness of the information. A proactive notification could also be made near the time of download, such as when updates to a specification are sent or received.

Shopping Cart

Stores items selected throughout shopping experience

Saves shopping carts to be retrieved at later point

Displays quantity, price, shipping info, total price

Modifies order information (add quantities, delete items)

Incorporates multiple languages and currency

Accessible easily throughout catalog

Figure 16:
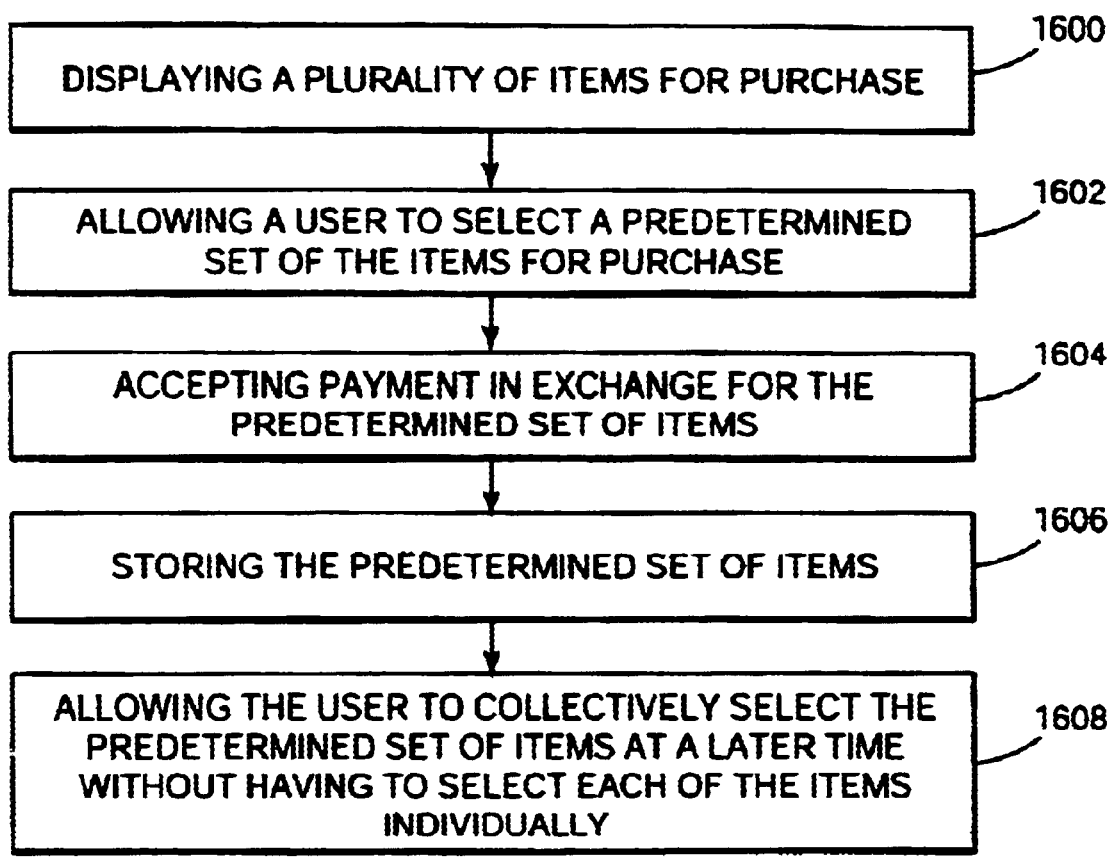
FIG. 16 is an illustration of one embodiment of the present invention for facilitating a virtual shopping transaction.

As shown in FIG. 16, one embodiment of the electronic commerce component of the present invention is provided for facilitating a virtual shopping transaction. First, a plurality of items, i.e. products or services, are selected from a database and displayed for purchase in operation 1600. Preferably, the items are displayed in an electronic catalog format. Next, in operation 1602, a user is allowed to select a predetermined set of the items for purchase. For example, each of the items could include a liked picture or text, which a user would then simply click on with a mouse pointer to select the items. Other options include scrollable menus, etc. In operation 1604, a payment is then accepted in exchange for the predetermined set of items. Such predetermined set of items is then stored in operation 1606, thereby allowing the user to collectively select the predetermined set of items at a later time without having to select each of the items individually. Note operation 1608. The selected items are preferably stored in a database unique to the user. The set of items selected during each shopping session should be stored in a separate listing or file so that the user can individually select particular sets of items. Optionally, the user may be allowed to name each stored set of items for easier identification later. The user may also be permitted to rate or rank the items of a selected set for purposes of refreshing the user's memory when the user later retrieves the set.

Ideally, a quantity and a price of each of the items that is selected is displayed during use of the present invention. Also displayed is a total price of the items that are selected along with shipping information. During use, the user is allowed to modify the predetermined set of items that are selected. Further, several sets of items may be separately stored for later review and modification. Retrieval 6f the set or sets of items should be easily accessible throughout the display catalog, such as through links.

Optionally, multiple languages may be incorporated into the present invention and payment for the predetermined set of items may be accepted in any one of a plurality of currencies such as electronic and foreign.

Recently, an online shopping system which allows examination, selection and order of items through a computer has been put into practice. In such an online shopping system, in order to supplement a disadvantage by a gap from ordinary shopping caused by the use of electronic means such as not capable of directly touching the item and not capable of getting assistance of a real salesman, various devices for a user interface have been made. As one of such devices, a so-called shopping basket function which has some analogy with shopping basket used in a shop such as supermarket is proposed. In this function, items on the online shopping are temporarily added to a purchase list and a process of order and purchase is conducted when all items to be purchased are registered on the list, as items to be purchased in the supermarket are once put into a shopping basket and lastly the account is settled at a counter. In this manner, by preparing the purchase list to order a plurality of items one time, a time required to purchase may be substantially saved. Further, the consumer may prevent the failure of shopping and stop the purchase of unnecessary items by checking the list once before the purchase. Further, because of feel of easiness that the items once added on the purchase list may be finally changed in any way before the purchase, there is a psychological effect that the consumer may proceed shopping readily.

The elements which constitute the shopping basket are a shopping basket main body (purchase list) and a function for taking in and out items for the shopping basket. As functions associated with the shopping basket, there are a function to take the items into the shopping basket (add to the purchase list), a function to check the contents of the shopping basket (display the purchase list), a function to return the item in the shopping basket (change the purchase list) and a function to purchase the items in the shopping basket. However, for the function to purchase the items, only the order is accepted because the delivery of the items is made later except a portion of items which can be downloaded as digital data and the shopping is not completed until the items are received and the account is settled.

As one of methods for proving the shopping basket to the consumer, there is a method of displaying a button for the shopping basket on the same display page as a catalog which the consumer watches as it is realized in the online shopping system mainly on the World Wide Web. As another method of proving the shopping basket, there is a method for separately displaying an item catalog area and a shopping basket area. Such a function is used in the shopping system provided by a CD-ROM.

A main stage of the online shopping is an item catalog screen on which information on the items is provided. The consumer examines the item on the screen and if he or she likes it, he or she takes it into the shopping basket. During the shopping, he or she examines the content of the shopping basket as required to check the item scheduled to purchase and the pay amount of the items. Accordingly, it is not necessary to always display the purchase list on the screen, but the functions to access to the shopping basket for taking in the items and to display the contents should be available to the consumer any time during the shopping.

As described above, when the button for the shopping basket is on the same page as the item catalog, the entire length of the page changes depending on the amount of item data described on the catalog, the page may not be accommodated on the display screen. In such a case, it is necessary for the consumer to scroll the page to press the button to display the button for the shopping basket in order to display the button. The same is true when the button is located at the top end of the page, and when the item of interest is at a lower portion of the page, the screen must be scrolled upward in order to take the item into the shopping basket after the confirmation. The state in which the necessary function is not displayed without scrolling not only imposes a burden to the operation of scroll, and when the consumer first uses the system, the operation to be conducted next is hard to understand and cause anxiety to the user. On the other hand, in the method of always displaying the button in a specified area by dividing the screen, the above problem is solved.

Further, as a feature of an application on the Internet such as the World Wide Web, high freedom of both information provider and user is pointed out. For example, the user cannot previously limit the length of one page of the contents prepared by the information provider. The environment of the user such as a resolution of the display, a type of browser software used and the setting of font varies from user to user and the information provider cannot know it. As a result, however the information provider devises the amount of information and the layout described on the page to accommodate it in the screen, the intended effect is not always achieved depending on the environment of the user. In the method of placing the button for the shopping basket on the same page as the catalog, some degree of scrolling is unavoidable. On the other hand, the method of dividing the screen and sharing the roles by the respective sub-areas restricts the method for preparing the contents. It may be good that the user interface is uniform in one online shop but when it is applied across a plurality of online shops of various items and scales, free design cannot be conducted. This forces to the user a specific environment such as to watch the window of the browser at a specified size and hence it does not conform to the Internet.

In accordance with the present invention, an interface for providing the shopping basket function is provided as a separate shopping basket window from a catalog window on which online shop item data is displayed. The shopping basket window is displayed on the catalog window and a display position is moved in linkage with the movement of a mouse pointer. The shopping basket includes a list of items to be purchased which is a main body of the shopping basket, a function to add the item data to the list, and a function to change the item data registered in the list. In one embodiment of the present invention, the shopping basket main body is not always displayed. Instead, an interface function to display the shopping basket contents on the screen is provided on the shopping basket window.

Compare Products and Services

Compares your products and services to competitors

Highlights advantages in across your products and services

Figure 16A:
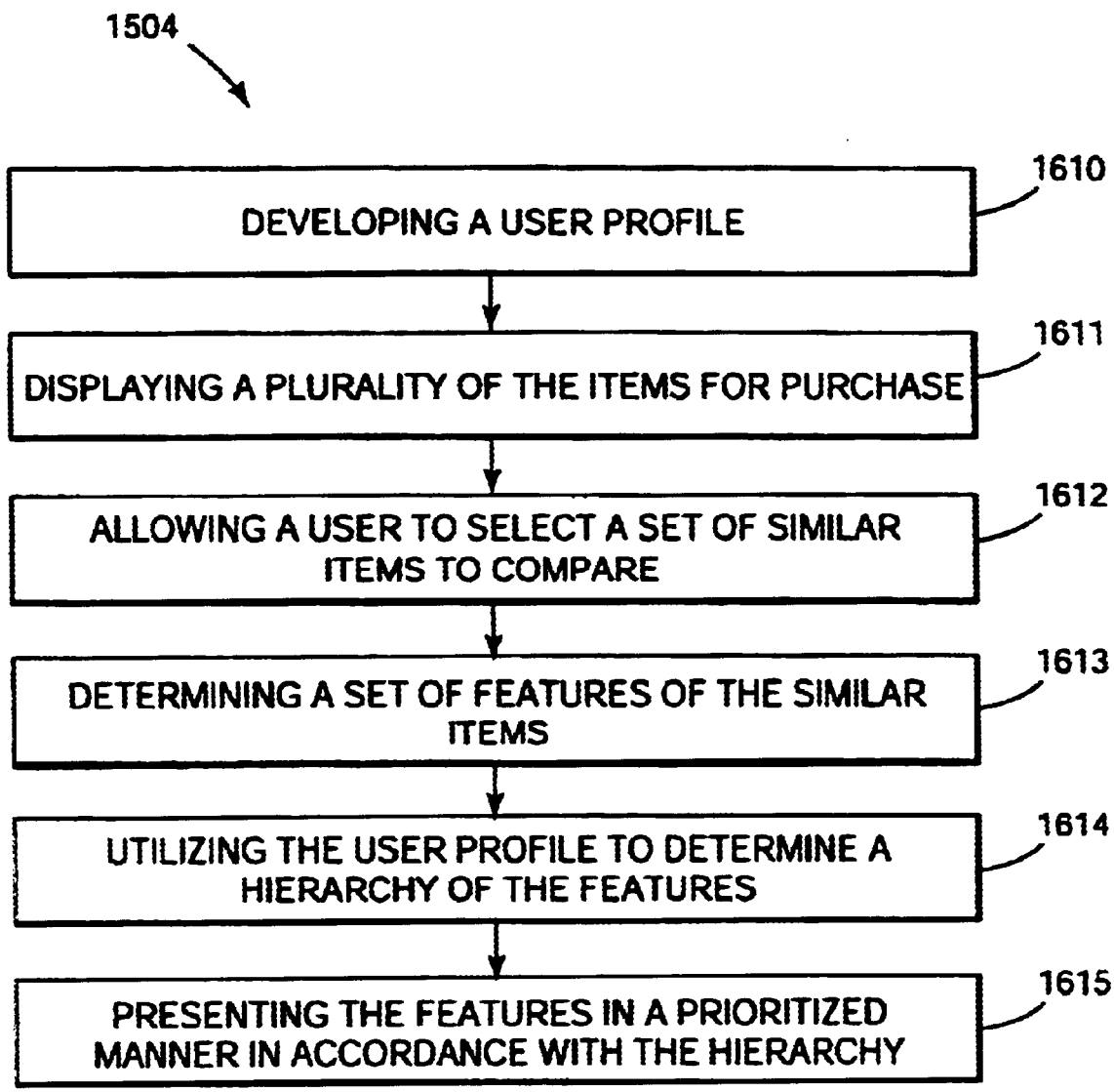
FIG. 16A is an illustration of one embodiment of the present invention for facilitating a virtual shopping transaction by comparing different products and services.
Figure 16B:
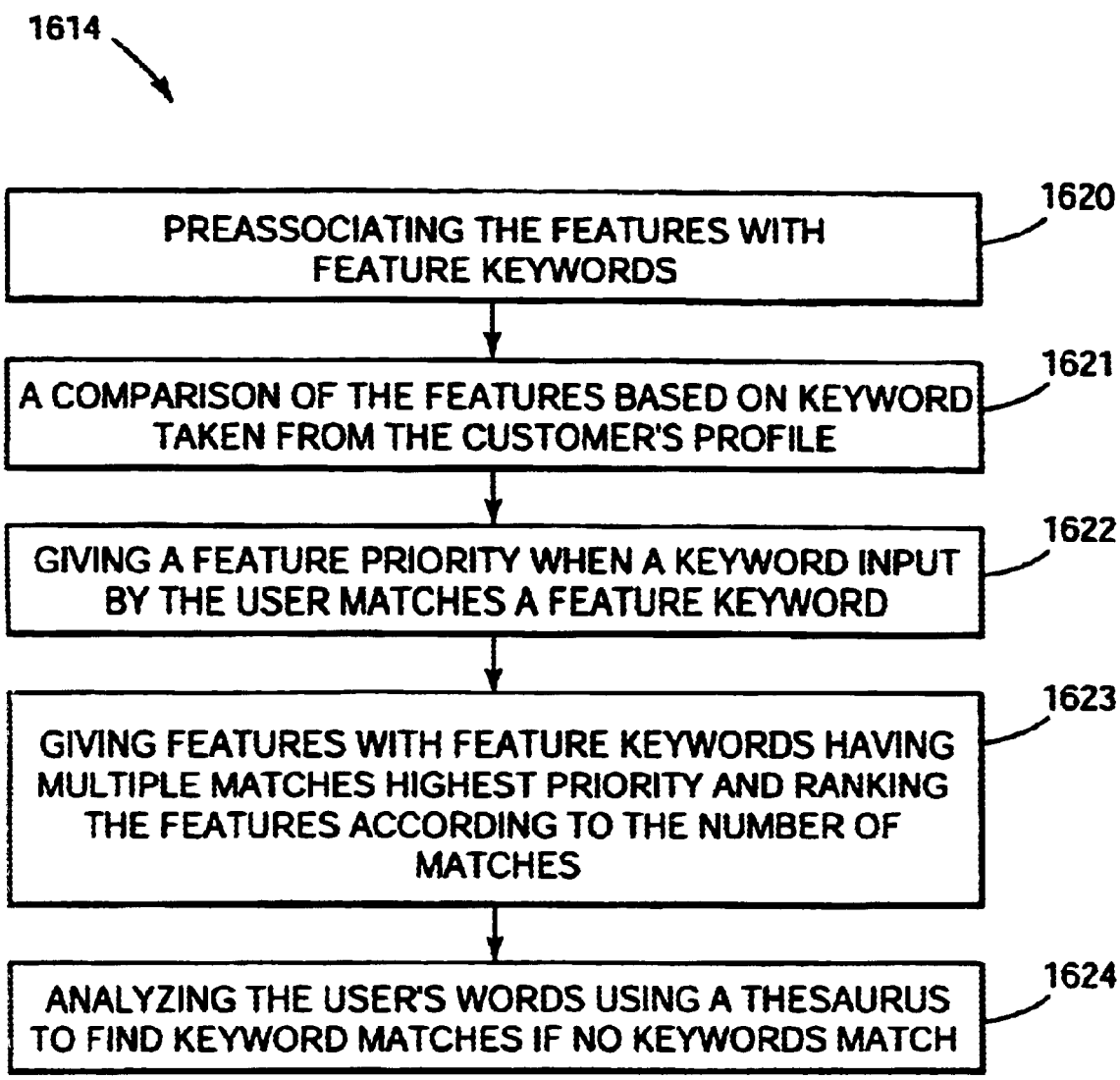
FIG. 16B is an illustration of one embodiment of the present invention for creating a hierarchy of the features of the items selected in accordance with the customer's profile.

One embodiment of the present invention provides for comparison shopping by utilizing the customer's profile to prioritize the features of a group of similar, competing products, as shown in operation 1504 of FIG. 15. The competing products may or may not have been manufactured by competing business entities. More detail is provided in FIG. 16A. First, in operation 1610, a customer's profile is developed. This profile may be developed from many sources including customer input, customer buying habits, customer income level, customer searching habits, customer profession, customer education level, customer's purpose of the pending sale, customer's shopping habits, etc. Such information may be input directly by the user, captured as a user uses the network, and may be downloaded periodically from a user's system. Next, in operation 1611, a plurality of items for purchase are displayed, from which the customer is allowed to select multiple, similar items, i.e. products or services to compare in operation 1612. Then, after a set of features of each item is determined in operation 1613, operation 1614 creates a hierarchy of the features of the items selected in accordance with the customer's profile. For example, as shown in FIG. 16B, a comparison of features based on keywords taken from the customer's profile may be performed in operation 1621. The features would be preassociated with feature keywords in operation 1620. When a keyword input by the user matches a feature keyword, the feature is given priority in operation 1622. Features with feature keywords having multiple matches are given highest priority and ranked according to the number of matches in operation 1623. If no keywords match, the user's words could be analyzed using a thesaurus to find keyword matches, but these would be given lower priority in operation 1624. Then, in operation 1615 of FIG. 16A, a comparison table is presented with the features organized in a prioritized manner in accordance with the hierarchy. A particular item may be chosen, and similar competing items would be compared to it. For example, the prices of a service may be compared to the prices of other similar services. The advantages of selected items could also be highlighted against similar competing and noncompeting items.

Needs Assessment/Buyer Assistant

Interacts with users to understand their needs

Provides solutions based on user needs (capacity, performance, cost)

Saves solutions to be retrieved at later point

Adds solutions to shopping cart

Provides online ROI tool to guide selection process

Provides web call-through for further user support

Figure 17:
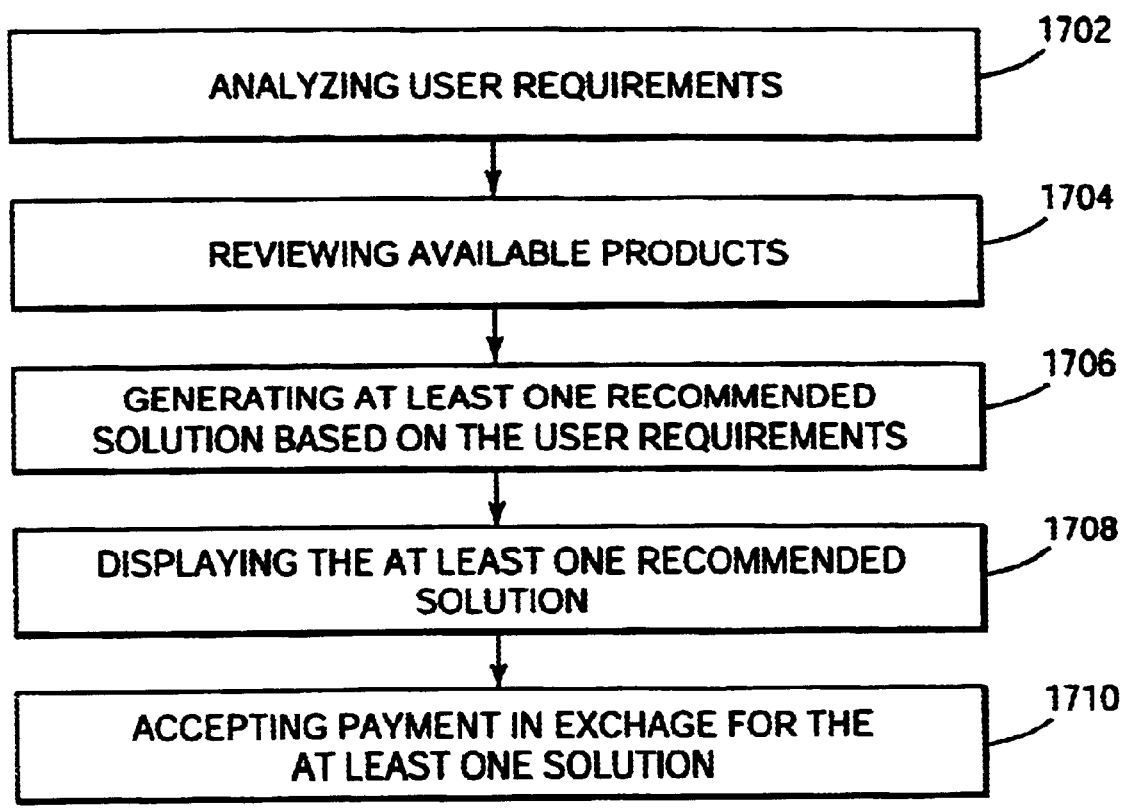
FIG. 17 is an illustration of one embodiment of the present invention for facilitating a virtual shopping transaction by ascertaining needs of a user.
Figure 17A:
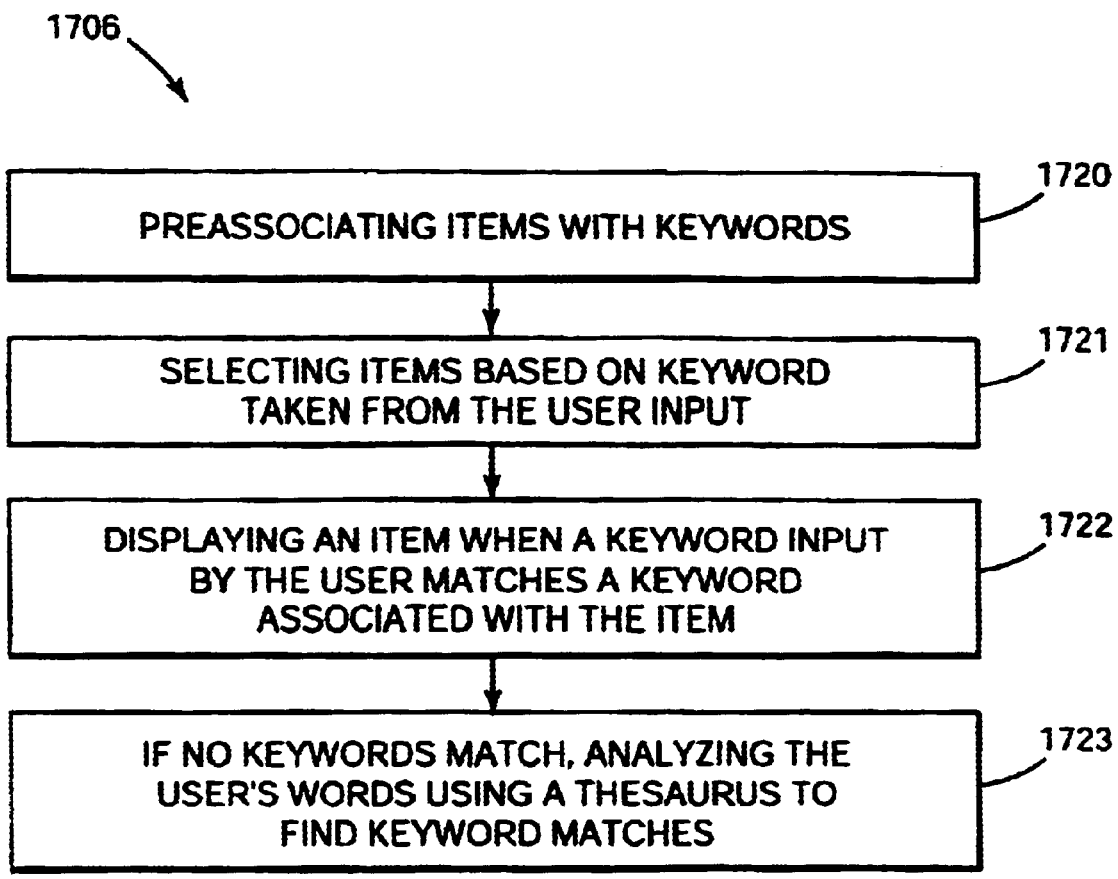
FIG. 17A is an illustration of one embodiment of the present invention for facilitating a virtual shopping transaction by generating a solution based on the requirements of the user.

With reference now to operation 1506 of FIG. 15, another embodiment of the electronic commerce component of the present invention is provided for facilitating a virtual shopping transaction by ascertaining needs of a user. A more detailed description is shown in FIG. 17. First, needs and requirements of a user are input by the user. Then the needs and requirements are analyzed in operation 1702. Available products are reviewed in FIG. 1704 and placed on a list from which one or more items will be selected based on the user input. Next, in operation 1706, a solution is generated based on the requirements of the user after which the solution is displayed, as indicated in operation 1708. FIG. 17A provides an example of operation 1706. The items would be preassociated with keywords in operation 1720. In operation 1721, selection of items based on keyword taken from the user input may be performed. When a keyword input by the user matches a keyword associated with an item, the item is displayed in operation 1722. If no keywords match, the user's words could be analyzed using a thesaurus to find keyword matches in operation 1723. A payment is then accepted in exchange for the solution in operation 1710 of FIG. 17, as will be discussed in more detail below. It should be noted that in the present description, the solution includes either a product or a service, or both.

As an option, the solution may be stored for allowing the purchase of the solution at a later time. Further, the solution may be grouped with a plurality of items selected for being purchased together. In the foregoing description, the needs of the user may refer to parameters including either capacity, performance, or cost. It should be noted that the needs of the user are assessed by receiving input from the user.

Product Configurator

Lists all the options related to a product or service

Allows users to piece together a single product/service or set of products/services Validates integrity of configurations and calculates prices/availability Only shows available options Adds configurations to shopping cart Saves configurations to be retrieved at later point Incorporates 3rd party products (partner products)

Figure 18:
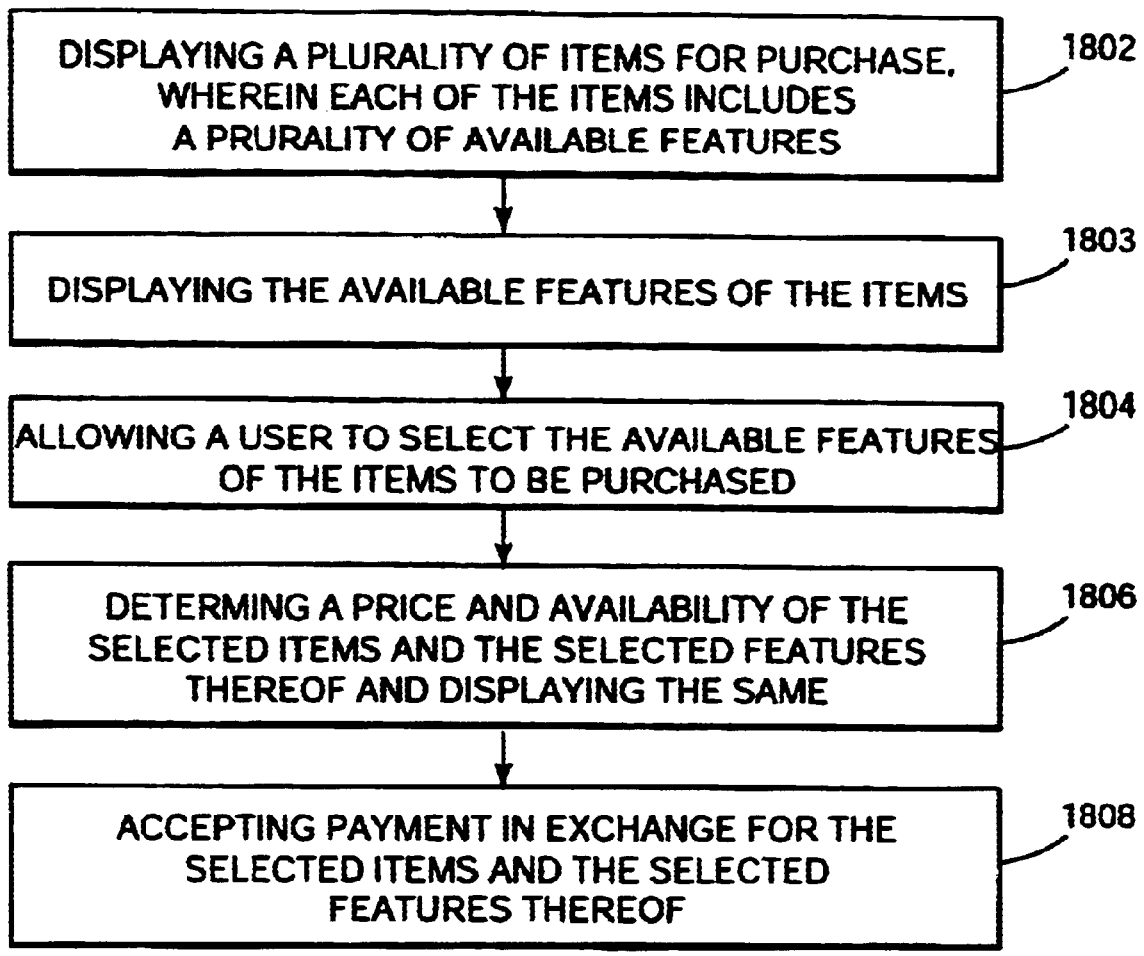
FIG. 18 is an illustration of one embodiment of the present invention for allowing a user to customize an item for purchase in a virtual shopping environment.

In still yet another embodiment, a method, system, and article of manufacture is provided for allowing a user to customize an item for purchase in a virtual shopping environment, as shown in FIG. 15, operation 1508. FIG. 18 provides more detail. Referring to FIG. 18, a plurality of items for purchase are first displayed in operation 1802, as discussed above. Each of the items includes a plurality of available features which are displayed in operation 1803, preferably with the price of each feature, including cost for adding the feature and cost savings for removing the feature. Next, a user is permitted to select the available features of each of the items to be purchased, as indicated in operation 1804. For example, a user may indicate which features of the item the user wants to be included with the item and which items the user wishes absent or removed. If the item is a product, an illustration or picture of the product with only the selected features should be made available so that the user can see the product in various configurations. As an option, a total price and availability may be determined with respect to the selected items and the selected features thereof for display purposes in operation 1806. Further, in operation 1808, payment is accepted in exchange for the selected items and the selected features thereof. It should be noted that in the foregoing description, the items each include either a product or a service or both, and may also include third party products and services.

While the available features which are displayed, the features of the items that are unavailable are hidden. Further, the selected features are stored for allowing the user to collectively select the selected features at a later time without having to select each of the features individually.

The present invention provides a system and method for conducting commerce via an electronic means, such as a computer network, cable television network, or direct dial modem. Previous attempts to provide electronic commerce subsystems have been custom tailored to an individual commerce offering, and have not been adaptable to be able to provide a versatile system capable of supporting a wide range of providers of goods and services.

To meet this need, several companies have developed computer architectures for online electronic catalog sales using, for example, the Internet as a transport mechanism to transmit data representing purchase requests between a proprietary browser and server product pair.

For example, Netscape Communications uses its Navigator/Netsite World Wide Web (WWW) browser/server pair. A buyer uses a Navigator to select a seller's Netsite server (sort of an electronic storefront), which is in turn coupled to standard application servers (back-end subsystems), e.g., a credit server or a member server for collecting demographic information on customers. These servers contain the business rules defined by the seller, e.g., what credit cards are accepted and what customer information is tracked during each sale. Some of these servers are connected to external, third-party services, e.g., the credit server to an external credit card processing network or the member server to an external demographics processing module. The actual applications e.g., on-line publishing or catalog sales, are represented as extensions of the application servers. Equivalently, the application servers are said to be instantiated in the applications. The net result of this approach is that the business rules (from the application servers) are embedded into the applications along with the application logic or presentation.

Another company, Open Market, is developing a similar electronic catalog system consisting of a HyperText Markup Language (HTML) authoring tool (called Storebuilder), and a server (called WebServer) connected to an integrated back-end commerce system (called TransactionLink). This system appears to share similar characteristics and disadvantages as the Netscape system.

Any of the foregoing types of browsers may employed to access various databases via the Internet in order to conduct electronic commerce-related business. Typical database or file-based shopping cart systems require that the user be uniquely identified in order to associate particular data stored on the server with a particular user. This requires the user to log-in or create an account, which is then stored in the server. Each subsequent request from the user must reference the unique identifier, either in the uniform resource locator (URL) or as hidden data passed back through a form submission. Either of these approaches require that the account or ID information of the user be stored on the remote server in the network for some definite period of time. Usually, the user must keep track of the account identifier in order that the prior session information can be retrieved.

It is desirable, to the extent possible, existing terminal hardware appropriately adapted and modified to incorporate the principles of the present invention. Hardware suitable for this purpose is sold by NCR. This equipment, a self-service terminal system identified as model NCR 5682, incorporates the data gathering and transaction processing capabilities of conventional automated teller machines with video, graphics, audio and printer operations. Interactivity with the customer is governed by a software system through the use, for example, of a keyboard or an infrared touch screen using prompts. Transactions may be completed through the use of a credit card reader and a PIN number entering means.

In one example of a related system, insurance agents at remote office on-line terminals communicate with a central processor which includes a data bank, storing data as to risks to be insured, client information, insurance premium information and predetermined text data for incorporation into insurance contracts. An agent at a terminal keys in information regarding a risk and other data needed to write insurance for that risk. To assist him, a "form" is displayed on his terminal by the central processor, and he merely enters the pertinent information in the blanks provided. The information is correlated in the central processor, from which a premium quotation is transmitted back and displayed at the agent's terminal and in which a client data base is established with the information from the form. Errors or omissions are detected and the agent or client is notified. If the policy is to be written, a formal contract is printed under the control of the central processor and electronically stored and displayed to underwriter personnel. Concurrently the insurance contract is mailed to the client. The underwriter can decide to cancel or alter the contract. Alternatively, the underwriting function is carried out before the contract is printed and mailed. In this system, the terminals operate on-line, underwriting is perfomed by a human underwriter, and the insurance contract is printed remotely from the client and mailed to him. The on-line terminals are not automatic self-service vending machines; the client must deal with the company through agents.

In another example of a related system, a terminal includes a CPU and is coupled to a memory unit which has data bases storing information. Certain elements are assigned weights. The system is used by underwriters to assist them in performing their underwriting functions.

Still yet another system is adapted for automatically dispensing information, goods and services to a customer on a self-service basis including a central data processing center in which information on services offered is stored. Self-service information sales terminals are remotely linked on-line to the central data processing center and are programmed to gather information from prospective customers on goods and services desired, to transmit to customers information on the desired goods or services from the central data processing center, to take orders for goods or services from customers and transmit them for processing to the central data processing center, to accept payment, and to deliver goods or services in the form of documents to the customer when orders are completed. The central data processing center is also remotely linked to institutions, such as insurance companies, serviced by the system to keep the institution updated on completed sales of services offered by that institution. As noted, the terminals in this system are on-line with the central data processing center.

Another system is provided using self-service terminals for dispensing voice and video information, printed documents, and goods and for accepting orders and payments therefor for travel related services by currency or credit card. The self-service terminals include a processor, printer, dispenser, data sources including a mass storage unit, a card reader, a coin box, and a communication device for communicating with a remote service center. The mass storage unit stores transitory information, such as flight schedules, ticket prices, weather information and other information useful in the planning of a business trip or vacation which is periodically updated via a communication link with the remote control center. The self-service terminal normally operates off-line.

Payment for items purchased over the Internet is also a concern. Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need to have the correct amount of cash or providing change therefor. Furthermore, the handling and managing of paper cash and coins is inconvenient, costly and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House ("ACH") where a user can enter a pre-authorized code and download information with billing occurring later, and a Point Of Sale (POS) system where a transaction is processed by connecting with a central computer for authorization for the transaction granted or denied immediately are examples of EFT systems that are utilized by retail and commercial organizations.

Home Banking bill payment services are examples of an EFT system used by individuals to make payments from a home computer. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems.

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable for the merchant to transmit information, including a subset of the information provided by the customer, over such a network to a payment gateway computer system that is designated, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit or debit card services.

Such secure payment technologies include Secure Transaction Technology ("STT"), Secure Electronic Payments Protocol ("SEPP"), Internet Keyed Payments ("iKP"), Net Trust, and Cybercash Credit Payment Protocol. One of ordinary skill in the art readily comprehends that any of the secure payment technologies can be substituted for the SET protocol without undue experimentation. Such secure payment technologies require the customer to operate software that is compliant with the secure payment technology, interacting with third-party certification authorities, thereby allowing the customer to transmit encoded information to a merchant, some of which may be decoded by the merchant, and some which can be decoded only by a payment gateway specified by the customer.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), The SSL Protocol Version 3.0, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Terisa Systems, Shen, Kerberos, Photuris, Pretty Good Privacy ("PGP") which meets the IPSEC criteria. One of ordinary skill in the art readily comprehends that any of the general-purpose secure communication protocols can be substituted for the SSL transmission protocol without undue experimentation.

Banks desire an Internet payment solution that emulates existing Point of Sale (POS) applications that are currently installed on their host computers, and require minimal changes to their host systems. This is a critical requirement since any downtime for a banks host computer system represents an enormous expense. Currently, VeriFone supports over fourteen hundred different payment-related applications. The large number of applications is necessary to accommodate a wide variety of host message formats, diverse methods for communicating to a variety of hosts with different dial-up and direct-connect schemes, and different certification around the world. In addition, there are a wide variety of business processes that dictate how a Point of Sale (POS) terminal queries a user for data and subsequently displays the data. Also, various vertical market segments, such as hotels, car rental agencies, restaurants, retail sales, mail sales/telephone sales require interfaces for different types of data to be entered, and provide different discount rates to merchants for complying with various data types. Moreover, a plethora of report generation mechanisms and formats are utilized by merchants that banking organizations work with.

Banks are unwilling to converge on "standards" since convergence would facilitate switching from one acquiring bank to another by merchants. In general, banks desire to increase the cost that a merchant incurs in switching from one acquiring bank to another acquiring bank. This is accomplished by supplying a merchant with a terminal that only communicates utilizing the bank's proprietary protocol,-and by providing other value-added services that a merchant may not be able to obtain at another bank.

Internet-based payment solutions require additional security measures that are not found in conventional POS terminals. This additional requirement is necessitated because Internet communication is done over publicly-accessible, unsecured communication line in stark contrast to the private, secure, dedicated phone or leased line service utilized between a traditional merchant and an acquiring bank. Thus, it is critical that any solution utilizing the Internet for a communication backbone, employ some form of cryptography.

As discussed above, the current state-of-the-art in Internet based payment processing is a protocol referred to as SET. Since the SET messages are uniform across all implementations, banks cannot differentiate themselves in any reasonable way. Also, since SET is not a proper superset of all protocols utilized today, there are bank protocols which cannot be mapped or translated into SET because they require data elements for which SET has no placeholder. Further, SET only handles the message types directly related to authorizing and capturing credit card transactions and adjustments to these authorizations or captures. In a typical POS terminal in the physical world, these messages comprise almost the entire volume of the total number of messages between the merchant and the authorizing bank, but only half of the total number of different message types. These message types, which are used infrequently, but which are critical to the operation of the POS terminal must be supported for proper transaction processing.

With the increasing popularity of computer communications, many companies are becoming interested in advertising and supporting their products using an online computer service that can be accessed by customers. However, creating a large online computer service is an extensive task. To develop a sophisticated online service, such as America Online.RTM., CompuServe.RTM., Genie.RTM., or Prodigy.RTM., a company must have a large mainframe computer and customized software. Developing the customized software requires a competent programming staff and a good deal of time. Most companies do not have the resources required to develop such systems, and thus cannot easily develop and maintain an online presence.

One way a company can contact millions of potential customers is to use the global Internet. The global Internet is a network of computer networks that links together millions of computer systems using the well defined TCP/IP protocol.

A new method of distributing and viewing information known as the World-Wide Web has recently become very popular on the global Internet. The World-Wide Web is a collection of servers connected to the Internet that provide multi-media information to users that request the information. The users access the information using client programs called "browsers" to display the multi-media information.

World-Wide Web servers store multi-media information in a document format known as HyperText Markup Language (HTML). The World-Wide Web servers distribute the HTML formatted documents using a specific communication protocol known as the HyperText Transfer Protocol (HTTP).

To access the multi-media information available on World-Wide Web servers, a user runs a client browser program that accesses the HTML formatted documents stored on the HTTP servers connected to the global Internet. The client browser program retrieves the formatted information and provides the information in an appropriate manner to the user. For example, the client browser program displays graphical image information as images on the user's graphical display screen; plays video information as video animation on the user's graphical display screen; displays text information as text on the user's screen; and plays sound samples using the speakers on the user's computer system. "Mosaic", one popular client browser program, is widely available to the users of the global Internet.

For a company that wishes to develop an online presence, creating a World-Wide Web Server would provide a feature rich online service available to customers and clients. A World-Wide Web Server can store images, text, animation, and sounds that provide information about the company. Furthermore, World-Wide Web Servers can be implemented on relatively simple computer systems, including personal computers.

Most World-Wide Web Servers are coupled to the global Internet. By deploying a World-Wide Web Server on the global Internet a company would create online service that is accessible to the millions of global Internet users.

Alternatively, a company can deploy a HTTP server that is available to customers through dial-up phone service. A dial-up HTTP server would be accessible to customers and clients that do not have Internet access. Thus, by creating a simple HTTP server, any organization or corporation can create an online presence.

However, quickly creating the HTML formatted documents required for a World-Wide Web Server is not a trivial task. Moreover, the standard HTTP server software, without any additional programming, is very limited. For example, without custom extensions, an HTTP server cannot accommodate complex transactions between a user and the HTTP server or integrate a database system into an online service. Although it is possible to write custom extensions to the HTTP server software using a conventional programming language, such custom extensions are difficult to write except by experienced programmers. Thus, to be able to quickly deploy full-featured HTTP servers, it would be desirable to have a development tool usable by non-programmers that allows a developer to quickly and easily create a full-featured online service based upon the HTTP and HTML standards.

Many programming development tools are known in the art. These programming development tools range from tools which are developed and marketed as general purpose programming development tools to sophisticated special purpose development tools for developing specific types of applications.

For example, the Information Exchange Facility (IEF) general development tool, which is available from Texas Instruments, is used by professional programmers to develop application programs. Essentially, IEF provides a facility that allows a programmer to write "pseudo code" and IEF generates an intermediate source code program in a high level programming language (such as COBOL or C code) based on the "pseudo code". IEF is an example of what will be referred to herein as a "general purpose development tool" because it allows development of programs for essentially any purpose or application dependent on the input provided by the programmer.

In contrast to general purpose software development tools, many application programs themselves provide special purpose "development tool" capability. An example is the Paradox.TM. database program available from Borland International of Scotts Valley, Calif. The Paradox.TM. database allows end users to develop sophisticated database applications which would have been developed by professional programmers a few years ago. The Paradox.TM. database is but one example of a special purpose development tool.

Another example of a special purpose development tool is the Application Development Environment of Lotus Notes.TM. which is available from Lotus Development Corporation of Cambridge, Mass. The Application Development Environment of Lotus Notes provides features which are said to allow for rapid development of workgroup applications such as sharing of documents between users over a network. Generally, Lotus Notes and, thus, its Application Development Environment, is directed at sharing of documents among persons in an authorized work group.

The Lotus Notes Application Development Environment provides for such features as (i) application design templates which are said to allow sophisticated applications to be built by customizing pre-built applications such as document libraries, form-based approval systems, project tracking applications and status reporting systems; (ii) security; (iii) database access; and (iv) discussion groups.

The ability to perform commercial transactions that involve order entry systems would allow an online system to sell goods and services to computer users. It is now recognized that many functions such as traditional order entry systems and the like will someday be carried out over computer networks by allowing a customer to place orders for goods and services directly with an online service. By way of example, even today, food orders can be placed with restaurants over computer networks; videos can be reserved at the local video store; and banking transactions can be carried out simply by logging onto a computer network.

Four different types of commercial transactions might commonly occur in a commercial online service. First, a user may be charged for the right to access all or parts of a useful publicly accessible online system. Second, the online service may pay the user for performing some type of action such as winning a contest or completing a marketing survey. Third, an online service may charge a content provider for placing certain information on the online service. For example, a content provider can be charged for placing an advertisement on the online service. Finally, a content provider can be paid by the online service for providing information that users may wish to access, can be can be provided on a for-fee basis. Conversely, an online service provider may wish to pay third party content providers for placing useful material on the online service.

Thus, when creating a publicly accessible online system, it is desirable to include the ability to define fee structures for accessing parts of the online system and/or ordering other goods or services. However, creating a sophisticated commercial online service with such features usually requires specialized programming.

Advertisement and Promotion Capabilities

Provides cross-selling and up-selling based on on a product/service

Provides cross-selling and up-selling based on on a user

Provides advertisements or promotions based on a product/service

Provides advertisements or promotions based on a user

Figure 19:
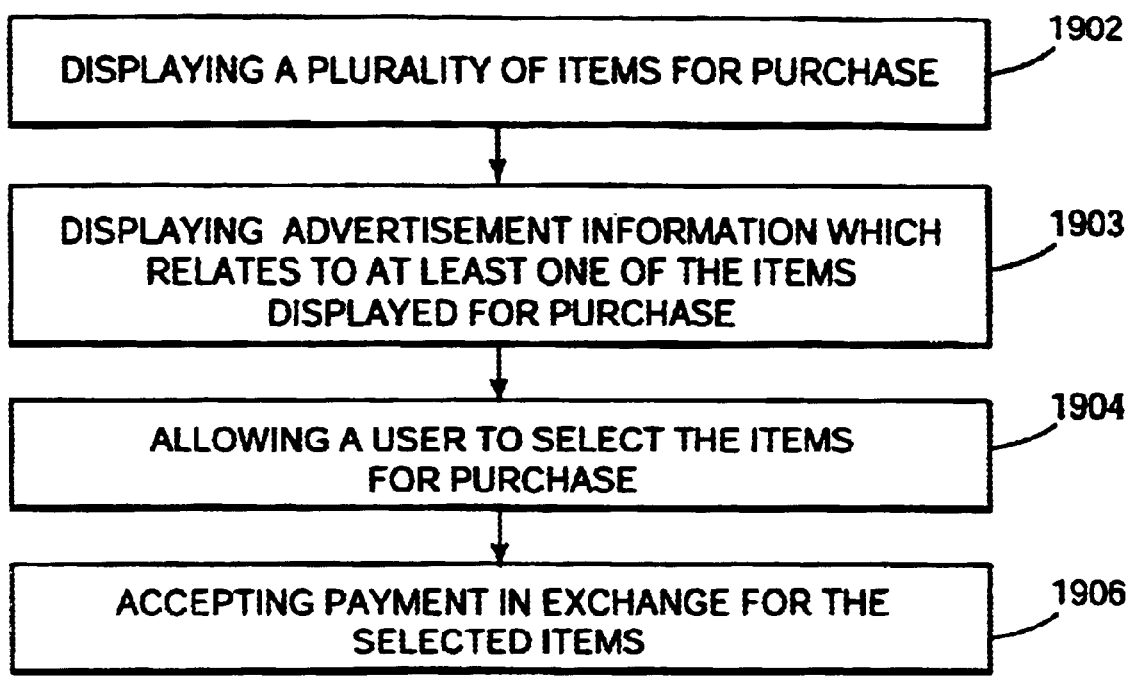
FIG. 19 is an illustration of one embodiment of the present invention for advertising in a virtual shopping environment.
Figure 19A:
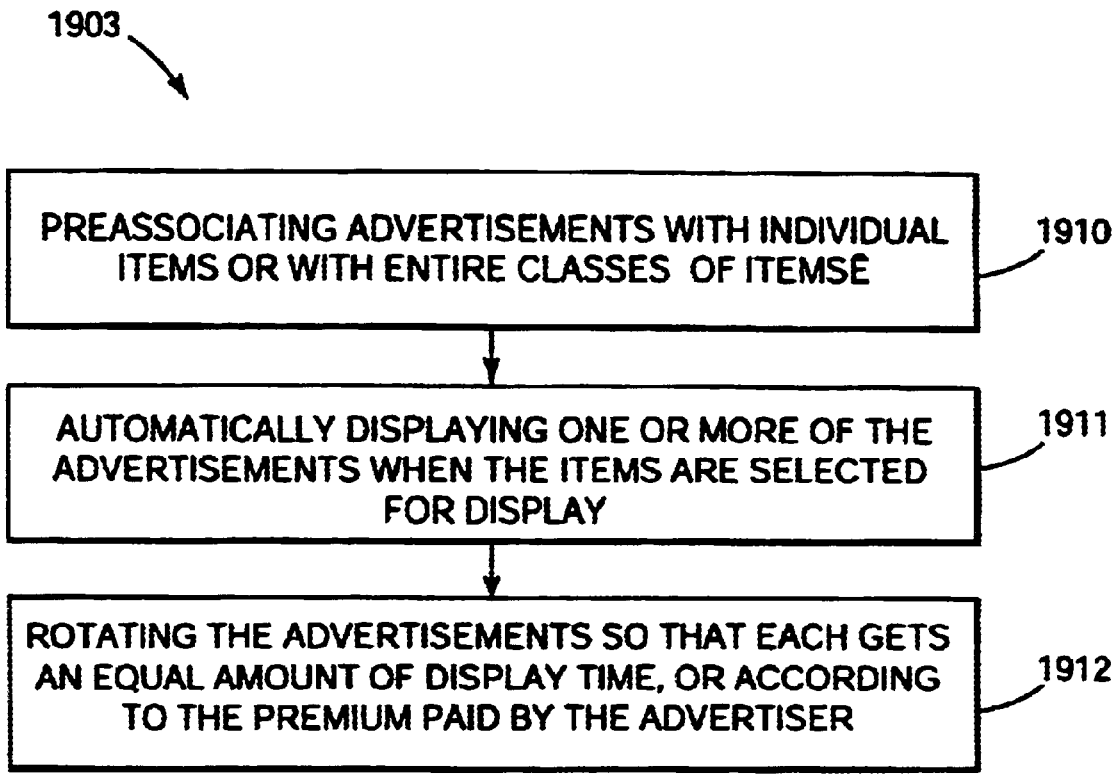
FIG. 19A is an illustration of one embodiment of the present invention for advertising in a virtual shopping environment.

Links all cross-selling, up-selling, advertisements, promotions to further detail or purchasing ability One embodiment of the electronic commerce component of the present invention is adapted for advertising in a virtual shopping environment in operation 1510 of FIG. 15. FIG. 19 illustrates the operation in more detail. In operation 1902, a plurality of items, i.e. products or services, are displayed for purchase. Along with the items being displayed for purchase, or on a subsequent page or pages, advertisement information which relates to at least one of the items displayed for purchase are displayed in operation 1903. FIG. 19A provides more detail of operation 1903. The advertisements are preferably preassociated with individual items or may be associated with an entire classes of items in operation 1910. When the items are selected for display, one or more of the advertisements is automatically displayed as well in operation 1911. In operation 1912, if there are many advertisements, the advertisements are rotated so that each gets an equal amount of display time, or according to the premium paid by the advertiser. A user is permitted to select the items for purchase, as indicated by operation 1904. Payment is then accepted in exchange for the selected items in operation 1905. While the virtual shopping environment is being used, advertisement information may be displayed which relates to at least one of the items for purchase and also relates to the user based on the profile of the user. This is particularly useful where the advertisements are being rotated. Then the advertiser would be billed based upon the number of times its advertisement was shown Note that the items each include at least one of a product and a service.

As an option, the advertisement information may further include promotion information or advertise another item separate from the item to which the advertisement information is related. As yet another option, the advertisement information is specifically tailored for the user based on a profile of the user. Further, cross-selling and up-selling based on a product or service, as well as of the user, may be provided. Ideally, all cross-selling, up-selling, advertisements, and promotions are linked to pages containing greater detail or to a purchasing area.

The use of advertising revenues to pay for information dissemination is well established in domains such as television and radio in which end users are tuned to a continuous signal over a lengthy period of time. In such systems, due to the continuous nature of the signal being monitored by the end users, the end users are sufficiently similar to a "captive audience" that many or most end users remain tuned to the same signal even when the main program to which they are listening or viewing is interrupted by advertisements.

Another example of advertising mixed with information dissemination is the use of scrolled text at the bottom of a television of computer screen, where the main program occupies most of the end user's visual field and a smaller portion is occupied by advertisements and the like on a "scroll bar" or similar visual device along the periphery of the screen. In some contexts, such as cable television channels that display a "stock ticker tape," this relationship is reversed: the information portion of the screen occupies a small part of the screen, such as horizontally scrolling image region at the top or bottom of the display and the remainder of the screen is occupied by advertisements, "infomercials" and the like.

Yet another example of mixing advertisements with information dissemination are newspapers and magazines.

Most, and perhaps all such examples of mixing advertisements with information content are based on systems in which the end user has actively elected to view or listen to a program or to otherwise receive information. Furthermore, in virtually all such systems or media, the juxtaposition or placement of advertisements and information content is explicitly programmed or determined by human beings working as "editors" or in a similar content and/or presentation editing capacity.

Distributing information via the Internet or other publicly accessible computer communication networks has been largely unsupported by advertising revenues due to the lack of good mechanisms for mixing advertising and information content in such a way as to be acceptable to both end users and advertisers. There are, of course, some exceptions where advertising/content mixtures from other contexts, such as newspapers and television, have been simply replicated on the Internet. For instance, some newspapers have been "published" at least in part on the Internet, and include advertisements along with information content. In fact, some newspapers sell advertising space on an associated World Wide Web (WWW) site, which often includes extensive listings of certain types of advertisements such as real estate advertisements, personal advertisements, and so on. Similarly, the scroll bar type advertisement at the bottom of a computer screen is based on similar advertising techniques used in cable television and other television contexts.

There are also examples of computer programs which contain advertisements. In all such examples known to the inventors, the advertisements are either permanently embedded in the computer programs or reside permanently with computer programs such that they cannot be easily updated.

Quote of Price and Availability

Displays list price

Displays promotional pricing based on product

Displays promotional pricing based on user

Displays user specific pricing

Handles multiple currency

Provides general availability

Provides user specific availability

Saves quote to be retrieved and maintained at later point

Adapts pricing for geographic markets

Passes quotes to channel partners

Determines credit available and terms

Provides web call-through for non-standard pricing

Figure 20:
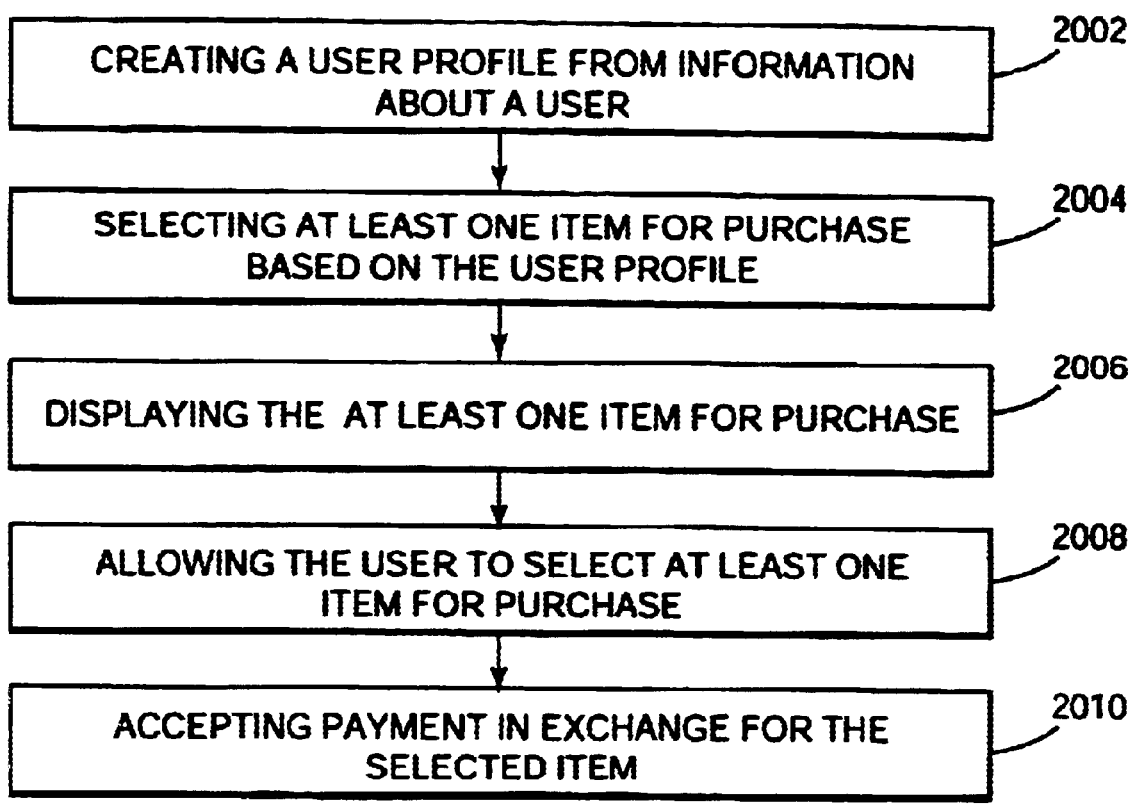
FIG. 20 is an illustration of yet another embodiment of the present invention.

Next provided is a method, system, and article of manufacture for selectively determining prices and availability of items, i.e. products or services, for purchase in a virtual shopping environment based on a user profile, as performed by operation 1512 of FIG. 15. FIG. 20 illustrates the operation in more detail. As shown in FIG. 20, in operation 2002, a user profile is created from input about a user. The user profile is preferably created in a manner that predicts buying tendencies. The virtual shopping environment is tailored automatically based on the user profile. A plurality of items (i.e., products or services) for purchase are displayed, as discussed above. One example would be selecting at least one item for purchase based on the profile of the user in operation 2004 and displaying those items before other items in operation 2006. For example, the items may be placed in groups, the groups being based on estimated buying tendencies. Then, items from the group most closely matching the user's buying tendency, as determined above, are displayed. Further, the user is allowed to select the items for purchase in operation 2008. Factors that are tailored include price and availability of the items. Payment is then accepted in exchange for the selected items in operation 2010, as discussed in more detail below.

The virtual shopping environment may be tailored by generating prices associated with the items based on the profile of the user. As an option, some or all of the prices may be promotional prices. The promotional prices may be offered based on the particular product or on the profile of the user. Further, available credit and the terms of receiving that credit may be produced based on the profile of the user.

The virtual shopping environment is further tailored by generating prices associated with the items based on a geographic location of the user, and may be designed to handle multiple types of currency. At least one of the prices that is generated may be stored and subsequently displayed during a subsequent use of the virtual shopping environment by the user. The virtual shopping environment may also be tailored by varying availability of the items based on the profile of the user.

The tremendous number of product types available to consumers at the retail level, e.g., in food and grocery, personal care, hardware and appliances, means that a retailer may have thousands of models or varieties of goods in inventory, each, of course, with a concomitant price. The result of this multitude of consumer products is that the control and consistency of pricing has assumed increasing importance, especially where retailing is highly competitive and price management is essential for a merchant to keep pace with competitors.

One area that has produced such a multitude of products and that has become a highly competitive selling environment is consumer appliances and electronics. Each type of product, e.g., a television set, is typically available from several different manufacturers, and each manufacturer typically produces several models of the same type product. The prices of products vary from manufacturer to manufacturer as well as within the same manufacturer's range of models, depending upon the particular specifications and features of each model within the product type. Moreover, each manufacturer sells its products through a large number of distributors and, ultimately, to retail stores, with the result that the pricing of the same product can differ from distributor to distributor, from retailer to retailer and from geographic market to geographic market. Even within a single merchant's inventory, price variations on an individual product occur, e.g., an advertised special versus the "regular" price.

To keep pace with competitors, a merchant may obtain pricing information by reviewing competitors' advertisements, printed or otherwise, by actual shopping of competitors and viewing of price tags in a competitor's store or outlet, or from a customer at the point of sale who claims that a certain product can be purchased from a competitor for a certain (i.e., lower) price. "Sale" prices are particularly problematic as such prices are typically only valid for a defined period, after which the "sale" price reverts to the "regular" price. If a merchant wishes to change prices in response to a competitor's price, usually special effort is required to change price tags at points of sale to meet or "beat" the competitor's price. The manual nature of the process does not permit prices to change frequently, such as once or twice per day. Such frequency is prohibitive, and thus, a merchant cannot respond daily to market price changes involving hundreds to thousands of products. Moreover, keeping track of the valid period for "sale" prices adds yet another layer of complexity. Further, if a competitor's pricing becomes known at the point of sale, the salesperson must determine if he or she is willing to sell the product for a lower or the same price, (i.e., in accordance with the merchant's pricing policy).

Various pricing systems are known, although virtually none implement complex pricing policies. Many systems, especially in the stock brokerage area, will provide market pricing of stocks. While these systems can accommodate a continually changing price situation, the actual pricing, of course, is independent of the system, i.e., pricing is controlled by the stock market.

The current wide-ranging use of computer systems provides a relatively large potential market to providers of electronic content or information. These providers may include, for example, advertisers and other information publishers such as newspaper and magazine publishers. A cost, however is involved with providing electronic information to individual consumers. For example, hardware and maintenance costs are involved in establishing and maintaining information servers and networks. In addition, labor costs are involved in keeping the information in the servers current.

One source which can be accessed to provide the monetary resources necessary to establish and maintain such an electronic information network is the individual end users which consume the electronic information. This electronic information, however, has different value to different users. For example, some users will be very accepting of advertising as part of the electronic information, whereas others will be opposed to receiving advertisements. Thus, it would be beneficial to provide a system which allows individual users to control the amount of electronic advertising they receive with their electronic content.

In addition, providers of electronic advertisements would be able to subsidize the cost of electronic content for end users. The amount of this subsidy would be dependent on the amount of electronic advertising which is consumed by the end users and the perceived quality of these consumers. Thus, it would be beneficial to provide a system which allows the providers of electronic advertisements to provide advertising-based subsidization of electronic content consumption, based upon the perceived quality of consumers who have specifically chosen to consume these advertisements, cognizant of the fact that consuming these advertisements will subsidize their electronic content consumption fees.

Order Placement
    Collects user information for order processing (shipping, billing)
    Recaps order for confirmation (shipping, price, availability)
    Allows for order maintenance (qty, product, shipping)

Referring to operation 1514 of FIG. 15, another embodiment of the electronic commerce component of the present invention receives an order for at least one of the products and services. User information is collected for order processing, including an address for delivery and billing. In the alternative, a user may enter an alphanumeric code representative of a source of currency, such as a credit card number or bank account number. Optionally, the user may be allowed to select a shipping provider other than a default provider. The availability of the desired product is confirmed, as are the price and shipping arrangements. As an option, the invention may require the user to confirm that the desired product or service has been ordered, that the price is satisfactory, and that the desired shipping provider is selected.

Tax and Shipping Calculations
    Provides tax cost on associated order
    Provides shipping cost on associated order
    Handles multiple tax laws within US
    Handles multiple tax implication globally As shown in FIG. 15, operation 1516 calculates at least one of a tax and a shipping fee for at least one of the items, i.e., products and services, for which the order is received. The tax cost for each order is calculated, and may include a listing of the tax per item. The shipping costs for each item or order may also be calculated, such as by taking into account handling costs, the total weight of the items, the distance to final destination of the items, and the corresponding charges of the shipping provider. An estimate of the delivery date may also be given. It should be noted that mileage and the like could be calculated where services are to be rendered at a location remote to the provider.

Optionally, mathematical formulas based on multiple applicable tax laws may be used in the calculation of the tax. Such applicable tax laws may include only domestic taxes for domestic delivery, and may include applicable foreign tax laws for imported and exported items.

Transaction Processing Capabilities
    Processes credit card transactions
    Processes purchase order transactions on backend systems
    Places actual order with fulfillment house for physical shipping
    Sends electronic fulfillment to the user
    Provides order confirmation and tracking number
    Supports micropayment processing Another embodiment of the invention processes transactions pertinent to the purchase of items. For example, credit card transactions are processed, as are purchase order transactions. A structured payment plan may also be created. The actual order is placed with a fulfillment house for physical shipping of a product, or the order is placed with a provider of an ordered service. Optionally, notification may be sent to the user to notify the user that the transaction is being completed or confirmation that the order has been completed. Also optionally, a tracking number may be sent to the user for assisting a user to determine the shipping status of a product.

Also envisioned is a quick-stop mass retail system which enables purchasers to order and purchase articles from a remote location for pickup at an article pickup area at an automated store.

In accordance with the above, the present invention may provide a quick-stop mass retail system for ordering and purchasing articles from a remote location for pickup at an article pickup area at an automated store, comprising: an interactive system for communicating a customer's purchase order for at least one article; a host computer including provisions for receiving the customer's purchase order; processing the customer's purchase order; and storing the customer's purchase order in a database; a system for retrieving the article ordered by the customer from a storage location for the article at the automated store, the host computer communicating with the system for retrieving; a system for retrieving identification information from the customer, the system for retrieving identification information communicating with the host computer, whereby the host computer enables the system for retrieving the article to provide the article to the article pickup area upon obtaining the identification information and comparing the identification with the customer's purchase order.

The quick-stop mass retail system may further include a system to enable a plurality of articles stored in a plurality of storage locations associated with the automated store to be retrieved, including a network of dispensing stations interconnected by at least one device for transporting the articles from the storage locations to the article pickup area.

The quick-stop mass retail system may also have a system for detecting when inventory is to be restocked including, the system for detecting communicating with the host computer such that the host computer initiates a purchase of additional inventory in response to the low inventory detection, The quick-stop mass retail system may have the host computer track inventory of the articles to enable restocking of the respective storage locations when detecting inventory below a certain level.

In accordance with a specific embodiment of the invention, there is disclosed a quick-stop mass retail system for ordering and purchasing articles from a remote location for pickup at an article pickup area at an automated store, comprising: an interactive system for communicating purchase information to the customer and communicating the customer's purchase order for at least one article; a host computer including provisions for receiving the customer's purchase order; processing the customer's purchase order; and storing the customer's purchase order in a database; a system for retrieving the article ordered by the customer from a storage location for the article at the automated store, the host computer communicating with the system for retrieving, wherein a plurality of articles are stored in a plurality of storage locations associated with the automated store and the system for retrieving the articles includes a network of dispensing stations interconnected by at least one apparatus for transporting the articles from the storage locations to the article pickup area; a system for retrieving identification information from an identification card or code associated with the customer, the system for retrieving identification information communicating with the host computer, wherein the storage locations include a system for detecting when inventory is to be restocked, the system for detecting communicating with the host computer such that the host computer initiates a purchase of additional inventory in response to the low inventory detection, whereby the host computer enables the system for retrieving the article to provide the article to the article pickup area upon obtaining the identification information and comparing the identification with the customer's purchase order.

The present invention also encompasses a method for ordering and purchasing articles from a remote location for pickup at an article pickup area at an automated store, comprising:
(a) communicating a customer's purchase order for at least one article via an interactive electronic network;
(b) receiving the customer's purchase order at a host computer in communication with the interactive electronic network;
(c) processing the customer's purchase order and storing the purchase order in a database;
(d) retrieving identification information from an identification card or code associated with the customer with a system for retrieving information communicating with the host computer; and
(e) retrieving the article ordered by the customer from a storage location for the article at the automated store by a system for retrieving articles communicating with the host computer and delivering the article to the article pickup area.

The method can further comprise the step of the host computer detecting an inventory level threshold below which inventory of the article is to be restocked.

Electronic License Distribution and Management

Tracks user license entitlements

Creates an electronic license entry on backend systems

Sends electronic license to user

Figure 21:
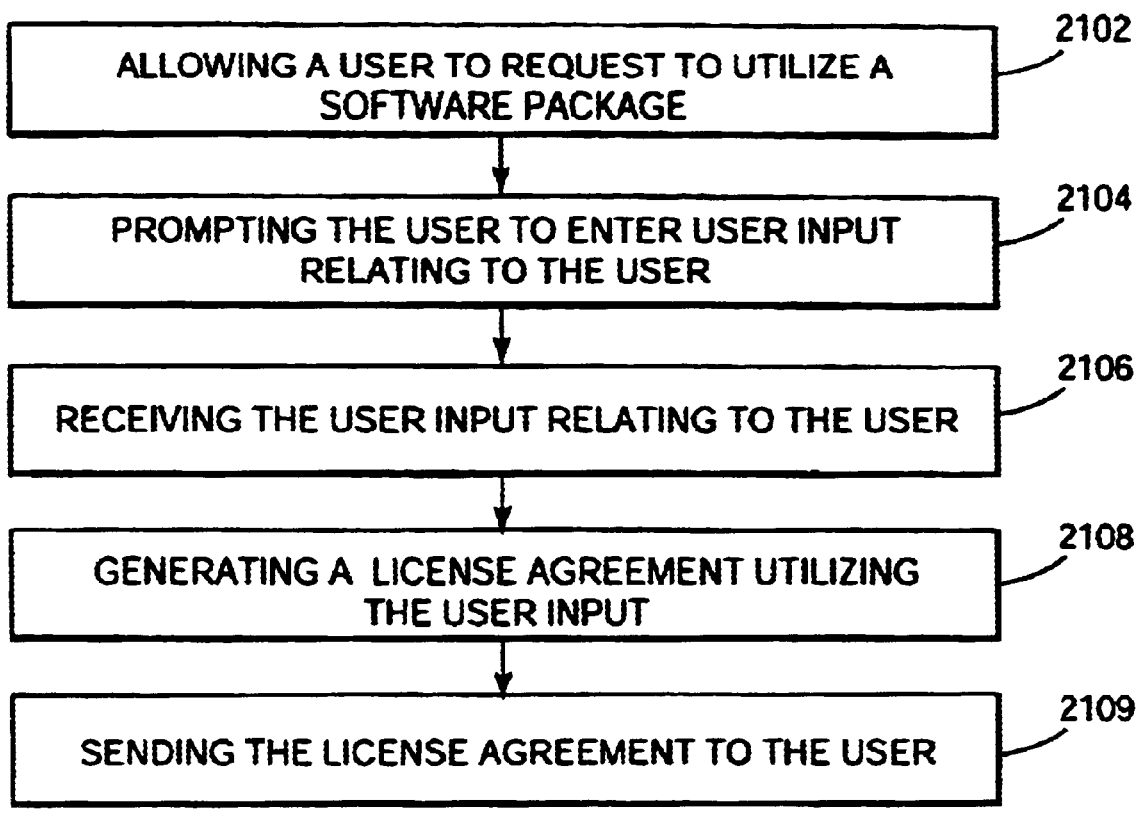
FIG. 21 is an illustration of one embodiment of the present invention for automatically generating a contract between an owner of software and a user of the software.
Figure 21A:
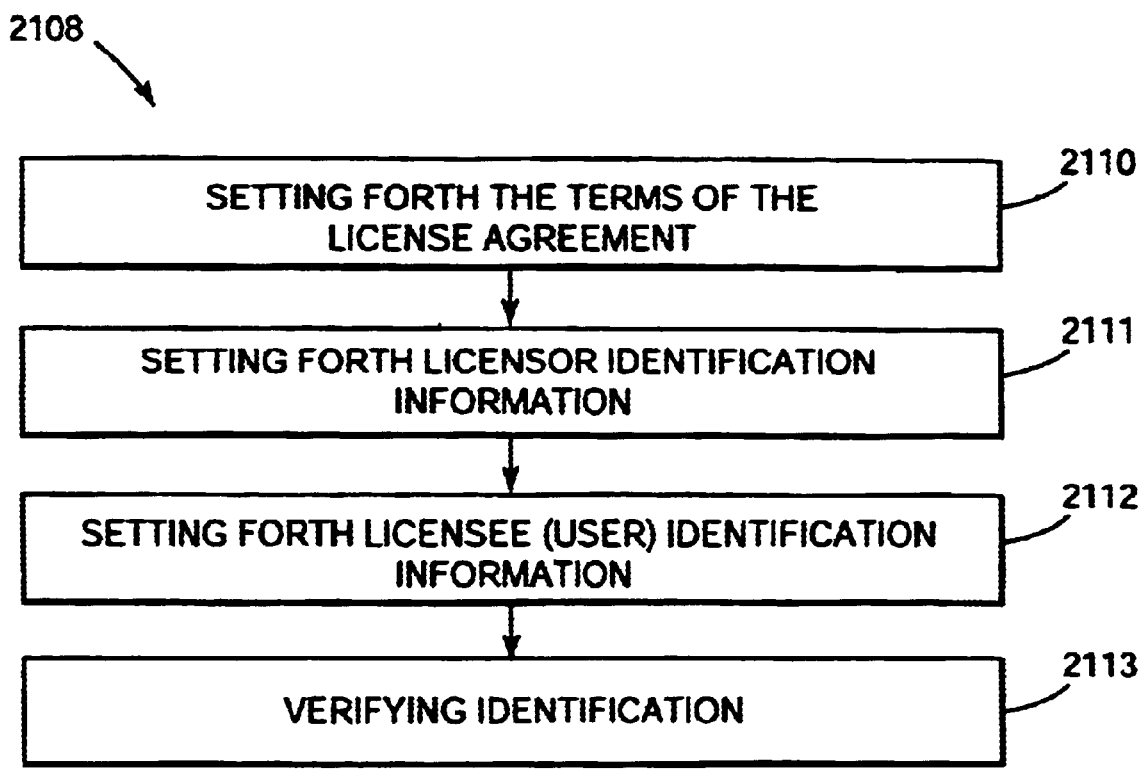
FIG. 21A is an illustration of one embodiment of the present invention for automatically generating a contract between an owner of software and a user of the software

As shown in FIG. 21, a method, system, and article of manufacture is provided for automatically generating a contract between an owner of software and a user of the software. First, in operation 2102, a user is allowed to request to utilize a software package after which user input relating to the user is requested and received. See operation 2104 and 2106, respectively. Such information may include identification information such as name, address, etc. In operation 2108, a tailored license agreement is then generated by utilizing the user input. FIG. 21A illustrates a procedure for performing operation 2108. In operation 2110, the terms of the license agreement are set forth. Licensor identification information is included in operation 2111. Licensee (user) identification information is set forth in operation 2112. Optionally, verification of identification may be performed in operation 2113, such as prompting a user to enter his or her telephone number and cross referencing the input number with telephone listings.

As an option, the license agreement may be sent to the user via electronic mail or the like in operation 2110. The present invention may further track entitlements of the user granted under the license agreement. The user may even be prevented from utilizing the software until the license agreement is generated.

Most software vendors currently favor licensing as the preferred method of distributing software. Licensing software provides the vendor with a certain amount of control over the distributed software which may be used to the vendor's advantage. For example, licensing software allows the vendor to prohibit unauthorized usage of the software that might facilitate unauthorized copying. In addition, licensing provides an advantageous method of providing and billing for software. Through licensing, the vendor may sell several identical copies of the same software and charge the buyer for each copy.

Licensing schemes have adapted to the network environment as well as the individual personal computer. In a network environment, such as a client-server network, multiple users may access the same copy of a particular application. Consequently, the vendor can charge the network owner not for the number of copies installed on the network, but for the number of users having access to the software.

Software is conventionally licensed using an agreement between the vendor and the user or administrator. The agreement is typically either a conventionally signed contract or a "shrink wrap" agreement attached to the packaging for the software, to which the licensee acknowledges agreement by opening the package.

Although traditional licensing and shrink wrap licensing are more or less applicable to licensing for individual systems, they are not well-suited to the network environment. Both traditional and shrink wrap licensing schemes are difficult to enforce on a network where several users have access to the software. Consequently, various electronic systems have been devised for controlling access to software on a network.

Electronic licensing typically comprises providing a set of criteria under which a request for an application from the server should be granted. One licensing system uses a fixed set of licenses controlled by a license server. The license information is maintained in a license database, along with information regarding which applications are in use and how many units are still available. The information in the database may be encrypted to prevent forgeries. When an application is desired, the application commences running. Code embedded in the application initially requests a license from the server to facilitate the execution of the application. The server checks the database of licenses, and if the appropriate licenses are available, grants the request. As requests are received and licenses granted, the relevant information is logged into a file to track usage of the various applications.

If a license is not available, the client contacts another server to find the appropriate license. The client in the conventional system has the responsibility to obtain licenses from the various servers, and the individual servers provide resources at the client's request. To facilitate such licensing, the application typically includes a library of programs designed to contact the server, request a license, and track the resulting license.

When a call is made to a server, all of the execution occurs on each individual server for any particular call. Similarly, if a license is located on a particular machine, all execution necessary to operate on that license occurs on that machine. Consequently, a central server containing most of the licenses available on a particular network is mainly responsible for maintaining the licenses.

In addition, conventional licensing systems rely on code embedded in the application to establish the licensing attributes. Code is placed in the application which interprets information received from the server to establish licensing parameters. Because the behavior of the license is not established until after the request has been made and the license obtained, the user cannot read the license terms prior to the request. In addition, this system lacks flexibility. To change the licensing terms, the code in the application must be revised.

Recently, generation and sales of software programs have become significant businesses both for companies which are primarily vendors of hardware, as well as for companies which vend software alone. Software is typically sold under license, that is, vendors transfer copies of software to users under a license which governs how the users may use the software. Typically, software costs are predicated on some belief as to the amount of usage which the software program may provide and the economic benefits, such as cost saving which may otherwise be incurred, which the software may provide to the users. Thus, license fees may be based on the power of the processor or the number of processors in the system, or the number of individual nodes in a network, since these factors provide measures of the number of users which may use the software at any give time.

In many cases, however, it may also be desirable, for example, to have licenses and license fees more closely relate to the actual numbers of users which can use the program at any given time or on the actual use to which a program may be put. Furthermore, it may be desirable to limit the use of the program to specified time periods. A problem arises particularly in digital data processing systems which have multiple users and/or multiple processors, namely, managing use of licensed software to ensure that the use is within the terms of the license, that is, to ensure that the software is only used on identified processors or by the numbers of users permitted by the license.

A network environment for computers permits several computers or terminals to use or have access to one or more programs. Traditionally, an end user would have to obtain a license from a software vendor to authorize use of the vendor's software on terminals or workstations, within the network.

One method for providing access to software is known as the single-CPU or single processor license, wherein a software program is locked to a specific CPU and access to that software is only permitted from the particular licensed computer. A single-CPU license may create instances where software is unavailable to all users because the computer is not functioning or because several users want to use the software at the same time. To assure wide access, end users frequently must obtain unneeded CPU-locked software to assure availability and convenience. Companies with but a few users of a particular software program generally choose a CPU-locked system because it is, in effect, priced proportionately to the number of users.

The second general method to provide access to software is known as site-licensing. With this method, a software program is available for all the computers at an installation. The number of users who may run a software package concurrently under a site license is theoretically limited only by the number of users in the computing environment. Although site-licensing may ease administrative and operational problems for an end user, it normally does so at a premium price which takes into account the lack of accountability that such flexible licensing provides. A site license imposes unneeded costs where only a few users of a company actually need the software.

In the instance where a software vendor offers a choice between CPU-locked and site licensed software, it is the number of expected users at a purchasing company which affects the purchasing choice. If many of the end users at a company intend to use the software, for example, then a site license may be the most appropriate distribution system because it may be the low-cost option. If the software only will be used by a few workers, however, then a CPU-locked distribution system may be more appropriate. The trade-off point is determined by the relative pricing between the two distribution systems.

For environments where many users need the software but only spend a portion of their time using it, neither a dedicated CPU-locked license nor a site license may be cost effective. In such a case, a user who needs more than a single copy of the software may not buy it, thus depriving a vendor of potential revenue. Similarly, vendors lose potential revenue when they permit a company with a very large number of users to use software over an entire site, due to a general lack of accountability.

As computers have proliferated in availability, the investment in computer software has also grown, and there have been developed various methods for charging the computer user for use of computer software products. Typically computer software products are licensed, rather than sold, to the computer user under various arrangements. The simplest common license arrangement gives the user the right to use a software product on a single computer, i.e., to employ only one central processing unit (CPU) in connection with operation of the software product.

Although many such licenses are for indefinite periods of time, a license may also be for a limited duration and extendable, so that the entity marketing the product can charge a periodic fee (for example, annually) for use of the software product. Or use may be absolutely time-limited (for example, one-day), so that the user may evaluate the software product for possible purchase of a regular license. Since software can be copied and moved easily from one like machine to another, companies have invented methods to prevent unauthorized use of their software products. Some licensors require passwords to activate software on a particular machine. The password may be keyed to the hardware's identification number as a condition for operation of the software. Such systems can effectively lock software to a particular machine, but do not address software that is licensed for concurrent or simultaneous use. Some licensors use hardware locks that attach to a parallel printer port or a serial port on a machine; each time the software is activated, it looks for a specified code, in the hardware lock, as a condition for operation of the software. Using hardware locks resolves the problem of unauthorized moving of software among machines; however, hardware locks do not handle multiple software products on a single machine, and they require time and expense to deliver to the end user.

When computer software products are used in a network environment (which may include computers running in various roles as workstations and servers of various types linked together over a data path), additional licensing challenges are present. For example, a network may permit a user at one node (which may be a terminal or workstation, for instance) to utilize a software product running at another node (which may be the network server or even another workstation). Consequently, the terms of the single-computer type of software license might not cover the usage of the software product on the network, or worse still (from the point of view of the licensor) might actually permit such a usage without additional compensation to the licensor. One approach to network licensing is to grant permission to use the program based on all of the nodes on the network, and to require a license for each node. Then typically the license fee may be increased as the number of nodes on the network increases. Another approach bases the license fee for a software product running on a network on the total number of individual users who might actually run the software, regardless of the number of nodes either on the network or running the software product at a given time. These approaches, however, have usually required the cooperation of the licensee, because additional nodes may be added to the network, or additional users may utilize the software, without the knowledge of the licensor, who is typically not present on the premises of the licensee. The licensor may reserve the right to audit the licensee's site, but such an audit is intrusive, expensive, and may alienate potential or actual customers for licenses. Although other approaches exist under which one might charge a single fee per server or per site or per entity, often on an individually negotiated basis, these approaches are often impractical or inflexible, in that they also typically do not take into account the possible wide variation over time in the number of nodes or users and also require reliance on licensee cooperation.

Recently it has become practical in some network environments to determine and limit the number of nodes that may access a software product at a given time, and to charge a license fee based on the maximum number of nodes that are permitted to use the software product concurrently.

This is called "concurrent licensing". In these environments, a computer program, acting as "librarian" and running on a computer node designated as a license server, is typically used to distribute license keys (sometimes called "tokens") over the network to nodes requesting access to run a software product; the number of keys is tracked by the librarian; and if at a given time, the permitted maximum number of keys would be exceeded by usage of the software product on a requesting node, the node can be denied, at such time, access to invoke the software product.

Examples of software-based concurrent licensing arrangements may be found in Unix applications running in connection with software products sold under the trademarks NetLS (available from Gradient Technologies, Inc., 577 Main Street, Suite 4, Hudson, Mass. 01749), and SunLic (available from Sun Microsystems, Inc., Mountain View, Calif.), and Flexible License Manager (available from Highland Software, Inc., 1001 Elwell Court, Palo Alto, Calif. 94303).

WAF can securely manage the integration of control information provided by two or more parties. As a result, WAF can construct an electronic agreement between WAF participants that represent a "negotiation" between, the control requirements of, two or more parties and enacts terms and conditions of a resulting agreement. WAF ensures the rights of each party to an electronic agreement regarding a wide range of electronic activities related to electronic information and/or appliance usage.

Electronic Agreements and Rights Protection

An important feature of WAF is that it can be used to assure the administration of, and adequacy of security and rights protection for, electronic agreements implemented through the use of the present invention. Such agreements may involve one or more of:

(1) creators, publishers, and other distributors, of electronic information, (2) financial service (e.g. credit) providers, (3) users of (other than financial service providers) information arising from content usage such as content specific demographic information and user specific descriptive information. Such users may include market analysts, marketing list compilers for direct and directed marketing, and government agencies, (4) end users of content, (5) infrastructure service and device providers such as telecommunication companies and hardware manufacturers (semiconductor and electronic appliance and/or other computer system manufacturers) who receive compensation based upon the use of their services and/or devices, and (6) certain parties described by electronic information.

WAF supports commercially secure "extended" value chain electronic agreements. WAF can be configured to support the various underlying agreements between parties that comprise this extended agreement. These agreements can define important electronic commerce considerations including:

(1) security,
(2) content use control, including electronic distribution,
(3) privacy (regarding, for example, information concerning parties described by medical, credit, tax, personal, and/or of other forms of confidential information),
(4) management of financial processes, and
(5) pathways of handling for electronic content, content and/or appliance control information, electronic content and/or appliance usage information and payment and/or credit.

WAF agreements may define the electronic commerce relationship of two or more parties of a value chain, but such agreements may, at times, not directly obligate or otherwise directly involve other WAF value chain participants. For example, an electronic agreement between a content creator and a distributor may establish both the price to the distributor for a creator's content (such as for a property distributed in a WAF container object) and the number of copies of this object that this distributor may distribute to end-users over a given period of time. In a second agreement, a value chain end-user may be involved in a three party agreement in which the end-user agrees to certain requirements for using the distributed product such as accepting distributor charges for content use and agreeing to observe the copyright rights of the creator. A third agreement might exist between the distributor and a financial clearinghouse that allows the distributor to employ the clearinghouse's credit for payment for the product if the end-user has a separate (fourth) agreement directly with the clearinghouse extending credit to the end-user. A fifth, evolving agreement may develop between all value chain participants as content control information passes along its chain of handling. This evolving agreement can establish the rights of all parties to content usage information, including, for example, the nature of information to be received by each party and the pathway of handling of content usage information and related procedures. A sixth agreement in this example, may involve all parties to the agreement and establishes certain general assumptions, such as security techniques and degree of trustedness (for example, commercial integrity of the system may require each WAF installation secure subsystem to electronically warrant that their WAF node meets certain interoperability requirements). In the above example, these six agreements could comprise agreements of an extended agreement for this commercial value chain instance.

WAF agreements support evolving ("living") electronic agreement arrangements that can be modified by current and/or new participants through very simple to sophisticated "negotiations" between newly proposed content control information interacting with control information already in place and/or by negotiation between concurrently proposed content control information submitted by a plurality of parties. A given model may be asynchronously and progressively modified over time in accordance with existing senior rules and such modification may be applied to all, to classes of, and/or to specific content, and/or to classes and/or specific users and/or user nodes. A given piece of content may be subject to different control information at different times or places of handling, depending on the evolution of its content control information (and/or on differing, applicable WAF installation content control information). The evolution of control information can occur during the passing along of one or more WAF control information containing objects, that is control information may be modified at one or more points along a chain of control information handling, so long as such modification is allowed. As a result, WAF managed content may have different control information applied at both different "locations" in a chain of content handling and at similar locations in differing chains of the handling of such content. Such different application of control information may also result from content control information specifying that a certain party or group of parties shall be subject to content control information that differs from another party or group of parties. For example, content control information for a given piece of content may be stipulated as senior information and therefore not changeable, might be put in place by a content creator and might stipulate that national distributors of a given piece of their content may be permitted to make 100,000 copies per calendar quarter, so long as such copies are provided to boni fide end-users, but may pass only a single copy of such content to a local retailers and the control information limits such a retailer to making no more than 1,000 copies per month for retail sales to end-users. In addition, for example, an end-user of such content might be limited by the same content control information to making three copies of such content, one for each of three different computers he or she uses (one desktop computer at work, one for a desktop computer at home, and one for a portable computer).

Electronic agreements supported by the preferred embodiment of the present invention can vary from very simple to very elaborate. They can support widely diverse information management models that provide for electronic information security, usage administration, and communication and may support:

(a) secure electronic distribution of information, for example commercial literary properties,
(b) secure electronic information usage monitoring and reporting,
(c) secure financial transaction capabilities related to both electronic information and/or appliance usage and other electronic credit and/or currency usage and administration capabilities,
(d) privacy protection for usage information a user does not wish to release, and
(e) "living" electronic information content dissemination models that flexibly accommodate:
  (1) a breadth of participants,
  (2) one or more pathways (chains) for: the handling of content, content and/or appliance control information, reporting of content and/or appliance usage related information, and/or payment,
  (3) supporting an evolution of terms and conditions incorporated into content control information, including use of electronic negotiation capabilities,
  (4) support the combination of multiple pieces of content to form new content aggregations, and
  (5) multiple concurrent models.

Order Status and History

Provides real-time order status (backorders)

Provides real-time shipping status

Provides real-time invoice status

Provides history of previous orders and delivery information

Ensures proactive notification of order/shipping problems

Referring to operation 1518 of FIG. 15, a status of delivery is output for at least one of the products and services for which the order is received. The order status of a desired order may be checked in real time, especially useful when products are backordered or services have been delayed. Once the items have been shipped, the shipping status may be provided, such as by requesting that the user input a tracking number and retrieving data concerning that number from the shipping provider and displaying the result. Further, the status of an invoice may be checked in real time for, for example, permitting a user to determine whether a payment has been received and the like.

Any problems encountered relating to the order or shipping of the order are result in proactive notification of the problem to the user. As an option, the history of previous orders and related delivery information may be provided.

Lead Generation and Referral

Captures interest in a product or promotion

Sends leads to sales effectiveness systems

Updates database of leads

Another aspect of the electronic commerce component of the present invention has the purpose of capturing interest in a product, service, or promotion. The invention sends leads, notices, and advertisements to sales effectiveness systems where the leads are displayed or disseminated to users. A database of the leads may be kept and updated as desired.

Auction Capabilities

Facilitates dynamic auction creation

Allows private and public auctions

Supports multiple auction formats (e.g. Dutch, Reserve)

Allows tracking and analysis of auction histories

The electronic commerce component of the present invention may include an auction component for permitting a user to bid on an item against competing bidders. The auction component would permit private and public auctions, and could even permit users to create their own auctions. The auction component should permit selection of an auction format from several different formats, including, for example, Dutch and Reserve auctions. Further, tracking and analysis of auction histories could also be provided.

Economic activity has at its centerpiece the buyer-seller transaction for all goods and services produced and consumed in a market economy. It is the fundamental mechanism to which resources are allocated to producers and output to consumers. The operation of the buyer-seller mechanism can and often is a critical determination of economic efficiency and when operated properly, will substantially enhance market performance.

Through history, there have been many different approaches adopted to fairly bring buyers and sellers together, each with the key objective of permitting transactions at or as close as possible to the "market" price of the goods. By definition, the market price is the price (in given currency terms) that a fully educated market, given full access will transact select goods. This can only be accomplished by permitting full access to the transaction by essentially all potential buyers and sellers. However, the buyer-seller transaction must be structured to operate at very low costs—or it will distort the market price of goods with the artificially high transactions costs. Thus, as can be seen, the two keys to effective buyer/seller transactions—full access and knowledge coupled with low costs—can be and are often conflicting, necessitating trade-offs between trading efficiency and market knowledge.

One well-known and particularly successful trading system is known as the "open outcry auction". This involves a process wherein buyers and sellers collect in one location and prices for select goods are presented to the group through a broker, via simple vocal offerings. This approach has been used for almost all kinds of goods, but is particularly useful where there are no established trading locations or markets for the selected items. It is the dominate trading forum for exotic items such as rare pieces of art and the like. Although successful in bringing interested parties to the transaction, the overall process can be very expensive, adding significantly to the market-distorting transaction costs.

Open outcry auction techniques, modified over time, have also found successful application in many commodity trading activities, including the buying and selling of farm produce and livestock, oil and commodities contracts, future contracts on a variety of items and—particularly germane to the present invention—fixed income securities. These trading activities focus on the buying and selling of essentially fungible items, that is, items that are without meaningful differentiation from like items on the market. For example, a bushel of wheat for February delivery is considered for sale and delivery at a price independent from its source. Similarly, a 30-year treasury bond paying a coupon rate of 8 percent and having a July 1996 issue date is indistinguishable from other 30-year treasuries having the same properties. Accordingly, the price buyers are willing to pay and sellers willing to accept defines the market price of all 30-year treasury bonds of that same vintage, allowing a source transparent application of open outcry auction trading.

The fixed income securities issued by the United States Government are known as U.S. treasuries. These instruments typically span maturity terms at issue of 13 to 52 weeks (T-bills), one to ten years (notes), and up to 30 years (bonds). The T-bills are pure discount securities having no coupons. Almost all other treasuries having longer terms are coupon notes or bonds, with a defined payment cycle of semi-annual payments to the holder.

Treasuries have characteristic properties that make them especially useful for the purpose of the present invention and, therefore, are used exclusively in the following discussions with the fundamental tenant that the principles may be applied to other types of fixed income securities without departing from the inventive concepts. One important attribute of treasuries, in the context of the present invention, is the minimal and uniform default risk; the issuance of U.S. government paper removes the default risk as a defining criteria in the relative pricing of treasuries in the market place when they are backed by the full faith and credit of the U.S. government.

New treasury securities are auctioned by the U.S. government at preestablished auction dates. The auction prices for the treasuries having a face value with a set coupon rate will define the issuance yields of the security. After the auction, the treasuries enter the secondary market and are traded typically "over the counter",i.e., without a defined exchange. As inflation expectations and supply and demand conditions change, the prices of the recently auctioned treasuries fluctuate on the secondary market. These new prices are reflected by competing bid and ask prices communicated among institutions, banks, brokers, and dealers in the secondary market. For example, the yield of a treasury note increases as its price drops in the market, typically reflecting an overall increase in the interest rates for that term of security.

The newly auctioned securities are traded with and in conjunction with the securities issued in earlier auctions. In this context, some securities are traded more often than others and are called the "actives"; the actives usually correspond to the recently issued securities as opposed to the older securities in the market. Indeed, some older securities are infrequently traded, creating an illiquid market that may or may not reflect the current market-determined interest rate for that maturity length security.

As can be realized by the foregoing description, the very size and diversity of the treasury market implicates an unprecedented level of sophistication by market participants in the bidding, offering, buying, and selling transactions involving these securities. The very complexity associated with the transactions and the scale of trading undertaken by banks, brokers, dealers and institutional participants necessitates a rigidly structured approach to trading.

In the past, open outcry auction bond brokering has served its customers well, providing highly efficient executions at near perfect market pricing. The open outcry auction applied to bond trading was implemented by a broker working with a collection of customers to create and manage a market. Typical customer representatives—both buyers and sellers—at a common location (e.g., a single room) where the representatives of the customers would communicate with each other to develop pricing and confirm transactions. This process employed the expression by the representatives of various bid and offer prices for the fixed income security at select volumes (i.e., how many million dollars of bonds at a given maturity). This expression would involve the loud oral "cry" of a customer-proposed bid or offer and the coordination with the fellow representatives regarding the extraction of complimentary positions—until a transaction match is made and a deal is done. This "trade capture" process relies on after-the-fact reporting of what just transpired through the oral outcry trade.

Recently, the trade capture process was performed by having designated clerks input data into electronic input devices. An input clerk would attempt to interpret the open outcry of many individual brokers simultaneously who sequentially are making verbally known their trading instructions of their customers. The quality of the data capture was a function of the interpretative skill of the input clerk, and the volume and the volatility of customer orders. A significant drawback to this type of auction data capture process is the difficulty in discerning the distinct trading instructions verbalized in rapid succession during a quickly moving market, so that an accurate sequence of data can be captured by brokers and a set of inputters.

The many permutations of this process will be discussed in some detail below. At this juncture, suffice to say that at the volumes of business transactions existing at the time of its development, and the lack of suitable alternatives, left this process as the dominate trading mechanism for decades. However successful, this approach was not perfect. Indeed, in recent years, some of the problems in a open outcry auction forum have been amplified by the vastly increased level of trading now undertaken in the fixed income field. Without attempting to be comprehensive, difficulties would occur by the injection of trader personalities into the open outcry auction process. For example, an aggressive—highly vocal representative may in fact dominate trading—and transaction flow—even though he/she may only represent a smaller and less critical collection of customers. Although such aggressive actions at open outcry auction may be beneficial to those particular customers in the short run, overall, such dominance of the trading can and will distort pricing away from the actual market conditions.

Other problems exist in open outcry auction that deplete efficient trading. The speed at which trading flows and the oral nature of the auction process injects a potential for human error that often translates into many millions of dollars committed to trades unrelated to customer objectives. As such, the broker is left at the end of each trading day with a reconciliation process that may, under certain market conditions, wipe out all associated profit from that day's trading. Also, customers may quickly change direction regarding trading, based on new information available to the market.

Shifting position or backing out of previously committed transactions on very short notice is often very difficult in the traditional open outcry auction process.

First, in brief overview, the present invention is directed to a data processing system for implementing complex trading rules in support of select transactions. The first aspect of the invention relates to a particular hardware arrangement that provides a specifically tailored platform for processor enhanced and supported trading. This hardware arrangement encompasses a plurality of custom designed workstations linked together for communication. Each workstation is linked to a central server that orchestrates the trading processes in accordance with program controlled logic. The workstation includes a display for presentation of the particulars of trading activity. A customized keypad permits enhanced data/position entry by the broker.

The second aspect of the invention is the governing logic for controlling system dynamics. This logic is stored in system memory and provides the sequence of protocols and rules that allocate trading priority, and the system responses to operative commands entered by the brokers at the workstations. The system logic is critical on two levels. First, it is important as the guiding principles underlying the system and thus performance is tied directly thereto. On a second level, system logic must be known to all customers and traders as the rules dictating market access and response—to eliminate any confusion and to place participants on as close to an equal footing as possible. It is a fundamental precept of the present system to provide fair and complete access to the trading process to all registered participants.

To better appreciate the following details, a review of the nomenclature employed is recommended. The illustrative examples herein all focus on fixed income instruments and trading of these instruments in large volumes—with the volume of a given transaction delineated in dollars (e.g., $25 million of 10-year treasuries).

The following terms are used with the associated definition:

TABLE 2

| | |
|---|---|
| Bid | Dollar amount offered to buy a security — issue. |
| Offer | Dollar amount offered to sell a security — issue. |
| Spread | Difference between best bid(s) and offer(s) on market. |
| Issue | A common class of fixed rate treasuries. |
| Hit | Accepting a pending bid. |
| Lift | Accepting a pending offer. |
| Size | The volume in dollars of a particular Bid/Offer. |
| Makers | Customers with pending offers and bids — making a market. |
| Uncleared Entry | Current bids/offers that lack a counterparty, i.e., have not been lifted or hit. |
| Traders | After a trade is initiated; all customers involved in transactions (as buyer or seller). |
| Trade | A string of transactions at one price initiated by a hit or lift and continuing until timed out or done. |
| Aggressor | A customer who initializes a trade. |
| Active Side | Group of Makers on same side of market as the Aggressor. |
| Passive Side | Group of customers on opposite side of market from the Aggressor. |

The general context of system operation is based on the repetitive operation of several functions, and, in its preferred embodiment, implements these functions through a specially designed keypad. Generally, the process begins when customers contact the brokers and place bids and offers for a defined class of instruments. These various positions are displayed on the computer terminal in specific ways to reflect priority, etc. A customer can establish trading priority by placing a bid or offer at a select price and volume; bids at the same price are displayed on the screen in time order in which they enter the system (as are offers). As such a "queue" of bids and offers develops, with place in line set by time at the same price. This queue is displayed on screen at the broker's workstation. Typically, there is a small difference between the bid price and offer price—the "spread". If no difference exists, this is known as a "locked" market.

Importantly, a bid and offer are commitments—once placed, a bid can be "hit" and an offer can be "lifted" by a customer willing to trade the instrument at the set price.

To control trading between many participating customers, some level of hierarchy is set. A customer who hits on a bid or lifts an offer is promoted to a new level known as the "aggressor". By acting on a bid or offer, the aggressor defines (and thus establishes) the active side of the trade. For example, if the customer hits a bid, selling becomes the active side of the trade and buying turns passive. However, if the customer lifts an offer, buying is active. This is an important practical consideration, as by convention the active side pays commissions on the ensuing transactions. This allocation of commissions is premised on the notion that the active customers are taking advantage of liquidity while the passive side is supplying liquidity to the market.

For controlled implementation, the above-noted delineation between active and passive sides is important and carries more significance in processing transactions than the different sides of the transaction, i.e., the bid and offer.

Focusing further on the nomenclature for the system logic, a "trade" is considered a sequence of trading events, triggered by the initial hit or lift that defines the aggressor, and continues for all such transactions until the trade "clears". During a trade, the aggressor side remains active and all transactions take place at the price set by the initial hit or lift—regardless of the number of following transactions. To properly track activity, a trade generates a (virtual and/or real) single trade ticket—with associated, and screen-displayed, reference number.

Content Channel-Related Web Application Services

As illustrated in FIG. 14 and denoted by reference numeral 1402, another embodiment of the present invention is provided for affording a combination of content channel-related web application services. More detail is given in FIG. 22. Various features are included such as downloading data in operation 2200 and transmitting data, such as push-technology data, based on user specifications in operation 2202. In operation 2204, a plurality of newsgroups are also provided to which users may subscribe. Content subscriptions are also available. Answers are provided to frequently asked questions (FAQ's) relating to the content-related web application services. See operation 2206. Further, in operation 2208, real time communications are enabled between a plurality of users. In use, the transmission of outgoing electronic mail is coordinated and targeted in operation 2210 while incoming electronic mail is manage and organized in operation 2212. A plurality of templates are provided for publishing data in various forms in operation 2214.

Options include monitoring a success rate of the downloading data and automatically transmitting the data that is transmitted based on the user profile. The answers to the frequently asked questions could include answers automatically generated from a dynamic knowledge base or a knowledge expert. Also optionally, the step of coordinating the transmission of electronic mail includes providing an automatic response based upon an external event. The step of organizing received electronic mail could include organizing the received electronic mail based on a text pattern. The received electronic mail could be stored in a dynamic customer interaction database. The plurality of templates for publishing data in various forms may include templates generated based on the user profile. These options and others will be discussed in more detail below.

Download Capabilities

Provides common process for all downloads

Downloads selected files securely

Tracks success of file downloads

Restarts download if an error occurs

Facilitates transactional dependent downloads

The present invention includes several download capabilities. See operation 2200 of FIG. 22. A common process is used for all downloads. Selected files may be downloaded securely and the success of file downloads are tracked. If an error occurs during downloading, the download is restarted. These features greatly facilitate transactional dependent downloads.

Push Technology Capabilities

Sends messages or content to customers proactively

Allows for delivery and receipt of custom applications developed in all major languages (i.e. Visual Basic, C++, Java)

Figure 22:
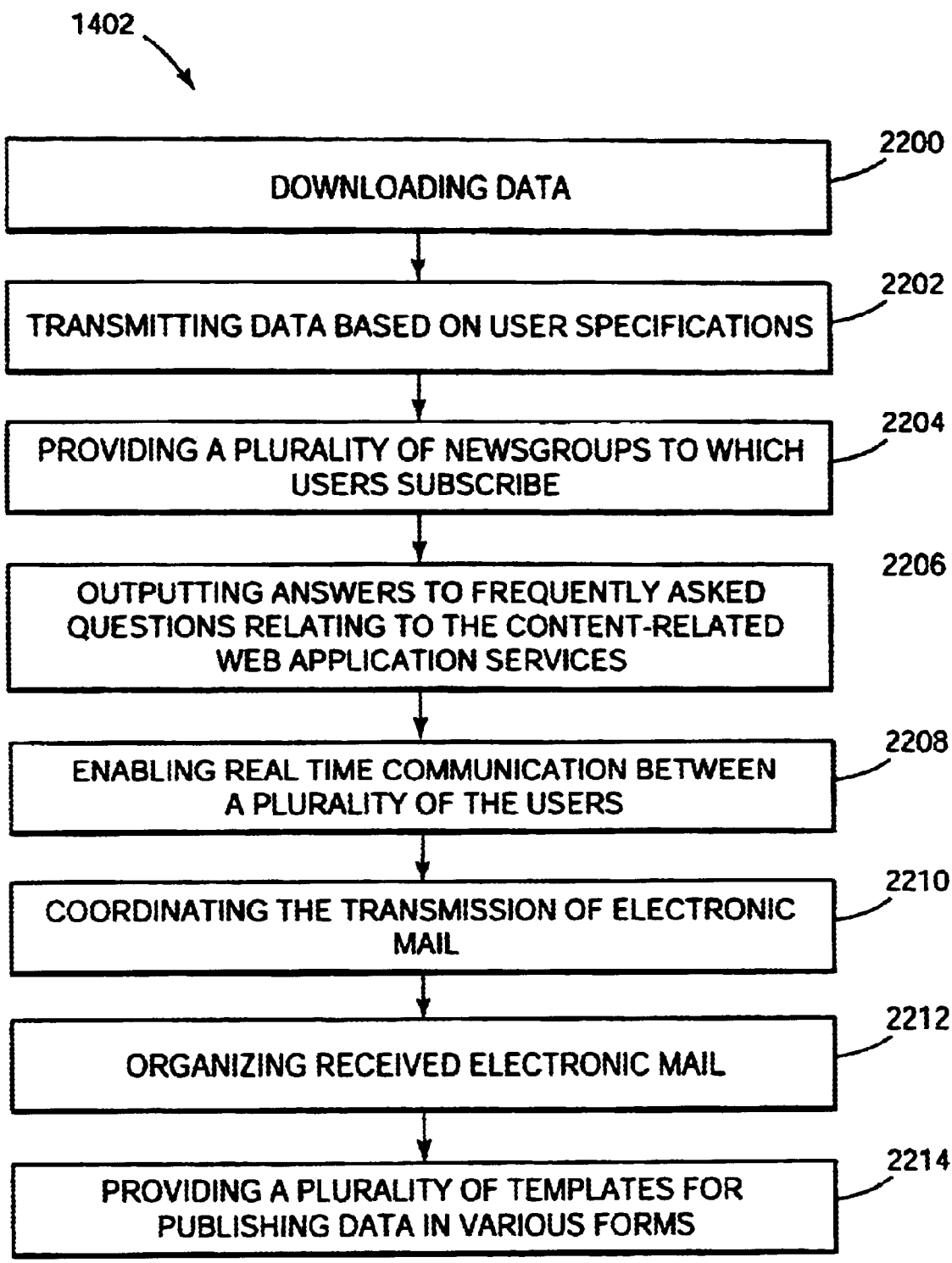
FIG. 22 is a flowchart illustrating the content channels-related web application services in accordance with one embodiment of the present invention.

Receives, installs, and launches applications automatically without user intervention Utilizes plug-ins allowing developers to personalize applications and content Performs informal hardware and software audits Delivers self-updating applications Referring to operation 2202 of FIG. 22, push-technology data is transmitted based on user specifications. Preselected messages and content may be sent to customers proactively. Furthermore, applications could be received, installed, and launched automatically without user intervention. For example, a software update could be automatically sent to a user's computer and installed immediately when it becomes available. Also, informal hardware and software audits could be performed automatically or at predetermined intervals.

Ideally, delivery and receipt of applications developed in a variety of programming languages, such as VISUAL BASIC, C++, and JAVA, is allowed. Plug-ins may also be utilized to allow developers to personalize applications and content.

Discussion Forums and Newsgroups

Securely handles all media types (e.g. graphics, audio, etc.)

Links to web pages for easy access to published documents

Facilitates discussions across multiple discussion groups

Finds information with search and notification tools

Allows participation in discussions via email

Allows forum moderation by users and administrators

Allows group membership control by users and administrators

Operation 2204 of FIG. 22 provides for a plurality of newsgroups to which users can subscribe. Sending and receipt of all media types, including graphics, audio, streaming video, and the like is permitted. A user may also participate in discussions via email. Selected users or an administrator may also be allowed to moderate a forum discussion as well as limit and control membership in a group.

An interface could be provided that permits discussions across multiple discussion groups. Optionally, links to web pages may be selected to access related sites and published documents. Also, search capabilities could be provided to search for information. Notification tools may inform a user of various events, such as when a particular discussion is going to occur.

Content Subscriptions

Allows users to subscribe and unsubscribe for different services

Allows subscribers to set up content preferences (e.g. topics)

Allows users to subscribe third parties for services

The content channels component of the present invention allows users to subscribe and unsubscribe to different services such as, for example, newsletters, travel clubs, and the like. Users would also be allowed to limit the content of the materials received to their particular preference. For example, a user would select several topics from a list of topics and would later receive information on the selected topics. Optionally, the invention could permit a user to subscribe third parties to selected services.

Frequently Asked Questions

Displays static answers to popular questions

Dynamically generates questions and answers from a knowledge base

Tracks knowledge experts based on content authors and discussion forum participation Referring to operation 2206 of FIG. 22, the content channels component of the present invention would also include a component for displaying static answers to popular questions. The questions and answers could be dynamically generated from a knowledge base. Optionally, the questions and answers could be ranked in order from the most to the least viewed or vice versa or could be organized by topic. Also optionally, a search engine could select relevant questions based on a user's input criteria.

Chat Capabilities in Real Time

Provides public and private messages

Provides Collaborative Web touring, URL pasting

Allows dynamic (public/private) room creation

Notifies users if another user is on-line

Provides free form discussion area

Allows for moderated chat sessions

Chat capabilities could be included in the content channels component of the present invention. Note operation 2208 of FIG. 22. Such capabilities would permit collaborative web touring and URL pasting, for such things as permitting two or more users to simultaneously navigate the web. The invention may notify a user when another user is online. Further, chat rooms could be dynamically created which could restrict access to known users or could permit open public access. Moderated chat sessions would also be allowed. Optionally, the chat capabilities could permit posting and retrieving of public and private messages, such as on electronic bulletin boards.

Generate Coordinated and Targeted Messages (Outbound E-Mail

Targets e-mails to visitors based on profile and category system

Logs and tracks outbound messages

Automates regular communication triggered by events

Tracks email responses for campaign management statistics

In operation 2210, shown in FIG. 22, the content channels component of the present invention also permits generation of messages which may be sent to selected users at predetermined times or automatically upon occurrence of a particular event. The users may sign up to receive the messages, or they may be selected based on user profiles or a category system. All outbound messages are logged and tracked, as are any responses to those messages.

Manage E-Mail Receipt and Delivery (Inbound E-Mail)

Offers automated responses to consumer's questions

Logs and tracks incoming messages

Classifies messages based on text patterns and routes them to the appropriate departments Stores messages to build customer interaction histories Queues messages in mailboxes for response Facilitates review and response process Inbound e-mail is managed in operation 2212 of FIG. 22. All incoming messages are logged, tracked, sorted based on text patterns, and routed to the appropriate destination. For some messages, automated responses may be sent. Other messages would be queued in mailboxes for response. All or selected messages may be stored to build a customer interaction history.

Dynamic Rendering

Displays content and applications based on profile

Pulls content from multiple data sources: static, database, third party site

Matches content to users via configurable business rules

Allows custom template based publishing

The content channels component of the present invention also provides for generic and custom template based publishing by displaying selected content and applications based on the profile of a user. Note operation 2214 of FIG. 22. Content is obtained from multiple data sources, including static, database, and third party sites. Optionally, the content may be matched to particular users via configurable business rules.

Administrative and Financial Web Application Services

Another embodiment of the present invention is provided for affording a combination of web application services to manage administration of the web application services. See component 1404 of FIG. 14. To accomplish this, information on employment opportunities is managed and organized. Further, information relating to the stock markets and corporate financial information is output. Information on legal services is also provided.

Online Recruiting

Displays job listings and contact numbers

Provides forms to enter resources

Accepts and stores resumes submitted

Routes resumes to appropriate department

Lists job interviews and campus recruiting dates

Describes open opportunities and facilitates matching potential employees to positions The administrative component of the present invention provides for online recruiting and job searching. Job listings and contact information are provided, as are forms to enter resources. Also listed are interview times and locations as well as campus recruiting dates. Resumes are accepted and stored to be later accessed by potential employers, or are routed to an appropriate destination. The resumes may be sorted based on keyword search or area of expertise, or may only be routed to certain destinations selected by the users submitting the resumes.

Figure 23:
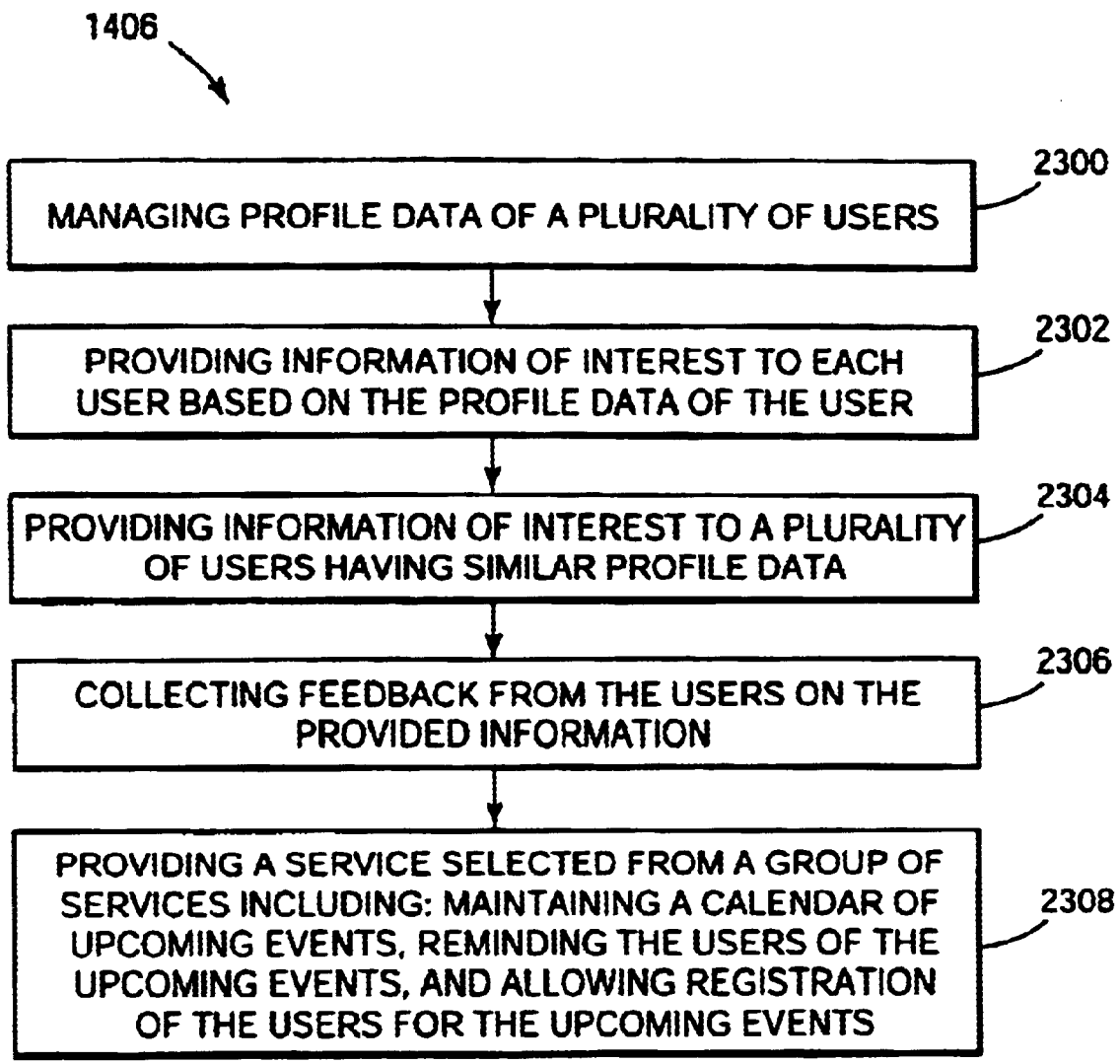
FIG. 23 is a flowchart illustrating the customer relationship management-related web application services in accordance with one embodiment of the present invention.
Figure 23A:
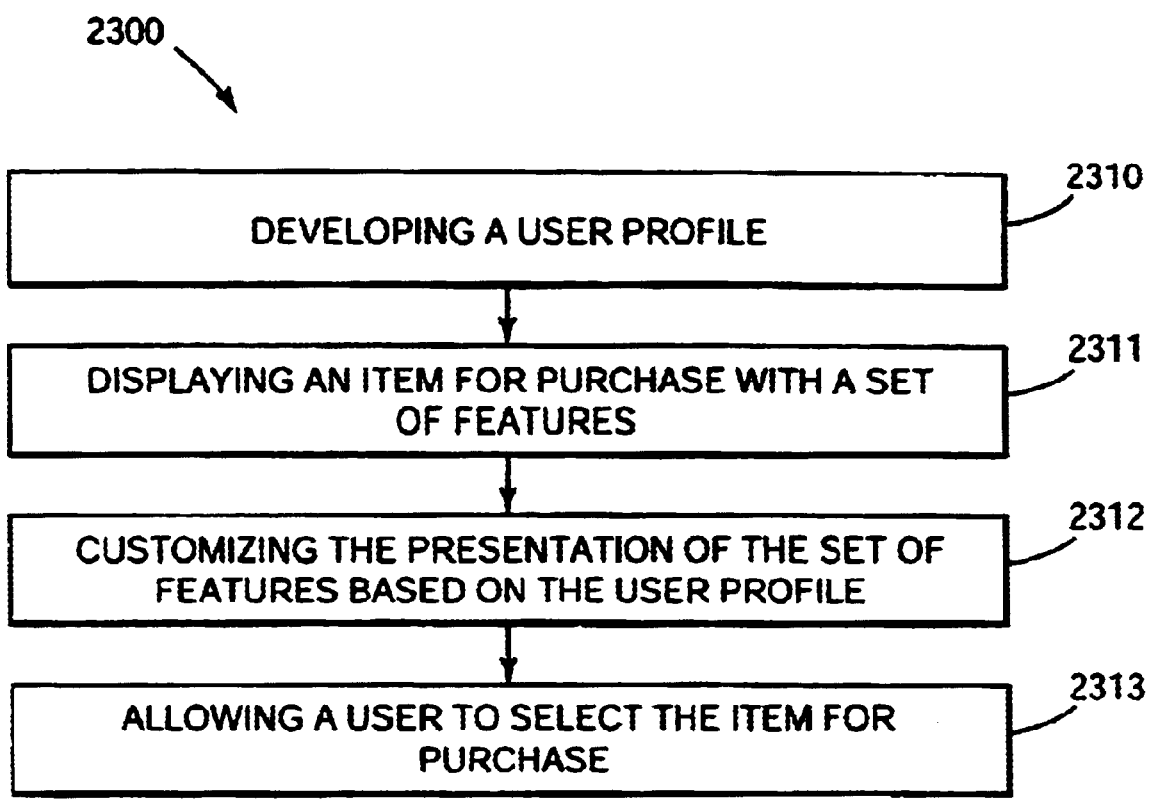
FIG. 23A is a flowchart illustrating a profile management service of the customer relationship management-related web application services in accordance with one embodiment of the present invention.
Figure 23B:
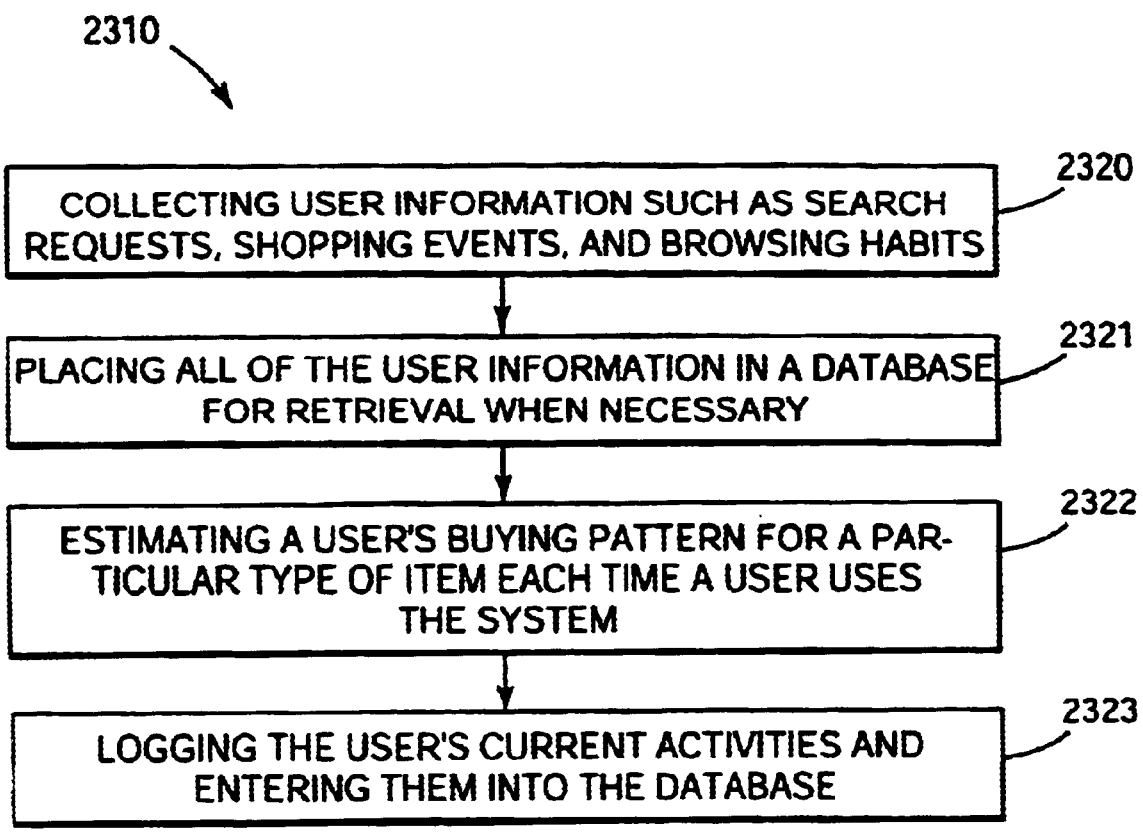
FIG. 23B is a flowchart illustrating a profile management service of the customer relationship management-related web application services in accordance with one embodiment of the present invention.

Shareholder Services
   Provides personalized stock tickers
   Displays corporate financial information
   The content channels component of the present invention provides a customizable display including personalized stock tickers, links to corporate financial information, and an online brokerage service. Other shareholder services could include historical graphing of the performance of stocks over time.
Legal Services
   Lists legal policies and notifications (privacy policy)
   Accepts notification of legal questions or issues
   Provides media kits
   Allows users to register for branding usage
   Legal notices and policies are displayed by the content channels component of the present invention. Legal questions and issues are accepted and stored for later reply. A user is also allowed to register for branding usage. Media kits may be provided.
Web Application Services to Manage Customer Relationships
   As shown in component 1406 of FIG. 14, one embodiment of the present invention is provided for affording a combination of web application services to manage customer relationships. FIG. 23 illustrates component 1406 in more detail. As shown in FIG. 23, profile data of a plurality of users is managed and organized in operation 2300. Static and dynamic information of interest is provided to each user based on profile data of that user in operation 2304. Further, static and dynamic information of interest is provided to a plurality of users having similar profile data in operation 2304. Information is also located on a network of databases, i.e. the Internet, as a function of the profile data. Feedback is also collected from the users by way of electronic forms and surveys Note operation 2306. Various event, calendaring and registration services are further provided. For example, operation 2308 reminds the users of upcoming events, a calendar of events is maintained, and the users are permitted to register for the events.
User Profile Management (Active Profiling)
   Displays and maintains user information and preferences
   Integrates with centralized source for profiles
   Allows users or administrators to modify profiles
   One embodiment of the present invention is provided for utilizing all user indicia for the purpose of customizing a user interface. Note operation 2300 of FIG. 23. In use, a user profile is developed in operation 2310 of FIG. 23A. Such user indicia may include any of search requests, products purchased, products looked at but not purchased, products purchased and returned, reasons for returning products, customer stated profile including income level, education level, stated profession, etc. as well as preferences of the user. FIG. 23B illustrates one method for developing a user profile. In operation 2320, user information such as search requests, shopping events, and browsing habits may be collected by the system or by the user's computer for periodic download to the system. All of the user information would be placed in a database in operation 2321 for retrieval when necessary. Thus, a user's buying pattern for a particular type of item can be readily estimated with relative surety in operation 2322 each time a user uses the system. Further, the user's current activities can be logged and entered into the database in operation 2323, thereby ensuring up to the minute accuracy. In operation 2311, an item for purchase with a set of features is selected based on the user profile and is displayed. The item may be selected from a group of items having characteristics that corresponds to a predicted buying pattern of the user. The presentation of the set of features is customized based on the user profile in operation 2312. For example, the features are The user is allowed to select the item for purchase. See operation 2314.

For example, the present system is capable of telling that the user was on the IT staff for an accounting firm and was reviewing software for purchase such that, when he drills down through product details on an ecommerce website, it would highlight first the software and hardware performance/requirements specs and next the return on investment. At a higher level, with the same customer, if he were searching for a word processor software, then the profile would present a review of the best software for accounting firms as written up in some accounting magazine. It might also compare what similar IT professionals from accounting firms purchased.
Dynamically Facilitate Communities of Interest
   Provides static content and applications to people with similar preferences or business needs
   Provides dynamic content and applications to people with similar preferences or business needs
   Communities can be created by configurable business rules
   The customer relationship management component of the present invention, in operation 2302, provides static content and applications to people with similar preferences and business needs. Dynamic content is provided, as are applications, to people with similar preferences and business needs.
Match Web Content to Specific User Profiles
   Permits cross- and up-sell of products to customers based on user profile
   Offers personalized recommendations based on an individual's profile
   Targets content and advertisements based on an individual's profile
   Relates legacy databases and information to personal profile information
   Content matching rules are defined by configurable business rules
   Uses metadata and business rules to match content to profiles
   The customer relationship management component of the present invention permits matching of web content and advertisements to specific user profiles. Note operation 2304 of FIG. 23. Personalized recommendations are made based on the profile of a user. Cross- and up-selling of products to users based on their profiles is also permitted. Optionally, content matching rules are defined by configurable business rules. In the alternative, metadata and business rules match content to profiles. Also optionally, legacy databases and information may be related to personal profile information.
Customer Feedback and Surveys
   Automates creation and administration of online feedback forms
   Allows internal users to access results from web browsers
   Builds and maintains multiple feedback forms and surveys
   Delivers and automatically processes interactive online forms
   Displays and analyzes real time survey reports in text and graphic format
   Downloads collected information for offline needs The customer relationship management component of the present invention also receives customer feedback and takes surveys in operation 2306. Creation, administration, and maintenance of multiple online feedback forms and surveys is automated, as is delivery and processing of the forms and surveys. Internal users are allowed to access results from web browsers. Survey results are analyzed and displayed in text and graphic format. Optionally, users may be permitted to view current survey results, such as reprots. Finally, collected information may be downloaded for offline needs.

Events, Calendaring, and Registration

- Offers user the ability to view upcoming events and register for them online
- Checks identity of user to authorize registration
- Checks for relevant events based on user profiles and notifies users
- Sends out notices to remind users of upcoming events for which user has registered
- Maintains calendar of events and administration of calendar
- Integrates with commerce functions to provide fee-based registration capabilities (e.g. online registration via credit card)

Referring to operations 2308, 2310, and 2312 of FIG. 23, the customer relationship management component of the present invention includes a calendar of events, a notification service, and a way to register for upcoming events. Relevant events are selected based on the profile of a user and the user is notified of the time and place of the event. Once the identity of a user has been verified, the registration of the user is accepted. A notice is sent to a user to remind the user of the event for which he or she has registered. The registration function is integrated with commerce functions to permit fee-based registration capabilities, such as permitting online registration via credit card.

Content Management and Publishing-Related Web Application Services

Figure 24:
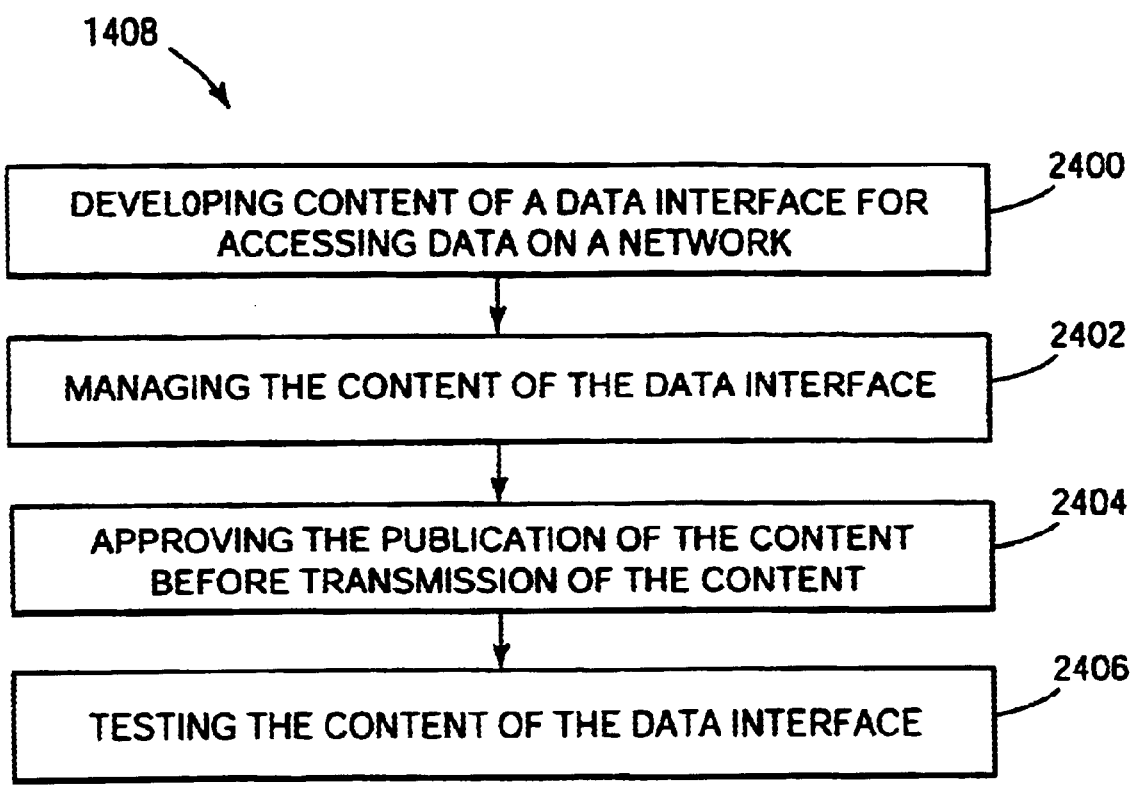
FIG. 24 is a flowchart illustrating the content management and publishing-related web application services in accordance with one embodiment of the present invention.

- Stores current files along with past changes to documents, source code, and Web content
- Assigns user-specific and project specific authorization for secure administration
- Reconciles file changes from multiple users and prevents accidental code overwriting
- Generates site maps
- Maintains metadata for content One embodiment of the present invention, illustrated in FIG. 14 as component 1408, is provided for affording a combination of content management and publishing-related web application services. In use, referring to FIG. 24, content of a data interface, i.e. a web-site, may be developed for accessing data on a network, i.e. the Internet, after which such content is managed in operation. Note operations 2400 and 2402, respectively. Publishing of the content of the data interface is controlled by precluding transmission or publication of the content until approval in operation 2404. The content of the data interface may also be tested in operation 2406. For example, this may be accomplished by creating a staging and deployment environment in which the data interface is analyzed. Further features include "text-only" rendering and content workflow control.

As an option, the step of developing content of a data interface may be carried out by a data version controller. A content developer may be automatically notified of a work assignment. Managing the content may include assigning a secure access for specific users and specific projects. Meta data could be maintained and language translation tools could be utilized. Approving the publication of the content may include assigning use and access restrictions on the content. Testing the content of the data interface may include comparing versions of the data interface and utilizing remote and automatic testing capabilities.

Controlling Electronic Content

A fundamental problem for electronic content providers is extending their ability to control the use of proprietary information. Content providers often need to limit use to authorized activities and amounts. Participants in a business model involving, for example, provision of movies and advertising on optical discs may include actors, directors, script and other writers, musicians, studios, publishers, distributors, retailers, advertisers, credit card services, and content end-users. These participants need the ability to embody their range of agreements and requirements, including use limitations, into an "extended" agreement comprising an overall electronic business model. This extended agreement is represented by electronic content control information that can automatically enforce agreed upon rights and obligations. Under WAF, such an extended agreement may comprise an electronic contract involving all business model participants. Such an agreement may alternatively, or in addition, be made up of electronic agreements between subsets of the business model participants. Through the use of WAF, electronic commerce can function in the same way as traditional commerce—that is commercial relationships regarding products and services can be shaped through the negotiation of one or more agreements between a variety of parties.

Commercial content providers are concerned with ensuring proper compensation for the use of their electronic information. Electronic digital information, for example a CD recording, can today be copied relatively easily and inexpensively. Similarly, unauthorized copying and use of software programs deprives rightful owners of billions of dollars in annual revenue according to the International Intellectual Property Alliance. Content providers and distributors have devised a number of limited function rights protection mechanisms to protect their rights. Authorization passwords and protocols, license servers, "lock/unlock" distribution methods, and non-electronic contractual limitations imposed on users of shrink-wrapped software are a few of the more prevalent content protection schemes. In a commercial context, these efforts are inefficient and limited solutions.

Providers of "electronic currency" have also created protections for their type of content. These systems are not sufficiently adaptable, efficient, nor flexible enough to support the generalized use of electronic currency. Furthermore, they do not provide sophisticated auditing and control configuration capabilities. This means that current electronic currency tools lack the sophistication needed for many real-world financial business models. WAF provides means for anonymous currency and for "conditionally" anonymous currency, wherein currency related activities remain anonymous except under special circumstances.

WAF Control Capabilities

WAF allows the owners and distributors of electronic digital information to reliably bill for, and securely control, audit, and budget the use of, electronic information. It can reliably detect and monitor the use of commercial information products. WAF uses a wide variety of different electronic information delivery means: including, for example, digital networks, digital broadcast, and physical storage media such as optical and magnetic disks. WAF can be used by major network providers, hardware manufacturers, owners of electronic information, providers of such information, and clearinghouses that gather usage information regarding, and bill for the use of, electronic information.

WAF provides comprehensive and configurable transaction management, metering and monitoring technology. It can change how electronic information products are protected, marketed, packaged, and distributed. When used, WAF should result in higher revenues for information providers and greater user satisfaction and value. Use of WAF will normally result in lower usage costs, decreased transaction costs, more efficient access to electronic information, re-usability of rights protection and other transaction management implementations, greatly improved flexibility in the use of secured information, and greater standardization of tools and processes for electronic transaction management. WAF can be used to create an adaptable environment that fulfills the needs of electronic information owners, distributors, and users; financial clearinghouses; and usage information analyzers and resellers.

WAF provides a secure, distributed electronic transaction management system for controlling the distribution and/or other usage of electronically provided and/or stored information. WAF controls auditing and reporting of electronic content and/or appliance usage. Users of WAF may include content creators who apply content usage, usage reporting, and/or usage payment related control information to electronic content and/or appliances for users such as end-user organizations, individuals, and content and/or appliance distributors. WAF also securely supports the payment of money owed (including money owed for content and/or appliance usage) by one or more parties to one or more other parties, in the form of electronic credit and/or currency.

WAF may be used to migrate most non-electronic, traditional information delivery models (including entertainment, reference materials, catalog shopping, etc.) into an adequately secure digital distribution and usage management and payment context. The distribution and financial pathways managed by a WAF arrangement may include:

content creator(s), distributor(s), redistributor(s), client administrator(s), client user(s), financial and/or other clearinghouse(s), and/or government agencies.

These distribution and financial pathways may also include:

advertisers, market survey organizations, and/or other parties interested in the user usage of information securely delivered and/or stored using WAF.

Normally, participants in a WAF arrangement will employ the same secure WAF foundation. Alternate embodiments support WAF arrangements employing differing WAF foundations. Such alternate embodiments may employ procedures to ensure certain interoperability requirements are met.

Because of the breadth of issues resolved by the present invention, it can provide the emerging "electronic highway" with a single transaction/distribution control system that can, for a very broad range of commercial and data security models, ensure against unauthorized use of confidential and/or proprietary information and commercial electronic transactions. WAF's electronic transaction management mechanisms can enforce the electronic rights and agreements of all parties participating in widely varying business and data security models, and this can be efficiently achieved through a single WAF implementation within each WAF participant's electronic appliance. WAF supports widely varying business and/or data security models that can involve a broad range of participants at various "levels" of WAF content and/or content control information pathways of handling. Different content control and/or auditing models and agreements may be available on the same WAF installation. These models and agreements may control content in relationship to, for example, WAF installations and/or users in general; certain specific users, installations, classes and/or other groupings of installations and/or users; as well as to electronic content generally on a given installation, to specific properties, property portions, classes and/or other groupings of content.

Distribution using WAF may package both the electronic content and control information into the same WAF container, and/or may involve the delivery to an end-user site of different pieces of the same WAF managed property from plural separate remote locations and/or in plural separate WAF content containers and/or employing plural different delivery means. Content control information may be partially or fully delivered separately from its associated content to a user WAF installation in one or more WAF administrative objects. Portions of said control information may be delivered from one or more sources. Control information may also be available for use by access from a user's WAF installation secure sub-system to one or more remote WAF secure sub-systems and/or WAF compatible, certified secure remote locations. WAF control processes such as metering, budgeting, decrypting and/or fingerprinting, may as relates to a certain user content usage activity, be performed in a user's local WAF installation secure subsystem, or said processes may be divided amongst plural secure subsystems which may be located in the same user WAF installations and/or in a network server and in the user installation. For example, a local WAF installation may perform decryption and save any, or all of, usage metering information related to content and/or electronic appliance usage at such user installation could be performed at the server employing secure (e.g., encrypted) communications between said secure subsystems. Said server location may also be used for near real time, frequent, or more periodic secure receipt of content usage information from said user installation, with, for example, metered information being maintained only temporarily at a local user installation.

Delivery means for WAF managed content may include electronic data storage means such as optical disks for delivering one portion of said information and broadcasting and/or telecommunicating means for other portions of said information. Electronic data storage means may include magnetic media, optical media, combined magneto-optical systems, flash RAM memory, bubble memory, and/or other memory storage means such as huge capacity optical storage systems employing holographic, frequency, and/or polarity data storage techniques. Data storage means may also employ layered disc techniques, such as the use of generally transparent and/or translucent materials that pass light through layers of data carrying discs which themselves are physically packaged together as one thicker disc. Data carrying locations on such discs may be, at least in part, opaque.

WAF control information (e.g., methods) that collectively control use of WAF managed properties (database, document, individual commercial product), are either shipped with the content itself (for example, in a content container) and/or one or more portions of such control information is shipped to distributors and/or other users in separably deliverable "administrative objects." A subset of the methods for a property may in part be delivered with each property while one or more other subsets of methods can be delivered separately to a user or otherwise made available for use (such as being available remotely by telecommunication means). Required methods (methods listed as required for property and/or appliance use) must be available as specified if WAF controlled content (such as intellectual property distributed within a WAF content container) is to be used. Methods that control content may apply to a plurality of WAF container objects, such as a class or other grouping of such objects. Methods may also be required by certain users or classes of users and/or WAF installations and/or classes of installations for such parties to use one or more specific, or classes of, objects.

A feature of WAF provided by the present invention is that certain one or more methods can be specified as required in order for a WAF installation and/or user to be able to use certain and/or all content. For example, a distributor of a certain type of content might be allowed by "senior" participants (by content creators, for example) to require a method which prohibits end-users from electronically saving decrypted content, a provider of credit for WAF transactions might require an audit method that records the time of an electronic purchase, and/or a user might require a method that summarizes usage information for reporting to a clearinghouse (e.g. billing information) in a way that does not convey confidential, personal information regarding detailed usage behavior.

A further feature of WAF provided by the present invention is that creators, distributors, and users of content can select from among a set of predefined methods (if available) to control container content usage and distribution functions and/or they may have the right to provide new customized methods to control at least certain usage functions (such "new" methods may be required to be certified for trustedness and interoperability to the WAF installation and/or for of a group of WAF applications). As a result, WAF provides a very high degree of configurability with respect to how the distribution and other usage of each property or object (or one or more portions of objects or properties as desired and/or applicable) will be controlled. Each WAF participant in a WAF pathway of content control information may set methods for some or all of the content in a WAF container, so long as such control information does not conflict with senior control information already in place with respect to:

(1) certain or all WAF managed content,
(2) certain one or more WAF users and/or groupings of users,
(3) certain one or more WAF nodes and/or groupings of nodes, and/or
(4) certain one or more WAF applications and/or arrangements.

For example, a content creator's WAF control information for certain content can take precedence over other submitted WAF participant control information and, for example, if allowed by senior control information, a content distributor's control information may itself take precedence over a client administrator's control information, which may take precedence over an end-user's control information. A path of distribution participant's ability to set such electronic content control information can be limited to certain control information (for example, method mediating data such as pricing and/or sales dates) or it may be limited only to the extent that one or more of the participant's proposed control information conflicts with control information set by senior control information submitted previously by participants in a chain of handling of the property, or managed in said participant's WAF secure subsystem. WAF control information may, in part or in full, (a) represent control information directly put in place by WAF content control information pathway participants, and/or (b) comprise control information put in place by such a participant on behalf of a party who does not directly handle electronic content (or electronic appliance) permissions records information (for example control information inserted by a participant on behalf of a financial clearinghouse or government agency). Such control information methods (and/or load modules and/or mediating data and/or component assemblies) may also be put in place by either an electronic automated, or a semi-automated and human assisted, control information (control set) negotiating process that assesses whether the use of one or more pieces of submitted control information will be integrated into and/or replace existing control information (and/or chooses between alternative control information based upon interaction with in-place control information) and how such control information may be used.

Control information may be provided by a party who does not directly participate in the handling of electronic content (and/or appliance) and/or control information for such content (and/or appliance). Such control information may be provided in secure form using WAF installation secure sub-system managed communications (including, for example, authenticating the deliverer of at least in part encrypted control information) between such not directly participating one or more parties' WAF installation secure subsystems, and a pathway of WAF content control information participant's WAF installation secure subsystem. This control information may relate to, for example, the right to access credit supplied by a financial services provider, the enforcement of regulations or laws enacted by a government agency, or the requirements of a customer of WAF managed content usage information (reflecting usage of content by one or more parties other than such customer) relating to the creation, handling and/or manner of reporting of usage information received by such customer. Such control information may, for example, enforce societal requirements such as laws related to electronic commerce.

WAF content control information may apply differently to different pathway of content and/or control information handling participants. Furthermore, permissions records rights may be added, altered, and/or removed by a WAF participant if they are allowed to take such action. Rights of WAF participants may be defined in relation to specific parties and/or categories of parties and/or other groups of parties in a chain of handling of content and/or content control information (e.g., permissions records). Modifications to control information that may be made by a given, eligible party or parties, may be limited in the number of modifications, and/or degree of modification, they may make.

At least one secure subsystem in electronic appliances of creators, distributors, auditors, clearinghouses, client administrators, and end-users (understanding that two or more of the above classifications may describe a single user) provides a "sufficiently" secure (for the intended applications) environment for:

1. Decrypting properties and control information;
2. Storing control and metering related information;
3. Managing communications;

4. Processing core control programs, along with associated data, that constitute control information for electronic content and/or appliance rights protection, including the enforcing of preferences and requirements of WAF participants.

Normally, most usage, audit, reporting, payment, and distribution control methods are themselves at least in part encrypted and are executed by the secure subsystem of a WAF installation. Thus, for example, billing and metering records can be securely generated and updated, and encryption and decryption keys are securely utilized, within a secure subsystem. Since WAF also employs secure (e.g. encrypted and authenticated) communications when passing information between the participant location (nodes) secure subsystems of a WAF arrangement, important components of a WAF electronic agreement can be reliably enforced with sufficient security (sufficiently trusted) for the intended commercial purposes. A WAF electronic agreement for a value chain can be composed, at least in part, of one or more subagreements between one or more subsets of the value chain participants. These subagreements are comprised of one or more electronic contract "compliance" elements (methods including associated parameter data) that ensure the protection of the rights of WAF participants.

The degree of trustedness of a WAF arrangement will be primarily based on whether hardware SPUs are employed at participant location secure subsystems and the effectiveness of the SPU hardware security architecture, software security techniques when an SPU is emulated in software, and the encryption algorithm(s) and keys that are employed for securing content, control information, communications, and access to WAF node (WAF installation) secure subsystems. Physical facility and user identity authentication security procedures may be used instead of hardware SPUs at certain nodes, such as at an established financial clearinghouse, where such procedures may provide sufficient security for trusted interoperability with a WAF arrangement employing hardware SPUs at user nodes.

The updating of property management files at each location of a WAF arrangement, to accommodate new or modified control information, is performed in the WAF secure subsystem and under the control of secure management file updating programs executed by the protected subsystem. Since all secure communications are at least in part encrypted and the processing inside the secure subsystem is concealed from outside observation and interference, the present invention ensures that content control information can be enforced. As a result, the creator and/or distributor and/or client administrator and/or other contributor of secure control information for each property (for example, an end-user restricting the kind of audit information he or she will allow to be reported and/or a financial clearinghouse establishing certain criteria for use of its credit for payment for use of distributed content) can be confident that their contributed and accepted control information will be enforced (within the security limitations of a given WAF security implementation design). This control information can determine, for example:

(1) How and/or to whom electronic content can be provided, for example, how an electronic property can be distributed;

(2) How one or more objects and/or properties, or portions of an object or property, can be directly used, such as decrypted, displayed, printed, etc;

(3) How payment for usage of such content and/or content portions may or must be handled; and (4) How audit information about usage information related to at least a portion of a property should be collected, reported, and/or used.

Seniority of contributed control information, including resolution of conflicts between content control information submitted by multiple parties, is normally established by:

(1) the sequence in which control information is put in place by various parties (in place control information normally takes precedence over subsequently submitted control information), (2) the specifics of WAF content and/or appliance control information. For example, in-place control information can stipulate which subsequent one or more piece of control from one or more parties or class of parties will take precedence over control information submitted by one or more yet different parties and/or classes of parties, and/or (3) negotiation between control information sets from plural parties, which negotiation establishes what control information shall constitute the resulting control information set for a given piece of WAF managed content and/or WAF installation.

Content Development Tools

Shows view of site's navigational structure, directories of information, hyperlinks, hyperlink status, or all files at once Provides automatic hyperlink maintenance Creates WYSIWYG frames pages and draws HTML tables Supports editing of graphics Generates web sites and pages from predefined formats Imports existing files or folders into web site Integrates with version control tools Allows metadata editing and definition Operation 2400 of the content management and publishing services component of the present invention provides tools for developing content of a data interface for accessing data on a network. In particular, a view of the navigational structure, directories of information, hyperlinks, hyperlink status, or all files of the site is shown. Hyperlinks may be maintained automatically. Graphics editing is supported. Predefined formats may be provided to assist in generating web sites and pages. Optionally, WYSIWYG frames pages may be created and HTML tables may be drawn. Also optionally, metadata editing and definition may be allowed. Existing files or folders may be imported into a web site. Ideally, the content management and publishing services component of the present invention integrates with version control tools.

Content Management Capabilities

The content management and publishing services component of the present invention also manages the content and security of the data interface. Note operation 2402 of FIG. 24. Current files are stored along with past changes to documents, source code, and web content. User specific and project specific authorization is assigned to ensure secure administration. File changes among multiple users are reconciled so that accidental code overwriting is avoided. Site maps are generated and metadata is maintained for content.

Content Approval

Controls access to content publishing

Permits publishing of material only after approval

Notifies approver of material to review

Describes the business rules for syndication, including who can have it, when, for how long, and any restrictions on use or reuse of the digital asset Operation 2404 of the content management and publishing services component of the present invention precludes publishing of the content of the data interface until approval so that access to content publishing is controlled. The administrator who approves the content is notified of the new content so that he or she may review the content. Optionally, the business rules for syndication are set forth, including proprietary rights, beginning date and duration of those rights, and any restrictions on use and reuse.

Content Workflow

- Generates site maps based on collection of stored web pages
- Provides content workflow view to all developers
- Allows content managers to change content workflow
- Provides change request and change notification routing
- Alerts developers of changes in content workflow
- Manages large numbers of sub-projects and organizes them into groups
- Allows sub-projects to automatically and remotely download available digital assets and remotely change them over time
- Allows developers to group content for particular sub-projects
- Alerts developers of content in work queue
- Allows routing of content to multiple parties The content management and publishing services component of the present invention controls the content workflow. Site maps are generated based on a collection of stored web pages which, along with content workflow view, is provided to developers. Content managers are allowed to change content workflow and group content for particular sub projects. Change requests may also be submitted and change notifications are routed to appropriate destinations. Developers are alerted to changes in content workflow as well as the contents of the work queue.

Large numbers of sub-projects are managed and organized into groups. The sub-projects are then allowed to automatically and remotely download available digital assets and remotely change them over time.

Content Review and Testing Tools

- Provides ability to preview content
- Compares the differences in a project against another project, or in two different folders
- Provides data-driven testing capabilities
- Allows script maintenance and reuse
- Reports where errors are found
- Enables remote and timed testing capabilities
- Supports multiple source and destination environments The content of the data interface is tested in operation 2406. The content is able to be previewed so that any errors or inconsistencies can be fixed. Also provided are data-driven testing capabilities. Further, remote testing, periodic testing, and durational testing may be performed. When an error is found, a report is output.

Optionally, two or more projects may be compared to determine the differences between the two. Likewise, data stored in two or more different folders may also be compared. Also optionally, scripts are tested and maintained, and can be reused. Further, support is provided for multiple source and destination environments.

Localization and Translation Capabilities

- Provides translation services from single to entire web sites, text-embedded in images, Java and Javascript source code and parameters, CGI scripts, Database files, Email, Adobe PDF files
- Enables site update and maintenance procedures for localization
- Alerts local web site content managers to changes in web site
- Tracks localization process The content management and publishing services component also includes localization and translation capabilities in operation 2408. Site updates and maintenance procedures for localization are enabled, and the localization process is tracked. The local web site content manager is alerted to any change in the web site. Also, translation services are provided for single pages to entire web sites. For example, the translation services translate text embedded in images, JAVA, JAVASCRIPT source code and parameters, CGI scripts, database files, email, and ADOBE PDF files to and from each other.

Text Only Rendering Capabilities

- Facilitates "text-only" site rendering based on business rules
- Allows modification/customization of text-only pages The content management and publishing services component facilitates "text-only" site rendering based on business rules, particularly useful for users with low end systems or without graphics displaying capabilities. This also simplifies modification and customization of text-only pages.

Staging and Deployment Tools

- Creates staging and deployment environments to test content in a mirrored production environment prior to deployment
- Provides ability to release content based on time
- Allows the ability to roll-back to a previous production version
- Integrates with content approval process
- Provides load, regression and performance testing capabilities The content management and publishing services component of the present invention creates an environment in which the content of the data is tested. This testing may be carried out by creating a staging and deployment environment in a mirrored production environment prior to deployment. Exemplary testing capabilities include load, regression, and performance testing capabilities. If a problem arises, a previous production version may be put back into use. Further, content may be released over time. Optionally, the testing environment may be integrated with the content approval process to ensure compliance with content guidelines before actual deployment of the content.

Education-Related Web Application Services

Figure 25:
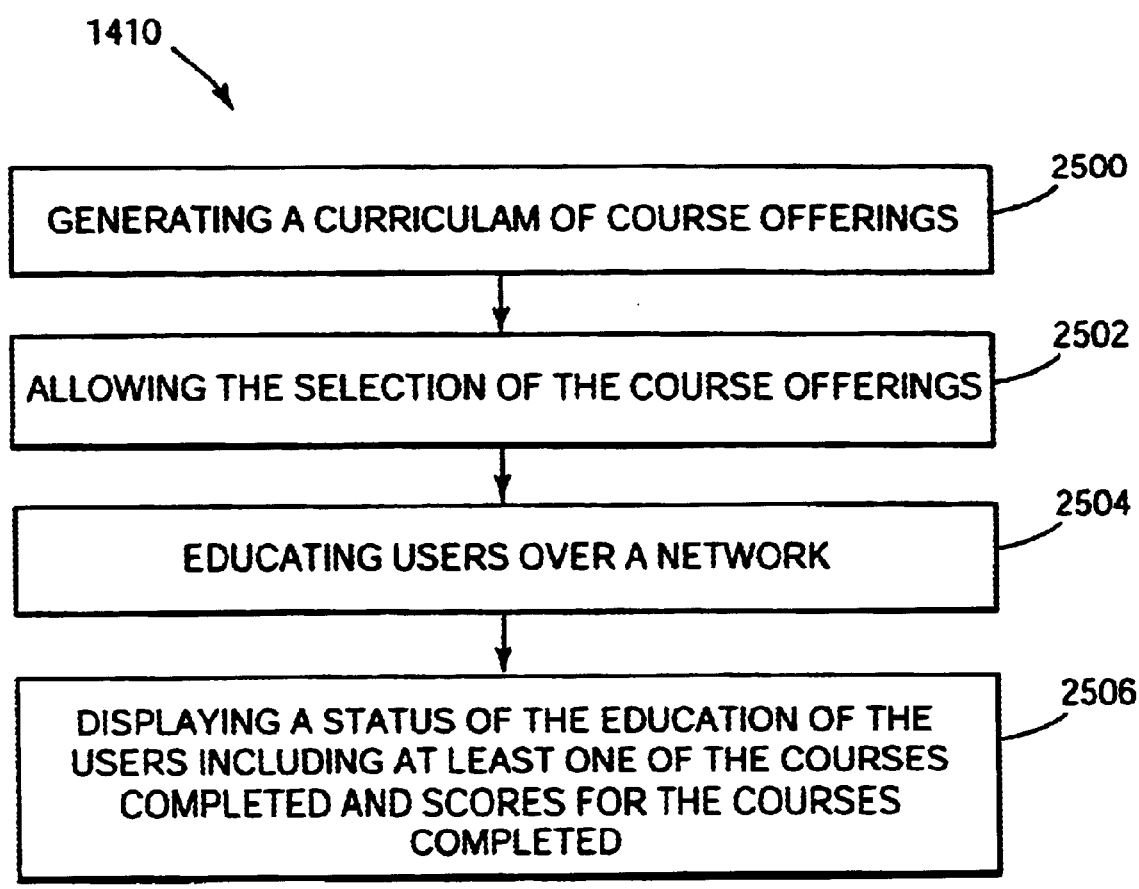
FIG. 25 is a flowchart illustrating the education-related web application services in accordance with one embodiment of the present invention.

One embodiment of the present invention is provided for affording a combination of education-related web application services, illustrated as component 1410 of FIG. 14. FIG. 25 provides more detail. In operations 2500 and 2502 respectively, a curriculum of course offerings is generated from which users are permitted to select, i.e. order, register, etc. Education such as training or the like is carried out over a network such as the Internet in operation 2504. At any given time, a status of the education may be provided, including such things as a listing of the courses completed, scores for the courses completed, a listing of courses for which currently enrolled and the current scores in those courses, a listing of courses required to matriculate, etc. Note operation 2506.

Many school systems have become highly centralized. Large schools have evolved, which serve wide geographic areas. The geographic area covered by some schools is so wide that certain students must make a round trip of one hundred miles, or more, to attend classes.

One benefit of a large, centralized school is that a vast, diverse curriculum can be offered. It is desirable to offer the diverse curriculum, without imposing the long-distance travel on students.

In one form of the invention, a system of computers store lessons which are transmitted to computers used by students. At intervals, the invention assess the students' progress, and selects appropriate lessons for the student at the time.

Highly Simplified Overview

REPOSITORIES hold educational computer programs. Students obtain access to the programs needed, via the NETWORK indicated. The programs instruct the students in an interactive manner.

The students need not be present at the REPOSITORIES, but station themselves at convenient locations, such as their homes, thereby eliminating the need to travel to a physical facility to attend classes.

The Educational Programs

The teaching programs themselves are commercially available, and new programs will be developed as systems such as the present invention become more widely implemented.

Programs which test students, in order to determine the students' master of material, are also commercially available.

The invention provides several highly innovative features which significantly enhance the effectiveness of these teaching programs and testing programs.

Profiles

One is that a PROFILE is generated for each student. PROFILES are discussed in the Related Applications. As adapted to the present invention, the PROFILE is, in simple terms, a description of (a) the present educational status, (b) the educational needs and (c) the educational capabilities, of the student.

Educational Status

Educational status refers to the student's present position in the student's educational career. For example, third-month, secondary-school freshman is one status.

The invention uses the educational status in deciding what material to present the student at a given time, as discussed more fully below.

Educational Needs

Educational needs refer to the instruction needed by the student at the time, which is largely determined by the student's curriculum. For example, the lessons needed by a college sophomore having a curriculum of college chemistry, with emphasis on organic synthesis, are known.

Educational Characteristics

Educational characteristics refer to the manner of teaching to which the student best responds. That is, the invention identifies learning characteristics of each student, and presents material in a manner compatible with the characteristics.

As a simple example, some students can understand the Pythagorean Theorem directly from its mathematical statement, namely, hypotenuse$^2$=side1$^2$+side2$^2$.

Other students do not obtain information from such an abstract statement, and must see the Theorem applied to specific examples before they understand it.

The preferred learning styles are ascertained by a combination of student-counselor interviews, computer-assisted examination of the student, and standard psychological assessment.

The invention uses the PROFILES to select material to present to the student during each session. The PROFILE is updated, if required, at each students' learning session, to indicate progress made during the session. This updating is automatic, and done non-intrusively.

Different Presentation of Given Lesson

The invention includes educational programs which present a given lesson in different ways, in order to accommodate the fact that different students assimilate material in different ways. This collection of different presentations allows implementation of two teaching approaches.

1. Different Presentations of SAME Lesson for DIFFERENT Students

As discussed immediately above, because different students have different learning characteristics, the invention selects a suitable manner of presentation from the collection, based on the learning characteristics of the student. The selection is made based on the PROFILE.

2. Different Presentations of SAME Lesson for SAME Student

The collection of presentations can be used to offer different presentations to a given student, if the student fails to master a lesson when presented the first time. Three reasons exist which indicate that this approach may be desirable.

One, it is expected that a given student does not maintain constant learning characteristics at all times.

Two, the characterization of learning style of a student is not a perfect science. Thus, even if the learning characteristics never change, it is not clear that a perfect match can always be made between a style of presentation and the learning characteristics of the student.

Three, even if the classification of learning style becomes perfected, the subject matter of some lessons may not be amenable to the learning style preferred by the student. For example, there exists a "left-brain, right-brain" conception of human thinking, wherein the left-brain is believed to manage logic, and the right-brain manages creativity and imagery.

For a "right-brain" student, there may exist no directly compatible teaching strategy for explaining "left-brain" subject matter. For instance, there may be no perfectly compatible teaching strategy to explain the principles of artistic color theory to a right-brain student undertaking a curriculum of nuclear physics.

Therefore, the invention presents a given lesson in successive, different ways, if the student does not master the lesson the first time.

Subject Matter Expert

If a student fails to demonstrate mastery of a lesson after a prescribed number of attempts, the invention establishes a video conference between the student and a SUBJECT MATTER EXPERT. The SUBJECT MATTER EXPERT is a consultant who is expert in the subject matter of the lesson causing difficulty. The video conference allows the SUBJECT MATTER EXPERT to identify the difficulties encountered by the student, and to offer coaching.

Establishment of the video conference is allowed by commercially available systems, such as the CLS system described below, and also described in the Related Applications.

CLS places no geographic restriction on the location of the SUBJECT MATTER EXPERT, except that the expert must be able to establish a communication link with the system. With no such restrictions, the SUBJECT MATTER EXPERT can be located anywhere in the world. This feature allows Subject Matter Experts of the highest caliber to be obtained, because such experts are a rare species, and not easily located.

Intelligent Administrator

An INTELLIGENT ADMINISTRATOR, IA, taking the form of a system of programs and computer objects, organizes the instructional activity. The IA does the following: examines the PROFILE of each student, selects the proper lessons for each session, administers examinations to the students, updates the PROFILE, and patches up the student with a SUBJECT MATTER EXPERT when necessary. In addition, the IA assesses the performance of the student, in a continual and non-intrusive manner.

The IA itself can call upon its own SUBJECT MATTER EXPERTS when it encounters a condition which its programming and organization cannot handle.

Greater Detail Concerning Invention

Invention Utilizes Commercially Available Equipment

The invention can be utilized in conjunction with the information management system sold under the trade name "Continuous Learning System" (CLS) and available from AT&T Global Information Solutions Company, Dayton, Ohio. CLS provides the systems to allow the remote access and video conferencing described above.

This discussion will explain some of the relevant features of CLS, and will then consider in greater detail the PROFILES and the IA.

1. CLS Uses Multiple, Linked Computers. In CLS, users interact with micro-computers, such as the well-known, highly advanced, and inexpensive Personal Computer (PC). The micro-computers are located at locations of the users' preference, such as their homes, offices, or vehicles. The micro-computers connect with CLS by data links, such as private or public data networks, or by commercially available telephone channels.

The links can take the form of traditional, hard-wired telephone channels, or wireless links, such as provided by cellular telephone service.

2. CLS Has Vast Storage Capability. Entire Curriculum can be Stored. CLS acts as a storage facility for materials which are generically called RESOURCES. RESOURCES can be classified into two types, namely (a) those which are downloadable and (b) those which are not. Two examples of downloadable RESOURCES are (a) a computer program, and (b) a file stored on a mass storage medium, such as a disc- or tape drive. Two examples of RESOURCES which are NOT downloadable are (a) a 35 mm film and (b) a book, in paper format.

Static and Dynamic Resources

RESOURCES consist of anything which has potential value in terms of recovering knowledge. RESOURCEs include, for example, information which can be downloaded, such as data, files, computer applications, computer-managed instruction. RESOURCES also include SYSTEMS, such as the commercially available information services known as CompuServe and Prodigy, because these SYSTEMS allow recovery of knowledge. Subject Matter Experts are also RESOURCES. RESOURCES can be classified in a different way, namely, as either static or dynamic. The RESOURCES discussed above are of the static type, because, at the time of recovery, they are pre-existing.

Dynamic RESOURCES are not pre-existing at the time of recovery, but come into existence at the time of recovery. For example, when television news media cover an event in real time, such as the State-of-the-Union Address of the President of the United States, information contained in the Address becomes available for recovery (if the news media is linkable to CLS or an equivalent). The information was not pre-existing, but came into existence at the time recovery became possible. (Of course, there is an extremely short time delay between the time of the Address and time recovery becomes possible. This time is considered negligible, and does not render the Address pre-existing.)

Non-Downloadable RESOURCES Can be Used

In general, it is expected that the invention will utilize downloadable RESOURCES primarily. However, because the vast storage ability allows the invention to hold a curriculum of truly immense proportions, it is expected that many educational courses will refer to materials which cannot be rendered into downloadable format, for reasons such as copyright laws. For such courses, the automated retrieval capabilities of CLS become significant. These features are described in the Related Applications.

Storage facilities in CLS are called REPOSITORIES. A REPOSITORY includes one micro-computer, or a group of micro-computers at a single location. (REPOSITORIES can also contain more advanced computers, such as main-frames and mini-computers.) The REPOSITORIES themselves can be distributed over an extremely wide geographic area; they can be spread world-wide. As a result, the RESOURCES will likewise be widely distributed, because they are stored in the REPOSITORIES.

However, despite this geographically distributed storage of RESOURCES, and despite the vast total storage capability of the overall system, CLS allows the user to deal with all downloadable RESOURCES as though physically present on the user's computer. That is, in effect, the user sees all RESOURCES, no matter where located, as though located in the storage devices of the user's own computer.

Therefore, several school districts can maintain their own REPOSITORIES. However, because the REPOSITORIES are linked by CLS, to the student, all RESOURCES appear to be located at a single, convenient location. (Of course, under CLS the student can, if desired, ascertain the fact that the RESOURCES reside in different REPOSITORIES, and are not, in fact, located at a single place.)

3. CLS Has Database Characteristics. CLS can be viewed as a type of database, but with several distinguishing features. One, the storage capacity of CLS is, for practical purposes, without limitation. One reason is that the architecture of CLS centers upon the PC. Expansion of storage in PCs is simple and inexpensive. Further, additional PCs can be added to CLS with little or no software modification: CLS is designed to accommodate this expansion. Stated in other words, the PCs are directly concatenable. In principle, there is no practical limit to the amount of storage available.

A second feature is that CLS allows a user to see a list of RESOURCES, to which the user is allowed access, and allows the user to select a RESOURCE. If the RESOURCE is a computer program, or other object that runs on a processor, CLS retrieves the selected RESOURCE, and launches it.

In the present context, this feature is important, because the RESOURCES include educational computer programs, as discussed below. When the student, or the INTELLIGENT ADMINISTRATOR, selects a RESOURCE, CLS automatically launches it, if possible.

4. CUSTODIAN of Each REPOSITORY Controls Contents (ie, Resources) of REPOSITORY, and Controls Access to RESOURCES Contained within the REPOSITORY. The person, or agency, having physical custody of each REPOSITORY has the power to load RESOURCES into storage within the computers of the REPOSITORY. Thus, the CUSTODIAN controls the contents of the REPOSITORY. Further, CLS allows the CUSTODIAN to designate the parties who shall be granted access to each RESOURCE.

Under the present invention, a local school district, for example, will control the RESOURCES, which contain the curriculum for the students. This school district will control access to the RESOURCES, and can grant access to students of other districts, if desired.

5. Each RESOURCE Has a PROFILE. A "RESOURCE PROFILE" is a collection of information which describes a RESOURCE. The PROFILE contains, for example, a) a descriptive title;

b) the REPOSITORY containing the RESOURCE;

c) information about physical characteristics of the RESOURCE (media type, such as computer disc, video tape, paper book, etc.);

d) relevant dates, such as date of loading into the REPOSITORY;

e) security-related information;

f) and so on.

The PROFILEs are somewhat analogous to the cards of the card catalog of a library. In a library, the books, and other media, such as film and video tape, constitute RESOURCEs. In CLS, the RESOURCEs include a more diverse array of media types than a library, but the PROFILEs serve a function similar to that of the cards.

Adaption of CLS to Education

A LEARNING PROFILE is generated for each student, in a manner discussed in greater detail below, and these are called LEARNING PROFILES, to distinguish them from RESOURCE PROFILES, which describe RESOURCES, and not students. The LEARNING PROFILEs conform to the PROFILEs used by CLS for RESOURCEs generally. The student-PROFILEs contain information about the student which is relevant to the INTELLIGENT ADMINISTRATOR. The LEARNING PROFILES can be arranged to follow the students through their entire careers, subject to legislation regarding privacy of the content of the LEARNING PROFILES.

LEARNING PROFILE Creation

The LEARNING PROFILE can be created in numerous different ways. For example, standard psychological testing techniques and personal interviews can allow a counsellor to generate a LEARNING PROFILE, which is loaded into CLS.

As another example, CLS itself can administer known, standard tests, and develop the LEARNING PROFILEs without intervention of a counsellor. In practice, the LEARNING PROFILE generation will probably be undertaken in a procedure which is a hybrid of these two examples. At the end of the Specification, a discussion is given regarding learning strategies, and contains additional material relevant to LEARNING PROFILE generation.

PROFILE Content

The LEARNING PROFILES contain information such as the following:

1. Student's curriculum, or "major." One benefit of the invention is that all students, at all levels, can be given individualized attention. Even very young students can be given a "major" if desirable.

That is, in present educational systems, younger students, such as those in the earlier years of primary education, are usually not given specific curricula. For these students, education tends to be non-specialized and generic; all students tend to be given similar courses.

The invention allows education to be tailored to individual needs, at all educational levels. One reason is reduction in cost: the invention contains the vast array of lessons needed to provide individual attention. There is very little added cost in making the individual attention available to additional students.

2. Preferred teaching strategies. At the end of the Specification, teaching strategies are discussed. In general, different teaching strategies are available for most, if not all, subjects. As an example, the Suzuki method of teaching piano illustrates one teaching strategy.

Under this strategy, students listen to recordings of piano music played by a master, and then imitate the master by playing the music themselves, while reading sheet scores of the music. While the student plays, a teacher coaches the student. Right from the start, the student plays complete (though simple) songs.

In contrast, under another method, the student does not initially study complete songs, but instead studies the components of songs, namely, single notes, their duration, their intensity, and so on.

Both methods have their advocates and critics. Without considering the debate itself, it seems reasonable to assume that neither method is perfectly suited to all students.

The invention, if called upon to teach piano, would recognize this fact. Under the invention, each student's PROFILE contains an indication of the student's preference, such as for the Suzuki method, or another approach, and the student is instructed accordingly.

3. Student's present standing. The PROFILEs contain a statement of the student's previous accomplishments, which indicate the student's present standing, or status. From a lifetime viewpoint, the present standing refers to the present educational level of the student, such as fifth grade, or college sophomore.

From a more focused viewpoint, the present standing refers to the courses presently being taken, and the progress made in each. For example, in a high-school course in algebra containing 60 lessons, the present standing will indicate the number of lessons successfully completed.

The present standing provides specific information for CLS to use in determining what material to present to a student during a given session.

The present standing is preferably ascertained in a non-intrusive, transparent manner, based on a demonstration of level of competency by the student. Level of competency can be determined, in many; if not most, subjects, by assessment in a hierarchical fashion. For example, assume that a given student is undertaking a course in calculus. Calculus textbooks present material in a sequential manner, in the sense that mastery of earlier material is required as a prerequisite to understanding later material. A simple assessment of level of competency of a student can be done by determining in which chapter of the textbook the student's mastery ends.

As another example, assume that the student is undertaking a course in gas turbine engine maintenance. Many maintenance procedures involve sequences of events, wherein the order cannot be changed. A student's level of competency can be assessed by determining how much of a given sequence the student has mastered.

It is significant that the source of a student's knowledge which determine the level of competence is not germane to the assessment process. The assessment process seeks to determine a level of performance, or level of competency, because the goal of the overall education process is to enhance ability to perform.

4. Significant personalized information. This is perhaps a sub-class of preferred teaching strategies. This section contains information about unique attributes of the student which either present difficulties in teaching the student, or facilitate teaching.

For example, a student who has a hearing impairment may require special lessons, as compared with a student having hearing abilities within the norm of a standard population. As another example, a student who has a photographic memory may find that learning the vocabulary of a foreign language is an extremely simple task.

The PROFILEs, in general, facilitate the IA's matching of the students' needs with the RESOURCEs which are suited to those needs. The PROFILEs contain information such as that described above, plus additional information required, to accomplish this goal.

RESOURCEs

In general, RESOURCEs include all materials made available by CLS. In the context of education, RESOURCEs include a significant number of computer programs which teach. There are numerous types of such programs, and hundreds, and perhaps thousands, are commercially available today.

Intelligent Administrator

The Intelligent Administrator (IA) is a system of computer programs, which can operate alone, or in conjunction with an SME or other consultant. The IA does the following:

1. Based on PROFILEs, the IA assesses a student's current standing within a curriculum, and determines the skills required for the student's present advancement.

For example, the IA may determine that a given student stands at the beginning of the junior year in high school, and that the student has successfully completed 12 of 60 lessons in analytic geometry. Based on this assessment, the IA decides that lesson number 13 should be given next.

2. The IA locates the RESOURCEs necessary for the required lessons. In this example, the IA would locate lesson 13, identified above. Lesson 13 will probably reside in the local school district's REPOSITORY, but, because of the capabilities of CLS, lesson 13 can reside anywhere within the overall CLS system.

Since multiple teaching strategies are available, and are used if the first-chosen strategy does not produce results, the IA locates the multiple RESOURCEs which represent the multiple strategies. (In the general case, these RESOURCEs will not be located in the same REPOSITORY, although they can be.)

3. The IA assesses whether the RESOURCEs are successfully imparting the knowledge desired to the students. This assessment can be done by using known, standardized testing approaches, given by computer.

Additional Considerations and Characterizations

1. Different presentation of a given lesson was discussed above. In the section entitled "Teaching Strategies Generally," located below, references are discussed which elaborate on the concept of different learning behavior of different students. These references provide the general principles of creating different presentations.

A more rote-minded approach would be based on the fact that different teachers themselves probably make different presentations of a given topic. Therefore, one approach to generating the different presentations is to assign a number of teachers, say ten, the task of each writing a lesson explaining a topic. The ten different lessons will provide ten different presentations for the collection of presentations.

2. The invention measures the rate of learning of the student, and prompt the student to end a lesson when the rate is seen to significantly falter. For example, suppose that a student is studying a subject which is memorization-intensive, such as biology. The lessons can be arranged such that learning is presented in groups of twenty concepts. After each group of twenty is presented, an assessment of the student is done.

The IA logs the time required by the student to learn each group. When the time falls below the best time by a predetermined amount, say thirty percent, the IA attempts a different teaching strategy. If that fails, after a predetermined number of attempts, then the IA patches the student into a Subject Matter Expert.

3. One form of the invention includes the following components:
  a) CLS.
  b) The educational programs, including the different presentations of a given subject, which are commercially available, or can be developed based on known principles.
  c) PROFILES, which are developed according to the teachings of this Specification.
  d) The INTELLIGENT ADMINISTRATOR, which primarily
    i) selects different teaching strategies, based on
      A) profile of student and
      B) success of previous lessons.

The details concerning implementation of the INTELLIGENT ADMINISTRATOR are known, given the mission of the IA as described herein.
  e) The SUBJECT MATTER EXPERTS.

4. The video conferencing feature of CLS allows a SUBJECT MATTER EXPERT to teach small groups of students, and the students to confer with each other. As an example, after students in an ordinary school take an examination, many of them congregate and compare opinions on the exam. Under the invention, similar behavior is possible, but by way of video conferencing.

5. The distributed aspect of learning is important. A student can undertake learning at any location, provided a Communicator is available to link with CLS, or an equivalent.

For example, a newly hired business person must learn certain internal procedures followed within the hiring organization, such as filling out expense account forms. It is known in the art how to write a program which explains how to fill out such a form. (In a highly simplistic sense, the program can merely repeat the text of written instructions which undoubtedly have been written.)

This instructional program is made available via CLS. The business person can now learn how to fill out the expense "form," using a Communicator, such as a PC and a modem, at any desired location, such as in a waiting lounge at an airport. Then, having mastered the procedure, the person can fill out needed "forms" at any location whatsoever, provided a link to CLS, or to an equivalent, is available.

6. Two learning styles are discussed herein, namely, "holistic" and "linear." There exist other distinctions in approaches to explaining subject matter to a student. Three examples are the following.

A. Some students prefer to read material; others prefer to hear an explanation of material spoken by a teacher.

B. Some students prefer to have material presented in a verbal format, either in writing (which is read) or in speech (which is heard). Other students prefer to have material presented in graphical format. A good example of this distinction is found in Gray's Anatomy. Two versions exist: there is a version which is primarily textual, and contains few pictures. There is another version which is primarily graphical, and is replete with pictures.

C. When technique is being taught, some students prefer to see a demonstration; others prefer to hear a description of the principles of that demonstration.

Profiles and Learning Strategies

One approach to Developing a Learning Profile

The invention obtains necessary data from the student, such as name, age, and previous learning completed in school. This information allows the AI to place the student in the proper grade.

The invention then ascertains the student's preferred learning style through an entry adventure. (Different adventures will be given to students of different age, so the age, or last grade completed, will influence the choice of entry adventure presented to the student.)

Each student can take a new entry adventure every year, to ascertain whether the learning characteristics have changed. Also, since girls and boys differ in their intellectual and social development, and since the entry adventure should catch their interest and create enthusiasm for the coming year's studies, different versions will be used for boys and girls.

In this adventure students solve a problem, or pursue an adventure. The choices made indicate their comprehension speed and favored style of learning.

Learning Speed

The student's learning speed can be measured by how long it takes a student to solve a given problem, or to perform an assigned task. Several problems will be embedded in the adventure; the problems will provide information and then require the student to apply it in situations which require different levels of complexity and integration. The invention can tally the total time elapsed for the student to solve the problems, and compare the total to the norm for that grade in the student's school district or region. (This learning speed measure is different from IQ measurement; research has shown that even above-average students differ in their learning speed.)

Physiology Can Correlate with Learning Speed

There has been some research pioneered by W. C. Sheldon at Harvard in the 1930's and 40's, on the correlation between body type and learning characteristics. (Smith, 1949, pp. 310–320). Sheldon delineated three body types, based on the embryonic source of tissue: ectomorph (tall and skinny), mesomorph (compact and muscular) and endomorph (large and or overweight).

More recently, Chopra has pointed out that a particular traditional medical system, of interest to him, also defines three basic physiological types in a manner similar to Sheldon's. (Chopra 1990, pp. 33–41).

According to Chopra, some students (endomorphs) learn slowly but retain knowledge quite well, and others who learn quickly tend to forget just as quickly (ectomorphs).

Therefore, physical examination of students may provide data indicative of learning characteristics. Further, the invention can be used to validate, or derive, correlations between measured physiological parameters and learning behavior. When correlations are found, the identification of learning characteristics can be made based on the physiological parameters, which are presumably easier to ascertain.

For example, a standard set of physiological parameters of students are measured and placed into the PROFILES. Known medical and public health techniques list these standard parameters. Then, over time, the INTELLIGENT ADMINISTRATOR looks for correlations between learning speed, preferred learning style, etc., and the parameters. Known statistical techniques provide the correlation.

When correlations are found, then the measured physical parameters are used to indicate the learning characteristics of subsequent students, rather than testing for the characteristics themselves.

Preferred Style of Learning

There is much written in educational psychology about learning styles, usually referred to as "cognitive styles." Cognitive style, or learning style, refers to the way in which a student prefers to organize his or her thought processes—his or her preferred mode of thinking. There are a few different approaches which could be used, but by far the largest body of research shows that learning style preferences usually fall into one of two groups, stereotyped as artistic or scientific thinking.

Hunter Breland, a research psychologist for the U.S. national Educational Testing Service, asserts that "the most widely examined" cognitive style is the continuum of field dependence/independence (Breland, 1981, p. 38). The basic difference between field dependent and field independent problem-solver is that the former tend to depend on cues from the environment to solve the problem, and the latter tend to rely more on internal cues. He quotes a study by Witkin et al. (1977) which indicates that field-independent college students tend to major in the sciences while the more field-dependent students gravitate toward majors in education (p. 38).

Entwistle (1981) writes about Pask's research categorizing students as "holist" or "serialist." The holist learning style, called comprehension learning, involves "building descriptions of what is known." The serialist style is called operation learning, "the facet of the learning process concerned with mastering procedural details." (p. 93).

When Pask assigned students to either a matched or mismatched learning situation, the results were notable: the matched students were able to answer most of the questions regarding the lesson, while the mismatched students generally scored less than 50% correct. Entwistle's conclusion is that although teachers will never provide as extreme an example of mismatching, there is evidence in primary education to support the fact that different teaching methods are effective to different degrees for students with different personality characteristics.

There has been other research indicating that students differ in their preference of inductive or deductive reasoning. Another area of research has been whether students prefer to use what are commonly considered "right brain" skills (creativity, association, imagery, analogies, spatial relationships, feelings) or "left brain" skills (logic, sequence, organization, structure, procedure).

All of these approaches have the same theme: the basic question is whether a student prefers to use logical, procedural, linear thought processes or holistic creative (associative), spatial processes. Most authors point out that many learners are flexible and can move relatively easily between the two cognitive styles. And, as most every author points out, everyone must use both approaches at different stages in the solution of a problem, and the ideal is to be able to function well in both (e.g., an architect must think creatively to plan a house, but then he must also know clearly the sequence of building, or the house will not materialize).

This computer program can assess whether one of these learning styles is preferred on the basis of choices made in the context of the entry adventure. If a student is reasonably comfortable with both, then he or she will be branched into the standard curriculum, which is a mix of both styles. If, however, a student displays a dear preference for one style, he/she will be branched into a curriculum which favors explanations and examples in that style.

Delivering the Content and Mastery of the Material

The curriculum must also be structured from sound learning principles. There are a few different schemes for classifying the necessary conditions for learning but Gagne's learning outcomes and conditions of learning are the most thoroughly developed and therefore the most useful in developing computer-based instruction.

Gagne classified all possible learning outcomes into five performance categories: intellectual skills, cognitive strategies, verbal information, motor skills, and attitudes. Examples of these, along with their subcategories, are shown in Table 3.1, below, taken from Gagne's Essentials of Learning for Instruction (1975, p. 68). These are useful for design purposes in that they describe capabilities which apply across all subject matter areas. According to Gagne, certain conditions are necessary for learning each of these types of outcomes. Some conditions are "internal" and some are "external."

The internal conditions define prerequisite knowledge or skills, and external conditions define certain aspects of the instruction; the invention should be concerned with both. The following descriptions of internal and external conditions required are derived from Gagne's The Conditions of Learning (1977, pp. 25–49).

For the learning of intellectual skills, the primary internal condition is that the student have prerequisite skills which provide the components of the new skill being learned. External conditions are often in the form of verbal directions which guide the combination of simpler skills into a new integrated whole.

In terms of verbal information, internal requirements are that the learner have a good mastery of linguistic rules and vocabulary in order to understand statements presented, and he or she must also have previously existing "cognitive structures" (p. 40), or structures of meaningfully organized information which will give meaning and context to the new material presented.

One external condition is stimulation of the appropriate cognitive structure (usually in the form of an advance organizer). Another is informing the learner of the objective of the learning; this focuses the learner's attention. A third may be repeated hearing or reading of an informational passage; most modern theories concur that more information is assimilated with each repetition (p. 40).

Cognitive strategies refer to how the learner organizes his or her own thought processes (attention, learning, remembering, thinking). The internal conditions required are memory of intellectual skills and verbal information previously learned which relate to the new task presented. The most effective external condition is evidently frequent opportunities to practice strategizing. According to Gagne, practice refines and improves the strategies.

TABLE 3.1

Five Major Categories of Human Capabilities, Representing the Outcomes of Learning with Examples of Each Example of Human Performance Made Learning Outcome Possible by the Capability

| | |
|---|---|
| Verbal Information | Stating the provisions of the First Amendment to the U.S. Constitution |
| Intellectual Skill | Showing how to do the following: |
| Discrimination | Distinguishing printed b's from d's |
| Concrete Concept | Identifying the spatial relation "below" |
| Defined Concept | Classifying a "city" by using a definition |
| Rule | Demonstrating that water changes state at 100 C. |
| Higher-order Rule | Generating a rule for predicting rainfall, given conditions of location and terrain |
| Cognitive Strategy | Originating a novel plan for disposing of fallen leaves |
| Attitude | Choosing swimming as a preferred exercise |
| Motor Skill | Executing the performance of planing the edge of a board |

The learning of motor skills (e.g., courses in drafting, carpentry, etc. in the curriculum) requires the student to master in overall sequence and pattern of movements. Especially in the case of a complicated procedure (e.g., constructing a chair) sometimes the sequence must be learned in parts, which are then put together. The main external condition required is repeated practice, which makes performance more and more smooth and predictable.

Attitudes are expressed behaviorally; therefore one internal condition for learning new attitudes is that the learner must have mastered whatever skills or knowledge the behavior requires (e.g., knowledge of the rules in order to enjoy playing chess, etc.) Another internal condition is that the learner must have admiration and respect for people who are seen doing the behavior; this is called "human modelling" (p. 46.) The only external conditions which seem to be effective are that either the learner himself or a human model experiences the effects of an action as "good" or "bad."

A summary of the external conditions which facilitate learning is shown in Table 4.2, from Essentials of Learning for Instruction (Gagne, 1975, p. 93). One way the invention will ensure mastery will be that the entire curriculum will be designed in accordance with these sound and widely accepted learning conditions of Gagne.

The invention has two ways to help a student who demonstrates through his or her score that internal conditions of learning are deficient (e.g., prerequisite skills or knowledge are lacking). The first is that a HELP screen is always available at the student's request. To avoid boredom or frustration, a student will be able to access a HELP screen at any point during an instructional unit. This first level HELP screen will allow the student to:

change skill levels (learning speeds)

change learning styles request another explanation request review of any previous material request a conference with a teacher Depending on the option chosen, the invention will then adjust a student's learning speed up or down, give another explanation and examples (one in the same learning style and one in a different learning style), review specific sections in the unit (or all previous information in the unit), or connect the student to a live video teleconference with a teacher. Access to this HELP screen is optional, and a student may choose it once, several times, or not at all during a unit of instruction.

TABLE 4.2

A Summary of External Conditions Which Can
Critically Influence the Processes of Learning
Class of Learning

| Objective | Critical Learning Conditions |
| --- | --- |
| Verbal Information | 1. Activating attention by variations in print or speech<br>2. Presenting a meaningful context (including imagery) for effective coding |
| Intellectual Skill | 1. Stimulating the retrieval of previously learned component skills<br>2. Presenting verbal cues to the ordering of the combination of component skills<br>3. Scheduling occasions for spaced reviews<br>4. Using a variety of contexts to promote transfer |
| Cognitive Strategy | 1. Verbal description of strategy.<br>2. Providing a frequent variety of occasions for the exercise of strategies, by posing novel problems to be solved. |
| Attitude | 1. Reminding learner of success experiences following choice-of particular action; alternatively, insuring identification with an admired "human model"<br>2. Performing the chosen action; or observing its performance by the human model<br>3. Giving feedback for successful performance; or observing feedback in the human model |
| Motor Skill | 1. Presenting verbal or other guidance to cue the learning of the executive subroutine<br>2. Arranging repeated practice<br>3. Furnishing feedback with immediacy and accuracy |

Students who score average or above average will be able to:

go to the next unit
change subjects
Request a live conference with teacher
Log off for now.

The conference option with SUBJECT MATTER EXPERTS makes it possible for a student who has mastered the unit but who is curious about tangential or deeper levels of the material to ask questions while his or her interest is still fresh. If a teacher needs to research the answer, the student could find the answer on the system at log on the next day, or CLS can page the student with a notice of the answer's availability.

A student who scores below average on the unit would automatically be given a diagnostic check. This is the second way in which the system can assess lack of prerequisite skills, as well as other problems. The diagnostic check will be in the form of a question (Did you use the HELP screen during the unit?) and a menu for the student to choose from:

Too easy
Too hard
Not straightforward enough (linear-biased learners will tend to think this about a curriculum that is too holistic)
Explanations seem incomplete (holistic-biased learners will tend to think this about a curriculum that is too linear).
Other
(Re-wording may be necessary for younger learners, but the idea will be the same.)

The computer system will automatically process the diagnostic results and adjust the curriculum accordingly. If the student requests, or checks "Other" he/she will be connected with a teacher for a live teleconference. After this diagnostic step, the student will then be given a menu screen with the choices:

further study
change subjects
log off

If the student chooses to either change subjects or log off, the computer will automatically place him at the beginning of customized remediation for this unit the next time this subject is requested. If the student chooses further study, he will begin the customized remedial content for the unit. This will include new explanations, examples, and practice situations.

When the remedial unit is complete, the score is displayed, and the above loop is repeated. If the student's score is still below average, he should automatically be connected with a teacher for a conference.

The teachers who work with this system will need to have Teachers' Guides containing all the content and resources in the system; there will be one of these for each grade level. They will need to know these well so that they can give assignments within the system to cover different problems that may arise.

The invention can be designed to provide many options, and the student's preferences can lead him through the curriculum to some extent; but the teachers' role will be critical in guiding the student through any rough spots, and being sure that the entire year's curriculum is completed on time.

Evaluation and revision must be built into the implementation of the system, especially for the first two years of use. Both the student and teacher should evaluate each unit of instruction as it is completed. The student could have a very short on-screen questionnaire immediately after the unit score is displayed, and the teacher could have the option of recording any comments about the content or design of the unit in the light of that student's experience.

Sample Lesson

Johnny, age 10, logs on to the system for the first time. The screen asks him to type his name, age, and assesses Johnny's last grade completed in school, which in this case was fourth grade.

The computer automatically branches Johnny into the fifth grade entry adventure for boys—the world of ancient Welsh legends, brought to life again through a time warp caused by the bizarre collision of incompatible electromagnetic fields on the exact spot where the Lord of Death was vanquished centuries ago. Death and his forces are abroad again, causing terrible damage. The challenge is to find him and trap him into returning to this spot, where the quantum mechanical laws of nature are normally strong enough to hold him fast.

To help Johnny solve this challenge, two guides provide assistance: one explains things using analogies and associations, and the other uses logical, linear, no-frills explanations. Johnny is frequently asked which of these guides he wants to ask for advice; in this way, the system can determine whether Johnny has a preferred learning style.

Johnny is given information of varying complexity at different points in the adventure. He is then asked to apply it in a number of situations. The computer tracks how many choices it takes Johnny to solve the problem, and compares this number to the norm. Assume that Johnny falls into the lower range.

Having finished the entry adventure, CLS identifies Unit 1 of the science curriculum. He first sees a short video clip of the science teacher, who introduces himself, explains how the unit is structured, and reminds Johnny that the HELP screen is available at any time, and that Johnny call talk with him in person by choosing that option. Then Johnny begins Unit 1.

The testing indicated that Johnny is a slower learner who is more comfortable with a holistic learning style, so he is branched into the holistic-dominant curriculum at the slower learning speed. First he sees and hears the story which acts as the advance organizer for the year's science study: there is a benevolent extraterrestrial messenger who has been given one year to convince his superiors that the earth should be spared from destruction.

Johnny's lessons examine selected features of the earth. At the end of each lesson, Johnny must provide information to the messenger which indicates whether the features studied have value, and should be preserved, so that the messenger can relay the information. The learning objectives for the year will be listed in this context. Then Johnny will see the tasks (learning objectives) that he must master for Unit 1 on Geology.

The learning outcomes expected in Unit 1 also verbal information, intellectual skills (all levels) and cognitive strategies. Gagne's critical learning conditions (e.g., presenting important ideas in context or building in occasional reviews of what has been learned) from Table 4.2 provide the structure for the stories, games, and adventures which comprise the unit of instruction.

Johnny works along in this highly—but transparently structured—learning environment until he doesn't understand something. At that point, he remembers that he can use the HELP screen. He chooses the HELP screen and indicates that he wants a further explanation. He is given two more explanations (one in each learning style) with examples and two practice questions at the end. His answer indicate that he understands, and he is branched back into the unit.

Later in the unit, he isn't sure that he understands something and he chooses "practice questions" under HELP 1. Still confused after those he asks for further explanation, which still doesn't clear up the problem. He is automatically branched into a live teleconference with the teacher, who sets him back on track, and tells Johnny how he can get more information on the subject if he wants, but tells him that now he can also go on if he prefers.

Johnny continues work in the unit until he has another question; he calls up the HELP screen and selects "further explanation." This time he understands well enough after the explanations to answer the two practice questions correctly, and he is then branched back into the unit.

Johnny finishes the unit with a test of his mastery of the learning objectives for the unit. Rather than calling it a test, the system presents it as his report for the extraterrestrial; it includes geological reasons why the earth, and the study of its geology, is important.

Johnny finishes the unit with an average score. He is asked to answer three short questions ("What did you like best about this unit?" "What did you like least . . . ?" "Any ideas for making it better?") regarding the appeal and effectiveness of the unit. Then he is given the options of going on to the next unit, changing subjects, talking with the teacher, or logging off.

Curriculum Generation and Marketing Collateral

Provides a review of standard course descriptions and objectives

Provides ability to review and define a custom curriculum

Offers a course catalog with descriptions of course-ware and curriculum planners Provides previews of training courses Allows download of educational collateral The education related services component of the present invention generates a curriculum of course offerings in operation 2500. A review of standard course descriptions and objectives is provided. Also provided is the ability to customize the curriculum. Course information and dates are described in a course catalog, which is displayed or made available for download. The course catalog may also describe course-ware and suggest curriculum. Also available for download is educational collateral. Optionally, previews of training courses may provided for example as promotional material or to help a user prepare for the first class.

Figure 25A:
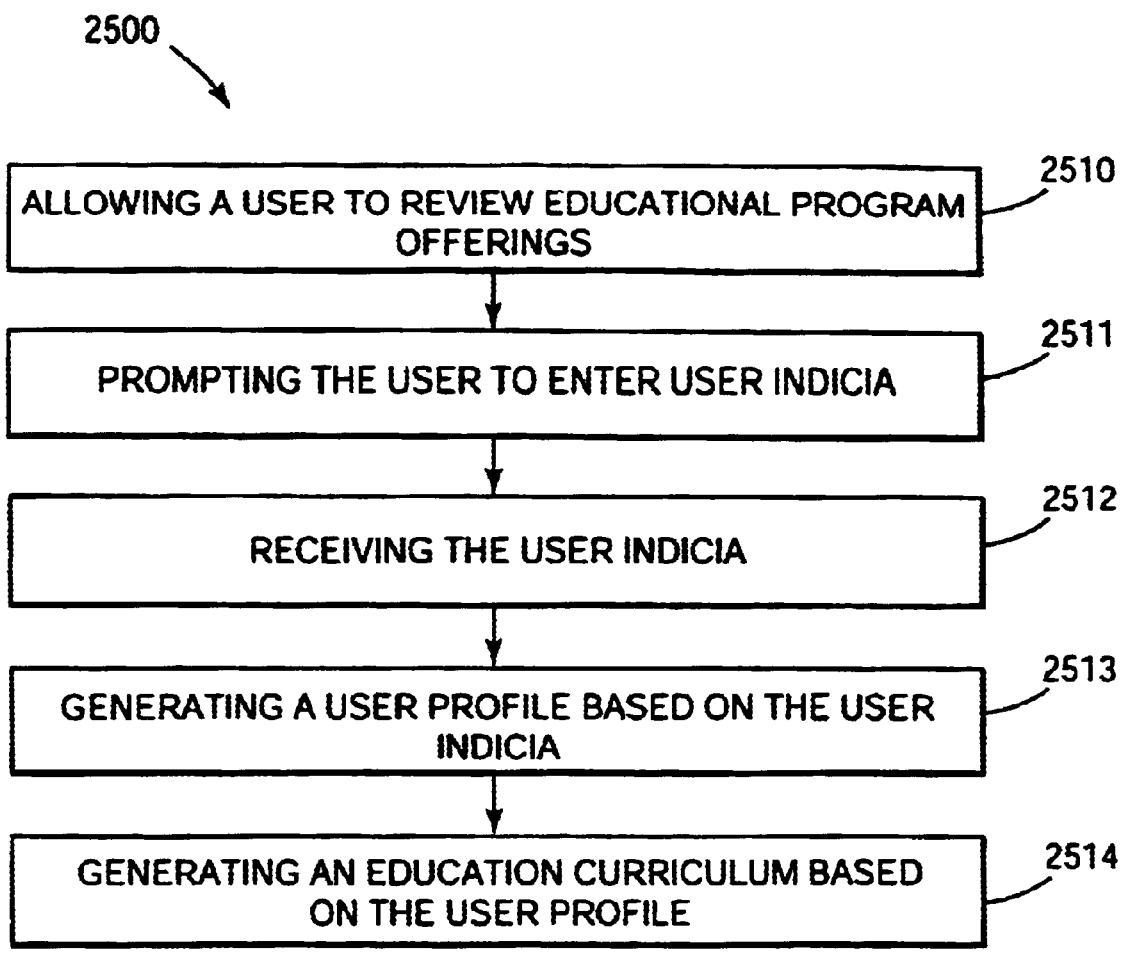
FIG. 25A is a flowchart illustrating one manner of generating an educational curriculum in the education-related web application services in accordance with one embodiment of the present invention.
Figure 25B:
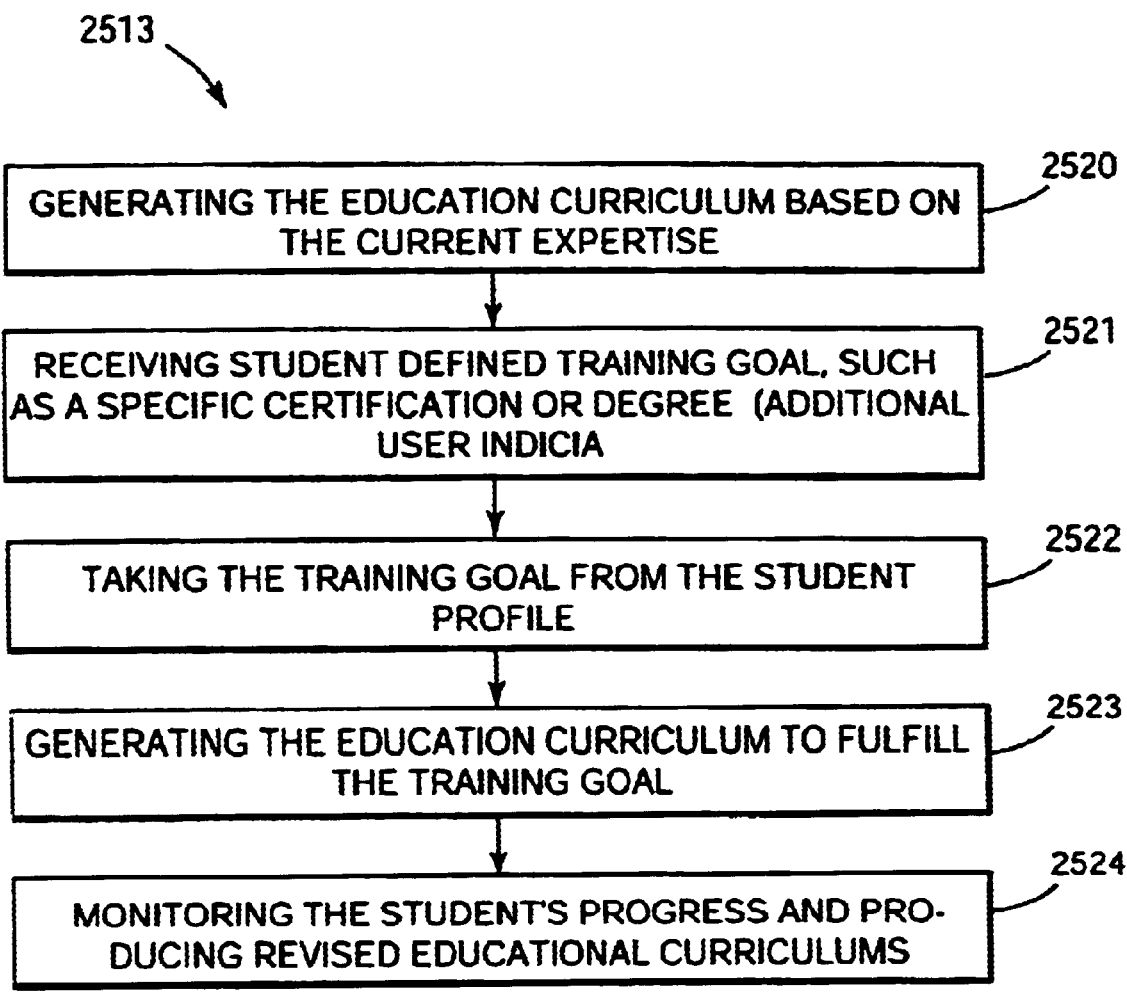
FIG. 25B is a flowchart illustrating one manner of generating an educational curriculum in the education-related web application services in accordance with one embodiment of the present invention.

One embodiment of the present invention is provided for automatically generating a student educational curriculum. See FIG. 25A. First, in operation 2510, educational program offerings are displayed, which a student is allowed to review. Next, in operation 2511, the student is prompted to define his current expertise by completing a student profile (user indicia), which is received by the invention in operation 2512 and used to generate a user profile in operation 2513. Referring to FIG. 25B, for example, the student profile may define a current expertise. The education curriculum would be generated based on the current expertise in operation 2520. Then, the student defines his training goal, such as a specific certification or degree (additional user indicia), which is received in operation 2521. Or the training goal may be taken from the student profile in operation 2522. The education curriculum is generated to fulfill the training goal in operation 2523. The student's progress is monitored and revised educational curriculums are produced, when necessary, in operation 2524 based on the monitored progress. Finally, an education curriculum based on the user profile is generated in operation 2514 of FIG. 25A.

The student may also opt to follow the original educational curriculum or the revised curriculum. Incentives and disincentives may be utilized to influence the student's curriculum choices.

Register for Training and Order Training

Provides an interactive interface to register for all offerings

Integrates with commerce functions to provide order placement and transaction processing (e.g. Takes orders online by credit card)

Allows users to register for third party training

Allows users to register for online training

Supports multiple payment options

Integrates with third party systems

Users may order and register for any educational offering on an interactive interface through operation 2502 of FIG. 25. Examples of offerings may include third party training and online training. The interactive interface may be integrated with the commerce component to permit transactional processing when placing an order. For example, a user may sign up for an offered course and pay the tuition by credit card. Alternatively, the commerce component could create a payment schedule which requires that payments be made periodically. Optionally, the registration and ordering components are able to integrate with third party service providers' systems.

Online Training

Courses can be deployed over a variety of environments (e.g. LANs, WANs, intranets, internet, etc.)

Offers tests over individual courses as well as entire curriculum

Offers courses that can be taken live, directly from the web server or downloaded to learner's workstation Provides ability for administrators to post bulletins announcing new course-ware The education related services component of the present invention educates users over a network such as a LAN, WAN, an intranet, the internet, etc. Note operation 2504 of FIG. 25. Courses may be taken live, directly from a server, or downloaded to the workstation of a user. Bulletins relating to the courses could be posted on electronic bulleting boards or electronically mailed to individual students. Tests may also be offered over individual courses as well as entire curriculum.

Training Account Status

Provides ability to check progress in individual courses or entire curriculum

Provides ability to match their completed courses against vendor certification program requirements Provides ability for administrators to track training library usage Provides ability to send in status reports to administrators via various media Integrates with third party training centers to update training status The status of the education of the user may be checked at any time in operation 2506, including checking progress in individual courses or the entire curriculum. A user is also able to match completed courses to certification program requirements. Administrators are permitted to track training library usage as well as receive status reports of individual students or all students in a course. Optionally, the education related services component of the present invention integrates with third party training centers to update the training status of a user, particularly useful for users who wish to take courses of another program.

Customer-Related Web Application Services

Referring to component 1412 of FIG. 14, one embodiment of the present invention is provided for affording a combination of customer-related web application services to support a product. More detail is provided in FIG. 26. In operation 2600, a user is allowed to register the product. Further, on-line support information is provided about the product. Such support information is provided based on queries. Note operation 2602. As an option, this information may also be afforded by way of a specially managed call center. In addition, in operation 2604, claims may be handled relating to the product. During operation 2606, the users are automatically notified of upgrades and/or problems relating to the product. Consulting services may also be made available.

Product Registration

Allows customers to register products online

Automatically sends users confirmation of registration

Notifies users of upgrades or other product-related information

Maintains database on user's purchases to create profiles

Operation 2600 of the web customer service component of the present invention allows the registration of a product, preferably online. Upon registration of a product, confirmation that the registration has been received is automatically sent to the user, such as by email. Notices of upgrades, promotions, and other product-related information is sent to registered users. A database stores the purchases of each user to create profiles, which may be used statistically for marketing purposes.

Web Based Self-Support/Knowledge Search/Diagnostics Search

Accepts queries in natural language format

Responds with additional questions to facilitate issue resolution

Provides solutions over several mediums (e.g. links to web pages, graphics, illustrations, software updates, etc.)

Offers an online technical library for quick troubleshooting

Provides downloads of software fixes/updates

Refers users to create service cases for unresolved issues

Figure 26:
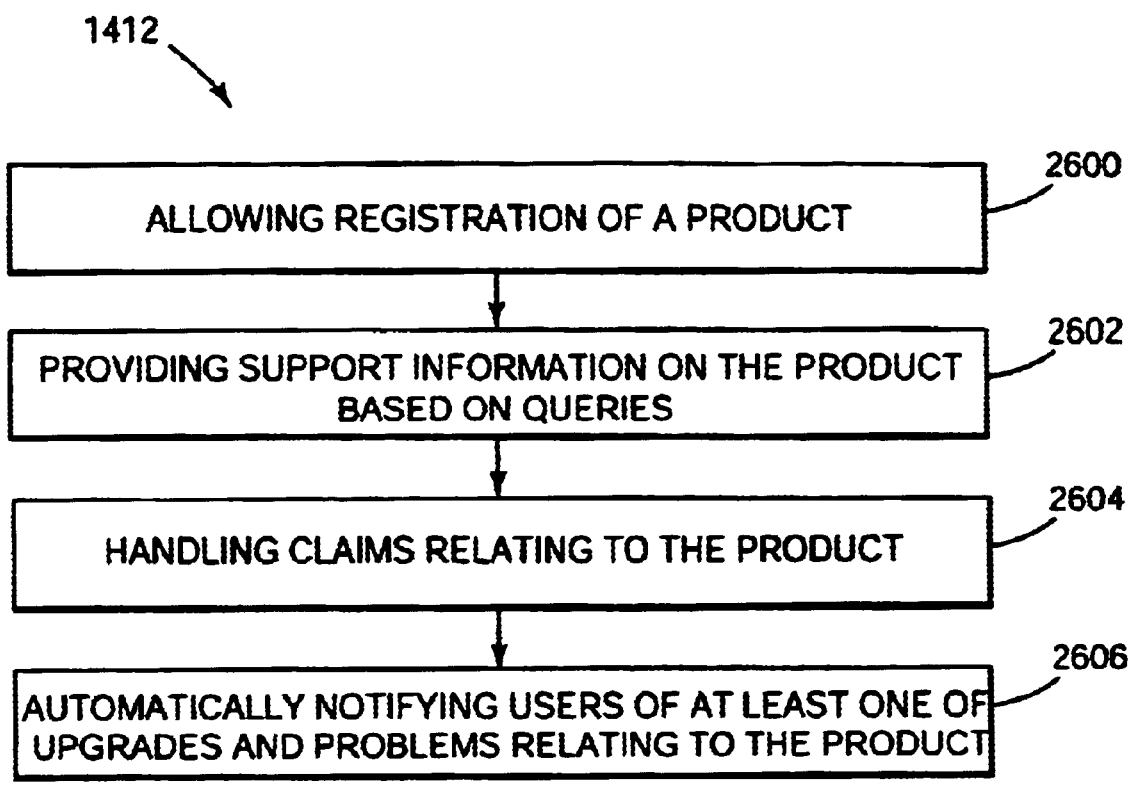
FIG. 26 is a flowchart illustrating the web customer-related web application services in accordance with one embodiment of the present invention.

Referring to operation 2602 of FIG. 26, support information on a product may be searched for based on queries input by a user. Queries may be accepted in natural language format as well as by keyword. The support component may respond with additional questions relating to the matter at hand in an effort to better identify the problem. Solutions may be provided over several mediums, including links to web pages, graphics, illustrations, animations, downloadable software updates and fixes, etc. Also provided may be an online technical library with answers to common questions for quick troubleshooting. For unresolved issues, the user may be asked to create a service case which will be followed up on later by a technician.

In a traditional case, where goods are introduced to a customer in a traditional way, that is, through a catalog sent via traditional mail (not electronic mail) and so forth, or through other media, without using an online communication system, If the customer has a question about the introduced goods, the customer may directly call a company or the like which handles the goods and inquire thereof about the goods. In such a case, the customer tells the company the trade names, article identification numbers, and so forth, of the goods. Then, the customer may obtain an answer as to how to use the goods, a payment method when buying the goods, and so forth, from a person in the customer service division in the company.

However, in an online mail-order case, goods information is transmitted to a customer from the center (the sales company) via the online communication system. In response thereto, the customer may make an order for an article and transmit this information to the center via the online communication system. Therefore, in such a case, it is not possible to perform direct conversation between the customer and the center (the sales company). A database has been considered for explaining goods and answering possible customer's questions. However, the contents of the customer's questions may vary for each particular customer. Therefore, the database which can answer various possible questions of the customer needs to have a very large amount of data and thus may be inefficient. Further, when assuming all possible customer's questions about the goods and preparing answers thereto, it is not possible that customers actually ask all the assumed possible questions. Therefore, a database may not be an efficient way to prepare all the answers for all the assumed possible customer's questions.

The present invention has been developed in consideration of the above-described problems. The present invention provides an answering method and system in online shopping which enables, in an online communication system, easy production of data for answering customer's questions and preparation of answers to general questions. Further, the answering method and system, in online shopping, enables, in a case where complete answers could not be prepared for all the possible questions, an answer to be transmitted to the customer when the answer has been prepared for a particular question given by the customer via electronic mail.

According to a first aspect of the present invention, in online shopping in which a mail-order business is conducted between a center and a terminal via an online communication system, for answering a question of a customer, necessary but minimum answers to questions are prepared in a database; the database is searched when the customer asks a question A, and, when an answer A to the question A is present in the database, transmits the answer A to the customer via the online communication system; an answer B is prepared when an answer to the question A is not present in the database, and the answer B is stored in the database; and the answer B is transmitted to the customer via electronic mail.

According to a second aspect of the present invention, the question A is stored as inquiring screen image information to be transmitted to customers, when an answer to the question A is not present in the database.

According to a third aspect of the present invention, the customer is able to input any other question when the customer wishes to ask a question other than predetermined questions previously stored in an inquiring screen image information; any other question asked by the customer is temporarily stored when receiving any other question; any other question and an answer thereto are stored as a question and answer set, when the answer thereto is prepared; and, at an any point of time, the database and the inquiring screen image information are updated using the question and answer set.

According to a fourth aspect of the present invention, in online shopping in which a mail-order business is performed between a center and a terminal via an online communication system, for answering a question asked by a customer, there is provided an answer database for previously storing necessary but minimum answers to questions; question item determination means for receiving a question A from the customer and determining whether or not the question A is included in predetermined question items; search means for searching the answer database when the question item determination means has determined that the question A is included in the predetermined question items; online transmission means for transmitting to the terminal, via an online communication system, an answer A obtained by the search means; answer requesting means for requesting an answer when the question item determination means has determined that the question A is not included in the predetermined questions; updating means for updating the answer database using an answer B after the answer B is obtained through the answer requesting means; and electronic mail transmission means for transmitting the answer B to the terminal via electronic mail after the answer B is obtained through the answer requesting means.

According to a fifth aspect of the present invention, the updating means includes goods master file updating means for adding a question type code representing the question A to at least one predetermined question type of a goods master file when the question A has received the answer B. The goods master file stores the at least one predetermined question type corresponding to a question item relevant to an article code of an article that the customer selected.

According to a sixth aspect of the present invention, the updating means comprises inquiring screen image information updating means for adding the question A to the inquiring screen image information to be displayed to the customer, when the question A has not been included in the inquiring screen image information yet.

According to a seventh aspect of the present invention, the electronic mail transmission means transmits the answer B only to the terminal that asked the question A.

In the first and fourth aspects of the present invention, answers to all possible questions are not prepared in the database. Only necessary but minimum answers for goods which can be obtained in regular patterns are prepared in the database. Then, when the customer gives a new question, an answer to which is not included in the database, an answer is transmitted to the customer via electronic mail and also the answer is additionally stored in the database. Thus, answers are automatically accumulated in the database. The thus-accumulated answers can also be provided for other customers when receiving questions from other customers. Further, because answers to all possible questions are not prepared, it is possible to reduce manpower costs and also to reduce otherwise necessary data storage capacity.

In the second and sixth aspects of the present invention, similar to the accumulation of answers in the database, all expected question items are included in the inquiring screen image information to be displayed to the customer. New question items that customers input are automatically additionally included in the inquiring screen image information. Thus, question items are automatically accumulated in the inquiring screen image information. Similar to the above-described first and fourth aspects, it is possible to reduce manpower costs and also to reduce otherwise necessary data storage capacity.

In the third aspect of the present invention, when the customer inputs a question item which has not been stored yet, the input question is stored in a predetermined file. Then, after an answer to that question is obtained, the answer is stored together with the question as a set. Thereby, it is possible to update the database and inquiring screen image information at any point of time using the stored answer and question set. Therefore, it is possible to perform the updating operation when periodically updating general information. It is also possible to perform the updating operation immediately after the answer is obtained. Thus, the updating operation is free from any time condition.

In the fifth aspect of the present invention, each inquiring screen image information is provided for a respective article code stored in the goods master file. Further, a type code is given in the goods master file for each question item. When a question is asked by the customer and a type code of the given question item has not been stored in the goods master file, a new type code is additionally stored in the goods master file similar to updating of the database and inquiring screen image information. Thereby, it is possible to keep consistency between the data stored in the goods master file, database and inquiring screen image information. Thereby, it is possible to prevent the amount of data transfer between the center and terminals from unnecessarily increasing.

In the seventh aspect of the present invention, when a customer asks a new question, an answer that is prepared for the question afterward is then transmitted only to that customer. That is, it is not necessary to transmit the answer to other customers because the other customer do not need that answer. Thereby, it is possible to prevent the amount of data transfer between the center and terminals from unnecessarily increasing.

Thus, according to the present invention, when an answer does not exist in the database, the answer is obtained from sales staff, the obtained answer is sent only to a customer who requested the answer, and a database and so forth are appropriately updated using the obtained answer. Thereby, after the updating, other customers can obtain the same answer by an easy regular question-item selection operation.

Create and Manage Service Cases/Consultation Follow Up
  Analyzes problem and routes to appropriate resources
  Facilitates consulting group follow-up
  Integrates with issue tracking tools (e.g. Vantive)
  Allows users to track status of a submitted service case The web customer service component of the present invention provides for creating and managing service cases and following up on those service cases. The problems set forth in the service cases are analyzed and are routed to the appropriate resources. Optionally, the service case component may integrate with issue tracking tools such as Vantive to identify problem areas. Also a user may be allowed to track the status of a submitted service case.

Online Support
  Handles conversation-based telephone inquiries for automated customer support
  Provides intelligent call routing
  Offers "call-through" abilities from web link
  Provides real-time private chat sessions
  Provides real-time public chat sessions
  Provides ability for user to enter online questions
  Offers live agents to guide customer to solution
  Offers ability to send follow-up questions, Web pages, files, graphics to customers
  Has ability to handle multiple customers simultaneously Online support is provided by the web customer service component of the present invention, and is designed to handle multiple users simultaneously. A knowledge base would store support information. Conversation based telephone inquiries are handled for automated support. For example, a user may verbally ask a question and voice recognition software would choose an appropriate automated response based on recognized words in the question of the user. Further, calls may be automatically routed to the appropriate resource based on user input. Call-through capabilities from a web link may be offered.

A user may also enter online questions. Email would be a popular means of entering online questions. Real time public and private chat sessions could also take place. Live agents could be kept on hand to answer any questions that the automated responses did not adequately respond to. Also, follow up questions, web pages, links, files, graphics, animations, and the like could also be sent to users.

Returns and Warranty Claims
  Lists warranties
  Automatically checks user identity to validate user is registered
  Checks claim to see if it matches warranty criteria
  Request automatically routed to appropriate agent The web customer service component of the present invention lists warranties for view by a user in operation 2604 of FIG. 26. When a user has a product that requires service or return under the warranty, the identity of the user is checked to ensure that the user has registered. The claim made by the user is then checked and compared to the warranty to ensure that the claim meet warranty criteria for the requested service or replacement. Once validated, the claim is routed to the appropriate agent.

The web customer service component of the present invention may also provide a method and apparatus for handling complaints that allows complainants to lodge anonymous complaints against subjects, informs the subjects of the complaints, permits the subjects to respond to the complaints, encourages settlements of the complaints and holds the parties to the complaints accountable for their conduct while tempting to resolve the complaints.

The method of the present invention is preferably implemented with a programmed central computer, a plurality of access terminals, and a communications network coupling the central computer with the access terminals. The central computer is programmed to receive complaints and responses, store the complaints and responses in individual data records, and negotiate settlements to the complaints by several means described in the Detailed Description below. Once the disputes are resolved, the settlements or judgments are stored along with their respective complaints and responses in the data records.

The central computer is also programmed to provide public access to the data records to permit viewing of the corresponding complaints, responses, and settlements for allowing other users to gauge the conduct of the subjects and to encourage the subjects to respond to the complaints in a timely and satisfactory manner. Moreover, the central computer is programmed to monitor and rate the conduct and performance of both the complainants and the subjects during the course of the disputes. The ratings can be used to affect the outcome of the disputes and for other purposes to hold the parties accountable for their conduct during the attempted resolution of the disputes to encourage good conduct and cooperation between the parties during the course of the disputes.

Proactive Service Notification
  Automatically notifies registered customers about needed and optional upgrades
  Automatically notifies registered customers about possible bugs or problems and suggested solutions One embodiment of the present invention is provided for affording proactive customer support. Registered users are automatically notified about necessary and optional upgrades. See operation 2606 of FIG. 26. Optionally, a description of the upgrade may be included with the notification, along with recommendations about whether or not to install the upgrade. Further, registered users are automatically notified of possible problems or bugs and solutions are suggested, such as configuration changes or downloads.

Figure 26A:
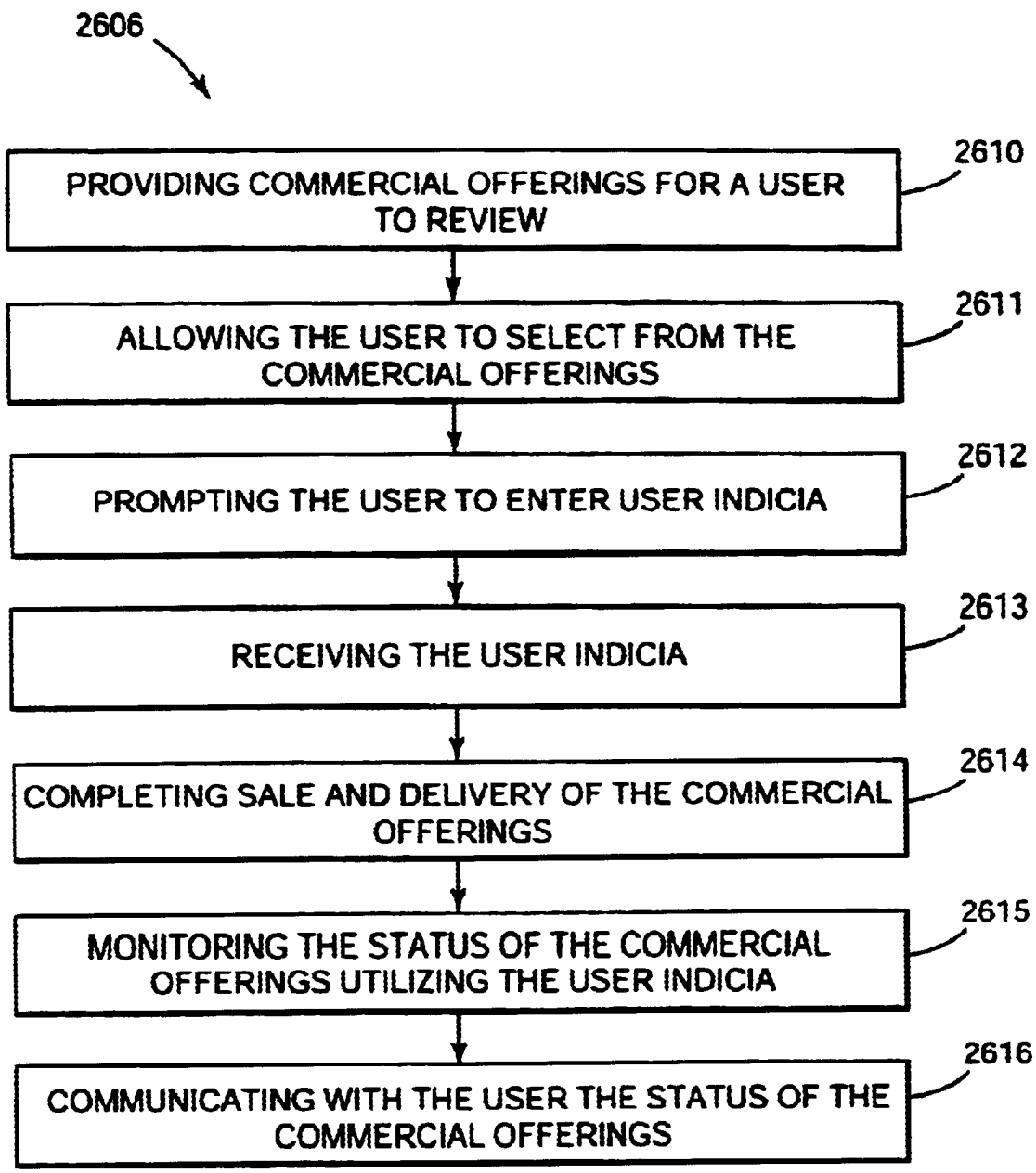
FIG. 26A is a flowchart illustrating one component of the web customer-related web application services in accordance with one embodiment of the present invention.

Referring to FIG. 26A, commercial offerings are displayed for a user to review in operation 2610. The user is allowed to select from the commercial offerings in operation 2611. In operation 2612, the user is prompted to enter user indicia, which is received in operation 2613. The sale is completed and the commercial offerings are delivered to the user in operation 2614. The status of the commercial offerings are monitored utilizing the user indicia in operation 2615. In operation 2616, the user is notified of the status of the commercial offerings. The commercial offerings include at least one of products and services.

In use, a user enters the system by purchasing products and/or services through a website. As part of the purchase transaction or product registration, the user defines the products and services which the user currently possesses or purchases by completing a user profile (user indicia). Incentives and disincentives may be used to influence the user indicia that is entered. Then, the user defines his specific desires for support including: levels of support, support channel, methods of use of the products and services and future purchasing plans (additional user indicia), which are received in operation 2613. The products and services which the user identified and/or purchased are monitored through the internet and other means in operation 2614. For example, search engines may scan provider websites for updates and patches, reduced price offerings, etc. Further, a dedicated email address corresponding to the user may be used when registering the product with the manufacturer, thereby providing a central location to receive notices and promotional material. If an issue with a product is found in operation 2615 such as a software bug, a factory recall or a reduced price offering, then the user is notified utilizing his defined channel such as mail, email, fax, telephone in operation 2616. If the user encounters an issue and requests support, the support will be provided utilizing the user's preferred channel and at the support level purchased by the user.

Consulting Services, Literature, and Partner Referral

Lists literature for follow-up consulting

Provides referrals to match customer-entered needs (internal or third party)

Routes consulting leads to external systems

The web customer service component of the present invention lists literature for follow-up consulting. Further, referrals are provided to match user-entered needs, whether the referrals are internal or from a third party. Also, consulting leads are routed to external systems.

Security Services

As shown in component 1414 of FIG. 14, one embodiment of the present invention is provided for affording a combination of security-related services. Various features are included, such as permitting remote log in as well as restricting access to various resources to authorized users only. As an option, permission may need to be granted before certain activities are performed by a user or users.

Figure 27:
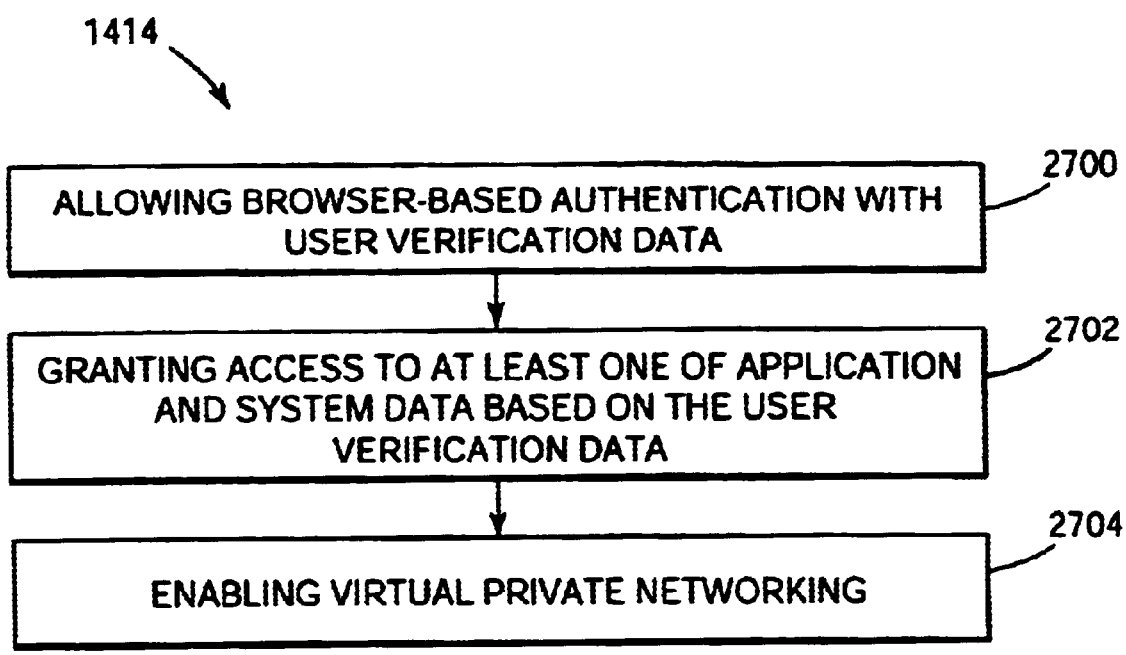
FIG. 27 is a flowchart illustrating the security services in accordance with one embodiment of the present invention.

Referring to FIG. 27, operation 2700 allows browser-based authentication with user verification data. In operation 2702, access is granted to application and/or system data based on the user verification data, which may be stored in a user's browser. Virtual private networking is provided in operation 2704. Rights and Control Information In general, the present invention can be used to protect the rights of parties who have:

(a) proprietary or confidentiality interests in electronic information. It can, for example, help ensure that information is used only in authorized ways;

(b) financial interests resulting from the use of electronically distributed information. It can help ensure that content providers will be paid for use of distributed information; and (c) interests in electronic credit and electronic currency storage, communication, and/or use including electronic cash, banking, and purchasing.

Protecting the rights of electronic community members involves a broad range of technologies. WAF combines these technologies in a way that creates a "distributed" electronic rights protection "environment." This environment secures and protects transactions and other processes important for rights protection. WAF, for example, provides the ability to prevent, or impede, interference with and/or observation of, important rights related transactions and processes. WAF, in its preferred embodiment, uses special purpose tamper resistant Secure Processing Units (SPUs) to help provide a high level of security for WAF processes and information storage and communication.

The rights protection problems solved by the present invention are electronic versions of basic societal issues. These issues include protecting property rights, protecting privacy rights, properly compensating people and organizations for their work and risk, protecting money and credit, and generally protecting the security of information. WAF employs a system that uses a common set of processes to manage rights issues in an efficient, trusted, and cost-effective way.

WAF can be used to protect the rights of parties who create electronic content such as, for example: records, games, movies, newspapers, electronic books and reference materials, personal electronic mail, and confidential records and communications. The invention can also be used to protect the rights of parties who provide electronic products, such as publishers and distributors; the rights of parties who provide electronic credit and currency to pay for use of products, for example, credit clearinghouses and banks; the rights to privacy of parties who use electronic content (such as consumers, business people, governments); and the privacy rights of parties described by electronic information, such as privacy rights related to information contained in a medical record, tax record, or personnel record.

In general, the present invention can protect the rights of parties who have:

(a) commercial interests in electronically distributed information—the present invention can help ensure, for example, that parties, will be paid for use of distributed information in a manner consistent with their agreement;

(b) proprietary and/or confidentiality interests in electronic information—the present invention can, for example, help ensure that data is used only in authorized ways;

(c) interests in electronic credit and electronic currency storage, communication, and/or use—this can include electronic cash, banking, and purchasing; and (d) interests in electronic information derived, at least in part, from use of other electronic information.

WAF Functional Properties

WAF is a cost-effective and efficient rights protection solution that provides a unified, consistent system for securing and managing transaction processing. WAF can:

(a) audit and analyze the use of content, (b) ensure that content is used only in authorized ways, and (c) allow information regarding content usage to be used only in ways approved by content users.

In addition, WAF:

(a) is very configurable, modifiable, and re-usable;

(b) supports a wide range of useful capabilities that may be combined in different ways to accommodate most potential applications;

(c) operates on a wide variety of electronic appliances ranging from hand-held inexpensive devices to large mainframe computers;

(d) is able to ensure the various rights of a number of different parties, and a number of different rights protection schemes, simultaneously;

(e) is able to preserve the rights of parties through a series of transactions that may occur at different times and different locations;

(f) is able to flexibly accommodate different ways of securely delivering information and reporting usage; and (g) provides for electronic analogues to "real" money and credit, including anonymous electronic cash, to pay for products and services and to support personal (including home) banking and other financial activities.

WAF economically and efficiently fulfills the rights protection needs of electronic community members. Users of WAF will not require additional rights protection systems for different information highway products and rights problems—nor will they be required to install and learn a new system for each new information highway application.

WAF provides a unified solution that allows all content creators, providers, and users to employ the same electronic rights protection solution. Under authorized circumstances, the participants can freely exchange content and associated content control sets. This means that a user of WAF may, if allowed, use the same electronic system to work with different kinds of content having different sets of content control information. The content and control information supplied by one group can be used by people who normally use content and control information supplied by a different group. WAF can allow content to be exchanged "universally" and users of an implementation of the present invention can interact electronically without fear of incompatibilities in content control, violation of rights, or the need to get, install, or learn a new content control system.

The WAF securely administers transactions that specify protection of rights. It can protect electronic rights including, for example:

(a) the property rights of authors of electronic content, (b) the commercial rights of distributors of content, (c) the rights of any parties who facilitated the distribution of content, (d) the privacy rights of users of content, (e) the privacy rights of parties portrayed by stored and/or distributed content, and (f) any other rights regarding enforcement of electronic agreements WAF can enable a very broad variety of electronically enforced commercial and societal agreements. These agreements can include electronically implemented contracts, licenses, laws, regulations, and tax collection.

Contrast With Traditional Solutions

Traditional content control mechanisms often require users to purchase more electronic information than the user needs or desires. For example, infrequent users of shrink-wrapped software are required to purchase a program at the same price as frequent users, even though they may receive much less value from their less frequent use. Traditional systems do not scale cost according to the extent or character of usage and traditional systems can not attract potential customers who find that a fixed price is too high. Systems using traditional mechanisms are also not normally particularly secure. For example, shrink-wrapping does not prevent the constant illegal pirating of software once removed from either its physical or electronic package.

Traditional electronic information rights protection systems are often inflexible and inefficient and may cause a content provider to choose costly distribution channels that increase a product's price. In general these mechanisms restrict product pricing, configuration, and marketing flexibility. These compromises are the result of techniques for controlling information which cannot accommodate both different content models and content models which reflect the many, varied requirements, such as content delivery strategies, of the model participants. This can limit a provider's ability to deliver sufficient overall value to justify a given product's cost in the eyes of many potential users. WAF allows content providers and distributors to create applications and distribution networks that reflect content providers' and users' preferred business models. It offers users a uniquely cost effective and feature rich system that supports the ways providers want to distribute information and the ways users want to use such information. WAF supports content control models that ensure rights and allow content delivery strategies to be shaped for maximum commercial results.

Chain of Handling and Control

WAF can protect a collection of rights belonging to various parties having in rights in, or to, electronic information. This information may be at one location or dispersed across (and/or moving between) multiple locations. The information may pass through a "chain" of distributors and a "chain" of users. Usage information may also be reported through one or more "chains" of parties. In general, WAF enables parties that (a) have rights in electronic information, and/or (b) act as direct or indirect agents for parties who have rights in electronic information, to ensure that the moving, accessing, modifying, or otherwise using of information can be securely controlled by rules regarding how, when, where, and by whom such activities can be performed.

WAF Applications and Software

WAF is a secure system for regulating electronic conduct and commerce. Regulation is ensured by control information put in place by one or more parties. These parties may include content providers, electronic hardware manufacturers, financial service providers, or electronic "infrastructure" companies such as cable or telecommunications companies. The control information implements "Rights Applications." Rights applications "run on" the "base software" of the preferred embodiment. This base software serves as a secure, flexible, general purpose foundation that can accommodate many different rights applications, that is, many different business models and their respective participant requirements.

A rights application under WAF is made up of special purpose pieces, each of which can correspond to one or more basic electronic processes needed for a rights protection environment. These processes can be combined together like building blocks to create electronic agreements that can protect the rights, and may enforce fulfillment of the obligations, of electronic information users and providers. One or more providers of electronic information can easily combine selected building blocks to create a rights application that is unique to a specific content distribution model. A group of these pieces can represent the capabilities needed to fulfill the agreement(s) between users and providers. These pieces accommodate many requirements of electronic commerce including:

the distribution of permissions to use electronic information;

the persistence of the control information and sets of control information managing these permissions;

configurable control set information that can be selected by users for use with such information;

data security and usage auditing of electronic information; and a secure system for currency, compensation and debit management.

For electronic commerce, a rights application, under the preferred embodiment of the present invention, can provide electronic enforcement of the business agreements between all participants. Since different groups of components can be put together for different applications, the present invention can provide electronic control information for a wide variety of different products and markets. This means the present invention can provide a "unified," efficient, secure, and cost-effective system for electronic commerce and data security. This allows WAF to serve as a single standard for electronic rights protection, data security, and electronic currency and banking.

In a WAF, the separation between a rights application and its foundation permits the efficient selection of sets of control information that are appropriate for each of many different types of applications and uses. These control sets can reflect both rights of electronic community members, as well as obligations (such as providing a history of one's use of a product or paying taxes on one's electronic purchases) WAF flexibility allows its users to electronically implement and enforce common social and commercial ethics and practices. By providing a unified control system, the present invention supports a vast range of possible transaction related interests and concerns of individuals, communities, businesses, and governments. Due to its open design, WAF allows (normally under securely controlled circumstances) applications using technology independently created by users to be "added" to the system and used in conjunction with the foundation of the invention. In sum, WAF provides a system that can fairly reflect and enforce agreements among parties. It is a broad ranging and systematic solution that answers the pressing need for a secure, cost-effective, and fair electronic environment.

WAF prevents many forms of unauthorized use of electronic information, by controlling and auditing (and other administration of use) electronically stored and/or disseminated information. This includes, for example, commercially distributed content, electronic currency, electronic credit, business transactions (such as EDI), confidential communications, and the like. WAF can further be used to enable commercially provided electronic content to be made available to users in user defined portions, rather than constraining the user to use portions of content that were "predetermined" by a content creator and/or other provider for billing purposes.

WAF, for example, can employ:

(1) Secure metering means for budgeting and/or auditing electronic content and/or appliance usage;

(2) Secure flexible means for enabling compensation and/or billing rates for content and/or appliance usage, including electronic credit and/or currency mechanisms for payment means;

(3) Secure distributed database means for storing control and usage related information (and employing validated compartmentalization and tagging schemes);

(4) Secure electronic appliance control means;

(5) A distributed, secure, "virtual black box" comprised of nodes located at every user (including WAF content container creators, other content providers, client users, and recipients of secure WAF content usage information) site. The nodes of said virtual black box normally include a secure subsystem having at least one secure hardware element (a semiconductor element or other hardware module for securely executing WAF control processes), said secure subsystems being distributed at nodes along a pathway of information storage, distribution, payment, usage, and/or auditing. In some embodiments, the functions of said hardware element, for certain or all nodes, may be performed by software, for example, in host processing environments of electronic appliances;

(6) Encryption and decryption means;

(7) Secure communications means employing authentication, digital signaturing, and encrypted transmissions. The secure subsystems at said user nodes utilize a protocol that establishes and authenticates each node's and/or participant's identity, and establishes one or more secure host-to-host encryption keys for communications between the secure subsystems; and (8) Secure control means that can allow each WAF installation to perform WAF content authoring (placing content into WAF containers with associated control information), content distribution, and content usage; as well as clearinghouse and other administrative and analysis activities employing content usage information.

WAF extensively employs methods in the form of software objects to augment configurability, portability, and security of the WAF environment. It also employs a software object architecture for WAF content containers that carries protected content and may also carry both freely available information (e.g, summary, table of contents) and secured content control information which ensures the performance of control information. Content control information governs content usage according to criteria set by holders of rights to an object's contents and/or according to parties who otherwise have rights associated with distributing such content (such as governments, financial credit providers, and users).

In part, security is enhanced by object methods employed by the present invention because the encryption schemes used to protect an object can efficiently be further used to protect the associated content control information (software control information and relevant data) from modification. Said object techniques also enhance portability between various computer and/or other appliance environments because electronic information in the form of content can be inserted along with (for example, in the same object container as) content control information (for said content) to produce a "published" object. As a result, various portions of said control information may be specifically adapted for different environments, such as for diverse computer platforms and operating systems, and said various portions may all be carried by a WAF container.

An objective of WAF is supporting a transaction/distribution control standard. Development of such a standard has many obstacles, given the security requirements and related hardware and communications issues, widely differing environments, information types, types of information usage, business and/or data security goals, varieties of participants, and properties of delivered information. A significant feature of WAF accommodates the many, varying distribution and other transaction variables by, in part, decomposing electronic commerce and data security functions into generalized capability modules executable within a secure hardware SPU and/or corresponding software subsystem and further allowing extensive flexibility in assembling, modifying, and/or replacing, such modules (e.g. load modules and/or methods) in applications run on a WAF installation foundation. This configurability and reconfigurability allows electronic commerce and data security participants to reflect their priorities and requirements through a process of iteratively shaping an evolving extended electronic agreement (electronic control model). This shaping can occur as content control information passes from one WAF participant to another and to the extent allowed by "in place" content control information. This process allows users of WAF to recast existing control information and/or add new control information as necessary (including the elimination of no longer required elements).

WAF supports trusted (sufficiently secure) electronic information distribution and usage control models for both commercial electronic content distribution and data security applications. It can be configured to meet the diverse requirements of a network of interrelated participants that may include content creators, content distributors, client administrators, end users, and/or clearinghouses and/or other content usage information users. These parties may constitute a network of participants involved in simple to complex electronic content dissemination, usage control, usage reporting, and/or usage payment. Disseminated content may include both originally provided and WAF generated information (such as content usage information) and content control information may persist through both chains (one or more pathways) of content and content control information handling, as well as the direct usage of content. The configurability provided by the present invention is particularly critical for supporting electronic commerce, that is enabling businesses to create relationships and evolve strategies that offer competitive value. Electronic commerce tools that are not inherently configurable and interoperable will ultimately fail to produce products (and services) that meet both basic requirements and evolving needs of most commerce applications.

Browser Based Authentication

Verifies user identity using built-in browser functionality

Maintains authentication information throughout sessions

Utilizes centralized directory of profiles

Provides LDAP compatibility

Provides NDS compatibility

The security component of the present invention verifies user identity using built-in browser functionality, allowing for immediate access to a user without requiring installation of additional software. Authentication information may be maintained throughout selected or all sessions to prevent unauthorized users from accessing resources through a registered user's connection.

Optionally, a centralized directory of profiles may be used, which can be updated regularly as new user information is gathered. The centralized directory could also track user movement from page to page or site to site. Also provided are LDAP and NDS compatibility.

Web Application Entitlement

Restricts access to specific web applications based upon user privileges

Determines if a user or group of users have permission to perform an operation in a specific application Utilizes centralized directory of profiles for entitlement data Provides LDAP compatibility Provides NDS compatibility The security component of the present invention also determines who has access to which resources. One function may be to restrict access to specific web applications based upon user privileges, which may be earned or purchased, or which may be granted because of administrative or other duties. Further, the security component may determine if a user or group of users have permission to perform an operation in a specific application. Again, a centralized directory of profiles may be used for entitlement data. Also included could be LDAP and NDS compatibility.

Web Data Entitlement

Restricts access to web content and data based upon user privileges

Determines if a user or group of users have permission to manipulate web data (create, read, update, delete)

Utilizes centralized directory of profiles for entitlement data

Provides LDAP compatibility

Provides NDS compatibility

The security component of the present invention may also restrict access to web content and data based upon user privileges, which may be earned or purchased, or which may be granted because of administrative or other duties. The security component also determines if a user or group of users have permission to manipulate web data such as to create, read, update, or delete such data. Again, a centralized directory of profiles may be used for entitlement data. Also included could be LDAP and NDS compatibility.

Virtual Private Networks

Offers guaranteed secure data transfer

Allows remote login

Provides ability to grant varying levels of access based on user identity

The security component of the present invention may also permit users to create secure virtual networks between their systems. One example would be two branches of a business in two different cities being connected by a virtual network. Guaranteed secure data transfer may be offered. Further, remote login is allowed. As an option, the ability to grant varying levels of access based on user identity may be granted. This could include both access to the virtual network, and to any individual resources shared through the network.

Network Services

Figure 28:
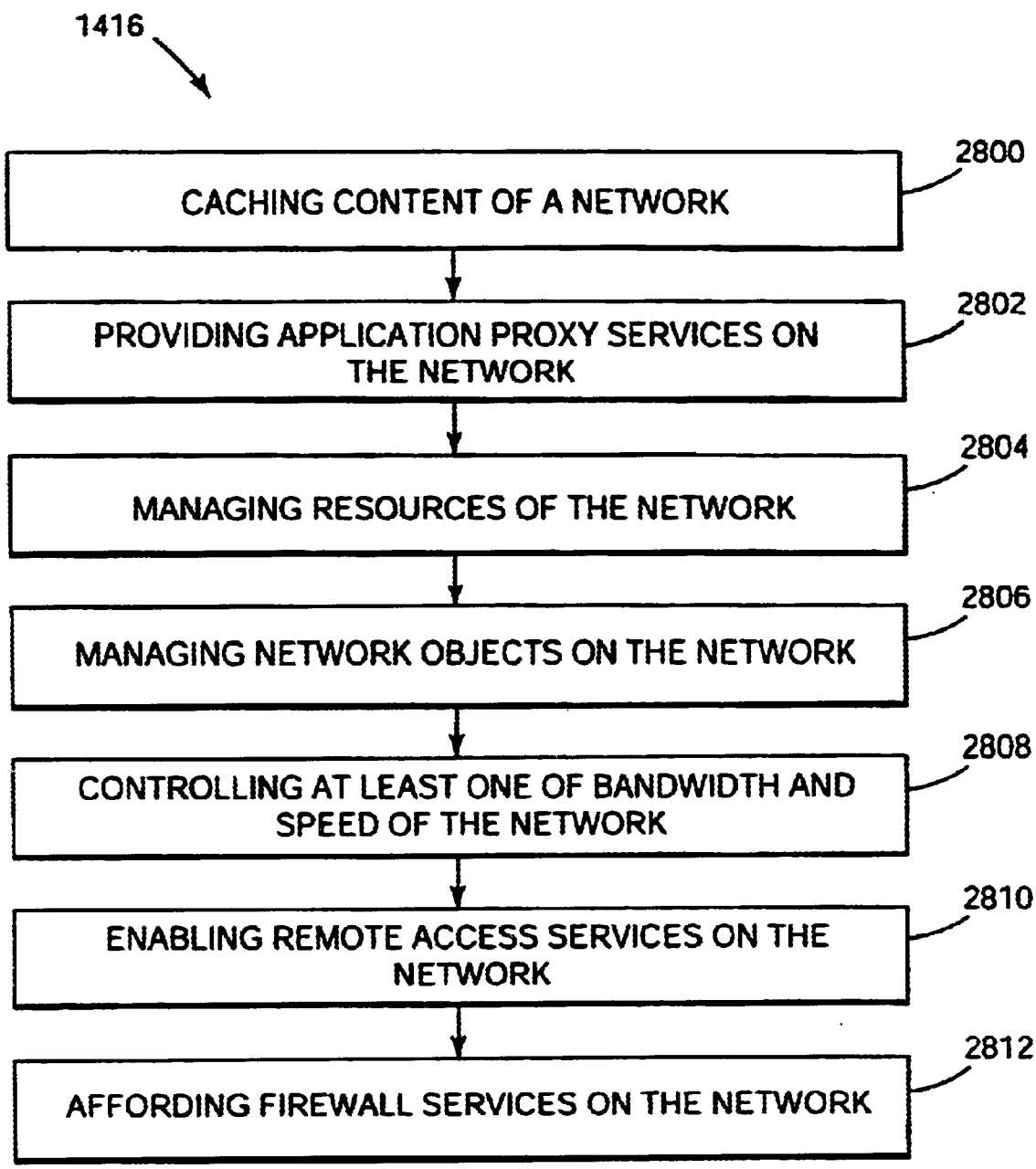
FIG. 28 is a flowchart illustrating the network services in accordance with one embodiment of the present invention.

As shown in component 1416 of FIG. 14, one embodiment of the present invention is provided for controlling the network and managing resources. More detail is provided in FIG. 28. Features include caching of network content in operation 2800, providing application proxy services the network in operation 2802, managing resources and load balancing such as spreading tasks among servers and rerouting around problems in operation 2804, and managing network objects in operation 2806. Operation 2808 controls at least one of bandwidth and speed of the network. Remote log in and access is provided in operation 2810, and affording firewall services on the network in operation 2812.

Web Content Caching

Stores frequently requested web pages and graphics in a temporary location

Serves up previously cached content without accessing original source

Updates cache automatically to ensure integrity of content

The network services component of the present invention may store frequently requested web pages and graphics in a temporary location. In use, previously cached content can be accessed without accessing original source. This dramatically reduces the time required to output the requests web pages and graphics. Preferably, the cache is automatically updated to ensure the integrity of the content stored in the cache.

Application Proxy Services

Passes requests from external clients to internal web servers and returns results Serves as trusted agent to access machines on the behalf of clients Hides IP Addresses of machines from external clients Provides configuration control over access permissions Provides reverse proxy services The network services component of the present invention passes requests from external clients to internal web servers and returns results. This component may also serve as trusted agent to access machines on the behalf of clients, particularly useful for automatic upgrades or information downloading for offline use. Optionally, IP Addresses of machines may be hidden from external clients. Further, configuration control may be provided over access permissions. As another option, reverse proxy services could be provided.

Load Balancing

Spreads tasks among application servers using an intelligent load-balance scheme (e.g., CPU utilization)

Provides a centralized task distribution mechanism for routing services

Identifies servers that are off-line and re-routes traffic

Tasks may be spread among application servers using an intelligent load-balance scheme (e.g., CPU utilization) by the network services component of the present invention. A centralized task distribution mechanism would route services. Further, servers that are off-line are identified and traffic is re-routed around them, such as to a parallel or secondary server.

Network Object Management

Provides centralized directory to facilitate network object interactions

Provides ability to administer network objects (e.g. printers, routers)

The network services component of the present invention provides a centralized directory to facilitate network object interactions as well as provides the ability to administer network objects (e.g. printers, routers, and other peripherals).

Quality of Service (Bandwidth)

Offers range of speed and bandwidth based on customer profile (e.g., larger, higher profile customers get faster service upon request)

The network services component of the present invention also offers selected range of speed and bandwidth based on a user profile. For example, larger, higher profile users get faster service upon request.

Remote Access Services (Radius)

Enables high density modem pooling

Provides a single dial-in number for ISDN or Analog calls and an automatic back-up number if first one does not work Creates an Integrated Firewall/authentication Allows remote authenticated access to intranet High density modem pooling is performed by the network services component of the present invention. Also provided are a single dial-in number for ISDN or Analog calls and an automatic back-up number if the first number does not work or returns a busy signal. Optionally, an integrated firewall may be created or authorization may be verified through authentication. Also optionally, remote authenticated access to intranet may be allowed.

Firewall Service

Protects resources on a private network from users of other networks

Filters network traffic based on security rules

Provides alarm notification of attacks

Provides logging and reporting functions

Provides port and traffic control

Firewall services are also provided by the network services component of the present invention. These services protect resources on a private network from users of other networks. Further, network traffic may be filtered based on security rules. An alarm notification may be provided in case of an attack on the system. Also, logging and reporting functions may be provided, allowing administrators to track movement and operations throughout the network as well as being useful for gathering statistics. Port and traffic control would also be provided.

Web and Internet Services

As illustrated in component 1418 of FIG. 14, one embodiment of the present invention is provided for affording a plurality of internet-related services. Among the features included are the actual uploading of web pages to users' computers, encrypting data for secure transmission, storing and transmitting files, processing requests and executing programs, and routing email.

Figure 29:
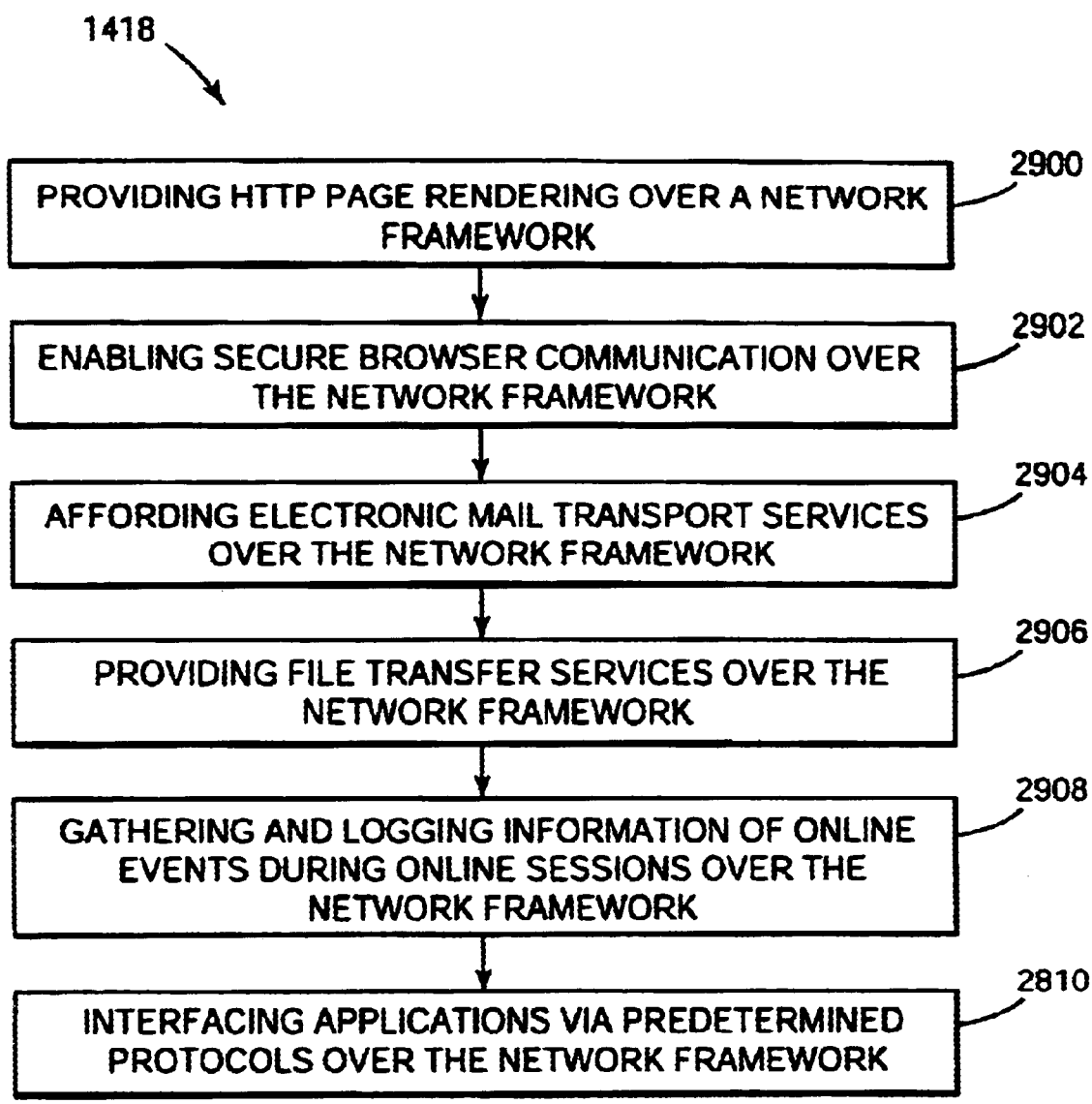
FIG. 29 is a flowchart illustrating the internet services in accordance with one embodiment of the present invention.

In more detail, it is seen in FIG. 29 that operation 2900 provides HTTP page rendering over a network framework. In operation 2902, secure browser communication over the network framework is enabled. Electronic mail transport services over the network framework are afforded in operation 2904. In operation 2906, file transfer services over the network framework are provided. Information of online events is gathered and logged during online sessions over the network framework in operation 2908. Applications may also be interfaced via predetermined protocols over the network framework. See operation 2910.

Secure WAF hardware (also known as SPUs for Secure Processing Units), or WAF installations that use software to substitute for, or complement, said hardware (provided by Host Processing Environments (HPEs)), operate in conjunction with secure communications, systems integration software, and distributed software control information and support structures, to achieve the electronic contract/rights protection environment of the present invention. Together, these WAF components comprise a secure, virtual, distributed content and/or appliance control, auditing (and other administration), reporting, and payment environment. In some embodiments and where commercially acceptable, certain WAF participants, such as clearinghouses that normally maintain sufficiently physically secure non-WAF processing environments, may be allowed to employ HPEs rather WAF hardware elements and interoperate, for example, with WAF end-users and content providers. WAF components together comprise a configurable, consistent, secure and "trusted" architecture for distributed, asynchronous control of electronic content and/or appliance usage. WAF supports a "universe wide" environment for electronic content delivery, broad dissemination, usage reporting, and usage related payment activities.

WAF provides generalized configurability. This results, in part, from decomposition of generalized requirements for supporting electronic commerce and data security into a broad range of constituent "atomic" and higher level components (such as load modules, data elements, and methods) that may be variously aggregated together to form control methods for electronic commerce applications, commercial electronic agreements, and data security arrangements. WAF provides a secure operating environment employing WAF foundation elements along with secure independently deliverable WAF components that enable electronic commerce models and relationships to develop. WAF specifically supports the unfolding of distribution models in which content providers, over time, can expressly agree to, or allow, subsequent content providers and/or users to participate in shaping the control information for, and consequences of, use of electronic content and/or appliances. A very broad range of the functional attributes important for supporting simple to very complex electronic commerce and data security activities are supported by capabilities of the present invention. As a result, WAF supports most types of electronic information and/or appliance: usage control (including distribution), security, usage auditing, reporting, other administration, and payment arrangements.

WAF, in its preferred embodiment, employs object software technology and uses object technology to form "containers" for delivery of information that is (at least in part) encrypted or otherwise secured. These containers may contain electronic content products or other electronic information and some or all of their associated permissions (control) information. These container objects may be distributed along pathways involving content providers and/or content users. They may be securely moved among nodes of a Virtual Distribution Environment (WAF) arrangement, which nodes operate WAF foundation software and execute control methods to enact electronic information usage control and/or administration models. The containers delivered through use of the preferred embodiment of the present invention may be employed both for distributing WAF control instructions (information) and/or to encapsulate and electronically distribute content that has been at least partially secured.

Content providers who employ the present invention may include, for example, software application and game publishers, database publishers, cable, television, and radio broadcasters, electronic shopping vendors, and distributors of information in electronic document, book, periodical, e-mail and/or other forms. Corporations, government agencies, and/or individual "end-users" who act as storers of, and/or distributors of, electronic information, may also be WAF content providers (in a restricted model, a user provides content only to himself and employs WAF to secure his own confidential information against unauthorized use by other parties). Electronic information may include proprietary and/or confidential information for personal or internal organization use, as well as information, such as software applications, documents, entertainment materials, and/or reference information, which may be provided to other parties. Distribution may be by, for example, physical media delivery, broadcast and/or telecommunication means, and in the form of "static" files and/or streams of data. WAF may also be used, for example, for multi-site "real-time" interaction such as teleconferencing, interactive games, or on-line bulletin boards, where restrictions on, and/or auditing of, the use of all or portions of communicated information is enforced.

WAF provides important mechanisms for both enforcing commercial agreements and enabling the protection of privacy rights. WAF can securely deliver information from one party to another concerning the use of commercially distributed electronic content. Even if parties are separated by several "steps" in a chain (pathway) of handling for such content usage information, such information is protected by WAF through encryption and/or other secure processing. Because of that protection, the accuracy of such information is guaranteed by WAF, and the information can be trusted by all parties to whom it is delivered. Furthermore, WAF guarantees that all parties can trust that such information cannot be received by anyone other than the intended, authorized, party(ies) because it is encrypted such that only an authorized party, or her agents, can decrypt it. Such information may also be derived through a secure WAF process at a previous pathway-of-handling location to produce secure WAF reporting information that is then communicated securely to its intended recipient's WAF secure subsystem. Because WAF can deliver such information securely, parties to an electronic agreement need not trust the accuracy of commercial usage and/or other information delivered through means other than those under control of WAF.

HTTP—Page Rendering

Serves requested web pages and graphics from web servers to client web browsers

Supports page rendering for multiple languages

Supports multiple content sources (file system, databases, scripts)

The internet services component of the present invention serves requested web pages and graphics from web servers to client web browsers. Page rendering for multiple languages may be supported, as may transmission of data to and from multiple content sources such as file systems, databases, and scripts.

Secure Browser Communications—SSL

Provides encrypted communication with common web browsers

Supports the Secure Sockets Layer protocol 2.0

Supports the Secure Sockets Layer protocol 3.0

The internet services component of the present invention provides encrypted communication with common web browsers, essential for commercial transactions and when transmitting confidential memoranda. The Secure Sockets Layer protocol 2.0 is supported, as is the Secure Sockets Layer protocol 3.0.

File Transfer Services (FTP)

Transfers files between computers on the Internet using the standard File Transfer Protocol (FTP)

Stores files on a file system or database

Provides mechanism to manage access control for files on a FTP server

The internet services component of the present invention may permit files to be transferred between computers on the Internet using the standard File Transfer Protocol (FTP). Such files would be stored on a file system or database. Security would also be provided by managing access control for files on a FTP server.

Web Application Interface Protocols CGI/NSAPI/ISAPI

Supports Common Gateway Interface (CGI) protocol

Supports Netscape' API (NSAPI) protocol

Supports Microsoft's API (ISAPI) protocol

Provides alternative to the interface mechanism that may be used

The internet services component of the present invention would support a multitude of interface protocols. Examples of protocols supported are Common Gateway Interface (CGI) protocol, Netscape' API (NSAPI) protocol, and Microsoft's API (ISAPI) protocol. Further, alternative interface mechanisms may be provided for use instead of the default mechanism.

Web Application Server

Executes web application logic

Utilizes user session information to support interactive applications

Provides scalability features

Provides fail-over features

Provides application programming logic

The internet services component of the present invention also executes web application logic. User session information is utilized to support interactive applications as well as for statistical purposes. Scalability features may be provided, as may fail-over features. Application programming logic may also be provided.

State and Session Management

Provides mechanism to note and remember one or more preceding events in a given sequence of interactions with the user or application program Tracks state and session information Manages multiple independent user sessions that are simultaneously active Supports Client Cookies Supports Client URL Encoding Supports Server Information with Client Cookies Supports Server Information with URL Session Identifiers The internet services component of the present invention may provide a mechanism to note and remember one or more preceding events in a given sequence of interactions with the user or application program. State and session information may be tracked. Multiple independent user sessions that are simultaneously active may be managed. Support is provided for user cookies, server information with user cookies, client URL encoding, and server information with URL session identifiers.

Email Transport Services

Routes inbound and outbound email messages to the appropriate email servers

Filters incoming messages and blocks junk mail

Queues messages for delivery

Provides backup and restore capabilities for stored email

The internet services component of the present invention routes inbound and outbound email messages to the appropriate email servers, where they are queued for delivery. Optional features could include filtering of incoming messages and blocking junk mail, as well as providing backup and restore capabilities for stored email.

Client Services

Figure 30:
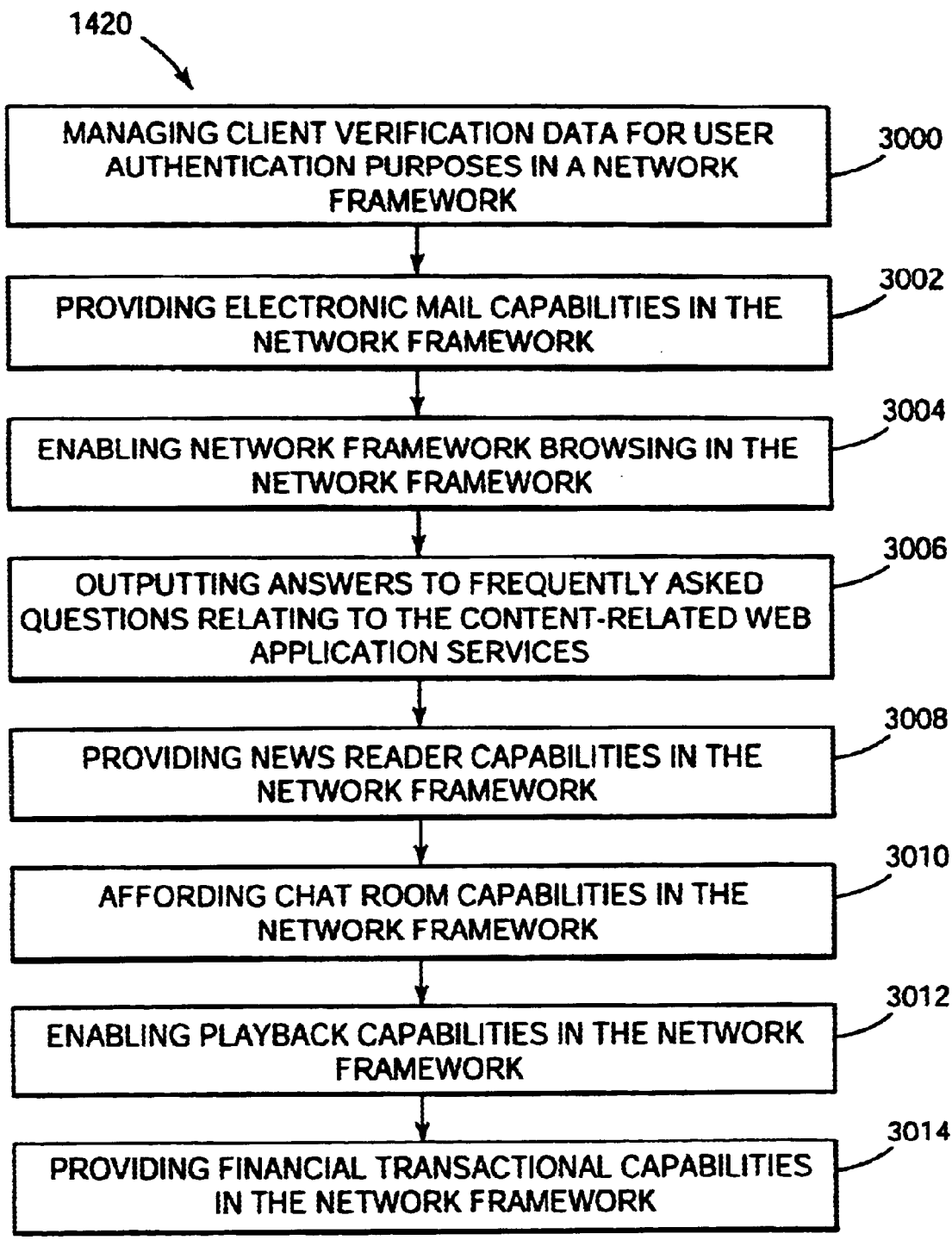
FIG. 30 is a flowchart illustrating the client services in accordance with one embodiment of the present invention.

As shown in component 1420 of FIG. 14, one embodiment of the present invention is provided for affording a plurality of client service-related services. Referring to FIG. 30, among the features included are managing client verification data for user authentication purposes in a network framework in operation 3000. In operation 3002, electronic mail capabilities in the network framework are provided. Network framework browsing in the network framework is provided in operation 3004. File transfer capabilities in the network framework, news reader capabilities in the network framework, and chat room capabilities in the network framework are provided in operations 3006, 3008, and 3010, respectively. Playback capabilities in the network framework are enabled in operation 3012. Financial transactional capabilities in the network framework are also provided. Note operation 3014.

Certificates

Manages client certificates for user authentication

The client services component of the present invention manages client certificates used for user authentication. These include certificates used to identify a user during automatic log on.

Plug-Ins and Network Utilities

Provides email capabilities

Provides Internet browser

Provides telnet capabilities

Provides FTP capabilities

Provides news reader

Provides chat capabilities

Provides specialized plug-ins for specific functions (e.g., video)

Provides audio playback capabilities

Supports Java

Provides electronic wallet capabilities

The client services component of the present invention provides several services. These services may include email capabilities, access to an Internet browser, telnet capabilities, and FTP capabilities. A news reader could be provided, as could chat capabilities. Specialized plug-ins could be offered for specific functions such as audio and video. Support for JAVA may be included. Optionally, electronic wallet capabilities could be provided as well.

Data Services

Figure 31:
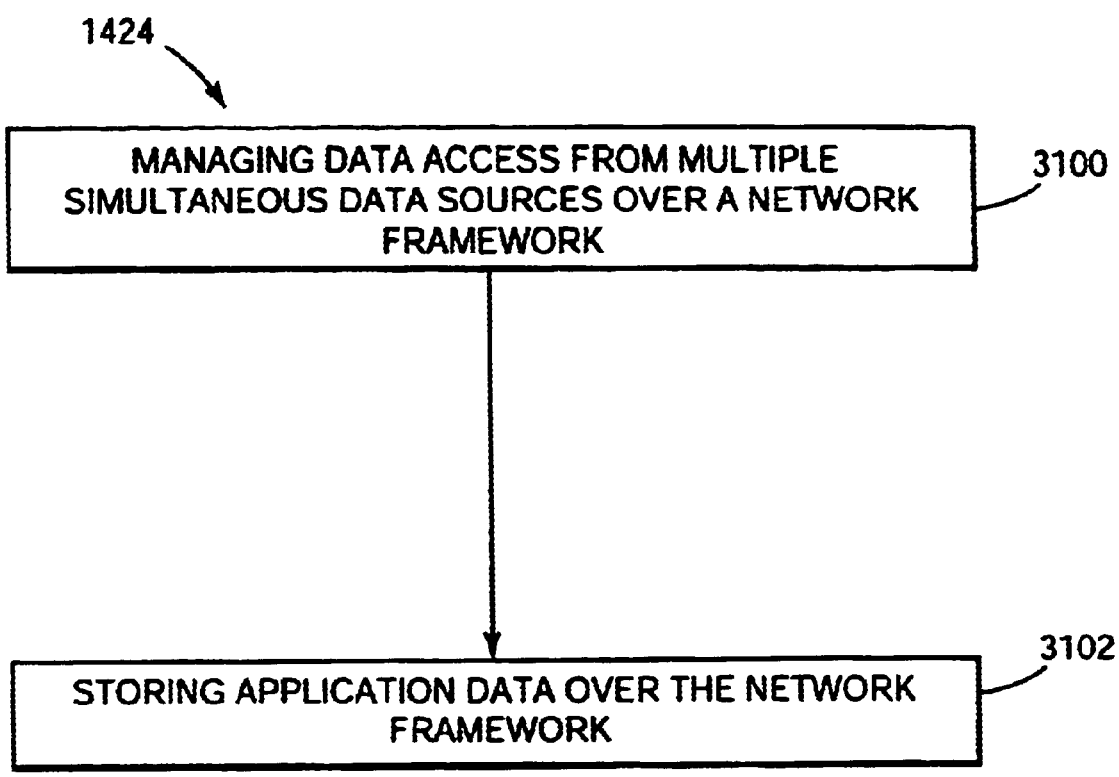
FIG. 31 is a flowchart illustrating the data services in accordance with one embodiment of the present invention.

As illustrated in component 1424 of FIG. 14, one embodiment of the present invention is provided for affording a combination of data-related services. Several features are included such as sorting, storing, and transferring data. As shown in FIG. 31, in operation 3100 data access from multiple simultaneous data sources over a network framework is provided. Application data is stored over the network framework in operation 3102.

Data Access Adapters

Supports native database access: Oracle, Informix, Sybase, MS SQL Server

Supports ODBC

Supports JDBC

Provides mechanism to import and export data from external systems

Supports data transfer in multiple languages

Supports multiple simultaneous data sources

Provides data connection pooling

Provides a common data access language across all data sources

Provides reporting and logging functions to detect communication errors

The data service component of the present invention supports native database access such as Oracle, Informix, Sybase, and MS SQL Server, as well as ODBC and JDBC. A mechanism is also provided to import and export data from external systems. Data transfer in multiple languages is supported. Multiple simultaneous data sources may be used. Data connection pooling may be provided. A common data access language may be used across all data sources. Reporting and logging functions may also be provided to detect communication errors.

Application Data Storage

Supports storage of application specific data

Maintains and verifies integrity of application data

Provides methods for administrators and user to manage data

Provides replication and synchronization capabilities

Supports ODBC

The data service component of the present invention supports storage of application specific data as well as maintains and verifies the integrity of application data. Several different methods to manage data may be provided, allowing administrators and users to choose their preferred method. Replication and synchronization capabilities may be included. Preferably, ODBC is supported.

Data delivery means may include electronic data storage means such as optical disks for delivering one portion of said information and broadcasting and/or telecommunicating means for other portions of said information. Electronic data storage means may include magnetic media, optical media, combined magneto-optical systems, flash RAM memory, bubble memory, and/or other memory storage means such as huge capacity optical storage systems employing holographic, frequency, and/or polarity data storage techniques. Data storage means may also employ layered disc techniques, such as the use of generally transparent and/or translucent materials that pass light through layers of data carrying discs which themselves are physically packaged together as one thicker disc. Data carrying locations on such discs may be, at least in part, opaque.

Integration Capabilities

Figure 32:
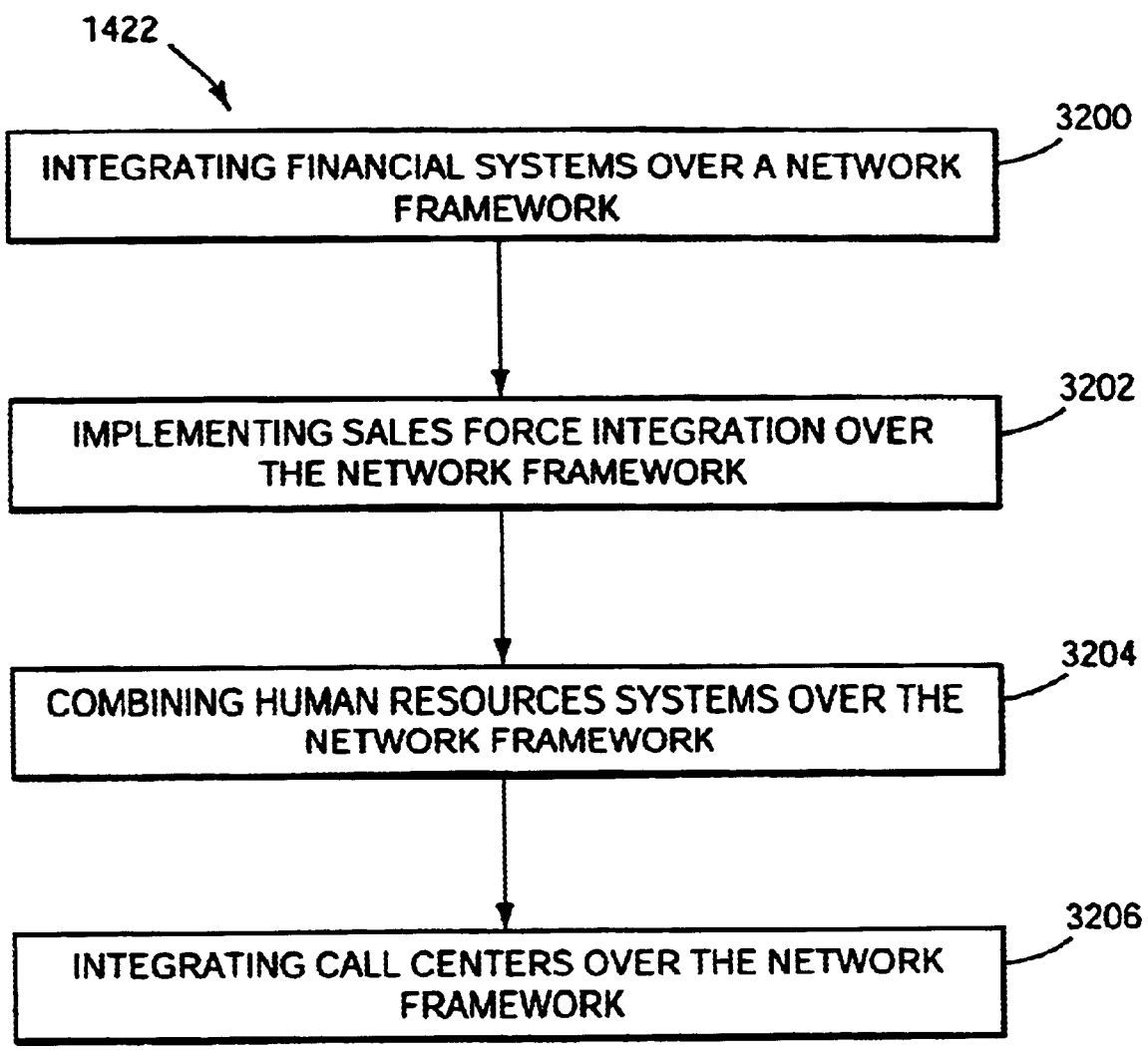
FIG. 32 is a flowchart illustrating the integration capabilities in accordance with one embodiment of the present invention.
Figure 33:
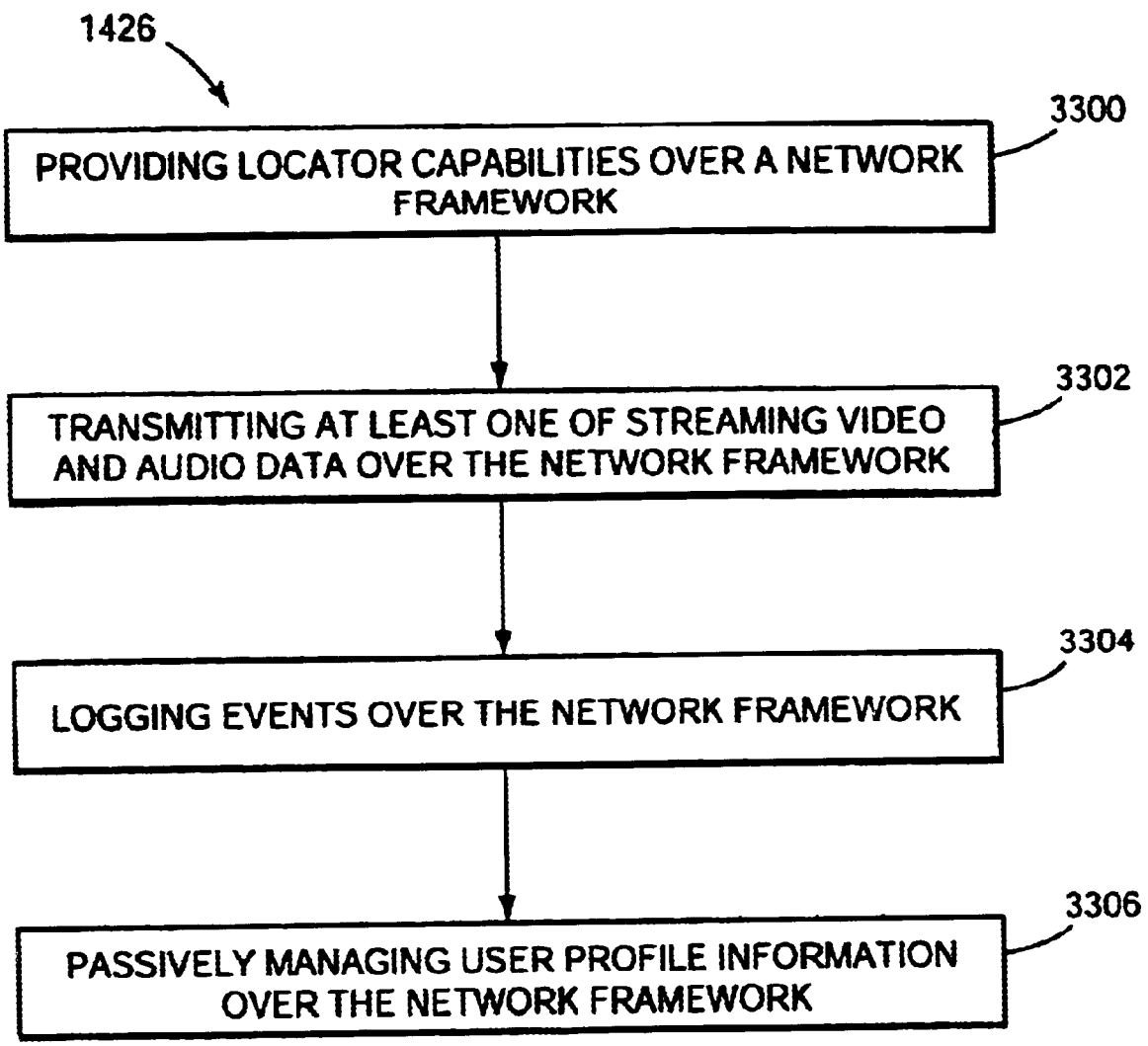
FIG. 33 is a flowchart illustrating the miscellaneous services in accordance with one embodiment of the present invention.

As shown in component 1422 of FIG. 14, one embodiment of the present invention is provided for affording a combination of integration capabilities-related services. Referring to FIG. 32, it is seen that many features are provided, including integration with financial and sales systems. See operations 3200 and 3202. Also, human resource systems may be combined over the network framework in operation 3204. Further, integration with call centers, as in operation 3206, and third party systems may also be included.

Financials Integration

- Provides adapter or mechanism to communicate and transfer data at the functional level with Financial systems via real-time API's
- Provides adapter or mechanism to communicate and transfer data at the functional level with Financial systems via batch API's
- Supports API's for external integration
- Supports Data Access Adapter capabilities The integration capabilities component of the present invention may provide an adapter or mechanism to communicate and transfer data at the functional level with financial systems via real-time API's. Further provided may be an adapter or mechanism to communicate and transfer data at the functional level with financial systems via batch API's. Preferably, API's for external integration are supported. Data Access Adapter capabilities may also be supported.

Sales Force Integration

- Provides adapter or mechanism to communicate and transfer data at the functional level with Sales Force systems via real-time API's
- Provides adapter or mechanism to communicate and transfer data at the functional level with Sales Force systems via batch API's
- Supports API's for external integration
- Supports Data Access Adapter capabilities The integration capabilities component of the present invention provides an adapter or mechanism to communicate and transfer data at the functional level with sales force systems via real-time API's as well as via batch API's. API's for external integration may be supported. Data Access Adapter capabilities may also be supported.

ERP Integration

- Provides adapter or mechanism to communicate and transfer data at the functional level with ERP systems via real-time API's
- Provides adapter or mechanism to communicate and transfer data at the functional level with ERP systems via batch API's
- Supports API's for external integration
- Supports Data Access Adapter capabilities The integration capabilities component of the present invention provides an adapter or mechanism to communicate and transfer data at the functional level with ERP systems via real-time API's as well as via batch API's. Preferably, API's for external integration are supported. Data Access Adapter capabilities may also be supported.

Human Resources Integration

- Provides adapter or mechanism to communicate and transfer data at the functional level with Human Resources systems via real-time API's
- Provides adapter or mechanism to communicate and transfer data at the functional level with Human Resources systems via batch API's
- Supports API's for external integration
- Supports Data Access Adapter capabilities The integration capabilities component of the present invention may provide an adapter or mechanism to communicate and transfer data at the functional level with human resources systems via real-time API's. Further provided may be an adapter or mechanism to communicate and transfer data at the functional level with human resources systems via batch API's. API's for external integration may be supported. Data Access Adapter capabilities may also be supported.

Call Center Integration

- Supports CTI integration from the web
- Provides adapter or mechanism to communicate and transfer data at the functional level with Call Center systems via real-time API's
- Provides adapter or mechanism to communicate and transfer data at the functional level with Call Center systems via batch API's
- Supports API's for external integration
- Supports Data Access Adapter capabilities CTI integration from the web is supported by the integration capabilities component of the present invention. An adapter or mechanism to communicate and transfer data at the functional level with call center systems via real-time API's may be provided. An adapter or mechanism to communicate and transfer data at the functional level with call center systems via batch API's may also be provided. Preferably, API's for external integration are supported. Data Access Adapter capabilities may also be supported.

Transaction Integration (Fulfillment/Payment/3rd Party)

- Provides adapter or mechanism to transfer transactional information to a fulfillment house, payment processing center or other third party
- Provides reporting and logging functions to detect communication errors The integration capabilities component of the present invention may provide an adapter or mechanism to transfer transactional information to a fulfillment house, payment processing center, or a third party. As an option, reporting and logging functions may be used to detect communication errors.

3rd Party Integration Capabilities (Content, Training)

- Provides adapter or mechanism to communicate with external systems that provide additional content such as catalog information
- Provides reporting and logging functions to detect communication errors The integration capabilities component of the present invention may also provide an adapter or mechanism to communicate with external systems that provide additional content such as catalog information. Again, reporting and logging functions may be used to detect communication errors.

Miscellaneous Services

As shown in component 1426 of FIG. 14, one embodiment of the present invention is provided for affording a combination of miscellaneous capabilities in a web architecture framework. Steps included are providing locator capabilities and streaming data over the network framework in operation 3300. Further, searching capabilities are provided over the network framework in addition to logging events and passive profiling. In operation 3302, streaming video and/or audio data is transmitted over the network framework. Various events may be logged over the network framework. Note operation 3304. User profile information is passively managed over the network framework in operation 3306.

Locator Capabilities—Channel Partners, Ed. Centers
  Provides proximity-based mapping
  Enables control of search parameters
  Creates interactive maps
  Provides multi-criteria proximity search
  Enables dynamic map navigation
  Permits customizable page design
  Displays table of query results
  Allows user to print maps by one click Mapping functions may be provided by the present invention, including proximity-based mapping and interactive mapping. Controls of search parameters would be provided, and could include multi-criteria proximity searching. Dynamic map navigation may be enabled. A table of query results would be displayed. The maps displayed would be printable. Optionally, customizable page design could be permitted, such as allowing a user to personalize mapping based on his or her favorite destinations.

Streaming Video & Audio Capabilities
  Provides streaming video download
  Provides content creation capabilities (e.g. recording, video transfer)
  Provides stereo audio
  Delivers end-user multimedia across all bandwidths
  Offers customizable web-based server administration and reporting to aid business management
  Provides enhanced security for sensitive or pay-per-view content
  Integrates with existing back office applications
  Develops customized applications and leverages content in existing formats
  Offers ability to scale with additional hardware
  Supports multiple concurrent users Streaming audio and video downloads may be available. Examples could include live radio and television programs, as well as previously generated or recorded video and audio clips. Ideally, audio would be produced in stereo. Optional features could include content creation capabilities, e.g., recording, video transfer, etc.

End-user multimedia may be delivered across all bandwidths. As an option, customizable web-based server administration and reporting could be offered to aid business management. Enhanced security would be used for sensitive or pay-per-view content. Ideally, multimedia capabilities would integrate with existing back office applications. Customized applications and leveraged content could be created in existing formats. Also offered could be the ability to scale with additional hardware. Ideally, the multimedia components support multiple concurrent users.

Search Capabilities
  Indexes file-based content
  Indexes database content
  Indexes 3rd party content
  Supports multiple indices and multiple content sources
  Provides basic search options (product number, name)
  Provides keyword searching
  Provides question-based searching
  Provides advanced flexible searching tools (parametric)
  Support searching using multiple languages
  Supports programmable filters
  Supports multiple languages The present invention may index various types of system content, including file-based content, database content, and 3rd party content. Preferably, multiple indices and multiple content sources are supported. Many modes of searching may be offered. Basic search options could include product number or name. Keyword searching may be allowed, as may question-based searching. Advanced flexible searching tools, such as parametric tools, may be used. Examples include searching using multiple languages. Ideally, programmable filters may be used to filter out unwanted content. Also ideally, the user interface supports multiple languages.

Web Event Logging
  Makes observation logs and event histories available for structured and ad-hoc reporting and analysis
  Provides log management and archiving functions The present invention may make observation logs and event histories available for structured and ad-hoc reporting and analysis. This information would also be useful for tracking unauthorized access to restricted content. Also provided may be log management and archiving functions.

Passive Profiling Capabilities
  Manages and leverages profile information
  Maintains identity and state for each user
  Adds preference and interest information for each customer's personal profile The present invention may manage and leverage profile information. The identity and state for each user would be maintained. Preference and interest information for each customer's personal profile may also be added.

Directory Services

Figure 34:
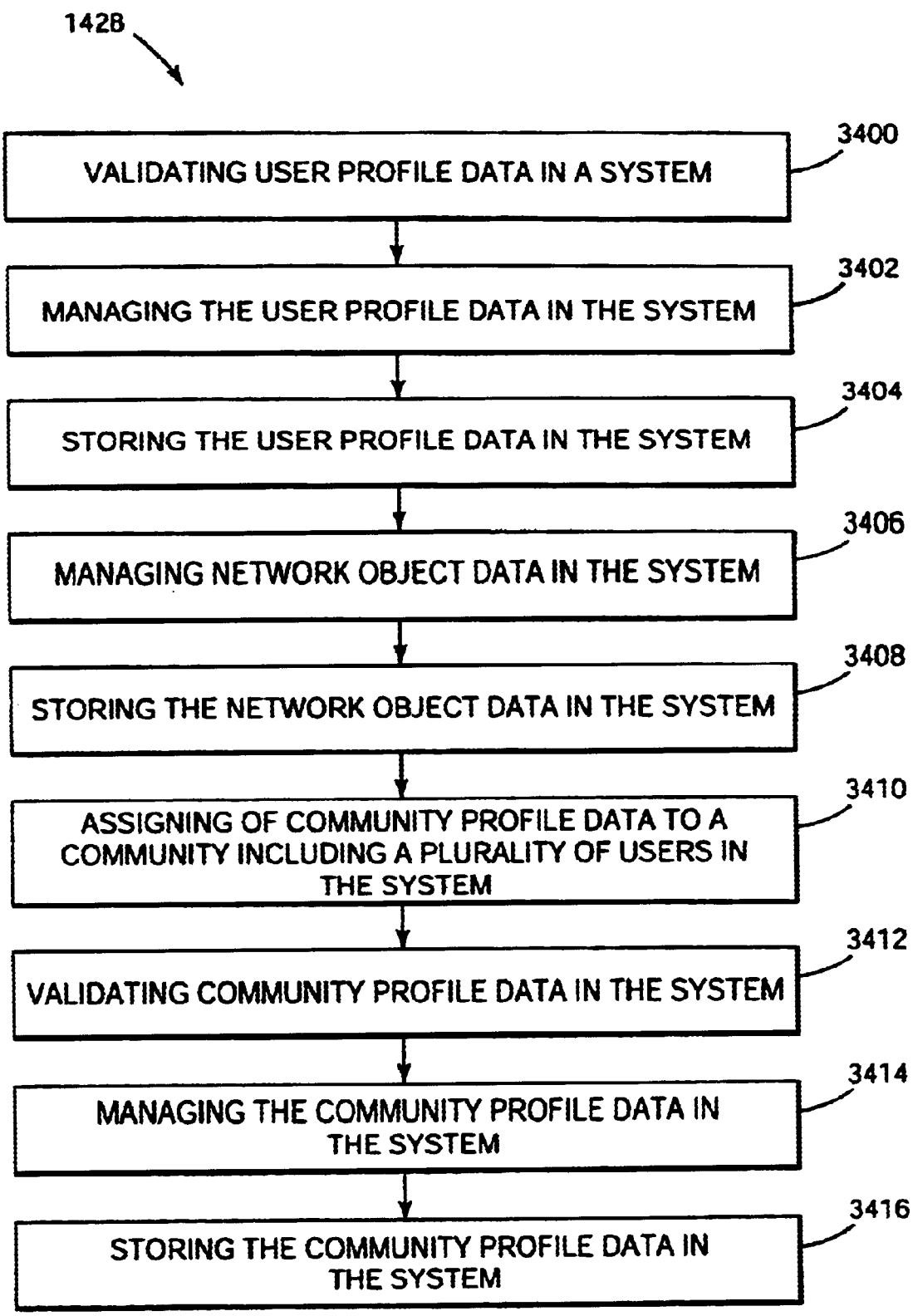
FIG. 34 is a flowchart illustrating the directory services in accordance with one embodiment of the present invention.

As shown in component 1428 of FIG. 14, one embodiment of the present invention is provided for affording a combination of directory-related services. In operation 3400 of FIG. 34 user profile data is validated in a system. The user profile data in the system is managed in operation 3402 and stored in operation 3404, while network object data in the system is managed in operation 3406 and stored in operation 3408. Community profile data may be assigned to a community including a plurality of users in the system. See operation 3410. Community profile data is validated in the system in operation 3412, managed in the system in operation 3414, and stored in the system in operation 3416.

Validation Management & Storage of Base Profile Data
  Maintains and verifies integrity of user profile information such as username, password, user groups
  Provides methods for administrators and users to manage user profile information
  Organizes and stores user profile data in permanent storage space
  Provides replication and synchronization capabilities
  Supports LDAP
  Supports NDS
  Supports ODBC The directory services component of the present invention maintains and verifies integrity of user profile information such as username, password, user groups, and the like. Several methods may be provided for administrators and users to manage user profile information, which is organized and stored in permanent storage space. Optionally, replication and synchronization capabilities may be provided. Ideally, support is provided for LDAP, NDS, ODBC, and others.

Assignment of User Profiles to Communities

Adds site-specific information to each person's profile provided the individual gives consent Allows user to choose to belong to a particular community Allows user to be remove himself from a particular community or change community The directory services component of the present invention may add site-specific information to each user's profile provided the user gives consent. Further, each user may be allowed to choose to belong to a particular community made up of other users. A user would also be able remove himself or herself from a particular community as well as change to a different community.

Validation, Management, & Storage of Base Community Data

Maintains and verifies integrity of community data information such as users assigned to a specific community Provides methods for administrators to manage community information Organizes and stores community data in permanent storage space The integrity of community data information such as users assigned to a specific community would be maintained and verified by the directory services component of the present invention. Administrators would also be provided with methods to manage community information. Ideally, community data is organized and stored in permanent storage space.

Management & Storage of Network Object Data

Organizes and stores network object data in permanent storage space

Provides replication and synchronization capabilities

Supports LDAP

Supports NDS

The directory services component of the present invention organizes and stores network object data in permanent storage space as well as provides replication and synchronization capabilities. Ideally, support is offered for LDAP and NDS, among others.

Management and Operations

As illustrated in component 1430 of FIG. 14, one embodiment of the present invention is provided for affording a combination of management and operation-related services. Features include billing for usage of particular sites, monitoring site performance, creating and managing user profiles, and scheduling of operations and functions such as software updates.

Figure 35:
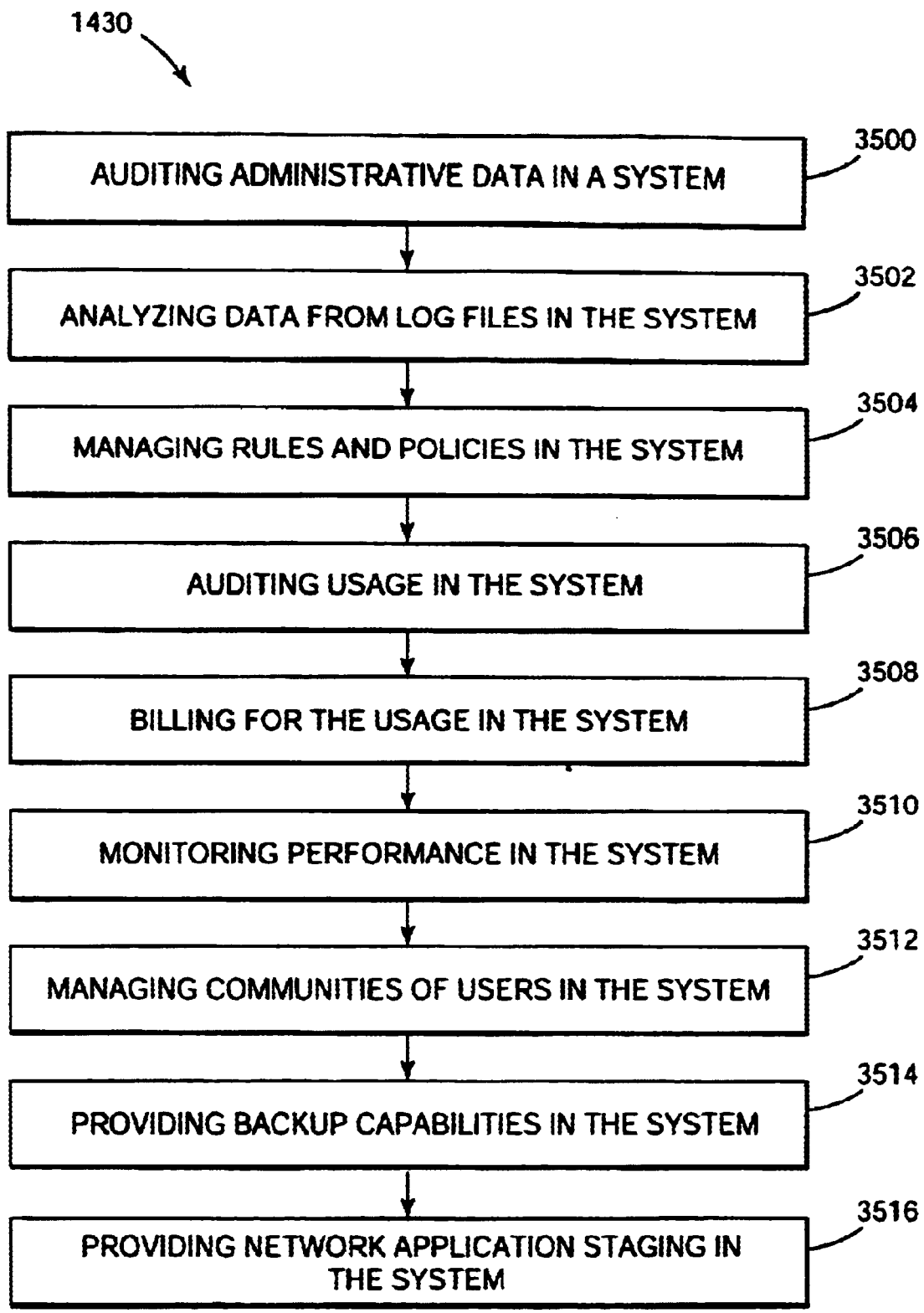
FIG. 35 is a flowchart illustrating the management and operations services in accordance with one embodiment of the present invention.

Referring to FIG. 35, auditing of administrative data in a system is performed in operation 3500. Data from log files in the system is analyzed in operation 3502. In operation 3504, rules and policies are managed in the system. Usage in the system is audited in operation 3506 while billing for the usage in the system is performed in operation 3508. Performance in the system is monitored in operation 3510. Communities of users may be managed in the system. See operation 3512. In operation 3514, backup capabilities are provided in the system, as is network application staging in operation 3516.

Administrative Auditing

Provides ability to track frequency of usage for specific functions on site (e.g. shopping cart, etc.)

Provides ability to track frequency of usage by specific users

Provides ability to track custom metrics

The management and operations component of the present invention provides the ability to track frequency of usage for specific functions on a site. One example includes the frequency of usage of the shopping cart, etc. Ideally, the frequency of usage by specific users can be tracked. Also ideally, custom metrics can also be tracked.

Log Analysis Capabilities

Extracts and analyzes data from log files and other sources

Generates predefined and ad-hoc reports based upon log and data analysis

Identifies trends and forecast performance based upon analysis

Provides advanced data analysis and report programming tools

The management and operations component of the present invention may be used to extract and analyzes data from log files and other sources. Predefined and ad-hoc reports may be generated based upon log and data analysis. Trends may be identified and performance forecast based upon analysis of preselected factors. Ideally, advanced data analysis and report programming tools are available.

Rules & Policy Management

Manages rules for common capabilities such as advertisements and promotions

Manages policies for operations such as authorization and access control for user groups and content Logs policy changes The management and operations component of the present invention manages rules for common capabilities such as advertisements and promotions. Also managed are policies for operations such as authorization and access control for user groups and content. Policy changes are logged.

Auditing and Billing for Usage (Charge-Back)

Provides ability to track usage of site to specific users and bill for that usage The ability to track usage of a site to specific users and bill for that users is provided by the management and operations component of the present invention. For example, a user would be billed for belonging to a site requiring a monthly fee for viewing.

Web Performance Monitoring Capabilities

Monitors production web site performance and traffic

Provides automatic alarm for performance thresholds

Generates reports based upon past performance

The management and operations component of the present invention may monitor production web site performance and traffic. An automatic alarm may be set to go off when performance thresholds are being approached or exceeded. As an option, reports may be generated based upon past performance.

Network Management

Centrally creates and manages policies and user profiles

Centrally creates hardware inventories for workstations automatically

Centrally configures printers

Offers centralized application installation

Assigns application rights to groups or individuals

Creates standard desktop environment for some or all users

Offers load balancing

Offers automatic transparent transfer across multiple servers

Provides remote help desk utilities for software-related problems

The management and operations component of the present invention centrally creates and manages policies and user profiles. Hardware inventories for workstations may also be automatically centrally created. Printers are centrally configured and loads are balanced. Centralized application installation may be offered. As an option, particular application rights may be assigned to groups or individuals and a standard desktop environment may be offered to some or all users. Ideally, automatic transparent transfer across multiple servers is permitted. Optionally, remote help desk utilities for software-related problems are provided.

Community & Role Management

Defines communities of visitors based on common characteristics and preferences

Dynamically assigns user to community based on profile

Updates community attributes

The management and operations component of the present invention may define communities of visitors based on common characteristics and preferences. Users may be dynamically assigned to particular communities based on their profiles. Ideally, community attributes are periodically updated.

Redundancy/Backup Capabilities

Restores deleted application files an corrupted files/settings automatically

Provides component failover capabilities

The management and operations component of the present invention may restore deleted application files as well as corrupted files and setting automatically. Also provided may be component failure capabilities.

Web APP. Admin Capabilities (Storing, Training, Service)

Provides catalog administrative capabilities (add products, change prices)

Provides application administration tools (restart application)

The management and operations component of the present invention may provide catalog administrative capabilities. Such capabilities could add products, change prices, etc. Application administration tools could be provided as well. For example, such administration tools could restart an application when necessary, such as after an automatic software update or where the application has stopped responding.

Configuration Management Capabilities

Provides centralized application installation

Schedules software updates to occur at a specific time (e.g. certain days, off-peak hours)

Creates standard environment for applications

Assigns application rights to groups or individuals

Blocks unauthorized deletion of network-installed applications

Integrates with web applications revision control system

Provides logging mechanism to track configuration change requests

Centralized application installation may be provided by the management and operations component of the present invention. Software updates may be scheduled to occur at a specific time, such as on certain days or during off-peak hours. Application rights may be assigned to groups or individuals, and unauthorized deletion of network-installed applications would be blocked. Ideally, the management and operations component of the present invention integrates with the revision control systems of web applications. Optionally, a logging mechanism may be provided for tracking configuration change requests. As another option, standard environments for applications may be created.

Web Application Staging

Provides ability to preview, test and change applications before production stage Provides ability to schedule releases (e.g. time-based batch release, individual immediate release, etc.)

The ability to preview, test and change applications before production stage may be provided by the management and operations component of the present invention, as may the ability to schedule releases, such as time-based batch releases, individual immediate releases, and the like.

Web Developer Services

As shown in component 1432 of FIG. 14, one embodiment of the present invention is provided for affording a combination of web development-related services.

Figure 36:
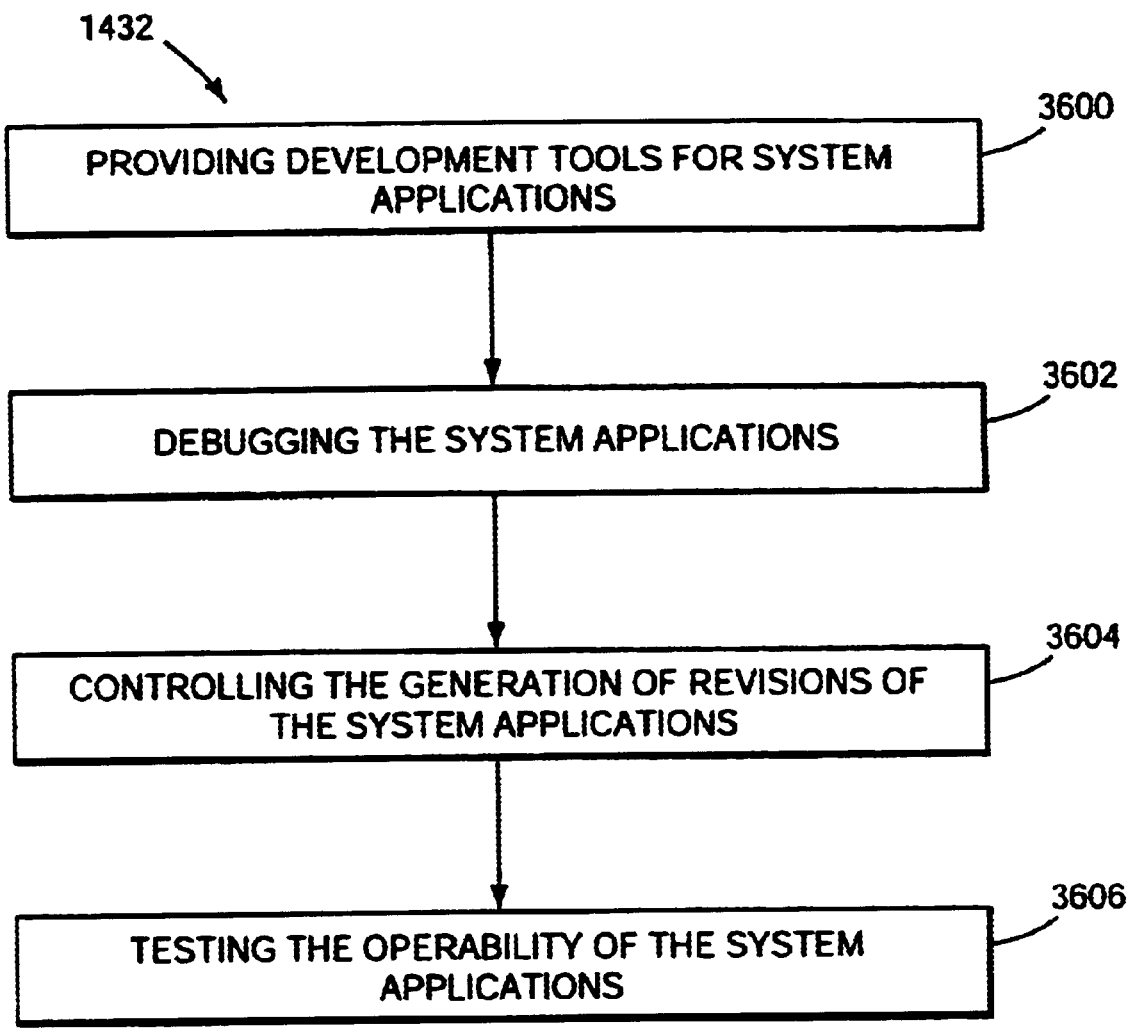
FIG. 36 is a flowchart illustrating the web developer services in accordance with one embodiment of the present invention.

Various features may be included, such as development tools, utilities, and testing tools, as are provided in operation 3600 of FIG. 36. System applications are debugged in operation 3602. In operation 3604, the generation of revisions of the system applications is controlled, and in operation 3606, the operability of the system applications are tested.

Web Application Development Tools

Provides application languages, tools, and utilities

Automatically generates site maps for user's collection of pages

Automatically tests local and remote hyperlinks

Coordinates file reuse among projects

Integrates with revision control system

The web development component of the present invention may provide application languages, tools, and utilities. A site maps of a collection of pages of a particular user may be automatically generated. Further, local and remote hyperlinks may be automatically tested. As an option, file reuse among projects may be coordinated. Ideally, the management and operations component of the present invention integrates with a revision control system.

Web Application Debugging Utilities

Offers step-through debugging tool

Automatically compiles finished code to test technical correctness

Offers auto-correction for common errors

Automatically checks all links off of site for validity

Provides ability to set variable watches

Provides ability to set program break points

Provides ability to log to a debugging file

The web development component of the present invention may offer a step-through debugging tool, which could guide a user through a series of diagnostic tests aimed at identifying and resolving problems causing errors. Preferably, finished code is automatically compiled to test its technical correctness. Optionally, auto-correction of common errors may be a feature. Also optionally, all links off of a site may be automatically checked for validity. The ability to set variable watches may be provided, as may the ability to set program break points and log to a debugging file.

Web Application Revision Control

Stores current files along with past changes to docs to allow easy recreation of previous versions Allows user to set various access levels to assign user and project-specific authorization Allows user to tailor custom file access rights Reconciles file changes from multiple users to prevent accidental code overwriting Speeds up performance by allowing direct access to most recent files, leaving delta storage for previous versions Ensures each user kept in sync with rest of the team by comparing the user's personal working directory with the corresponding shared project Allows specific versions of files to be grouped to identify application builds The web development component of the present invention may store current files along with past changes to docs to allow easy re-creation of previous versions. Users may be allowed to set various access levels to assign user- and project-specific authorization. Preferably, users are allowed to tailor custom file access rights.

Optionally, file changes from multiple users may be reconciled to prevent accidental code overwriting as well as for speeding up performance by allowing direct access to most recent files, leaving delta storage for previous versions. The web development component of the present invention ensures each user is kept in sync with the rest of the team by comparing the user's personal working directory with the corresponding shared project. Specific versions of files may be allowed to be grouped to identify application builds.

Web Site Testing Tools (Performance & Link Spiders)

Simulates multiple users on web site

Allows pages to be retrieved and programmatically navigated by simulated clients Logs error messages Records performance statistics Enables programmatic control of load generation Allows tests to be scheduled and load to be varied over time The web development component of the present invention may test a web site, such as by simulating multiple users on web site. Pages may be retrieved and programmatically navigated by simulated clients. Error messages are logged and performance statistics are recorded. Programmatic control of load generation may be enabled. Tests can be scheduled and loaded to be varied over time.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

WAF provides organization, community, and/or universe wide secure environments whose integrity is assured by processes securely controlled in WAF participant user installations (nodes). WAF installations, in the preferred embodiment, may include both software and tamper resistant hardware semiconductor elements. Such a semiconductor arrangement comprises, at least in part, special purpose circuitry that has been designed to protect against tampering with, or unauthorized observation of, the information and functions used in performing the WAF's control functions. The special purpose secure circuitry provided by the present invention includes at least one of: a dedicated semiconductor arrangement known as a Secure Processing Unit (SPU) and/or a standard microprocessor, microcontroller, and/or other processing logic that accommodates the requirements of the present invention and functions as an SPU. WAF's secure hardware may be found incorporated into, for example, a fax/modem chip or chip pack, I/O controller, video display controller, and/or other available digital processing arrangements. It is anticipated that portions of the present invention's WAF secure hardware capabilities may ultimately be standard design elements of central processing units (CPUs) for computers and various other electronic devices.

Designing WAF capabilities into one or more standard microprocessor, microcontroller and/or other digital processing components may materially reduce WAF related hardware costs by employing the same hardware resources for both the transaction management uses contemplated by the present invention and for other, host electronic appliance functions. This means that a WAF SPU can employ (share) circuitry elements of a "standard" CPU. For example, if a "standard" processor can operate in protected mode and can execute WAF related instructions as a protected activity, then such an embodiment may provide sufficient hardware security for a variety of applications and the expense of a special purpose processor might be avoided. Under one preferred embodiment of the present invention, certain memory (e.g., RAM, ROM, NVRAM) is maintained during WAF related instruction processing in a protected mode (for example, as supported by protected mode microprocessors). This memory is located in the same package as the processing logic (e.g. processor). Desirably, the packaging and memory of such a processor would be designed using security techniques that enhance its resistance to tampering.

The degree of overall security of the WAF system is primarily dependent on the degree of tamper resistance and concealment of WAF control process execution and related data storage activities. Employing special purpose semiconductor packaging techniques can significantly contribute to the degree of security. Concealment and tamper-resistance in semiconductor memory (e.g., RAM, ROM, NVRAM) can be achieved, in part, by employing such memory within an SPU package, by encrypting data before it is sent to external memory (such as an external RAM package) and decrypting encrypted data within the CPU/RAM package before it is executed. This process is used for important WAF related data when such data is stored on unprotected media, for example, standard host storage, such as random access memory, mass storage, etc. In that event, a WAF SPU would encrypt data that results from a secure WAF execution before such data was stored in external memory.

Summary of Some Important Features Provided by WAF in Accordance With the Present Invention WAF employs a variety of capabilities that serve as a foundation for a general purpose, sufficiently secure distributed electronic commerce solution. WAF enables an electronic commerce marketplace that supports divergent, competitive business partnerships, agreements, and evolving overall business models. For example, WAF includes features that:

"sufficiently" impede unauthorized and/or uncompensated use of electronic information and/or appliances through the use of secure communication, storage, and transaction management technologies. WAF supports a model wide, distributed security implementation which creates a single secure "virtual" transaction processing and information storage environment. WAF enables distributed WAF installations to securely store and communicate information and remotely control the execution processes and the character of use of electronic information at other WAF installations and in a wide variety of ways;

support low-cost, efficient, and effective security architectures for transaction control, auditing, reporting, and related communications and information storage. WAF may employ tagging related security techniques, the time-ageing of encryption keys, the compartmentalization of both stored control information (including differentially tagging such stored information to ensure against substitution and tampering) and distributed content (to, for many content applications, employ one or more content encryption keys that are unique to the specific WAF installation and/or user), private key techniques such as triple DES to encrypt content, public key techniques such as RSA to protect communications and to provide the benefits of digital signature and authentication to securely bind together the nodes of a WAF arrangement, secure processing of important transaction management executable code, and a combining of a small amount of highly secure, hardware protected storage space with a much larger "exposed" mass media storage space storing secured (normally encrypted and tagged) control and audit information. WAF employs special purpose hardware distributed throughout some or all locations of a WAF implementation: a) said hardware controlling important elements of: content preparation (such as causing such content to be placed in a WAF content container and associating content control information with said content), content and/or electronic appliance usage auditing, content usage analysis, as well as content usage control; and b) said hardware having been designed to securely handle processing load module control activities, wherein said control processing activities may involve a sequence of required control factors;

support dynamic user selection of information subsets of a WAF electronic information product (WAF controlled content). This contrasts with the constraints of having to use a few high level individual, pre-defined content provider information increments such as being required to select a whole information product or product section in order to acquire or otherwise use a portion of such product or section. WAF supports metering and usage control over a variety of increments (including "atomic" increments, and combinations of different increment types) that are selected ad hoc by a user and represent a collection of pre-identified one or more increments (such as one or more blocks of a preidentified nature, e.g., bytes, images, logically related blocks) that form a generally arbitrary, but logical to a user, content "deliverable." WAF control information (including budgeting, pricing and metering) can be configured so that it can specifically apply, as appropriate, to ad hoc selection of different, unanticipated variable user selected aggregations of information increments and pricing levels can be, at least in part, based on quantities and/or nature of mixed increment selections (for example, a certain quantity of certain text could mean associated images might be discounted by 15%; a greater quantity of text in the "mixed" increment selection might mean the images are discounted 20%). Such user selected aggregated information increments can reflect the actual requirements of a user for information and is more flexible than being limited to a single, or a few, high level, (e.g. product, document, database record) predetermined increments. Such high level increments may include quantities of information not desired by the user and as a result be more costly than the subset of information needed by the user if such a subset was available. In sum, the present invention allows information contained in electronic information products to be supplied according to user specification. Tailoring to user specification allows the present invention to provide the greatest value to users, which in turn will generate the greatest amount of electronic commerce activity. The user, for example, would be able to define an aggregation of content derived from various portions of an available content product, but which, as a deliverable for use by the user, is an entirely unique aggregated increment. The user may, for example, select certain numbers of bytes of information from various portions of an information product, such as a reference work, and copy them to disc in unencrypted form and be billed based on total number of bytes plus a surcharge on the number of "articles" that provided the bytes. A content provider might reasonably charge less for such a user defined information increment since the user does not require all of the content from all of the articles that contained desired information. This process of defining a user desired information increment may involve artificial intelligence database search tools that contribute to the location of the most relevant portions of information from an information product and cause the automatic display to the user of information describing search criteria hits for user selection or the automatic extraction and delivery of such portions to the user. WAF further supports a wide variety of predefined increment types including:

bytes, images, content over time for audio or video, or any other increment that can be identified by content provider data mapping efforts, such as:

sentences, paragraphs, articles, database records, and byte offsets representing increments of logically related information.

WAF supports as many simultaneous predefined increment types as may be practical for a given type of content and business model.

securely store at a user's site potentially highly detailed information reflective of a user's usage of a variety of different content segment types and employing both inexpensive "exposed" host mass storage for maintaining detailed information in the form of encrypted data and maintaining summary information for security testing in highly secure special purpose WAF installation nonvolatile memory (if available).

support trusted chain of handling capabilities for pathways of distributed electronic information and/or for content usage related information. Such chains may extend, for example, from a content creator, to a distributor, a redistributor, a client user, and then may provide a pathway for securely reporting the same and/or differing usage information to one or more auditors, such as to one or more independent clearinghouses and then back to the content providers, including content creators. The same and/or different pathways employed for certain content handling, and related content control information and reporting information handling, may also be employed as one or more pathways for electronic payment handling (payment is characterized in the present invention as administrative content) for electronic content and/or appliance usage. These pathways are used for conveyance of all or portions of content, and/or content related control information. Content creators and other providers can specify the pathways that, partially or fully, must be used to disseminate commercially distributed property content, content control information, payment administrative content, and/or associated usage reporting information. Control information specified by content providers may also specify which specific parties must or may (including, for example, a group of eligible parties from which a selection may be made) handle conveyed information. It may also specify what transmission means (for example telecommunication carriers or media types) and transmission hubs must or may be used.

support flexible auditing mechanisms, such as employing "bitmap meters," that achieve a high degree of efficiency of operation and throughput and allow, in a practical manner, the retention and ready recall of information related to previous usage activities and related patterns. This flexibility is adaptable to a wide variety of billing and security control strategies such as:

upgrade pricing (e.g. suite purchases), pricing discounts (including quantity discounts), billing related time duration variables such as discounting new purchases based on the timing of past purchases, and security budgets based on quantity of different, logically related units of electronic information used over an interval of time.

Use of bitmap meters (including "regular" and "wide" bitmap meters) to record usage and/or purchase of information, in conjunction with other elements of the preferred embodiment of the present invention, uniquely supports efficient maintenance of usage history for: (a) rental, (b) flat fee licensing or purchase, (c) licensing or purchase discounts based upon historical usage variables, and (d) reporting to users in a manner enabling users to determine whether a certain item was acquired, or acquired within a certain time period (without requiring the use of conventional database mechanisms, which are highly inefficient for these applications). Bitmap meter methods record activities associated with electronic appliances, properties, objects, or portions thereof, and/or administrative activities that are independent of specific properties, objects, etc., performed by a user and/or electronic appliance such that a content and/or appliance provider and/or controller of an administrative activity can determine whether a certain activity has occurred at some point, or during a certain period, in the past (for example, certain use of a commercial electronic content product and/or appliance). Such determinations can then be used as part of pricing and/or control strategies of a content and/or appliance provider, and/or controller of an administrative activity. For example, the content provider may choose to charge only once for access to a portion of a property, regardless of the number of times that portion of the property is accessed by a user.

support "launchable" content, that is content that can be provided by a content provider to an end-user, who can then copy or pass along the content to other end-user parties without requiring the direct participation of a content provider to register and/or otherwise initialize the content for use. This content goes "out of (the traditional distribution) channel" in the form of a "traveling object." Traveling objects are containers that securely carry at least some permissions information and/or methods that are required for their use (such methods need not be carried by traveling objects if the required methods will be available at, or directly available to a destination WAF installation). Certain travelling objects may be used at some or all WAF installations of a given WAF arrangement since they c an make available the content control information necessary for content use without requiring the involvement of a commercial WAF value chain participant or data security administrator (e.g. a control officer or network administrator). As long as traveling object control information requirements are available at the user WAF installation secure subsystem (such as the presence of a sufficient quantity of financial credit from an authorized credit provider), at least some travelling object content may be used by a receiving party without the need to establish a connection with a remote WAF authority (until, for example, budgets are exhausted or a time content usage reporting interval has occurred). Traveling objects can travel "out-of-channel," allowing, for example, a user to give a copy of a traveling object whose content is a software program, a movie or a game, to a neighbor, the neighbor being able to use the traveling object if appropriate credit (e.g. an electronic clearinghouse account from a clearinghouse such as VISA or AT&T) is available. Similarly, electronic information that is generally available on an Internet, or a similar network, repository might be provided in the form of a traveling object that can be downloaded and subsequently copied by the initial downloader and then passed along to other parties who may pass the object on to additional parties.

provide very flexible and extensible user identification according to individuals, installations, by groups such as classes, and by function and hierarchical identification employing a hierarchy of levels of client identification (for example, client organization ID, client department ID, client network ID, client project ID, and client employee ID, or any appropriate subset of the above).

provide a general purpose, secure, component based content control and distribution system that functions as a foundation transaction operating system environment that employs executable code pieces crafted for transaction control and auditing. These code pieces can be reused to optimize efficiency in creation and operation of trusted, distributed transaction management arrangements. WAF supports providing such executable code in the form of "atomic" load modules and associated data. Many such load modules are inherently configurable, aggregatable, portable, and extensible and singularly, or in combination (along with associated data), run as control methods under the WAF transaction operating environment. WAF can satisfy the requirements of widely differing electronic commerce and data security applications by, in part, employing this general purpose transaction management foundation to securely process WAF transaction related control methods. Control methods are created primarily through the use of one or more of said executable, reusable load module code pieces (normally in the form of executable object components) and associated data. The component nature of control methods allows the present invention to efficiently operate as a highly configurable content control system. Under the present invention, content control models can be iteratively and asynchronously shaped, and otherwise updated to accommodate the needs of WAF participants to the extent that such shaping and otherwise updating conforms to constraints applied by a WAF application, if any (e.g., whether new component assemblies are accepted and, if so, what certification requirements exist for such component assemblies or whether any or certain participants may shape any or certain control information by selection amongst optional control information (permissions record) control methods. This iterative (or concurrent) multiple participant process occurs as a result of the submission and use of secure, control information components (executable code such as load modules and/or methods, and/or associated data). These components may be contributed independently by secure communication between each control information influencing WAF participant's WAF installation and may require certification for use with a given application, where such certification was provided by a certification service manager for the WAF arrangement who ensures secure interoperability and/or reliability (e.g., bug control resulting from interaction) between appliances and submitted control methods. The transaction management control functions of a WAF electronic appliance transaction operating environment interact with non-secure transaction management operating system functions to properly direct transaction processes and data related to electronic information security, usage control, auditing, and usage reporting. WAF provides the capability to manages resources related to secure WAF content and/or appliance control information execution and data storage.

facilitate creation of application and/or system functionality under WAF and to facilitate integration into electronic appliance environments of load modules and methods created under the present invention. To achieve this, WAF employs an Application Programmer's Interface (API) and/or a transaction operating system (such as a ROS) programming language with incorporated functions, both of which support the use of capabilities and can be used to efficiently and tightly integrate WAF functionality into commercial and user applications.

support user interaction through: (a) "Pop-Up" applications which, for example, provide messages to users and enable users to take specific actions such as approving a transaction, (b) stand-alone WAF applications that provide administrative environments for user activities such as: end-user preference specifications for limiting the price per transaction, unit of time, and/or session, for accessing history information concerning previous transactions, for reviewing financial information such as budgets, expenditures (e.g. detailed and/or summary) and usage analysis information, and (c) WAF aware applications which, as a result of the use of a WAF API and/or a transaction management (for example, ROS based) programming language embeds WAF "awareness" into commercial or internal software (application programs, games, etc.) so that WAF user control information and services are seamlessly integrated into such software and can be directly accessed by a user since the underlying functionality has been integrated into the commercial software's native design. For example, in a WAF aware word processor application, a user may be able to "print" a document into a WAF content container object, applying specific control information by selecting from amongst a series of different menu templates for different purposes (for example, a confidential memo template for internal organization purposes may restrict the ability to "keep," that is to make an electronic copy of the memo).

employ "templates" to ease the process of configuring capabilities of the present invention as they relate to specific industries or businesses. Templates are applications or application add-ons under the present invention. Templates support the efficient specification and/or manipulation of criteria related to specific content types, distribution approaches, pricing mechanisms, user interactions with content and/or administrative activities, and/or the like. Given the very large range of capabilities and configurations supported by the present invention, reducing the range of configuration opportunities to a manageable subset particularly appropriate for a given business model allows the full configurable power of the present invention to be easily employed by "typical" users who would be otherwise burdened with complex programming and/or configuration design responsibilities template applications can also help ensure that WAF related processes are secure and optimally bug free by reducing the risks associated with the contribution of independently developed load modules, including unpredictable aspects of code interaction between independent modules and applications, as well as security risks associated with possible presence of viruses in such modules. WAF, through the use of templates, reduces typical user configuration responsibilities to an appropriately focused set of activities including selection of method types (e.g. functionality) through menu choices such as multiple choice, icon selection, and/or prompting for method parameter data (such as identification information, prices, budget limits, dates, periods of time, access rights to specific content, etc.) that supply appropriate and/or necessary data for control information purposes. By limiting the typical (non-programming) user to a limited subset of configuration activities whose general configuration environment (template) has been preset to reflect general requirements corresponding to that user, or a content or other business model can very substantially limit difficulties associated with content containerization (including placing initial control information on content), distribution, client administration, electronic agreement implementation, end-user interaction, and clearinghouse activities, including associated interoperability problems (such as conflicts resulting from security, operating system, and/or certification incompatibilities). Use of appropriate WAF templates can assure users that their activities related to content WAF containerization, contribution of other control information, communications, encryption techniques and/or keys, etc. will be in compliance with specifications for their distributed WAF arrangement. WAF templates constitute preset configurations that can normally be reconfigurable to allow for new and/or modified templates that reflect adaptation into new industries as they evolve or to reflect the evolution or other change of an existing industry. For example, the template concept may be used to provide individual, overall frameworks for organizations and individuals that create, modify, market, distribute, consume, and/or otherwise use movies, audio recordings and live performances, magazines, telephony based retail sales, catalogs, computer software, information data bases, multimedia, commercial communications, advertisements, market surveys, infomercials, games, CAD/CAM services for numerically controlled machines, and the like. As the context surrounding these templates changes or evolves, template applications provided under the present invention may be modified to meet these changes for broad use, or for more focused activities. A given WAF participant may have a plurality of templates available for different tasks. A party that places content in its initial WAF container may have a variety of different, configurable templates depending on the type of content and/or business model related to the content. An end-user may have different configurable templates that can be applied to different document types (e-mail, secure internal documents, database records, etc.) and/or subsets of users (applying differing general sets of control information to different bodies of users, for example, selecting a list of users who may, under certain preset criteria, use a certain document). Of course, templates may, under certain circumstances have fixed control information and not provide for user selections or parameter data entry.

support plural, different control models regulating the use and/or auditing of either the same specific copy of electronic information content and/or differently regulating different copies (occurrences) of the same electronic information content. Differing models for billing, auditing, and security can be applied to the same piece of electronic information content and such differing sets of control information may employ, for control purposes, the same, or differing, granularities of electronic information control increments. This includes supporting variable control information for budgeting and auditing usage as applied to a variety of predefined increments of electronic information, including employing a variety of different budgets and/or metering increments for a given electronic information deliverable for: billing units of measure, credit limit, security budget limit and security content metering increments, and/or market surveying and customer profiling content metering increments. For example, a CD-ROM disk with a database of scientific articles might be in part billed according to a formula based on the number of bytes decrypted, number of articles containing said bytes decrypted, while a security budget might limit the use of said database to no more than 5% of the database per month for users on the wide area network it is installed on.

provide mechanisms to persistently maintain trusted content usage and reporting control information through both a sufficiently secure chain of handling of content and content control information and through various forms of usage of such content wherein said persistence of control may survive such use. Persistence of control includes the ability to extract information from a WAF container object by creating a new container whose contents are at least in part secured and that contains both the extracted content and at least a portion of the control information which control information of the original container and/or are at least in part produced by control information of the original container for this purpose and/or WAF installation control information stipulates should persist and/or control usage of content in the newly formed container. Such control information can continue to manage usage of container content if the container is "embedded" into another WAF managed object, such as an object which contains plural embedded WAF containers, each of which contains content derived (extracted) from a different source.

enables users, other value chain participants (such as clearinghouses and government agencies), and/or user organizations, to specify preferences or requirements related to their use of electronic content and/or appliances. Content users, such as end-user customers using commercially distributed content (games, information resources, software programs, etc.), can define, if allowed by senior control information, budgets, and/or other control information, to manage their own internal use of content. Uses include, for example, a user setting a limit on the price for electronic documents that the user is willing to pay without prior express user authorization, and the user establishing the character of metering information he or she is willing to allow to be collected (privacy protection). This includes providing the means for content users to protect the privacy of information derived from their use of a WAF installation and content and/or appliance usage auditing. In particular, WAF can prevent information related to a participant's usage of electronic content from being provided to other parties without the participant's tacit or explicit agreement.

provide mechanisms that allow control information to "evolve" and be modified according, at least in part, to independently, securely delivered further control information. Said control information may include executable code (e.g., load modules) that has been certified as acceptable (e.g., reliable and trusted) for use with a specific WAF application, class of applications, and/or a WAF distributed arrangement. This modification (evolution) of control information can occur upon content control information (load modules and any associated data) circulating to one or more WAF participants in a pathway of handling of control information, or it may occur upon control information being received from a WAF participant. Handlers in a pathway of handling of content control information, to the extent each is authorized, can establish, modify, and/or contribute to, permission, auditing, payment, and reporting control information related to controlling, analyzing, paying for, and/or reporting usage of, electronic content and/or appliances (for example, as related to usage of WAF controlled property content). Independently delivered (from an independent source which is independent except in regards to certification), at least in part secure, control information can be employed to securely modify content control information when content control information has flowed from one party to another party in a sequence of WAF content control information handling. This modification employs, for example, one or more WAF component assemblies being securely processed in a WAF secure subsystem. In an alternate embodiment, control information may be modified by a senior party through use of their WAF installation secure sub-system after receiving submitted, at least in part secured, control information from a "junior" party, normally in the form of a WAF administrative object. Control information passing along WAF pathways can represent a mixed control set, in that it may include: control information that persisted through a sequence of control information handlers, other control information that was allowed to be modified, and further control information representing new control information and/or mediating data. Such a control set represents an evolution of control information for disseminated content. In this example the overall content control set for a WAF content container is "evolving" as it securely (e.g. communicated in encrypted form and using authentication and digital signaturing techniques) passes, at least in part, to a new participant's WAF installation where the proposed control information is securely received and handled. The received control information may be integrated (through use of the receiving parties' WAF installation secure sub-system) with in-place control information through a negotiation process involving both control information sets. For example, the modification, within the secure sub-system of a content provider's WAF installation, of content control information for a certain WAF content container may have occurred as a result of the incorporation of required control information provided by a financial credit provider. Said credit provider may have employed their WAF installation to prepare and securely communicate (directly or indirectly) said required control information to said content provider. Incorporating said required control information enables a content provider to allow the credit provider's credit to be employed by a content end-user to compensate for the end-user's use of WAF controlled content and/or appliances, so long as said end-user has a credit account with said financial credit provider and said credit account has sufficient credit available. Similarly, control information requiring the payment of taxes and/or the provision of revenue information resulting from electronic commerce activities may be securely received by a content provider. This control information may be received, for example, from a government agency. Content providers might be required by law to incorporate such control information into the control information for commercially distributed content and/or services related to appliance usage. Proposed control information is used to an extent allowed by senior control information and as determined by any negotiation trade-offs that satisfy priorities stipulated by each set (the received set and the proposed set). WAF also accommodates different control schemes specifically applying to different participants (e.g., individual participants and/or participant classes (types)) in a network of WAF content handling participants.

support multiple simultaneous control models for the same content property and/or property portion. This allows, for example, for concurrent business activities which are dependent on electronic commercial product content distribution, such as acquiring detailed market survey information and/or supporting advertising, both of which can increase revenue and result in lower content costs to users and greater value to content providers. Such control information and/or overall control models may be applied, as determined or allowed by control information, in differing manners to different participants in a pathway of content, reporting, payment, and/or related control information handling. WAF supports applying different content control information to the same and/or different content and/or appliance usage related activities, and/or to different parties in a content and/or appliance usage model, such that different parties (or classes of WAF users, for example) are subject to differing control information managing their use of electronic information content. For example, differing control models based on the category of a user as a distributor of a WAF controlled content object or an end-user of such content may result in different budgets being applied. Alternatively, for example, a one distributor may have the right to distribute a different array of properties than another distributor (from a common content collection provided, for example, on optical disc). An individual, and/or a class or other grouping of end-users, may have different costs (for example, a student, senior citizen, and/or poor citizen user of content who may be provided with the same or differing discounts) than a "typical" content user.

support provider revenue information resulting from customer use of content and/or appliances, and/or provider and/or end-user payment of taxes, through the transfer of credit and/or electronic currency from said end-user and/or provider to a government agency, might occur "automatically" as a result of such received control information causing the generation of a WAF content container whose content includes customer content usage information reflecting secure, trusted revenue summary information and/or detailed user transaction listings (level of detail might depend, for example on type or size of transaction—information regarding a bank interest payment to a customer or a transfer of a large (e.g. over $10,000) might be, by law, automatically reported to the government). Such summary and/or detailed information related to taxable events and/or currency, and/or creditor currency transfer, may be passed along a pathway of reporting and/or payment to the government in a WAF container. Such a container may also be used for other WAF related content usage reporting information.

support the flowing of content control information through different "branches" of content control information handling so as to accommodate, under the present invention's preferred embodiment, diverse controlled distributions of WAF controlled content. This allows different parties to employ the same initial electronic content with differing (perhaps competitive) control strategies. In this instance, a party who first placed control information on content can make certain control assumptions and these assumptions would evolve into more specific and/or extensive control assumptions. These control assumptions can evolve during the branching sequence upon content model participants submitting control information changes, for example, for use in "negotiating" with "in place" content control information. This can result in new or modified content control information and/or it might involve the selection of certain one or more already "in-place" content usage control methods over in-place alternative methods, as well as the submission of relevant control information parameter data. This form of evolution of different control information sets applied to different copies of the same electronic property content and/or appliance results from WAF control information flowing "down" through different branches in an overall pathway of handling and control and being modified differently as it diverges down these different pathway branches. This ability of the present invention to support multiple pathway branches for the flow of both WAF content control information and WAF managed content enables an electronic commerce marketplace which supports diverging, competitive business partnerships, agreements, and evolving overall business models which can employ the same content properties combined, for example, in differing collections of content representing differing at least in part competitive products.

enable a user to securely extract, through the use of the secure subsystem at the user's WAF installation, at least a portion of the content included within a WAF content container to produce a new, secure object (content container), such that the extracted information is maintained in a continually secure manner through the extraction process. Formation of the new WAF container containing such extracted content shall result in control information consistent with, or specified by, the source WAF content container, and/or local WAF installation secure subsystem as appropriate, content control information. Relevant control information, such as security and administrative information, derived, at least in part, from the parent (source) object's control information, will normally be automatically inserted into a new WAF content container object containing extracted WAF content. This process typically occurs under the control framework of a parent object and/or WAF installation control information executing at the user's WAF installation secure subsystem (with, for example, at least a portion of this inserted control information being stored securely in encrypted form in one or more permissions records). In an alternative embodiment, the derived content control information applied to extracted content may be in part or whole derived from, or employ, content control information stored remotely from the WAF installation that performed the secure extraction such as at a remote server location. As with the content control information for most WAF managed content, features of the present invention allows the content's control information to:

(a) "evolve," for example, the extractor of content may add new control methods and/or modify control parameter data, such as WAF application compliant methods, to the extent allowed by the content's in-place control information. Such new control information might specify, for example, who may use at least a portion of the new object, and/or how said at least a portion of said extracted content may be used (e.g. when at least a portion may be used, or what portion or quantity of portions may be used);

(b) allow a user to combine additional content with at least a portion of said extracted content, such as material authored by the extractor and/or content (for example, images, video, audio, and/or text) extracted from one or more other WAF container objects for placement directly into the new container;

(c) allow a user to securely edit at least a portion of said content while maintaining said content in a secure form within said WAF content container;

(d) append extracted content to a pre-existing WAF content container object and attach associated control information—in these cases, user added information may be secured, e.g., encrypted, in part or as a whole, and may be subject to usage and/or auditing control information that differs from the those applied to previously in place object content;

(e) preserve WAF control over one or more portions of extracted content after various forms of usage of said portions, for example, maintain content in securely stored form while allowing "temporary" on screen display of content or allowing a software program to be maintained in secure form but transiently decrypt any encrypted executing portion of said program (all, or only a portion, of said program may be encrypted to secure the program).

Generally, the extraction features of the present invention allow users to aggregate and/or disseminate and/or otherwise use protected electronic content information extracted from content container sources while maintaining secure WAF capabilities thus preserving the rights of providers in said content information after various content usage processes.

support the aggregation of portions of WAF controlled content, such portions being subject to differing WAF content container control information, wherein various of said portions may have been provided by independent, different content providers from one or more different locations remote to the user performing the aggregation. Such aggregation, in the preferred embodiment of the present invention, may involve preserving at least a portion of the control information (e.g., executable code such as load modules) for each of various of said portions by, for example, embedding some or all of such portions individually as WAF content container objects within an overall WAF content container and/or embedding some or all of such portions directly into a WAF content container. In the latter case, content control information of said content container may apply differing control information sets to various of such portions based upon said portions original control information requirements before aggregation. Each of such embedded WAF content containers may have its own control information in the form of one or more permissions records. Alternatively, a negotiation between control information associated with various aggregated portions of electronic content, may produce a control information set that would govern some or all of the aggregated content portions. The WAF content control information produced by the negotiation may be uniform (such as having the same load modules and/or component assemblies, and/or it may apply differing such content control information to two or more portions that constitute an aggregation of WAF controlled content such as differing metering, budgeting, billing and/or payment models. For example, content usage payment may be automatically made, either through a clearinghouse, or directly, to different content providers for different potions.

enable flexible metering of, or other collection of information related to, use of electronic content and/or electronic appliances. A feature of the present invention enables such flexibility of metering control mechanisms to accommodate a simultaneous, broad array of: (a) different parameters related to electronic information content use; (b) different increment units (bytes, documents, properties, paragraphs, images, etc.) and/or other organizations of such electronic content; and/or (c) different categories of user and/or WAF installation types, such as client organizations, departments, projects, networks, and/or individual users, etc. This feature of the present invention can be employed for content security, usage analysis (for example, market surveying), and/or compensation based upon the use and/or exposure to WAF managed content. Such metering is a flexible basis for ensuring payment for content royalties, licensing, purchasing, and/or advertising. A feature of the present invention provides for payment means supporting flexible electronic currency and credit mechanisms, including the ability to securely maintain audit trails reflecting information related to use of such currency or credit. WAF supports multiple differing hierarchies of client organization control information wherein an organization client administrator distributes control information specifying the usage rights of departments, users, and/or projects. Likewise, a department (division) network manager can function as a distributor (budgets, access rights, etc.) for department networks, projects, and/or users, etc.

provide scalable, integratable, standardized control means for use on electronic appliances ranging from inexpensive consumer (for example, television set-top appliances) and professional devices (and hand-held PDAs) to servers, mainframes, communication switches, etc. The scalable transaction management/auditing technology of the present invention will result in more efficient and reliable interoperability amongst devices functioning in electronic commerce and/or data security environments. As standardized physical containers have become essential to the shipping of physical goods around the world, allowing these physical containers to universally "fit" unloading equipment, efficiently use truck and train space, and accommodate known arrays of objects (for example, boxes) in an efficient manner, so WAF electronic content containers may, as provided by the present invention, be able to efficiently move electronic information content (such as commercially published properties, electronic currency and credit, and content audit information), and associated content control information, around the world. Interoperability is fundamental to efficient electronic commerce. The design of the WAF foundation, WAF load modules, and WAF containers, are important features that enable the WAF node operating environment to be compatible with a very broad range of electronic appliances. The ability, for example, for control methods based on load modules to execute in very "small" and inexpensive secure sub-system environments, such as environments with very little read/write memory, while also being able to execute in large memory sub-systems that may be used in more expensive electronic appliances, supports consistency across many machines. This consistent WAF operating environment, including its control structures and container architecture, enables the use of standardized WAF content containers across a broad range of device types and host operating environments. Since WAF capabilities can be seamlessly integrated as extensions, additions, and/or modifications to fundamental capabilities of electronic appliances and host operating systems, WAF containers, content control information, and the WAF foundation will be able to work with many device types and these device types will be able to consistently and efficiently interpret and enforce WAF control information. Through this integration users can also benefit from a transparent interaction with many of the capabilities of WAF. WAF integration with software operating on a host electronic appliance supports a variety of capabilities that would be unavailable or less secure without such integration. Through integration with one or more device applications and/or device operating environments, many capabilities of the present invention can be presented as inherent capabilities of a given electronic appliance, operating system, or appliance application. For example, features of the present invention include: (a) WAF system software to in part extend and/or modify host operating systems such that they possesses WAF capabilities, such as enabling secure transaction processing and electronic information storage; (b) one or more application programs that in part represent tools associated with WAF operation; and/or (c) code to be integrated into application programs, wherein such code incorporates references into WAF system software to integrate WAF capabilities and makes such applications WAF aware (for example, word processors, database retrieval applications, spreadsheets, multimedia presentation authoring tools, film editing software, music editing software such as MIDI applications and the like, robotics control systems such as those associated with CAD/CAM environments and NCM software and the like, electronic mail systems, teleconferencing software, and other data authoring, creating, handling, and/or usage applications including combinations of the above). These one or more features (which may also be implemented in firmware or hardware) may be employed in conjunction with a WAF node secure hardware processing capability, such as a microcontroller(s), microprocessor(s), other CPU(s) or other digital processing logic.

employ audit reconciliation and usage pattern evaluation processes that assess, through certain, normally network based, transaction processing reconciliation and threshold checking activities, whether certain violations of security of a WAF arrangement have occurred. These processes are performed remote to WAF controlled content end-user WAF locations by assessing, for example, purchases, and/or requests, for electronic properties by a given WAF installation. Applications for such reconciliation activities include assessing whether the quantity of remotely delivered WAF controlled content corresponds to the amount of financial credit and/or electronic currency employed for the use of such content. A trusted organization can acquire information from content providers concerning the cost for content provided to a given WAF installation and/or user and compare this cost for content with the credit and/or electronic currency disbursements for that installation and/or user. Inconsistencies in the amount of content delivered versus the amount of disbursement can prove, and/or indicate, depending on the circumstances, whether the local WAF installation has been, at least to some degree, compromised (for example, certain important system security functions, such as breaking encryption for at least some portion of the secure subsystem and/or WAF controlled content by uncovering one or more keys). Determining whether irregular patterns (e.g. unusually high demand) of content usage, or requests for delivery of certain kinds of WAF controlled information during a certain time period by one or more WAF installations and/or users (including, for example, groups of related users whose aggregate pattern of usage is suspicious) may also be useful in determining whether security at such one or more installations, and/or by such one or more users, has been compromised, particularly when used in combination with an assessment of electronic credit and/or currency provided to one or more WAF users and/or installations, by some or all of their credit and/or currency suppliers, compared with the disbursements made by such users and/or installations.

support security techniques that materially increase the time required to "break" a system's integrity. This includes using a collection of techniques that minimizes the damage resulting from comprising some aspect of the security features of the present inventions.

provide a family of authoring, administrative, reporting, payment, and billing tool user applications that comprise components of the present invention's trusted/secure, universe wide, distributed transaction control and administration system. These components support WAF related: object creation (including placing control information on content), secure object distribution and management (including distribution control information, financial related, and other usage analysis), client internal WAF activities administration and control, security management, user interfaces, payment disbursement, and clearinghouse related functions. These components are designed to support highly secure, uniform, consistent, and standardized: electronic commerce and/or data security pathway(s) of handling, reporting, and/or payment; content control and administration; and human factors (e.g. user interfaces).

support the operation of a plurality of clearinghouses, including, for example, both financial and user clearinghouse activities, such as those performed by a client administrator in a large organization to assist in the organization's use of a WAF arrangement, including usage information analysis, and control of WAF activities by individuals and groups of employees such as specifying budgets and the character of usage rights available under WAF for certain groups of and/or individual, client personnel, subject to control information series to control information submitted by the client administrator. At a clearinghouse, one or more WAF installations may operate together with a trusted distributed database environment (which may include concurrent database processing means). A financial clearinghouse normally receives at its location securely delivered content usage information, and user requests (such as requests for further credit, electronic currency, and/or higher credit limit). Reporting of usage information and user requests can be used for supporting electronic currency, billing, payment and credit related activities, and/or for user profile analysis and/or broader market survey analysis and marketing (consolidated) list generation or other information derived, at least in part, from said usage information this information can be provided to content providers or other parties, through secure, authenticated encrypted communication to the WAF installation secure subsystems. Clearinghouse processing means would normally be connected to specialized I/O means, which may include high speed telecommunication switching means that may be used for secure communications between a clearinghouse and other WAF pathway participants.

securely support electronic currency and credit usage control, storage, and communication at, and between, WAF installations. WAF further supports automated passing of electronic currency and/or credit information, including payment tokens (such as in the form of electronic currency or credit) or other payment information, through a pathway of payment, which said pathway may or may not be the same as a pathway for content usage information reporting. Such payment may be placed into a WAF container created automatically by a WAF installation in response to control information stipulating the "withdrawal" of credit or electronic currency from an electronic credit or currency account based upon an amount owed resulting from usage of WAF controlled electronic content and/or appliances. Payment credit or currency may then be automatically communicated in protected (at least in part encrypted) form through telecommunication of a WAF container to an appropriate party such as a clearinghouse, provider of original property content or appliance, or an agent for such provider (other than a clearinghouse). Payment information may be packaged in said WAF content container with, or without, related content usage information, such as metering information. An aspect of the present invention further enables certain information regarding currency use to be specified as unavailable to certain, some, or all WAF parties ("conditionally" to fully anonymous currency) and/or further can regulate certain content information, such as currency and/or credit use related information (and/or other electronic information usage data) to be available only under certain strict circumstances, such as a court order (which may itself require authorization through the use of a court controlled WAF installation that may be required to securely access "conditionally" anonymous information). Currency and credit information, under the preferred embodiment of the present invention, is treated as administrative content;

support fingerprinting (also known as watermarking) for embedding in content such that when content protected under the present invention is released in clear form from a WAF object (displayed, printed, communicated, extracted, and/or saved), information representing the identification of the user and/or WAF installation responsible for transforming the content into clear form is embedded into the released content. Fingerprinting is useful in providing an ability to identify who extracted information in clear form a WAF container, or who made a copy of a WAF object or a portion of its contents. Since the identity of the user and/or other identifying information may be embedded in an obscure or generally concealed manner, in WAF container content and/or control information, potential copyright violators may be deterred from unauthorized extraction or copying. Fingerprinting normally is embedded into unencrypted electronic content or control information, though it can be embedded into encrypted content and later placed in unencrypted content in a secure WAF installation sub-system as the encrypted content carrying the fingerprinting information is decrypted. Electronic information, such as the content of a WAF container, may be fingerprinted as it leaves a network (such as Internet) location bound for a receiving party. Such repository information may be maintained in unencrypted form prior to communication and be encrypted as it leaves the repository. Fingerprinting would preferably take place as the content leaves the repository, but before the encryption step. Encrypted repository content can be decrypted, for example in a secure WAF sub-system, fingerprint information can be inserted, and then the content can be re-encrypted for transmission. Embedding identification information of the intended recipient user and/or WAF installation into content as it leaves, for example, an Internet repository, would provide important information that would identify or assist in identifying any party that managed to compromise the security of a WAF installation or the delivered content. If a party produces an authorized clear form copy of WAF controlled content, including making unauthorized copies of an authorized clear form copy, fingerprint information would point back to that individual and/or his or her WAF installation. Such hidden information will act as a strong disincentive that should dissuade a substantial portion of potential content "pirates" from stealing other parties electronic information. Fingerprint information identifying a receiving party and/or WAF installation can be embedded into a WAF object before, or during, decryption, replication, or communication of WAF content objects to receivers. Fingerprinting electronic content before it is encrypted for transfer to a customer or other user provides information that can be very useful for identifying who received certain content which may have then been distributed or made available in unencrypted form. This information would be useful in tracking who may have "broken" the security of a WAF installation and was illegally making certain electronic content available to others. Fingerprinting may provide additional, available information such as time and/or date of the release (for example extraction) of said content information. Locations for inserting fingerprints may be specified by WAF installation and/ or content container control information. This information may specify that certain areas and/or precise locations within properties should be used for fingerprinting, such as one or more certain fields of information or information types. Fingerprinting information may be incorporated into a property by modifying in a normally undetectable way color frequency and/or the brightness of certain image pixels, by slightly modifying certain audio signals as to frequency, by modifying font character formation, etc. Fingerprint information, itself, should be encrypted so as to make it particularly difficult for tampered fingerprints to be interpreted as valid. Variations in fingerprint locations for different copies of the same property; "false" fingerprint information; and multiple copies of fingerprint information within a specific property or other content which copies employ different fingerprinting techniques such as information distribution patterns, frequency and/or brightness manipulation, and encryption related techniques, are features of the present invention for increasing the difficulty of an unauthorized individual identifying fingerprint locations and erasing and/or modifying fingerprint information.

provide smart object agents that can carry requests, data, and/or methods, including budgets, authorizations, credit or currency, and content. For example, smart objects may travel to and/or from remote information resource locations and fulfill requests for electronic information content. Smart objects can, for example, be transmitted to a remote location to perform a specified database search on behalf of a user or otherwise "intelligently" search remote one or more repositories of information for user desired information. After identifying desired information at one or more remote locations, by for example, performing one or more database searches, a smart object may return via communication to the user in the form of a secure "return object" containing retrieved information. A user may be charged for the remote retrieving of information, the returning of information to the user's WAF installation, and/or the use of such information. In the latter case, a user may be charged only for the information in the return object that the user actually uses. Smart objects may have the means to request use of one or more services and/or resources. Services include locating other services and/or resources such as information resources, language or format translation, processing, credit (or additional credit) authorization, etc. Resources include reference databases, networks, high powered or specialized computing resources (the smart object may carry information to another computer to be efficiently processed and then return the information to the sending WAF installation), remote object repositories, etc. Smart objects can make efficient use of remote resources (e.g. centralized databases, super computers, etc.) while providing a secure means for charging users based on information and/or resources actually used.

support both "translations" of WAF electronic agreements elements into modern language printed agreement elements (such as English language agreements) and translations of electronic rights protection/transaction management modern language agreement elements to electronic WAF agreement elements. This feature requires maintaining a library of textual language that corresponds to WAF load modules and/or methods and/or component assemblies. As WAF methods are proposed and/or employed for WAF agreements, a listing of textual terms and conditions can be produced by a WAF user application which, in a preferred embodiment, provides phrases, sentences and/or paragraphs that have been stored and correspond to said methods and/or assemblies. This feature preferably employs artificial intelligence capabilities to analyze and automatically determine, and/or assist one or more users to determine, the proper order and relationship between the library elements corresponding to the chosen methods and/or assemblies so as to compose some or all portions of a legal or descriptive document. One or more users, and/or preferably an attorney (if the document a legal, binding agreement), would review the generated document material upon completion and employ such additional textual information and/or editing as necessary to describe non electronic transaction elements of the agreement and make any other improvements that may be necessary. These features further support employing modern language tools that allow one or more users to make selections from choices and provide answers to questions and to produce a WAF electronic agreement from such a process. This process can be interactive and the WAF agreement formulation process may employ artificial intelligence expert system technology that learns from responses and, where appropriate and based at least in part on said responses, provides further choices and/or questions which "evolves" the desired WAF electronic agreement.

support the use of multiple WAF secure subsystems in a single WAF installation. Various security and/or performance advantages may be realized by employing a distributed WAF design within a single WAF installation. For example, designing a hardware based WAF secure subsystem into an electronic appliance WAF display device, and designing said subsystem's integration with said display device so that it is as close as possible to the point of display, will increase the security for video materials by making it materially more difficult to "steal" decrypted video information as it moves from outside to inside the video system. Ideally, for example, a WAF secure hardware module would be in the same physical package as the actual display monitor, such as within the packaging of a video monitor or other display device, and such device would be designed, to the extent commercially practical, to be as tamper resistant as reasonable. As another example, embedding a WAF hardware module into an I/O peripheral may have certain advantages from the standpoint of overall system throughput. If multiple WAF instances are employed within the same WAF installation, these instances will ideally share resources to the extent practical, such as WAF instances storing certain control information and content and/or appliance usage information on the same mass storage device and in the same WAF management database.

requiring reporting and payment compliance by employing exhaustion of budgets and time ageing of keys. For example, a WAF commercial arrangement and associated content control information may involve a content provider's content and the use of clearinghouse credit for payment for end-user usage of said content. Control information regarding said arrangement may be delivered to a user's (of said content) WAF installation and/or said financial clearinghouse's WAF installation. Said control information might require said clearinghouse to prepare and telecommunicate to said content provider both content usage based information in a certain form, and content usage payment in the form of electronic credit (such credit might be "owned" by the provider after receipt and used in lieu of the availability or adequacy of electronic currency) and/or electronic currency. This delivery of information and payment may employ trusted WAF installation secure subsystems to securely, and in some embodiments, automatically, provide in the manner specified by said control information, said usage information and payment content. Features of the present invention help ensure that a requirement that a clearinghouse report such usage information and payment content will be observed. For example, if one participant to a WAF electronic agreement fails to observe such information reporting and/or paying obligation, another participant can stop the delinquent party from successfully participating in WAF activities related to such agreement. For example, if required usage information and payment was not reported as specified by content control information, the "injured" party can fail to provide, through failing to securely communicate from his WAF installation secure subsystem, one or more pieces of secure information necessary for the continuance of one or more critical processes. For example, failure to report information and/or payment from a clearinghouse to a content provider (as well as any security failures or other disturbing irregularities) can result in the content provider not providing key and/or budget refresh information to the clearinghouse, which information can be necessary to authorize use of the clearinghouse's credit for usage of the provider's content and which the clearinghouse would communicate to end-user's during a content usage reporting communication between the clearinghouse and end-user. As another example, a distributor that failed to make payments and/or report usage information to a content provider might find that their budget for creating permissions records to distribute the content provider's content to users, and/or a security budget limiting one or more other aspect of their use of the provider's content, are not being refreshed by the content provider, once exhausted or timed-out (for example, at a predetermined date). In these and other cases, the offended party might decide not to refresh time ageing keys that had "aged out." Such a use of time aged keys has a similar impact as failing to refresh budgets or time-aged authorizations.

support smart card implementations of the present invention in the form of portable electronic appliances, including cards that can be employed as secure credit, banking, and/or money cards. A feature of the present invention is the use of portable WAFs as transaction cards at retail and other establishments, wherein such cards can "dock" with an establishment terminal that has a WAF secure sub-system and/or an online connection to a WAF secure and/or otherwise secure and compatible subsystem, such as a "trusted" financial clearinghouse (e.g., VISA, Mastercard). The WAF card and the terminal (and/or online connection) can securely exchange information related to a transaction, with credit and/or electronic currency being transferred to a merchant and/or clearinghouse and transaction information flowing back to the card. Such a card can be used for transaction activities of all sorts. A docking station, such as a PCMCIA connector on an electronic appliance, such as a personal computer, can receive a consumer's WAF card at home. Such a station/card combination can be used for on-line transactions in the same manner as a WAF installation that is permanently installed in such an electronic appliance. The card can be used as an "electronic wallet" and contain electronic currency as well as credit provided by a clearinghouse. The card can act as a convergence point for financial activities of a consumer regarding many, if not all, merchant, banking, and on-line financial transactions, including supporting home banking activities. A consumer can receive his paycheck and/or investment earnings and/or "authentic" WAF content container secured detailed information on such receipts, through on-line connections. A user can send digital currency to another party with a WAF arrangement, including giving away such currency. A WAF card can retain details of transactions in a highly secure and database organized fashion so that financially related information is both consolidated and very easily retrieved and/or analyzed. Because of the WAF security, including use of effective encryption, authentication, digital signaturing, and secure database structures, the records contained within a WAF card arrangement may be accepted as valid transaction records for government and/or corporate recordkeeping requirements. In some embodiments of the present invention a WAF card may employ docking station and/or electronic appliance storage means and/or share other WAF arrangement means local to said appliance and/or available across a network, to augment the information storage capacity of the WAF card, by for example, storing dated, and/or archived, backup information. Taxes relating to some or all of an individual's financial activities may be automatically computed based on "authentic" information securely stored and available to said WAF card. Said information may be stored in said card, in said docking station, in an associated electronic appliance, and/or other device operatively attached thereto, and/or remotely, such as at a remote server site. A card's data, e.g. transaction history, can be backed up to an individual's personal computer or other electronic appliance and such an appliance may have an integrated WAF installation of its own. A current transaction, recent transactions (for redundancy), or all or other selected card data may be backed up to a remote backup repository, such a WAF compatible repository at a financial clearinghouse, during each or periodic docking for a financial transaction and/or information communication such as a user/merchant transaction. Backing up at least the current transaction during a connection with another party's WAF installation (for example a WAF installation that is also on a financial or general purpose electronic network), by posting transaction information to a remote clearinghouse and/or bank, can ensure that sufficient backup is conducted to enable complete reconstruction of WAF card internal information in the event of a card failure or loss.

support certification processes that ensure authorized interoperability between various WAF installations so as to prevent WAF arrangements and/or installations that unacceptably deviate in specification protocols from other WAF arrangements and/or installations from interoperating in a manner that may introduce security (integrity and/or confidentiality of WAF secured information), process control, and/or software compatibility problems. Certification validates the identity of WAF installations and/or their components, as well as WAF users. Certification data can also serve as information that contributes to determining the decommissioning or other change related to WAF sites.

support the separation of fundamental transaction control processes through the use of event (triggered) based method control mechanisms. These event methods trigger one or more other WAF methods (which are available to a secure WAF sub-system) and are used to carry out WAF managed transaction related processing. These triggered methods include independently (separably) and securely processable component billing management methods, budgeting management methods, metering management methods, and related auditing management processes. As a result of this feature of the present invention, independent triggering of metering, auditing, billing, and budgeting methods, the present invention is able to efficiently, concurrently support multiple financial currencies (e.g. dollars, marks, yen) and content related budgets, and/or billing increments as well as very flexible content distribution models.

support, complete, modular separation of the control structures related to (1) content event triggering, (2) auditing, (3) budgeting (including specifying no right of use or unlimited right of use), (4) billing, and (5) user identity (WAF installation, client name, department, network, and/or user, etc.). The independence of these WAF control structures provides a flexible system which allows plural relationships between two or more of these structures, for example, the ability to associate a financial budget with different event trigger structures (that are put in place to enable controlling content based on its logical portions). Without such separation between these basic WAF capabilities, it would be more difficult to efficiently maintain separate metering, budgeting, identification, and/or billing activities which involve the same, differing (including overlapping), or entirely different, portions of content for metering, billing, budgeting, and user identification, for example, paying fees associated with usage of content, performing home banking, managing advertising services, etc. WAF modular separation of these basic capabilities supports the programming of plural, "arbitrary" relationships between one or differing content portions (and/or portion units) and budgeting, auditing, and/or billing control information. For example, under WAF, a budget limit of $200 dollars or 300 German Marks a month may be enforced for decryption of a certain database and 2 U.S. Dollars or 3 German Marks may be charged for each record of said database decrypted (depending on user selected currency). Such usage can be metered while an additional audit for user profile purposes can be prepared recording the identity of each filed displayed. Additionally, further metering can be conducted regarding the number of said database bytes that have been decrypted, and a related security budget may prevent the decrypting of more than 5% of the total bytes of said database per year. The user may also, under WAF (if allowed by senior control information), collect audit information reflecting usage of database fields by different individuals and client organization departments and ensure that differing rights of access and differing budgets limiting database usage can be applied to these client individuals and groups. Enabling content providers and users to practically employ such diverse sets of user identification, metering, budgeting, and billing control information results, in part, from the use of such independent control capabilities. As a result, WAF can support great configurability in creation of plural control models applied to the same electronic property and the same and/or plural control models applied to differing or entirely different content models (for example, home banking versus electronic shopping).

Secure Processing Units

An important part of WAF provided by the present invention is the core secure transaction control arrangement, herein called an SPU (or SPUs), that typically must be present in each user's computer, other electronic appliance, or network. SPUs provide a trusted environment for generating decryption keys, encrypting and decrypting information, managing the secure communication of keys and other information between electronic appliances (i.e. between WAF installations and/or between plural WAF instances within a single WAF installation), securely accumulating and managing audit trail, reporting, and budget information in secure and/or non-secure non-volatile memory, maintaining a secure database of control information management instructions, and providing a secure environment for performing certain other control and administrative functions.

A hardware SPU (rather than a software emulation) within a WAF node is necessary if a highly trusted environment for performing certain WAF activities is required.

Such a trusted environment may be created through the use of certain control software, one or more tamper resistant hardware modules such as a semiconductor or semiconductor chipset (including, for example, a tamper resistant hardware electronic appliance peripheral device), for use within, and/or operatively connected to, an electronic appliance. With the present invention, the trustedness of a hardware SPU can be enhanced by enclosing some or all of its hardware elements within tamper resistant packaging and/or by employing other tamper resisting techniques (e.g. microfusing and/or thin wire detection techniques). A trusted environment of the present invention implemented, in part, through the use of tamper resistant semiconductor design, contains control logic, such as a microprocessor, that securely executes WAF processes.

A WAF node's hardware SPU is a core component of a WAF secure subsystem and may employ some or all of an electronic appliance's primary control logic, such as a microcontroller, microcomputer or other CPU arrangement. This primary control logic may be otherwise employed for non WAF purposes such as the control of some or all of an electronic appliance's non-WAF functions. When operating in a hardware SPU mode, said primary control logic must be sufficiently secure so as to protect and conceal important WAF processes. For example, a hardware SPU may employ a host electronic appliance microcomputer operating in protected mode while performing WAF related activities, thus allowing portions of WAF processes to execute with a certain degree of security. This alternate embodiment is in contrast to the preferred embodiment wherein a trusted environment is created using a combination of one or more tamper resistant semiconductors that are not part of said primary control logic. In either embodiment, certain control information (software and parameter data) must be securely maintained within the SPU, and further control information can be stored externally and securely (e.g. in encrypted and tagged form) and loaded into said hardware SPU when needed. In many cases, and in particular with microcomputers, the preferred embodiment approach of employing special purpose secure hardware for executing said WAF processes, rather than using said primary control logic, may be more secure and efficient. The level of security and tamper resistance required for trusted SPU hardware processes depends on the commercial requirements of particular markets or market niches, and may vary widely.

What is claimed is:

1. A method for prioritizing components of an existing network framework comprising the steps of:
   (a) providing a plurality of components required for implementation of a predetermined technology using an existing network framework;
   (b) compiling a priority listing of the plurality of components such that the relative position of the plurality of components on the priority listing corresponds to a temporal priority among the plurality of components, the temporal priority being indicative of the order in which the plurality of components are installed for optimal component function;
   (c) pictorially representing the existing network framework and the plurality of components;
   (d) indicia coding a first component of the existing network framework in order to indicate that the first component must be installed first based on the first component's first position on the priority listing; and
   (e) indicia coding a second component of the existing network framework in order to indicate that the second component must be installed after the first component based on the first component's first position and the second component's second position on the priority listing.

2. A method for prioritizing components of an existing network framework as recited in claim 1, wherein a legend is presented which defines the indicia coding with respect to the priority of the components required in the implementation of the predetermined technology.

3. A method for prioritizing components of an existing network framework as recited in claim 1, wherein the components of the existing network framework are selected from the group of components including security services, network services, web services, client services, integration capabilities, data services, directory services, management services, operation services, and developer services.

4. A method for prioritizing components of an existing network framework as recited in claim 1, wherein the components of the existing network framework are selected from the group of components including commerce-related services, content-related services, administration-related services, customer-related services, and education-related services.

5. A method for prioritizing components of an existing network framework as recited in claim 1, wherein the indicia coding is selected from the group of indicia coding including texture coding, color coding, and shading coding.

6. A method for prioritizing components of an existing network framework as recited in claim 1, wherein the existing network framework is a web architecture framework.

7. A computer program embodied on a computer readable medium for prioritizing components of an existing network framework comprising:
   (a) a code segment that provides a plurality of components required for implementation of a predetermined technology using an existing network framework;
   (b) a code segment that compiles a priority listing of the plurality of components such that the relative position of the plurality of components on the priority listing corresponds to a temporal priority among the plurality of components, the temporal priority being indicative of the order in which the plurality of components are installed for optimal component function;
   (c) a code segment that pictorially represents the existing network framework and the plurality of components;
   (d) a code segment that indicia codes a first component of the existing network framework in order to indicate that the first component must be installed first based on the first component's first position on the priority listing; and
   (e) a code segment that indicia codes a second component of the existing network framework in order to indicate that the second component must be installed after the first component based on the first component's first position and the second component's second position on the priority listing.

8. A computer program for prioritizing components of an existing network framework as recited in claim 7, wherein a legend is presented which defines the indicia coding with respect to the priority of the components required in the implementation of the predetermined technology.

9. A computer program for prioritizing components of an existing network framework as recited in claim 7, wherein the components of the existing network framework are selected from the group of components including security services, network services, web services, client services, integration capabilities, data services, directory services, management services, operation services, and developer services.

10. A computer program for prioritizing components of an existing network framework as recited in claim 7, wherein the components of the existing network framework are selected from the group of components including commerce-related services, content-related services, administration-related services, customer-related services, and education-related services.

11. A computer program for prioritizing components of an existing network framework as recited in claim 7, wherein the indicia coding is selected from the group of indicia coding including texture coding, color coding, and shading coding.

12. A computer program for prioritizing components of an existing network framework as recited in claim 7, wherein the existing network framework is a web architecture framework.

13. A system for prioritizing components of an existing network framework comprising:
- (a) logic for providing a plurality of components required for implementation of a predetermined technology using an existing network framework;
- (b) logic for compiling a priority listing of the plurality of components such that the relative position of the plurality of components on the priority listing corresponds to a temporal priority among the plurality of components, the temporal priority being indicative of the order in which the plurality of components are installed for optimal component function;
- (c) logic for pictorially representing the existing network framework and the plurality of components;
- (d) logic for indicia coding a first component of the existing network framework in order to indicate that the first component must be installed first based on the first component's first position on the priority listing; and
- (e) logic for indicia coding a second component of the existing network framework in order to indicate that the second component must be installed after the first component based on the first component's first position and the second component's second position on the priority listing.

14. A system for prioritizing components of an existing network framework as recited in claim 13, wherein a legend is presented which defines the indicia coding with respect to the priority of the components required in the implementation of the predetermined technology.

15. A system for prioritizing components of an existing network framework as recited in claim 13, wherein the components of the existing network framework are selected from the group of components including security services, network services, web services, client services, integration capabilities, data services, directory services, management services, operation services, and developer services.

16. A system for prioritizing components of an existing network framework as recited in claim 13, wherein the components of the existing network framework are selected from the group of components including commerce-related services, content-related services, administration-related services, customer-related services, and education-related services.

17. A system for prioritizing components of an existing network framework as recited in claim 13, wherein the indicia coding is selected from the group of indicia coding including texture coding, color coding, and shading coding.

18. A system for prioritizing components of an existing network framework as recited in claim 13, wherein the existing network framework is a web architecture framework.

* * * * *